US012456274B2

(12) United States Patent
Smith

(10) Patent No.: US 12,456,274 B2
(45) Date of Patent: *Oct. 28, 2025

(54) FACIAL EXPRESSION AND POSE TRANSFER UTILIZING AN END-TO-END MACHINE LEARNING MODEL

(71) Applicant: Adobe Inc., San Jose, CA (US)

(72) Inventor: Cameron Smith, Santa Cruz, CA (US)

(73) Assignee: Adobe Inc., San Jose, CA (US)

( * ) Notice: Subject to any disclaimer, the term of this patent is extended or adjusted under 35 U.S.C. 154(b) by 196 days.

This patent is subject to a terminal disclaimer.

(21) Appl. No.: 18/190,673

(22) Filed: Mar. 27, 2023

(65) Prior Publication Data

US 2024/0331322 A1    Oct. 3, 2024

(51) Int. Cl.
*G06T 19/20* (2011.01)
*G06V 10/774* (2022.01)
(Continued)

(52) U.S. Cl.
CPC ............ *G06T 19/20* (2013.01); *G06V 10/774* (2022.01); *G06V 10/945* (2022.01); *G06V 20/40* (2022.01);
(Continued)

(58) Field of Classification Search
CPC ............... G06T 19/20; G06T 2200/24; G06T 2219/2021; G06T 13/40; G06T 7/10;
(Continued)

(56) References Cited

U.S. PATENT DOCUMENTS

| 11,462,040 B2 | 10/2022 | Lin et al. |
| 12,026,845 B2 | 7/2024 | Pardeshi |

(Continued)

FOREIGN PATENT DOCUMENTS

| CN | 113240613 B | 8/2021 |
| CN | 114862697 A | 8/2022 |

(Continued)

OTHER PUBLICATIONS

Combined Search and Examination Report as received in GB2318853.5 dated Jun. 12, 2024.

(Continued)

*Primary Examiner* — Alicia M Harrington
*Assistant Examiner* — Christine Yera Ahn
(74) *Attorney, Agent, or Firm* — Keller Preece PLLC

(57) ABSTRACT

The present disclosure relates to systems, methods, and non-transitory computer-readable media that modify digital images via scene-based editing using image understanding facilitated by artificial intelligence. For example, in one or more embodiments the disclosed systems utilize generative machine learning models to create modified digital images portraying human subjects. In particular, the disclosed systems generate modified digital images by performing infill modifications to complete a digital image or human inpainting for portions of a digital image that portrays a human. Moreover, in some embodiments, the disclosed systems perform reposing of subjects portrayed within a digital image to generate modified digital images. In addition, the disclosed systems in some embodiments perform facial expression transfer and facial expression animations to generate modified digital images or animations.

20 Claims, 119 Drawing Sheets

(51) Int. Cl.
    *G06V 10/94*     (2022.01)
    *G06V 20/40*     (2022.01)
    *G06V 40/16*     (2022.01)
(52) U.S. Cl.
    CPC ........ *G06V 40/174* (2022.01); *G06T 2200/24* (2013.01); *G06T 2219/2021* (2013.01)
(58) Field of Classification Search
    CPC . G06T 2207/20081; G06T 2207/20084; G06T 2207/30201; G06V 10/774; G06V 10/945; G06V 20/40; G06V 40/174; G06V 10/82
    See application file for complete search history.

(56) References Cited

U.S. PATENT DOCUMENTS

| | | | |
|---|---|---|---|
| 2019/0114748 | A1 | 4/2019 | Lin et al. |
| 2020/0234480 | A1 | 7/2020 | Volkov et al. |
| 2020/0394828 | A1 | 12/2020 | Shukla et al. |
| 2021/0056348 | A1 | 2/2021 | Berlin et al. |
| 2021/0264207 | A1* | 8/2021 | Smith .................. G06V 10/44 |
| 2022/0068037 | A1 | 3/2022 | Pardeshi |
| 2022/0207262 | A1 | 6/2022 | Jeong et al. |
| 2022/0392133 | A1 | 12/2022 | Volkov et al. |
| 2023/0037339 | A1 | 2/2023 | Villegas et al. |
| 2023/0110206 | A1* | 4/2023 | Karras .................. H04N 19/85 706/20 |
| 2023/0123820 | A1 | 4/2023 | Wang et al. |
| 2023/0252687 | A1* | 8/2023 | Zhang .................. G06V 10/806 382/159 |
| 2023/0319223 | A1 | 10/2023 | Naruiec et al. |
| 2023/0410447 | A1 | 12/2023 | Cheng et al. |
| 2024/0135511 | A1 | 4/2024 | Singh et al. |
| 2024/0135513 | A1 | 4/2024 | Singh et al. |
| 2024/0153047 | A1 | 5/2024 | Smith et al. |
| 2024/0169624 | A1 | 5/2024 | Brandt et al. |
| 2024/0169701 | A1 | 5/2024 | Kulal et al. |
| 2024/0171848 | A1 | 5/2024 | Figueroa et al. |
| 2024/0249459 | A1 | 7/2024 | Bradley et al. |
| 2024/0331322 | A1 | 10/2024 | Smith |

FOREIGN PATENT DOCUMENTS

| | | |
|---|---|---|
| CN | 114943656 A | 8/2022 |
| GB | 2606253 A | 11/2022 |
| WO | 2022083504 A1 | 4/2022 |

OTHER PUBLICATIONS

Combined Search and Examination Report as received in GB2319660.3 dated Jun. 14, 2024.
Combined Search and Examination Report as received in GB2319084.6 dated Jun. 25, 2024.
Wiles, O., Koepke, A and Zisserman, A, 2018. "X2face: A network for controlling face generation using images, audio, and pose codes." in Proceedings of the European conference on computer vision (ECCV) (pp. 690-706).
U.S. Appl. No. 18/190,544, filed Nov. 20, 2024, Notice of Allowance.
U.S. Appl. No. 18/190,556, filed Dec. 13, 2024, Office Action.
U.S. Appl. No. 18/190,684, filed Jan. 27, 2025, Office Action.
Michail Christos Doukas, Stefanos Zafeiriou, Viktoriia Sharmanska HeadGAN: One-Shot Neural Head Synthesis and Editing, Year: 2021.
Robin Rombach, Andreas Blattmann, Dominik Lorenz, Patrick Esser, Bjorn Ommer—High-Resolution Image Synthesis with Latent Diffusion Models arXiv:2112.10752 Wed, Apr. 13, 2022.
Badour AlBahar, Jingwan Lu, Jimei Yang, Zhixin Shu, Eli Shechtman, Jia-Bin Huang—Pose with Style: Detail-Preserving Pose-Guided Image Synthesis with Conditional StyleGAN Badour et al., Siggraph Asia 2021.
Artur Grigorev, Artem Sevastopolsky, Alexander Vakhiov, and Victor Lempitsky. Coordinate-based texture inpainting for pose-guided image generation. arXiv preprint arXiv:1811.11459, 2018.
Ziwei Liu, Ping Luo, Shi Qiu, Xiaogang Wang, and Xiaoou Tang. Deepfashion: Powering robust clothes recognition and retrieval with rich annotations. In Proceedings of IEEE Conference on Computer Vision and Pattern Recognition (CVPR), 415 2016.
Kripasindhu Sarkar, Vladislav Golyanik, Lingjie Liu, and Christian Theobalt. Style and pose control for image synthesis of humans from a single monocular view, 2021.
Karen Simonyan and Andrew Zisserman. Very deep convolutional networks for large-scale image recognition. arXiv preprint arXiv:1409.1556, 2014.
Qiao, Fengchun, et al. "Geometry-contrastive gan for facial expression transfer." arXiv preprint arXiv: 1802.01822 (2018). (Year: 2018).
Chen, Yajing, et al. "Self-supervised learning of detailed 3d face reconstruction." IEEE Transactions on Image Processing 29 (2020): 8696-8705. (Year: 2020).
Screen captures from YouTube video clip entitled "How to Use xpression camera—For Video Chat, Vlogging, Live Streaming, Content Creation, Gaming," 4 pages, uploaded on Feb. 8, 2023 by user "EmbodyMe". Retrieved from Internet: <https://www.youtube.com/watch?v=BWOOoScfx_g> (Year: 2023).
U.S. Appl. No. 18/190,500, filed Feb. 26, 2025, Office Action.
U.S. Appl. No. 18/190,500, filed Apr. 15, 2025, Notice of Allowance.
U.S. Appl. No. 18/190,556, filed Mar. 12, 2025, Notice of Allowance.
U.S. Appl. No. 18/190,684, filed Mar. 12, 2025, Office Action.
U.S. Appl. No. 18/190,684, filed May 7, 2025, Office Action.
U.S. Appl. No. 18/190,684 filed Jul. 29, 2025.

* cited by examiner

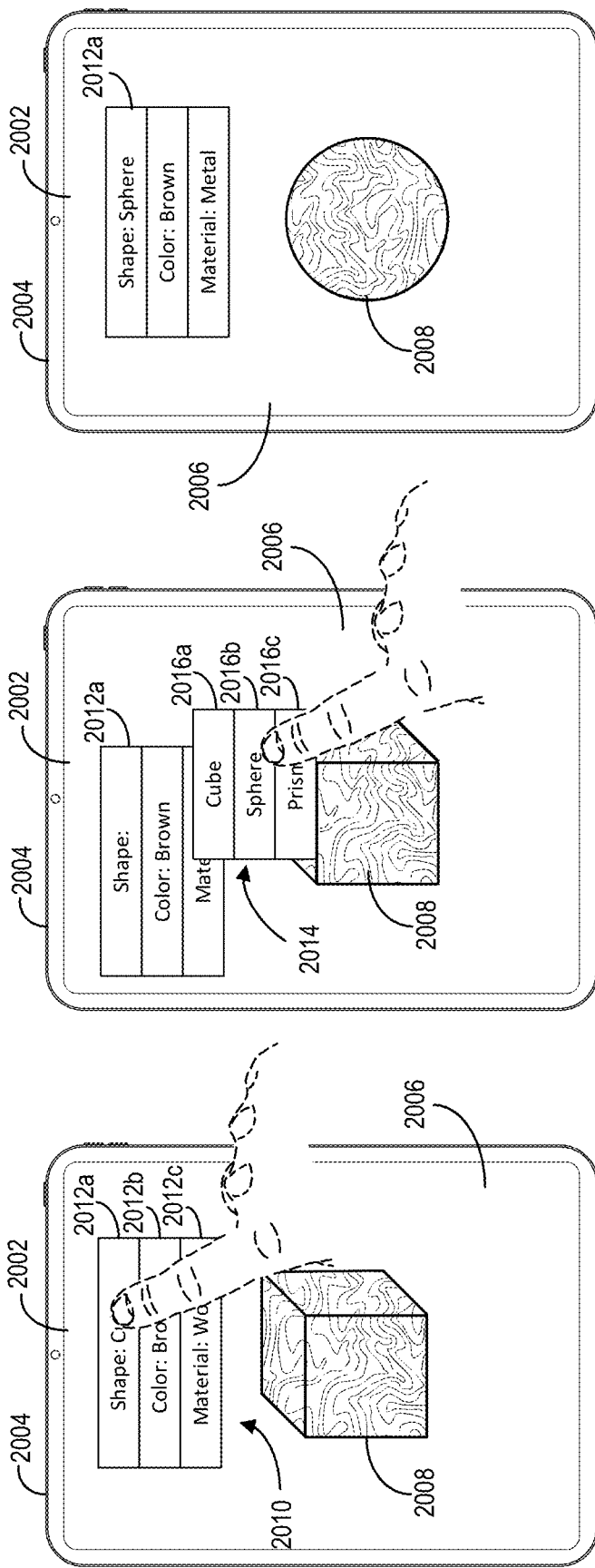

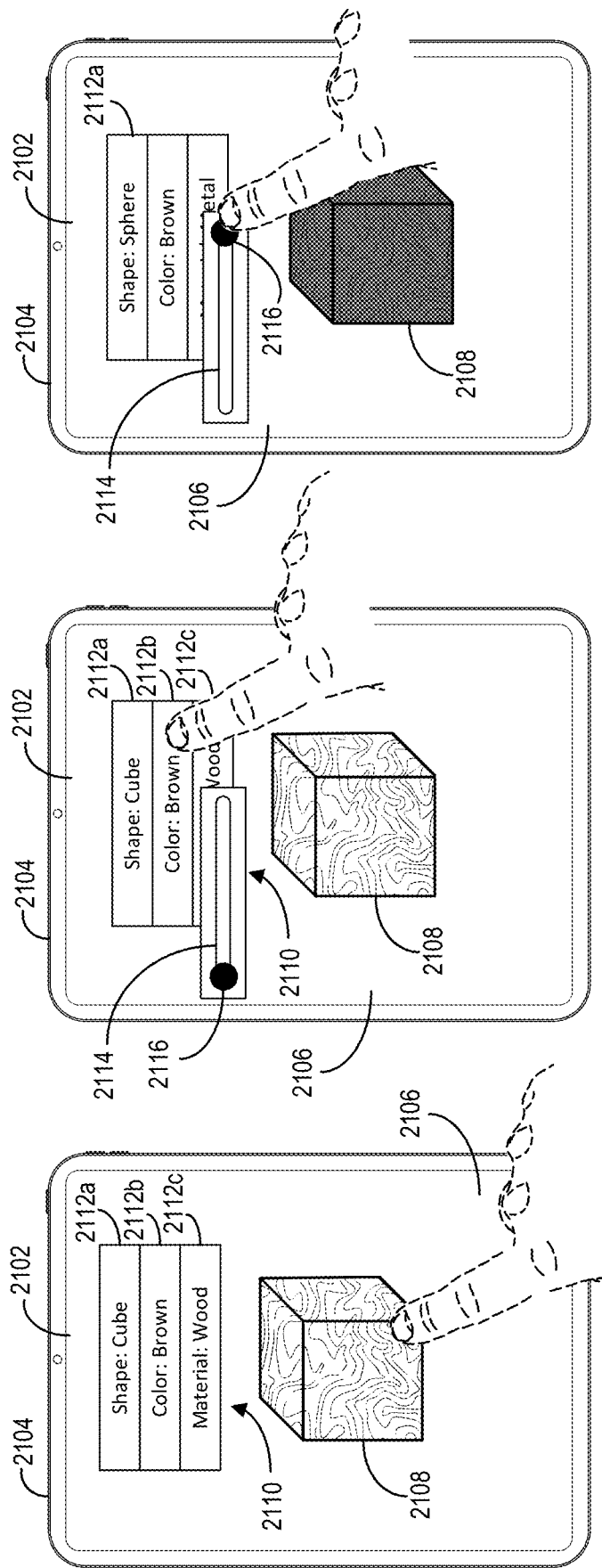

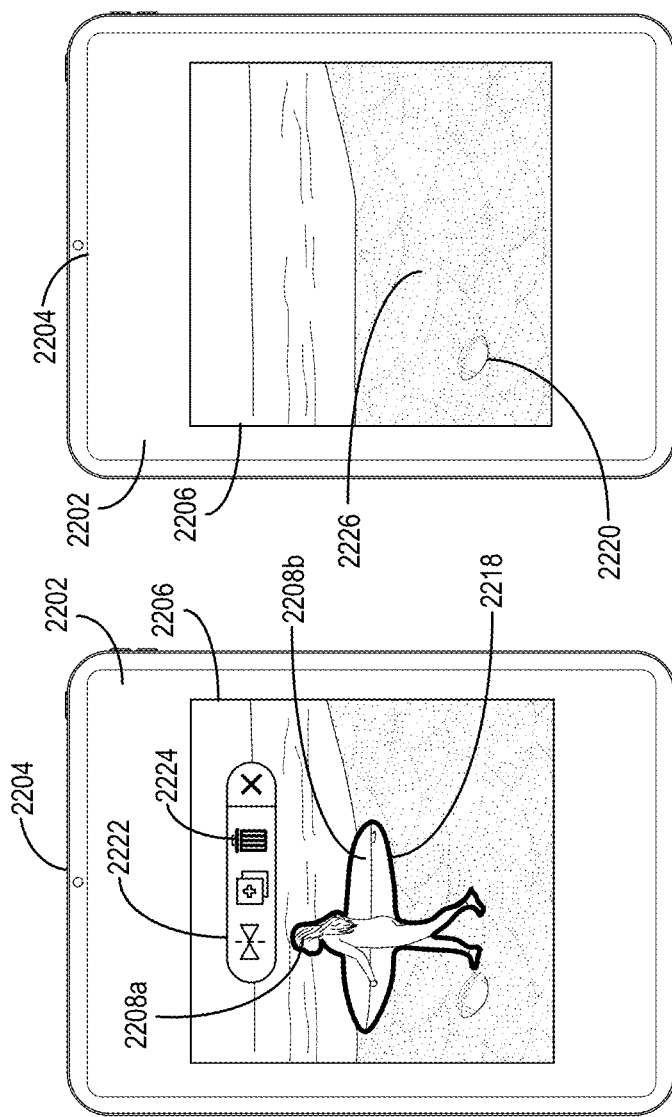
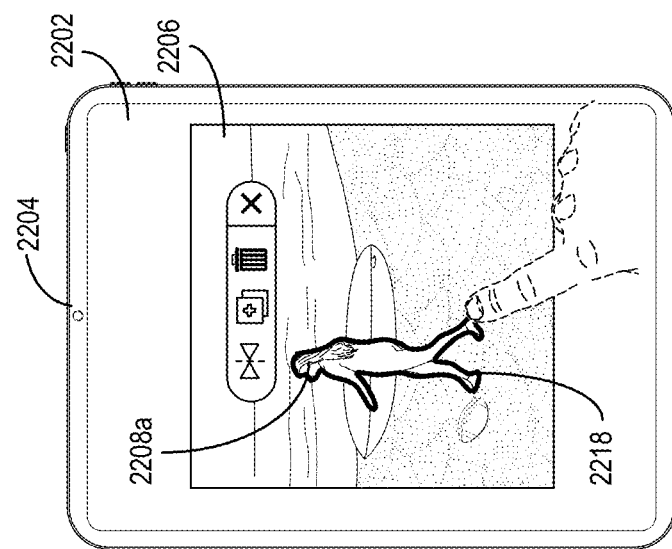
Fig. 22D
Fig. 22C
Fig. 22B

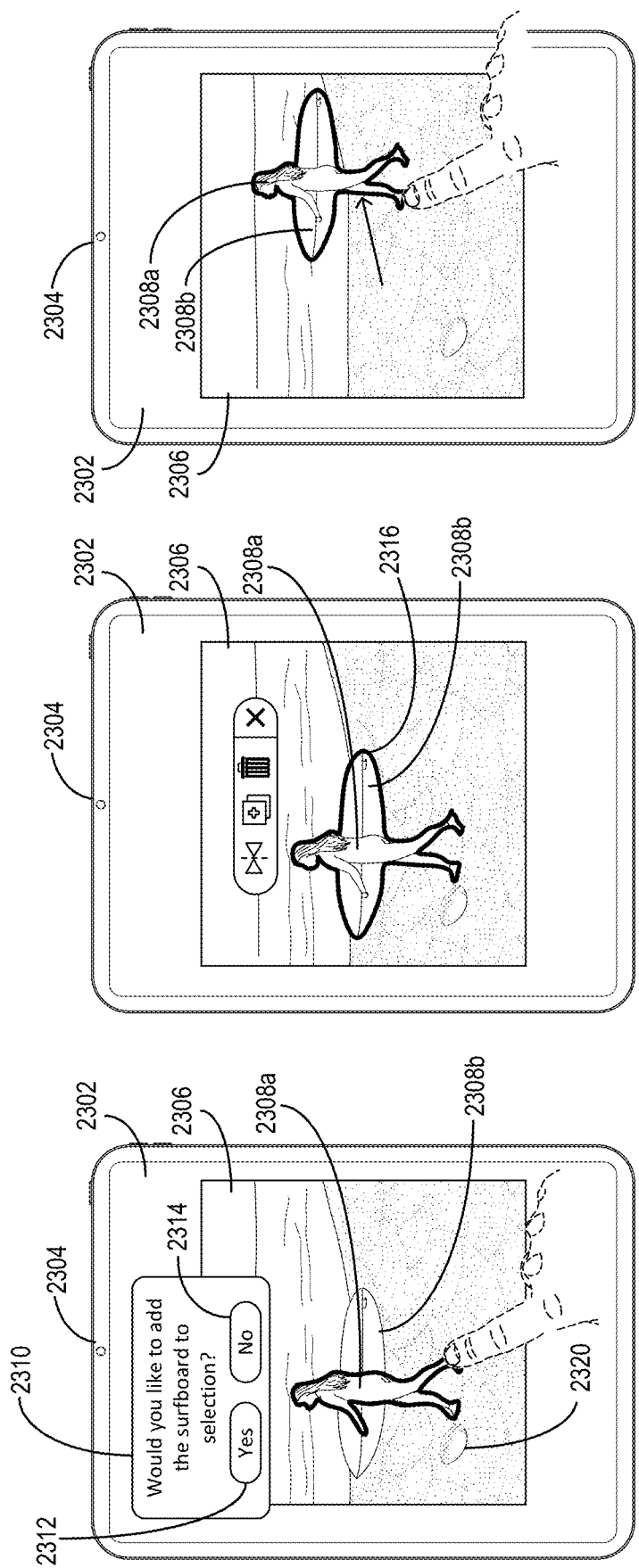

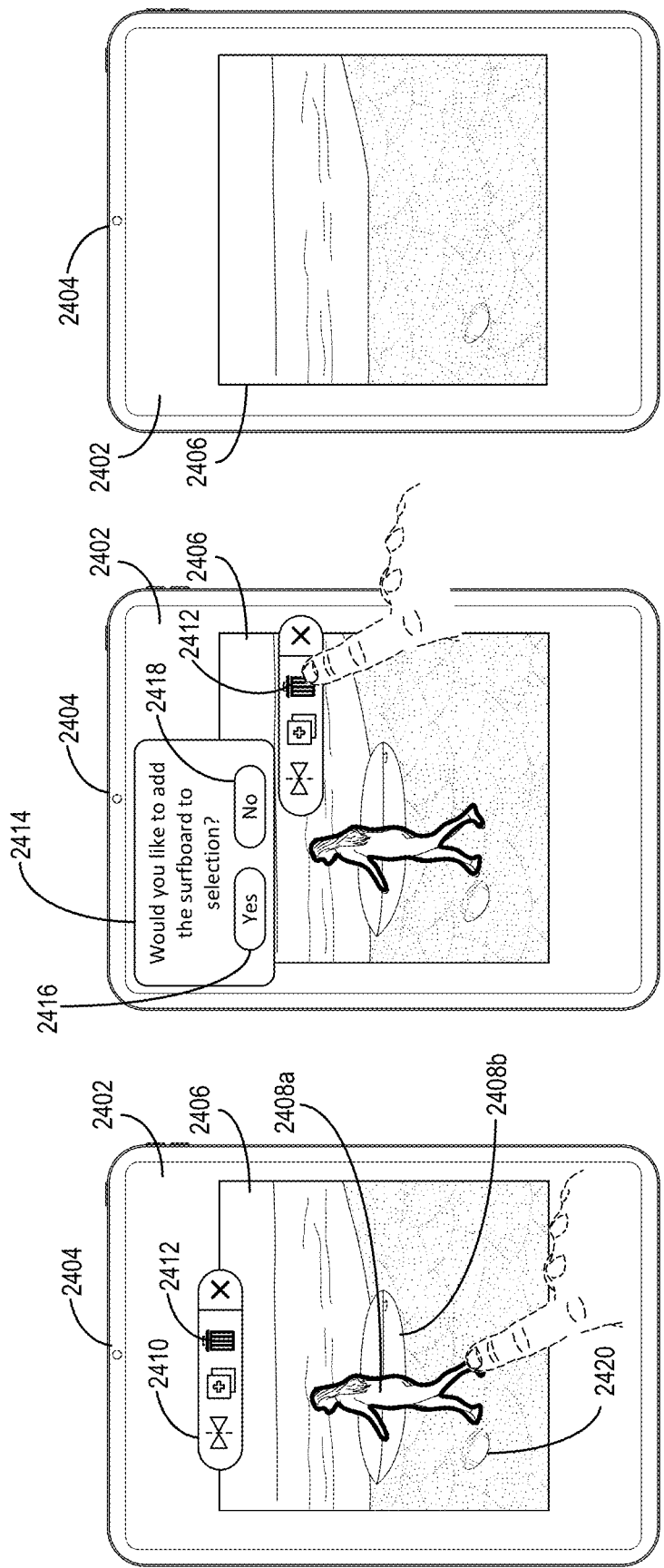

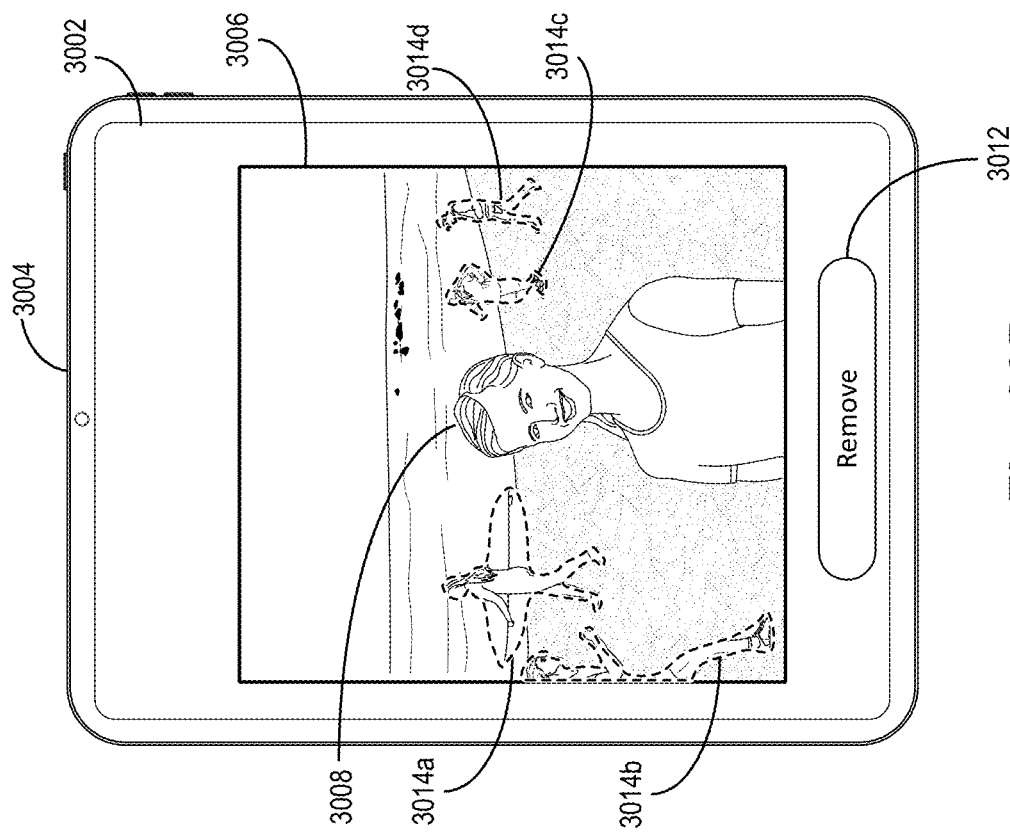
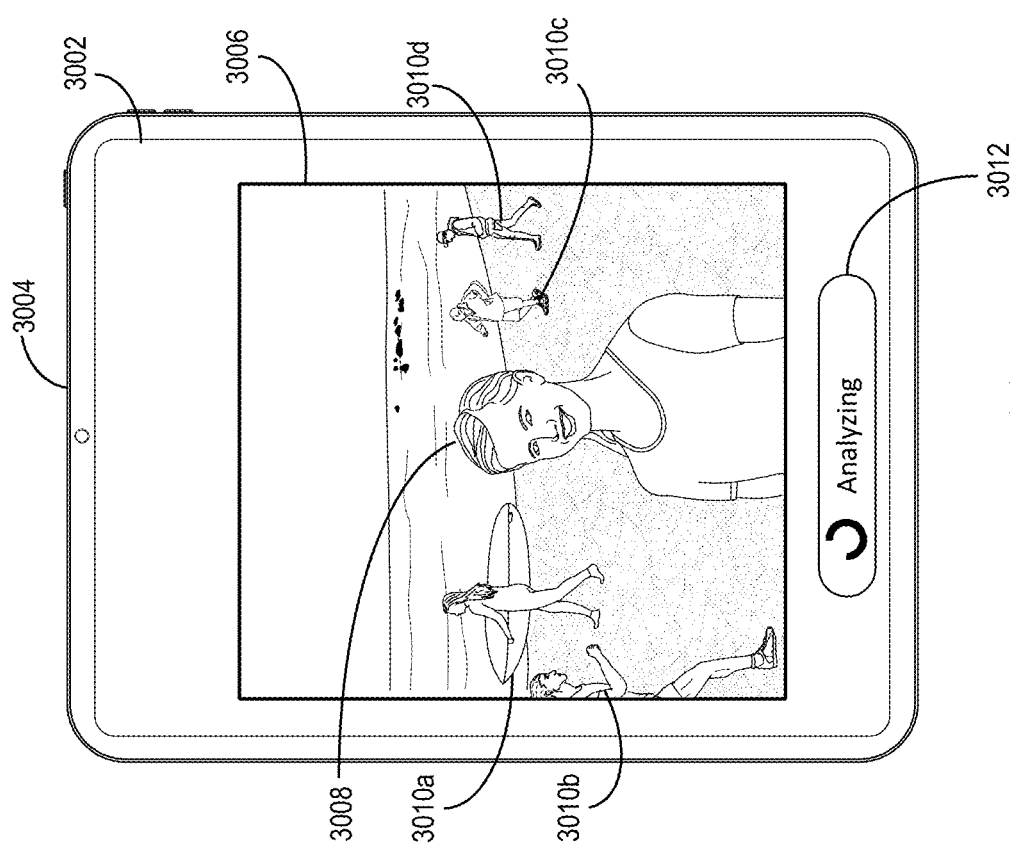
Fig. 30B
Fig. 30A

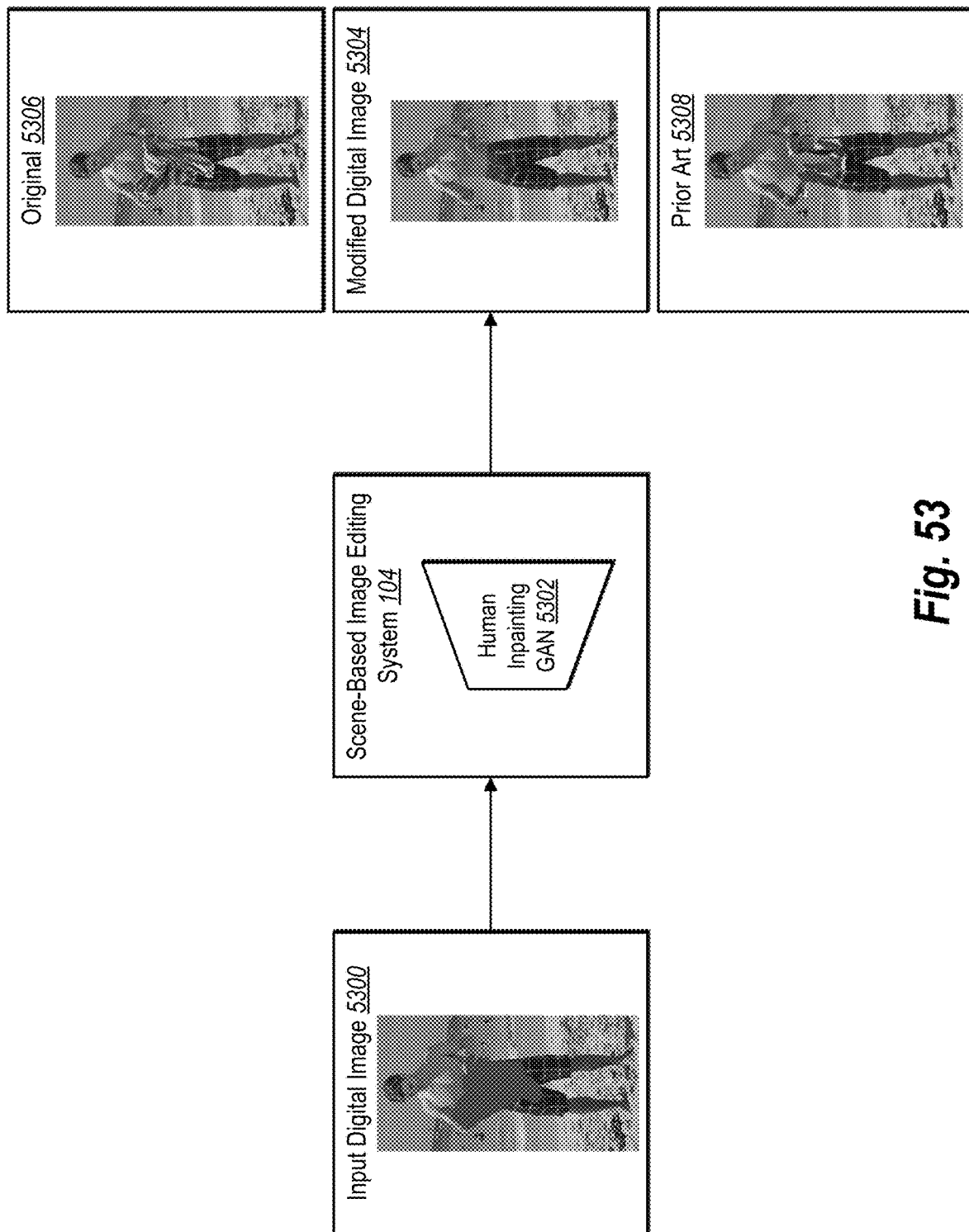

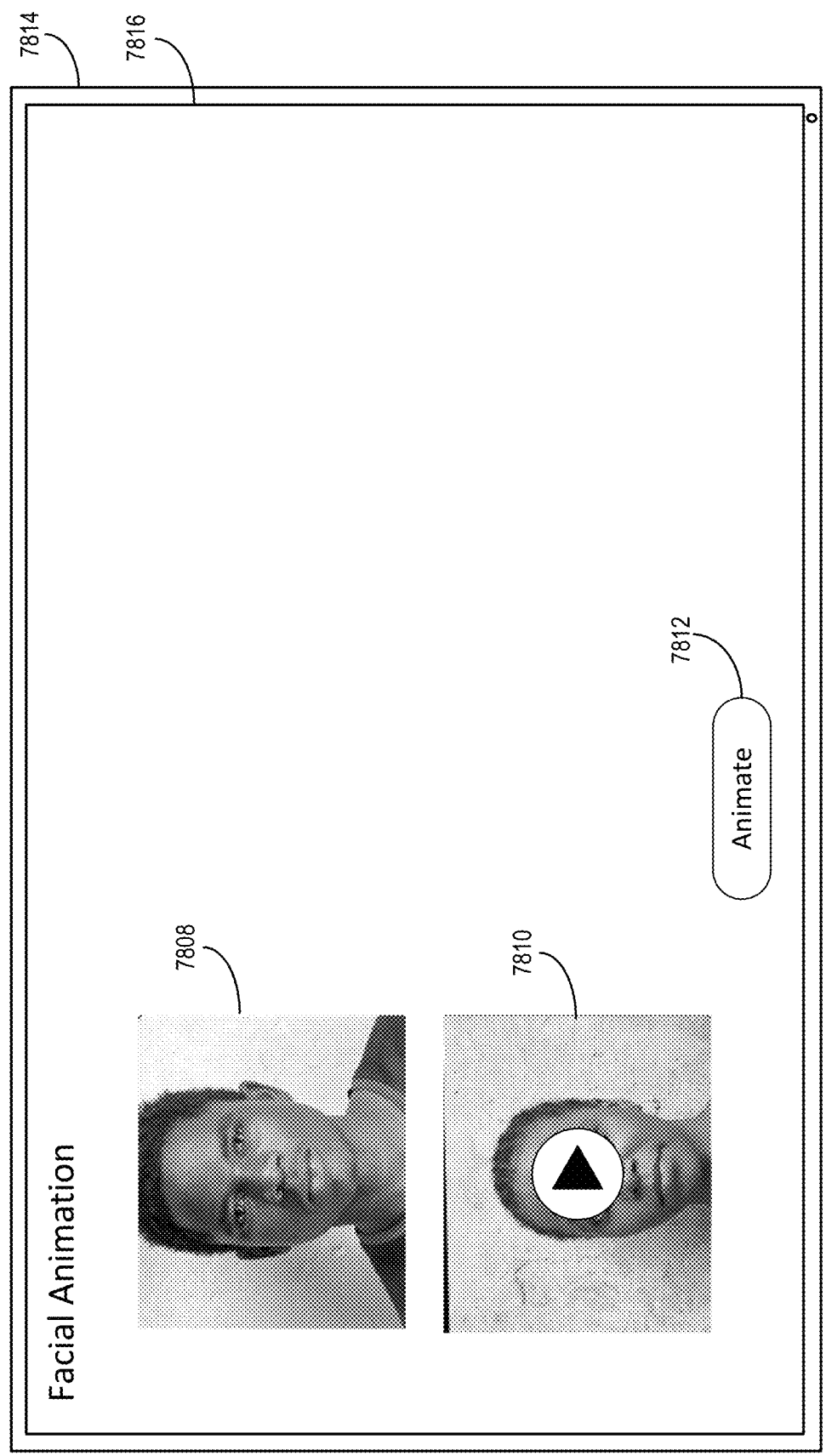

9100 ⟶

```
┌─────────────────────────────────────────────────────────────┐
│  Generating A Pose Feature Map From A Target Pose Map And A Source │
│                      Digital Image 9102                     │
│  ┌───────────────────────────────────────────────────────┐  │
│  │ Generating The Pose Feature Map Utilizing A Hierarchical Pose │
│  │                    Encoder 9103                       │  │
│  └───────────────────────────────────────────────────────┘  │
└─────────────────────────────────────────────────────────────┘
                              │
                              ▼
┌─────────────────────────────────────────────────────────────┐
│  Generating A Global Texture Map Appearance Vector From A Texture Map │
│                              9104                           │
└─────────────────────────────────────────────────────────────┘
                              │
                              ▼
┌─────────────────────────────────────────────────────────────┐
│  Generating A Local Appearance Feature Tensor From The Source Digital │
│                         Image 9106                          │
└─────────────────────────────────────────────────────────────┘
                              │
                              ▼
┌─────────────────────────────────────────────────────────────┐
│  Synthesizing A Modified Digital Image Based On The Pose Feature Map, │
│  The Local Appearance Feature Tensor, And The Global Texture Map │
│                  Appearance Vector 9108                     │
└─────────────────────────────────────────────────────────────┘
```

*Fig. 91*

FACIAL EXPRESSION AND POSE TRANSFER UTILIZING AN END-TO-END MACHINE LEARNING MODEL

BACKGROUND

Recent years have seen significant advancement in hardware and software platforms for performing computer vision and image editing tasks. Indeed, systems provide a variety of image-related tasks, such as object identification, classification, segmentation, composition, style transfer, image inpainting, etc.

SUMMARY

One or more embodiments described herein provide benefits and/or solve one or more problems in the art with systems, methods, and non-transitory computer-readable media that implement artificial intelligence models to facilitate flexible and efficient scene-based image editing. To illustrate, in one or more embodiments, a system utilizes one or more machine learning models to learn/identify characteristics of a digital image, anticipate potential edits to the digital image, and/or generate supplementary components that are usable in various edits. Accordingly, the system gains an understanding of the two-dimensional digital image as if it were a real scene, having distinct semantic areas reflecting real-world (e.g., three-dimensional) conditions. Further, the system enables the two-dimensional digital image to be edited so that the changes automatically and consistently reflect the corresponding real-world conditions without relying on additional user input. In one or more embodiments, the system performs scene-based image editing by performing a variety of infill modifications, human inpainting, reposing of subjects portrayed within digital images, and facial expression transfer and animation. Moreover, for performing the aforementioned infill modifications, human inpainting, reposing, and facial expression transfer and animation, the system utilizes various generative models and various instances of artificial intelligence to generate modified digital images or animations. Thus, the system facilitates flexible and intuitive editing of digital images while efficiently reducing the user interactions typically required to make such edits.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIGS. 20A-20C illustrate another graphical user interface implemented by the scene-based image editing system to facilitate modifying object attributes of objects portrayed in a digital image in accordance with one or more embodiments;

FIGS. 21A-21C illustrate yet another graphical user interface implemented by the scene-based image editing system to facilitate modifying object attributes of objects portrayed in a digital image in accordance with one or more embodiments;

FIGS. 22A-22D illustrate a graphical user interface implemented by the scene-based image editing system to facilitate a relationship-aware object modification in accordance with one or more embodiments;

FIGS. 23A-23C illustrate another graphical user interface implemented by the scene-based image editing system to facilitate a relationship-aware object modification in accordance with one or more embodiments;

FIGS. 24A-24C illustrate yet another graphical user interface implemented by the scene-based image editing system to facilitate a relationship-aware object modification in accordance with one or more embodiments;

FIGS. 30A-30C illustrate a graphical user interface implemented by the scene-based image editing system to identify and remove distracting objects from a digital image in accordance with one or more embodiments;

FIG. 53 illustrates an overview diagram of the scene-based image editing system performing human inpainting in accordance with one or more embodiments;

FIGS. 78A-78C illustrate an example graphical user interface of the scene-based image editing system providing options to select a source digital image and a target digital video to generate an animation in accordance with one or more embodiments;

FIG. 91 illustrates a flowchart for a series of acts for reposing a subject within a digital image in accordance with one or more embodiments;

DETAILED DESCRIPTION

Figure 1:
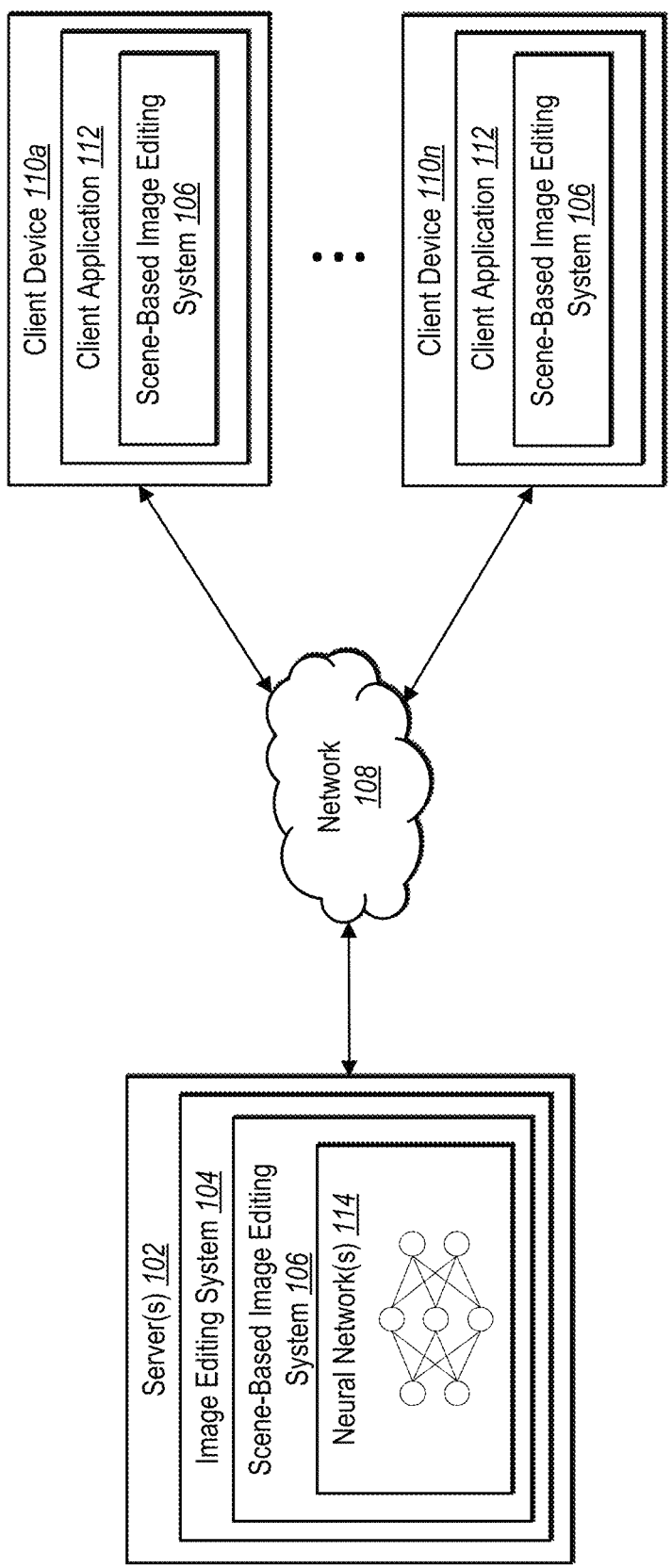
FIG. 1 illustrates an example environment in which a scene-based image editing system operates in accordance with one or more embodiments.

One or more embodiments described herein include a scene-based image editing system that implements scene-based image editing techniques using intelligent image understanding. Indeed, in one or more embodiments, the scene-based image editing system utilizes one or more machine learning models to process a digital image in anticipation of user interactions for modifying the digital image. For example, in some implementations, the scene-based image editing system performs operations that build a knowledge set for the digital image and/or automatically initiate workflows for certain modifications before receiving user input for those modifications. Based on the pre-processing, the scene-based image editing system facilitates user interactions with the digital image as if it were a real scene reflecting real-world conditions. For instance, the scene-based image editing system enables user interactions that target pre-processed semantic areas (e.g., objects that have been identified and/or masked via pre-processing) as distinct components for editing rather than target the individual underlying pixels. Further, the scene-based image editing system automatically modifies the digital image to consistently reflect the corresponding real-world conditions.

As indicated above, in one or more embodiments, the scene-based image editing system utilizes machine learning to process a digital image in anticipation of future modifications. In particular, in some cases, the scene-based image editing system employs one or more machine learning models to perform preparatory operations that will facilitate subsequent modification. In some embodiments, the scene-based image editing system performs the pre-processing automatically in response to receiving the digital image. For instance, in some implementations, the scene-based image editing system gathers data and/or initiates a workflow for editing the digital image before receiving user input for such edits. Thus, the scene-based image editing system allows user interactions to directly indicate intended edits to the digital image rather than the various preparatory steps often utilized for making those edits.

As an example, in one or more embodiments, the scene-based image editing system pre-processes a digital image to facilitate object-aware modifications. In particular, in some embodiments, the scene-based image editing system pre-processes a digital image in anticipation of user input for manipulating one or more semantic areas of a digital image, such as user input for moving or deleting one or more objects within the digital image.

To illustrate, in some instances, the scene-based image editing system utilizes a segmentation neural network to generate, for each object portrayed in a digital image, an object mask. In some cases, the scene-based image editing system utilizes a hole-filing model to generate, for each object (e.g., for each corresponding object mask), a content fill (e.g., an inpainting segment). In some implementations, the scene-based image editing system generates a completed background for the digital image by pre-filling object holes with the corresponding content fill. Accordingly, in one or more embodiments, the scene-based image editing system pre-processes the digital image in preparation for an object-aware modification, such as a move operation or a delete operation, by pre-generating object masks and/or content fills before receiving user input for such a modification.

Thus, upon receiving one or more user inputs targeting an object of the digital image for an object-aware modification (e.g., a move operation or a delete operation), the scene-based image editing system leverages the corresponding pre-generated object mask and/or content fill to complete the modification. For instance, in some cases, the scene-based image editing system detects, via a graphical user interface displaying the digital image, a user interaction with an object portrayed therein (e.g., a user selection of the object). In response to the user interaction, the scene-based image editing system surfaces the corresponding object mask that was previously generated. The scene-based image editing system further detects, via the graphical user interface, a second user interaction with the object (e.g., with the surfaced object mask) for moving or deleting the object. Accordingly, the moves or deletes the object, revealing the content fill previously positioned behind the object.

Additionally, in one or more embodiments, the scene-based image editing system pre-processes a digital image to generate a semantic scene graph for the digital image. In particular, in some embodiments, the scene-based image editing system generates a semantic scene graph to map out various characteristics of the digital image. For instance, in some cases, the scene-based image editing system generates a semantic scene graph that describes the objects portrayed in the digital image, the relationships or object attributes of those objects, and/or various other characteristics determined to be useable for subsequent modification of the digital image.

In some cases, the scene-based image editing system utilizes one or more machine learning models to determine the characteristics of the digital image to be included in the semantic scene graph. Further, in some instances, the scene-based image editing system generates the semantic scene graph utilizing one or more predetermined or pre-generated template graphs. For instance, in some embodiments, the scene-based image editing system utilizes an image analysis graph, a real-world class description graph, and/or a behavioral policy graph in generating the semantic scene.

Thus, in some cases, the scene-based image editing system uses the semantic scene graph generated for a digital image to facilitate modification of the digital image. For instance, in some embodiments, upon determining that an object has been selected for modification, the scene-based image editing system retrieves characteristics of the object from the semantic scene graph to facilitate the modification. To illustrate, in some implementations, the scene-based image editing system executes or suggests one or more additional modifications to the digital image based on the characteristics from the semantic scene graph.

As one example, in some embodiments, upon determining that an object has been selected for modification, the scene-based image editing system provides one or more object attributes of the object for display via the graphical user interface displaying the object. For instance, in some cases, the scene-based image editing system retrieves a set of object attributes for the object (e.g., size, shape, or color) from the corresponding semantic scene graph and presents the set of object attributes for display in association with the object.

In some cases, the scene-based image editing system further facilitates user interactivity with the displayed set of object attributes for modifying one or more of the object attributes. For instance, in some embodiments, the scene-based image editing system enables user interactions that change the text of the displayed set of object attributes or select from a provided set of object attribute alternatives. Based on the user interactions, the scene-based image editing system modifies the digital image by modifying the one or more object attributes in accordance with the user interactions.

As another example, in some implementations, the scene-based image editing system utilizes a semantic scene graph to implement relationship-aware object modifications. To illustrate, in some cases, the scene-based image editing system detects a user interaction selecting an object portrayed in a digital image for modification. The scene-based image editing system references the semantic scene graph previously generated for the digital image to identify a relationship between that object and one or more other objects portrayed in the digital image. Based on the identified relationships, the scene-based image editing system also targets the one or more related objects for the modification.

For instance, in some cases, the scene-based image editing system automatically adds the one or more related objects to the user selection. In some instances, the scene-based image editing system provides a suggestion that the one or more related objects be included in the user selection and adds the one or more related objects based on an acceptance of the suggestion. Thus, in some embodiments, the scene-based image editing system modifies the one or more related objects as it modifies the user-selected object.

In one or more embodiments, in addition to pre-processing a digital image to identify objects portrayed as well as their relationships and/or object attributes, the scene-based image editing system further pre-processes a digital image to aid in the removal of distracting objects. For example, in some cases, the scene-based image editing system utilizes a distractor detection neural network to classify one or more objects portrayed in a digital image as subjects of the digital image and/or classify one or more other objects portrayed in the digital image as distracting objects. In some embodiments, the scene-based image editing system provides a visual indication of the distracting objects within a display of the digital image, suggesting that these objects be removed to present a more aesthetic and cohesive visual result.

Further, in some cases, the scene-based image editing system detects the shadows of distracting objects (or other selected objects) for removal along with the distracting objects. In particular, in some cases, the scene-based image editing system utilizes a shadow detection neural network to identify shadows portrayed in the digital image and associate those shadows with their corresponding objects. Accordingly, upon removal of a distracting object from a digital image, the scene-based image editing system further removes the associated shadow automatically.

Moreover, in some embodiments, the scene-based image editing system generates modified digital images portraying human subjects. For example, in some implementations the scene-based image editing system 106 receives an indication to expand a digital image frame or remove a portion of a digital image portraying a human. For instance, in some cases, the scene-based image editing system utilizes generative machine learning models to generate infill modifications for the digital image. Further, the infill modifications aid in completing a digital image based on indicated modifications (e.g., uncropping/expansion and/or removal of a portion of a digital image). In other instances, the scene-based image editing system also generates modified digital images by inpainting indicated portions of a digital image. In particular, the scene-based image editing system utilizes a structure guidance map and machine learning models to perform partial human inpainting.

Furthermore, in additional embodiments, the scene-based image editing system reposes subjects within a digital image to generate a modified digital image. In particular, the scene-based image editing system utilizes generative models to performs human reposing for human(s) portrayed in a source digital image according to a target pose. In addition to reposing, the scene-based image editing system also generates modified digital images or animations of static digital images by utilizing facial expression transfer and facial expression animation. In particular, the scene-based image editing system transfers the facial expression(s) from a target digital image to a source digital image and for animation, the scene-based image editing system animates a static image with a target digital video.

The scene-based image editing system provides advantages over conventional systems. Indeed, conventional image editing systems suffer from several technological shortcomings that result in inflexible and inefficient operation. To illustrate, conventional systems are typically inflexible in that they rigidly perform edits on a digital image on the pixel level. In particular, conventional systems often perform a particular edit by targeting pixels individually for the edit. Accordingly, such systems often rigidly require user interactions for editing a digital image to interact with individual pixels to indicate the areas for the edit. Additionally, many conventional systems (e.g., due to their pixel-based editing) require users to have a significant amount of deep, specialized knowledge in how to interact with digital images, as well as the user interface of the system itself, to select the desired pixels and execute the appropriate workflow to edit those pixels.

Additionally, conventional image editing systems often fail to operate efficiently. For example, conventional systems typically require a significant amount of user interaction to modify a digital image. Indeed, in addition to user interactions for selecting individual pixels, conventional systems typically require a user to interact with multiple menus, sub-menus, and/or windows to perform the edit. For instance, many edits may require multiple editing steps using multiple different tools. Accordingly, many conventional systems require multiple interactions to select the proper tool at a given editing step, set the desired parameters for the tool, and utilize the tool to execute the editing step.

The scene-based image editing system operates with improved flexibility when compared to conventional systems. In particular, the scene-based image editing system implements techniques that facilitate flexible scene-based editing. For instance, by pre-processing a digital image via machine learning, the scene-based image editing system allows a digital image to be edited as if it were a real scene, in which various elements of the scene are known and are able to be interacted with intuitively on the semantic level to perform an edit while continuously reflecting real-world conditions. Indeed, where pixels are the targeted units under many conventional systems and objects are generally treated as groups of pixels, the scene-based image editing system allows user interactions to treat whole semantic areas (e.g., objects) as distinct units. Further, where conventional systems often require deep, specialized knowledge of the tools and workflows needed to perform edits, the scene-based editing system offers a more intuitive editing experience that enables a user to focus on the end goal of the edit.

Further, the scene-based image editing system operates with improved efficiency when compared to conventional systems. In particular, the scene-based image editing system implements a graphical user interface that reduces the user interactions required for editing. Indeed, by pre-processing a digital image in anticipation of edits, the scene-based image editing system reduces the user interactions that are required to perform an edit. Specifically, the scene-based image editing system performs many of the operations required for an edit without relying on user instructions to perform those operations. Thus, in many cases, the scene-based image editing system reduces the user interactions typically required under conventional systems to select pixels to target for editing and to navigate menus, sub-menus, or other windows to select a tool, select its corresponding parameters, and apply the tool to perform the edit. By implementing a graphical user interface that reduces and simplifies user interactions needed for editing a digital image, the scene-based image editing system offers improved user experiences on computing devices-such as tablets or smart phone devices-having relatively limited screen space.

Additional detail regarding the scene-based image editing system will now be provided with reference to the figures. For example, FIG. 1 illustrates a schematic diagram of an exemplary system 100 in which a scene-based image editing system 106 operates. As illustrated in FIG. 1, the system 100 includes a server(s) 102, a network 108, and client devices 110a-110n.

Although the system 100 of FIG. 1 is depicted as having a particular number of components, the system 100 is capable of having any number of additional or alternative components (e.g., any number of servers, client devices, or other components in communication with the scene-based image editing system 106 via the network 108). Similarly, although FIG. 1 illustrates a particular arrangement of the server(s) 102, the network 108, and the client devices 110a-110n, various additional arrangements are possible.

The server(s) 102, the network 108, and the client devices 110a-110n are communicatively coupled with each other either directly or indirectly (e.g., through the network 108 discussed in greater detail below in relation to FIG. 51). Moreover, the server(s) 102 and the client devices 110a-110n include one or more of a variety of computing devices (including one or more computing devices as discussed in greater detail with relation to FIG. 51).

As mentioned above, the system 100 includes the server(s) 102. In one or more embodiments, the server(s) 102 generates, stores, receives, and/or transmits data including digital images and modified digital images. In one or more embodiments, the server(s) 102 comprises a data server. In some implementations, the server(s) 102 comprises a communication server or a web-hosting server.

In one or more embodiments, the image editing system 104 provides functionality by which a client device (e.g., a user of one of the client devices 110a-110n) generates, edits, manages, and/or stores digital images. For example, in some instances, a client device sends a digital image to the image editing system 104 hosted on the server(s) 102 via the network 108. The image editing system 104 then provides options that the client device may use to edit the digital image, store the digital image, and subsequently search for, access, and view the digital image. For instance, in some cases, the image editing system 104 provides one or more options that the client device may use to modify objects within a digital image.

In one or more embodiments, the client devices 110a-110n include computing devices that access, view, modify, store, and/or provide, for display, digital images. For example, the client devices 110a-110n include smartphones, tablets, desktop computers, laptop computers, head-mounted-display devices, or other electronic devices. The client devices 110a-110n include one or more applications (e.g., the client application 112) that can access, view, modify, store, and/or provide, for display, digital images. For example, in one or more embodiments, the client application 112 includes a software application installed on the client devices 110a-110n. Additionally, or alternatively, the client application 112 includes a web browser or other application that accesses a software application hosted on the server(s) 102 (and supported by the image editing system 104).

To provide an example implementation, in some embodiments, the scene-based image editing system 106 on the server(s) 102 supports the scene-based image editing system 106 on the client device 110n. For instance, in some cases, the scene-based image editing system 106 on the server(s) 102 learns parameters for a neural network(s) 114 for analyzing and/or modifying digital images. The scene-based image editing system 106 then, via the server(s) 102, provides the neural network(s) 114 to the client device 110n. In other words, the client device 110n obtains (e.g., downloads) the neural network(s) 114 with the learned parameters from the server(s) 102. Once downloaded, the scene-based image editing system 106 on the client device 110n utilizes the neural network(s) 114 to analyze and/or modify digital images independent from the server(s) 102.

In alternative implementations, the scene-based image editing system 106 includes a web hosting application that allows the client device 110n to interact with content and services hosted on the server(s) 102. To illustrate, in one or more implementations, the client device 110n accesses a software application supported by the server(s) 102. In response, the scene-based image editing system 106 on the server(s) 102 modifies digital images. The server(s) 102 then provides the modified digital images to the client device 110n for display.

Indeed, the scene-based image editing system 106 is able to be implemented in whole, or in part, by the individual elements of the system 100. Indeed, although FIG. 1 illustrates the scene-based image editing system 106 implemented with regard to the server(s) 102, different components of the scene-based image editing system 106 are able to be implemented by a variety of devices within the system 100. For example, one or more (or all) components of the scene-based image editing system 106 are implemented by a different computing device (e.g., one of the client devices 110a-110n) or a separate server from the server(s) 102 hosting the image editing system 104. Indeed, as shown in FIG. 1, the client devices 110a-110n include the scene-based image editing system 106. Example components of the scene-based image editing system 106 will be described below with regard to FIG. 44.

Figure 2:
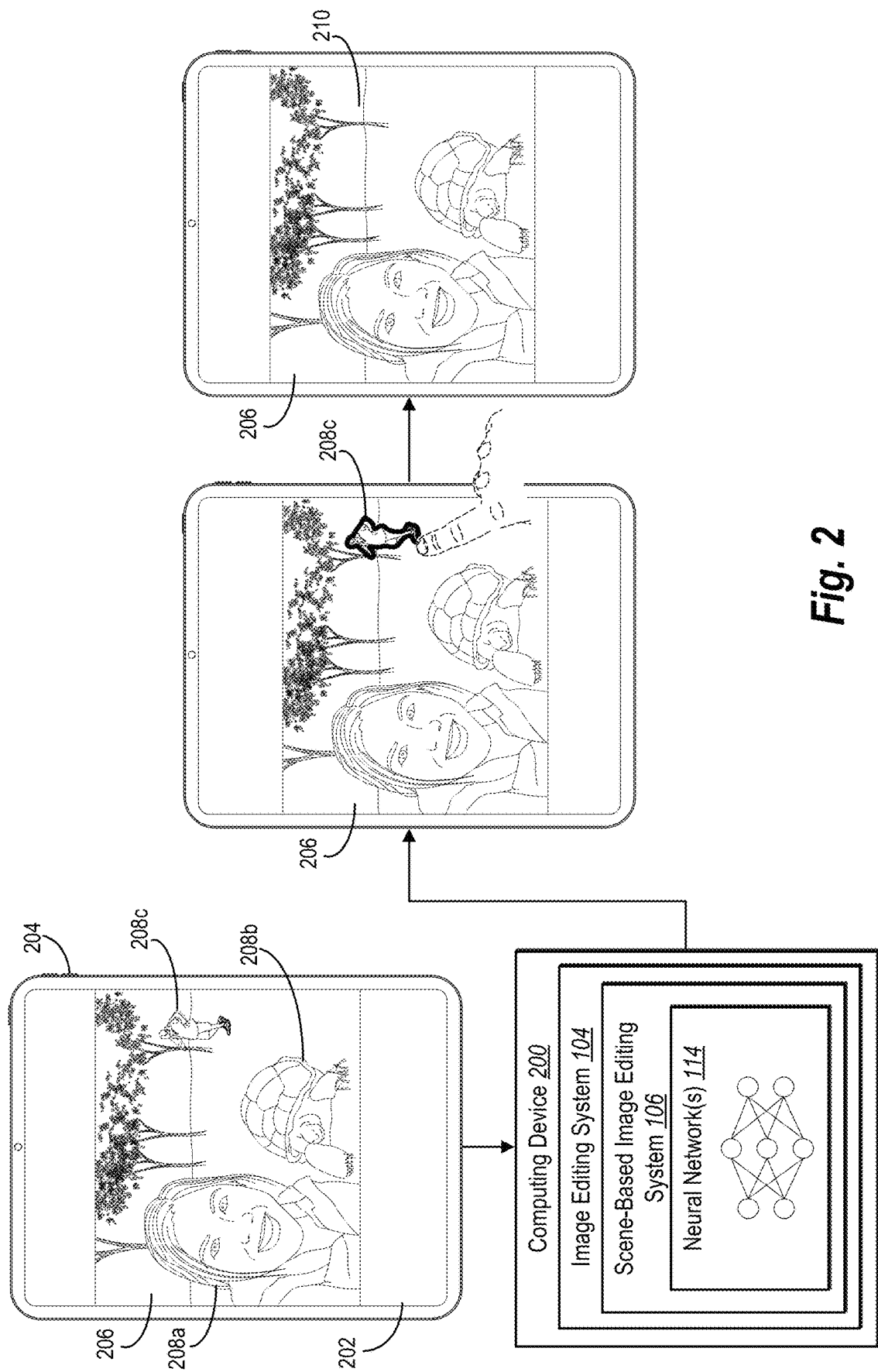
FIG. 2 illustrates an overview diagram of the scene-based image editing system editing a digital image as a real scene in accordance with one or more embodiments.

As mentioned, in one or more embodiments, the scene-based image editing system 106 manages a two-dimensional digital image as a real scene reflecting real-world conditions. In particular, the scene-based image editing system 106 implements a graphical use interface that facilitates the modification of a digital image as a real scene. FIG. 2 illustrates an overview diagram of the scene-based image editing system 106 managing a digital image as a real scene in accordance with one or more embodiments.

As shown in FIG. 2, the scene-based image editing system 106 provides a graphical user interface 202 for display on a client device 204. As further shown, the scene-based image editing system 106 provides, for display within the graphical user interface 202, a digital image 206. In one or more embodiments, the scene-based image editing system 106 provides the digital image 206 for display after the digital image 206 is captured via a camera of the client device 204. In some instances, the scene-based image editing system 106 receives the digital image 206 from another computing device or otherwise accesses the digital image 206 at some storage location, whether local or remote.

As illustrated in FIG. 2, the digital image 206 portrays various objects. In one or more embodiments, an object includes a distinct visual component portrayed in a digital image. In particular, in some embodiments, an object includes a distinct visual element that is identifiable separately from other visual elements portrayed in a digital image. In many instances, an object includes a group of pixels that, together, portray the distinct visual element separately from the portrayal of other pixels. An object refers to a visual representation of a subject, concept, or sub-concept in an image. In particular, an object refers to a set of pixels in an image that combine to form a visual depiction of an item, article, partial item, component, or element. In some cases, an object is identifiable via various levels of abstraction. In other words, in some instances, an object includes separate object components that are identifiable individually or as part of an aggregate. To illustrate, in some embodiments, an object includes a semantic area (e.g., the sky, the ground, water, etc.). In some embodiments, an object comprises an instance of an identifiable thing (e.g., a person, an animal, a building, a car, or a cloud, clothing, or some other accessory). In one or more embodiments, an object includes sub-objects, parts, or portions. For example, a person's face, hair, or leg can be objects that are part of another object (e.g., the person's body). In still further implementations, a shadow or a reflection comprises part of an object. As another example, a shirt is an object that can be part of another object (e.g., a person).

As shown in FIG. 2, the digital image 206 portrays a static, two-dimensional image. In particular, the digital image 206 portrays a two-dimensional projection of a scene that was captured from the perspective of a camera. Accordingly, the digital image 206 reflects the conditions (e.g., the lighting, the surrounding environment, or the physics to which the portrayed objects are subject) under which the image was captured; however, it does so statically. In other words, the conditions are not inherently maintained when changes to the digital image 206 are made. Under many conventional systems, additional user interactions are required to maintain consistency with respect to those conditions when editing a digital image.

Further, the digital image 206 includes a plurality of individual pixels that collectively portray various semantic areas. For instance, the digital image 206 portrays a plurality of objects, such as the objects 208a-208c. While the pixels of each object are contributing to the portrayal of a cohesive visual unit, they are not typically treated as such. Indeed, a pixel of a digital image is typically inherently treated as an individual unit with its own values (e.g., color values) that are modifiable separately from the values of other pixels. Accordingly, conventional systems typically require user interactions to target pixels individually for modification when making changes to a digital image.

As illustrated in FIG. 2, however, the scene-based image editing system 106 manages the digital image 206 as a real scene, consistently maintaining the conditions under which the image was captured when modifying the digital image. In particular, the scene-based image editing system 106 maintains the conditions automatically without relying on user input to reflect those conditions. Further, the scene-based image editing system 106 manages the digital image 206 on a semantic level. In other words, the digital image 206 manages each semantic area portrayed in the digital image 206 as a cohesive unit. For instance, as shown in FIG. 2 and as will be discussed, rather than requiring a user interaction to select the underlying pixels in order to interact with a corresponding object, the scene-based image editing system 106 enables user input to target the object as a unit and the scene-based image editing system 106 automatically recognizes the pixels that are associated with that object.

To illustrate, as shown in FIG. 2, in some cases, the scene-based image editing system 106 operates on a computing device 200 (e.g., the client device 204 or a separate computing device, such as the server(s) 102 discussed above with reference to FIG. 1) to pre-process the digital image 206. In particular, the scene-based image editing system 106 performs one or more pre-processing operations in anticipation of future modification to the digital image. In one or more embodiments, the scene-based image editing system 106 performs these pre-processing operations automatically in response to receiving or accessing the digital image 206 before user input for making the anticipated modifications have been received. As further shown, the scene-based image editing system 106 utilizes one or more machine learning models, such as the neural network(s) 114 to perform the pre-processing operations.

In one or more embodiments, the scene-based image editing system 106 pre-processes the digital image 206 by learning characteristics of the digital image 206. For instance, in some cases, the scene-based image editing system 106 segments the digital image 206, identifies objects, classifies objects, determines relationships and/or attributes of objects, determines lighting characteristics, and/or determines depth/perspective characteristics. In some embodiments, the scene-based image editing system 106 pre-processes the digital image 206 by generating content for use in modifying the digital image 206. For example, in some implementations, the scene-based image editing system 106 generates an object mask for each portrayed object and/or generates a content fill for filling in the background behind each portrayed object. Background refers to what is behind an object in an image. Thus, when a first object is positioned in front of a second object, the second object forms at least part of the background for the first object. Alternatively, the background comprises the furthest element in the image (often a semantic area like the sky, ground, water, etc.). The background for an object, in or more embodiments, comprises multiple object/semantic areas. For example, the background for an object can comprise part of another object and part of the furthest element in the image. The various pre-processing operations and their use in modifying a digital image will be discussed in more detail below with reference to the subsequent figures.

As shown in FIG. 2, the scene-based image editing system 106 detects, via the graphical user interface 202, a user interaction with the object 208c. In particular, the scene-based image editing system 106 detects a user interaction for selecting the object 208c. Indeed, in one or more embodiments, the scene-based image editing system 106 determines that the user interaction targets the object even where the user interaction only interacts with a subset of the pixels that contribute to the object 208c based on the pre-processing of the digital image 206. For instance, as mentioned, the scene-based image editing system 106 pre-processes the digital image 206 via segmentation in some embodiments. As such, at the time of detecting the user interaction, the scene-based image editing system 106 has already partitioned/segmented the digital image 206 into its various semantic areas. Thus, in some instances, the scene-based image editing system 106 determines that the user interaction selects a distinct semantic area (e.g., the object 208c) rather than the particular underlying pixels or image layers with which the user interacted.

As further shown in FIG. 2, the scene-based image editing system 106 modifies the digital image 206 via a modification to the object 208c. Though FIG. 2 illustrates a deletion of the object 208c, various modifications are possible and will be discussed in more detail below. In some embodiments, the scene-based image editing system 106 edits the object 208c in response to detecting a second user interaction for performing the modification.

As illustrated, upon deleting the object 208c from the digital image 206, the scene-based image editing system 106 automatically reveals background pixels that have been positioned in place of the object 208c. Indeed, as mentioned, in some embodiments, the scene-based image editing system 106 pre-processes the digital image 206 by generating a content fill for each portrayed foreground object. Thus, as indicated by FIG. 2, the scene-based image editing system 106 automatically exposes the content fill 210 previously generated for the object 208c upon removal of the object 208c from the digital image 206. In some instances, the scene-based image editing system 106 positions the content fill 210 within the digital image so that the content fill 210 is exposed rather than a hole appearing upon removal of object 208c.

Thus, the scene-based image editing system 106 operates with improved flexibility when compared to many conventional systems. In particular, the scene-based image editing system 106 implements flexible scene-based editing techniques in which digital images are modified as real scenes that maintain real-world conditions (e.g., physics, environment, or object relationships). Indeed, in the example shown in FIG. 2, the scene-based image editing system 106 utilizes pre-generated content fills to consistently maintain the background environment portrayed in the digital image 206 as though the digital image 206 had captured that background in its entirety. Thus, the scene-based image editing system 106 enables the portrayed objects to be moved around freely (or removed entirely) without disrupting the scene portrayed therein.

Further, the scene-based image editing system 106 operates with improved efficiency. Indeed, by segmenting the digital image 206 and generating the content fill 210 in anticipation of a modification that would remove the object 208c from its position in the digital image 206, the scene-based image editing system 106 reduces the user interactions that are typically required to perform those same operations under conventional systems. Thus, the scene-based image editing system 106 enables the same modifications to a digital image with less user interactions when compared to these conventional systems.

As just discussed, in one or more embodiments, the scene-based image editing system 106 implements object-aware image editing on digital images. In particular, the scene-based image editing system 106 implements object-aware modifications that target objects as cohesive units that are interactable and can be modified. FIGS. 3-9B illustrate the scene-based image editing system 106 implementing object-aware modifications in accordance with one or more embodiments.

Indeed, many conventional image editing systems are inflexible and inefficient with respect to interacting with objects portrayed in a digital image. For instance, as previously mentioned, conventional systems are often rigid in that they require user interactions to target pixels individually rather than the objects that those pixels portray. Thus, such systems often require a rigid, meticulous process of selecting pixels for modification. Further, as object identification occurs via user selection, these systems typically fail to anticipate and prepare for potential edits made to those objects.

Further, many conventional image editing systems require a significant amount of user interactions to modify objects portrayed in a digital image. Indeed, in addition to the pixel-selection process for identifying objects in a digital image-which can require a series of user interactions on its own-conventional systems may require workflows of significant length in which a user interacts with multiple menus, sub-menus, tool, and/or windows to perform the edit. Often, performing an edit on an object requires multiple preparatory steps before the desired edit is able to be executed, requiring additional user interactions.

The scene-based image editing system 106 provides advantages over these systems. For instance, the scene-based image editing system 106 offers improved flexibility via object-aware image editing. In particular, the scene-based image editing system 106 enables object-level-rather than pixel-level or layer level-interactions, facilitating user interactions that target portrayed objects directly as cohesive units instead of their constituent pixels individually.

Further, the scene-based image editing system 106 improves the efficiency of interacting with objects portrayed in a digital image. Indeed, previously mentioned, and as will be discussed further below, the scene-based image editing system 106 implements pre-processing operations for identifying and/or segmenting for portrayed objects in anticipation of modifications to those objects. Indeed, in many instances, the scene-based image editing system 106 performs these pre-processing operations without receiving user interactions for those modifications. Thus, the scene-based image editing system 106 reduces the user interactions that are required to execute a given edit on a portrayed object.

Figure 3:
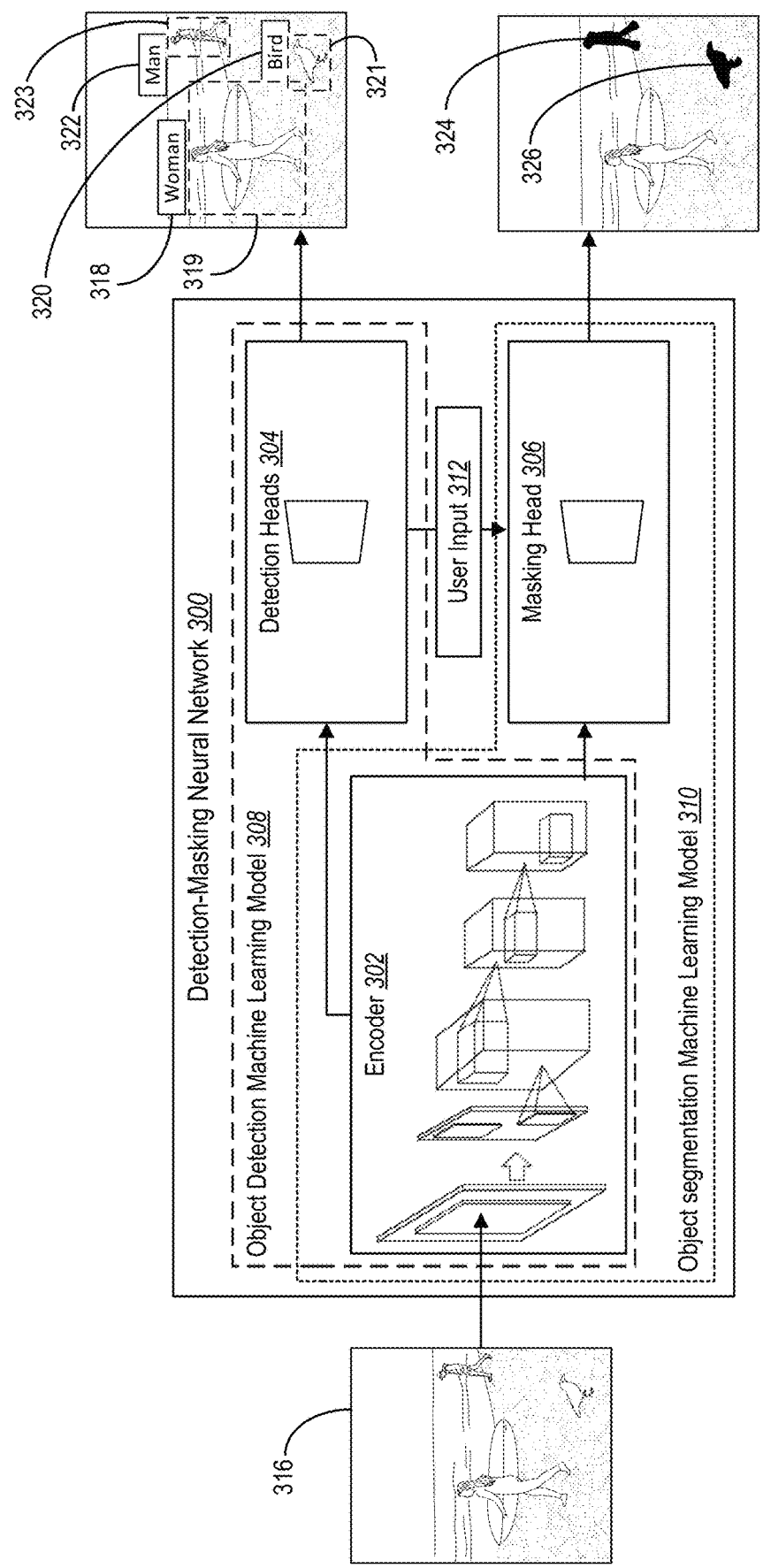
FIG. 3 illustrates a segmentation neural network utilized by the scene-based image editing system to generate object masks for objects in accordance with one or more embodiments.

In some embodiments, the scene-based image editing system 106 implements object-aware image editing by generating an object mask for each object/semantic area portrayed in a digital image. In particular, in some cases, the scene-based image editing system 106 utilizes a machine learning model, such as a segmentation neural network, to generate the object mask(s). FIG. 3 illustrates a segmentation neural network utilized by the scene-based image editing system 106 to generate object masks for objects in accordance with one or more embodiments.

In one or more embodiments, an object mask includes a map of a digital image that has an indication for each pixel of whether the pixel corresponds to part of an object (or other semantic area) or not. In some implementations, the indication includes a binary indication (e.g., a "1" for pixels belonging to the object and a "0" for pixels not belonging to the object). In alternative implementations, the indication includes a probability (e.g., a number between 1 and 0) that indicates the likelihood that a pixel belongs to an object. In such implementations, the closer the value is to 1, the more likely the pixel belongs to an object and vice versa.

In one or more embodiments, a machine learning model includes a computer representation that is tunable (e.g., trained) based on inputs to approximate unknown functions used for generating the corresponding outputs. In particular, in some embodiments, a machine learning model includes a computer-implemented model that utilizes algorithms to learn from, and make predictions on, known data by analyzing the known data to learn to generate outputs that reflect patterns and attributes of the known data. For instance, in some instances, a machine learning model includes, but is not limited to a neural network (e.g., a convolutional neural network, recurrent neural network or other deep learning network), a decision tree (e.g., a gradient boosted decision tree), association rule learning, inductive logic programming, support vector learning, Bayesian network, regression-based model (e.g., censored regression), principal component analysis, or a combination thereof.

In one or more embodiments, a neural network includes a model of interconnected artificial neurons (e.g., organized in layers) that communicate and learn to approximate complex functions and generate outputs based on a plurality of inputs provided to the model. In some instances, a neural network includes one or more machine learning algorithms. Further, in some cases, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, or a multi-layer perceptron. In some embodiments, a neural network includes a combination of neural networks or neural network components.

In one or more embodiments, a segmentation neural network includes a computer-implemented neural network that generates object masks for objects portrayed in digital images. In particular, in some embodiments, a segmentation neural network includes a computer-implemented neural network that detects objects within digital images and generates object masks for the objects. Indeed, in some implementations, a segmentation neural network includes a neural network pipeline that analyzes a digital image, identifies one or more objects portrayed in the digital image, and generates an object mask for the one or more objects. In some cases, however, a segmentation neural network focuses on a subset of tasks for generating an object mask.

As mentioned, FIG. 3 illustrates one example of a segmentation neural network that the scene-based image editing system 106 utilizes in one or more implementations to generate object masks for objects portrayed in a digital image. In particular, FIG. 3 illustrates one example of a segmentation neural network used by the scene-based image editing system 106 in some embodiments to both detect objects in a digital image and generate object masks for those objects. Indeed, FIG. 3 illustrates a detection-masking neural network 300 that comprises both an object detection machine learning model 308 (in the form of an object detection neural network) and an object segmentation machine learning model 310 (in the form of an object segmentation neural network). Specifically, the detection-masking neural network 300 is an implementation of the on-device masking system described in U.S. patent application Ser. No. 17/589,114, "DETECTING DIGITAL OBJECTS AND GENERATING OBJECT MASKS ON DEVICE," filed on Jan. 31, 2022, the entire contents of which are hereby incorporated by reference.

Although FIG. 3 illustrates the scene-based image editing system 106 utilizing the detection-masking neural network 300, in one or more implementations, the scene-based image editing system 106 utilizes different machine learning models to detect objects, generate object masks for objects, and/or extract objects from digital images. For instance, in one or more implementations, the scene-based image editing system 106 utilizes, as the segmentation neural network (or as an alternative to a segmentation neural network), one of the machine learning models or neural networks described in U.S. patent application Ser. No. 17/158,527, entitled "Segmenting Objects In Digital Images Utilizing A Multi-Object Segmentation Model Framework," filed on Jan. 26, 2021; or U.S. patent application Ser. No. 16/388,115, entitled "Robust Training of Large-Scale Object Detectors with Noisy Data," filed on Apr. 8, 2019; or U.S. patent application Ser. No. 16/518,880, entitled "Utilizing Multiple Object Segmentation Models To Automatically Select User-Requested Objects In Images," filed on Jul. 22, 2019; or U.S. patent application Ser. No. 16/817,418, entitled "Utilizing A Large-Scale Object Detector To Automatically Select Objects In Digital Images," filed on Mar. 20, 2020; or Ren, et al., Faster r-cnn: Towards real-time object detection with region proposal networks, NIPS, 2015; or Redmon, et al., You Only Look Once: Unified, Real-Time Object Detection, CVPR 2016, the contents of each of the foregoing applications and papers are hereby incorporated by reference in their entirety.

Similarly, in one or more implementations, the scene-based image editing system 106 utilizes, as the segmentation neural network (or as an alternative to a segmentation neural network), one of the machine learning models or neural networks described in Ning Xu et al., "Deep GrabCut for Object Selection," published Jul. 14, 2017; or U.S. Patent Application Publication No. 2019/0130229, entitled "Deep Salient Content Neural Networks for Efficient Digital Object Segmentation," filed on Oct. 31, 2017; or U.S. patent application Ser. No. 16/035,410, entitled "Automatic Trimap Generation and Image Segmentation," filed on Jul. 13, 2018; or U.S. Pat. No. 10,192,129, entitled "Utilizing Interactive Deep Learning To Select Objects In Digital Visual Media," filed Nov. 18, 2015, each of which are incorporated herein by reference in their entirety.

In one or more implementations the segmentation neural network is a panoptic segmentation neural network. In other words, the segmentation neural network creates object mask for individual instances of a given object type. Furthermore, the segmentation neural network, in one or more implementations, generates object masks for semantic regions (e.g., water, sky, sand, dirt, etc.) in addition to countable things. Indeed, in one or more implementations, the scene-based image editing system 106 utilizes, as the segmentation neural network (or as an alternative to a segmentation neural network), one of the machine learning models or neural networks described in U.S. patent application Ser. No. 17/495,618, entitled "PANOPTIC SEGMENTATION REFINEMENT NETWORK," filed on Oct. 2, 2021; or U.S. patent application Ser. No. 17/454,740, entitled "MULTI-SOURCE PANOPTIC FEATURE PYRAMID NETWORK," filed on Nov. 12, 2021, each of which are incorporated herein by reference in their entirety.

Returning now to FIG. 3, in one or more implementations, the scene-based image editing system 106 utilizes a detection-masking neural network 300 that includes an encoder 302 (or neural network encoder) having a backbone network, detection heads 304 (or neural network decoder head), and a masking head 306 (or neural network decoder head). As shown in FIG. 3, the encoder 302 encodes a digital image 316 and provides the encodings to the detection heads 304 and the masking head 306. The detection heads 304 utilize the encodings to detect one or more objects portrayed in the digital image 316. The masking head 306 generates at least one object mask for the detected objects.

As just mentioned, the detection-masking neural network 300 utilizes both the object detection machine learning model 308 and the object segmentation machine learning model 310. In one or more implementations, the object detection machine learning model 308 includes both the encoder 302 and the detection heads 304 shown in FIG. 3. While the object segmentation machine learning model 310 includes both the encoder 302 and the masking head 306. Furthermore, the object detection machine learning model 308 and the object segmentation machine learning model 310 are separate machine learning models for processing objects within target and/or source digital images. FIG. 3 illustrates the encoder 302, detection heads 304, and the masking head 306 as a single model for detecting and segmenting objects of a digital image. For efficiency purposes, in some embodiments the scene-based image editing system 106 utilizes the network illustrated in FIG. 3 as a single network. The collective network (i.e., the object detection machine learning model 308 and the object segmentation machine learning model 310) is referred to as the detection-masking neural network 300. The following paragraphs describe components relating to the object detection machine learning model 308 of the network (such as the detection heads 304) and transitions to discussing components relating to the object segmentation machine learning model 310.

As just mentioned, in one or more embodiments, the scene-based image editing system 106 utilizes the object detection machine learning model 308 to detect and identify objects within the digital image 316 (e.g., a target or a source digital image). FIG. 3 illustrates one implementation of the object detection machine learning model 308 that the scene-based image editing system 106 utilizes in accordance with at least one embodiment. In particular, FIG. 3 illustrates the scene-based image editing system 106 utilizing the object detection machine learning model 308 to detect objects. In one or more embodiments, the object detection machine learning model 308 comprises a deep learning convolutional neural network (CNN). For example, in some embodiments, the object detection machine learning model 308 comprises a region-based (R-CNN).

As shown in FIG. 3, the object detection machine learning model 308 includes lower neural network layers and higher neural network layers. In general, the lower neural network layers collectively form the encoder 302 and the higher neural network layers collectively form the detection heads 304 (e.g., decoder). In one or more embodiments, the encoder 302 includes convolutional layers that encodes a digital image into feature vectors, which are outputted from the encoder 302 and provided as input to the detection heads 304. In various implementations, the detection heads 304 comprise fully connected layers that analyze the feature vectors and output the detected objects (potentially with approximate boundaries around the objects).

In particular, the encoder 302, in one or more implementations, comprises convolutional layers that generate a feature vector in the form of a feature map. To detect objects within the digital image 316, the object detection machine learning model 308 processes the feature map utilizing a convolutional layer in the form of a small network that is slid across small windows of the feature map. The object detection machine learning model 308 further maps each sliding window to a lower-dimensional feature. In one or more embodiments, the object detection machine learning model 308 processes this feature using two separate detection heads that are fully connected layers. In some embodiments, the first head comprises a box-regression layer that generates the detected object and an object-classification layer that generates the object label.

As shown by FIG. 3, the output from the detection heads 304 shows object labels above each of the detected objects. For example, the detection-masking neural network 300, in response to detecting objects, assigns an object label to each of the detected objects. In particular, in some embodiments, the detection-masking neural network 300 utilizes object labels based on classifications of the objects. To illustrate, FIG. 3 shows a label 318 for woman, a label 320 for bird, and a label 322 for man. Though not shown in FIG. 3, the detection-masking neural network 300 further distinguishes between the woman and the surfboard held by the woman in some implementations. Additionally, the detection-masking neural network 300 optionally also generates object masks for the semantic regions shown (e.g., the sand, the sea, and the sky).

As mentioned, the object detection machine learning model 308 detects the objects within the digital image 316. In some embodiments, and as illustrated in FIG. 3, the detection-masking neural network 300 indicates the detected objects utilizing approximate boundaries (e.g., bounding boxes 319, 321, and 323). For example, each of the bounding boxes comprises an area that encompasses an object. In some embodiments, the detection-masking neural network 300 annotates the bounding boxes with the previously mentioned object labels such as the name of the detected object, the coordinates of the bounding box, and/or the dimension of the bounding box.

As illustrated in FIG. 3, the object detection machine learning model 308 detects several objects for the digital image 316. In some instances, the detection-masking neural network 300 identifies all objects within the bounding boxes. In one or more embodiments, the bounding boxes comprise the approximate boundary area indicating the detected object. In some cases, an approximate boundary refers to an indication of an area including an object that is larger and/or less accurate than an object mask. In one or more embodiments, an approximate boundary includes at least a portion of a detected object and portions of the digital image 316 not comprising the detected object. An approximate boundary includes various shape, such as a square, rectangle, circle, oval, or other outline surrounding an object. In one or more embodiments, an approximate boundary comprises a bounding box.

Upon detecting the objects in the digital image 316, the detection-masking neural network 300 generates object masks for the detected objects. Generally, instead of utilizing coarse bounding boxes during object localization, the detection-masking neural network 300 generates segmentations masks that better define the boundaries of the object. The following paragraphs provide additional detail with respect to generating object masks for detected objects in accordance with one or more embodiments. In particular, FIG. 3 illustrates the scene-based image editing system 106 utilizing the object segmentation machine learning model 310 to generate segmented objects via object masks in accordance with some embodiments.

As illustrated in FIG. 3, the scene-based image editing system 106 processes a detected object in a bounding box utilizing the object segmentation machine learning model 310 to generate an object mask, such as an object mask 324 and an object mask 326. In alternative embodiments, the scene-based image editing system 106 utilizes the object detection machine learning model 308 itself to generate an object mask of the detected object (e.g., segment the object for selection).

In one or more implementations, prior to generating an object mask of a detected object, scene-based image editing system 106 receives user input 312 to determine objects for which to generate object masks. For example, the scene-based image editing system 106 receives input from a user indicating a selection of one of the detected objects. To illustrate, in the implementation shown, the scene-based image editing system 106 receives user input 312 of the user selecting bounding boxes 321 and 323. In alternative implementations, the scene-based image editing system 106 generates objects masks for each object automatically (e.g., without a user request indicating an object to select).

As mentioned, the scene-based image editing system 106 processes the bounding boxes of the detected objects in the digital image 316 utilizing the object segmentation machine learning model 310. In some embodiments, the bounding box comprises the output from the object detection machine learning model 308. For example, as illustrated in FIG. 3, the bounding box comprises a rectangular border about the object. Specifically, FIG. 3 shows bounding boxes 319, 321 and 323 which surround the woman, the bird, and the man detected in the digital image 316.

In some embodiments, the scene-based image editing system 106 utilizes the object segmentation machine learning model 310 to generate the object masks for the aforementioned detected objects within the bounding boxes. For example, the object segmentation machine learning model 310 corresponds to one or more deep neural networks or models that select an object based on bounding box parameters corresponding to the object within the digital image 316. In particular, the object segmentation machine learning model 310 generates the object mask 324 and the object mask 326 for the detected man and bird, respectively.

In some embodiments, the scene-based image editing system 106 selects the object segmentation machine learning model 310 based on the object labels of the object identified by the object detection machine learning model 308. Generally, based on identifying one or more classes of objects associated with the input bounding boxes, the scene-based image editing system 106 selects an object segmentation machine learning model tuned to generate object masks for objects of the identified one or more classes. To illustrate, in some embodiments, based on determining that the class of one or more of the identified objects comprises a human or person, the scene-based image editing system 106 utilizes a special human object mask neural network to generate an object mask, such as the object mask 324 shown in FIG. 3.

As further illustrated in FIG. 3, the scene-based image editing system 106 receives the object mask 324 and the object mask 326 as output from the object segmentation machine learning model 310. As previously discussed, in one or more embodiments, an object mask comprises a pixel-wise mask that corresponds to an object in a source or target digital image. In one example, an object mask includes a segmentation boundary indicating a predicted edge of one or more objects as well as pixels contained within the predicted edge.

In some embodiments, the scene-based image editing system 106 also detects the objects shown in the digital image 316 via the collective network, i.e., the detection-masking neural network 300, in the same manner outlined above. For example, in some cases, the scene-based image editing system 106, via the detection-masking neural network 300 detects the woman, the man, and the bird within the digital image 316. In particular, the scene-based image editing system 106, via the detection heads 304, utilizes the feature pyramids and feature maps to identify objects within the digital image 316 and generates object masks via the masking head 306.

Furthermore, in one or more implementations, although FIG. 3 illustrates generating object masks based on the user input 312, the scene-based image editing system 106 generates object masks without user input 312. In particular, the scene-based image editing system 106 generates object masks for all detected objects within the digital image 316. To illustrate, in at least one implementation, despite not receiving the user input 312, the scene-based image editing system 106 generates object masks for the woman, the man, and the bird.

Figure 4:
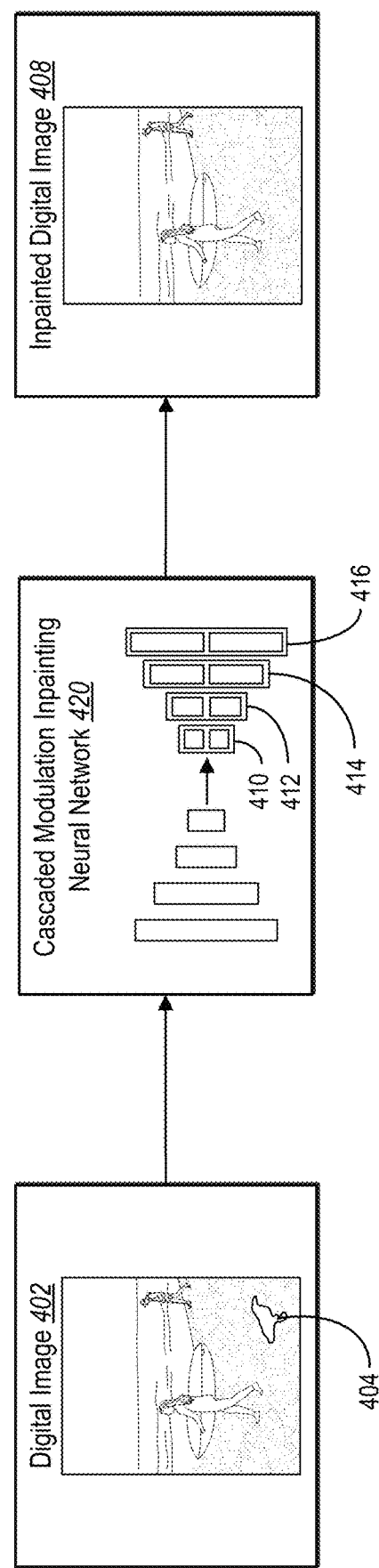
FIG. 4 illustrates utilizing a cascaded modulation inpainting neural network to generate an inpainted digital image in accordance with one or more embodiments.
Figure 5:
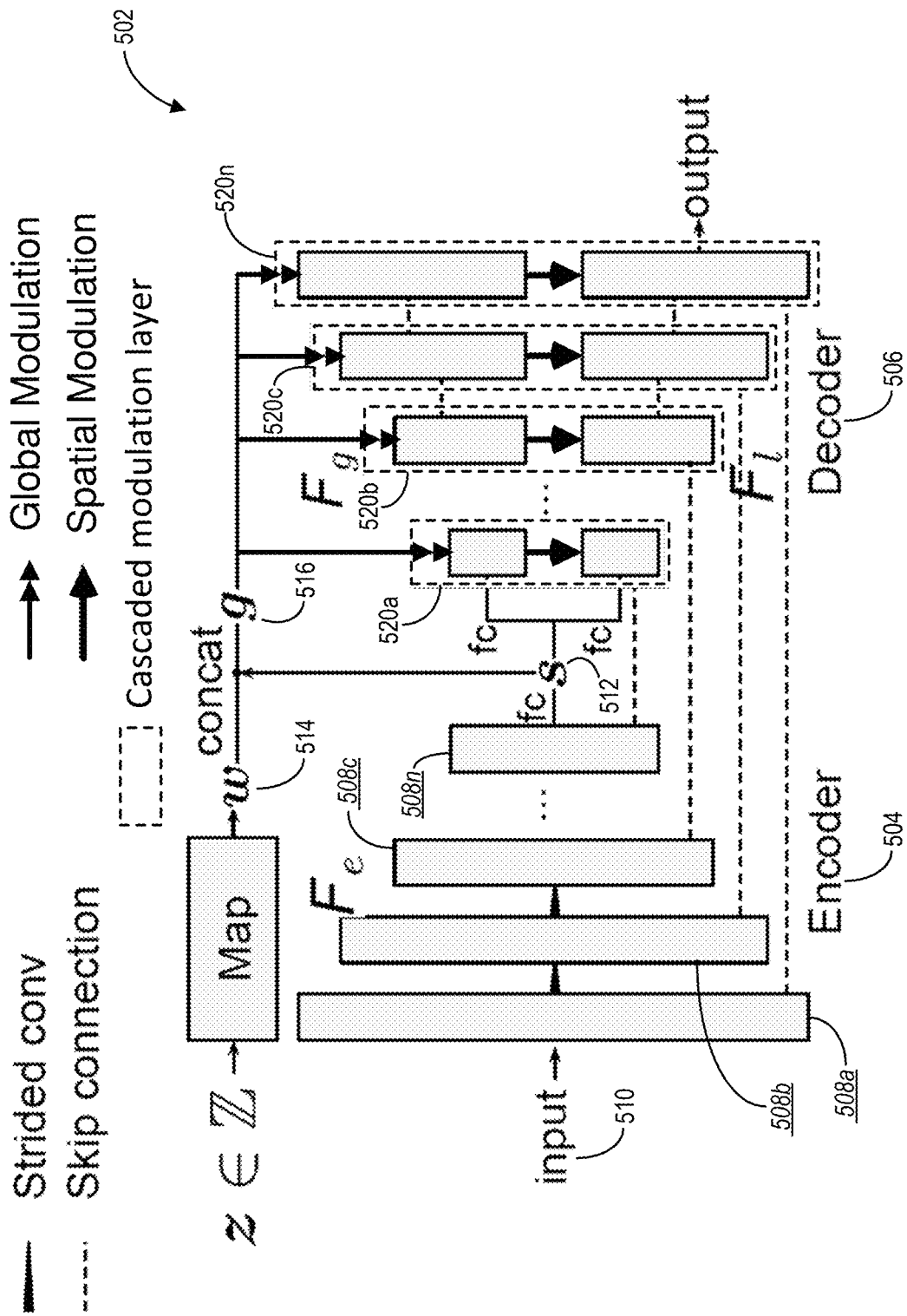
FIG. 5 illustrates an example architecture of a cascaded modulation inpainting neural network in accordance with one or more embodiments.
Figure 6:
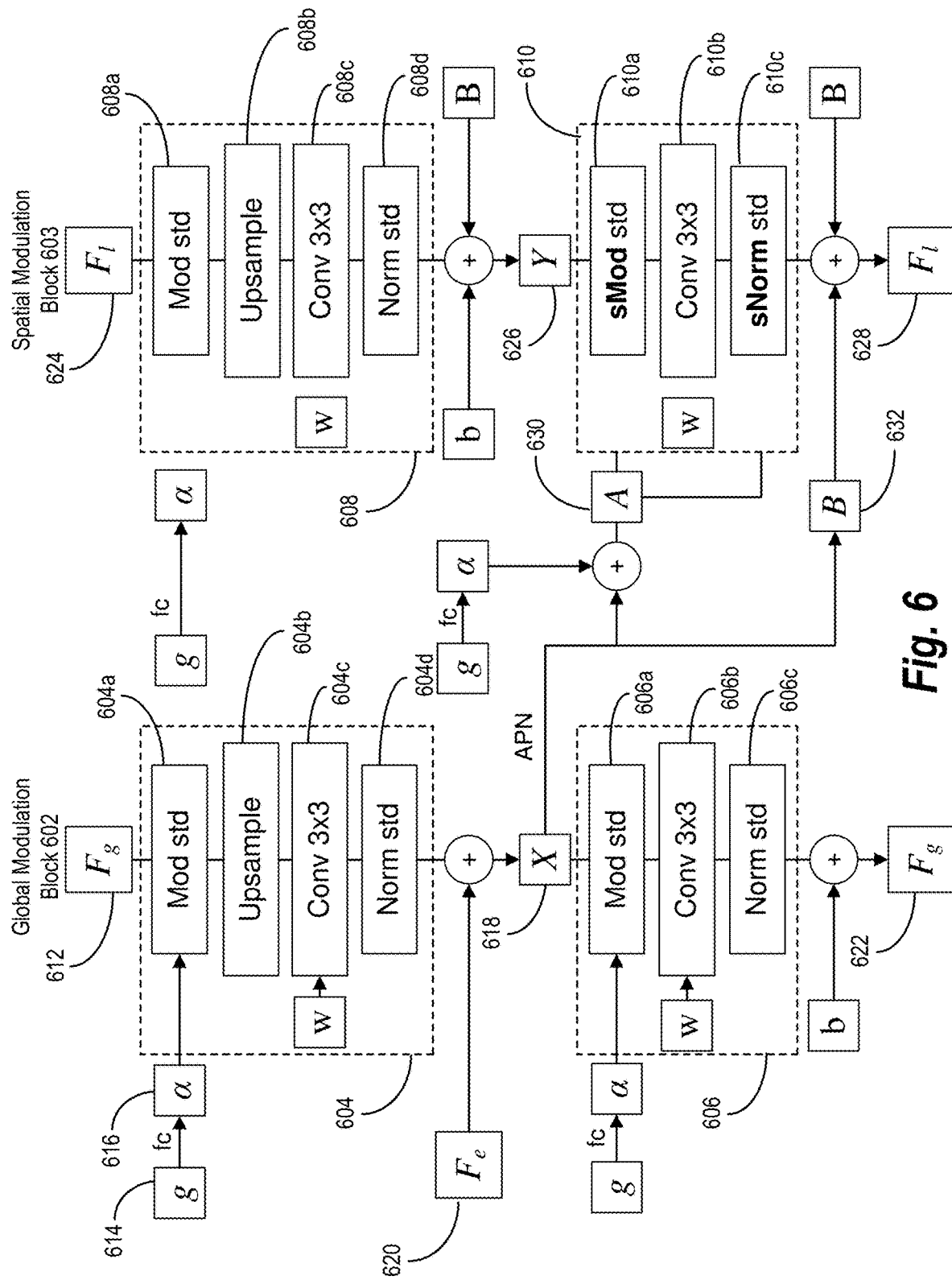
FIG. 6 illustrates global modulation blocks and spatial modulation blocks implemented in a cascaded modulation inpainting neural network in accordance with one or more embodiments.

In one or more embodiments, the scene-based image editing system 106 implements object-aware image editing by generating a content fill for each object portrayed in a digital image (e.g., for each object mask corresponding to portrayed objects) utilizing a hole-filing model. In particular, in some cases, the scene-based image editing system 106 utilizes a machine learning model, such as a content-aware hole-filling machine learning model to generate the content fill(s) for each foreground object. FIGS. 4-6 illustrate a content-aware hole-filling machine learning model utilized by the scene-based image editing system 106 to generate content fills for objects in accordance with one or more embodiments.

In one or more embodiments, a content fill includes a set of pixels generated to replace another set of pixels of a digital image. Indeed, in some embodiments, a content fill includes a set of replacement pixels for replacing another set of pixels. For instance, in some embodiments, a content fill includes a set of pixels generated to fill a hole (e.g., a content void) that remains after (or if) a set of pixels (e.g., a set of pixels portraying an object) has been removed from or moved within a digital image. In some cases, a content fill corresponds to a background of a digital image. To illustrate, in some implementations, a content fill includes a set of pixels generated to blend in with a portion of a background proximate to an object that could be moved/removed. In some cases, a content fill includes an inpainting segment, such as an inpainting segment generated from other pixels (e.g., other background pixels) within the digital image. In some cases, a content fill includes other content (e.g., arbitrarily selected content or content selected by a user) to fill in a hole or replace another set of pixels.

In one or more embodiments, a content-aware hole-filling machine learning model includes a computer-implemented machine learning model that generates content fill. In particular, in some embodiments, a content-aware hole-filling machine learning model includes a computer-implemented machine learning model that generates content fills for replacement regions in a digital image. For instance, in some cases, the scene-based image editing system 106 determines that an object has been moved within or removed from a digital image and utilizes a content-aware hole-filling machine learning model to generate a content fill for the hole that has been exposed as a result of the move/removal in response. As will be discussed in more detail, however, in some implementations, the scene-based image editing system 106 anticipates movement or removal of an object and utilizes a content-aware hole-filling machine learning model to pre-generate a content fill for that object. In some cases, a content-aware hole-filling machine learning model includes a neural network, such as an inpainting neural network (e.g., a neural network that generates a content fill-more specifically, an inpainting segment-using other pixels of the digital image). In other words, the scene-based image editing system 106 utilizes a content-aware hole-filling machine learning model in various implementations to provide content at a location of a digital image that does not initially portray such content (e.g., due to the location being occupied by another semantic area, such as an object).

FIG. 4 illustrates the scene-based image editing system 106 utilizing a content-aware machine learning model, such as a cascaded modulation inpainting neural network 420, to generate an inpainted digital image 408 from a digital image 402 with a replacement region 404 in accordance with one or more embodiments.

Indeed, in one or more embodiments, the replacement region 404 includes an area corresponding to an object (and a hole that would be present if the object were moved or deleted). In some embodiments, the scene-based image editing system 106 identifies the replacement region 404 based on user selection of pixels (e.g., pixels portraying an object) to move, remove, cover, or replace from a digital image. To illustrate, in some cases, a client device selects an object portrayed in a digital image. Accordingly, the scene-based image editing system 106 deletes or removes the object and generates replacement pixels. In some case, the scene-based image editing system 106 identifies the replacement region 404 by generating an object mask via a segmentation neural network. For instance, the scene-based image editing system 106 utilizes a segmentation neural network (e.g., the detection-masking neural network 300 discussed above with reference to FIG. 3) to detect objects with a digital image and generate object masks for the objects. Thus, in some implementations, the scene-based image editing system 106 generates content fill for the replacement region 404 before receiving user input to move, remove, cover, or replace the pixels initially occupying the replacement region 404.

As shown, the scene-based image editing system 106 utilizes the cascaded modulation inpainting neural network 420 to generate replacement pixels for the replacement region 404. In one or more embodiments, the cascaded modulation inpainting neural network 420 includes a generative adversarial neural network for generating replacement pixels. In some embodiments, a generative adversarial neural network (or "GAN") includes a neural network that is tuned or trained via an adversarial process to generate an output digital image (e.g., from an input digital image). In some cases, a generative adversarial neural network includes multiple constituent neural networks such as an encoder neural network and one or more decoder/generator neural networks. For example, an encoder neural network extracts latent code from a noise vector or from a digital image. A generator neural network (or a combination of generator neural networks) generates a modified digital image by combining extracted latent code (e.g., from the encoder neural network). During training, a discriminator neural network, in competition with the generator neural network, analyzes a generated digital image to generate an authenticity prediction by determining whether the generated digital image is real (e.g., from a set of stored digital images) or fake (e.g., not from the set of stored digital images). The discriminator neural network also causes the scene-based image editing system 106 to modify parameters of the encoder neural network and/or the one or more generator neural networks to eventually generate digital images that fool the discriminator neural network into indicating that a generated digital image is a real digital image.

Along these lines, a generative adversarial neural network refers to a neural network having a specific architecture or a specific purpose such as a generative inpainting neural network. For example, a generative inpainting neural network includes a generative adversarial neural network that inpaints or fills pixels of a digital image with a content fill (or generates a content fill in anticipation of inpainting or filling in pixels of the digital image). In some cases, a generative inpainting neural network inpaints a digital image by filling hole regions (indicated by object masks). Indeed, as mentioned above, in some embodiments an object mask defines a replacement region using a segmentation or a mask indicating, overlaying, covering, or outlining pixels to be removed or replaced within a digital image.

Accordingly, in some embodiments, the cascaded modulation inpainting neural network 420 includes a generative inpainting neural network that utilizes a decoder having one or more cascaded modulation decoder layers. Indeed, as illustrated in FIG. 4, the cascaded modulation inpainting neural network 420 includes a plurality of cascaded modulation decoder layers 410, 412, 414, 416. In some cases, a cascaded modulation decoder layer includes at least two connected (e.g., cascaded) modulations blocks for modulating an input signal in generating an inpainted digital image. To illustrate, in some instances, a cascaded modulation decoder layer includes a first global modulation block and a second global modulation block. Similarly, in some cases, a cascaded modulation decoder layer includes a first global modulation block (that analyzes global features and utilizes a global, spatially-invariant approach) and a second spatial modulation block (that analyzes local features utilizing a spatially-varying approach). Additional detail regarding modulation blocks will be provided below (e.g., in relation to FIGS. 5-6).

As shown, the scene-based image editing system 106 utilizes the cascaded modulation inpainting neural network 420 (and the cascaded modulation decoder layers 410, 412, 414, 416) to generate the inpainted digital image 408. Specifically, the cascaded modulation inpainting neural network 420 generates the inpainted digital image 408 by generating a content fill for the replacement region 404. As illustrated, the replacement region 404 is now filled with a content fill having replacement pixels that portray a photo-realistic scene in place of the replacement region 404.

As mentioned above, the scene-based image editing system 106 utilizes a cascaded modulation inpainting neural network that includes cascaded modulation decoder layers to generate inpainted digital images. FIG. 5 illustrates an example architecture of a cascaded modulation inpainting neural network 502 in accordance with one or more embodiments.

As illustrated, the cascaded modulation inpainting neural network 502 includes an encoder 504 and a decoder 506. In particular, the encoder 504 includes a plurality of convolutional layers 508*a*-508*n* at different scales/resolutions. In some cases, the scene-based image editing system 106 feeds the digital image input 510 (e.g., an encoding of the digital image) into the first convolutional layer 508*a* to generate an encoded feature vector at a higher scale (e.g., lower resolution). The second convolutional layer 508*b* processes the encoded feature vector at the higher scale (lower resolution) and generates an additional encoded feature vector (at yet another higher scale/lower resolution). The cascaded modulation inpainting neural network 502 iteratively generates these encoded feature vectors until reaching the final/highest scale convolutional layer 508*n* and generating a final encoded feature vector representation of the digital image.

As illustrated, in one or more embodiments, the cascaded modulation inpainting neural network 502 generates a global feature code from the final encoded feature vector of the encoder 504. A global feature code includes a feature representation of the digital image from a global (e.g., high-level, high-scale, low-resolution) perspective. In particular, a global feature code includes a representation of the digital image that reflects an encoded feature vector at the highest scale/lowest resolution (or a different encoded feature vector that satisfies a threshold scale/resolution).

As illustrated, in one or more embodiments, the cascaded modulation inpainting neural network 502 applies a neural network layer (e.g., a fully connected layer) to the final encoded feature vector to generate a style code 512 (e.g., a style vector). In addition, the cascaded modulation inpainting neural network 502 generates the global feature code by combining the style code 512 with a random style code 514. In particular, the cascaded modulation inpainting neural network 502 generates the random style code 514 by utilizing a neural network layer (e.g., a multi-layer perceptron) to process an input noise vector. The neural network layer maps the input noise vector to a random style code 514. The cascaded modulation inpainting neural network 502 combines (e.g., concatenates, adds, or multiplies) the random style code 514 with the style code 512 to generate the global feature code 516. Although FIG. 5 illustrates a particular approach to generate the global feature code 516, the scene-based image editing system 106 is able to utilize a variety of different approaches to generate a global feature code that represents encoded feature vectors of the encoder 504 (e.g., without the style code 512 and/or the random style code 514).

As mentioned above, in some embodiments, the cascaded modulation inpainting neural network 502 generates an image encoding utilizing the encoder 504. An image encoding refers to an encoded representation of the digital image. Thus, in some cases, an image encoding includes one or more encoding feature vectors, a style code, and/or a global feature code.

In one or more embodiments, the cascaded modulation inpainting neural network 502 utilizes a plurality of Fourier convolutional encoder layer to generate an image encoding (e.g., the encoded feature vectors, the style code 512, and/or the global feature code 516). For example, a Fourier convolutional encoder layer (or a fast Fourier convolution) comprises a convolutional layer that includes non-local receptive fields and cross-scale fusion within a convolutional unit. In particular, a fast Fourier convolution can include three kinds of computations in a single operation unit: a local branch that conducts small-kernel convolution, a semi-global branch that processes spectrally stacked image patches, and a global branch that manipulates image-level spectrum. These three branches complementarily address different scales. In addition, in some instances, a fast Fourier convolution includes a multi-branch aggregation process for cross-scale fusion. For example, in one or more embodiments, the cascaded modulation inpainting neural network 502 utilizes a fast Fourier convolutional layer as described by Lu Chi, Borui Jiang, and Yadong Mu in Fast Fourier convolution, Advances in Neural Information Processing Systems, 33 (2020), which is incorporated by reference herein in its entirety.

Specifically, in one or more embodiments, the cascaded modulation inpainting neural network 502 utilizes Fourier convolutional encoder layers for each of the encoder convolutional layers 508a-508n. Thus, the cascaded modulation inpainting neural network 502 utilizes different Fourier convolutional encoder layers having different scales/resolutions to generate encoded feature vectors with improved, non-local receptive field.

Operation of the encoder 504 can also be described in terms of variables or equations to demonstrate functionality of the cascaded modulation inpainting neural network 502. For instance, as mentioned, the cascaded modulation inpainting neural network 502 is an encoder-decoder network with proposed cascaded modulation blocks at its decoding stage for image inpainting. Specifically, the cascaded modulation inpainting neural network 502 starts with an encoder E that takes the partial image and the mask as inputs to produce multi-scale feature maps from input resolution to resolution 4×4:

$$F_e^{(1)}, \ldots, F_e^{(L)} = E(x \odot (1-m), m),$$

where $F_e^{(i)}$ are the generated feature at scale $1 \leq i \leq L$ (and L is the highest scale or resolution). The encoder is implemented by a set of stride-2 convolutions with residual connection.

After generating the highest scale feature $F_e^{(L)}$, a fully connected layer followed by a $l_2$ normalization products a global style code $s = fc(F_e^{(L)})/\|fc(F_e^{(L)})\|_2$ to represent the input globally. In parallel to the encoder, an MLP-based mapping network produces a random style code w from a normalized random Gaussian noise z, simulating the stochasticity of the generation process. Moreover, the scene-based image editing system 106 joins w with s to produce the final global code g=[s; w] for decoding. As mentioned, in some embodiments, the scene-based image editing system 106 utilizes the final global code as an image encoding for the digital image.

As mentioned above, in some implementations, full convolutional models suffer from slow growth of effective receptive field, especially at the early stage of the network. Accordingly, utilizing strided convolution within the encoder can generate invalid features inside the hole region, making the feature correction at decoding stage more challenging. Fast Fourier convolution (FFC) can assist early layers to achieve receptive field that covers an entire image. Conventional systems, however, have only utilized FFC at a bottleneck layer, which is computationally demanding. Moreover, the shallow bottleneck layer cannot capture global semantic features effectively. Accordingly, in one or more implementations the scene-based image editing system 106 replaces the convolutional block in the encoder with FFC for the encoder layers. FFC enables the encoder to propagate features at early stage and thus address the issue of generating invalid features inside the hole, which helps improve the results.

As further shown in FIG. 5, the cascaded modulation inpainting neural network 502 also includes the decoder 506. As shown, the decoder 506 includes a plurality of cascaded modulation layers 520a-520n. The cascaded modulation layers 520a-520n process input features (e.g., input global feature maps and input local feature maps) to generate new features (e.g., new global feature maps and new local feature maps). In particular, each of the cascaded modulation layers 520a-520n operate at a different scale/resolution. Thus, the first cascaded modulation layer 520a takes input features at a first resolution/scale and generates new features at a lower scale/higher resolution (e.g., via upsampling as part of one or more modulation operations). Similarly, additional cascaded modulation layers operate at further lower scales/higher resolutions until generating the inpainted digital image at an output scale/resolution (e.g., the lowest scale/highest resolution).

Moreover, each of the cascaded modulation layers include multiple modulation blocks. For example, with regard to FIG. 5 the first cascaded modulation layer 520a includes a global modulation block and a spatial modulation block. In particular, the cascaded modulation inpainting neural network 502 performs a global modulation with regard to input features of the global modulation block. Moreover, the cascaded modulation inpainting neural network 502 performs a spatial modulation with regard to input features of the spatial modulation block. By performing both a global modulation and spatial modulation within each cascaded modulation layer, the scene-based image editing system 106 refines global positions to generate more accurate inpainted digital images.

As illustrated, the cascaded modulation layers 520a-520n are cascaded in that the global modulation block feeds into the spatial modulation block. Specifically, the cascaded modulation inpainting neural network 502 performs the spatial modulation at the spatial modulation block based on features generated at the global modulation block. To illustrate, in one or more embodiments the cascaded modulation inpainting neural network 502 utilizes the global modulation block to generate an intermediate feature. The cascaded modulation inpainting neural network 502 further utilizes a convolutional layer (e.g., a 2-layer convolutional affine parameter network) to convert the intermediate feature to a spatial tensor. The cascaded modulation inpainting neural network 502 utilizes the spatial tensor to modulate the input features analyzed by the spatial modulation block.

For example, FIG. 6 provides additional detail regarding operation of global modulation blocks and spatial modulation blocks in accordance with one or more embodiments. Specifically, FIG. 6 illustrates a global modulation block 602 and a spatial modulation block 603. As shown in FIG. 6, the global modulation block 602 includes a first global modulation operation 604 and a second global modulation operation 606. Moreover, the spatial modulation block 603 includes a global modulation operation 608 and a spatial modulation operation 610.

For example, a modulation block (or modulation operation) includes a computer-implemented process for modulating (e.g., scaling or shifting) an input signal according to one or more conditions. To illustrate, modulation block includes amplifying certain features while counteracting/normalizing these amplifications to preserve operation within a generative model. Thus, for example, a modulation block (or modulation operation) includes a modulation layer, a convolutional layer, and a normalization layer in some cases. The modulation layer scales each input feature of the convolution, and the normalization removes the effect of scaling from the statistics of the convolution's output feature maps.

Indeed, because a modulation layer modifies feature statistics, a modulation block (or modulation operation) often includes one or more approaches for addressing these statistical changes. For example, in some instances, a modulation block (or modulation operation) includes a computer-implemented process that utilizes batch normalization or instance normalization to normalize a feature. In some embodiments, the modulation is achieved by scaling and shifting the normalized activation according to affine parameters predicted from input conditions. Similarly, some modulation procedures replace feature normalization with a demodulation process. Thus, in one or more embodiments, a modulation block (or modulation operation) includes a modulation layer, convolutional layer, and a demodulation layer. For example, in one or more embodiments, a modulation block (or modulation operation) includes the modulation approaches described by Tero Karras, Samuli Laine, Miika Aittala, Janne Hellsten, Jaakko Lehtinen, and Timo Aila in Analyzing and improving the image quality of StyleGAN, Proc. CVPR (2020) (hereinafter StyleGan2), which is incorporated by reference herein in its entirety. In some instances, a modulation block includes one or more modulation operations.

Moreover, in one or more embodiments, a global modulation block (or global modulation operation) includes a modulation block (or modulation operation) that modulates an input signal in a spatially-invariant manner. For example, in some embodiments, a global modulation block (or global modulation operation) performs a modulation according to global features of a digital image (e.g., that do not vary spatially across coordinates of a feature map or image). Thus, for example, a global modulation block includes a modulation block that modulates an input signal according to an image encoding (e.g., global feature code) generated by an encoder. In some implementations, a global modulation block includes multiple global modulation operations.

In one or more embodiments, a spatial modulation block (or spatial modulation operation) includes a modulation block (or modulation operation) that modulates an input signal in a spatially-varying manner (e.g., according to a spatially-varying feature map). In particular, in some embodiments, a spatial modulation block (or spatial modulation operation) utilizes a spatial tensor, to modulate an input signal in a spatially-varying manner. Thus, in one or more embodiments a global modulation block applies a global modulation where affine parameters are uniform across spatial coordinates, and a spatial modulation block applies a spatially-varying affine transformation that varies across spatial coordinates. In some embodiments, a spatial modulation block includes both a spatial modulation operation in combination with another modulation operation (e.g., a global modulation operation and a spatial modulation operation).

For instance, in some embodiments, a spatial modulation operation includes spatially-adaptive modulation as described by Taesung Park, Ming-Yu Liu, Ting-Chun Wang, and Jun-Yan Zhu in Semantic image synthesis with spatially-adaptive normalization, Proceedings of the IEEE Conference on Computer Vision and Pattern Recognition (2019), which is incorporated by reference herein in its entirety (hereinafter Taesung). In some embodiments, the spatial modulation operation utilizes a spatial modulation operation with a different architecture than Taesung, including a modulation-convolution-demodulation pipeline.

Thus, with regard to FIG. 6, the scene-based image editing system 106 utilizes a global modulation block 602. As shown, the global modulation block 602 includes a first global modulation operation 604 and a second global modulation operation 606. Specifically, the first global modulation operation 604 processes a global feature map 612. For example, the global feature map 612 includes a feature vector generated by the cascaded modulation inpainting neural network reflecting global features (e.g., high-level features or features corresponding to the whole digital image). Thus, for example, the global feature map 612 includes a feature vector reflecting global features generated from a previous global modulation block of a cascaded decoder layer. In some instances, the global feature map 612 also includes a feature vector corresponding to the encoded feature vectors generated by the encoder (e.g., at a first decoder layer the scene-based image editing system 106 utilizes an encoded feature vector, style code, global feature code, constant, noise vector, or other feature vector as input in various implementations).

As shown, the first global modulation operation 604 includes a modulation layer 604a, an upsampling layer 604b, a convolutional layer 604c, and a normalization layer 604d. In particular, the scene-based image editing system 106 utilizes the modulation layer 604a to perform a global modulation of the global feature map 612 based on a global feature code 614 (e.g., the global feature code 516). Specifically, the scene-based image editing system 106 applies a neural network layer (i.e., a fully connected layer) to the global feature code 614 to generate a global feature vector 616. The scene-based image editing system 106 then modulates the global feature map 612 utilizing the global feature vector 616.

In addition, the scene-based image editing system 106 applies the upsampling layer 604b (e.g., to modify the resolution scale). Further, the scene-based image editing system 106 applies the convolutional layer 604c. In addition, the scene-based image editing system 106 applies the normalization layer 604d to complete the first global modulation operation 604. As shown, the first global modulation operation 604 generates a global intermediate feature 618. In particular, in one or more embodiments, the scene-based image editing system 106 generates the global intermediate feature 618 by combining (e.g., concatenating) the output of the first global modulation operation 604 with an encoded feature vector 620 (e.g., from a convolutional layer of the encoder having a matching scale/resolution).

As illustrated, the scene-based image editing system 106 also utilizes a second global modulation operation 606. In particular, the scene-based image editing system 106 applies the second global modulation operation 606 to the global intermediate feature 618 to generate a new global feature map 622. Specifically, the scene-based image editing system 106 applies a global modulation layer 606a to the global intermediate feature 618 (e.g., conditioned on the global feature vector 616). Moreover, the scene-based image editing system 106 applies a convolutional layer 606b and a normalization layer 606c to generate the new global feature map 622. As shown, in some embodiments, the scene-based image editing system 106 applies a spatial bias in generating the new global feature map 622.

Furthermore, as shown in FIG. 6, the scene-based image editing system 106 utilizes a spatial modulation block 603. In particular, the spatial modulation block 603 includes a global modulation operation 608 and a spatial modulation operation 610. The global modulation operation 608 processes a local feature map 624. For example, the local feature map 624 includes a feature vector generated by the cascaded modulation inpainting neural network reflecting local features (e.g., low-level, specific, or spatially variant features). Thus, for example, the local feature map 624 includes a feature vector reflecting local features generated from a previous spatial modulation block of a cascaded decoder layer. In some cases, the global feature map 612 also includes a feature vector corresponding to the encoded feature vectors generated by the encoder (e.g., at a first decoder layer, the scene-based image editing system 106 utilizes an encoded feature vector, style code, noise vector or other feature vector in various implementations).

As shown, the scene-based image editing system 106 utilizes the global modulation operation 608 to generate a local intermediate feature 626 from the local feature map 624.

Specifically, the scene-based image editing system 106 applies a modulation layer 608a, an upsampling layer 608b, a convolutional layer 608c, and a normalization layer 608d. Moreover, in some embodiments, the scene-based image editing system 106 applies spatial bias and broadcast noise to the output of the global modulation operation 608 to generate the local intermediate feature 626.

As illustrated in FIG. 6, the scene-based image editing system 106 utilizes the spatial modulation operation 610 to generate a new local feature map 628. Indeed, the spatial modulation operation 610 modulates the local intermediate feature 626 based on the global intermediate feature 618. Specifically, the scene-based image editing system 106 generates a spatial tensor 630 from the global intermediate feature 618. For example, the scene-based image editing system 106 applies a convolutional affine parameter network to generate the spatial tensor 630. In particular, the scene-based image editing system 106 applies a convolutional affine parameter network to generate an intermediate spatial tensor. The scene-based image editing system 106 combines the intermediate spatial tensor with the global feature vector 616 to generate the spatial tensor 630. The scene-based image editing system 106 utilizes the spatial tensor 630 to modulate the local intermediate feature 626 (utilizing the spatial modulation layer 610a) and generated a modulated tensor.

As shown, the scene-based image editing system 106 also applies a convolutional layer 610b to the modulated tensor. In particular, the convolutional layer 610b generates a convolved feature representation from the modulated tensor. In addition, the scene-based image editing system 106 applies a normalization layer 610c to convolved feature representation to generate the new local feature map 628.

Although illustrated as a normalization layer 610c, in one or more embodiments, the scene-based image editing system 106 applies a demodulation layer. For example, the scene-based image editing system 106 applies a modulation-convolution-demodulation pipeline (e.g., general normalization rather than instance normalization). In some cases, this approach avoids potential artifacts (e.g., water droplet artifacts) caused by instance normalization. Indeed, a demodulation/normalization layer includes a layer that scales each output feature map by a uniform demodulation/normalization value (e.g., by a uniform standard deviation instead of instance normalization that utilizes data-dependent constant normalization based on the contents of the feature maps).

As shown in FIG. 6, in some embodiments, the scene-based image editing system 106 also applies a shifting tensor 632 and broadcast noise to the output of the spatial modulation operation 610. For example, the spatial modulation operation 610 generates a normalized/demodulated feature. The scene-based image editing system 106 also generates the shifting tensor 632 by applying the affine parameter network to the global intermediate feature 618. The scene-based image editing system 106 combines the normalized/demodulated feature, the shifting tensor 632, and/or the broadcast noise to generate the new local feature map 628.

In one or more embodiments, upon generating the new global feature map 622 and the new local feature map 628, the scene-based image editing system 106 proceeds to the next cascaded modulation layer in the decoder. For example, the scene-based image editing system 106 utilizes the new global feature map 622 and the new local feature map 628 as input features to an additional cascaded modulation layer at a different scale/resolution. The scene-based image editing system 106 further utilizes the additional cascaded modulation layer to generate additional feature maps (e.g., utilizing an additional global modulation block and an additional spatial modulation block). In some cases, the scene-based image editing system 106 iteratively processes feature maps utilizing cascaded modulation layers until coming to a final scale/resolution to generate an inpainted digital image.

Although FIG. 6 illustrates the global modulation block 602 and the spatial modulation block 603, in some embodiments, the scene-based image editing system 106 utilizes a global modulation block followed by another global modulation block. For example, the scene-based image editing system 106 replaces the spatial modulation block 603 with an additional global modulation block. In such an embodiment, the scene-based image editing system 106 replaces APN (and spatial tensor) and corresponding spatial modulation illustrated in FIG. 6 with a skip connection. For example, the scene-based image editing system 106 utilizes the global intermediate feature to perform a global modulation with regard to the local intermediate vector. Thus, in some cases, the scene-based image editing system 106 utilizes a first global modulation block and a second global modulation block.

As mentioned, the decoder can also be described in terms of variables and equations to illustrate operation of the cascaded modulation inpainting neural network. For example, as discussed, the decoder stacks a sequence of cascaded modulation blocks to upsample the input feature map $F_e^{(L)}$. Each cascaded modulation block takes the global code g as input to modulate the feature according to the global representation of the partial image. Moreover, in some cases, the scene-based image editing system 106 provides mechanisms to correct local error after predicting the global structure.

In particular, in some embodiments, the scene-based image editing system 106 utilizes a cascaded modulation block to address the challenge of generating coherent features both globally and locally. At a high level, the scene-based image editing system 106 follows the following approach: i) decomposition of global and local features to separate local details from the global structure, ii) a cascade of global and spatial modulation that predicts local details from global structures. In one or more implementations, the scene-based image editing system 106 utilizes spatial modulations generated from the global code for better predictions (e.g., and discards instance normalization to make the design compatible with StyleGAN2).

Specifically, the cascaded modulation takes the global and local feature $F_g^{(i)}$ and $F_l^{(i)}$ from previous scale and the global code g as input and produces the new global and local features $F_g^{(i+1)}$ and $F_l^{(i+1)}$ at next scale/resolution. To produce the new global code $F_g^{(i+1)}$ from $F_g^{(i)}$, the scene-based image editing system 106 utilizes a global code modulation stage that includes a modulation-convolution-demodulation procedure, which generates an upsampled feature X.

Due to the limited expressive power of the global vector g on representing 2-d visual details, and the inconsistent features inside and outside the hole, the global modulation may generate distorted features inconsistent with the context. To compensate, in some cases, the scene-based image editing system 106 utilizes a spatial modulation that generates more accurate features. Specifically, the spatial modulation takes X as the spatial code and g as the global code to modulate the input local feature $F_l^{(i)}$ in a spatially adaptive fashion.

Moreover, the scene-based image editing system 106 utilizes a unique spatial modulation-demodulation mechanism to avoid potential "water droplet" artifacts caused by instance normalization in conventional systems. As shown, the spatial modulation follows a modulation-convolution-demodulation pipeline.

In particular, for spatial modulation, the scene-based image editing system 106 generates a spatial tensor $A_0$=APN (Y) from feature X by a 2-layer convolutional affine parameter network (APN). Meanwhile, the scene-based image editing system 106 generates a global vector $\alpha$=fc (g) from global gode g with a fully connected layer (fc) to capture global context. The scene-based image editing system 106 generates a final spatial tensor $A=A_0+\alpha$ as the broadcast summation of $A_0$ and $\alpha$ for scaling intermediate feature Y of the block with element-wise product $\odot$:

$$\bar{Y} = Y \odot A$$

Moreover, for convolution, the modulated tensor $\bar{Y}$ is convolved with a 3×3 learnable kernel K, resulting in:

$$\hat{Y} = \bar{Y} * K$$

For spatially-aware demodulation, the scene-based image editing system 106 applies a demodularization step to compute the normalized output $\tilde{Y}$. Specifically, the scene-based image editing system 106 assumes that the input features Y are independent random variables with unit variance and after the modulation, the expected variance of the output is not changed, i.e., $\mathbb{E}_{y \in \tilde{y}}[\text{Var}(y)]=1$. Accordingly, this gives the demodulation computation:

$$\tilde{Y} = \hat{Y} \odot D,$$

where $D = 1/\sqrt{K^2 \odot \mathbb{E}_{a \in A}[a^2]}$ is the demodulation coefficient. In some cases, the scene-based image editing system 106 implements the foregoing equation with standard tensor operations.

In one or more implementations, the scene-based image editing system 106 also adds spatial bias and broadcast noise. For example, the scene-based image editing system 106 adds the normalized feature $\tilde{Y}$ to a shifting tensor B=APN (X) produced by another affine parameter network (APN) from feature X along with the broadcast noise n to product the new local feature $F_l^{(i+1)}$:

$$F_l^{(i+1)} = \tilde{Y} + B + n$$

Thus, in one or more embodiments, to generate a content fill having replacement pixels for a digital image having a replacement region, the scene-based image editing system 106 utilizes an encoder of a content-aware hole-filling machine learning model (e.g., a cascaded modulation inpainting neural network) to generate an encoded feature map from the digital image. The scene-based image editing system 106 further utilizes a decoder of the content-aware hole-filling machine learning model to generate the content fill for the replacement region. In particular, in some embodiments, the scene-based image editing system 106 utilizes a local feature map and a global feature map from one or more decoder layers of the content-aware hole-filling machine learning model in generating the content fill for the replacement region of the digital image.

Figure 7:
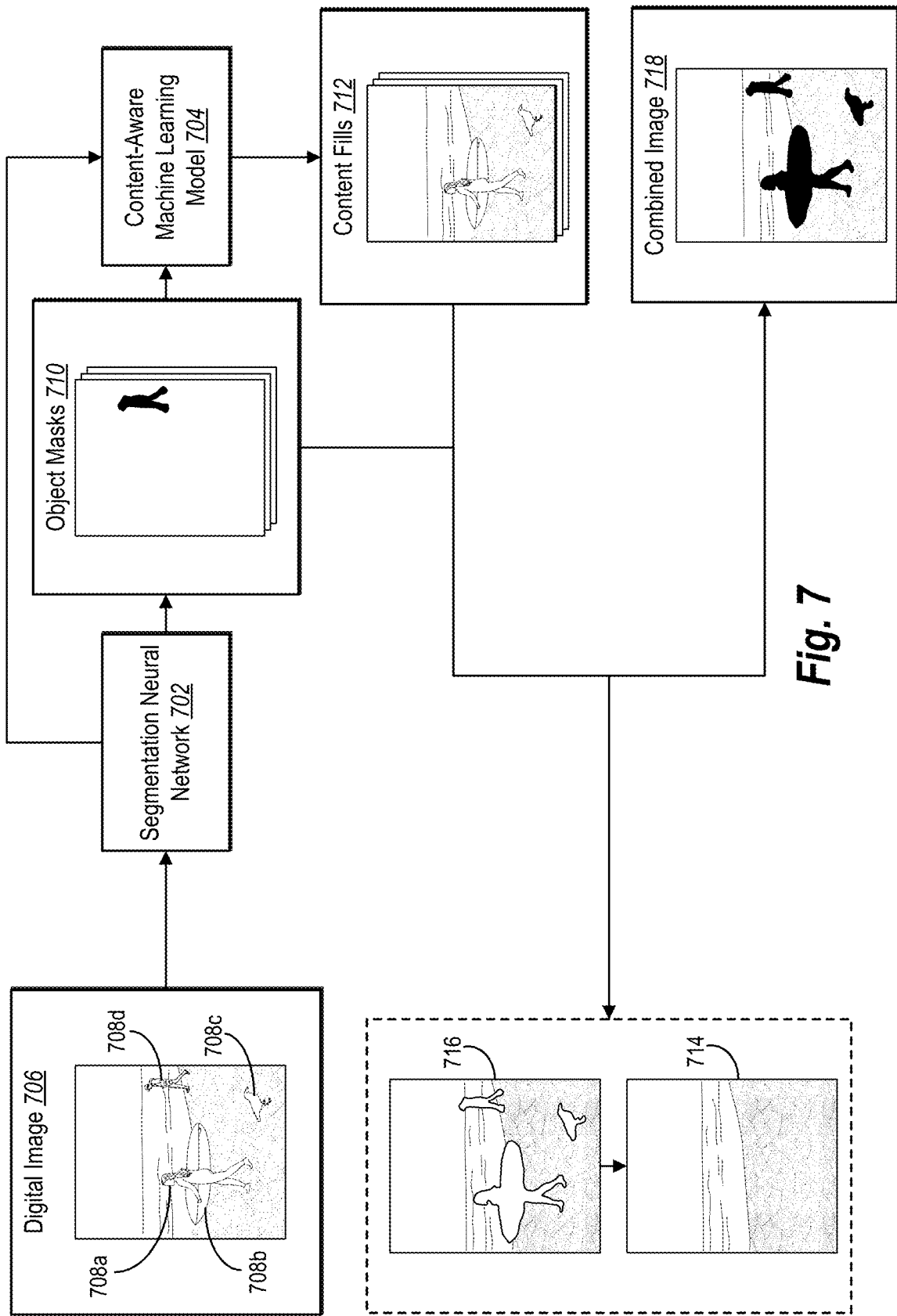
FIG. 7 illustrates a diagram for generating object masks and content fills to facilitate object-aware modifications to a digital image in accordance with one or more embodiments.

As discussed above with reference to FIGS. 3-6, in one or more embodiments, the scene-based image editing system 106 utilizes a segmentation neural network to generate object masks for objects portrayed in a digital image and a content-aware hole-filling machine learning model to generate content fills for those objects (e.g., for the object masks generated for the objects). As further mentioned, in some embodiments, the scene-based image editing system 106 generates the object mask(s) and the content fill(s) in anticipation of one or more modifications to the digital image-before receiving user input for such modifications. For example, in one or more implementations, upon opening, accessing, or displaying the digital image 706, the scene-based image editing system 106 generates the object mask(s) and the content fill(s) automatically (e.g., without user input to do so). Thus, in some implementations the scene-based image editing system 106 facilitates object-aware modifications of digital images. FIG. 7 illustrates a diagram for generating object masks and content fills to facilitate object-aware modifications to a digital image in accordance with one or more embodiments.

In one or more embodiments, an object-aware modification includes an editing operation that targets an identified object in a digital image. In particular, in some embodiments, an object-aware modification includes an editing operation that targets an object that has been previously segmented. For instance, as discussed, the scene-based image editing system 106 generates a mask for an object portrayed in a digital image before receiving user input for modifying the object in some implementations. Accordingly, upon user selection of the object (e.g., a user selection of at least some of the pixels portraying the object), the scene-based image editing system 106 determines to target modifications to the entire object rather than requiring that the user specifically designate each pixel to be edited. Thus, in some cases, an object-aware modification includes a modification that targets an object by managing all the pixels portraying the object as part of a cohesive unit rather than individual elements. For instance, in some implementations an object-aware modification includes, but is not limited to, a move operation or a delete operation.

As shown in FIG. 7, the scene-based image editing system 106 utilizes a segmentation neural network 702 and a content-aware hole-filling machine learning model 704 to analyze/process a digital image 706. The digital image 706 portrays a plurality of objects 708*a*-708*d* against a background. Accordingly, in one or more embodiments, the scene-based image editing system 106 utilizes the segmentation neural network 702 to identify the objects 708*a*-708*d* within the digital image.

In one or more embodiments, the scene-based image editing system 106 utilizes the segmentation neural network 702 and the content-aware hole-filling machine learning model 704 to analyze the digital image 706 in anticipation of receiving user input for modifications of the digital image 706. Indeed, in some instances, the scene-based image editing system 106 analyzes the digital image 706 before receiving user input for such modifications. For instance, in some embodiments, the scene-based image editing system 106 analyzes the digital image 706 automatically in response to receiving or otherwise accessing the digital image 706. In some implementations, the scene-based image editing system 106 analyzes the digital image in response to a general user input to initiate pre-processing in anticipation of subsequent modification.

As shown in FIG. 7, the scene-based image editing system 106 utilizes the segmentation neural network 702 to generate object masks 710 for the objects 708*a*-708*d* portrayed in the digital image 706. In particular, in some embodiments, the scene-based image editing system 106 utilizes the segmentation neural network 702 to generate a separate object mask for each portrayed object.

As further shown in FIG. 7, the scene-based image editing system 106 utilizes the content-aware hole-filling machine learning model 704 to generate content fills 712 for the objects 708*a*-708*d*. In particular, in some embodiments, the scene-based image editing system 106 utilizes the content-aware hole-filling machine learning model 704 to generate a separate content fill for each portrayed object. As illustrated, the scene-based image editing system 106 generates the content fills 712 using the object masks 710. For instance, in one or more embodiments, the scene-based image editing system 106 utilizes the object masks 710 generated via the segmentation neural network 702 as indicators of replacement regions to be replaced using the content fills 712 generated by the content-aware hole-filling machine learning model 704. In some instances, the scene-based image editing system 106 utilizes the object masks 710 to filter out the objects from the digital image 706, which results in remaining holes in the digital image 706 to be filled by the content fills content fills 712.

As shown in FIG. 7, the scene-based image editing system 106 utilizes the object masks 710 and the content fills 712 to generate a completed background 714. In one or more embodiments, a completed background image includes a set of background pixels having objects replaced with content fills. In particular, a completed background includes the background of a digital image having the objects portrayed within the digital image replaced with corresponding content fills. In one or more implementations, a completed background comprises generating a content fill for each object in the image. Thus, the completed background may comprise various levels of completion when objects are in front of each other such that the background for a first object comprises part of a second object and the background of the second object comprises a semantic area or the furthest element in the image.

Indeed, FIG. 7 illustrates the background 716 of the digital image 706 with holes 718*a*-718*d* where the objects 708*a*-708*d* were portrayed. For instance, in some cases, the scene-based image editing system 106 filters out the objects 708*a*-708*d* using the object masks 710, causing the holes 718*a*-718*d* to remain. Further, the scene-based image editing system 106 utilizes the content fills 712 to fill in the holes 718*a*-718*d*, resulting in the completed background 714.

In other implementations, the scene-based image editing system 106 utilizes the object masks 710 as indicators of replacement regions in the digital image 706. In particular, the scene-based image editing system 106 utilizes the object masks 710 as indicators of potential replacement regions that may result from receiving user input to modify the digital image 706 via moving/removing one or more of the objects 708*a*-708*d*. Accordingly, the scene-based image editing system 106 utilizes the content fills 712 to replace pixels indicated by the object masks 710.

Though FIG. 7 indicates generating a separate completed background, it should be understood that, in some implementations, the scene-based image editing system 106 creates the completed background 714 as part of the digital image 706. For instance, in one or more embodiments, the scene-based image editing system 106 positions the content fills 712 behind their corresponding object (e.g., as a separate image layer) in the digital image 706. Further, in one or more embodiments, the scene-based image editing system 106 positions the object masks 710 behind their corresponding object (e.g., as a separate layer). In some implementations, the scene-based image editing system 106 places the content fills 712 behind the object masks 710.

Further, in some implementations, the scene-based image editing system 106 generates multiple filled-in backgrounds (e.g., semi-completed backgrounds) for a digital image. For instance, in some cases, where a digital image portrays a plurality of objects, the scene-based image editing system 106 generates a filled-in background for each object from the plurality of objects. To illustrate, the scene-based image editing system 106 generates a filled-in background for an object by generating a content fill for that object while treating the other objects of the digital image as part of the background. Thus, in some instances, the content fill includes portions of other objects positioned behind the object within the digital image.

Thus, in one or more embodiments, the scene-based image editing system 106 generates a combined image 718 as indicated in FIG. 7. Indeed, the scene-based image editing system 106 generates the combined image having the digital image 706, the object masks 710, and the content fills 712 as separate layers. Though, FIG. 7 shows the object masks 710 on top of the objects 708*a*-708*d* within the combined image 718, it should be understood that the scene-based image editing system 106 places the object masks 710 as well as the content fills 712 behind the objects 708a-708d in various implementations. Accordingly, the scene-based image editing system 106 presents the combined image 718 for display within a graphical user interface so that the object masks 710 and the content fills 712 are hidden from view until user interactions that trigger display of those components is received.

Further, though FIG. 7 shows the combined image 718 as separate from the digital image 706, it should be understood that the combined image 718 represents modifications to the digital image 706 in some implementations. In other words, in some embodiments, to generate the combined image 718 the scene-based image editing system 106 modifies the digital image 706 by adding additional layers composed of the object masks 710 and the content fills 712.

In one or more embodiments, the scene-based image editing system 106 utilizes the combined image 718 (e.g., the digital image 706, the object masks 710, and the content fills 712) to facilitate various object-aware modifications with respect to the digital image 706. In particular, the scene-based image editing system 106 utilizes the combined image 718 to implement an efficient graphical user interface that facilitates flexible object-aware modifications. FIGS. 8A-8D illustrate a graphical user interface implemented by the scene-based image editing system 106 to facilitate a move operation in accordance with one or more embodiments.

Figure 8B:
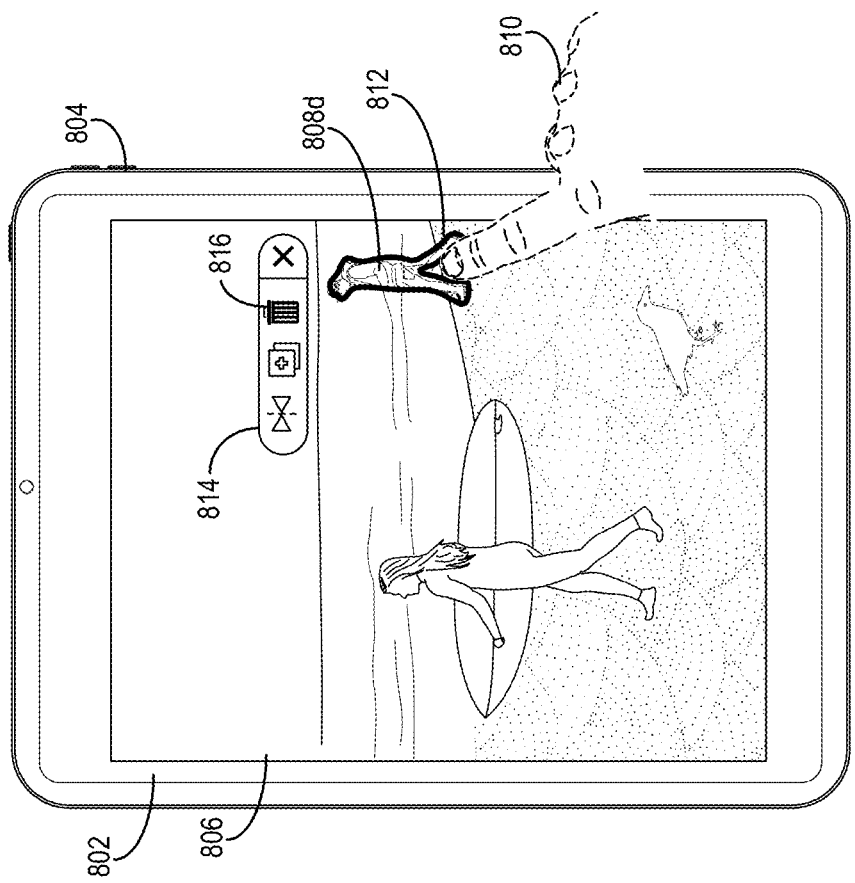
FIGS. 8A-8D illustrate a graphical user interface implemented by the scene-based image editing system to facilitate a move operation in accordance with one or more embodiments.
Figure 8A:
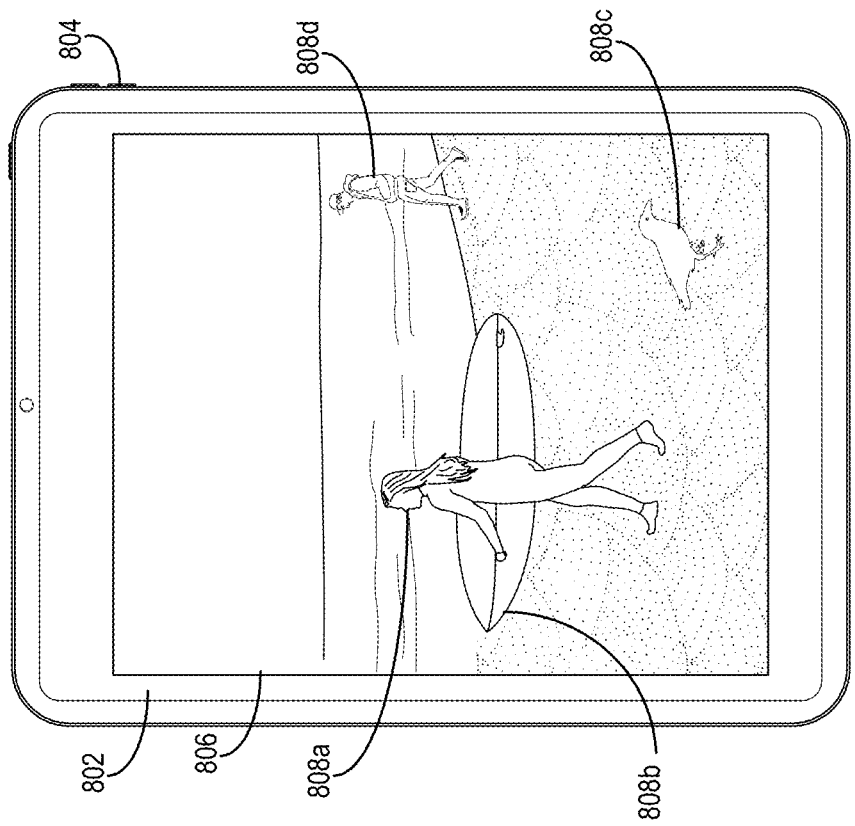

Indeed, as shown in FIG. 8A, the scene-based image editing system 106 provides a graphical user interface 802 for display on a client device 804, such as a mobile device. Further, the scene-based image editing system 106 provides a digital image 806 for display with the graphical user interface.

It should be noted that the graphical user interface 802 of FIG. 8A is minimalistic in style. In particular, the graphical user interface 802 does not include a significant number of menus, options, or other visual elements aside from the digital image 806. Though the graphical user interface 802 of FIG. 8A displays no menus, options, or other visual elements aside from the digital image 806, it should be understood that the graphical user interface 802 displays at least some menus, options, or other visual elements in various embodiments—at least when the digital image 806 is initially displayed.

As further shown in FIG. 8A, the digital image 806 portrays a plurality of objects 808a-808d. In one or more embodiments, the scene-based image editing system 106 pre-processes the digital image 806 before receiving user input for the move operation. In particular, in some embodiments, the scene-based image editing system 106 utilizes a segmentation neural network to detect and generate masks for the plurality of objects 808a-808d and/or utilizes a content-aware hole-filling machine learning model to generate content fills that correspond to the objects 808a-808d. Furthermore, in one or more implementations, the scene-based image editing system 106 generates the object masks, content fills, and a combined image upon loading, accessing, or displaying the digital image 806, and without, user input other than to open/display the digital image 806.

As shown in FIG. 8B, the scene-based image editing system 106 detects a user interaction with the object 808d via the graphical user interface 802. In particular, FIG. 8B illustrates the scene-based image editing system 106 detecting a user interaction executed by a finger (part of a hand 810) of a user (e.g., a touch interaction), though user interactions are executed by other instruments (e.g., stylus or pointer controlled by a mouse or track pad) in various embodiments. In one or more embodiments, the scene-based image editing system 106 determines that, based on the user interaction, the object 808d has been selected for modification.

The scene-based image editing system 106 detects the user interaction for selecting the object 808d via various operations in various embodiments. For instance, in some cases, the scene-based image editing system 106 detects the selection via a single tap (or click) on the object 808d. In some implementations, the scene-based image editing system 106 detects the selection of the object 808d via a double tap (or double click) or a press and hold operation. Thus, in some instances, the scene-based image editing system 106 utilizes the second click or the hold operation to confirm the user selection of the object 808d.

In some cases, the scene-based image editing system 106 utilizes various interactions to differentiate between a single object select or a multi-object select. For instance, in some cases, the scene-based image editing system 106 determines that a single tap is for selecting a single object and a double tap is for selecting multiple objects. To illustrate, in some cases, upon receiving a first tap on an object, the scene-based image editing system 106 selects the object. Further, upon receiving a second tap on the object, the scene-based image editing system 106 selects one or more additional objects. For instance, in some implementations, the scene-based image editing system 106 selects one or more additional object having the same or a similar classification (e.g., selecting other people portrayed in an image when the first tap interacted with a person in the image). In one or more embodiments, the scene-based image editing system 106 recognizes the second tap as an interaction for selecting multiple objects if the second tap is received within a threshold time period after receiving the first tap.

In some embodiments, the scene-based image editing system 106 recognizes other user interactions for selecting multiple objects within a digital image. For instance, in some implementations, the scene-based image editing system 106 receives a dragging motion across the display of a digital image and selects all object captured within the range of the dragging motion. To illustrate, in some cases, the scene-based image editing system 106 draws a box that grows with the dragging motion and selects all objects that falls within the box. In some cases, the scene-based image editing system 106 draws a line that follows the path of the dragging motion and selects all objects intercepted by the line.

In some implementations, the scene-based image editing system 106 further allows for user interactions to select distinct portions of an object. To illustrate, in some cases, upon receiving a first tap on an object, the scene-based image editing system 106 selects the object. Further, upon receiving a second tap on the object, the scene-based image editing system 106 selects a particular portion of the object (e.g., a limb or torso of a person or a component of a vehicle). In some cases, the scene-based image editing system 106 selects the portion of the object touched by the second tap. In some cases, the scene-based image editing system 106 enters into a "sub object" mode upon receiving the second tap and utilizes additional user interactions for selecting particular portions of the object.

Returning to FIG. 8B, as shown, based on detecting the user interaction for selecting the object 808d, the scene-based image editing system 106 provides a visual indication 812 in association with the object 808d. Indeed, in one or more embodiments, the scene-based image editing system 106 detects the user interaction with a portion of the object

808*d*—e.g., with a subset of the pixels that portray the object- and determines that the user interaction targets the object 808*d* as a whole (rather than the specific pixels with which the user interacted). For instance, in some embodiments, the scene-based image editing system 106 utilizes the pre-generated object mask that corresponds to the object 808*d* to determine whether the user interaction targets the object 808*d* or some other portion of the digital image 806. For example, in some cases, upon detecting that the user interacts with an area inside the object mask that corresponds to the object 808*d*, the scene-based image editing system 106 determines that the user interaction targets the object 808*d* as a whole. Thus, the scene-based image editing system 106 provides the visual indication 812 in association with the object 808*d* as a whole.

In some cases, the scene-based image editing system 106 utilizes the visual indication 812 to indicate, via the graphical user interface 802, that the selection of the object 808*d* has been registered. In some implementations, the scene-based image editing system 106 utilizes the visual indication 812 to represent the pre-generated object mask that corresponds to the object 808*d*. Indeed, in one or more embodiments, in response to detecting the user interaction with the object 808*d*, the scene-based image editing system 106 surfaces the corresponding object mask. For instance, in some cases, the scene-based image editing system 106 surfaces the object mask in preparation for a modification to the object 808*d* and/or to indicate that the object mask has already been generated and is available for use. In one or more embodiments, rather than using the visual indication 812 to represent the surfacing of the object mask, the scene-based image editing system 106 displays the object mask itself via the graphical user interface 802.

Additionally, as the scene-based image editing system 106 generated the object mask for the object 808*d* prior to receiving the user input to select the object 808*d*, the scene-based image editing system 106 surfaces the visual indication 812 without latency or delay associated with conventional systems. In other words, the scene-based image editing system 106 surfaces the visual indication 812 without any delay associated with generating an object mask.

As further illustrated, based on detecting the user interaction for selecting the object 808*d*, the scene-based image editing system 106 provides an option menu 814 for display via the graphical user interface 802. The option menu 814 shown in FIG. 8B provides a plurality of options, though the option menu includes various numbers of options in various embodiments. For instance, in some implementations, the option menu 814 includes one or more curated options, such as options determined to be popular or used with the most frequency. For example, as shown in FIG. 8B, the option menu 814 includes an option 816 to delete the object 808*d*.

Thus, in one or more embodiments, the scene-based image editing system 106 provides modification options for display via the graphical user interface 802 based on the context of a user interaction. Indeed, as just discussed, the scene-based image editing system 106 provides an option menu that provides options for interacting with (e.g., modifying) a selected object. In doing so, the scene-based image editing system 106 minimizes the screen clutter that is typical under many conventional systems by withholding options or menus for display until it is determined that those options or menus would be useful in the current context in which the user is interacting with the digital image. Thus, the graphical user interface 802 used by the scene-based image editing system 106 allows for more flexible implementation on computing devices with relatively limited screen space, such as smart phones or tablet devices.

Figure 8D:
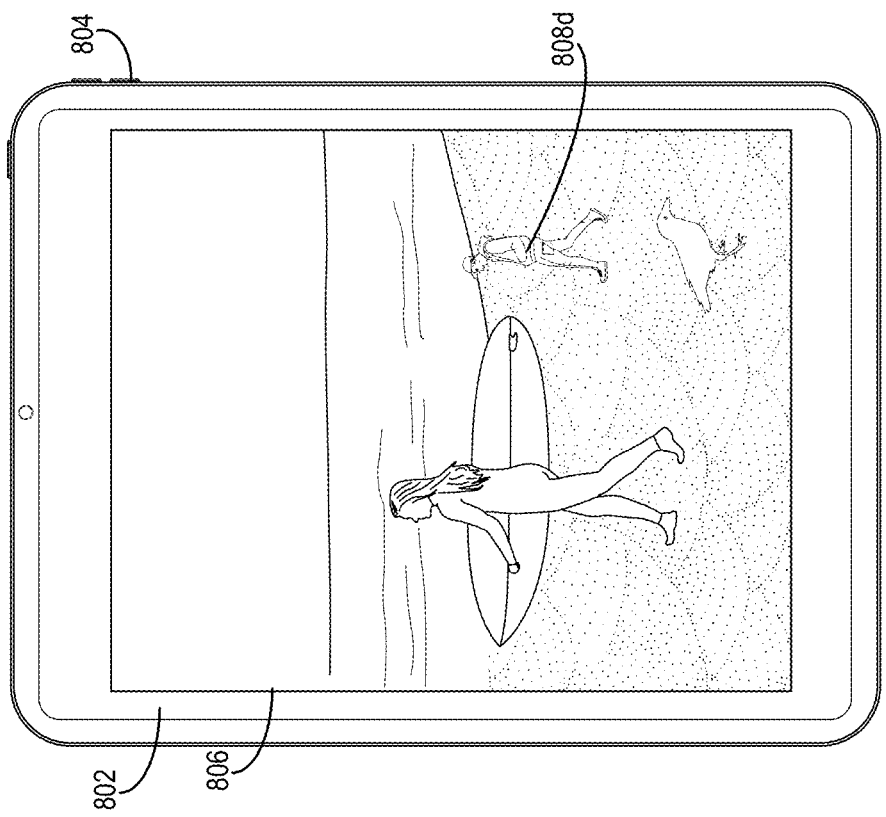
Figure 8C:
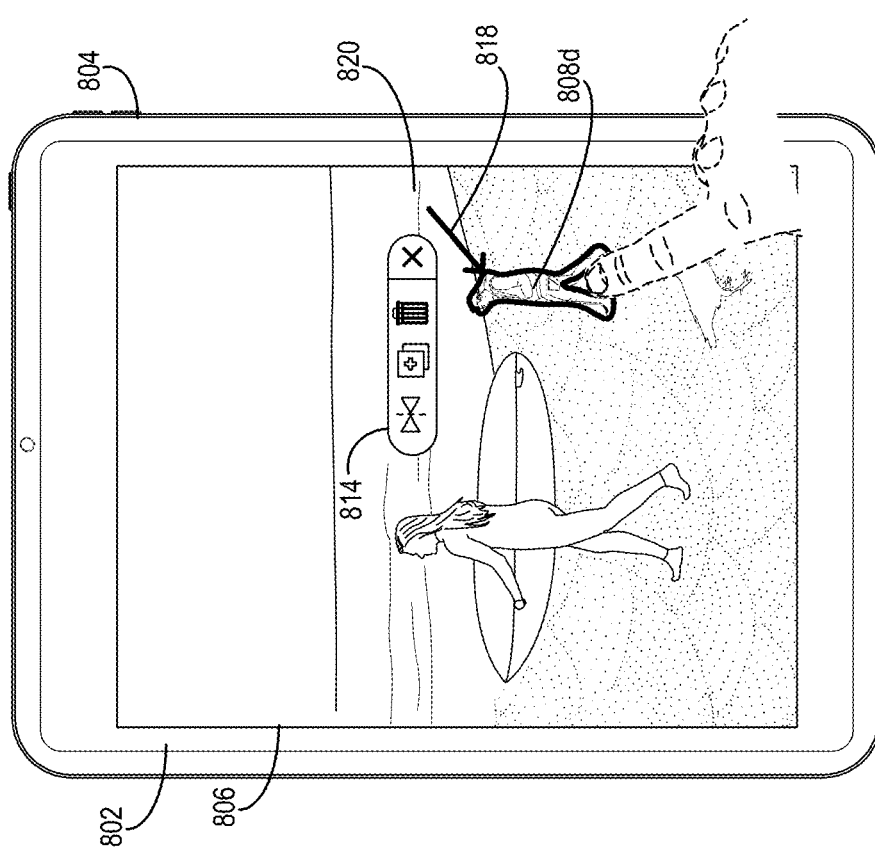

As shown in FIG. 8C, the scene-based image editing system 106 detects, via the graphical user interface 802, an additional user interaction for moving the object 808*d* across the digital image 806 (as shown via the arrow 818). In particular, the scene-based image editing system 106 detects the additional user interaction for moving the object 808*d* from a first position in the digital image 806 to a second position. For instance, in some cases, the scene-based image editing system 106 detects the second user interaction via a dragging motion (e.g., the user input selects the object 808*d* and moves across the graphical user interface 802 while holding onto the object 808*d*). In some implementations, after the initial selection of the object 808*d*, the scene-based image editing system 106 detects the additional user interaction as a click or tap on the second position and determines to use the second position as a new position for the object 808*d*. It should be noted that the scene-based image editing system 106 moves the object 808*d* as a whole in response to the additional user interaction.

As indicated in FIG. 8C, upon moving the object 808*d* from the first position to the second position, the scene-based image editing system 106 exposes the content fill 820 that was placed behind the object 808*d* (e.g., behind the corresponding object mask). Indeed, as previously discussed, the scene-based image editing system 106 places pre-generated content fills behind the objects (or corresponding object masks) for which the content fills were generated. Accordingly, upon removing the object 808*d* from its initial position within the digital image 806, the scene-based image editing system 106 automatically reveals the corresponding content fill. Thus, the scene-based image editing system 106 provides a seamless experience where an object is movable without exposing any holes in the digital image itself. In other words, the scene-based image editing system 106 provides the digital image 806 for display as if it were a real scene in which the entire background is already known.

Additionally, as the scene-based image editing system 106 generated the content fill 820 for the object 808*d* prior to receiving the user input to move the object 808*d*, the scene-based image editing system 106 exposes or surfaces the content fill 820 without latency or delay associated with conventional systems. In other words, the scene-based image editing system 106 exposes the content fill 820 incrementally as the object 808*d* is moved across the digital image 806 without any delay associated with generating content.

As further shown in FIG. 8D, the scene-based image editing system 106 deselects the object 808*d* upon completion of the move operation. In some embodiments, the object 808*d* maintains the selection of the object 808*d* until receiving a further user interaction to indicate deselection of the object 808*d* (e.g., a user interaction with another portion of the digital image 806). As further indicated, upon deselecting the object 808*d*, the scene-based image editing system 106 further removes the option menu 814 that was previously presented. Thus, the scene-based image editing system 106 dynamically presents options for interacting with objects for display via the graphical user interface 802 to maintain a minimalistic style that does not overwhelm the displays of computing devices with limited screen space.

Figure 9C:
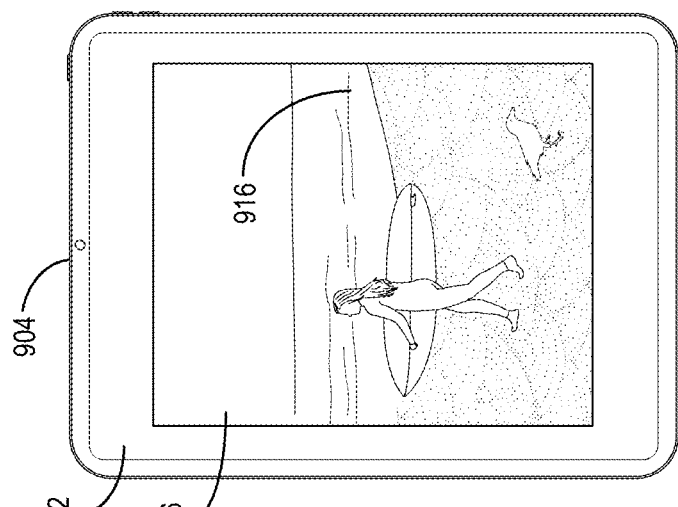
FIGS. 9A-9C illustrate a graphical user interface implemented by the scene-based image editing system to facilitate a delete operation in accordance with one or more embodiments.
Figure 9B:
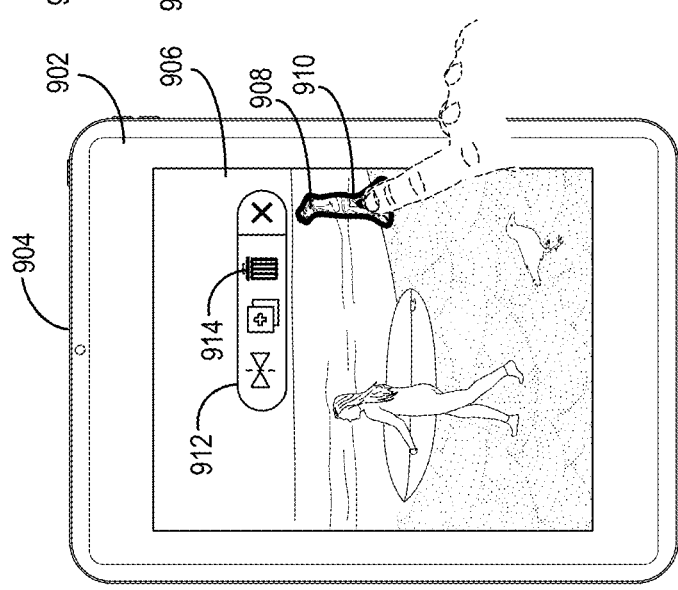
Figure 9A:
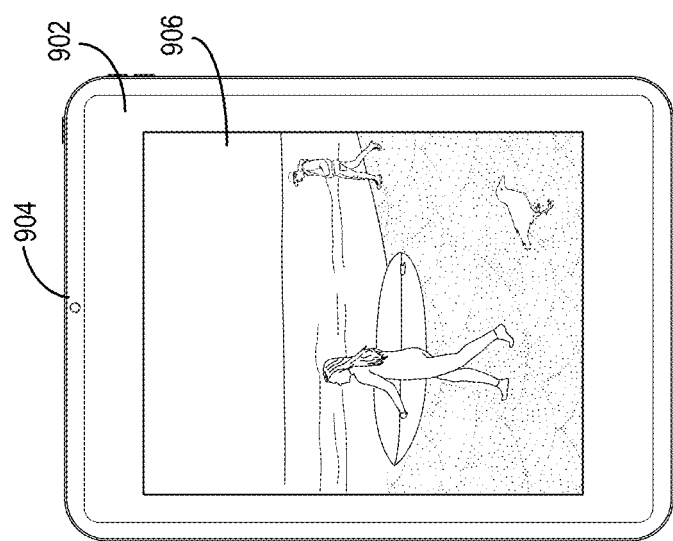

FIGS. 9A-9C illustrate a graphical user interface implemented by the scene-based image editing system 106 to facilitate a delete operation in accordance with one or more embodiments. Indeed, as shown in FIG. 9A, the scene-based image editing system 106 provides a graphical user interface 902 for display on a client device 904 and provides a digital image 906 for display in the graphical user interface 902.

As further shown in FIG. 9B, the scene-based image editing system 106 detects, via the graphical user interface 902, a user interaction with an object 908 portrayed in the digital image 906. In response to detecting the user interaction, the scene-based image editing system 106 surfaces the corresponding object mask, providing the visual indication 910 (or the object mask itself) for display in association with the object 908, and provides the option menu 912 for display. In particular, as shown, the option menu 912 includes an option 914 for deleting the object 908 that has been selected.

Additionally, as shown in FIG. 9C, the scene-based image editing system 106 removes the object 908 from the digital image 906. For instance, in some cases, the scene-based image editing system 106 detects an additional user interaction via the graphical user interface 902 (e.g., an interaction with the option 914 for deleting the object 908) and removes the object 908 from the digital image 906 in response. As further shown, upon removing the object 908 from the digital image 906, the scene-based image editing system 106 automatically exposes the content fill 916 that was previously placed behind the object 908 (e.g., behind the corresponding object mask). Thus, in one or more embodiments, the scene-based image editing system 106 provides the content fill 916 for immediate display upon removal of the object 908.

While FIGS. 8B, 8C, and 9B illustrate the scene-based image editing system 106 providing a menu, in or more implementations, the scene-based image editing system 106 allows for object-based editing without requiring or utilizing a menu. For example, the scene-based image editing system 106 selects an object 808d, 908 and surfaces a visual indication 812, 910 in response to a first user interaction (e.g., a tap on the respective object). The scene-based image editing system 106 performs an object-based editing of the digital image in response to second user interaction without the use of a menu. For example, in response to a second user input dragging the object across the image, the scene-based image editing system 106 moves the object. Alternatively, in response to a second user input (e.g., a second tap), the scene-based image editing system 106 deletes the object.

The scene-based image editing system 106 provides more flexibility for editing digital images when compared to conventional systems. In particular, the scene-based image editing system 106 facilitates object-aware modifications that enable interactions with objects rather than requiring targeting the underlying pixels. Indeed, based on a selection of some pixels that contribute to the portrayal of an object, the scene-based image editing system 106 flexibly determines that the whole object has been selected. This is in contrast to conventional systems that require a user to select an option from a menu indicating an intention to selection an object, provide a second user input indicating the object to select (e.g., a bounding box about the object or drawing of another rough boundary about the object), and another user input to generate the object mask. The scene-based image editing system 106 instead provides for selection of an object with a single user input (a tap on the object).

Further, upon user interactions for implementing a modification after the prior selection, the scene-based image editing system 106 applies the modification to the entire object rather than the particular set of pixels that were selected. Thus, the scene-based image editing system 106 manages objects within digital images as objects of a real scene that are interactive and can be handled as cohesive units. Further, as discussed, the scene-based image editing system 106 offers improved flexibility with respect to deployment on smaller devices by flexibly and dynamically managing the amount of content that is displayed on a graphical user interface in addition to a digital image.

Additionally, the scene-based image editing system 106 offers improved efficiency when compared to many conventional systems. Indeed, as previously discussed, conventional systems typically require execution of a workflow consisting of a sequence of user interactions to perform a modification. Where a modification is meant to target a particular object, many of these systems require several user interactions just to indicate that the object is the subject of the subsequent modification (e.g., user interactions for identifying the object and separating the object from the rest of the image) as well as user interactions for closing the loop on executed modifications (e.g., filling in the holes remaining after removing objects). The scene-based image editing system 106, however, reduces the user interactions typically required for a modification by pre-processing a digital image before receiving user input for such a modification. Indeed, by generating object masks and content fills automatically, the scene-based image editing system 106 eliminates the need for user interactions to perform these steps.

In one or more embodiments, the scene-based image editing system 106 performs further processing of a digital image in anticipation of modifying the digital image. For instance, as previously mentioned, the scene-based image editing system 106 generates a semantic scene graph from a digital image in some implementations. Thus, in some cases, upon receiving one or more user interactions for modifying the digital image, the scene-based image editing system 106 utilizes the semantic scene graph to execute the modifications. Indeed, in many instances, the scene-based image editing system 106 generates a semantic scene graph for use in modifying a digital image before receiving user input for such modifications. FIGS. 10-15 illustrate diagrams for generating a semantic scene graph for a digital image in accordance with one or more embodiments.

Indeed, many conventional systems are inflexible in that they typically wait upon user interactions before determining characteristics of a digital image. For instance, such conventional systems often wait upon a user interaction that indicates a characteristic to be determined and then performs the corresponding analysis in response to receiving the user interaction. Accordingly, these systems fail to have useful characteristics readily available for use. For example, upon receiving a user interaction for modifying a digital image, conventional systems typically must perform an analysis of the digital image to determine characteristics to change after the user interaction has been received.

Further, as previously discussed, such operation results in inefficient operation as image edits often require workflows of user interactions, many of which are used in determining characteristics to be used in execution of the modification. Thus, conventional systems often require a significant number of user interactions to determine the characteristics needed for an edit.

The scene-based image editing system 106 provides advantages by generating a semantic scene graph for a digital image in anticipation of modifications to the digital image. Indeed, by generating the semantic scene graph, the scene-based image editing system 106 improves flexibility over conventional systems as it makes characteristics of a digital image readily available for use in the image editing process. Further, the scene-based image editing system 106 provides improved efficiency by reducing the user interactions required in determining these characteristics. In other words, the scene-based image editing system 106 eliminates the user interactions often required under conventional systems for the preparatory steps of editing a digital image. Thus, the scene-based image editing system 106 enables user interactions to focus on the image edits more directly themselves.

Additionally, by generating a semantic scene graph for a digital image, the scene-based image editing system 106 intelligently generates/obtains information the allows an image to be edited like a real-world scene. For example, the scene-based image editing system 106 generates a scene graph that indicates objects, object attributes, object relationships, etc. that allows the scene-based image editing system 106 to enable object/scene-based image editing.

In one or more embodiments, a semantic scene graph includes a graph representation of a digital image. In particular, in some embodiments, a semantic scene graph includes a graph that maps out characteristics of a digital image and their associated characteristic attributes. For instance, in some implementations, a semantic scene graph includes a node graph having nodes that represent characteristics of the digital image and values associated with the node representing characteristic attributes of those characteristics. Further, in some cases, the edges between the nodes represent the relationships between the characteristics.

Figure 10:
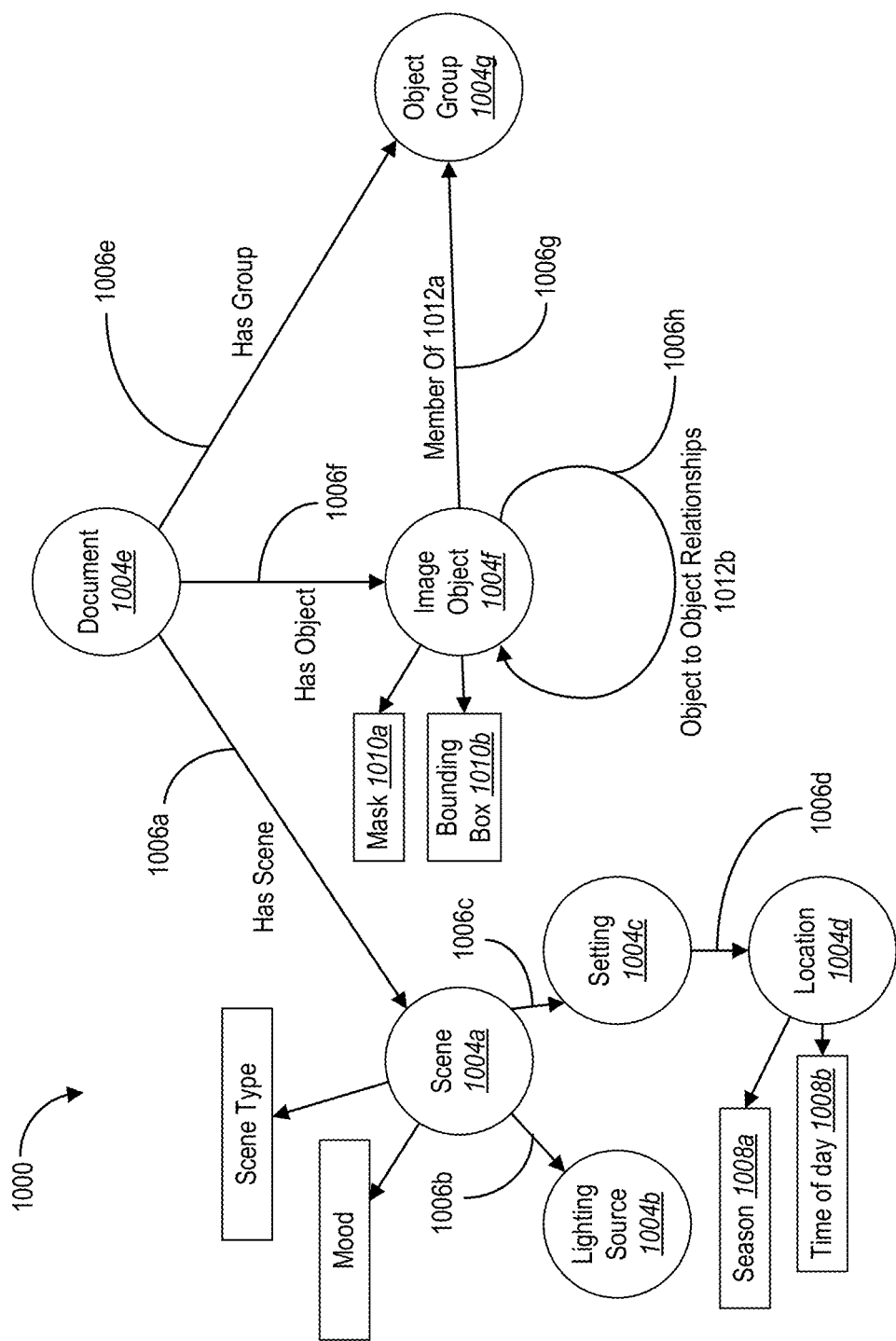
FIG. 10 illustrates an image analysis graph utilized by the scene-based image editing system in generating a semantic scene graph in accordance with one or more embodiments.

As mentioned, in one or more implementations, the scene-based image editing system 106 utilizes one or more predetermined or pre-generated template graphs in generating a semantic scene graph for a digital image. For instance, in some cases, the scene-based image editing system 106 utilizes an image analysis graph in generating a semantic scene graph. FIG. 10 illustrates an image analysis graph 1000 utilized by the scene-based image editing system 106 in generating a semantic scene graph in accordance with one or more embodiments.

In one or more embodiments, an image analysis graph includes a template graph for structing a semantic scene graph. In particular, in some embodiments, an image analysis graph includes a template graph used by the scene-based image editing system 106 to organize the information included in a semantic scene graph. For instance, in some implementations, an image analysis graph includes a template graph that indicates how to organize the nodes of the semantic scene graph representing characteristics of a digital image. In some instances, an image analysis graph additionally or alternatively indicates the information to be represented within a semantic scene graph. For instance, in some cases, an image analysis graph indicates the characteristics, relationships, and characteristic attributes of a digital image to be represented within a semantic scene graph.

Indeed, as shown in FIG. 10, the image analysis graph 1000 includes a plurality of nodes 1004a-1004g. In particular, the plurality of nodes 1004a-1004g correspond to characteristics of a digital image. For instance, in some cases, the plurality of nodes 1004a-1004g represent characteristic categories that are to be determined when analyzing a digital image. Indeed, as illustrated, the image analysis graph 1000 indicates that a semantic scene graph is to represent the objects and object groups within a digital image as well as the scene of a digital image, including the lighting source, the setting, and the particular location.

As further shown in FIG. 10, the image analysis graph 1000 includes an organization of the plurality of nodes 1004a-1004g. In particular, the image analysis graph 1000 includes edges 1006a-1006h arranged in a manner that organizes the plurality of nodes 1004a-1004g. In other words, the image analysis graph 1000 illustrates the relationships among the characteristic categories included therein. For instance, the image analysis graph 1000 indicates that the object category represented by the node 1004f and the object group category represented by the node 1004g are closely related, both describing objects that portrayed in a digital image.

Additionally, as shown in FIG. 10, the image analysis graph 1000 associates characteristic attributes with one or more of the nodes 1004a-1004g to represent characteristic attributes of the corresponding characteristic categories. For instance, as shown, the image analysis graph 1000 associates a season attribute 1008a and a time-of-day attribute 1008b with the setting category represented by the node 1004c. In other words, the image analysis graph 1000 indicates that the season and time of day should be determined when determining a setting of a digital image. Further, as shown, the image analysis graph 1000 associates an object mask 1010a and a bounding box 1010b with the object category represented by the node 1004f. Indeed, in some implementations, the scene-based image editing system 106 generates content for objects portrayed in a digital image, such as an object mask and a bounding box. Accordingly, the image analysis graph 1000 indicates that this pre-generated content is to be associated with the node representing the corresponding object within a semantic scene graph generated for the digital image.

As further shown in FIG. 10, the image analysis graph 1000 associates characteristic attributes with one or more of the edges 1006a-1006h to represent characteristic attributes of the corresponding characteristic relationships represented by these edges 1006a-1006h. For instance, as shown, the image analysis graph 1000 associates a characteristic attribute 1012a with the edge 1006g indicating that an object portrayed in a digital image will be a member of a particular object group. Further, the image analysis graph 1000 associates a characteristic attribute 1012b with the edge 1006h indicating that at least some objects portrayed in a digital image have relationships with one another. FIG. 10 illustrates a sample of relationships that are identified between objects in various embodiments, and additional detail regarding these relationships will be discussed in further detail below.

It should be noted that the characteristic categories and characteristic attributes represented in FIG. 10 are exemplary and the image analysis graph 1000 includes a variety of characteristic categories and/or characteristic attributes not shown in various embodiments. Further, FIG. 10 illustrates a particular organization of the image analysis graph 1000, though alternative arrangements are used in different embodiments. Indeed, in various embodiments, the scene-based image editing system 106 accommodates a variety of characteristic categories and characteristic attributes to facilitate subsequent generation of a semantic scene graph that supports a variety of image edits. In other words, the scene-based image editing system 106 includes those characteristic categories and characteristic attributes that it determines are useful in editing a digital image.

Figure 11:
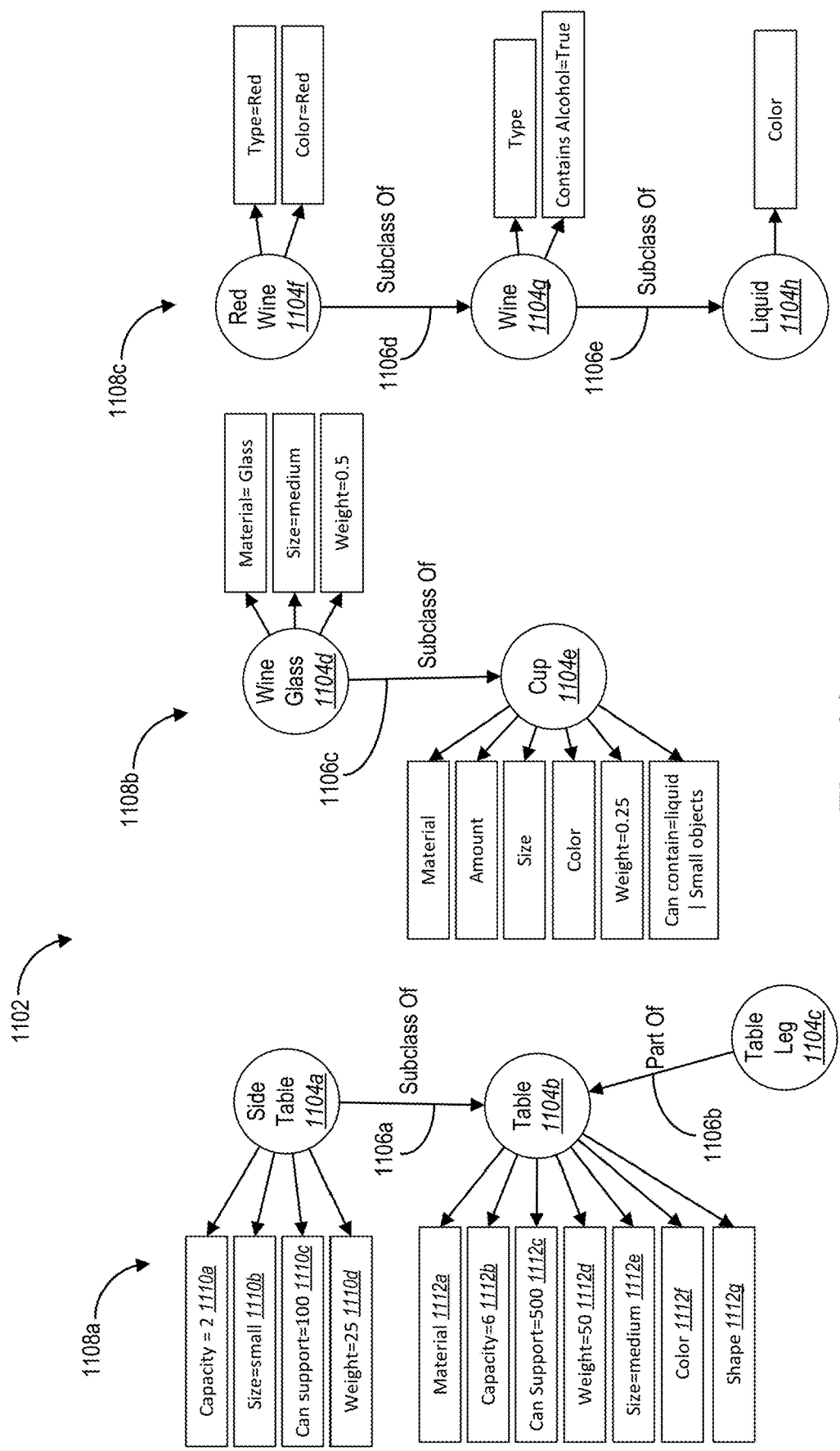
FIG. 11 illustrates a real-world class description graph utilized by the scene-based image editing system in generating a semantic scene graph in accordance with one or more embodiments.

In some embodiments, the scene-based image editing system 106 utilizes a real-world class description graph in generating a semantic scene graph for a digital image. FIG. 11 illustrates a real-world class description graph 1102 utilized by the scene-based image editing system 106 in generating a semantic scene graph in accordance with one or more embodiments.

In one or more embodiments, a real-world class description graph includes a template graph that describes scene components (e.g., semantic areas) that may be portrayed in a digital image. In particular, in some embodiments, a real-world class description graph includes a template graph used by the scene-based image editing system 106 to provide contextual information to a semantic scene graph regarding scene components-such as objects-potentially portrayed in a digital image. For instance, in some implementations, a real-world class description graph provides a hierarchy of object classifications and/or an anatomy (e.g., object components) of certain objects that may be portrayed in a digital image. In some instances, a real-world class description graph further includes object attributes associated with the objects represented therein. For instance, in some cases, a real-world class description graph provides object attributes assigned to a given object, such as shape, color, material from which the object is made, weight of the object, weight the object can support, and/or various other attributes determined to be useful in subsequently modifying a digital image. Indeed, as will be discussed, in some cases, the scene-based image editing system 106 utilizes a semantic scene graph for a digital image to suggest certain edits or suggest avoiding certain edits to maintain consistency of the digital image with respect to the contextual information contained in the real-world class description graph from which the semantic scene graph was built.

As shown in FIG. 11, the real-world class description graph 1102 includes a plurality of nodes 1104a-1104h and a plurality of edges 1106a-1106e that connect some of the nodes 1104a-1104h. In particular, in contrast to the image analysis graph 1000 of FIG. 10, the real-world class description graph 1102 does not provide a single network of interconnected nodes. Rather, in some implementations, the real-world class description graph 1102 includes a plurality of node clusters 1108a-1108c that are separate and distinct from one another.

In one or more embodiments, each node cluster corresponds to a separate scene component (e.g., semantic area) class that may be portrayed in a digital image. Indeed, as shown in FIG. 11, each of the node clusters 1108a-1108c corresponds to a separate object class that may be portrayed in a digital image. As indicated above, the real-world class description graph 1102 is not limited to representing object classes and can represent other scene component classes in various embodiments.

As shown in FIG. 11, each of the node clusters 1108a-1108c portrays a hierarchy of class descriptions (otherwise referred to as a hierarchy of object classifications) corresponding to a represented object class. In other words, each of the node clusters 1108a-1108c portrays degrees of specificity/generality with which an object is described or labeled. Indeed, in some embodiments, the scene-based image editing system 106 applies all class descriptions/labels represented in a node cluster to describe a corresponding object portrayed in a digital image. In some implementations, however, the scene-based image editing system 106 utilizes a subset of the class descriptions/labels to describe an object.

As an example, the node cluster 1108a includes a node 1104a representing a side table class and a node 1104b representing a table class. Further, as shown in FIG. 11, the node cluster 1108a includes an edge 1106a between the node 1104a and the node 1104b to indicate that the side table class is a subclass of the table class, thus indicating a hierarchy between these two classifications that are applicable to a side table. In other words, the node cluster 1108a indicates that a side table is classifiable either as a side table and/or more generally as a table. In other words, in one or more embodiments, upon detecting a side table portrayed in a digital image, the scene-based image editing system 106 labels the side table as a side table and/or as a table based on the hierarchy represented in the real-world class description graph 1102.

The degree to which a node cluster represents a hierarchy of class descriptions varies in various embodiments. In other words, the length/height of the represented hierarchy varies in various embodiments. For instance, in some implementations, the node cluster 1108a further includes a node representing a furniture class, indicating that a side table is classifiable as a piece of furniture. In some cases, the node cluster 1108a also includes a node representing an inanimate object lass, indicating that a side table is classifiable as such. Further, in some implementations, the node cluster 1108a includes a node representing an entity class, indicating that a side table is classifiable as an entity. Indeed, in some implementations, the hierarchies of class descriptions represented within the real-world class description graph 1102 include a class description/label-such as an entity class—at such a high level of generality that it is commonly applicable to all objects represented within the real-world class description graph 1102.

As further shown in FIG. 11, the node cluster 1108a includes an anatomy (e.g., object components) of the represented object class. In particular, the node cluster 1108a includes a representation of component parts for the table class of objects. For instance, as shown, the node cluster 1108a includes a node 1104c representing a table leg class. Further, the node cluster 1108a includes an edge 1106b indicating that a table leg from the table leg class is part of a table from the table class. In other words, the edge 1106b indicates that a table leg is a component of a table. In some cases, the node cluster 1108a includes additional nodes for representing other components that are part of a table, such as a tabletop, a leaf, or an apron.

As shown in FIG. 11, the node 1104c representing the table leg class of objects is connected to the node 1104b representing the table class of objects rather than the node 1104a representing the side table class of objects. Indeed, in some implementations, the scene-based image editing system 106 utilizes such a configuration based on determining that all tables include one or more table legs. Thus, as side tables are a subclass of tables, the configuration of the node cluster 1108a indicates that all side tables also include one or more table legs. In some implementations, however, the scene-based image editing system 106 additionally or alternatively connects the node 1104c representing the table leg class of objects to the node 1104a representing the side table class of objects to specify that all side tables include one or more table legs.

Similarly, the node cluster 1108a includes object attributes 1110a-1110d associated with the node 1104a for the side table class and an additional object attributes 1112a-1112g associated with the node 1104b for the table class. Thus, the node cluster 1108a indicates that the object attributes 1110a-1110d are specific to the side table class while the additional object attributes 1112a-1112g are more generally associated with the table class (e.g., associated with all object classes that fall within the table class). In one or more embodiments, the object attributes 1110a-1110d and/or the additional object attributes 1112a-1112g are attributes that have been arbitrarily assigned to their respective object class (e.g., via user input or system defaults). For instance, in some cases, the scene-based image editing system 106 determines that all side tables can support one hundred pounds as suggested by FIG. 11 regardless of the materials used or the quality of the build. In some instances, however, the object attributes 1110a-1110d and/or the additional object attributes 1112a-1112g represent object attributes that are common among all objects that fall within a particular class, such as the relatively small size of side tables. In some implementations, however, the object attributes 1110a-1110d and/or the additional object attributes 1112a-1112g are indicators of object attributes that should be determined for an object of the corresponding object class. For instance, in one or more embodiments, upon identifying a side table, the scene-based image editing system 106 determines at least one of the capacity, size, weight, or supporting weight of the side table.

It should be noted that there is some overlap between object attributes included in a real-world class description graph and characteristic attributes included in an image analysis graph in some embodiments. Indeed, in many implementations, object attributes are characteristic attributes that are specific towards objects (rather than attributes for the setting or scene of a digital image). Further, it should be noted that the object attributes are merely exemplary and do not necessarily reflect the object attributes that are to be associated with an object class. Indeed, in some embodiments, the object attributes that are shown and their association with particular object classes are configurable to accommodate different needs in editing a digital image.

In some cases, a node cluster corresponds to one particular class of objects and presents a hierarchy of class descriptions and/or object components for that one particular class. For instance, in some implementations, the node cluster 1108a only corresponds to the side table class and presents a hierarchy of class descriptions and/or object components that are relevant to side tables. Thus, in some cases, upon identifying a side table within a digital image, the scene-based image editing system 106 refers to the node cluster 1108a for the side table class when generating a semantic scene graph but refers to a separate node cluster upon identifying another subclass of table within the digital image. In some cases, this separate node cluster includes several similarities (e.g., similar nodes and edges) with the node cluster 1108a as the other type of table would be included in a subclass of the table class and include one or more table legs.

In some implementations, however, a node cluster corresponds to a plurality of different but related object classes and presents a common hierarchy of class descriptions and/or object components for those object classes. For instance, in some embodiments, the node cluster 1108a includes an additional node representing a dining table class that is connected to the node 1104b representing the table class via an edge indicating that dining tables are also a subclass of tables. Indeed, in some cases, the node cluster 1108a includes nodes representing various subclasses of a table class. Thus, in some instances, upon identifying a table from a digital image, the scene-based image editing system 106 refers to the node cluster 1108a when generating a semantic scene graph for the digital image regardless of the subclass to which the table belongs.

As will be described, in some implementations, utilizing a common node cluster for multiple related subclasses facilitates object interactivity within a digital image. For instance, as noted, FIG. 11 illustrates multiple separate node clusters. As further mentioned however, the scene-based image editing system 106 includes a classification (e.g., an entity classification) that is common among all represented objects within the real-world class description graph 1102 in some instances. Accordingly, in some implementations, the real-world class description graph 1102 does include a single network of interconnected nodes where all node clusters corresponding to separate object classes connect at a common node, such as a node representing an entity class. Thus, in some embodiments, the real-world class description graph 1102 illustrates the relationships among all represented objects.

Figure 12:
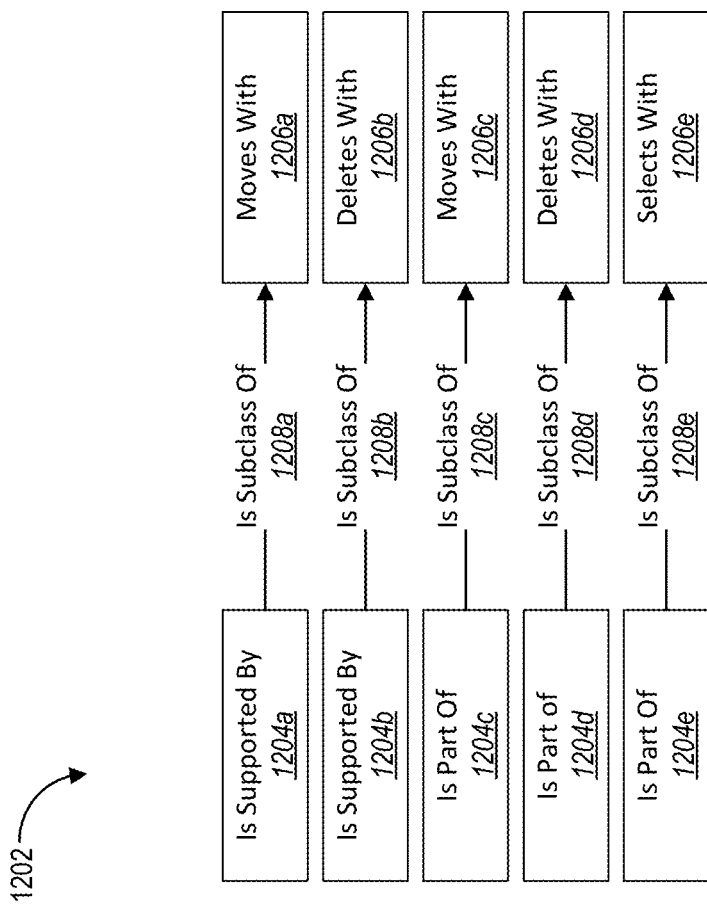
FIG. 12 illustrates a behavioral policy graph utilized by the scene-based image editing system in generating a semantic scene graph in accordance with one or more embodiments.

In one or more embodiments, the scene-based image editing system 106 utilizes a behavioral policy graph in generating a semantic scene graph for a digital image. FIG. 12 illustrates a behavioral policy graph 1202 utilized by the scene-based image editing system 106 in generating a semantic scene graph in accordance with one or more embodiments.

In one or more embodiments, a behavioral policy graph includes a template graph that describes the behavior of an object portrayed in a digital image based on the context in which the object is portrayed. In particular, in some embodiments, a behavioral policy graph includes a template graph that assigns behaviors to objects portrayed in a digital image based on a semantic understanding of the objects and/or their relationships to other objects portrayed in the digital image. Indeed, in one or more embodiments, a behavioral policy includes various relationships among various types of objects and designates behaviors for those relationships. In some cases, the scene-based image editing system 106 includes a behavioral policy graph as part of a semantic scene graph. In some implementations, as will be discussed further below, a behavioral policy is separate from the semantic scene graph but provides plug-in behaviors based on the semantic understanding and relationships of objects represented in the semantic scene graph.

As shown in FIG. 12, the behavioral policy graph 1202 includes a plurality of relationship indicators 1204a-1204e and a plurality of behavior indicators 1206a-1206e that are associated with the relationship indicators 1204a-1204e. In one or more embodiments, the relationship indicators 1204a-1204e reference a relationship subject (e.g., an object in the digital image that is the subject of the relationship) and a relationship object (e.g., an object in the digital image that is the object of the relationship). For example, the relationship indicators 1204a-1204e of FIG. 12 indicate that the relationship subject "is supported by" or "is part of" the relationship object. Further, in one or more embodiments the behavior indicators 1206a-1206e assign a behavior to the relationship subject (e.g., indicating that the relationship subject "moves with" or "deletes with" the relationship object). In other words, the behavior indicators 1206a-1206e provide modification instructions for the relationship subject when the relationship object is modified.

FIG. 12 provides a small subset of the relationships recognized by the scene-based image editing system 106 in various embodiments. For instance, in some implementations, the relationships recognized by the scene-based image editing system 106 and incorporated into generated semantic scene graphs include, but are not limited to, relationships described as "above," "below," "behind," "in front of," "touching," "held by," "is holding," "supporting," "standing on," "worn by," "wearing," "leaning on," "looked at by," or "looking at." Indeed, as suggested by the foregoing, the scene-based image editing system 106 utilizes relationship pairs to describe the relationship between objects in both directions in some implementations. For instance, in some cases, where describing that a first object "is supported by" a second object, the scene-based image editing system 106 further describes that the second object "is supporting" the first object. Thus, in some cases, the behavioral policy graph 1202 includes these relationship pairs, and the scene-based image editing system 106 includes the information in the semantic scene graphs accordingly.

As further shown, the behavioral policy graph 1202 further includes a plurality of classification indicators 1208a-1208e associated with the relationship indicators 1204a-1204e. In one or more embodiments, the classification indicators 1208a-1208e indicate an object class to which the assigned behavior applies. Indeed, in one or more embodiments, the classification indicators 1208a-1208e reference the object class of the corresponding relationship object. As shown by FIG. 12, the classification indicators 1208a-1208e indicate that a behavior is assigned to object classes that are a subclass of the designated object class. In other words, FIG. 12 shows that the classification indicators 1208a-1208e reference a particular object class and indicate that the assigned behavior applies to all objects that fall within that object class (e.g., object classes that are part of a subclass that falls under that object class).

The level of generality or specificity of a designated object class referenced by a classification indicator within its corresponding hierarchy of object classification varies in various embodiments. For instance, in some embodiments, a classification indicator references a lowest classification level (e.g., the most specific classification applicable) so that there are no subclasses, and the corresponding behavior applies only to those objects having that particular object lowest classification level. On the other hand, in some implementations, a classification indicator references a highest classification level (e.g., the most generic classification applicable) or some other level above the lowest classification level so that the corresponding behavior applies to objects associated with one or more of the multiple classification levels that exist within that designated classification level.

To provide an illustration of how the behavioral policy graph 1202 indicates assigned behavior, the relationship indicator 1204a indicates a "is supported by" relationship between an object (e.g., the relationship subject) and another object (e.g., the relationship object). The behavior indicator 1206a indicates a "moves with" behavior that is associated with the "is supported by" relationship, and the classification indicator 1208a indicates that this particular behavior applies to objects within some designated object class. Accordingly, in one or more embodiments, the behavioral policy graph 1202 shows that an object that falls within the designated object class and has a "is supported by" relationship with another object will exhibit the "moves with" behavior. In other words, if a first object of the designated object class is portrayed in a digital image being supported by a second object, and the digital image is modified to move that second object, then the scene-based image editing system 106 will automatically move the first object with the second object as part of the modification in accordance with the behavioral policy graph 1202. In some cases, rather than moving the first object automatically, the scene-based image editing system 106 provides a suggestion to move the first object for display within the graphical user interface in use to modify the digital image.

As shown by FIG. 12, some of the relationship indicators (e.g., the relationship indicators 1204a-1204b or the relationship indicators 1204c-1204e) refer to the same relationship but are associated with different behaviors. Indeed, in some implementations, the behavioral policy graph 1202 assigns multiple behaviors to the same relationship. In some instances, the difference is due to the difference in the designated subclass. In particular, in some embodiments, the scene-based image editing system 106 assigns an object of one object class a particular behavior for a particular relationship but assigns an object of another object class a different behavior for the same relationship. Thus, in configuring the behavioral policy graph 1202, the scene-based image editing system 106 manages different object classes differently in various embodiments.

Figure 13:
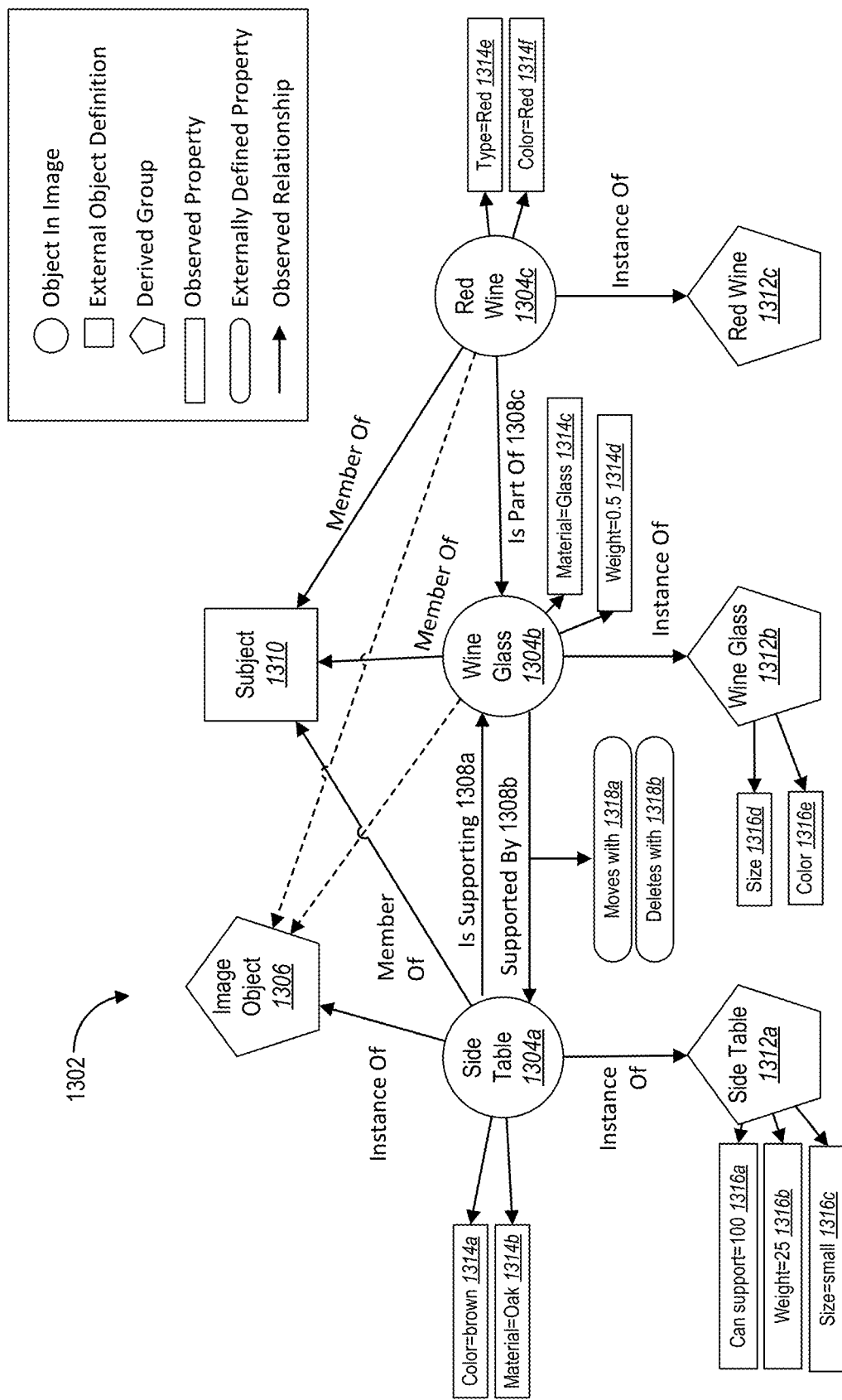
FIG. 13 illustrates a semantic scene graph generated by the scene-based image editing system for a digital image in accordance with one or more embodiments.

FIG. 13 illustrates a semantic scene graph 1302 generated by the scene-based image editing system 106 for a digital image in accordance with one or more embodiments. In particular, the semantic scene graph 1302 shown in FIG. 13 is a simplified example of a semantic scene graph and does not portray all the information included in a semantic scene graph generated by the scene-based image editing system 106 in various embodiments.

As shown in FIG. 13, the semantic scene graph 1302 is organized in accordance with the image analysis graph 1000 described above with reference to FIG. 10. In particular, the semantic scene graph 1302 includes a single network of interconnected nodes that reference characteristics of a digital image. For instance, the semantic scene graph 1302 includes nodes 1304a-1304c representing portrayed objects as indicated by their connection to the node 1306. Further, the semantic scene graph 1302 includes relationship indicators 1308a-1308c representing the relationships between the objects corresponding to the nodes 1304a-1304c. As further shown, the semantic scene graph 1302 includes a node 1310 representing a commonality among the objects (e.g., in that the objects are all included in the digital image, or the objects indicate a subject or topic of the digital image). Additionally, as shown, the semantic scene graph 1302 includes the characteristic attributes 1314a-1314f of the objects corresponding to the nodes 1304a-1304c.

As further shown in FIG. 13, the semantic scene graph 1302 includes contextual information from the real-world class description graph 1102 described above with reference to FIG. 11. In particular, the semantic scene graph 1302 includes nodes 1312a-1312c that indicate the object class to which the objects corresponding to the nodes 1304a-1304c belong. Though not shown in FIG. 11, the semantic scene graph 1302 further includes the full hierarchy of object classifications for each of the object classes represented by the nodes 1312a-1312c. In some cases, however, the nodes 1312a-1312c each include a pointer that points to their respective hierarchy of object classifications within the real-world class description graph 1102. Additionally, as shown in FIG. 13, the semantic scene graph 1302 includes object attributes 1316a-1316e of the object classes represented therein.

Additionally, as shown in FIG. 13, the semantic scene graph 1302 includes behaviors from the behavioral policy graph 1202 described above with reference to FIG. 12. In particular, the semantic scene graph 1302 includes behavior indicators 1318a-1318b indicating behaviors of the objects represented therein based on their associated relationships.

Figure 14:
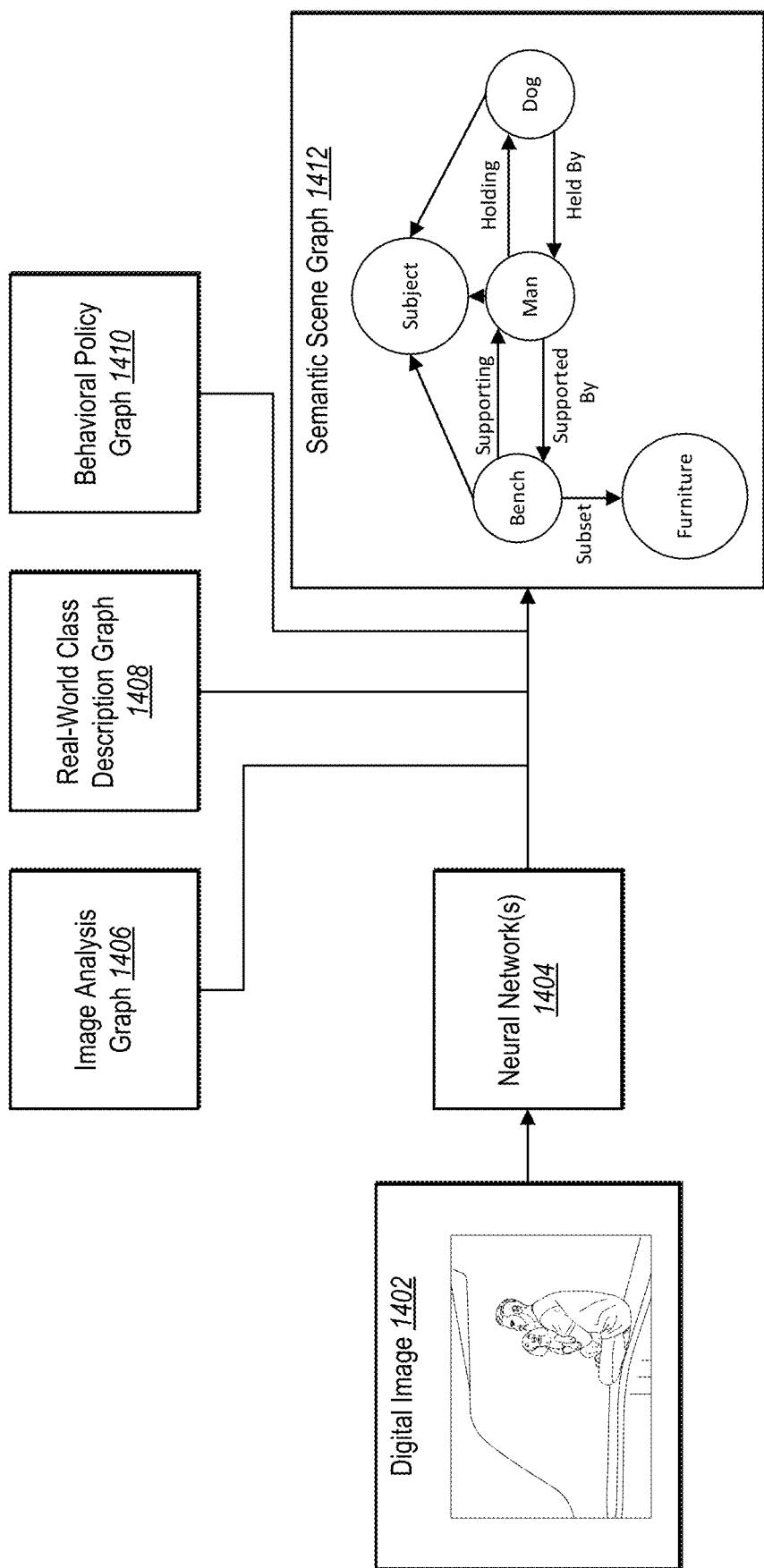
FIG. 14 illustrates a diagram for generating a semantic scene graph for a digital image utilizing template graphs in accordance with one or more embodiments.

FIG. 14 illustrates a diagram for generating a semantic scene graph for a digital image utilizing template graphs in accordance with one or more embodiments. Indeed, as shown in FIG. 14, the scene-based image editing system 106 analyzes a digital image 1402 utilizing one or more neural networks 1404. In particular, in one or more embodiments, the scene-based image editing system 106 utilizes the one or more neural networks 1404 to determine various characteristics of the digital image 1402 and/or their corresponding characteristic attributes. For instance, in some cases, the scene-based image editing system 106 utilizes a segmentation neural network to identify and classify objects portrayed in a digital image (as discussed above with reference to FIG. 3). Further, in some embodiments, the scene-based image editing system 106 utilizes neural networks to determine the relationships between objects and/or their object attributes as will be discussed in more detail below.

In one or more implementations, the scene-based image editing system 106 utilizes a depth estimation neural network to estimate a depth of an object in a digital image and stores the determined depth in the semantic scene graph 1412. For example, the scene-based image editing system 106 utilizes a depth estimation neural network as described in U.S. application Ser. No. 17/186,436, filed Feb. 26, 2021, titled "GENERATING DEPTH IMAGES UTILIZING A MACHINE-LEARNING MODEL BUILT FROM MIXED DIGITAL IMAGE SOURCES AND MULTIPLE LOSS FUNCTION SETS," which is herein incorporated by reference in its entirety. Alternatively, the scene-based image editing system 106 utilizes a depth refinement neural network as described in U.S. application Ser. No. 17/658,873, filed Apr. 12, 2022, titled "UTILIZING MACHINE LEARNING MODELS TO GENERATE REFINED DEPTH MAPS WITH SEGMENTATION MASK GUIDANCE," which is herein incorporated by reference in its entirety. The scene-based image editing system 106 then accesses the depth information (e.g., average depth for an object) for an object from the semantic scene graph 1412 when editing an object to perform a realistic scene edit. For example, when moving an object within an image, the scene-based image editing system 106 then accesses the depth information for objects in the digital image from the semantic scene graph 1412 to ensure that the object being moved is not placed in front an object with less depth.

In one or more implementations, the scene-based image editing system 106 utilizes a depth estimation neural network to estimate lighting parameters for an object or scene in a digital image and stores the determined lighting parameters in the semantic scene graph 1412. For example, the scene-based image editing system 106 utilizes a source-specific-lighting-estimation-neural network as described in U.S. application Ser. No. 16/558,975, filed Sep. 3, 2019, titled "DYNAMICALLY ESTIMATING LIGHT-SOURCE-SPECIFIC PARAMETERS FOR DIGITAL IMAGES USING A NEURAL NETWORK," which is herein incorporated by reference in its entirety. The scene-based image editing system 106 then accesses the lighting parameters for an object or scene from the semantic scene graph 1412 when editing an object to perform a realistic scene edit. For example, when moving an object within an image or inserting a new object in a digital image, the scene-based image editing system 106 accesses the lighting parameters for from the semantic scene graph 1412 to ensure that the object being moved/placed within the digital image has realistic lighting.

In one or more implementations, the scene-based image editing system 106 utilizes a depth estimation neural network to estimate lighting parameters for an object or scene in a digital image and stores the determined lighting parameters in the semantic scene graph 1412. For example, the scene-based image editing system 106 utilizes a source-specific-lighting-estimation-neural network as described in U.S. application Ser. No. 16/558,975, filed Sep. 3, 2019, titled "DYNAMICALLY ESTIMATING LIGHT-SOURCE-SPECIFIC PARAMETERS FOR DIGITAL IMAGES USING A NEURAL NETWORK," which is herein incorporated by reference in its entirety. The scene-based image editing system 106 then accesses the lighting parameters for an object or scene from the semantic scene graph 1412 when editing an object to perform a realistic scene edit. For example, when moving an object within an image or inserting a new object in a digital image, the scene-based image editing system 106 accesses the lighting parameters for from the semantic scene graph 1412 to ensure that the object being moved/placed within the digital image has realistic lighting.

As further shown in FIG. 14, the scene-based image editing system 106 utilizes the output of the one or more neural networks 1404 along with an image analysis graph 1406, a real-world class description graph 1408, and a behavioral policy graph 1410 to generate a semantic scene graph 1412. In particular, the scene-based image editing system 106 generates the semantic scene graph 1412 to include a description of the digital image 1402 in accordance with the structure, characteristic attributes, hierarchies of object classifications, and behaviors provided by the image analysis graph 1406, the real-world class description graph 1408, and the behavioral policy graph 1410.

As previously indicated, in one or more embodiments, the image analysis graph 1406, the real-world class description graph 1408, and/or the behavioral policy graph 1410 are predetermined or pre-generated. In other words, the scene-based image editing system 106 pre-generates, structures, or otherwise determines the content and organization of each graph before implementation. For instance, in some cases, the scene-based image editing system 106 generates the image analysis graph 1406, the real-world class description graph 1408, and/or the behavioral policy graph 1410 based on user input.

Further, in one or more embodiments, the image analysis graph 1406, the real-world class description graph 1408, and/or the behavioral policy graph 1410 are configurable. Indeed, the graphs can be re-configured, re-organized, and/or have data represented therein added or removed based on preferences or the needs of editing a digital image. For instance, in some cases, the behaviors assigned by the behavioral policy graph 1410 work in some image editing contexts but not others. Thus, when editing an image in another image editing context, the scene-based image editing system 106 implements the one or more neural networks 1404 and the image analysis graph 1406 but implements a different behavioral policy graph (e.g., one that was configured to satisfy preferences for that image editing context). Accordingly, in some embodiments, the scene-based image editing system 106 modifies the image analysis graph 1406, the real-world class description graph 1408, and/or the behavioral policy graph 1410 to accommodate different image editing contexts.

For example, in one or more implementations, the scene-based image editing system 106 determines a context for selecting a behavioral policy graph by identifying a type of user. In particular, the scene-based image editing system 106 generates a plurality of behavioral policy graphs for various types of users. For instance, the scene-based image editing system 106 generates a first behavioral policy graph for novice or new users. The first behavioral policy graph, in one or more implementations, includes a greater number of behavior policies than a second behavioral policy graph. In particular, for newer users, the scene-based image editing system 106 utilizes a first behavioral policy graph that provides greater automation of actions and provides less control to the user. On the other hand, the scene-based image editing system 106 utilizes a second behavioral policy graph for advanced users with less behavior policies than the first behavioral policy graph. In this manner, the scene-based image editing system 106 provides the advanced user with greater control over the relationship-based actions (automatic moving/deleting/editing) of objects based on relationships. In other words, by utilizing the second behavioral policy graph for advanced users, the scene-based image editing system 106 performs less automatic editing of related objects.

In one or more implementations the scene-based image editing system 106 determines a context for selecting a behavioral policy graph based on visual content of a digital image (e.g., types of objects portrayed in the digital image), the editing application being utilized, etc. Thus, the scene-based image editing system 106, in one or more implementations, selects/utilizes a behavioral policy graph based on image content, a type of user, an editing application being utilizes, or another context.

Moreover, in some embodiments, the scene-based image editing system 106 utilizes the graphs in analyzing a plurality of digital images. Indeed, in some cases, the image analysis graph 1406, the real-world class description graph 1408, and/or the behavioral policy graph 1410 do not specifically target a particular digital image. Thus, in many cases, these graphs are universal and re-used by the scene-based image editing system 106 for multiple instances of digital image analysis.

In some cases, the scene-based image editing system 106 further implements one or more mappings to map between the outputs of the one or more neural networks 1404 and the data scheme of the image analysis graph 1406, the real-world class description graph 1408, and/or the behavioral policy graph 1410. As one example, the scene-based image editing system 106 utilizes various segmentation neural networks to identify and classify objects in various embodiments. Thus, depending on the segmentation neural network used, the resulting classification of a given object can be different (e.g., different wording or a different level of abstraction). Thus, in some cases, the scene-based image editing system 106 utilizes a mapping that maps the particular outputs of the segmentation neural network to the object classes represented in the real-world class description graph 1408, allowing the real-world class description graph 1408 to be used in conjunction with multiple neural networks.

Figure 15:
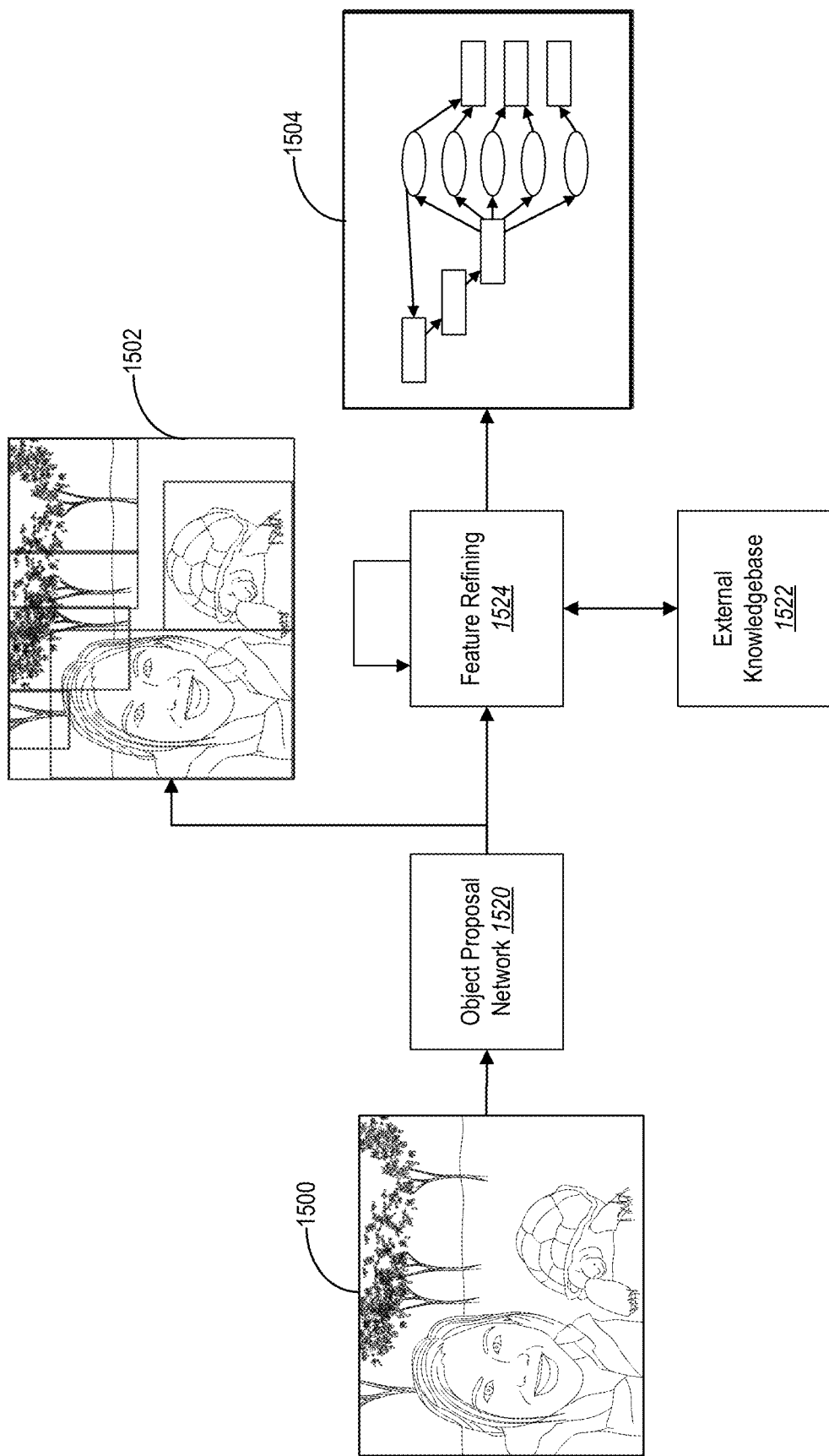
FIG. 15 illustrates another diagram for generating a semantic scene graph for a digital image in accordance with one or more embodiments.

FIG. 15 illustrates another diagram for generating a semantic scene graph for a digital image in accordance with one or more embodiments. In particular, FIG. 15 illustrates an example framework of the scene-based image editing system 106 generating a semantic scene graph in accordance with one or more embodiments.

As shown in FIG. 15, the scene-based image editing system 106 identifies an input image 1500. In some cases, the scene-based image editing system 106 identifies the input image 1500 based on a request. For instances, in some cases, the request includes a request to generate a semantic scene graph for the input image 1500. In one or more implementations the request comprises to analyze the input image comprises the scene-based image editing system 106 accessing, opening, or displaying by the input image 1500.

In one or more embodiments, the scene-based image editing system 106 generates object proposals and subgraph proposals for the input image 1500 in response to the request. For instance, in some embodiments, the scene-based image editing system 106 utilizes an object proposal network 1520 to extract a set of object proposals for the input image 1500. To illustrate, in some cases, the scene-based image editing system 106 extracts a set of object proposals for humans detected within the input image 1500, objects that the human(s) are wearing, objects near the human(s), buildings, plants, animals, background objects or scenery (including the sky or objects in the sky), etc.

In one or more embodiments, the object proposal network 1520 comprises the detection-masking neural network 300 (specifically, the object detection machine learning model 308) discussed above with reference to FIG. 3. In some cases, the object proposal network 1520 includes a neural network such as a region proposal network ("RPN"), which is part of a region-based convolutional neural network, to extract the set of object proposals represented by a plurality of bounding boxes. One example RPN is disclosed in S. Ren, K. He, R. Girshick, and J. Sun, *Faster r-cnn: Towards real-time object detection with region proposal networks*, NIPS, 2015, the entire contents of which are hereby incorporated by reference. As an example, in some cases, the scene-based image editing system 106 uses the RPN to extract object proposals for significant objects (e.g., detectable objects or objects that have a threshold size/visibility) within the input image. The algorithm below represents one embodiment of a set of object proposals:

$$[o_0, \ldots, o_{N-1}] = f_{RPN}(I)$$

where I is the input image, $f_{RPN}(\bullet)$ represents the RPN network, and $o_i$ is the i-th object proposal.

In some implementations, in connection with determining the object proposals, the scene-based image editing system 106 also determines coordinates of each object proposal relative to the dimensions of the input image 1500. Specifically, in some instances, the locations of the object proposals are based on bounding boxes that contain the visible portion(s) of objects within a digital image. To illustrate, for $o_i$, the coordinates of the corresponding bounding box are represented by $r_i = [x_i, y_i, w_i, h_i]$, with $(x_i, y_i)$ being the coordinates of the top left corner and $w_i$ and $h_i$ being the width and the height of the bounding box, respectively. Thus, the scene-based image editing system 106 determines the relative location of each significant object or entity in the input image 1500 and stores the location data with the set of object proposals.

As mentioned, in some implementations, the scene-based image editing system 106 also determines subgraph proposals for the object proposals. In one or more embodiments, the subgraph proposals indicate relations involving specific object proposals in the input image 1500. As can be appreciated, any two different objects $(o_i, o_j)$ in a digital image can correspond to two possible relationships in opposite directions. As an example, a first object can be "on top of" a second object, and the second object can be "underneath" the first object. Because each pair of objects has two possible relations, the total number of possible relations for N object proposals is N(N−1). Accordingly, more object proposals result in a larger scene graph than fewer object proposals, while increasing computational cost and deteriorating inference speed of object detection in systems that attempt to determine all the possible relations in both directions for every object proposal for an input image.

Subgraph proposals reduce the number of potential relations that the scene-based image editing system 106 analyze. Specifically, as mentioned previously, a subgraph proposal represents a relationship involving two or more specific object proposals. Accordingly, in some instances, the scene-based image editing system 106 determines the subgraph proposals for the input image 1500 to reduce the number of potential relations by clustering, rather than maintaining the N (N−1) number of possible relations. In one or more embodiments, the scene-based image editing system 106 uses the clustering and subgraph proposal generation process described in Y. Li, W. Ouyang, B. Zhou, Y. Cui, J. Shi, and X. Wang, *Factorizable net: An efficient subgraph based framework for scene graph generation*, ECCV, Jun. 29, 2018, the entire contents of which are hereby incorporated by reference.

As an example, for a pair of object proposals, the scene-based image editing system 106 determines a subgraph based on confidence scores associated with the object proposals. To illustrate, the scene-based image editing system 106 generates each object proposal with a confidence score indicating the confidence that the object proposal is the right match for the corresponding region of the input image. The scene-based image editing system 106 further determines the subgraph proposal for a pair of object proposals based on a combined confidence score that is the product of the confidence scores of the two object proposals. The scene-based image editing system 106 further constructs the subgraph proposal as the union box of the object proposals with the combined confidence score.

In some cases, the scene-based image editing system 106 also suppresses the subgraph proposals to represent a candidate relation as two objects and one subgraph. Specifically, in some embodiments, the scene-based image editing system 106 utilizes non-maximum-suppression to represent the candidate relations as $\langle o_i, o_j, s_k^i \rangle$, where $i \neq j$ and $s_k^i$ is the k-th subgraph of all the subgraphs associated with $o_i$, the subgraphs for $o_i$ including $o_j$ and potentially other object proposals. After suppressing the subgraph proposals, the scene-based image editing system 106 represents each object and subgraph as a feature vector, $o_i \in \mathbb{R}^D$ and a feature map $s_k^i \in \mathbb{R}^{D \times K_a \times K_a}$, respectively, where D and $K_a$ are dimensions.

After determining object proposals and subgraph proposals for objects in the input image, the scene-based image editing system 106 retrieves and embeds relationships from an external knowledgebase 1522. In one or more embodiments, an external knowledgebase includes a dataset of semantic relationships involving objects. In particular, in some embodiments, an external knowledgebase includes a semantic network including descriptions of relationships between objects based on background knowledge and contextual knowledge (also referred to herein as "commonsense relationships"). In some implementations, an external knowledgebase includes a database on one or more servers that includes relationship knowledge from one or more sources including expert-created resources, crowdsourced resources, web-based sources, dictionaries, or other sources that include information about object relationships.

Additionally, in one or more embodiments an embedding includes a representation of relationships involving objects as a vector. For instance, in some cases, a relationship embedding includes a vector representation of a triplet (i.e., an object label, one or more relationships, and an object entity) using extracted relationships from an external knowledgebase.

Indeed, in one or more embodiments, the scene-based image editing system 106 communicates with the external knowledgebase 1522 to obtain useful object-relationship information for improving the object and subgraph proposals. Further, in one or more embodiments, the scene-based image editing system 106 refines the object proposals and subgraph proposals (represented by the box 1524) using embedded relationships, as described in more detail below.

In some embodiments, in preparation for retrieving the relationships from the external knowledgebase 1522, the scene-based image editing system 106 performs a process of inter-refinement on the object and subgraph proposals (e.g., in preparation for refining features of the object and subgraph proposals). Specifically, the scene-based image editing system 106 uses the knowledge that each object $o_i$ is connected to a set of subgraphs $S^i$, and each subgraph $s_k$ is associated with a set of objects $O^k$ to refine the object vector (resp. the subgraphs) by attending the associated subgraph feature maps (resp. the associated object vectors). For instance, in some cases, the inter-refinement process is represented as:

$$\bar{o}_i = o_i + f_{s \to o}\left(\sum_{s_k^i \in S^i} \alpha_k^{s \to i} \cdot s_k^i\right)$$

$$\bar{s}_i = s_i + f_{o \to s}\left(\sum_{o_i^k \in O^k} \alpha_i^{o \to s} \cdot o_i^k\right)$$

where $\alpha_k^{s \to o}$ (resp. $\alpha_i^{o \to s}$) is the output of a softmax layer indicating the weight for passing $s_k^i$ (resp. $o_i^k$) to $o_i$ (resp. to $s_k$), and $f_{s \to o}$ and $f_{o \to s}$ are non-linear mapping functions. In one or more embodiments, due to different dimensions of $o_i$ and $s_k$, the scene-based image editing system 106 applies pooling or spatial location-based attention for s→o or o→s refinement.

In some embodiments, once the inter-refinement is complete, the scene-based image editing system 106 predicts an object label from the initially refined object feature vector $\bar{o}_i$ and matches the object label with the corresponding semantic entities in the external knowledgebase 1522. In particular, the scene-based image editing system 106 accesses the external knowledgebase 1522 to obtain the most common relationships corresponding to the object label. The scene-based image editing system 106 further selects a predetermined number of the most common relationships from the external knowledgebase 1522 and uses the retrieved relationships to refine the features of the corresponding object proposal/feature vector.

In one or more embodiments, after refining the object proposals and subgraph proposals using the embedded relationships, the scene-based image editing system 106 predicts object labels 1502 and predicate labels from the refined proposals. Specifically, the scene-based image editing system 106 predicts the labels based on the refined object/subgraph features. For instance, in some cases, the scene-based image editing system 106 predicts each object label directly with the refined features of a corresponding feature vector. Additionally, the scene-based image editing system 106 predicts a predicate label (e.g., a relationship label) based on subject and object feature vectors in connection with their corresponding subgraph feature map due to subgraph features being associated with several object proposal pairs. In one or more embodiments, the inference process for predicting the labels is shown as:

$$P_{i,j} \sim \text{softmax}(f_{rel}([\tilde{o}_i \otimes \bar{s}_k; \tilde{o}_j \otimes \bar{s}_k; \bar{s}_k]))$$

$$V_i \sim \text{softmax}(f_{node}(\tilde{o}_i))$$

where $f_{rel}(\bullet)$ and $f_{node}(\bullet)$ denote the mapping layers for predicate and object recognition, respectively, and represents a convolution operation. Furthermore, $\tilde{o}_i$ represents a refined feature vector based on the extracted relationships from the external knowledgebase.

In one or more embodiments, the scene-based image editing system 106 further generates a semantic scene graph 1504 using the predicted labels. In particular, the scene-based image editing system 106 uses the object labels 1502 and predicate labels from the refined features to create a graph representation of the semantic information of the input image 1500. In one or more embodiments, the scene-based image editing system 106 generates the scene graph as $\mathcal{G} = \langle V_i, P_{i,j}, V_j \rangle$, i≠j, where $\mathcal{G}$ is the scene graph.

Thus, the scene-based image editing system 106 utilizes relative location of the objects and their labels in connection with an external knowledgebase 1522 to determine relationships between objects. The scene-based image editing system 106 utilizes the determined relationships when generating a behavioral policy graph 1410. As an example, the scene-based image editing system 106 determines that a hand and a cell phone have an overlapping location within the digital image. Based on the relative locations and depth information, the scene-based image editing system 106 determines that a person (associated with the hand) has a relationship of "holding" the cell phone. As another example, the scene-based image editing system 106 determines that a person and a shirt have an overlapping location and overlapping depth within a digital image. Based on the relative locations and relative depth information, the scene-based image editing system 106 determines that the person has a relationship of "wearing" the shirt. On other hand, the scene-based image editing system 106 determines that a person and a shirt have an overlapping location and but the shirt has a greater average depth than an average depth of the person within a digital image. Based on the relative locations and relative depth information, the scene-based image editing system 106 determines that the person has a relationship of "in front of" with the shirt.

By generating a semantic scene graph for a digital image, the scene-based image editing system 106 provides improved flexibility and efficiency. Indeed, as mentioned above, the scene-based image editing system 106 generates a semantic scene graph to provide improved flexibility as characteristics used in modifying a digital image are readily available at the time user interactions are received to execute a modification. Accordingly, the scene-based image editing system 106 reduces the user interactions typically needed under conventional systems to determine those characteristics (or generate needed content, such as bounding boxes or object masks) in preparation for executing a modification. Thus, the scene-based image editing system 106 provides a more efficient graphical user interface that requires less user interactions to modify a digital image.

Additionally, by generating a semantic scene graph for a digital image, the scene-based image editing system 106 provides an ability to edit a two-dimensional image like a real-world scene. For example, based on a generated semantic scene graph for an image generated utilizing various neural networks, the scene-based image editing system 106 determines objects, their attributes (position, depth, material, color, weight, size, label, etc.). The scene-based image editing system 106 utilizes the information of the semantic scene graph to edit an image intelligently as if the image were a real-world scene.

Indeed, in one or more embodiments, the scene-based image editing system 106 utilizes a semantic scene graph generated for a digital image to facilitate modification to the digital image. For instance, in one or more embodiments, the scene-based image editing system 106 facilitates modification of one or more object attributes of an object portrayed in a digital image utilizing the corresponding semantic scene graph. FIGS. 16-21C illustrate modifying one or more object attributes of an object portrayed in a digital image in accordance with one or more embodiments.

Many conventional systems are inflexible in that they often require difficult, tedious workflows to target modifications to a particular object attribute of an object portrayed in a digital image. Indeed, modifying an object attribute often requires manual manipulation of the object attribute under such systems. For example, modifying a shape of an object portrayed in a digital image often requires several user interactions to manually restructure the boundaries of an object (often at the pixel level), and modifying a size often requires tedious interactions with resizing tools to adjust the size and ensure proportionality. Thus, in addition to inflexibility, many conventional systems suffer from inefficiency in that the processes required by these systems to execute such a targeted modification typically involve a significant number of user interactions.

The scene-based image editing system 106 provides advantages over conventional systems by operating with improved flexibility and efficiency. Indeed, by presenting a graphical user interface element through which user interactions are able to target object attributes of an object, the scene-based image editing system 106 offers more flexibility in the interactivity of objects portrayed in digital images. In particular, via the graphical user interface element, the scene-based image editing system 106 provides flexible selection and modification of object attributes. Accordingly, the scene-based image editing system 106 further provides improved efficiency by reducing the user interactions required to modify an object attribute. Indeed, as will be discussed below, the scene-based image editing system 106 enables user interactions to interact with a description of an object attribute in order to modify that object attribute, avoiding the difficult, tedious workflows of user interactions required under many conventional systems.

Figure 16:
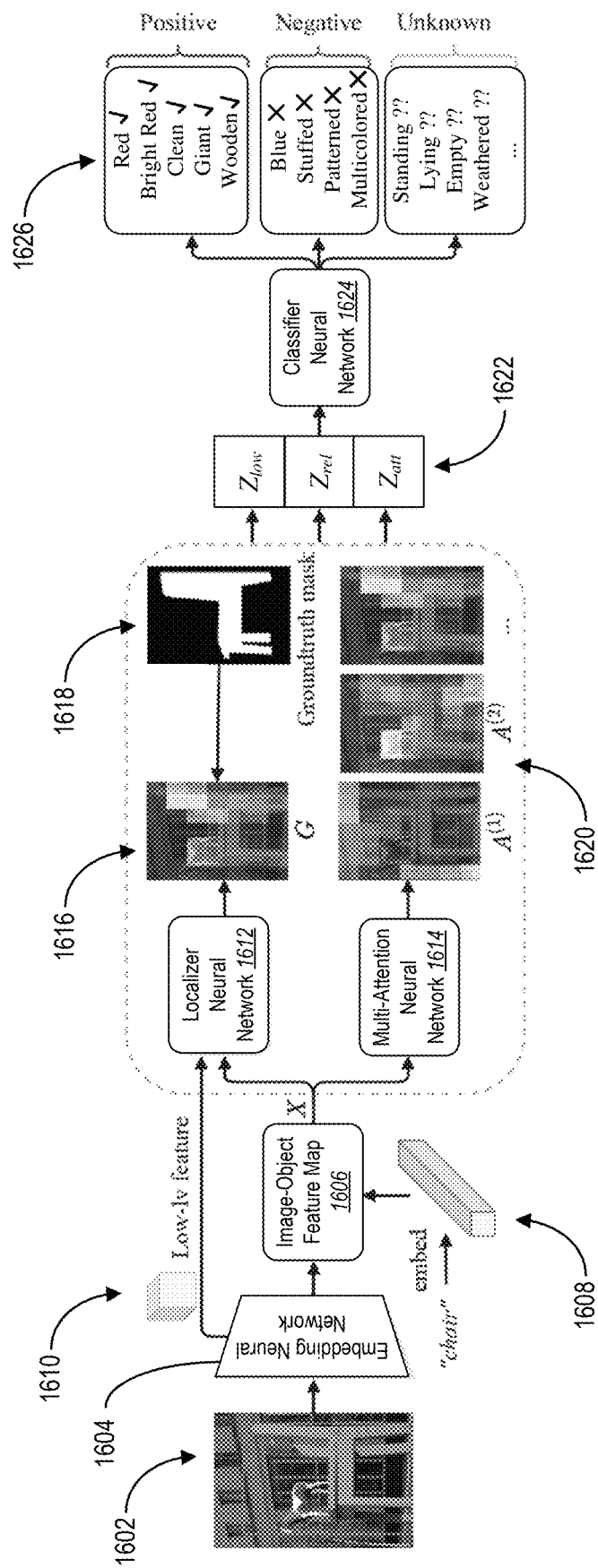
FIG. 16 illustrates an overview of a multi-attribute contrastive classification neural network in accordance with one or more embodiments.
Figure 17:
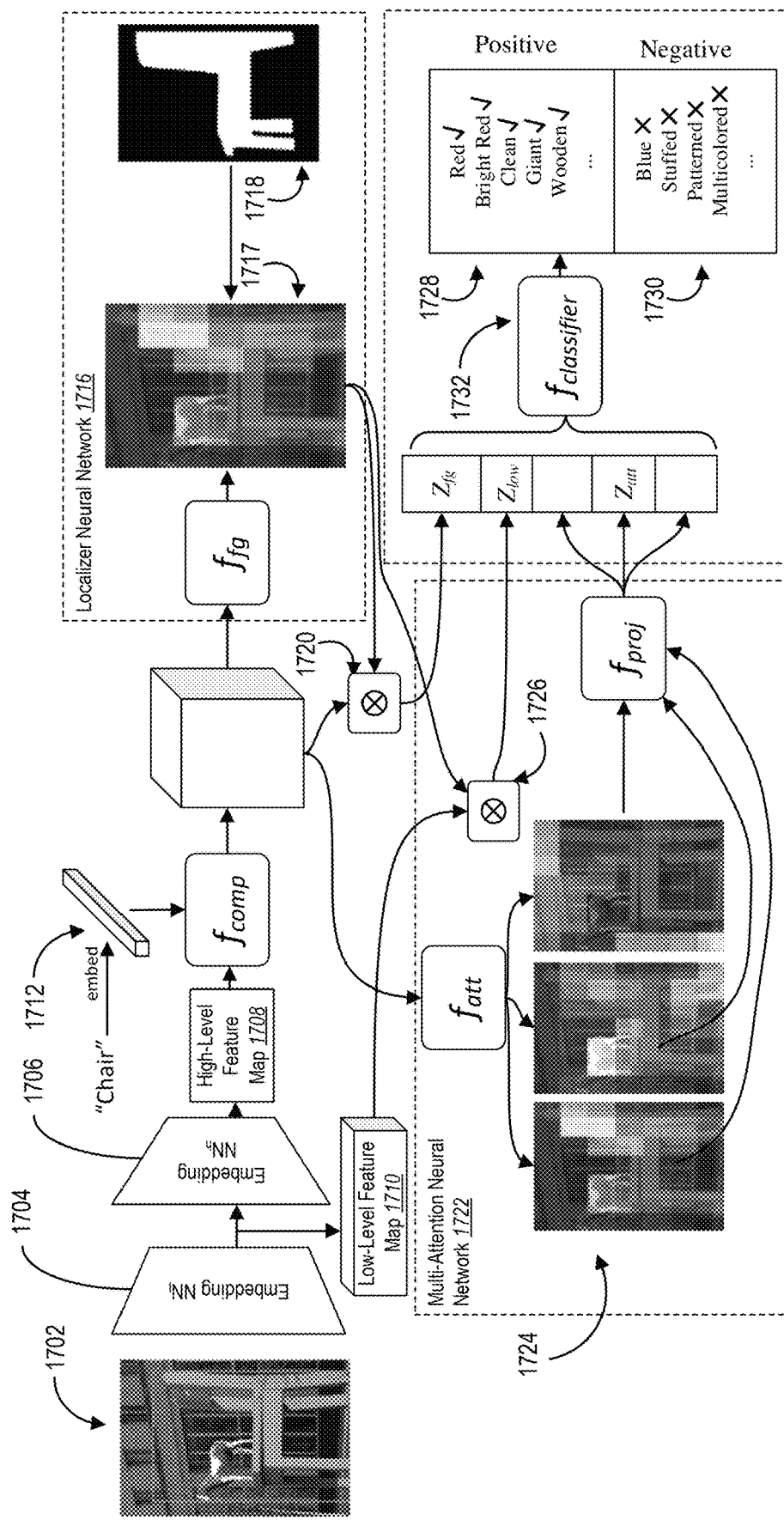
FIG. 17 illustrates an architecture of a multi-attribute contrastive classification neural network in accordance with one or more embodiments.

As suggested, in one or more embodiments, the scene-based image editing system 106 facilitates modifying object attributes of objects portrayed in a digital image by determining the object attributes of those objects. In particular, in some cases, the scene-based image editing system 106 utilizes a machine learning model, such as an attribute classification neural network, to determine the object attributes. FIGS. 16-17 illustrates an attribute classification neural network utilized by the scene-based image editing system 106 to determine object attributes for objects in accordance with one or more embodiments. In particular, FIGS. 16-17 illustrate a multi-attribute contrastive classification neural network utilized by the scene-based image editing system 106 in one or more embodiments.

In one or more embodiments, an attribute classification neural network includes a computer-implemented neural network that identifies object attributes of objects portrayed in a digital image. In particular, in some embodiments, an attribute classification neural network includes a computer-implemented neural network that analyzes objects portrayed in a digital image, identifies the object attributes of the objects, and provides labels for the corresponding object attributes in response. It should be understood that, in many cases, an attribute classification neural network more broadly identifies and classifies attributes for semantic areas portrayed in a digital image. Indeed, in some implementations, an attribute classification neural network determines attributes for semantic areas portrayed in a digital image aside from objects (e.g., the foreground or background).

FIG. 16 illustrates an overview of a multi-attribute contrastive classification neural network in accordance with one or more embodiments. In particular, FIG. 16 illustrates the scene-based image editing system 106 utilizing a multi-attribute contrastive classification neural network to extract a wide variety of attribute labels (e.g., negative, positive, and unknown labels) for an object portrayed within a digital image.

As shown in FIG. 16, the scene-based image editing system 106 utilizes an embedding neural network 1604 with a digital image 1602 to generate an image-object feature map 1606 and a low-level attribute feature map 1610. In particular, the scene-based image editing system 106 generates the image-object feature map 1606 (e.g., the image-object feature map X) by combining an object-label embedding vector 1608 with a high-level attribute feature map from the embedding neural network 1604. For instance, the object-label embedding vector 1608 represents an embedding of an object label (e.g., "chair").

Furthermore, as shown in FIG. 16, the scene-based image editing system 106 generates a localized image-object feature vector $Z_{rel}$. In particular, the scene-based image editing system 106 utilizes the image-object feature map 1606 with the localizer neural network 1612 to generate the localized image-object feature vector $Z_{rel}$. Specifically, the scene-based image editing system 106 combines the image-object feature map 1606 with a localized object attention feature vector 1616 (denoted (3) to generate the localized image-object feature vector $Z_{rel}$ to reflect a segmentation prediction of the relevant object (e.g., "chair") portrayed in the digital image 1602. As further shown in FIG. 16, the localizer neural network 1612, in some embodiments, is trained using ground truth object segmentation masks 1618.

Additionally, as illustrated in FIG. 16, the scene-based image editing system 106 also generates a localized low-level attribute feature vector $Z_{low}$. In particular, in reference to FIG. 16, the scene-based image editing system 106 utilizes the localized object attention feature vector G from the localizer neural network 1612 with the low-level attribute feature map 1610 to generate the localized low-level attribute feature vector $Z_{low}$.

Moreover, as shown FIG. 16, the scene-based image editing system 106 generates a multi-attention feature vector $Z_{att}$. As illustrated in FIG. 16, the scene-based image editing system 106 generates the multi-attention feature vector $Z_{att}$ from the image-object feature map 1606 by utilizing attention maps 1620 of the multi-attention neural network 1614. Indeed, in one or more embodiments, the scene-based image editing system 106 utilizes the multi-attention feature vector $Z_{att}$ to attend to features at different spatial locations in relation to the object portrayed within the digital image 1602 while predicting attribute labels for the portrayed object.

As further shown in FIG. 16, the scene-based image editing system 106 utilizes a classifier neural network 1624 to predict the attribute labels 1626 upon generating the localized image-object feature vector $Z_{rel}$. the localized low-level attribute feature vector $Z_{low}$, and the multi-attention feature vector $Z_{att}$ (collectively shown as vectors 1622 in FIG. 16). In particular, in one or more embodiments, the scene-based image editing system 106 utilizes the classifier neural network 1624 with a concatenation of the localized image-object feature vector $Z_{rel}$. the localized low-level attribute feature vector $Z_{low}$, and the multi-attention feature vector $Z_{att}$ to determine the attribute labels 1626 for the object (e.g., chair) portrayed within the digital image 1602. As shown in FIG. 16, the scene-based image editing system 106 determines positive attribute labels for the chair portrayed in the digital image 1602, negative attribute labels that are not attributes of the chair portrayed in the digital image 1602, and unknown attribute labels that correspond to attribute labels that the scene-based image editing system 106 could not confidently classify utilizing the classifier neural network 1624 as belonging to the chair portrayed in the digital image 1602.

In some instances, the scene-based image editing system 106 utilizes probabilities (e.g., a probability score, floating point probability) output by the classifier neural network 1624 for the particular attributes to determine whether the attributes are classified as positive, negative, and/or unknown attribute labels for the object portrayed in the digital image 1602 (e.g., the chair). For example, the scene-based image editing system 106 identifies an attribute as a positive attribute when a probability output for the particular attribute satisfies a positive attribute threshold (e.g., a positive probability, a probability that is over 0.5). Moreover, the scene-based image editing system 106 identifies an attribute as a negative attribute when a probability output for the particular attribute satisfies a negative attribute threshold (e.g., a negative probability, a probability that is below −0.5). Furthermore, in some cases, the scene-based image editing system 106 identifies an attribute as an unknown attribute when the probability output for the particular attribute does not satisfy either the positive attribute threshold or the negative attribute threshold.

In some cases, a feature map includes a height, width, and dimension locations (H×W×D) which have D-dimensional feature vectors at each of the H×W image locations. Furthermore, in some embodiments, a feature vector includes a set of values representing characteristics and/or features of content (or an object) within a digital image. Indeed, in some embodiments, a feature vector includes a set of values corresponding to latent and/or patent attributes related to a digital image. For example, in some instances, a feature vector is a multi-dimensional dataset that represents features depicted within a digital image. In one or more embodiments, a feature vector includes a set of numeric metrics learned by a machine learning algorithm.

FIG. 17 illustrates an architecture of the multi-attribute contrastive classification neural network in accordance with one or more embodiments. Indeed, in one or more embodiments, the scene-based image editing system 106 utilizes the multi-attribute contrastive classification neural network, as illustrated in FIG. 17, with the embedding neural network, the localizer neural network, the multi-attention neural network, and the classifier neural network components to determine positive and negative attribute labels (e.g., from output attribute presence probabilities) for an object portrayed in a digital image.

As shown in FIG. 17, the scene-based image editing system 106 utilizes an embedding neural network within the multi-attribute contrastive classification neural network. In particular, as illustrated in FIG. 17, the scene-based image editing system 106 utilizes a low-level embedding layer 1704 (e.g., embedding $NN_l$) (e.g., of the embedding neural network 1604 of FIG. 16) to generate a low-level attribute feature map 1710 from a digital image 1702. Furthermore, as shown in FIG. 17, the scene-based image editing system 106 utilizes a high-level embedding layer 1706 (e.g., embedding $NN_h$) (e.g., of the embedding neural network 1604 of FIG. 16) to generate a high-level attribute feature map 1708 from the digital image 1702.

In particular, in one or more embodiments, the scene-based image editing system 106 utilizes a convolutional neural network as an embedding neural network. For example, the scene-based image editing system 106 generates a I)-dimensional image feature map $f_{img}(I) \in \mathbb{R}^{H \times W \times D}$ with a spatial size H×W extracted from a convolutional neural network-based embedding neural network. In some instance, the scene-based image editing system 106 utilizes an output of the penultimate layer of ResNet-50 as the image feature map $f_{img}(I)$.

As shown in FIG. 17, the scene-based image editing system 106 extracts both a high-level attribute feature map 1708 and a low-level attribute feature map 1710 utilizing a high-level embedding layer and a low-level embedding layer of an embedding neural network. By extracting both the high-level attribute feature map 1708 and the low-level attribute feature map 1710 for the digital image 1702, the scene-based image editing system 106 addresses the heterogeneity in features between different classes of attributes. Indeed, attributes span across a wide range of semantic levels.

By utilizing both low-level feature maps and high-level feature maps, the scene-based image editing system 106 accurately predicts attributes across the wide range of semantic levels. For instance, the scene-based image editing system 106 utilizes low-level feature maps to accurately predict attributes such as, but not limited to, colors (e.g., red, blue, multicolored), patterns (e.g., striped, dotted, striped), geometry (e.g., shape, size, posture), texture (e.g., rough, smooth, jagged), or material (e.g., wooden, metallic, glossy, matte) of a portrayed object. Meanwhile, in one or more embodiments, the scene-based image editing system 106 utilizes high-level feature maps to accurately predict attributes such as, but not limited to, object states (e.g., broken, dry, messy, full, old) or actions (e.g., running, sitting, flying) of a portrayed object.

Furthermore, as illustrated in FIG. 17, the scene-based image editing system 106 generates an image-object feature map 1714. In particular, as shown in FIG. 17, the scene-based image editing system 106 combines an object-label embedding vector 1712 (e.g., such as the object-label embedding vector 1608 of FIG. 16) from a label corresponding to the object (e.g., "chair") with the high-level attribute feature map 1708 to generate the image-object feature map 1714 (e.g., such as the image-object feature map 1606 of FIG. 16). As further shown in FIG. 17, the scene-based image editing system 106 utilizes a feature composition module (e.g., $f_{comp}$) that utilizes the object-label embedding vector 1712 and the high-level attribute feature map 1708 to output the image-object feature map 1714.

In one or more embodiments, the scene-based image editing system 106 generates the image-object feature map 1714 to provide an extra signal to the multi-attribute contrastive classification neural network to learn the relevant object for which it is predicting attributes (e.g., while also encoding the features for the object). In particular, in some embodiments, the scene-based image editing system 106 incorporates the object-label embedding vector 1712 (as an input in a feature composition module $f_{comp}$ to generate the image-object feature map 1714) to improve the classification results of the multi-attribute contrastive classification neural network by having the multi-attribute contrastive classification neural network learn to avoid unfeasible object-attribute combinations (e.g., a parked dog, a talking table, a barking couch). Indeed, in some embodiments, the scene-based image editing system 106 also utilizes the object-label embedding vector 1712 (as an input in the feature composition module $f_{comp}$) to have the multi-attribute contrastive classification neural network learn to associate certain object-attribute pairs together (e.g., a ball is always round). In many instances, by guiding the multi-attribute contrastive classification neural network on what object it is predicting attributes for enables the multi-attribute contrastive classification neural network to focus on particular visual aspects of the object. This, in turn, improves the quality of extracted attributes for the portrayed object.

In one or more embodiments, the scene-based image editing system 106 utilizes a feature composition module (e.g., $f_{comp}$) to generate the image-object feature map 1714. In particular, the scene-based image editing system 106 implements the feature composition module (e.g., $f_{comp}$) with a gating mechanism in accordance with the following:

$$f_{comp}(f_{img}(I),\phi_o) = f_{img}(I) \odot f_{gate}(\phi_o)$$

and $$f_{comp}(\phi_o) = \sigma(W_{g2} \cdot ReLU(W_{g1}\phi_o + b_{g1}) + b_{g2})$$

In the first function above, the scene-based image editing system 106 utilizes a channel-wise product ($\odot$) of the high-level attribute feature map $f_{img}(I)$ and a filter $f_{gate}$ of the object-label embedding vector $\phi_o \in \mathbb{R}^d$ to generate an image-object feature map $f_{comp}(f_{img}(I), \phi_o) \in \mathbb{R}^D$.

In addition, in the second function above, the scene-based image editing system 106 utilizes a sigmoid function $\sigma$ in the $f_{gate}(\phi_o)) \in \mathbb{R}^D$ that is broadcasted to match the feature map spatial dimension as a 2-layer multilayer perceptron (MLP). Indeed, in one or more embodiments, the scene-based image editing system 106 utilizes $f_{gate}$ as a filter that selects attribute features that are relevant to the object of interest (e.g., as indicated by the object-label embedding vector $\phi_o$). In many instances, the scene-based image editing system 106 also utilizes $f_{gate}$ to suppress incompatible object-attribute pairs (e.g., talking table). In some embodiments, the scene-based image editing system 106 can identify object-image labels for each object portrayed within a digital image and output attributes for each portrayed object by utilizing the identified object-image labels with the multi-attribute contrastive classification neural network.

Furthermore, as shown in FIG. 17, the scene-based image editing system 106 utilizes the image-object feature map 1714 with a localizer neural network 1716 to generate a localized image-object feature vector $Z_{rel}$ (e.g., as also shown in FIG. 16 as localizer neural network 1612 and $Z_{rel}$). In particular, as shown in FIG. 17, the scene-based image editing system 106 generates a localized object attention feature vector 1717 (e.g., G in FIG. 16) that reflects a segmentation prediction of the portrayed object by utilizing the image-object feature map 1714 with a convolutional layer $f_{rel}$ of the localizer neural network 1716. Then, as illustrated in FIG. 17, the scene-based image editing system 106 combines the localized object attention feature vector 1717 with the image-object feature map 1714 to generate the localized image-object feature vector $Z_{rel}$. As shown in FIG. 17, the scene-based image editing system 106 utilizes matrix multiplication 1720 between the localized object attention feature vector 1717 and the image-object feature map 1714 to generate the localized image-object feature vector $Z_{rel}$.

In some instances, digital images may include multiple objects (and/or a background). Accordingly, in one or more embodiments, the scene-based image editing system 106 utilizes a localizer neural network to learn an improved feature aggregation that suppresses non-relevant-object regions (e.g., regions not reflected in a segmentation prediction of the target object to isolate the target object). For example, in reference to the digital image 1702, the scene-based image editing system 106 utilizes the localizer neural network 1716 to localize an object region such that the multi-attribute contrastive classification neural network predicts attributes for the correct object (e.g., the portrayed chair) rather than other irrelevant objects (e.g., the portrayed horse). To do this, in some embodiments, the scene-based image editing system 106 utilizes a localizer neural network that utilizes supervised learning with object segmentation masks (e.g., ground truth relevant-object masks) from a dataset of labeled images (e.g., ground truth images as described below).

To illustrate, in some instances, the scene-based image editing system 106 utilizes 2-stacked convolutional layers $f_{rel}$ (e.g., with a kernel size of 1) followed by a spatial softmax to generate a localized object attention feature vector G (e.g., a localized object region) from an image-object feature map $X \in \mathbb{R}^{H \times W \times D}$ in accordance with the following:

$$g = f_{rel}(X), g \in \mathbb{R}^{H \times W},$$

$$G_{h,w} = \frac{\exp(g_h, w)}{\sum_{h,w} \exp(g_h, w)}, G \in \mathbb{R}^{H \times W}$$

For example, the localized object attention feature vector G includes a single plane of data that is H×W (e.g., a feature map having a single dimension). In some instances, the localized object attention feature vector G includes a feature map (e.g., a localized object attention feature map) that includes one or more feature vector dimensions.

Then, in one or more embodiments, the scene-based image editing system 106 utilizes the localized object attention feature vector $G_{h,w}$ and the image-object feature map $X_{h,w}$ to generate the localized image-object feature vector $Z_{rel}$ in accordance with the following:

$$Z_{rel} = \sum_{h,w} G_{h,w} X_{h,w}$$

In some instances, in the above function, the scene-based image editing system 106 pools H×W D-dimensional feature vectors $X_{h,w}$ (from the image-object feature map) in $\mathbb{R}^D$ using weights from the localized object attention feature vector $G_{h,w}$ into a single D-dimensional feature vector $Z_{rel}$.

In one or more embodiments, in reference to FIG. 17, the scene-based image editing system 106 trains the localizer neural network 1716 to learn the localized object attention feature vector 1717 (e.g., G) utilizing direct supervision with object segmentation masks 1718 (e.g., ground truth object segmentation masks 1618 from FIG. 16).

Furthermore, as shown in FIG. 17, the scene-based image editing system 106 utilizes the image-object feature map 1714 with a multi-attention neural network 1722 to generate a multi-attention feature vector $Z_{att}$ (e.g., the multi-attention neural network 1614 and $Z_{att}$ of FIG. 16). In particular, as shown in FIG. 17, the scene-based image editing system 106 utilizes a convolutional layer $f_{att}$ (e.g., attention layers) with the image-object feature map 1714 to extract attention maps 1724 (e.g., Attention 1 through Attention k) (e.g., attention maps 1620 of FIG. 16). Then, as further shown in FIG. 17, the scene-based image editing system 106 passes (e.g., via linear projection) the extracted attention maps 424 (attention 1 through attention k) through a projection layer $f_{proj}$ to extract one or more attention features that are utilized to generate the multi-attention feature vector $Z_{att}$.

In one or more embodiments, the scene-based image editing system 106 utilizes the multi-attention feature vector $Z_{att}$ to accurately predict attributes of a portrayed object within a digital image by providing focus to different parts of the portrayed object and/or regions surrounding the portrayed object (e.g., attending to features at different spatial locations). To illustrate, in some instances, the scene-based image editing system 106 utilizes the multi-attention feature vector $Z_{att}$ to extract attributes such as "barefooted" or "bald-headed" by focusing on different parts of a person (i.e., an object) that is portrayed in a digital image. Likewise, in some embodiments, the scene-based image editing system 106 utilizes the multi-attention feature vector $Z_{att}$ to distinguish between different activity attributes (e.g., jumping vs crouching) that may rely on information from surrounding context of the portrayed object.

In certain instances, the scene-based image editing system 106 generates an attention map per attribute portrayed for an object within a digital image. For example, the scene-based image editing system 106 utilizes an image-object feature map with one or more attention layers to generate an attention map from the image-object feature map for each known attribute. Then, the scene-based image editing system 106 utilizes the attention maps with a projection layer to generate the multi-attention feature vector $Z_{att}$. In one or more embodiments, the scene-based image editing system 106 generates various numbers of attention maps for various attributes portrayed for an object within a digital image (e.g., the system can generate an attention map for each attribute or a different number of attention maps than the number of attributes).

Furthermore, in one or more embodiments, the scene-based image editing system 106 utilizes a hybrid shared multi-attention approach that allows for attention hops while generating the attention maps from the image-object feature map. For example, the scene-based image editing system 106 extracts M attention maps $\{A^{(m)}\}_{m=1}^{M}$ from an image-object feature map X utilizing a convolutional layer $f_{att}^{(m)}$ (e.g., attention layers) in accordance with the following function:

$$E^{(m)} = f_{att}^{(m)}(X), E^{(m)} \in \mathbb{R}^{H \times W}, m = 1, \ldots, M$$

and $$A_{h,w}^{(m)} = \frac{\exp(E_{h,w}^{(m)})}{\sum_{h,w} \exp(E_{h,w}^{(m)})}, A_{h,w}^{(m)} \in \mathbb{R}^{H \times W}$$

In some cases, the scene-based image editing system 106 utilizes a convolutional layer $f_{att}^{(m)}$ that has a similar architecture to the 2-stacked convolutional layers $f_{rel}$ from function (3) above. By utilizing the approach outlined in second function above, the scene-based image editing system 106 utilizes a diverse set of attention maps that correspond to a diverse range of attributes.

Subsequently, in one or more embodiments, the scene-based image editing system 106 utilizes the M attention maps (e.g., $A_{h,w}^{(m)}$) to aggregate M attention feature vectors ($\{r_{(m)}\}_{m=1}^{M}$) from the image-object feature map X in accordance with the following function:

$$r^{(m)} = \sum_{h,w} A_{h,w}^{(m)} X_{h,w}, r^{(m)} \in \mathbb{R}^D$$

Moreover, in reference to FIG. 17, the scene-based image editing system 106 passes the M attention feature vectors $(\{r^{(m)}\}_{i=1}^{M})$ through a projection layer $f_{proj}^{(m)}$ to extract one or more attention feature vectors $z^{(m)}$ in accordance with the following function:

$$z_{att}^{(m)} = f_{proj}^{(m)}(r^{(m)}, z_{att}^{(m)}) \in \mathbb{R}^{D_{proj}}$$

Then, in one or more embodiments, the scene-based image editing system 106 generates the multi-attention feature vector $Z_{att}$ by concatenating the individual attention feature vectors $z_{att}^{(m)}$ in accordance with the following function:

$$Z_{att} = \text{concat}([z_{att}^{(1)}, \ldots, z_{att}^{(M)}])$$

In some embodiments, the scene-based image editing system 106 utilizes a divergence loss with the multi-attention neural network in the M attention hops approach. In particular, the scene-based image editing system 106 utilizes a divergence loss that encourages attention maps to focus on different (or unique) regions of a digital image (from the image-object feature map). In some cases, the scene-based image editing system 106 utilizes a divergence loss that promotes diversity between attention features by minimizing a cosine similarity (e.g., $\ell_2$-norm) between attention weight vectors (e.g., E) of attention features. For instance, the scene-based image editing system 106 determines a divergence loss $\mathcal{L}_{div}$ in accordance with the following function:

$$\mathcal{L}_{div} = \sum_{m \neq n} \frac{\langle E^{(m)}, E^{(n)} \rangle}{\|E^{(m)}\|_2 \|E^{(n)}\|_2}$$

In one or more embodiments, the scene-based image editing system 106 utilizes the divergence loss $\mathcal{L}_{div}$ to learn parameters of the multi-attention neural network 1722 and/or the multi-attribute contrastive classification neural network (as a whole).

Furthermore, as shown in FIG. 17, the scene-based image editing system 106 also generates a localized low-level attribute feature vector $Z_{low}$ (e.g., $Z_{low}$ of FIG. 16). Indeed, as illustrated in FIG. 17, the scene-based image editing system 106 generates the localized low-level attribute feature vector $Z_{low}$ by combining the low-level attribute feature map 1710 and the localized object attention feature vector 1717. For example, as shown in FIG. 17, the scene-based image editing system 106 combines the low-level attribute feature map 1710 and the localized object attention feature vector 1717 utilizing matrix multiplication 1726 to generate the localized low-level attribute feature vector $Z_{low}$.

By generating and utilizing the localized low-level attribute feature vector $Z_{low}$, in one or more embodiments, the scene-based image editing system 106 improves the accuracy of low-level features (e.g., colors, materials) that are extracted for an object portrayed in a digital image. In particular, in one or more embodiments, the scene-based image editing system 106 pools low-level features (as represented by a low-level attribute feature map from a low-level embedding layer) from a localized object attention feature vector (e.g., from a localizer neural network). Indeed, in one or more embodiments, by pooling low-level features from the localized object attention feature vector utilizing a low-level feature map, the scene-based image editing system 106 constructs a localized low-level attribute feature vector $Z_{low}$.

As further shown in FIG. 17, the scene-based image editing system 106 utilizes a classifier neural network 1732 ($f_{classifier}$) (e.g., the classifier neural network 1624 of FIG. 16) with the localized image-object feature vector $Z_{rel}$, the multi-attention feature vector $Z_{att}$, and the localized low-level attribute feature vector $Z_{low}$ to determine positive attribute labels 1728 and negative attribute labels 1730 for the object (e.g., "chair") portrayed within the digital image 1702. In some embodiments, the scene-based image editing system 106 utilizes a concatenation of the localized image-object feature vector $Z_{rel}$, the multi-attention feature vector $Z_{att}$, and the localized low-level attribute feature vector $Z_{low}$ as input in a classification layer of the classifier neural network 1732 ($f_{classifier}$). Then, as shown in FIG. 17, the classifier neural network 1732 ($f_{classifier}$) generates positive attribute labels 1728 (e.g., red, bright red, clean, giant, wooden) and also generates negative attribute labels 1730 (e.g., blue, stuffed, patterned, multicolored) for the portrayed object in the digital image 1702.

In one or more embodiments, the scene-based image editing system 106 utilizes a classifier neural network that is a 2-layer MLP. In some cases, the scene-based image editing system 106 utilizes a classifier neural network that includes various amounts of hidden units and output logic values followed by sigmoid. In some embodiments, the classifier neural network is trained by the scene-based image editing system 106 to generate both positive and negative attribute labels. Although one or more embodiments described herein utilize a 2-layer MLP, in some instances, the scene-based image editing system 106 utilizes a linear layer (e.g., within the classifier neural network, for the $f_{gate}$, and for the image-object feature map).

Furthermore, in one or more embodiments, the scene-based image editing system 106 utilizes various combinations of the localized image-object feature vector $Z_{rel}$, the multi-attention feature vector $Z_{att}$, and the localized low-level attribute feature vector $Z_{low}$ with the classifier neural network to extract attributes for an object portrayed in a digital image. For example, in certain instances, the scene-based image editing system 106 provides the localized image-object feature vector $Z_{rel}$ and the multi-attention feature vector $Z_{att}$ to extract attributes for the portrayed object. In some instances, as shown in FIG. 17, the scene-based image editing system 106 utilizes a concatenation of each the localized image-object feature vector $Z_{rel}$, the multi-attention feature vector $Z_{att}$, and the localized low-level attribute feature vector $Z_{low}$ with the classifier neural network.

In one or more embodiments, the scene-based image editing system 106 utilizes the classifier neural network 1732 to generate prediction scores corresponding to attribute labels as outputs. For, example, the classifier neural network 1732 can generate a prediction score for one or more attribute labels (e.g., a score of 0.04 for blue, a score of 0.9 for red, a score of 0.4 for orange). Then, in some instances, the scene-based image editing system 106 utilizes attribute labels that correspond to prediction scores that satisfy a threshold prediction score. Indeed, in one or more embodiments, the scene-based image editing system 106 selects various attribute labels (both positive and negative) by utilizing output prediction scores for attributes from a classifier neural network.

Although one or more embodiments herein illustrate the scene-based image editing system 106 utilizing a particular embedding neural network, localizer neural network, multi-attention neural network, and classifier neural network, the scene-based image editing system 106 can utilize various types of neural networks for these components (e.g., CNN, FCN). In addition, although one or more embodiments herein describe the scene-based image editing system 106 combining various feature maps (and/or feature vectors) utilizing matrix multiplication, the scene-based image editing system 106, in some embodiments, utilizes various approaches to combine feature maps (and/or feature vectors) such as, but not limited to, concatenation, multiplication, addition, and/or aggregation. For example, in some implementations, the scene-based image editing system 106 combines a localized object attention feature vector and an image-object feature map to generate the localized image-object feature vector by concatenating the localized object attention feature vector and the image-object feature map.

Thus, in some cases, the scene-based image editing system 106 utilizes an attribute classification neural network (e.g., a multi-attribute contrastive classification neural network) to determine objects attributes of objects portrayed in a digital image or otherwise determined attributes of portrayed semantic areas. In some cases, the scene-based image editing system 106 adds object attributes or other attributes determined for a digital image to a semantic scene graph for the digital image. In other words, the scene-based image editing system 106 utilizes the attribute classification neural network in generating semantic scene graphs for digital images. In some implementations, however, the scene-based image editing system 106 stores the determined object attributes or other attributes in a separate storage location.

Figure 18:
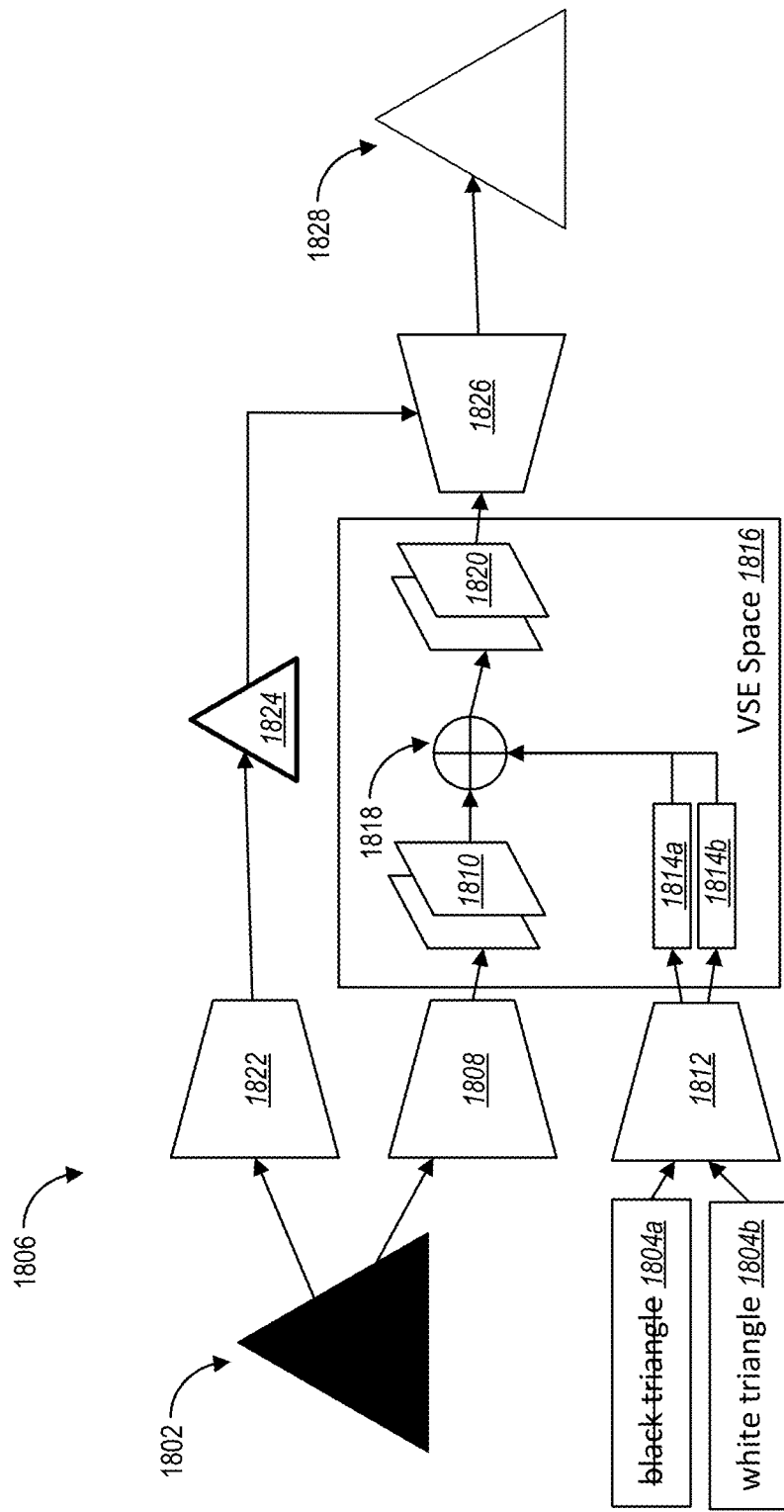
FIG. 18 illustrates an attribute modification neural network utilized by the scene-based image editing system to modify object attributes in accordance with one or more embodiments.

Further, in one or more embodiments, the scene-based image editing system 106 facilitates modifying object attributes of objects portrayed in a digital image by modifying one or more object attributes in response to user input. In particular, in some cases, the scene-based image editing system 106 utilizes a machine learning model, such as an attribute modification neural network to modify object attributes. FIG. 18 illustrates an attribute modification neural network utilized by the scene-based image editing system 106 to modify object attributes in accordance with one or more embodiments.

In one or more embodiments, an attribute modification neural network includes a computer-implemented neural network that modifies specified object attributes of an object (or specified attributes of other specified semantic areas). In particular, in some embodiments, an attribute modification neural network includes a computer-implemented neural network that receives user input targeting an object attribute and indicating a change to the object attribute and modifies the object attribute in accordance with the indicated change. In some cases, an attribute modification neural network includes a generative network.

As shown in FIG. 18, the scene-based image editing system 106 provides an object 1802 (e.g., a digital image that portrays the object 1802) and modification input 1804a-1804b to an object modification neural network 1806. In particular, FIG. 18 shows the modification input 1804a-1804b including input for the object attribute to be changed (e.g., the black color of the object 1802) and input for the change to occur (e.g., changing the color of the object 1802 to white).

As illustrated by FIG. 18, the object modification neural network 1806 utilizes an image encoder 1808 to generate visual feature maps 1810 from the object 1802. Further, the object modification neural network 1806 utilizes a text encoder 1812 to generate textual features 1814a-1814b from the modification input 1804a-1804b. In particular, as shown in FIG. 18, the object modification neural network 1806 generates the visual feature maps 1810 and the textual features 1814a-1814b within a joint embedding space 1816 (labeled "visual-semantic embedding space" or "VSE space").

In one or more embodiments, the object modification neural network 1806 performs text-guided visual feature manipulation to ground the modification input 1804a-1804b on the visual feature maps 1810 and manipulate the corresponding regions of the visual feature maps 1810 with the provided textual features. For instance, as shown in FIG. 18, the object modification neural network 1806 utilizes an operation 1818 (e.g., a vector arithmetic operation) to generate manipulated visual feature maps 1820 from the visual feature maps 1810 and the textual features 1814a-1814b.

As further shown in FIG. 18, the object modification neural network 1806 also utilizes a fixed edge extractor 1822 to extract an edge 1824 (a boundary) of the object 1802. In other words, the object modification neural network 1806 utilizes the fixed edge extractor 1822 to extract the edge 1824 of the area to be modified.

Further, as shown, the object modification neural network 1806 utilizes a decoder 1826 to generate the modified object 1828. In particular, the decoder 1826 generates the modified object 1828 from the edge 1824 extracted from the object 1802 and the manipulated visual feature maps 1820 generated from the object 1802 and the modification input 1804a-1804b.

In one or more embodiments, the scene-based image editing system 106 trains the object modification neural network 1806 to handle open-vocabulary instructions and open-domain digital images. For instance, in some cases, the scene-based image editing system 106 trains the object modification neural network 1806 utilizing a large-scale image-caption dataset to learn a universal visual-semantic embedding space. In some cases, the scene-based image editing system 106 utilizes convolutional neural networks and/or long short-term memory networks as the encoders of the object modification neural network 1806 to transform digital images and text input into the visual and textual features.

The following provides a more detailed description of the text-guided visual feature manipulation. As previously mentioned, in one or more embodiments, the scene-based image editing system 106 utilizes the joint embedding space 1816 to manipulate the visual feature maps 1810 with the text instructions of the modification input 1804a-1804b via vector arithmetic operations. When manipulating certain objects or object attributes, the object modification neural network 1806 aims to modify only specific regions while keeping other regions unchanged. Accordingly, the object modification neural network 1806 conducts vector arithmetic operations between the visual feature maps 1810 represented as $V \in \mathbb{R}^{1024 \times 7 \times 7}$ and the textual features 1814a-1814b (e.g., represented as textual feature vectors).

For instance, in some cases, the object modification neural network 1806 identifies the regions in the visual feature maps 1810 to manipulate (i.e., grounds the modification input 1804a-1804b) on the spatial feature map. In some cases, the object modification neural network 1806 provides a soft grounding for textual queries via a weighted summation of the visual feature maps 1810. In some cases, the object modification neural network 1806 uses the textual features 1814a-1814b (represented as $t \in \mathbb{R}^{1024 \times 1}$) as weights to compute the weighted summation of the visual feature maps 1810 $g=t^tV$. Using this approach, the object modification neural network 1806 provides a soft grounding map g∈ $\mathbb{R}^{7\times 7}$, which roughly localizes corresponding regions in the visual feature maps 1810 related to the text instructions.

In one or more embodiments, the object modification neural network 1806 utilizes the grounding map as location-adaptive coefficients to control the manipulation strength at different locations. In some cases, the object modification neural network 1806 utilizes a coefficient α to control the global manipulation strength, which enables continuous transitions between source images and the manipulated ones. In one or more embodiments, the scene-based image editing system 106 denotes the visual feature vector at spatial location (i, j) (where i, j∈ {0, 1, . . . 6}) in the visual feature map V∈ $\mathbb{R}^{1024\times 7\times 7}$ as $v^{i,j}\in \mathbb{R}^{1024}$.

The scene-based image editing system 106 utilizes the object modification neural network 1806 to perform various types of manipulations via the vector arithmetic operations weighted by the soft grounding map and the coefficient α. For instance, in some cases, the scene-based image editing system 106 utilizes the object modification neural network 1806 to change an object attribute or a global attribute. The object modification neural network 1806 denotes the textual feature embeddings of the source concept (e.g., "black triangle") and the target concept (e.g., "white triangle") as $t_1$ and $t_2$, respectively. The object modification neural network 1806 performs the manipulation of image feature vector $v^{i,j}$ at location (i, j) as follows:

$$v_m^{i,j} = v^{i,j} - \alpha\langle v^{i,j}, t_1\rangle t_1 + \alpha\langle v^{i,j}, t_1\rangle t_2,$$

where i, j∈ {0, 1, . . . 6} and $v_m^{i,j}$ is the manipulated visual feature vector at location (i, j) of the 7×7 feature map.

In one or more embodiments, the object modification neural network 1806 removes the source features $t_1$ and adds the target features $t_2$ to each visual feature vector $v^{i,j}$. Additionally, $\langle v^{i,j}, t_1\rangle$ represents the value of the soft grounding map at location (i, j), calculated as the dot product of the image feature vector and the source textual features. In other words, the value represents the projection of the visual embedding $v^{i,j}$ onto the direction of the textual embedding $t_1$. In some cases, object modification neural network 1806 utilizes the value as a location-adaptive manipulation strength to control which regions in the image should be edited. Further, the object modification neural network 1806 utilizes the coefficient α as a hyper-parameter that controls the image-level manipulation strength. By smoothly increasing α, the object modification neural network 1806 achieves smooth transitions from source to target attributes.

In some implementations, the scene-based image editing system 106 utilizes the object modification neural network 1806 to remove a concept (e.g., an object attribute, an object, or other visual elements) from a digital image (e.g., removing an accessory from a person). In some instances, the object modification neural network 1806 denotes the semantic embedding of the concept to be removed as t. Accordingly, the object modification neural network 1806 performs the removing operation as follows:

$$v_m^{i,j} = v^{i,j} - \alpha\langle v^{i,j}, t\rangle t$$

Further, in some embodiments, the scene-based image editing system 106 utilizes the object modification neural network 1806 to modify the degree to which an object attribute (or other attribute of a semantic area) appears (e.g., making a red apple less red or increasing the brightness of a digital image). In some cases, the object modification neural network 1806 controls the strength of an attribute via the hyper-parameter α. By smoothly adjusting a, the object modification neural network 1806 gradually strengthens or weakens the degree to which an attribute appears as follows:

$$v_m^{i,j} = v^{i,j} \pm \alpha\langle v^{i,j}, t\rangle t$$

After deriving the manipulated feature map $V_m\in \mathbb{R}^{1024\times 7\times 7}$, the object modification neural network 1806 utilizes the decoder 1826 (an image decoder) to generate a manipulated image (e.g., the modified object 1828). In one or more embodiments, the scene-based image editing system 106 trains the object modification neural network 1806 as described by F. Faghri et al., Vse++: *Improving visual-semantic Embeddings with Hard Negatives*, arXiv: 1707.05612, 2017, which is incorporated herein by reference in its entirety. In some cases, the decoder 1826 takes 1024×7×7 features maps as input and is composed of seven ResNet blocks with upsampling layers in between, which generates 256×256 images. Also, in some instances, the scene-based image editing system 106 utilizes a discriminator that includes a multi-scale patch-based discriminator. In some implementations, the scene-based image editing system 106 trains the decoder 1826 with GAN loss, perceptual loss, and discriminator feature matching loss. Further, in some embodiments, the fixed edge extractor 1822 includes a bi-directional cascade network.

Figure 19C:
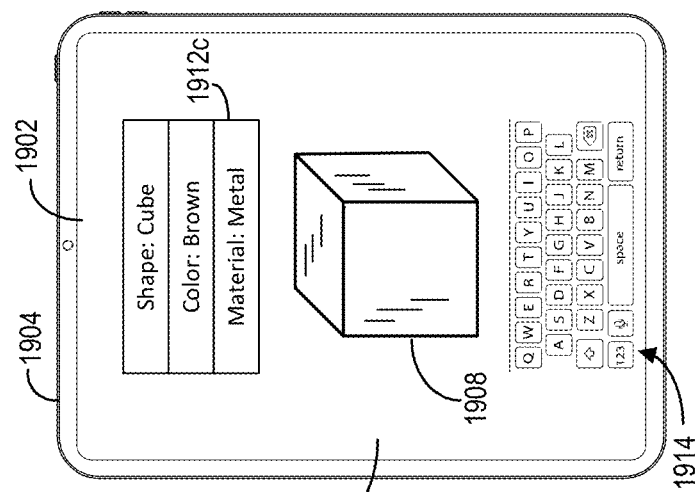
FIGS. 19A-19C illustrate a graphical user interface implemented by the scene-based image editing system to facilitate modifying object attributes of objects portrayed in a digital image in accordance with one or more embodiments.
Figure 19B:
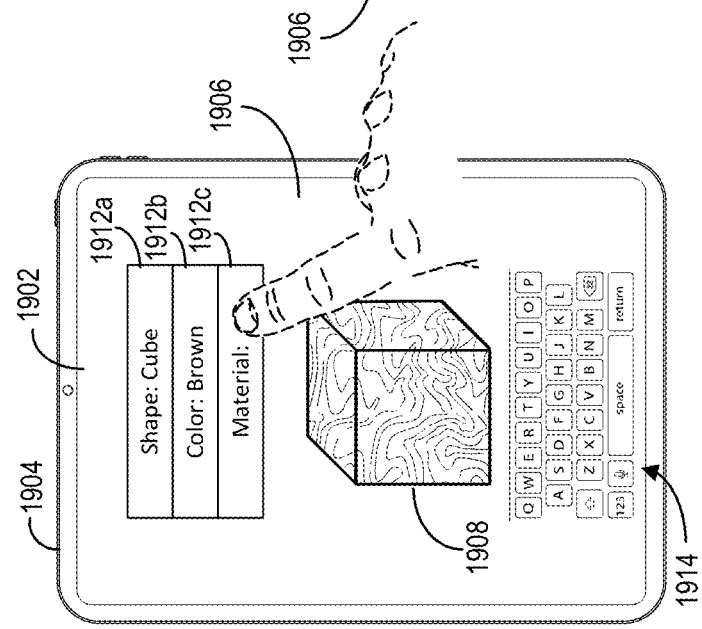
Figure 19A:
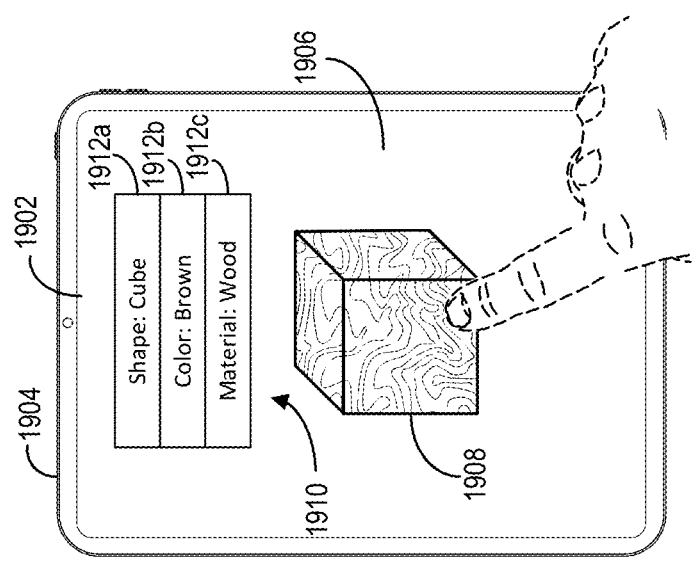

FIGS. 19A-19C illustrate a graphical user interface implemented by the scene-based image editing system 106 to facilitate modifying object attributes of objects portrayed in a digital image in accordance with one or more embodiments. Indeed, though FIGS. 19A-19C particularly show modifying object attributes of objects, it should be noted that the scene-based image editing system 106 similarly modifies attributes of other semantic areas (e.g., background, foreground, ground, sky, etc.) of a digital image in various embodiments.

Indeed, as shown in FIG. 19A, the scene-based image editing system 106 provides a graphical user interface 1902 for display on a client device 1904 and provides a digital image 1906 for display within the graphical user interface 1902. As further shown, the digital image 1906 portrays an object 1908.

As further shown in FIG. 19A, in response to detecting a user interaction with the object 1908, the scene-based image editing system 106 provides an attribute menu 1910 for display within the graphical user interface 1902. In some embodiments, the attribute menu 1910 provides one or more object attributes of the object 1908. Indeed, FIG. 19A shows that the attribute menu 1910 provides object attributes indicators 1912a-1912c, indicating the shape, color, and material of the object 1908, respectively. It should be noted, however, that various alternative or additional object attributes are provided in various embodiments.

In one or more embodiments, the scene-based image editing system 106 retrieves the object attributes for the object attribute indicators 1912a-1912c from a semantic scene graph generated for the digital image 1906. Indeed, in some implementations, the scene-based image editing system 106 generates a semantic scene graph for the digital image 1906 (e.g., before detecting the user interaction with the object 1908). In some cases, the scene-based image editing system 106 determines the object attributes for the object 1908 utilizing an attribute classification neural network and includes the determined object attributes within the semantic scene graph. In some implementations, the scene-based image editing system 106 retrieves the object attributes from a separate storage location.

As shown in FIG. 19B, the scene-based image editing system 106 detects a user interaction with the object attribute indicator 1912c. Indeed, in one or more embodiments, the object attribute indicators 1912a-1912c are interactive. As shown, in response to detecting the user interaction, the scene-based image editing system 106 removes the corresponding object attribute of the object 1908 from display. Further, in response to detecting the user interaction, the scene-based image editing system 106 provides a digital keyboard 1914 for display within the graphical user interface 1902. Thus, the scene-based image editing system 106 provides a prompt for entry of textual user input. In some cases, upon detecting the user interaction with the object attribute indicator 1912c, the scene-based image editing system 106 maintains the corresponding object attribute for display, allowing user interactions to remove the object attribute in confirming that the object attribute has been targeted for modification.

As shown in FIG. 19C, the scene-based image editing system 106 detects one or more user interactions with the digital keyboard 1914 displayed within the graphical user interface 1902. In particular, the scene-based image editing system 106 receives textual user input provided via the digital keyboard 1914. The scene-based image editing system 106 further determines that the textual user input provides a change to the object attribute corresponding to the object attribute indicator 1912c. Additionally, as shown, the scene-based image editing system 106 provides the textual user input for display as part of the object attribute indicator 1912c.

In this case, the user interactions with the graphical user interface 1902 provide instructions to change a material of the object 1908 from a first material (e.g., wood) to a second material (e.g., metal). Thus, upon receiving the textual user input regarding the second material, the scene-based image editing system 106 modifies the digital image 1906 by modifying the object attribute of the object 1908 to reflect the user-provided second material.

In one or more embodiments, the scene-based image editing system 106 utilizes an attribute modification neural network to change the object attribute of the object 1908. In particular, as described above with reference to FIG. 18, the scene-based image editing system 106 provides the digital image 1906 as well as the modification input composed of the first material and the second material provided by the textual user input to the attribute modification neural network. Accordingly, the scene-based image editing system 106 utilizes the attribute modification neural network to provide a modified digital image portraying the object 1908 with the modified object attribute as output.

FIGS. 20A-20C illustrate another graphical user interface implemented by the scene-based image editing system 106 to facilitate modifying object attributes of objects portrayed in a digital image in accordance with one or more embodiments. As shown in FIG. 20A, the scene-based image editing system 106 provides a digital image 2006 portraying an object 2008 for display within a graphical user interface 2002 of a client device 2004. Further, upon detecting a user interaction with the object 2008, the scene-based image editing system 106 provides an attribute menu 2010 having attribute object indicators 2012a-2012c listing object attributes of the object 2008.

As shown in FIG. 20B, the scene-based image editing system 106 detects an additional user interaction with the object attribute indicator 2012a. In response to detecting the additional user interaction, the scene-based image editing system 106 provides an alternative attribute menu 2014 for display within the graphical user interface 2002. In one or more embodiments, the alternative attribute menu 2014 includes one or more options for changing a corresponding object attribute. Indeed, as illustrated in FIG. 20B, the alternative attribute menu 2014 includes alternative attribute indicators 2016a-2016c that provide object attributes that could be used in place of the current object attribute for the object 2008.

As shown in FIG. 20C, the scene-based image editing system 106 detects a user interaction with the alternative attribute indicator 2016b. Accordingly, the scene-based image editing system 106 modifies the digital image 2006 by modifying the object attribute of the object 2008 in accordance with the user input with the alternative attribute indicator 2016b. In particular, the scene-based image editing system 106 modifies the object 2008 to reflect the alternative object attribute associated with the alternative attribute indicator 2016b.

In one or more embodiments, the scene-based image editing system 106 utilizes a textual representation of the alternative object attribute in modifying the object 2008. For instance, as discussed above, the scene-based image editing system 106 provides the textual representation as textual input to an attribute modification neural network and utilizes the attribute modification neural network to output a modified digital image in which the object 2008 reflects the targeted change in its object attribute.

FIGS. 21A-21C illustrate another graphical user interface implemented by the scene-based image editing system 106 to facilitate modifying object attributes of objects portrayed in a digital image in accordance with one or more embodiments. As shown in FIG. 21A, the scene-based image editing system 106 provides a digital image 2106 portraying an object 2108 for display within a graphical user interface 2102 of a client device 2104. Further, upon detecting a user interaction with the object 2108, the scene-based image editing system 106 provides an attribute menu 2110 having attribute object indicators 2112a-2012c listing object attributes of the object 2108.

As shown in FIG. 21B, the scene-based image editing system 106 detects an additional user interaction with the object attribute indicator 2112b. In response to detecting the additional user interaction, the scene-based image editing system 106 provides a slider bar 2114 for display within the graphical user interface 2102. In one or more embodiments, the slider bar 2114 includes a slider element 2116 that indicates a degree to which the corresponding object attribute appears in the digital image 2106 (e.g., the strength or weakness of its presence in the digital image 2106).

As shown in FIG. 21C, the scene-based image editing system 106 detects a user interaction with the slider element 2116 of the slider bar 2114, increasing the degree to which the corresponding object attribute appears in the digital image. Accordingly, the scene-based image editing system 106 modifies the digital image 2106 by modifying the object 2108 to reflect the increased strength in the appearance of the corresponding object attribute.

In particular, in one or more embodiments, the scene-based image editing system 106 utilizes an attribute modification neural network to modify the digital image 2106 in accordance with the user interaction. Indeed, as described above with reference to FIG. 18, the scene-based image editing system 106 is capable of modifying the strength or weakness of the appearance of an object attribute via the coefficient α. Accordingly, in one or more embodiments, the scene-based image editing system 106 adjusts the coefficient α based on the positioning of the slider element 2116 via the user interaction.

By facilitating image modifications that target particular object attributes as described above, the scene-based image editing system 106 provides improved flexibility and efficiency when compared to conventional systems. Indeed, the scene-based image editing system 106 provides a flexible, intuitive approach that visually displays descriptions of an object's attributes and allows user input that interacts with those descriptions to change the attributes. Thus, rather than requiring tedious, manual manipulation of an object attribute as is typical under many conventional systems, the scene-based image editing system 106 allows user interactions to target object attributes at a high level of abstraction (e.g., without having to interact at the pixel level). Further, as scene-based image editing system 106 enables modifications to object attributes via relatively few user interactions with provided visual elements, the scene-based image editing system 106 implements a graphical user interface that provides improved efficiency.

As previously mentioned, in one or more embodiments, the scene-based image editing system 106 further uses a semantic scene graph generated for a digital image to implement relationship-aware object modifications. In particular, the scene-based image editing system 106 utilizes the semantic scene graph to inform the modification behaviors of objects portrayed in a digital image based on their relationships with one or more other objects in the digital image. FIGS. 22A-25D illustrate implementing relationship-aware object modifications in accordance with one or more embodiments.

Indeed, many conventional systems are inflexible in that they require different objects to be interacted with separately for modification. This is often the case even where the different objects are to be modified similarly (e.g., similarly resized or moved). For instance, conventional systems often require separate workflows to be executed via user interactions to modify separate objects or, at least, to perform the preparatory steps for the modification (e.g., outlining the objects and/or separating the objects from the rest of the image). Further, conventional systems typically fail to accommodate relationships between objects in a digital image when executing a modification. Indeed, these systems may modify a first object within a digital image but fail to execute a modification on a second object in accordance with a relationship between the two objects. Accordingly, the resulting modified image can appear unnatural or aesthetically confusing as it does not properly reflect the relationship between the two objects.

Accordingly, conventional systems are also often inefficient in that they require a significant number of user interactions to modify separate objects portrayed in a digital image. Indeed, as mentioned, conventional systems often require separate workflows to be performed via user interactions to execute many of the steps needed in modifying separate objects. Thus, many of the user interactions are redundant in that a user interaction is received, processed, and responded to multiple times for the separate objects. Further, when modifying an object having a relationship with another object, conventional systems require additional user interactions to modify the other object in accordance with that relationship. Thus, these systems unnecessarily duplicate the interactions used (e.g., interactions for moving an object then moving a related object) to perform separate modifications on related objects even where the relationship is suggestive as to the modification to be performed.

The scene-based image editing system 106 provides more flexibility and efficiency over conventional systems by implementing relationship-aware object modifications. Indeed, as will be discussed, the scene-based image editing system 106 provides a flexible, simplified process for selecting related objects for modification. Accordingly, the scene-based image editing system 106 flexibly allows user interactions to select and modify multiple objects portrayed in a digital image via a single workflow. Further, the scene-based image editing system 106 facilitates the intuitive modification of related objects so that the resulting modified image continues to reflect that relationship. As such, digital images modified by the scene-based image editing system 106 provide a more natural appearance when compared to conventional systems.

Further, by implementing a simplified process for selecting and modifying related objects, the scene-based image editing system 106 improves efficiency. In particular, the scene-based image editing system 106 implements a graphical user interface that reduces the user interactions required for selecting and modifying multiple, related objects. Indeed, as will be discussed, the scene-based image editing system 106 processes a relatively small number of user interactions with one object to anticipate, suggest, and/or execute modifications to other objects thus eliminating the need for additional user interactions for those modifications.

Figure 22A:
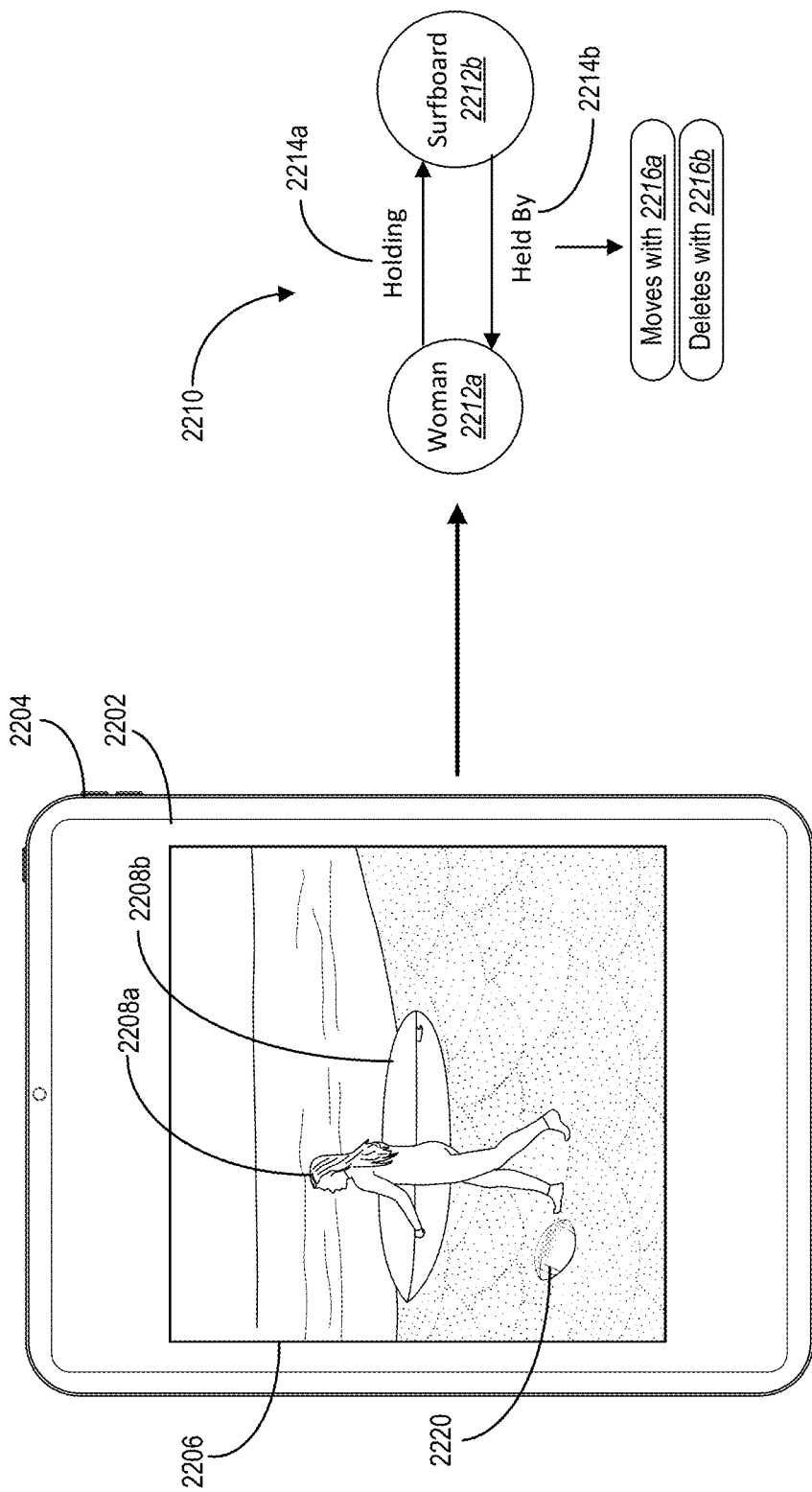

For instance, FIGS. 22A-22D illustrate a graphical user interface implemented by the scene-based image editing system 106 to facilitate a relationship-aware object modification in accordance with one or more embodiments. Indeed, as shown in FIG. 22A, the scene-based image editing system 106 provides, for display within a graphical user interface 2202 of a client device 2204, a digital image 2206 that portrays objects 2208a-2208b and object 2220. In particular, the digital image 2206 portrays a relationship between the objects 2208a-2208b in that the object 2208a is holding the object 2208b.

In one or more embodiments, the scene-based image editing system 106 references the semantic scene graph previously generated for the digital image 2206 to identify the relationship between the objects 2208a-2208b. Indeed, as previously discussed, in some cases, the scene-based image editing system 106 includes relationships among the objects of a digital image in the semantic scene graph generated for the digital image. For instance, in one or more embodiments, the scene-based image editing system 106 utilizes a machine learning model, such as one of the models (e.g., the clustering and subgraph proposal generation model) discussed above with reference to FIG. 15, to determine the relationships between objects. Accordingly, the scene-based image editing system 106 includes the determined relationships within the representation of the digital image in the semantic scene graph. Further, the scene-based image editing system 106 determines the relationship between the objects 2208a-2208b for inclusion in the semantic scene graph before receiving user interactions to modify either one of the objects 2208a-2208b.

Indeed, FIG. 22A illustrates a semantic scene graph component 2210 from a semantic scene graph of the digital image 2206. In particular, the semantic scene graph component 2210 includes a node 2212a representing the object 2208*a* and a node 2212*b* representing the object 2208*b*. Further, the semantic scene graph component 2210 includes relationship indicators 2214*a*-2214*b* associated with the nodes 2212*a*-2212*b*. The relationship indicators 2214*a*-2214*b* indicate the relationship between the objects 2208*a*-2208*b* in that the object 2208*a* is holding the object 2208*b*, and the object 2208*b* is conversely being held by the object 2208*a*.

As further shown, the semantic scene graph component 2210 includes behavior indicators 2216*a*-2216*b* associated with the relationship indicator 2214*b*. The behavior indicators 2216*a*-2216*b* assign a behavior to the object 2208*b* based on its relationship with the object 2208*a*. For instance, the behavior indicator 2216*a* indicates that, because the object 2208*b* is held by the object 2208*a*, the object 2208*b* moves with the object 2208*a*. In other words, the behavior indicator 2216*a* instructs the scene-based image editing system 106 to move the object 2208*b* (or at least suggest that the object 2208*b* be moved) when moving the object 2208*a*. In one or more embodiments, the scene-based image editing system 106 includes the behavior indicators 2216*a*-2216*b* within the semantic scene graph based on the behavioral policy graph used in generating the semantic scene graph. Indeed, in some cases, the behaviors assigned to a "held by" relationship (or other relationships) vary based on the behavioral policy graph used. Thus, in one or more embodiments, the scene-based image editing system 106 refers to a previously generated semantic scene graph to identify relationships between objects and the behaviors assigned based on those relationships.

It should be noted that the semantic scene graph component 2210 indicates that the behaviors of the behavior indicators 2216*a*-2216*b* are assigned to the object 2208*b* but not the object 2208*a*. Indeed, in one or more, the scene-based image editing system 106 assigns behavior to an object based on its role in the relationship. For instance, while it may be appropriate to move a held object when the holding object is moved, the scene-based image editing system 106 determines that the holding object does not have to move when the held object is moved in some embodiments. Accordingly, in some implementations, the scene-based image editing system 106 assigns different behaviors to different objects in the same relationship.

As shown in FIG. 22B, the scene-based image editing system 106 determines a user interaction selecting the object 2208*a*. For instance, the scene-based image editing system 106 determines that user interaction targets the object 2208*a* for modification. As further shown, the scene-based image editing system 106 provides a visual indication 2218 for display to indicate the selection of the object 2208*a*.

As illustrated by FIG. 22C, in response to detecting the user interaction selecting the object 2208*a*, the scene-based image editing system 106 automatically selects the object 2208*b*. For instance, in one or more embodiments, upon detecting the user interaction selecting the object 2208*a*, the scene-based image editing system 106 refers to the semantic scene graph generated for the digital image 2206 (e.g., the semantic scene graph component 2210 that corresponds to the object 2208*a*). Based on the information represented in the semantic scene graph, the scene-based image editing system 106 determines that there is another object in the digital image 2206 that has a relationship with the object 2208*a*. Indeed, the scene-based image editing system 106 determines that the object 2208*a* is holding the object 2208*b*. Conversely, the scene-based image editing system 106 determines that the object 2208*b* is held by the object 2208*a*.

Because the objects 2208*a*-2208*b* have a relationship, the scene-based image editing system 106 adds the object 2208*b* to the selection. As shown in FIG. 22C, the scene-based image editing system 106 modifies the visual indication 2218 of the selection to indicate that the object 2208*b* has been added to the selection. Though FIG. 22C illustrates an automatic selection of the object 2208*b*, in some cases, the scene-based image editing system 106 selects the object 2208*b* based on a behavior assigned to the object 2208*b* within the semantic scene graph in accordance with its relationship with the object 2208*a*. Indeed, in some cases, the scene-based image editing system 106 specifies when a relationship between objects leads to the automatic selection of one object upon the user selection of another object (e.g., via a "selects with" behavior). As shown in FIG. 22C, however, the scene-based image editing system 106 automatically selects the object 2208*b* by default in some instances.

In one or more embodiments, the scene-based image editing system 106 surfaces object masks for the object 2208*a* and the object 2208*b* based on their inclusion within the selection. Indeed, the scene-based image editing system 106 surfaces pre-generated object masks for the objects 2208*a*-2208*b* in anticipation of a modification to the objects 2208*a*-2208*b*. In some cases, the scene-based image editing system 106 retrieves the pre-generated object masks from the semantic scene graph for the digital image 2206 or retrieves a storage location for the pre-generated object masks. In either case, the object masks are readily available at the time the objects 2208*a*-2208*b* are included in the selection and before modification input has been received.

As further shown in FIG. 22C, the scene-based image editing system 106 provides an option menu 2222 for display within the graphical user interface 2202. In one or more embodiments, the scene-based image editing system 106 determines that at least one of the modification options from the option menu 222 would apply to both of the objects 2208*a*-2208*b* if selected. In particular, the scene-based image editing system 106 determines that, based on behavior assigned to the object 2208*b*, a modification selected for the object 2208*a* would also apply to the object 2208*b*.

Indeed, in one or more embodiments, in addition to determining the relationship between the objects 2208*a*-2208*b*, the scene-based image editing system 106 references the semantic scene graph for the digital image 2206 to determine the behaviors that have been assigned based on that relationship. In particular, the scene-based image editing system 106 references the behavior indicators associated with the relationship between the objects 2208*a*-2208*b* (e.g., the behavior indicators 2216*a*-2216*b*) to determine which behaviors are assigned to the objects 2208*a*-2208*b* based on their relationship. Thus, by determining the behaviors assigned to the object 2208*b*, the scene-based image editing system 106 determines how to respond to potential edits.

For instance, as shown in FIG. 22D, the scene-based image editing system 106 deletes the objects 2208*a*-2208*b* together. For instance, in some cases, the scene-based image editing system 106 deletes the objects 2208*a*-2208*b* in response to detecting a selection of the option 2224 presented within the option menu 2222. Accordingly, while the object 2208*a* was targeted for deletion via user interactions, the scene-based image editing system 106 includes the object 2208*b* in the deletion operation based on the behavior assigned to the object 2208*b* via the semantic scene graph (i.e., the "deletes with" behavior). Thus, in some embodiments, the scene-based image editing system 106 implements relationship-aware object modifications by deleting objects based on their relationships to other objects.

As previously suggested, in some implementations, the scene-based image editing system 106 only adds an object to a selection if its assigned behavior specifies that it should be selected with another object. At least, in some cases, the scene-based image editing system 106 only adds the object before receiving any modification input if its assigned behavior specifies that it should be selected with another object. Indeed, in some instances, only a subset of potential edits to a first object are applicable to a second object based on the behaviors assigned to that second object. Thus, including the second object in the selection of the first object before receiving modification input risks violating the rules set forth by the behavioral policy graph via the semantic scene graph if there is not a behavior providing for automatic selection. To avoid this risk, in some implementations, the scene-based image editing system 106 waits until modification input has been received before determining whether to add the second object to the selection. In one or more embodiments, however—as suggested by FIGS. 22A-22D—the scene-based image editing system 106 automatically adds the second object upon detecting a selection of the first object. In such embodiments, the scene-based image editing system 106 deselects the second object upon determining that a modification to the first object does not apply to the second object based on the behaviors assigned to the second object.

As further shown in FIG. 22D, the object 2220 remains in the digital image 2206. Indeed, the scene-based image editing system 106 did not add the object 2220 to the selection in response to the user interaction with the object 2208a, nor did it delete the object 2220 along with the objects 2208a-2208b. For instance, upon referencing the semantic scene graph for the digital image 2206, the scene-based image editing system 106 determines that there is not a relationship between the object 2220 and either of the objects 2208a-2208b (at least, there is not a relationship that applies in this scenario). Thus, the scene-based image editing system 106 enables user interactions to modify related objects together while preventing unrelated objects from being modified without more targeted user interactions.

Additionally, as shown in FIG. 22D, the scene-based image editing system 106 reveals content fill 2226 within the digital image 2206 upon removing the objects 2208a-2208b. In particular, upon deleting the objects 2208a-2208b, the scene-based image editing system 106 exposes a content fill previously generated for the object 2208a as well as a content fill previously generated for the object 2208b. Thus, the scene-based image editing system 106 facilitates seamless modification of the digital image 2206 as if it were a real scene.

FIGS. 23A-23C illustrate another graphical user interface implemented by the scene-based image editing system 106 to facilitate a relationship-aware object modification in accordance with one or more embodiments. Indeed, as shown in FIG. 23A, the scene-based image editing system 106 provides, for display within a graphical user interface 2302 of a client device 2304, a digital image 2306 that portrays objects 2308a-2308b and object 2320. In particular, the digital image 2306 portrays a relationship between the objects 2308a-2308b in that the object 2308a is holding the object 2308b.

As further shown in FIG. 23A, the scene-based image editing system 106 detects a user interaction selecting the object 2308a. In response to detecting the user interaction, the scene-based image editing system 106 provides a suggestion that the object 2308b be added to the selection. In particular, the scene-based image editing system 106 provides a text box 2310 asking if the user wants the object 2308b to be added to the selection and provides an option 2312 for agreeing to add the object 2308b and an option 2314 for declining to add the object 2308b.

In one or more embodiments, the scene-based image editing system 106 provides the suggestion for adding the object 2308b to the selection based on determining the relationship between the objects 2308a-2308b via the semantic scene graph generated for the digital image 2306. In some cases, the scene-based image editing system 106 further provides the suggestion for adding the object 2308b based on the behaviors assigned to the object 2308b based on that relationship.

As suggested by FIG. 23A, the scene-based image editing system 106 does not suggest adding the object 2320 to the selection. Indeed, in one or more embodiments, based on referencing the semantic scene graph, the scene-based image editing system 106 determines that there is no relationship between the object 2320 and either of the objects 2308a-2308b (at least, that there is not a relevant relationship). Accordingly, the scene-based image editing system 106 determines to omit the object 2320 from the suggestion.

As shown in FIG. 23B, the scene-based image editing system 106 adds the object 2308b to the selection. In particular, in response to receiving a user interaction with the option 2312 for agreeing to add the object 2308b, the scene-based image editing system 106 adds the object 2308b to the selection. As shown in FIG. 23B, the scene-based image editing system 106 modifies a visual indication 2316 of the selection to indicate that the object 2308b has been added to the selection along with the object 2308a.

As illustrated in FIG. 23C, the scene-based image editing system 106 modifies the digital image 2306 by moving the object 2308a within the digital image 2306 in response to detecting one or more additional user interactions. Further, the scene-based image editing system 106 moves the object 2308b along with the object 2308a based on the inclusion of the object 2308b in the selection. Accordingly, the scene-based image editing system 106 implements a relationship-aware object modification by moving objects based on their relationship to other objects.

FIGS. 24A-24C illustrate yet another graphical user interface implemented by the scene-based image editing system 106 to facilitate a relationship-aware object modification in accordance with one or more embodiments. Indeed, as shown in FIG. 24A, the scene-based image editing system 106 provides, for display within a graphical user interface 2402 of a client device 2404, a digital image 2406 that portrays objects 2408a-2408b and an object 2420. In particular, the digital image 2406 portrays a relationship between the objects 2408a-2408b in that the object 2408a is holding the object 2408b.

As shown in FIG. 24A, the scene-based image editing system 106 detects a user interaction with the object 2408a. In response to detecting the user interaction, the scene-based image editing system 106 provides an option menu 2410 for display within the graphical user interface 2402. As illustrated, the option menu 2410 includes an option 2412 for deleting the object 2408a.

As shown in FIG. 24B, the scene-based image editing system 106 detects an additional user interaction with the option 2412 for deleting the object 2408a. In response to detecting the additional user interaction, the scene-based image editing system 106 provides, for display, a suggestion for adding the object 2408b to the selection via a text box 2414 asking if the user wants the object 2408b to be added to the selection, an option 2416 for agreeing to add the object 2408b, and an option 2418 for declining to add the object 2308b.

Indeed, as mentioned above, in one or more embodiments, the scene-based image editing system 106 waits upon receiving input to modify a first object before suggesting adding a second object (or automatically adding the second object). Accordingly, the scene-based image editing system 106 determines whether a relationship between the objects and the pending modification indicate that the second object should be added before including the second object in the selection.

To illustrate, in one or more embodiments, upon detecting the additional user interaction with the option 2412, the scene-based image editing system 106 references the semantic scene graph for the digital image 2406. Upon referencing the semantic scene graph, the scene-based image editing system 106 determines that the object 2408a has a relationship with the object 2408b. Further, the scene-based image editing system 106 determines that the behaviors assigned to the object 2408b based on that relationship indicate that the object 2408b should be deleted with the object 2408a. Accordingly, upon receiving the additional user interaction for deleting the object 2408a, the scene-based image editing system 106 determines that the object 2408b should also be deleted and then provides the suggestion to add the object 2408b (or automatically adds the object 2408b) to the selection.

As shown in FIG. 24C, the scene-based image editing system 106 deletes the object 2408a and the object 2408b from the digital image 2406 together. In particular, in response to detecting a user interaction with the option 2416 for adding the object 2408b to the selection, the scene-based image editing system 106 adds the object 2408b and executes the delete operation. In one or more embodiments, upon detecting a user interaction with the option 2418 to decline adding the object 2408b, the scene-based image editing system 106 omits the object 2408b from the selection and only deletes the object 2408a.

Though the above specifically discusses moving objects or deleting objects based on their relationships with other objects, it should be noted that the scene-based image editing system 106 implements various other types of relationship-aware object modifications in various embodiments. For example, in some cases, the scene-based image editing system 106 implements relationship-aware object modifications via resizing modifications, recoloring or retexturing modifications, or compositions. Further, as previously suggested, the behavioral policy graph utilized by the scene-based image editing system 106 is configurable in some embodiments. Thus, in some implementations, the relationship-aware object modifications implemented by the scene-based image editing system 106 change based on user preferences.

In one or more embodiments, in addition to modifying objects based on relationships as described within a behavioral policy graph that is incorporated into a semantic scene graph, the scene-based image editing system 106 modifies objects based on classification relationships. In particular, in some embodiments, the scene-based image editing system 106 modifies objects based on relationships as described by a real-world class description graph that is incorporated into a semantic scene graph. Indeed, as previously discussed, a real-world class description graph provides a hierarchy of object classifications for objects that may be portrayed in a digital image. Accordingly, in some implementations, the scene-based image editing system 106 modifies objects within digital images based on their relationship with other objects via their respective hierarchy of object classifications. For instance, in one or more embodiments, the scene-based image editing system 106 adds objects to a selection for modification based on their relationships with other objects via their respective hierarchy of object classifications. FIGS. 25A-25D illustrate a graphical user interface implemented by the scene-based image editing system 106 to add objects to a selection for modification based on classification relationships in accordance with one or more embodiments.

Figure 25A:
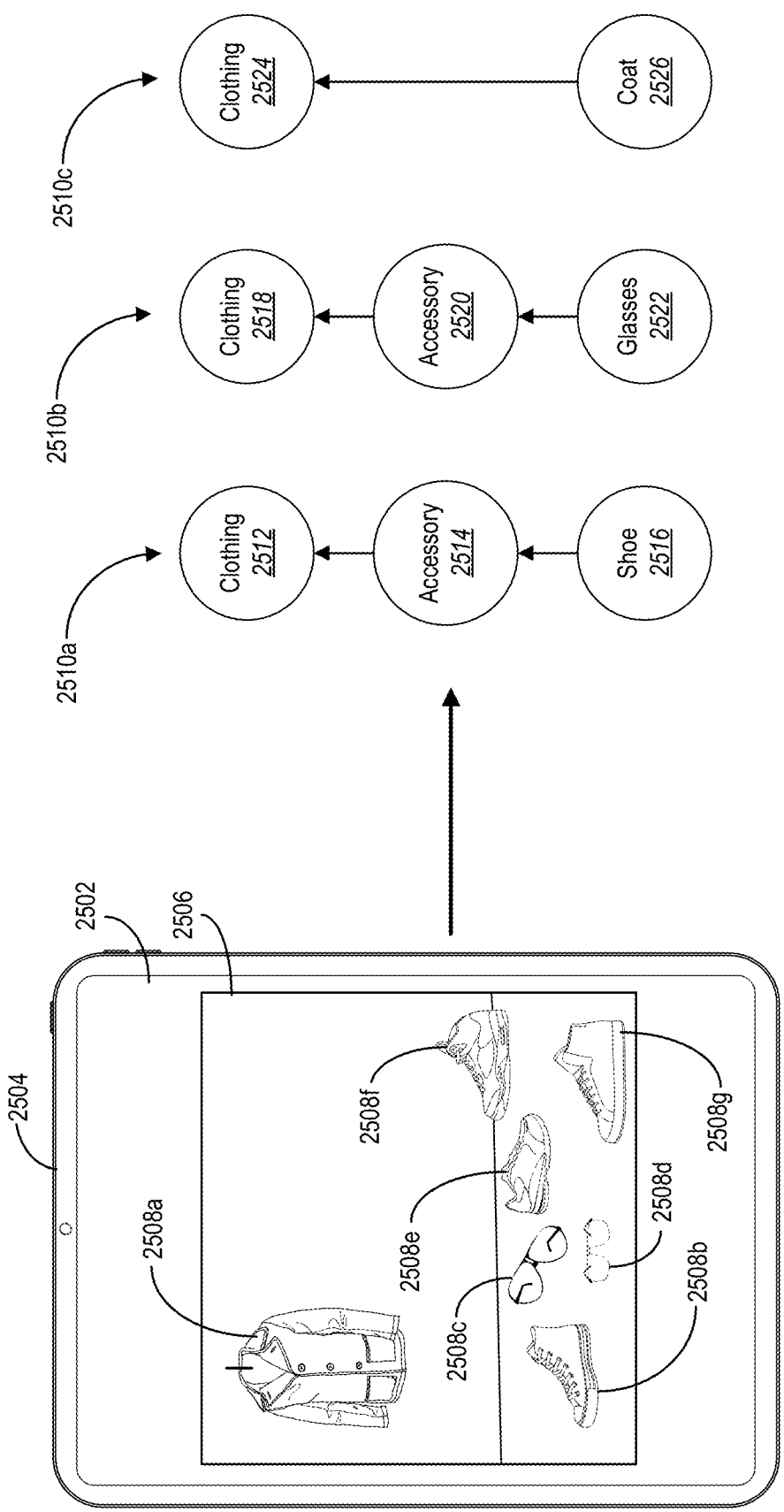
FIGS. 25A-25D illustrate a graphical user interface implemented by the scene-based image editing system to add objects to a selection for modification based on classification relationships in accordance with one or more embodiments.

In particular, FIG. 25A illustrates the scene-based image editing system 106 providing, for display in a graphical user interface 2502 of a client device 2504, a digital image 2506 portraying a plurality of objects 2508a-2508g. In particular, as shown the objects 2508a-2508g include various items, such as shoes, pairs of glasses, and a coat.

FIG. 25A further illustrates semantic scene graph components 2510a-2510c from a semantic scene graph of the digital image 2506. Indeed, the semantic scene graph components 2510a-2510c include portions of a semantic scene graph providing a hierarchy of object classifications for each of the objects 2508a-2508g. Alternatively, in some cases, the semantic scene graph components 2510a-2510c represent portions of the real-world class description graph used in making the semantic scene graph.

As shown in FIG. 25A, the semantic scene graph component 2510a includes a node 2512 representing a clothing class, a node 2514 representing an accessory class, and a node 2516 representing a shoe class. As further shown, the accessory class is a subclass of the clothing class, and the shoe class is a subclass of the accessory class. Similarly, the semantic scene graph component 2510b includes a node 2518 representing the clothing class, a node 2520 representing the accessory class, and a node 2522 representing a glasses class, which is a subclass of the accessory class. Further, the semantic scene graph component 2510c includes a node 2524 representing the clothing class and a node 2526 representing a coat class, which is another subclass of the clothing class. Thus, the semantic scene graph components 2510a-2510c provide various classifications that apply to each of the objects 2508a-2508g. In particular, the semantic scene graph component 2510a provides a hierarchy of object classifications associated with the shoes presented in the digital image 2506, the semantic scene graph component 2510b provides a hierarchy of object classifications associated with the pairs of glasses, and the semantic scene graph component 2510c provides a hierarchy of object classifications associated with the coat.

Figure 25C:
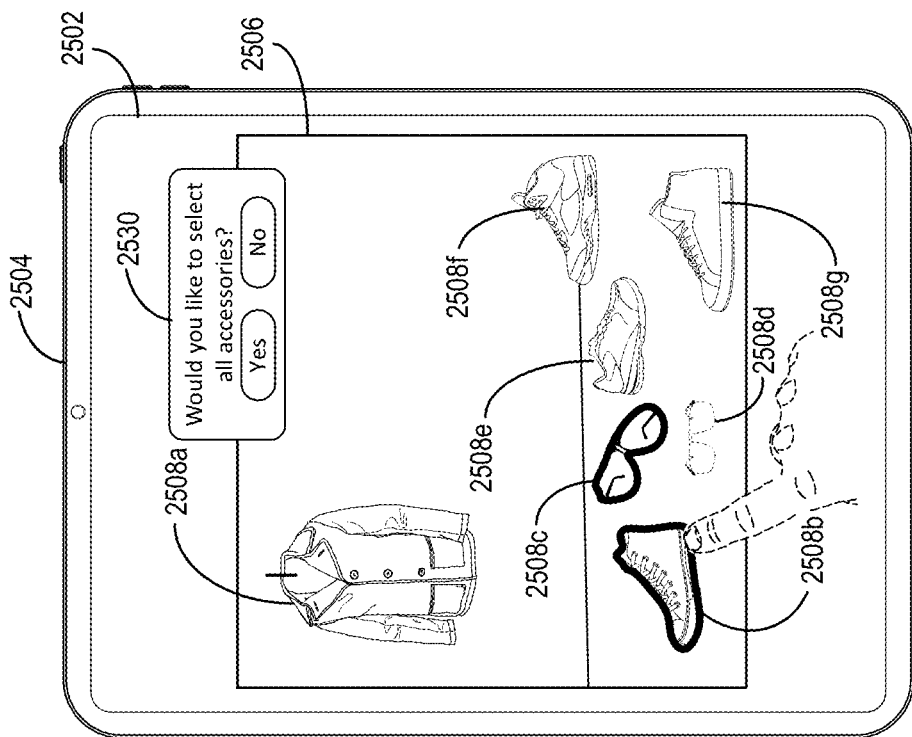
Figure 25B:
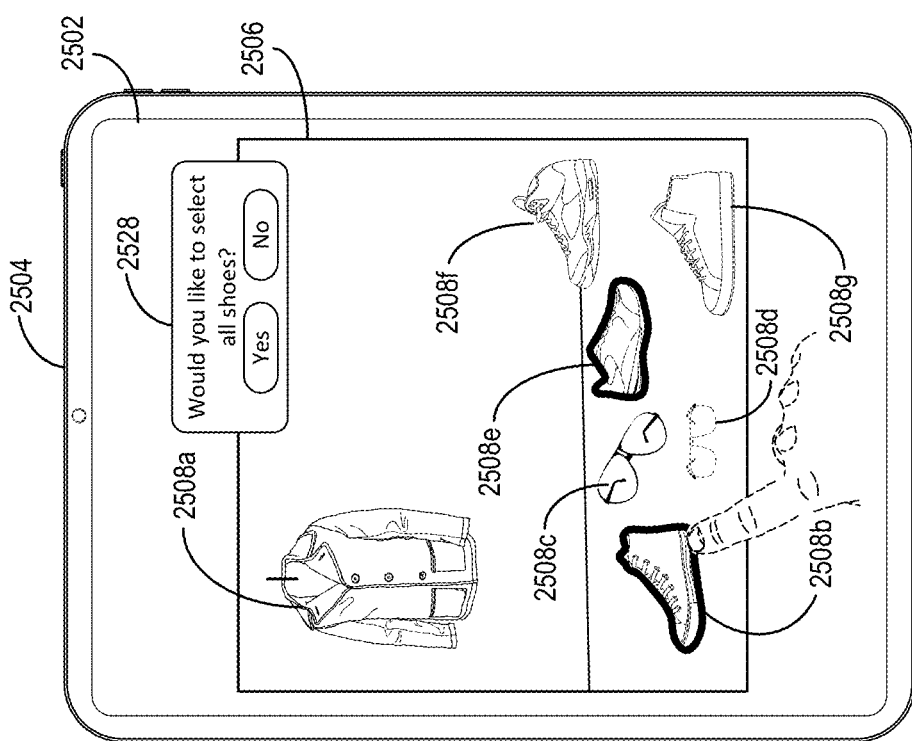

As shown in FIG. 25B, the scene-based image editing system 106 detects a user interaction selecting the object 2508e. Further, the scene-based image editing system 106 detects a user interaction selecting the object 2508b. As further shown, in response to detecting the selection of the object 2508b and the object 2508e, the scene-based image editing system 106 provides a text box 2528 suggesting all shoes in the digital image 2506 be added to the selection.

To illustrate, in some embodiments, in response to detecting the selection of the object 2508b and the object 2508e, the scene-based image editing system 106 references the semantic scene graph generated for the digital image 2506 (e.g., the semantic scene graph components that are associated with the object 2508b and the object 2508e). Based on referencing the semantic scene graph, the scene-based image editing system 106 determines that the object 2508b and the object 2508e are both part of the shoe class. Thus, the scene-based image editing system 106 determines that there is a classification relationship between the object 2508*b* and the object 2508*e* via the shoe class. In one or more embodiments, based on determining that the object 2508*b* and the object 2508*e* are both part of the shoe class, the scene-based image editing system 106 determines that the user interactions providing the selections are targeting all shoes within the digital image 2506. Thus, the scene-based image editing system 106 provides the text box 2528 suggesting adding the other shoes to the selection. In one or more embodiments, upon receiving a user interaction accepting the suggestion, the scene-based image editing system 106 adds the other shoes to the selection.

Similarly, as shown in FIG. 25C, the scene-based image editing system 106 detects a user interaction selecting the object 2508*c* and another user interaction selecting the object 2508*b*. In response to detecting the user interactions, the scene-based image editing system 106 references the semantic scene graph generated for the digital image 2506. Based on referencing the semantic scene graph, the scene-based image editing system 106 determines that the object 2508*b* is part of the shoe class, which is a subclass of the accessory class. In other words, the scene-based image editing system 106 determines that the object 2508*b* is part of the accessory class. Likewise, the scene-based image editing system 106 determines that the object 2508*c* is part of the glasses class, which is a subclass of the accessory class. Thus, the scene-based image editing system 106 determines that there is a classification relationship between the object 2508*b* and the object 2508*c* via the accessory class. As shown in FIG. 25C, based on determining that the object 2508*b* and the object 2508*c* are both part of the accessory class, the scene-based image editing system 106 provides a text box 2530 suggesting adding all other accessories portrayed in the digital image 2506 (e.g., the other shoes and pairs of glasses) to the selection.

Figure 25D:
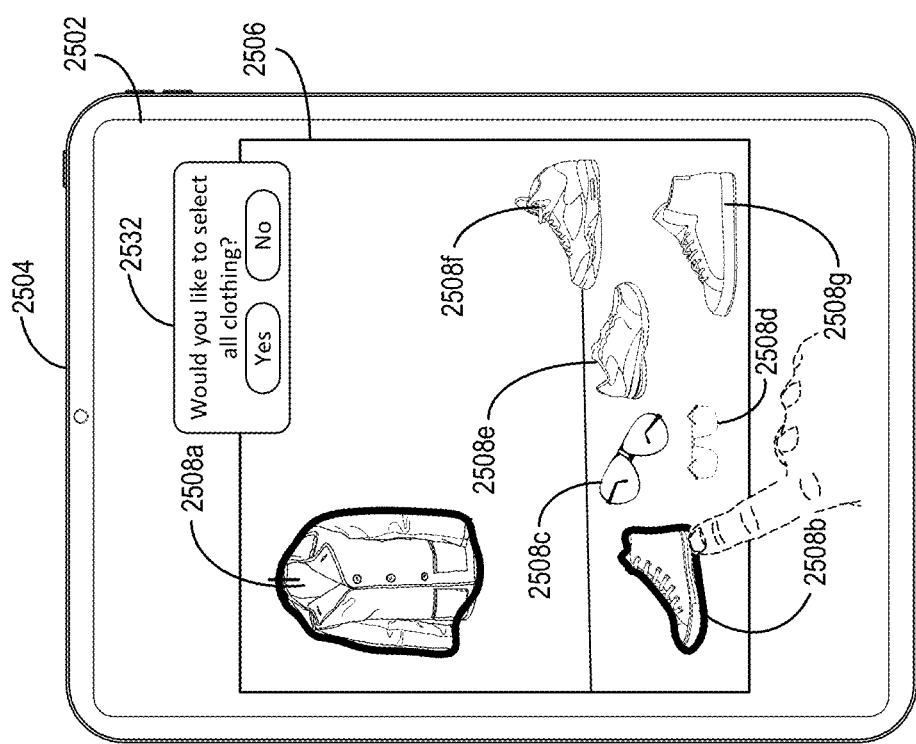

Further, as shown in FIG. 25D, the scene-based image editing system 106 detects a user interaction selecting the object 2508*a* and another user interaction selecting the object 2508*b*. In response to detecting the user interactions, the scene-based image editing system 106 references the semantic scene graph generated for the digital image 2506. Based on referencing the semantic scene graph, the scene-based image editing system 106 determines that the object 2508*b* is part of the shoe class, which is a subclass of the accessory class that is a subclass of the clothing class. Similarly, the scene-based image editing system 106 determines that the object 2508*a* is part of the coat class, which is also a subclass of the clothing class. Thus, the scene-based image editing system 106 determines that there is a classification relationship between the object 2508*b* and the object 2508*a* via the clothing class. As shown in FIG. 25D, based on determining that the object 2508*b* and the object 2508*a* are both part of the clothing class, the scene-based image editing system 106 provides a text box 2532 suggesting adding all other clothing items portrayed in the digital image 2506 to the selection.

Thus, in one or more embodiments, the scene-based image editing system 106 anticipates the objects that are targeted user interactions and facilitates quicker selection of those objects based on their classification relationships. In some embodiments, upon selection of multiple objects via provided suggestions, the scene-based image editing system 106 modifies the selected objects in response to additional user interactions. Indeed, the scene-based image editing system 106 modifies the selected objects together. Thus, the scene-based image editing system 106 implements a graphical user interface that provides a more flexible and efficient approach to selecting and modifying multiple related objects using reduced user interactions.

Indeed, as previously mentioned, the scene-based image editing system 106 provides improved flexibility and efficiency when compared to conventional systems. For instance, by selecting (e.g., automatically or via suggestion) objects based on the selection of related objects, the scene-based image editing system 106 provides a flexible method of targeting multiple objects for modification. Indeed, the scene-based image editing system 106 flexibly identifies the related objects and includes them with the selection. Accordingly, the scene-based image editing system 106 implements a graphical user interface that reduces user interactions typically required under conventional system for selecting and modifying multiple objects.

In one or more embodiments, the scene-based image editing system 106 further pre-processes a digital image to aid in the removal of distracting objects. In particular, the scene-based image editing system 106 utilizes machine learning to identify objects in a digital image, classify one or more of the objects as distracting objects, and facilitate the removal of the distracting objects to provide a resulting image that is more visually cohesive and aesthetically pleasing. Further, in some cases, the scene-based image editing system 106 utilizes machine learning to facilitate the removal of shadows associated with distracting objects. FIGS. 26-39C illustrate diagrams of the scene-based image editing system 106 identifying and removing distracting objects and their shadows from digital images in accordance with one or more embodiments.

Many conventional systems are inflexible in the methods they use for removing distracting human in that they strip control away from users. For instance, conventional systems often remove humans they have classified as distracting automatically. Thus, when a digital image is received, such systems fail to provide the opportunity for user interactions to provide input regarding the removal process. For example, these systems fail to allow user interactions to remove human from the set of humans identified for removal.

Additionally, conventional systems typically fail to flexibly remove all types of distracting objects. For instance, many conventional systems fail to flexibly remove shadows cast by distracting objects and non-human objects. Indeed, while some existing systems identify and remove distracting humans from a digital image, these systems often fail to identify shadows cast by humans or other objects within the digital image. Accordingly, the resulting digital image will still include the influence of a distracting human as its shadow remains despite the distracting human itself being removed. This further causes these conventional systems to require additional user interactions to identify and remove these shadows.

The scene-based image editing system 106 addresses these issues by providing more user control in the removal process while reducing the interactions typically required to delete an object from a digital image. Indeed, as will be explained below, the scene-based image editing system 106 presents identified distracting objects for display as a set of objects selected for removal. The scene-based image editing system 106 further enables user interactions to add objects to this set, remove objects from the set, and/or determine when the selected objects are deleted. Thus, the scene-based image editing system 106 employs a flexible workflow for removing distracting objects based on machine learning and user interactions.

Further, the scene-based image editing system 106 flexibly identifies and removes shadows associated with distracting objects within a digital image. By removing shadows associated with distracting objects, the scene-based image editing system 106 provides a better image result in that distracting objects and additional aspects of their influence within a digital image are removed. This allows for reduced user interaction when compared to conventional systems as the scene-based image editing system 106 does not require additional user interactions to identify and remove shadows.

Figure 26:
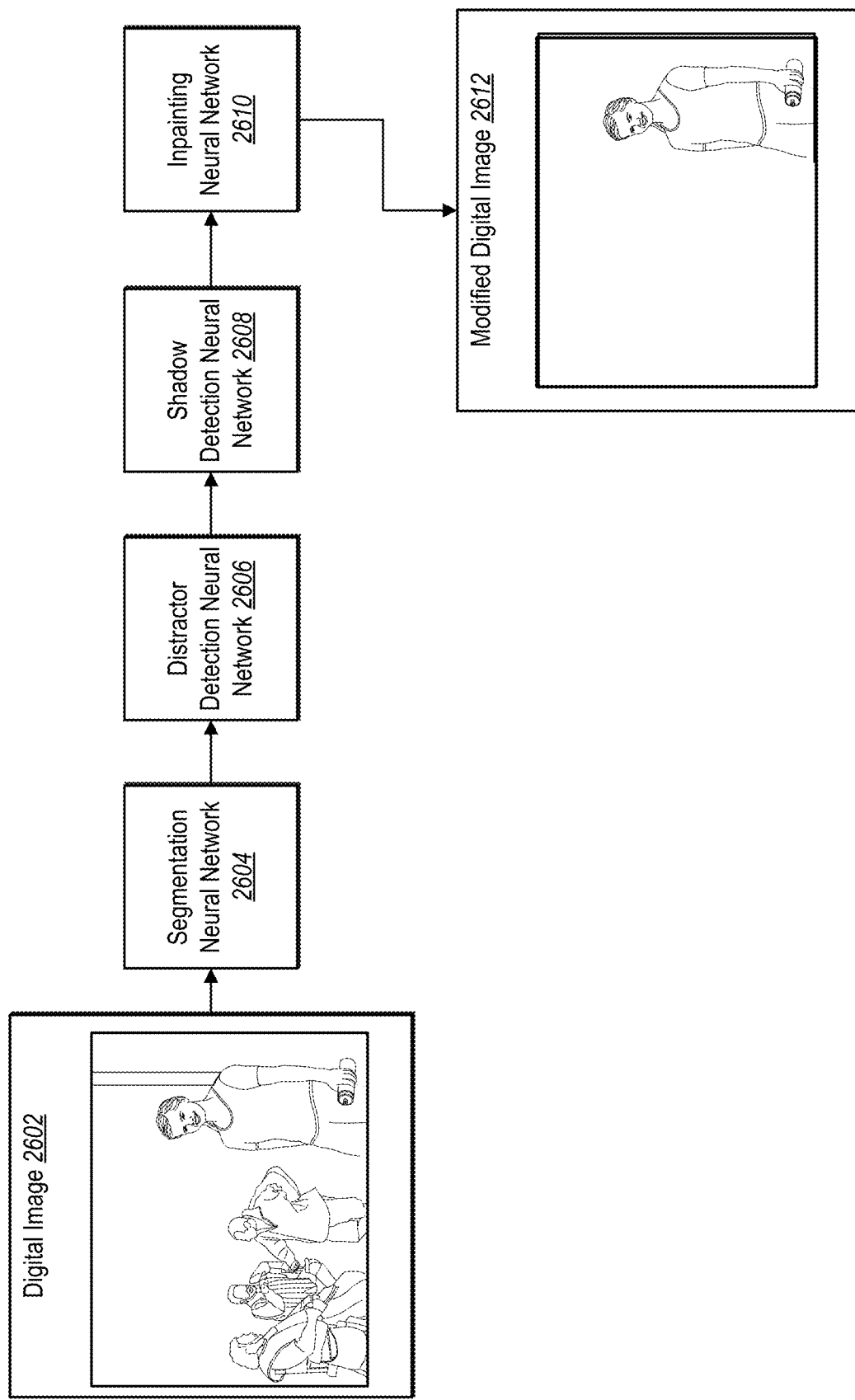
FIG. 26 illustrates a neural network pipeline utilized by the scene-based image editing system to identify and remove distracting objects from a digital image in accordance with one or more embodiments.

FIG. 26 illustrates a neural network pipeline utilized by the scene-based image editing system 106 to identify and remove distracting objects from a digital image in accordance with one or more embodiments. Indeed, as shown in FIG. 26, the scene-based image editing system 106 receives a digital image 2602 that portrays a plurality of objects. As illustrated, the scene-based image editing system 106 provides the digital image 2602 to a pipeline of neural networks comprising a segmentation neural network 2604, a distractor detection neural network 2606, a shadow detection neural network 2608, and an inpainting neural network 2610.

In one or more embodiments, the scene-based image editing system 106 utilizes, as the segmentation neural network 2604, one of the segmentation neural networks discussed above (e.g., the detection-masking neural network 300 discussed with reference to FIG. 3). In some embodiments, the scene-based image editing system 106 utilizes, as the inpainting neural network 2610, one of the content-aware machine learning models discussed above (e.g., the cascaded modulation inpainting neural network 420 discussed with reference to FIG. 4). The distractor detection neural network 2606 and the shadow detection neural network 2608 will be discussed in more detail below.

As shown in FIG. 26, the scene-based image editing system 106 utilizes the pipeline of neural networks to generate a modified digital image 2612 from the digital image 2602. In particular, the scene-based image editing system 106 utilizes the pipeline of neural networks to identify and remove distracting objects from the digital image 2602. In particular, the scene-based image editing system 106 generates an object mask for the objects in the digital image utilizing the segmentation neural network 2604. The scene-based image editing system 106 determines a classification for the objects of the plurality of objects utilizing the distractor detection neural network 2606. More specifically, the scene-based image editing system 106 assigns each object a classification of main subject object or distracting object. The scene-based image editing system 106 removes distracting objects from the digital image utilizing the object masks. Further, the scene-based image editing system 106 utilizes inpainting neural network 2610 to generate content fill for the portions of the digital image 2602 from which the distracting objects were removed to generate the modified digital image 2612. As shown, the scene-based image editing system 106 deletes a plurality of different types of distracting objects (multiple men and a pole). Indeed, the scene-based image editing system 106 is robust enough to identify non-human objects as distracting (e.g., the pole behind the girl).

In one or more embodiments, the scene-based image editing system 106 utilizes a subset of the neural networks shown in FIG. 26 to generate a modified digital image. For instance, in some cases, the scene-based image editing system 106 utilizes the segmentation neural network 2604, the distractor detection neural network 2606, and the content fill 210 to generate a modified digital image from a digital image. Further, in some cases, the scene-based image editing system 106 utilizes a different ordering of the neural networks than what is shown.

Figure 27:
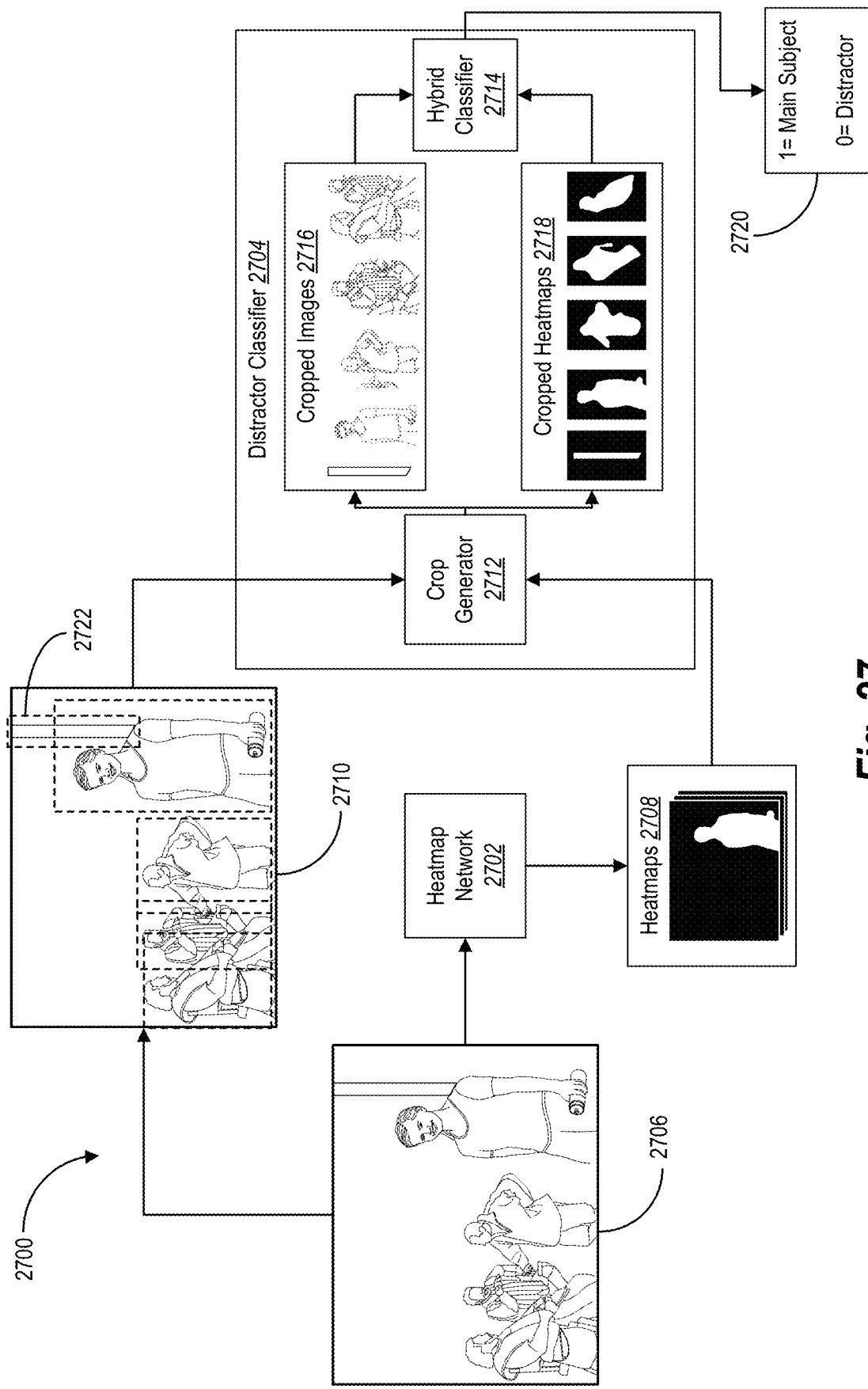
FIG. 27 illustrates an architecture of a distractor detection neural network utilized by the scene-based image editing system to identify and classify distracting objects in of a digital image in accordance with one or more embodiments.

FIG. 27 illustrates an architecture of a distractor detection neural network 2700 utilized by the scene-based image editing system 106 to identify and classify distracting objects in of a digital image in accordance with one or more embodiments. As shown in FIG. 27, the distractor detection neural network 2700 includes a heatmap network 2702 and a distractor classifier 2704.

As illustrated, the heatmap network 2702 operates on an input image 2706 to generate heatmaps 2708. For instance, in some cases, the heatmap network 2702 generates a main subject heatmap representing possible main subject objects and a distractor heatmap representing possible distracting objects. In one or more embodiments, a heatmap (also referred to as a class activation map) includes a prediction made by a convolutional neural network that indicates a probability value, on a scale of zero to one, that a specific pixel of an image belongs to a particular class from a set of classes. As opposed to object detection, the goal of a heatmap network is to classify individual pixels as being part of the same region in some instances. In some cases, a region includes an area of a digital image where all pixels are of the same color or brightness.

In at least one implementation, the scene-based image editing system 106 trains the heatmap network 2702 on whole images, including digital images where there are no distracting objects and digital images that portray main subject objects and distracting objects.

In one or more embodiments, the heatmap network 2702 identifies features in a digital image that contribute to a conclusion that that a given region is more likely to be a distracting object or more likely to be a main subject object, such as body posture and orientation. For instance, in some cases, the heatmap network 2702 determines that objects with slouching postures as opposed to standing at attention postures are likely distracting objects and also that objects facing away from the camera are likely to be distracting objects. In some cases, the heatmap network 2702 considers other features, such as size, intensity, color, etc.

In some embodiments, the heatmap network 2702 classifies regions of the input image 2706 as being a main subject or a distractor and outputs the heatmaps 2708 based on the classifications. For example, in some embodiments, the heatmap network 2702 represents any pixel determined to be part of a main subject object as white within the main subject heatmap and represents any pixel determined to not be part of a main subject object as black (or vice versa). Likewise, in some cases, the heatmap network 2702 represents any pixel determined to be part of a distracting object as white within the distractor heatmap while representing any pixel determined to not be part of a distracting object as black (or vice versa).

In some implementations, the heatmap network 2702 further generates a background heatmap representing a possible background as part of the heatmaps 2708. For instance, in some cases, the heatmap network 2702 determines that the background includes areas that are not part of a main subject object or a distracting object. In some cases, the heatmap network 2702 represents any pixel determined to be part of the background as white within the background heatmap while representing any pixel determined to not be part of the background as black (or vice versa).

In one or more embodiments, the distractor detection neural network 2700 utilizes the heatmaps 2708 output by the heatmap network 2702 as a prior to the distractor classifier 2704 to indicate a probability that a specific region of the input image 2706 contains a distracting object or a main subject object.

In one or more embodiments, the distractor detection neural network 2700 utilizes the distractor classifier 2704 to consider the global information included in the heatmaps 2708 and the local information included in one or more individual objects 2710. To illustrate, in some embodiments, the distractor classifier 2704 generates a score for the classification of an object. If an object in a digital image appears to be a main subject object based on the local information, but the heatmaps 2708 indicate with a high probability that the object is a distracting object, the distractor classifier 2704 concludes that the object is indeed a distracting object in some cases. On the other hand, if the heatmaps 2708 point toward the object being a main subject object, the distractor classifier 2704 determines that the object has been confirmed as a main subject object.

As shown in FIG. 27, the distractor classifier 2704 includes a crop generator 2712 and a hybrid classifier 2714. In one or more embodiments, the distractor classifier 2704 receives one or more individual objects 2710 that have been identified from the input image 2706. In some cases, the one or more individual objects 2710 are identified via user annotation or some object detection network (e.g., the object detection machine learning model 308 discussed above with reference to FIG. 3).

As illustrated by FIG. 27, the distractor classifier 2704 utilizes the crop generator 2712 to generate cropped images 2716 by cropping the input image 2706 based on the locations of the one or more individual objects 2710. For instance, where there are three object detections in the input image 2706, the crop generator 2712 generates three cropped images-one for each detected object. In one or more embodiments, the crop generator 2712 generates a cropped image by removing all pixels of the input image 2706 outside the location of the corresponding inferred bounding region.

As further shown, the distractor classifier 2704 also utilizes the crop generator 2712 to generate cropped heatmaps 2718 by cropping the heatmaps 2708 with respect to each detected object. For instance, in one or more embodiments, the crop generator 2712 generates—from each of the main subject heatmap, the distractor heatmap, and the background heatmap-one cropped heatmap for each of the detected objects based on a region within the heatmaps corresponding to the location of the detected objects.

In one or more embodiments, for each of the one or more individual objects 2710, the distractor classifier 2704 utilizes the hybrid classifier 2714 to operate on a corresponding cropped image (e.g., its features) and corresponding cropped heatmaps (e.g., their features) to determine whether the object is a main subject object or a distracting object. To illustrate, in some embodiments, for a detected object, the hybrid classifier 2714 performs an operation on the cropped image associated with the detected object and the cropped heatmaps associated with the detected object (e.g., the cropped heatmaps derived from the heatmaps 2708 based on a location of the detected object) to determine whether the detected object is a main subject object or a distracting object. In one or more embodiments, the distractor classifier 2704 combines the features of the cropped image for a detected object with the features of the corresponding cropped heatmaps (e.g., via concatenation or appending the features) and provides the combination to the hybrid classifier 2714. As shown in FIG. 27, the hybrid classifier 2714 generates, from its corresponding cropped image and cropped heatmaps, a binary decision 2720 including a label for a detected object as a main subject object or a distracting object.

Figure 28:
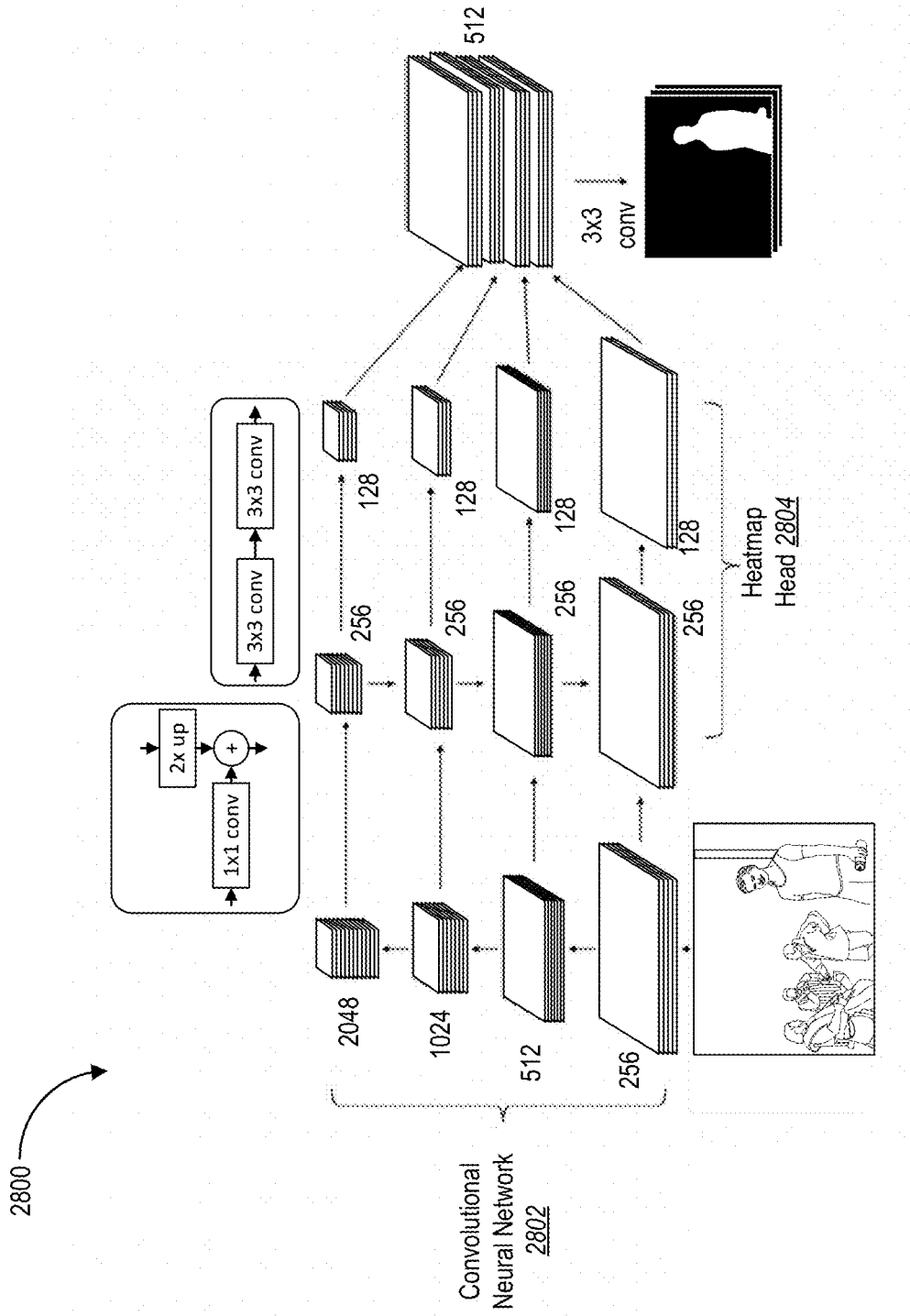
FIG. 28 illustrates an architecture of a heatmap network utilized by the scene-based image editing system as part of a distractor detection neural network in accordance with one or more embodiments.

FIG. 28 illustrates an architecture of a heatmap network 2800 utilized by the scene-based image editing system 106 as part of a distractor detection neural network in accordance with one or more embodiments. As shown in FIG. 28, the heatmap network 2800 includes a convolutional neural network 2802 as its encoder. In one or more embodiments, the convolutional neural network 2802 includes a deep residual network. As further shown in FIG. 28, the heatmap network 2800 includes a heatmap head 2804 as its decoder.

Figure 29:
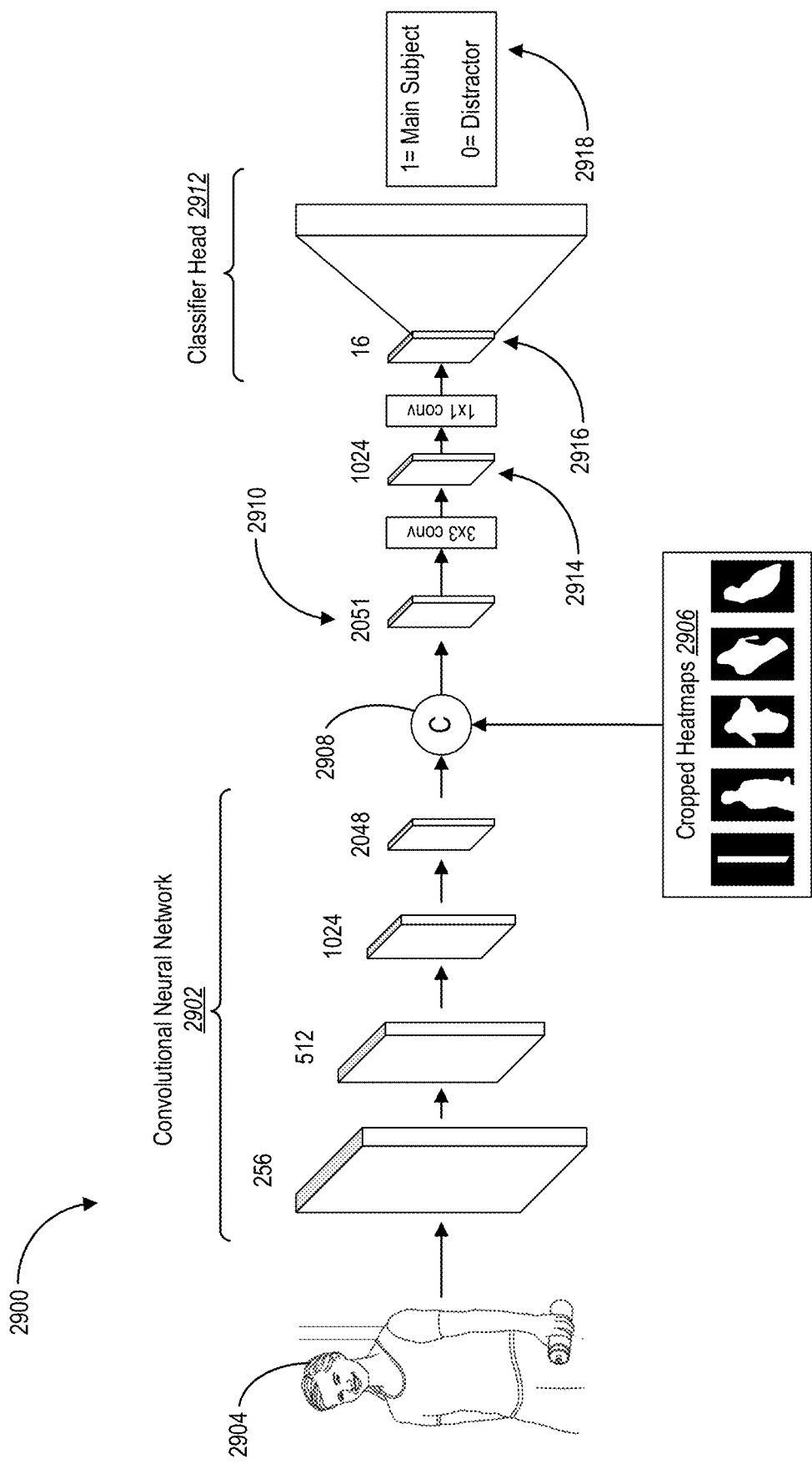
FIG. 29 illustrates an architecture of a hybrid classifier utilized by the scene-based image editing system as part of a distractor detection neural network in accordance with one or more embodiments.

FIG. 29 illustrates an architecture of a hybrid classifier 2900 utilized by the scene-based image editing system 106 as part of a distractor detection neural network in accordance with one or more embodiments. As shown in FIG. 29, the hybrid classifier 2900 includes a convolutional neural network 2902. In one or more embodiments, the hybrid classifier 2900 utilizes the convolutional neural network 2902 as an encoder.

To illustrate, in one or more embodiments, the scene-based image editing system 106 provides the features of a cropped image 2904 to the convolutional neural network 2902. Further, the scene-based image editing system 106 provides features of the cropped heatmaps 2906 corresponding to the object of the cropped image 2904 to an internal layer 2910 of the hybrid classifier 2900. In particular, as shown, in some cases, the scene-based image editing system 106 concatenates the features of the cropped heatmaps 2906 with the output of a prior internal layer (via the concatenation operation 2908) and provides the resulting feature map to the internal layer 2910 of the hybrid classifier 2900. In some embodiments, the feature map includes 2048+N channels, where N corresponds to the channels of the output of the heatmap network and 2048 corresponds to the channels of the output of the prior internal layer (though 2048 is an example).

As shown in FIG. 29, the hybrid classifier 2900 performs a convolution on the output of the internal layer 2910 to reduce the channel depth. Further, the hybrid classifier 2900 performs another convolution on the output of the subsequent internal layer 2914 to further reduce the channel depth. In some cases, the hybrid classifier 2900 applies a pooling to the output of the final internal layer 2916 before the binary classification head 2912. For instance, in some cases, the hybrid classifier 2900 averages the values of the final internal layer output to generate an average value. In some cases, where the average value is above the threshold, the hybrid classifier 2900 classifies the corresponding object as a distracting object and outputs a corresponding binary value; otherwise, the hybrid classifier 2900 classifies the corresponding object as a main subject object and outputs the corresponding binary value (or vice versa). Thus, the hybrid classifier 2900 provides an output 2918 containing a label for the corresponding object.

Figure 30C:
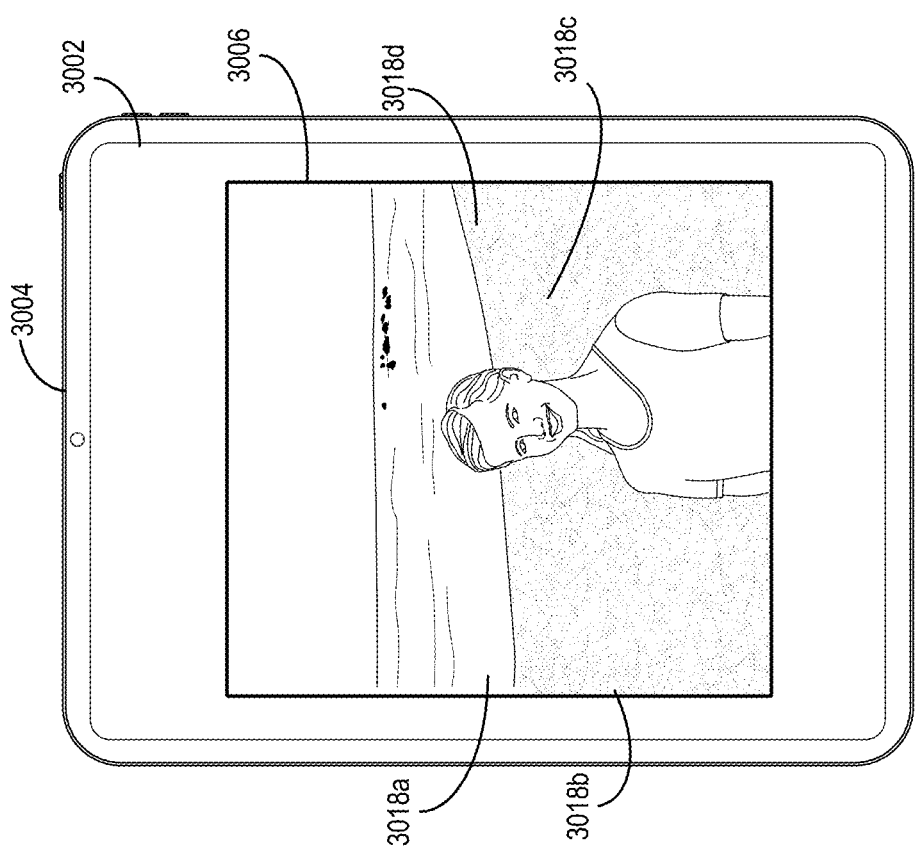

FIGS. 30A-30C illustrate a graphical user interface implemented by the scene-based image editing system 106 to identify and remove distracting objects from a digital image in accordance with one or more embodiments. For instance, as shown in FIG. 30A, the scene-based image editing system 106 provides a digital image 3006 for display within a graphical user interface 3002 of a client device 3004. As further shown, the digital image 3006 portrays an object 3008 and a plurality of additional objects 3010a-3010d.

Additionally, as shown in FIG. 30A, the scene-based image editing system 106 provides a progress indicator 3012 for display within the graphical user interface 3002. In some cases, the scene-based image editing system 106 provides the progress indicator 3012 to indicate that the digital image 3006 is being analyzed for distracting objects. For instance, in some embodiments, the scene-based image editing system 106 provides the progress indicator 3012 while utilizing a distractor detection neural network to identify and classify distracting objects within the digital image 3006. In one or more embodiments, the scene-based image editing system 106 automatically implements the distractor detection neural network upon receiving the digital image 3006 and before receiving user input for modifying one or more of the objects 3010a-3010d. In some implementations, however, the scene-based image editing system 106 waits upon receiving user input before analyzing the digital image 3006 for distracting objects.

As shown in FIG. 30B, the scene-based image editing system 106 provides visual indicators 3014a-3014d for display within the graphical user interface 3002 upon completing the analysis. In particular, the scene-based image editing system 106 provides the visual indicators 3014a-3014d to indicate that the objects 3010a-3010d have been classified as distracting objects.

In one or more embodiments, the scene-based image editing system 106 further provides the visual indicators 3014a-3014d to indicate that the objects 3010a-3010d have been selected for deletion. In some instances, the scene-based image editing system 106 also surfaces the pre-generated object masks for the objects 3010a-3010d in preparation of deleting the objects. Indeed, as has been discussed, the scene-based image editing system 106 pre-generates object masks and content fills for the objects of a digital image (e.g., utilizing the segmentation neural network 2604 and the inpainting neural network 2610 referenced above). Accordingly, the scene-based image editing system 106 has the object masks and content fills readily available for modifying the objects 3010a-3010d.

In one or more embodiments, the scene-based image editing system 106 enables user interactions to add to or remove from the selection of the objects for deletion. For instance, in some embodiments, upon detecting a user interaction with the object 3010a, the scene-based image editing system 106 determines to omit the object 3010a from the deletion operation. Further, the scene-based image editing system 106 removes the visual indication 3014a from the display of the graphical user interface 3002. On the other hand, in some implementations, the scene-based image editing system 106 detects a user interaction with the object 3008 and determines to include the object 3008 in the deletion operation in response. Further, in some cases, the scene-based image editing system 106 provides a visual indication for the object 3008 for display and/or surfaces a pre-generated object mask for the object 3008 in preparation for the deletion.

As further shown in FIG. 30B, the scene-based image editing system 106 provides a removal option 3016 for display within the graphical user interface 3002. In one or more embodiments, in response to detecting a user interaction with the removal option 3016, the scene-based image editing system 106 removes the objects that have been selected for deletion (e.g., the objects 3010a-3010d that had been classified as distracting objects). Indeed, as shown in FIG. 30C, the scene-based image editing system 106 removes the objects 3010a-3010d from the digital image 3006. Further, as shown in 30C, upon removing the objects 3010a-3010d, the scene-based image editing system 106 reveals content fills 3018a-3018d that were previously generated.

By enabling user interactions to control which objects are included in the deletion operation and to further choose when the selected objects are removed, the scene-based image editing system 106 provides more flexibility. Indeed, while conventional systems typically delete distracting objects automatically without user input, the scene-based image editing system 106 allows for the deletion of distracting objects in accordance with user preferences expressed via the user interactions. Thus, the scene-based image editing system 106 flexibly allow for control of the removal process via the user interactions.

Figure 31B:
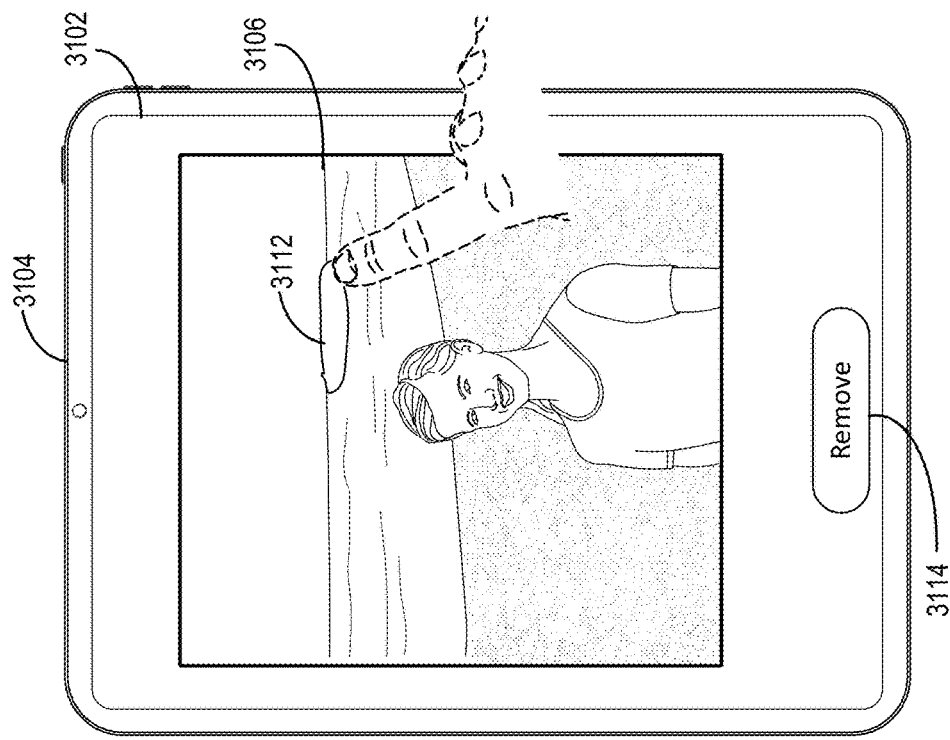
FIGS. 31A-31C illustrate another graphical user interface implemented by the scene-based image editing system to identify and remove distracting objects from a digital image in accordance with one or more embodiments.
Figure 31A:
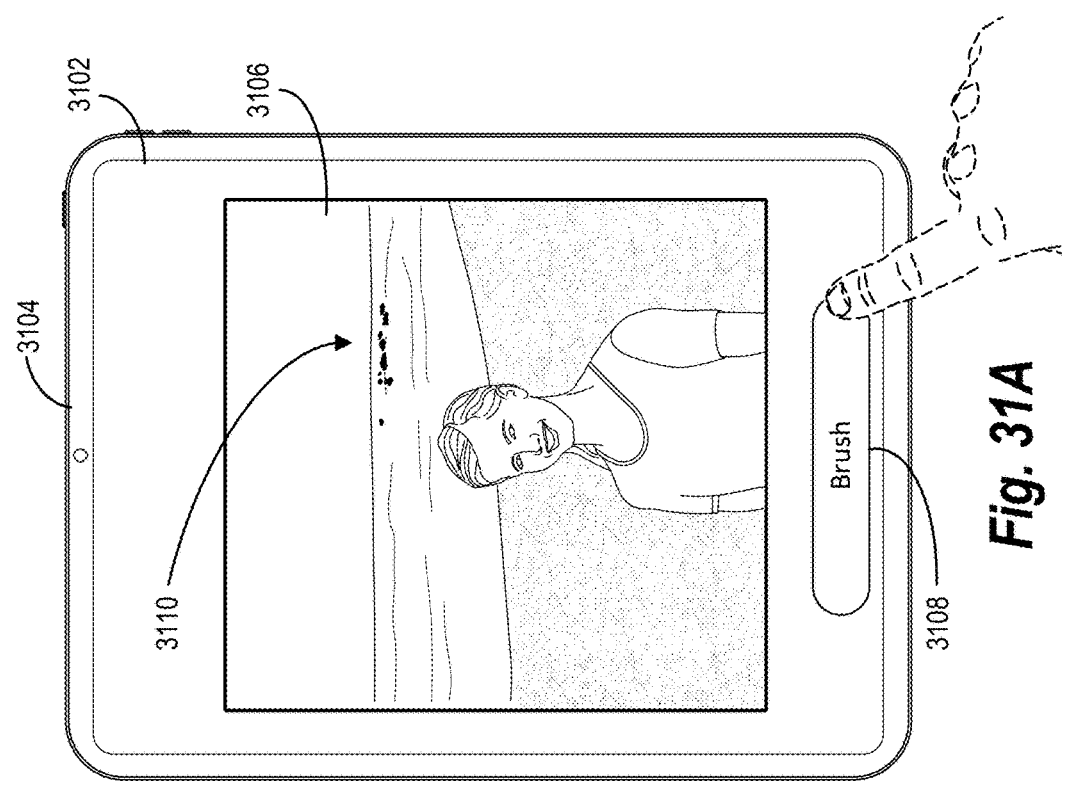
Figure 31C:
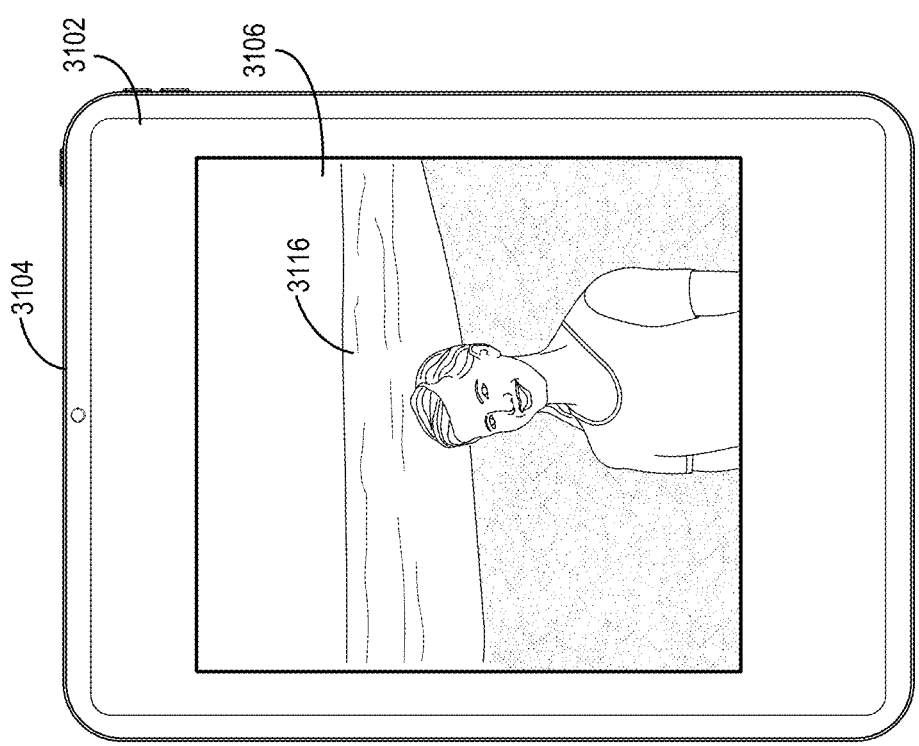

In addition to removing distracting objects identified via a distractor detection neural network, the scene-based image editing system 106 provides other features for removing unwanted portions of a digital image in various embodiments. For instance, in some cases, the scene-based image editing system 106 provides a tool whereby user interactions can target arbitrary portions of a digital image for deletion. FIGS. 31A-31C illustrate a graphical user interface implemented by the scene-based image editing system 106 to identify and remove distracting objects from a digital image in accordance with one or more embodiments.

In particular, FIG. 31A illustrates a digital image 3106 displayed on a graphical user interface 3102 of a client device 3104. The digital image 3106 corresponds to the digital image 3006 of FIG. 30C after distracting objects identified by a distractor detection neural network have been removed. Accordingly, in some cases, the objects remaining in the digital image 3106 represent those objects that were not identified and removed as distracting objects. For instance, in some cases, the collection of objects 3110 near the horizon of the digital image 3106 include objects that were not identified as distracting objects by the distractor detection neural network.

As further shown in FIG. 31A, the scene-based image editing system 106 provides a brush tool option 3108 for display within the graphical user interface 3102. FIG. 31B illustrates that, upon detecting a user interaction with the brush tool option 3108, the scene-based image editing system 106 enables one or more user interactions to use a brush tool to select arbitrary portions of the digital image 3106 (e.g., portions not identified by the distractor detection neural network) for removal. For instance, as illustrated, the scene-based image editing system 106 receives one or more user interactions with the graphical user interface 3102 that target a portion of the digital image 3106 that portrayed the collection of objects 3110.

As indicated by FIG. 31B, via the brush tool, the scene-based image editing system 106 enables free-form user input in some cases. In particular, FIG. 31B shows the scene-based image editing system 106 providing a visual indication 3112 representing the portion of the digital image 3106 selected via the brush tool (e.g., the specific pixels targeted). Indeed, rather than receiving user interactions with previously identified objects or other pre-segmented semantic areas, the scene-based image editing system 106 uses the brush tool to enable arbitrary selection of various portions of the digital image 3106. Accordingly, the scene-based image editing system 106 utilizes the brush tool to provide additional flexibility whereby user interactions is able to designate undesirable areas of a digital image that may not be identified by machine learning.

As further shown in FIG. 31B, the scene-based image editing system 106 provides a remove option 3114 for display within the graphical user interface 3102. As illustrated in FIG. 31C, in response to detecting a user interaction with the remove option 3114, the scene-based image editing system 106 removes the selected portion of the digital image 3106. Further, as shown, the scene-based image editing system 106 fills in the selected portion with a content fill 3116. In one or more embodiments, where the portion removed from the digital image 3106 does not include objects for which content fill was previously selected (or otherwise includes extra pixels not included in previously generated content fill), the scene-based image editing system 106 generates the content fill 3116 after removing the portion of the digital image 3106 selected via the brush tool. In particular, the scene-based image editing system 106 utilizes a content-aware hole-filling machine learning model to generate the content fill 3116 after the selected portion is removed.

Figure 32A:
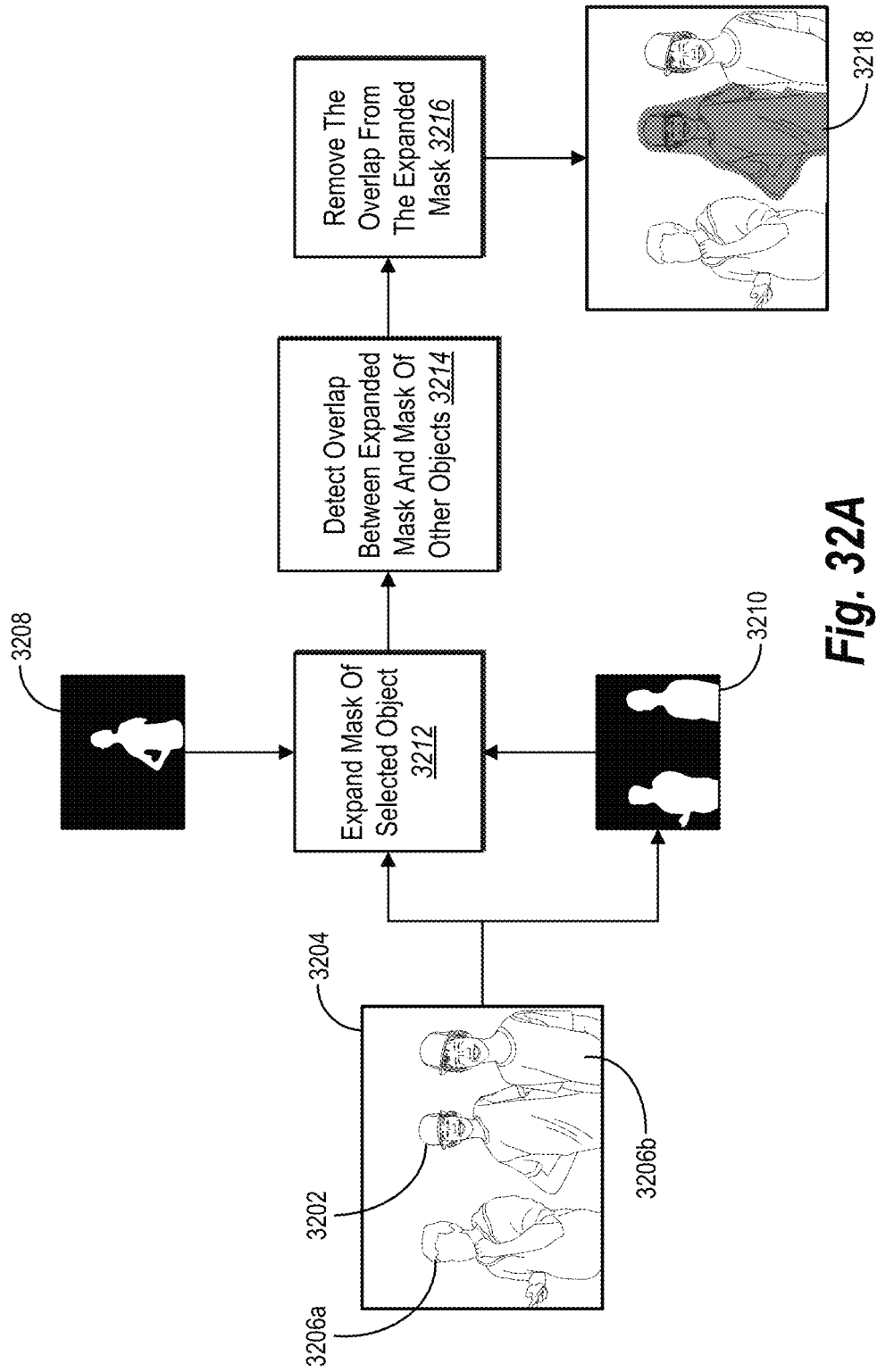
FIGS. 32A-32B illustrate the scene-based image editing system utilizing smart dilation to remove an object from a digital image in accordance with one or more embodiments.

In one or more embodiments, the scene-based image editing system 106 further implements smart dilation when removing objects, such as distracting objects, from digital images. For instance, in some cases, the scene-based image editing system 106 utilizes smart dilation to remove objects that touch, overlap, or are proximate to other objects portrayed in a digital image. FIG. 32A illustrates the scene-based image editing system 106 utilizes smart dilation to remove an object from a digital image in accordance with one or more embodiments.

Often, conventional systems remove objects from digital images utilizing tight masks (e.g., a mask that tightly adheres to the border of the corresponding object). In many cases, however, a digital image includes color bleeding or artifacts around the border of an object. For instance, there exist some image formats (JPEG) that are particularly susceptible to having format-related artifacts around object borders. Using tight masks when these issues are present causes undesirable effects in the resulting image. For example, inpainting models are typically sensitive to these image blemishes, creating large artifacts when operating directly on the segmentation output. Thus, the resulting modified images inaccurately capture the user intent in removing an object by creating additional image noise.

Thus, the scene-based image editing system 106 dilates (e.g., expands) the object mask of an object to avoid associated artifacts when removing the object. Dilating objects masks, however, presents the risk of removing portions of other objects portrayed in the digital image. For instance, where a first object to be removed overlaps, touches, or is proximate to a second object, a dilated mask for the first object will often extend into the space occupied by the second object. Thus, when removing the first object using the dilated object mask, significant portions of the second object are often removed and the resulting hole is filled in (generally improperly), causing undesirable effects in the resulting image. Accordingly, the scene-based image editing system 106 utilizes smart dilation to avoid significantly extending the object mask of an object to be removed into areas of the digital image occupied by other objects.

As shown in FIG. 32A, the scene-based image editing system 106 determines to remove an object 3202 portrayed in a digital image 3204. For instance, in some cases, the scene-based image editing system 106 determines (e.g., via a distractor detection neural network) that the object 3202 is a distracting object. In some implementations, the scene-based image editing system 106 receives a user selection of the object 3202 for removal. The digital image 3204 also portrays the objects 3206a-3206b. As shown, the object 3202 selected for removal overlaps with the object 3206b in the digital image 3204.

As further illustrated in FIG. 32A, the scene-based image editing system 106 generates an object mask 3208 for the object 3202 to be removed and a combined object mask 3210 for the objects 3206a-3206b. For instance, in some embodiments, the scene-based image editing system 106 generates the object mask 3208 and the combined object mask 3210 from the digital image 3204 utilizing a segmentation neural network. In one or more embodiments, the scene-based image editing system 106 generates the combined object mask 3210 by generating an object mask for each of the objects 3206a-3206b and determining the union between the separate object masks.

Additionally, as shown in FIG. 32A, the scene-based image editing system 106 performs an act 3212 of expanding the object mask 3208 for the object 3202 to be removed. In particular, the scene-based image editing system 106 expands the representation of the object 3202 within the object mask 3208. In other words, the scene-based image editing system 106 adds pixels to the border of the representation of the object within the object mask 3208. The amount of expansion varies in various embodiments and, in some implementations, is configurable to accommodate user preferences. For example, in one or more implementations, the scene-based image editing system 106 expands the object mask by extending the object mask outward ten, fifteen, twenty, twenty-five, or thirty pixels.

After expanding the object mask 3208, the scene-based image editing system 106 performs an act 3214 of detecting overlap between the expanded object mask for the object 3202 and the object masks of the other detected objects 3206a-3206b (i.e., the combined object mask 3210). In particular, the scene-based image editing system 106 determines where pixels corresponding to the expanded representation of the object 3202 within the expanded object mask overlap pixels corresponding to the objects 3206a-3206b within the combined object mask 3210. In some cases, the scene-based image editing system 106 determines the union between the expanded object mask and the combined object mask 3210 and determines the overlap using the resulting union. The scene-based image editing system 106 further performs an act 3216 of removing the overlapping portion from the expanded object mask for the object 3202. In other words, the scene-based image editing system 106 removes pixels from the representation of the object 3202 within the expanded object mask that overlaps with the pixels corresponding to the object 3206a and/or the object 3206b within the combined object mask 3210.

Thus, as shown in FIG. 32A, the scene-based image editing system 106 generates a smartly dilated object mask 3218 (e.g., an expanded object mask) for the object 3202 to be removed. In particular, the scene-based image editing system 106 generates the smartly dilated object mask 3218 by expanding the object mask 3208 in areas that don't overlap with either one of the objects 3206a-3206b and avoiding expansion in areas that do overlap with at least one of the objects 3206a-3206b. At least, in some implementations, the scene-based image editing system 106 reduces the expansion in areas that do overlap. For instance, in some cases, the smartly dilated object mask 3218 still includes expansion in overlapping areas but the expansion is significantly less when compared to areas where there is no overlap. In other words, the scene-based image editing system 106 expands using less pixels in areas where there is overlap. For example, in one or more implementations, the scene-based image editing system 106 expands or dilates an object mask five, ten, fifteen, or twenty times as far into areas where there is no overlap compared to areas where there are overlaps.

To describe it differently, in one or more embodiments, the scene-based image editing system 106 generates the smartly dilated object mask 3218 (e.g., an expanded object mask) by expanding the object mask 3208 for the object 3202 into areas not occupied by the object masks for the objects 3206a-3206b (e.g., areas not occupied by the objects 3206a-3206b themselves). For instance, in some cases, the scene-based image editing system 106 expands the object mask 3208 into portions of the digital image 3204 that abut the object mask 3208. In some cases, the scene-based image editing system 106 expands the object mask 3208 into the abutting portions by a set number of pixels. In some implementations, the scene-based image editing system 106 utilizes a different number of pixels for expanding the object mask 3208 into different abutting portions (e.g., based on detecting a region of overlap between the object mask 3208 and other object masks).

To illustrate, in one or more embodiments, the scene-based image editing system 106 expands the object mask 3208 into the foreground and the background of the digital image 3204. In particular, the scene-based image editing system 106 determines foreground by combining the object masks of objects not to be deleted. The scene-based image editing system 106 expands the object mask 3208 into the abutting foreground and background. In some implementations, the scene-based image editing system 106 expands the object mask 3208 into the foreground by a first amount and expands the object mask 3208 into the background by a second amount that differs from the first amount (e.g., the second amount is greater than the first amount). For example, in one or more implementations the scene-based image editing system 106 expands the object mask by twenty pixels into background areas and two pixels into foreground areas (into abutting object masks, such as the combined object mask 3210).

In one or more embodiments, the scene-based image editing system 106 determines the first amount to use for the expanding the object mask 3208 into the foreground by expanding the object mask 3208 into the foreground by the second amount—the same amount used to expand the object mask 3208 into the background. In other words, the scene-based image editing system 106 expands the object mask 3208 as a whole into the foreground and background by the same amount (e.g., using the same number of pixels). The scene-based image editing system 106 further determines a region of overlap between the expanded object mask and the object masks corresponding to the other objects 3206a-3206b (e.g., the combined object mask 3210). In one or more embodiments, the region of overlap exists in the foreground of the digital image 3204 abutting the object mask 3208. Accordingly, the scene-based image editing system 106 reduces the expansion of the object mask 3208 into the foreground so that the expansion corresponds to the second amount. Indeed, in some instances, the scene-based image editing system 106 removes the region of overlap from the expanded object mask for the object 3202 (e.g., removes the overlapping pixels). In some cases, scene-based image editing system 106 removes a portion of the region of overlap rather than the entire region of overlap, causing a reduced overlap between the expanded object mask for the object 3202 and the object masks corresponding to the objects 3206a-3206b.

In one or more embodiments, as removing the object 3202 includes removing foreground and background abutting the smartly dilated object mask 3218 (e.g., the expanded object mask) generated for the object 3202, the scene-based image editing system 106 inpaints a hole remaining after the removal. In particular, the scene-based image editing system 106 inpaints a hole with foreground pixels and background pixels. Indeed, in one or more embodiments, the scene-based image editing system 106 utilizes an inpainting neural network to generate foreground pixels and background pixels for the resulting hole and utilizes the generated pixels to inpaint the hole, resulting in a modified digital image (e.g., an inpainted digital image) where the object 3202 has been removed and the corresponding portion of the digital image 3204 has been filled in.

Figure 32B:
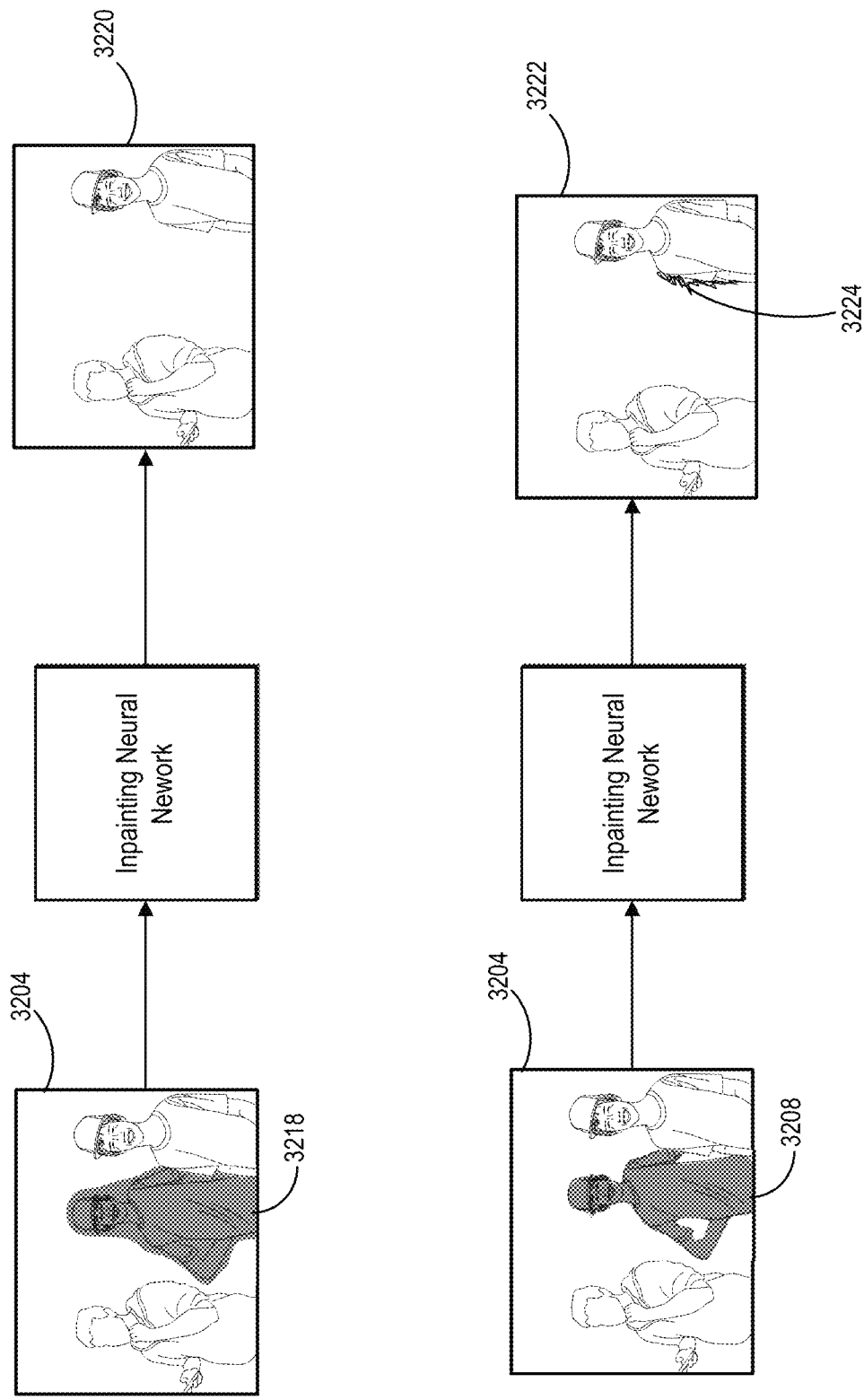

For example, FIG. 32B illustrates the advantages provided by intelligently dilating object masks prior to performing inpainting. In particular, FIG. 32B illustrates that when the smartly dilated object mask 3218 (e.g., the expanded object mask) is provided to an inpainting neural network (e.g., the cascaded modulation inpainting neural network 420) as an area to fill, the inpainting neural network generates a modified digital image 3220 with the area corresponding to the smartly dilated object mask 3218 filled with pixel generated by the inpainting neural network. As shown, the modified digital image 3220 includes no artifacts in the inpainted area corresponding to the smartly dilated object mask 3218. Indeed, the modified digital image 3220 provides a realistic appearing image.

In contrast, FIG. 32B illustrates that when the object mask 3208 (e.g., the non-expanded object mask) is provided to an inpainting neural network (e.g., the cascaded modulation inpainting neural network 420) as an area to fill, the inpainting neural network generates a modified digital image 3222 with the area corresponding to the smartly dilated object mask 3218 filled with pixel generated by the inpainting neural network. As shown, the modified digital image 3222 includes artifacts in the inpainted area corresponding to the object mask 3208. In particular, artifacts are along the back of the girl and event in the generated water.

By generating smartly dilated object masks, the scene-based image editing system 106 provides improved image results when removing objects. Indeed, the scene-based image editing system 106 leverages expansion to remove artifacts, color bleeding, or other undesirable errors in a digital image but avoids removing significant portions of other objects that are remain in the digital image. Thus, the scene-based image editing system 106 is able to fill in holes left by removed objects without enhancing present errors where possible without needlessly replacing portions of other objects that remain.

As previously mentioned, in one or more embodiments, the scene-based image editing system 106 further utilizes a shadow detection neural network to detect shadows associated with distracting objects portrayed within a digital image. FIGS. 33-38 illustrate diagrams of a shadow detection neural network utilized by the scene-based image editing system 106 to detect shadows associated with objects in accordance with one or more embodiments.

Figure 33:
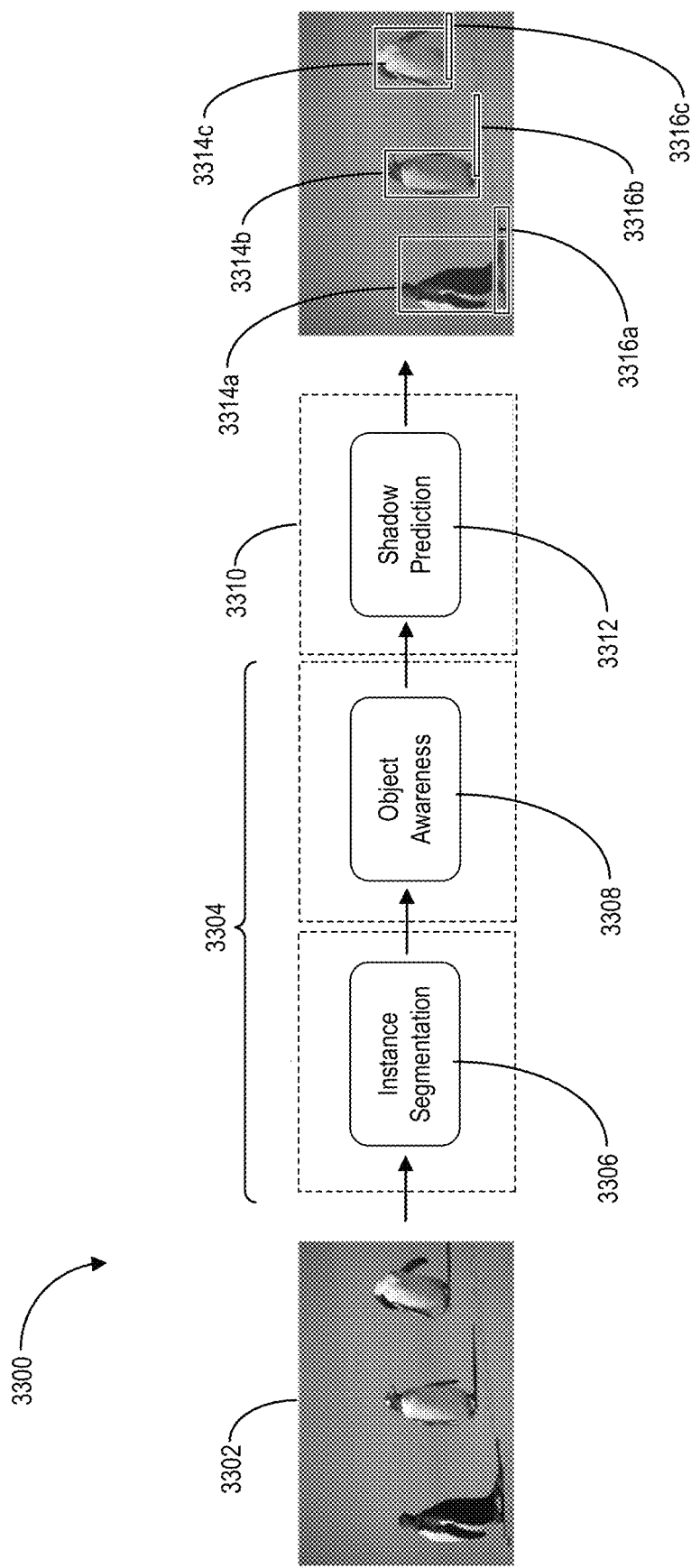
FIG. 33 illustrates an overview of a shadow detection neural network in accordance with one or more embodiments.

In particular, FIG. 33 illustrates an overview of a shadow detection neural network 3300 in accordance with one or more embodiments. Indeed, as shown in FIG. 33, the shadow detection neural network 3300 analyzes an input image 3302 via a first stage 3304 and a second stage 3310. In particular, the first stage 3304 includes an instance segmentation component 3306 and an object awareness component 3308. Further, the second stage 3310 includes a shadow prediction component 3312. In one or more embodiments, the instance segmentation component 3306 includes the segmentation neural network 2604 of the neural network pipeline discussed above with reference to FIG. 26.

As shown in FIG. 33, after analyzing the input image 3302, the shadow detection neural network 3300 identifies objects 3314a-3314c and shadows 3316a-3316c portrayed therein. Further, the shadow detection neural network 3300 associates the objects 3314a-3314c with their respective shadows. For instance, the shadow detection neural network 3300 associates the object 3314a with the shadow 3316a and likewise for the other objects and shadows. Thus, the shadow detection neural network 3300 facilitates inclusion of a shadow when its associated object is selected for deletion, movement, or some other modification.

Figure 34:
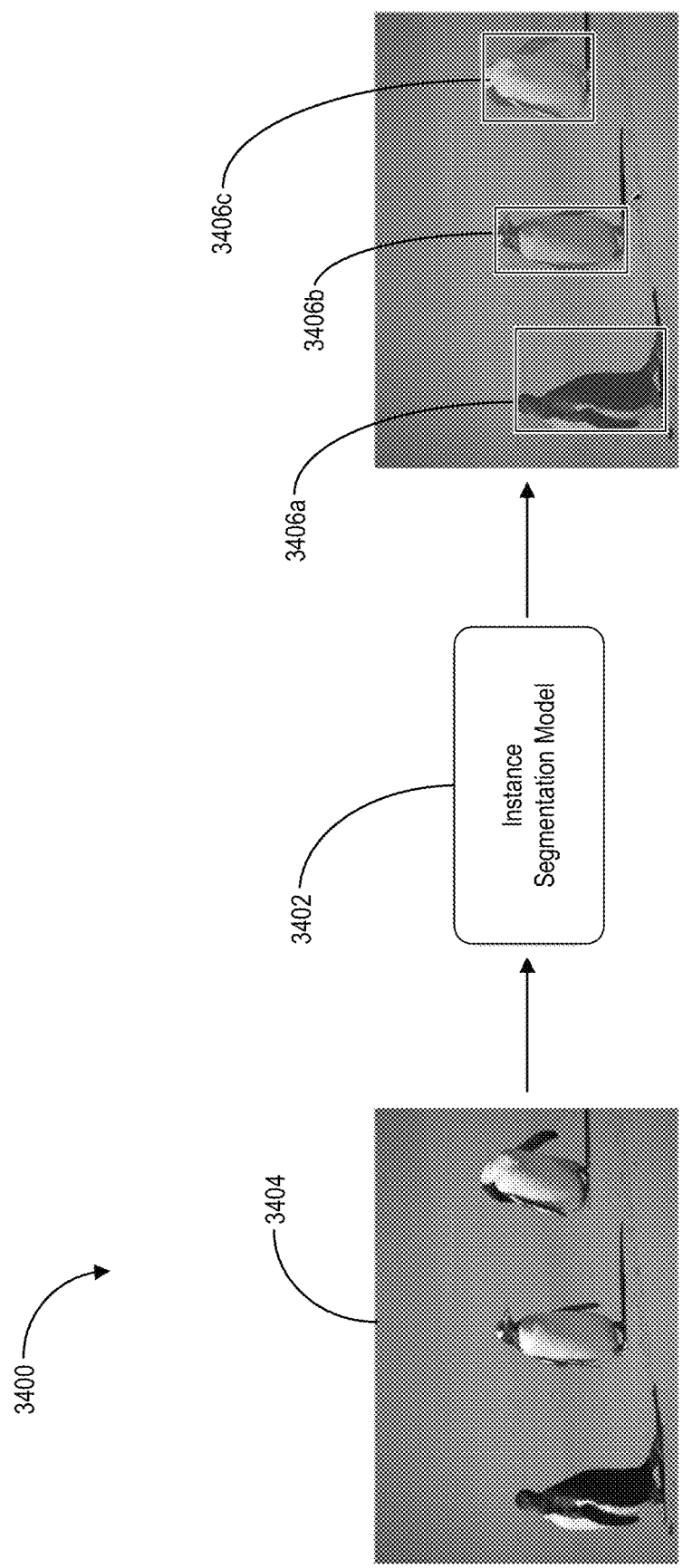
FIG. 34 illustrates an overview of an instance segmentation component of a shadow detection neural network in accordance with one or more embodiments.

FIG. 34 illustrates an overview of an instance segmentation component 3400 of a shadow detection neural network in accordance with one or more embodiments. As shown in FIG. 34, the instance segmentation component 3400 implements an instance segmentation model 3402. In one or more embodiments, the instance segmentation model 3402 includes the detection-masking neural network 300 discussed above with reference to FIG. 3. As shown in FIG. 34, the instance segmentation component 3400 utilizes the instance segmentation model 3402 to analyze an input image 3404 and identify objects 3406a-3406c portrayed therein based on the analysis. For instance, in some cases, the scene-based image editing system 106 outputs object masks and/or bounding boxes for the objects 3406a-3406c.

Figure 35:
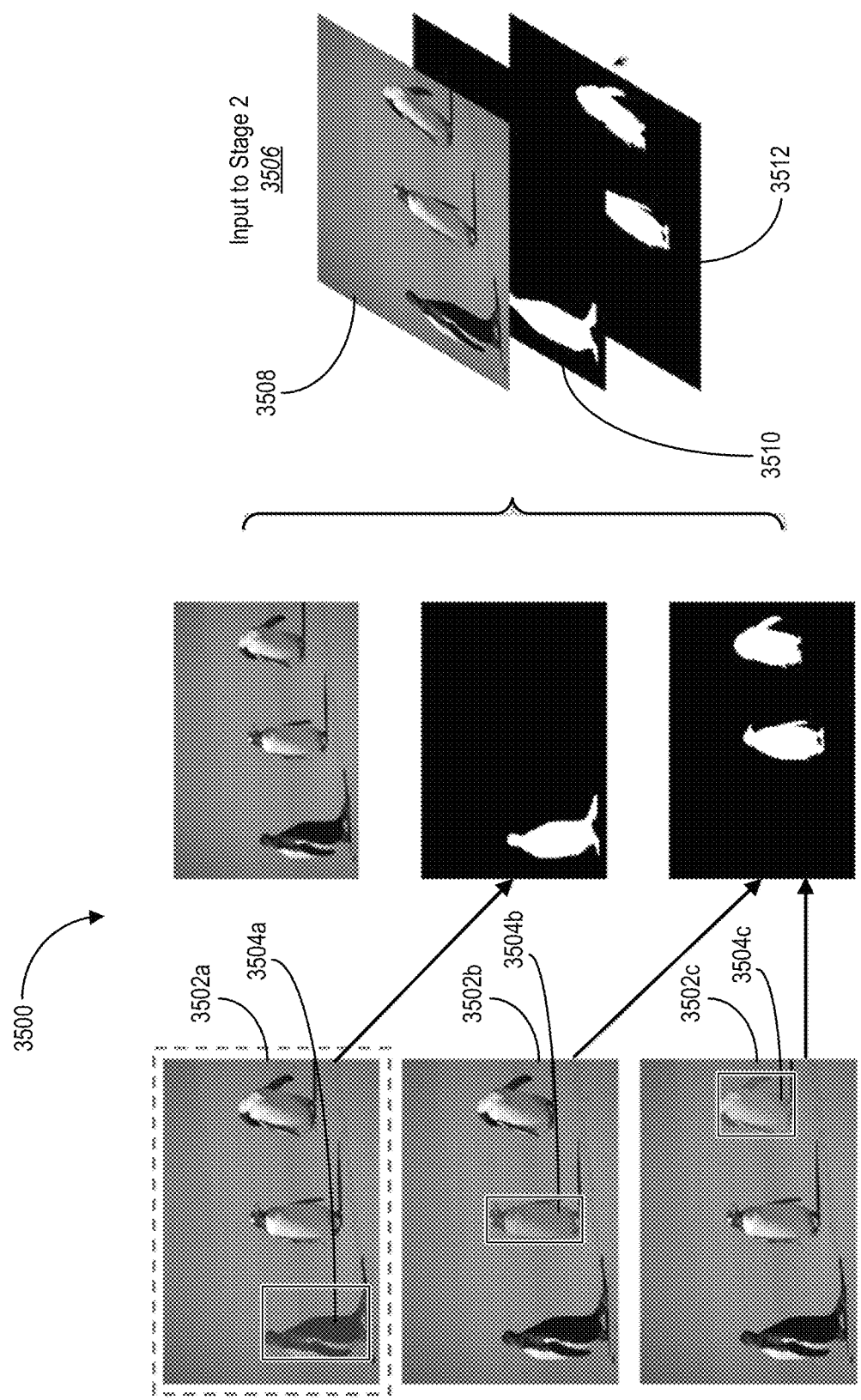
FIG. 35 illustrates an overview of an object awareness component of a shadow detection neural network in accordance with one or more embodiments.

FIG. 35 illustrates an overview of an object awareness component 3500 of a shadow detection neural network in accordance with one or more embodiments. In particular, FIG. 35 illustrates input image instances 3502a-3502c corresponding to each object detected within the digital image via the prior instance segmentation component. In particular, each input image instance corresponds to a different detected object and corresponds to an object mask and/or a bounding box generated for that digital image. For instance, the input image instance 3502a corresponds to the object 3504a, the input image instance 3502b corresponds to the object 3504b, and the input image instance 3502c corresponds to the object 3504c. Thus, the input image instances 3502a-3502c illustrate the separate object detections provided by the instance segmentation component of the shadow detection neural network.

In some embodiments, for each detected object, the scene-based image editing system 106 generates input for the second stage of the shadow detection neural network (i.e., the shadow prediction component). FIG. 35 illustrates the object awareness component 3500 generating input 3506 for the object 3504a. Indeed, as shown in FIG. 35, the object awareness component 3500 generates the input 3506 using the input image 3508, the object mask 3510 corresponding to the object 3504a (referred to as the object-aware channel) and a combined object mask 3512 corresponding to the objects 3504b-3504c (referred to as the object-discriminative channel). For instance, in some implementations, the object awareness component 3500 combines (e.g., concatenates) the input image 3508, the object mask 3510, and the combined object mask 3512. The object awareness component 3500 similarly generates second stage input for the other objects 3504b-3504c as well (e.g., utilizing their respective object mask and combined object mask representing the other objects along with the input image 3508).

In one or more embodiments, the scene-based image editing system 106 (e.g., via the object awareness component 3500 or some other component of the shadow detection neural network) generates the combined object mask 3512 using the union of separate object masks generated for the object 3504b and the object 3504c. In some instances, the object awareness component 3500 does not utilize the object-discriminative channel (e.g., the combined object mask 3512). Rather, the object awareness component 3500 generates the input 3506 using the input image 3508 and the object mask 3510. In some embodiments, however, using the object-discriminative channel provides better shadow prediction in the second stage of the shadow detection neural network.

Figure 36:
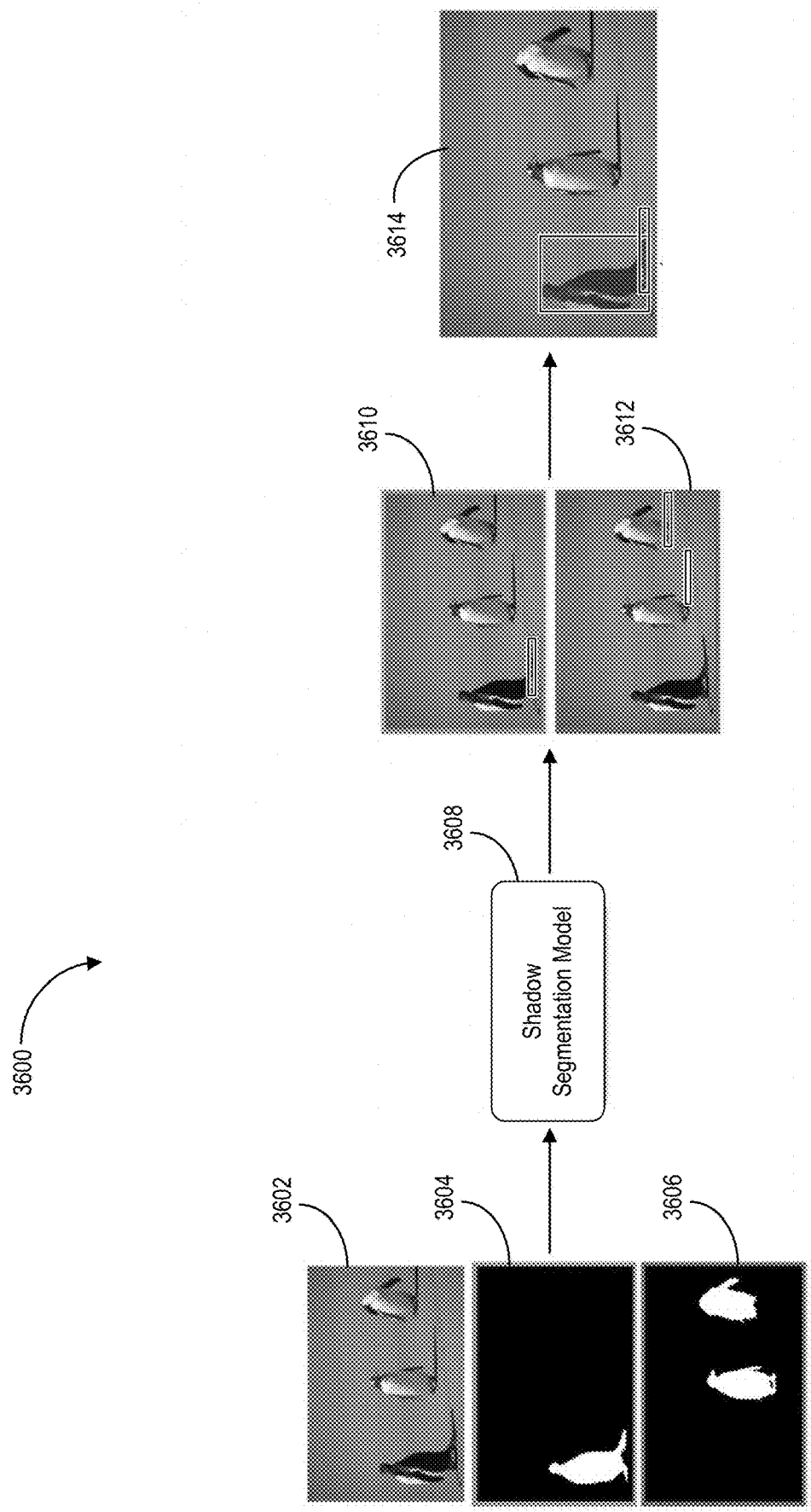
FIG. 36 illustrates an overview of a shadow prediction component of a shadow detection neural network in accordance with one or more embodiments.

FIG. 36 illustrates an overview of a shadow prediction component 3600 of a shadow detection neural network in accordance with one or more embodiments. As shown in FIG. 36, the shadow detection neural network provides, to the shadow prediction component 3600, input compiled by an object awareness component consisting of an input image 3602, an object mask 3604 for an object of interest, and a combined object mask 3606 for the other detected objects. The shadow prediction component 3600 utilizes a shadow segmentation model 3608 to generate a first shadow prediction 3610 for the object of interest and a second shadow prediction 3612 for the other detected objects. In one or more embodiments, the first shadow prediction 3610 and/or the second shadow prediction 3612 include shadow masks (e.g., where a shadow mask includes an object mask for a shadow) for the corresponding shadows. In other words, the shadow prediction component 3600 utilizes the shadow segmentation model 3608 to generate the first shadow prediction 3610 by generating a shadow mask for the shadow predicted for the object of interest. Likewise, the shadow prediction component 3600 utilizes the shadow segmentation model 3608 to generate the second shadow prediction 3612 by generating a combined shadow mask for the shadows predicted for the other detected objects.

Based on the outputs of the shadow segmentation model 3608, the shadow prediction component 3600 provides an object-shadow pair prediction 3614 for the object of interest. In other words, the shadow prediction component 3600 associates the object of interest with its shadow cast within the input image 3602. In one or more embodiments, the shadow prediction component 3600 similarly generates an object-shadow pair prediction for all other objects portrayed in the input image 3602. Thus, the shadow prediction component 3600 identifies shadows portrayed in a digital image and associates each shadow with its corresponding object.

In one or more embodiments, the shadow segmentation model 3608 utilized by the shadow prediction component 3600 includes a segmentation neural network. For instance, in some cases, the shadow segmentation model 3608 includes the detection-masking neural network 300 discussed above with reference to FIG. 3. As another example, in some implementations, the shadow segmentation model 3608 includes the DeepLabv3 semantic segmentation model described by Liang-Chieh Chen et al., Rethinking Atrous Convolution for Semantic Image Segmentation, arXiv: 1706.05587, 2017, or the DeepLab semantic segmentation model described by Liang-Chich Chen et al., Deeplab: Semantic Image Segmentation with Deep Convolutional Nets, Atrous Convolution, and Fully Connected CRE's, arXiv: 1606.00915, 2016, both of which are incorporated herein by reference in their entirety.

Figure 37:
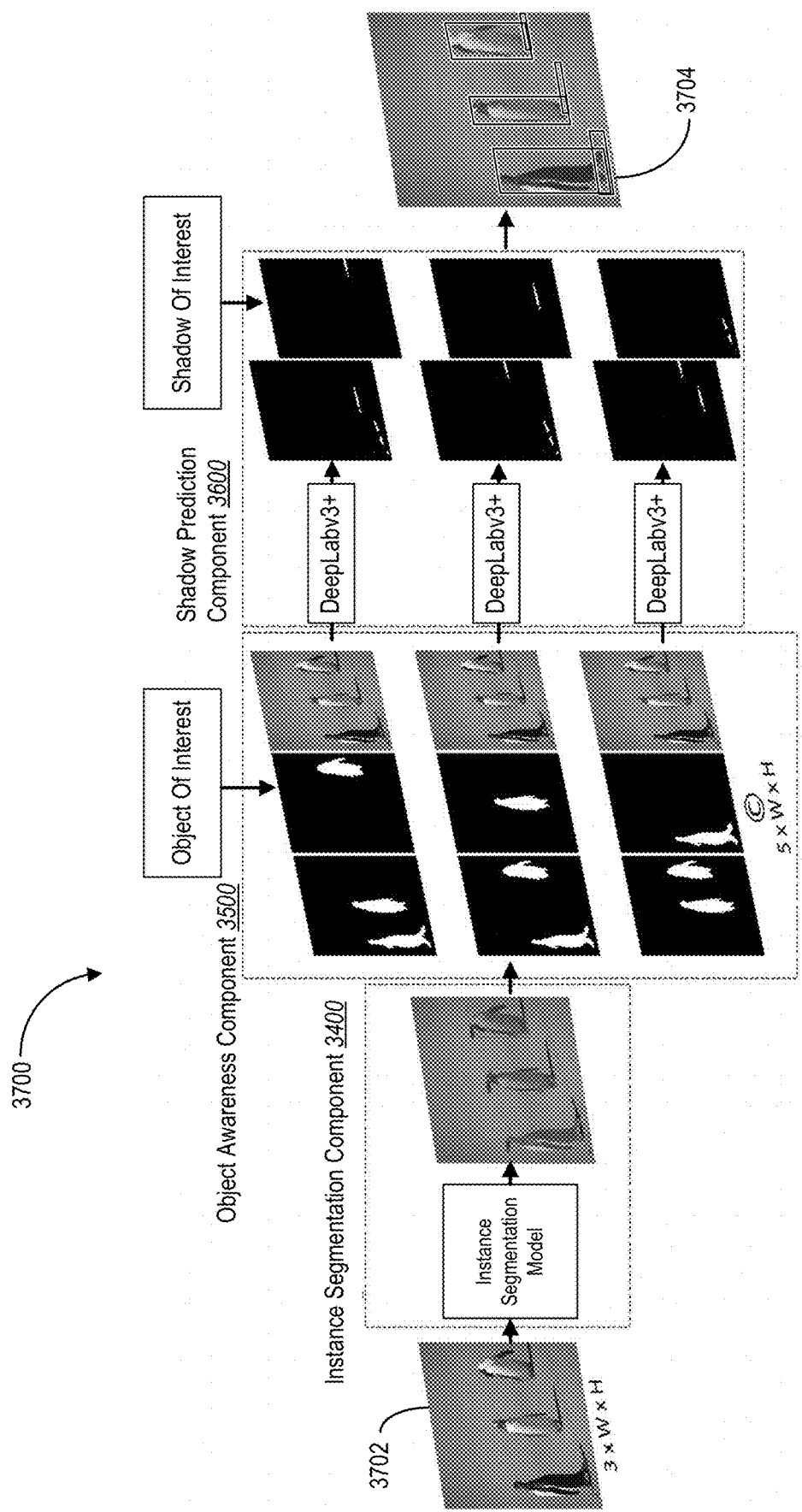
FIG. 37 illustrates an overview of the architecture of a shadow detection neural network in accordance with one or more embodiments.

FIG. 37 illustrates an overview of the architecture of a shadow detection neural network 3700 in accordance with one or more embodiments. In particular, FIG. 37 illustrates the shadow detection neural network 3700 consisting of the instance segmentation component 3400 discussed with reference to FIG. 34, the object awareness component 3500 discussed with reference to FIG. 35, and the shadow prediction component 3600 discussed with reference to FIG.

36. Further, FIG. 37 illustrates the shadow detection neural network 3700 generating object masks, shadow masks, and predictions with respect to each object portrayed in the input image 3702. Thus, the shadow detection neural network 3700 outputs a final prediction 3704 that associates each object portrayed in a digital image with its shadow. Accordingly, as shown in FIG. 37, the shadow detection neural network 3700 provides an end-to-end neural network framework that receives a digital image and outputs an association between objects and shadows depicted therein.

In some implementations, the shadow detection neural network 3700 determines that an object portrayed within a digital image does not have an associated shadow. Indeed, in some cases, upon analyzing the digital image utilizing its various components, the shadow detection neural network 3700 determines that there is not a shadow portrayed within the digital image that is associated with the object. In some cases, the scene-based image editing system 106 provides feedback indicating the lack of a shadow. For example, in some cases, upon determining that there are no shadows portrayed within a digital image (or that there is not a shadow associated with a particular object), the scene-based image editing system 106 provides a message for display or other feedback indicating the lack of shadows. In some instances, the scene-based image editing system 106 does not provide explicit feedback but does not auto-select or provide a suggestion to include a shadow within a selection of an object as discussed below with reference to FIGS. 39A-39C.

In some implementations, the scene-based image editing system 106 utilizes the second stage of the shadow detection neural network to determine shadows associated with objects portrayed in a digital image when the objects masks of the objects have already been generated. Indeed, FIG. 38 illustrates a diagram for using the second stage of the shadow detection neural network for determining shadows associated with objects portrayed in a digital image in accordance with one or more embodiments.

Figure 38:
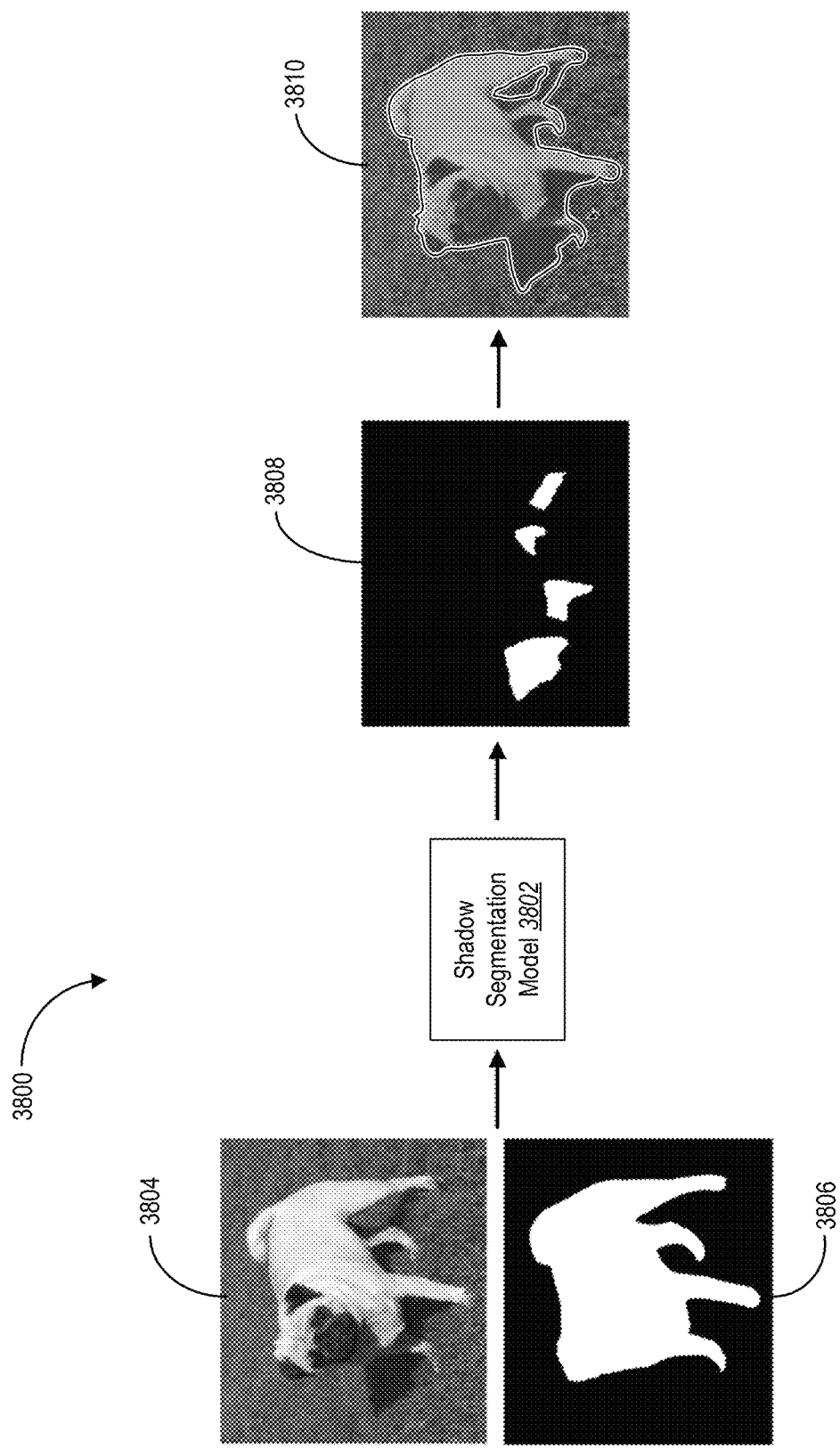
FIG. 38 illustrates a diagram for using the second stage of the shadow detection neural network for determining shadows associated with objects portrayed in a digital image in accordance with one or more embodiments.

As shown in FIG. 38, the scene-based image editing system 106 provides an input image 3804 to the second stage of a shadow detection neural network (i.e., a shadow prediction model 3802). Further, the scene-based image editing system 106 provides an object mask 3806 to the second stage. The scene-based image editing system 106 utilizes the second stage of the shadow detection neural network to generate a shadow mask 3808 for the shadow of the object portrayed in the input image 3804, resulting in the association between the object and the shadow cast by the object within the input image 3804 (e.g., as illustrated in the visualization 3810).

By providing direct access to the second stage of the shadow detection neural network, the scene-based image editing system 106 provides flexibility in the shadow detection process. Indeed, in some cases, an object mask will already have been created for an object portrayed in a digital image. For instance, in some cases, the scene-based image editing system 106 implements a separate segmentation neural network to generate an object mask for a digital image as part of a separate workflow. Accordingly, the object mask for the object already exists, and the scene-based image editing system 106 leverages the previous work in determining the shadow for the object. Thus, the scene-based image editing system 106 further provides efficiency as it avoids duplicating work by accessing the shadow prediction model of the shadow detection neural network directly.

Figure 39B:
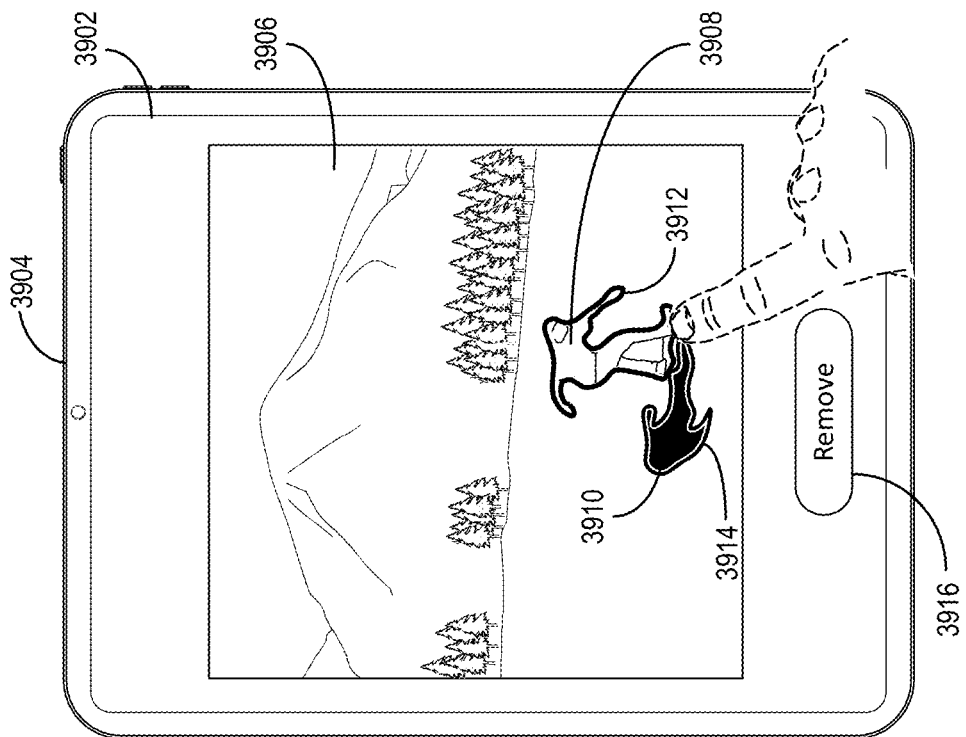
FIGS. 39A-39C illustrate a graphical user interface implemented by the scene-based image editing system to identify and remove shadows of objects portrayed in a digital image in accordance with one or more embodiments.
Figure 39A:
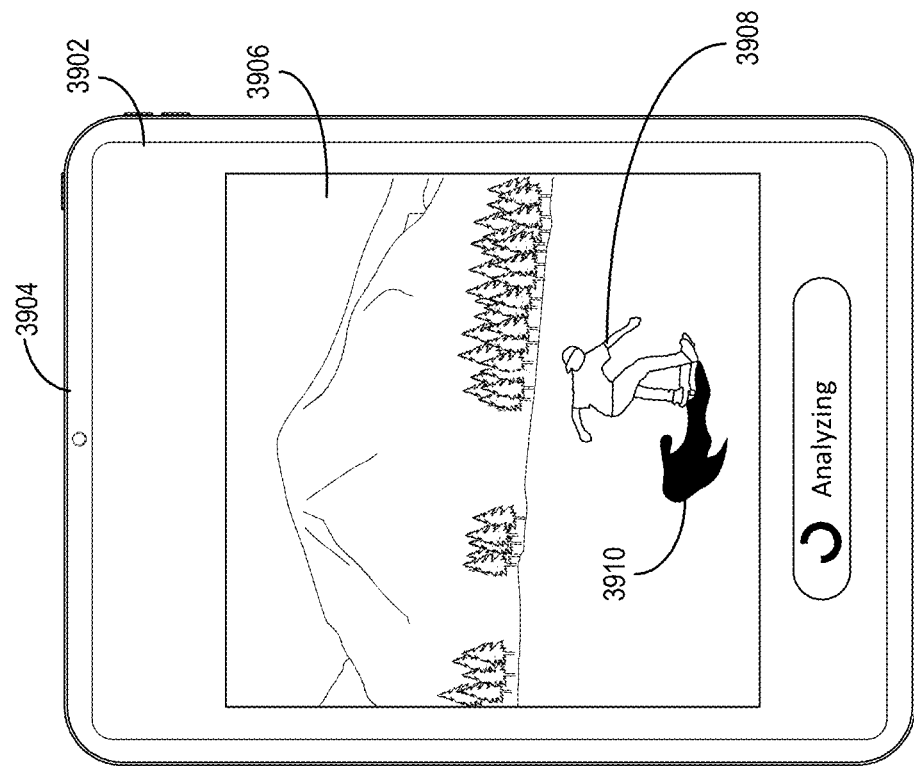
Figure 39C:
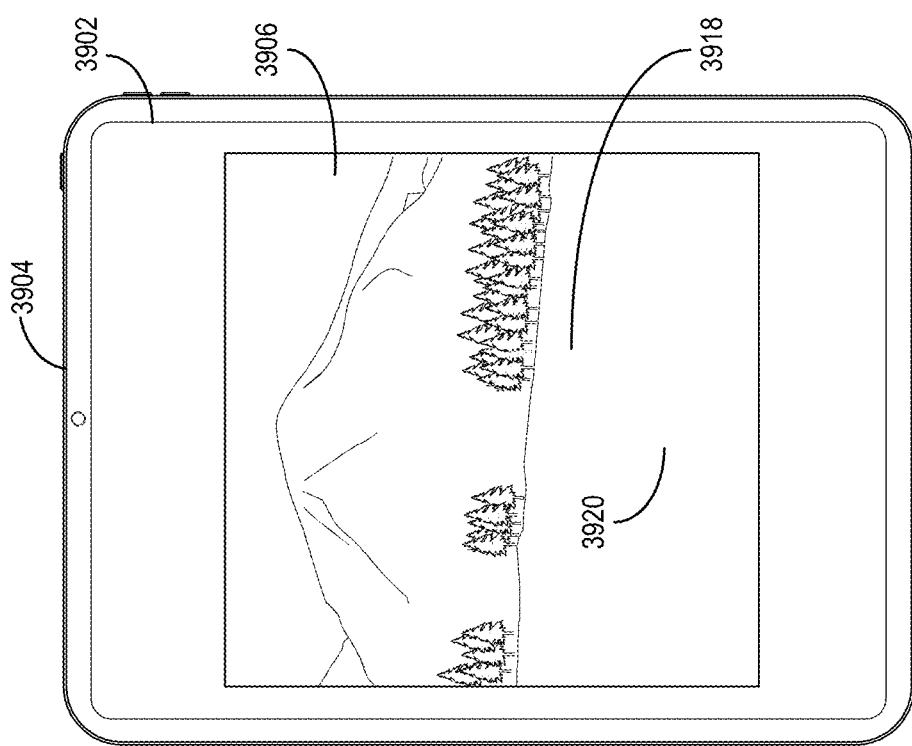

FIGS. 39A-39C illustrate a graphical user interface implemented by the scene-based image editing system 106 to identify and remove shadows of objects portrayed in a digital image in accordance with one or more embodiments. Indeed, as shown in FIG. 39A, the scene-based image editing system 106 provides, for display within a graphical user interface 3902 of a client device, a digital image 3906 portraying an object 3908. As further shown, the object 3908 casts a shadow 3910 within the digital image 3906.

In one or more embodiments, upon receiving the digital image 3906, the scene-based image editing system 106 utilizes a shadow detection neural network to analyze the digital image 3906. In particular, the scene-based image editing system 106 utilizes the shadow detection neural network to identify the object 3908, identify the shadow 3910 cast by the object 3908, and further associate the shadow 3910 with the object 3908. As previously mentioned, in some implementations, the scene-based image editing system 106 further utilizes the shadow detection neural network to generate object masks for the object 3908 and the shadow 3910.

As previously discussed with reference to FIG. 26, in one or more embodiments, the scene-based image editing system 106 identifies shadows cast by objects within a digital image as part of a neural network pipeline for identifying distracting objects within the digital image. For instance, in some cases, the scene-based image editing system 106 utilizes a segmentation neural network to identify objects for a digital image, a distractor detection neural network to classify one or more of the objects as distracting objects, a shadow detection neural network to identify shadows and associate the shadows with their corresponding objects, and an inpainting neural network to generate content fills to replace objects (and their shadows) that are removed. In some cases, the scene-based image editing system 106 implements the neural network pipeline automatically in response to receiving a digital image.

Indeed, as shown in FIG. 39B, the scene-based image editing system 106 provides, for display within the graphical user interface 3902, a visual indication 3912 indicating a selection of the object 3908 for removal. As further shown, the scene-based image editing system 106 provides, for display, a visual indication 3914 indicating a selection of the shadow 3910 for removal. As suggested, in some cases, the scene-based image editing system 106 selects the object 3908 and the shadow 3910 for deletion automatically (e.g., upon determining the object 3908 is a distracting object). In some implementations, however, the scene-based image editing system 106 selects the object 3908 and/or the shadow 3910 in response to receiving one or more user interactions.

For instance, in some cases, the scene-based image editing system 106 receives a user selection of the object 3908 and automatically adds the shadow 3910 to the selection. In some implementations, the scene-based image editing system 106 receives a user selection of the object 3908 and provides a suggestion for display in the graphical user interface 3902, suggesting that the shadow 3910 be added to the selection. In response to receiving an additional user interaction, the scene-based image editing system 106 adds the shadow 3910.

As further shown in FIG. 39B, the scene-based image editing system 106 provides a remove option 3916 for display within the graphical user interface 3902. As indicated by FIG. 39C, upon receiving a selection of the remove option 3916, the scene-based image editing system 106 removes the object 3908 and the shadow 3910 from the digital image. As further shown, the scene-based image editing system 106 replaces the object 3908 with a content fill 3918 and replaces the shadow 3910 with a content fill 3920. In other words, the scene-based image editing system 106 reveals the content fill 3918 and the content fill 3920 upon removing the object 3908 and the shadow 3910, respectively.

Though FIGS. 39A-39C illustrates implementing shadow detection with respect to a delete operation, it should be noted that the scene-based image editing system 106 implements shadow detection for other operations (e.g., a move operation) in various embodiments. Further, thought FIGS. 39A-39C are discussed with respect to removing distracting objects from a digital image, the scene-based image editing system 106 implements shadow detection in the context of other features described herein. For instance, in some cases, the scene-based image editing system 106 implements shadow detection with respect to object-aware modifications where user interactions target objects directly. Thus, the scene-based image editing system 106 provides further advantages to object-aware modifications by segmenting objects and their shadows and generating corresponding content fills before receiving user interactions to modify the objects to allow for seamless interaction with digital images as if they were real scenes.

By identifying shadows cast by objects within digital images, the scene-based image editing system 106 provides improved flexibility when compared to conventional systems. Indeed, the scene-based image editing system 106 flexibly identifies objects within a digital image along with other aspects of those objects portrayed in the digital image (e.g., their shadows). Thus, the scene-based image editing system 106 provides a better image result when removing or moving objects as it accommodates these other aspects. This further leads to reduced user interaction with a graphical user interface as the scene-based image editing system 106 does not require user interactions for targeting the shadows of objects for movement or removal (e.g., user interactions to identify shadow pixels and/or tie the shadow pixels to the object).

In some implementations, the scene-based image editing system 106 implements one or more additional features to facilitate the modification of a digital image. In some embodiments, these features provide additional user-interface-based efficiency in that they reduce the amount of user interactions with a user interface typically required to perform some action in the context of image editing. In some instances, these features further aid in the deployment of the scene-based image editing system 106 on computing devices with limited screen space as they efficiently use the space available to aid in image modification without crowding the display with unnecessary visual elements.

As mentioned above, in some implementations, the scene-based image editing system 106 utilizes machine learning models to generate and/or expand semantic guides to modify or complete digital images. Given a digital portrait or photo, client devices often seek to remove unwanted accessories, unexpected occluders, or undesired leg/feet cropping. The scene-based image editing system 106 provides an authentic and flexible solution for efficient, accurate, and flexible portrait photo editing. Indeed, the scene-based image editing system 106 leverages semantic map guidance in machine learning models to remove accessories or occlusions, uncrop digital images, and control content creation. For example, the scene-based image editing system 106 can utilize a diffusion model (or other generative machine learning model) to complete a semantic map to progressively generate an image layout. Then, using the map as guidance, the scene-based image editing system can generate an RGB image with authenticity.

The scene-based image editing system 106 can perform a variety of editing processes. For example, in some implementations, the scene-based image editing system utilizes semantic map guidance and machine learning models for accessory removal. In particular, the scene-based image editing system can crop an occlusion or accessory from a digital image, utilize a first generative machine learning model to generate a semantic map of the missing region, and then utilize a second generative machine learning model to generate a complete digital image from the semantic map (with the accessory or occlusion removed from the final digital image).

The scene-based image editing system 106 can also uncrop or expand digital images. To illustrate, the scene-based image editing system can expand the size or scope of a digital image, utilize a first generative machine learning model to generate a semantic map of the expanded region, and then utilize a second generative machine learning model to generate a complete digital image. In this manner, the scene-based image editing system can expand a close up digital image of a person to include a more complete picture of the target subject (e.g., the person's legs, feet, or arms and corresponding background).

In one or more embodiments, the scene-based image editing system 106 performs progressive semantic completion and progressive image completion. For example, the scene-based image editing system 106 can iteratively utilize a diffusion model to generate progressively more accurate semantic maps and/or completed digital images. In this manner, the scene-based image editing system iteratively improves the accuracy of the resulting maps and images to generate a realistic/authentic result.

Moreover, the scene-based image editing system 106 can also provide more flexibility and controllability during editing. For example, the scene-based image editing system 106 can generate a diverse pool of possible solutions for user selection. Moreover, the scene-based image editing system 106 can allow a client device to provide user input of strokes, style guides, or color patches at a desired region to guide the image generation directly. Indeed, by including a style input within a region of a digital image, the scene-based image editing system 106 can utilize a machine learning model to expand/apply the style to the entire semantic region in generating a modified digital image. Similarly, by considering user input/modification of semantic regions, the scene-based image editing system 106 can flexibly guide generation of completed digital images to accurately reflect desired features.

Figure 40:
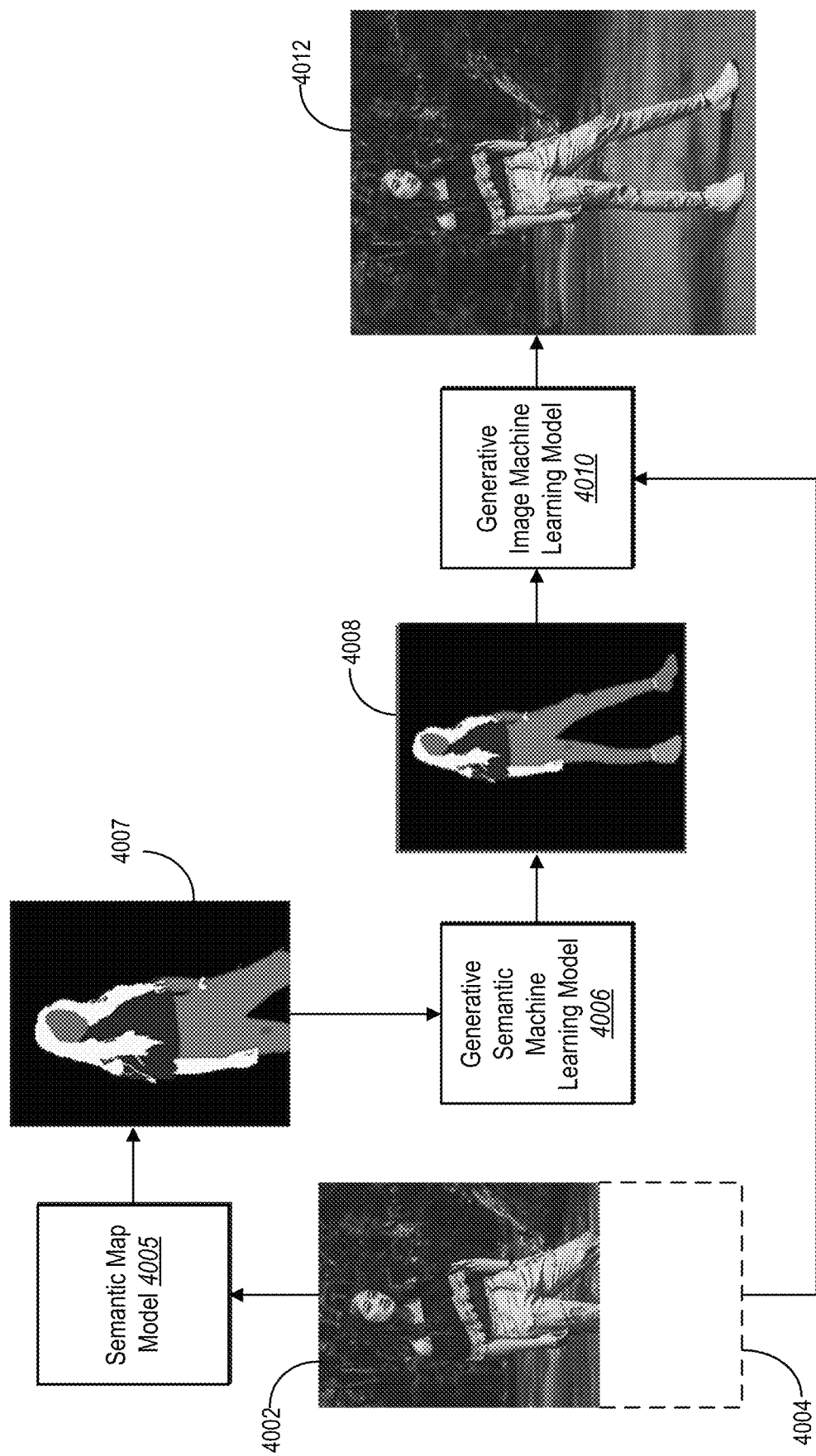
FIG. 40 illustrates an overview diagram of the scene-based image editing system performing infill modifications in accordance with one or more embodiments.

For example, FIG. 40 illustrates an overview of the scene-based image editing system 106 completing a digital image in accordance with one or more embodiments. For instance, the scene-based image editing system 106 generates a modified digital image 4012 from digital image 4002 by identifying an object or region to replace or remove and/or receiving a selection of a region to remove or expand (e.g., uncropping).

Furthermore, the scene-based image editing system 106 provides options to generate the modified digital image 4012 within a user interface. For instance, the scene-based image editing system 106 provides client devices with more flexibility and controllability during editing. The user interface has various options to indicate the type of modification (e.g., expanding the digital image or removing an object) and the scene-based image editing system 106 further provides customizable options for modifying the digital image 4002. For example, the scene-based image editing system 106 can generate a diverse pool of possible solutions for user selection. Moreover, the scene-based image editing system 106 can allow a client device to provide user input of strokes, style guides, or color patches at a desired region to guide the image generation. Indeed, by including a style input within a region of digital image 4002, the scene-based image editing system 106 can utilize a machine learning model to expand/apply the style to the entire semantic region in generating the modified digital image 4012. Similarly, by considering user input/modification of semantic regions, the scene-based image editing system 106 can flexibly guide generation of completed digital images to accurately reflect desired features. More details relating to these features are given below starting at the description of FIG. 45A.

As mentioned above, the scene-based image editing system 106 generates the modified digital image 4012 from the digital image 4002. As shown, FIG. 40 illustrates the scene-based image editing system 106 receiving the digital image 4002. The scene-based image editing system 106 can receive the digital image 4002 from a repository of digital images (e.g., a cloud repository of digital images or local repository of digital images such as a camera roll). Similarly, the image editing system 104 can receive the digital image 4002 by capturing the digital image 4002 utilizing a camera device. For example, the digital image 4002 includes a digital frame (or boundary) that encompasses various pictorial elements defining the digital image 4002.

As shown in FIG. 40, the scene-based image editing system 106 also performs an act 4004 of determining an infill modification. For example, the infill modification includes adding pixel values to a region or replacing pixel values in a region portrayed within the digital image 4002. For instance, for adding pixel values to a region, the scene-based image editing system 106 adds pixel values to an expanded portion of the digital image (e.g., outside of the original digital frame of the digital image 4002). Further, upon initial expansion of the frame of the digital image 4002, the expanded portion is unpopulated. In other instances, for replacing pixel values, the scene-based image editing system 106 replaces existing pixel values in the digital image 4002 with new pixel values (e.g., within the original digital frame of the digital image 4002). In other words, the infill modification modifies existing pixels within the digital image or adds additional pixel values to an expanded portion of the digital image frame of the digital image 4002. Although not illustrated, the scene-based image editing system 106 can receive a variety of user inputs, such as user input of a mask identifying an object or region to replace, selection of an object to remove, an area or region to expand, or a style/color patch to expand within an input region.

As mentioned, the scene-based image editing system 106 replaces or adds pixel values to a region. For example, the region indicated for the infill modification includes a portion of the digital image 4002, either from the existing digital image or from an expanded version of the digital image. In some instances, the region includes one or more objects within the digital image 4002. While in other instances (as already mentioned) the region includes expanding the frame of the digital image and the region encompasses the portion corresponding to the expanded frame. As shown in FIG. 40, the scene-based image editing system 106 performs the act 4004 to determine the infill modification. In doing so, the scene-based image editing system 106 determines the infill modification region as an expanded digital frame of the digital image 4002.

Furthermore, FIG. 40 illustrates the scene-based image editing system 106 utilizing a semantic map model 4005 to generate a semantic map 4007 from the digital image 4002. For example, the semantic map model 4005 includes a segmentation image neural network. The scene-based image editing system 106 can utilize a variety of semantic segmentation models. For example, in some implementations, the scene-based image editing system 106 utilizes the segmentation image neural network described by Ke Sun, Yang Zhao, Borui Jian, Tianheng Cheng, Bin Xiao, Dong Liu, Yadong Mu, Xinggang Wang, Wenyu Liu, and Jingdong Wang in High-resolution Representations for Labeling Pixels and Regions, arXiv: 1904.04515 (2019) (or other semantic segmentation models described herein). Additional details regarding a segmentation image neural network is given below (e.g., in regard to FIG. 44). As shown in FIG. 40, the scene-based image editing system 106 receives via the semantic map model 4005 the digital image 4002 as an input and generates the semantic map 4007.

As just mentioned, the scene-based image editing system 106 generates the semantic map 4007. For example, the scene-based image editing system 106 generates the semantic map 4007 (e.g., an initial semantic map) based on the portrayal within the digital image 4002. In particular, the semantic map 4007 includes classifications of pixels within the digital image 4002. The scene-based image editing system 106 via the semantic map model 4005 detects the classifications and objects portrayed within the digital image 4002. For the semantic map 4007, the scene-based image editing system 106 highlights each objects of a single class with a different color shade (or other visual indicator) within a semantic boundary. To illustrate, the digital image 4002 depicts a human, the scene-based image editing system 106 generates a semantic map by segmenting the human from the background and highlighting each sub-portion of the human. For example, the semantic map 4007 as shown in FIG. 40 highlights each sub-portion of the human such as pants, legs, arms, shirt, face, and hair.

As mentioned above, the scene-based image editing system 106 detects and classifies various objects portrayed within the digital image 4002. For example, an object includes a collection of pixels in the digital image 4002 that depicts a person, place, or thing. To illustrate, in some embodiments, an object includes a person, an item, a natural object (e.g., a tree or rock formation) or a structure depicted in a digital image. In some instances, an object includes a plurality of elements that, collectively, can be distinguished from other elements depicted in the digital image 4002. For example, in some instances, an object includes a collection of buildings that make up a skyline. In some instances, an object more broadly includes a (portion of a) foreground or other element(s) depicted in the digital image 4002 as distinguished from a background. Specifically, for human semantic maps, the object includes sub-parts of the human such as body parts and articles of clothing associated with the human.

As further shown, FIG. 40 illustrates the scene-based image editing system 106 generating an infill semantic map 4008 utilizing a generative semantic machine learning model 4006. For example, as mentioned earlier, the scene-based image editing system 106 performs the act 4004 to determine the infill modification. FIG. 40 illustrates the scene-based image editing system 106 determining the infill modification as expanding the frame of the digital image 4002. Accordingly, as illustrated, FIG. 40 shows the scene-based image editing system 106 utilizing the generative semantic machine learning model 4006 to generate the infill semantic map 4008 from the semantic map 4007. Thus, the scene-based image editing system 106 via the generative semantic machine learning model 4006 expands the semantic map 4007 to include semantic labels for the added region (corresponding to the unpopulated expanded frame). Because the digital image 4002 did not include any pixel values within the indicated region to expand, the scene-based image editing system 106 infills (e.g., inpaints) semantic labels within the expanded region.

In one or more embodiments, machine learning models include generative machine learning models. In particular, generative machine learning models includes machine learning models that generate or create digital image content. For example, generative machine learning models include diffusion networks. Generative machine learning models also include generative adversarial neural networks (GANs). For instance, in a GAN, two machine learning models compete with each other in a zero-sum game.

As mentioned above, the scene-based image editing system 106 utilizes generative machine learning models. In particular, as already mentioned, the scene-based image editing system 106 utilizes the generative semantic machine learning model 4006. For instance, the generative semantic machine learning model 4006 is a generative machine learning model that generates semantic maps of the digital image. Specifically, the generative semantic machine learning model generates realistic semantic maps that fill in gaps of an expanded digital image or a semantic map of the digital image 4002. To illustrate, the generative semantic machine learning model 4006 generates the infill semantic map 4008 from the initially generated semantic map (e.g., the semantic map 4007).

As mentioned above, the scene-based image editing system 106 generates the infill semantic map 4008 that indicates semantic classifications corresponding to the digital image 4002 with the expanded portion infilled. For example, similar to the discussion above related to the semantic map 4007, the infill semantic map 4008 also includes classifications and boundaries of various objects within the digital image. However, the scene-based image editing system 106 generates the infill semantic map 4008 based on an infill modification that indicates a region to fill for an expanded digital image frame of the digital image 4002. To illustrate, if the infill modification indicates a region to fill that includes expanding the frame of the digital image 4002, then the scene-based image editing system 106 generates an infill semantic map that corresponds to the indicated region. In this instance, the infill semantic map 4008 includes semantic classifications and semantic boundaries for the expanded portion of the digital image. In other instances, when the infill modification indicates a region to fill that includes replacing a portion of the existing digital image, then the scene-based image editing system 106 generates an infill semantic map that generates a segmented portion corresponding to the portion to be replaced with corresponding semantic classifications and semantic boundaries. More details relating to semantic boundaries and classifications are given below in relation to FIG. 49A.

Additionally, as further shown, FIG. 40 illustrates the scene-based image editing system 106 utilizing a generative image machine learning model 4010 to generate a modified digital image 4012. For example, FIG. 40 illustrates the scene-based image editing system 106 generating the modified digital image 4012 from the infill semantic map 4008.

As previously discussed, the scene-based image editing system 106 utilizes a generative machine learning model to generate realistic infill semantic maps. As shown, the scene-based image editing system 106 further utilizes the generative image machine learning model 4010 to generate a realistic digital image from the infill semantic map 4008. In particular, the generative image machine learning model 4010 receives as input the infill semantic map 4008 and the digital image 4002. The infill semantic map 4008 and the digital image 4002 guides the generative image machine learning model 4010 in generating the modified digital image 4012.

As shown in the modified digital image 4012, the scene-based image editing system 106 infills the portion below the knees of the person portrayed in the digital image 4002 (which only portrays the human from the knees up). The results generated by the scene-based image editing system 106 illustrate an efficient, accurate, and high-quality completion of the digital image 4002 by completing the semantic map 4007 and utilizing the infill semantic map 4008 to generate the modified digital image 4012.

Conventional systems have leveraged recent computing advancements to modify digital images utilizing a variety of digital tools and models. To illustrate, conventional systems utilize computer-implemented models to uncrop, inpaint, and modify digital objects portrayed in digital images. Despite these advancements, however, conventional systems continue to suffer from a number of technical deficiencies, particularly with regard to accuracy, efficiency, and flexibility of implementing systems in generating modified digital images.

For instance, conventional systems are able to uncrop and inpaint digital images, but these systems often generate inaccurate and unrealistic results. Similarly, conventional systems typically require a large number of user interactions and user interfaces. The user interactions and interfaces required to add or remove regions consumes valuable computational resources and time. In addition, conventional systems provide limited functional flexibility in inpainting digital images. For example, conventional systems seek to generate pixels that will blend with surrounding pixels but fail to provide additional functional control with regard to features or factors in implementing underlying models.

As just mentioned, the scene-based image editing system 106 can improve upon accuracy of conventional systems. For example, the scene-based image editing system 106 utilizes the infill semantic map 4008 and the digital image 4002 to create a realistically infilled digital image (e.g., the modified digital image 4012). In particular, the scene-based image editing system 106 by generating the infill semantic map 4008 (utilizing a generative machine learning model) and generating the modified digital image 4012 from the infill semantic map (utilizing a generative machine learning model), the scene-based image editing system 106 generates digital images that accurately and realistically portray target objects. Indeed, in some embodiments, the scene-based image editing system 106 conditions a diffusion neural network to more accurately generate infill semantic maps and accurately resulting digital images. Thus, as illustrated in FIG. 40, the scene-based image editing system 106 can accurately expand digital images or perform other modifications, such as infilling or modifying object/scene textures.

Furthermore, in one or more implementations the scene-based image editing system 106 also improves upon efficiency relative to conventional systems. For example, the scene-based image editing system 106 can generate a modified digital image with reduced user interactions, user interfaces, and time-consuming corrections/edits associated with many conventional systems. For example, the scene-based image editing system 106 generates the semantic map 4007, the infill semantic map 4008, and the modified digital image 4012 with various machine learning models. Accordingly, the scene-based image editing system 106 saves valuable time and computational resources by intelligently generating the modified digital image 4012. Moreover, the scene-based image editing system 106 can provide streamlined interfaces for an intuitive and simplified flow to generate the infill semantic map 4008 and/or the modified digital image 4012. In particular, the scene-based image editing system 106 can provide a unified user interface for generating both an infill semantic map and a modified digital image to that reduces or eliminates the need to alternate between multiple interfaces as utilized by conventional systems.

In addition to the above, the scene-based image editing system 106 also improves upon functional flexibility. For example, the scene-based image editing system 106 allows client devices to expand the frame of digital images, remove objects portrayed within a digital image, or modify textures within portions of a digital images. Moreover, the scene-based image editing system 106 provides improved functionality with user interfaces that allow for unique control over implementing models, such as the number of infill segmentation maps to generate, the number of modified images to generate, the number of layers to utilizes (e.g., within a diffusion neural network), textures for conditioning the generative model, and semantic editing input to guide generation infill semantic maps and/or modified digital images.

Figure 41A:
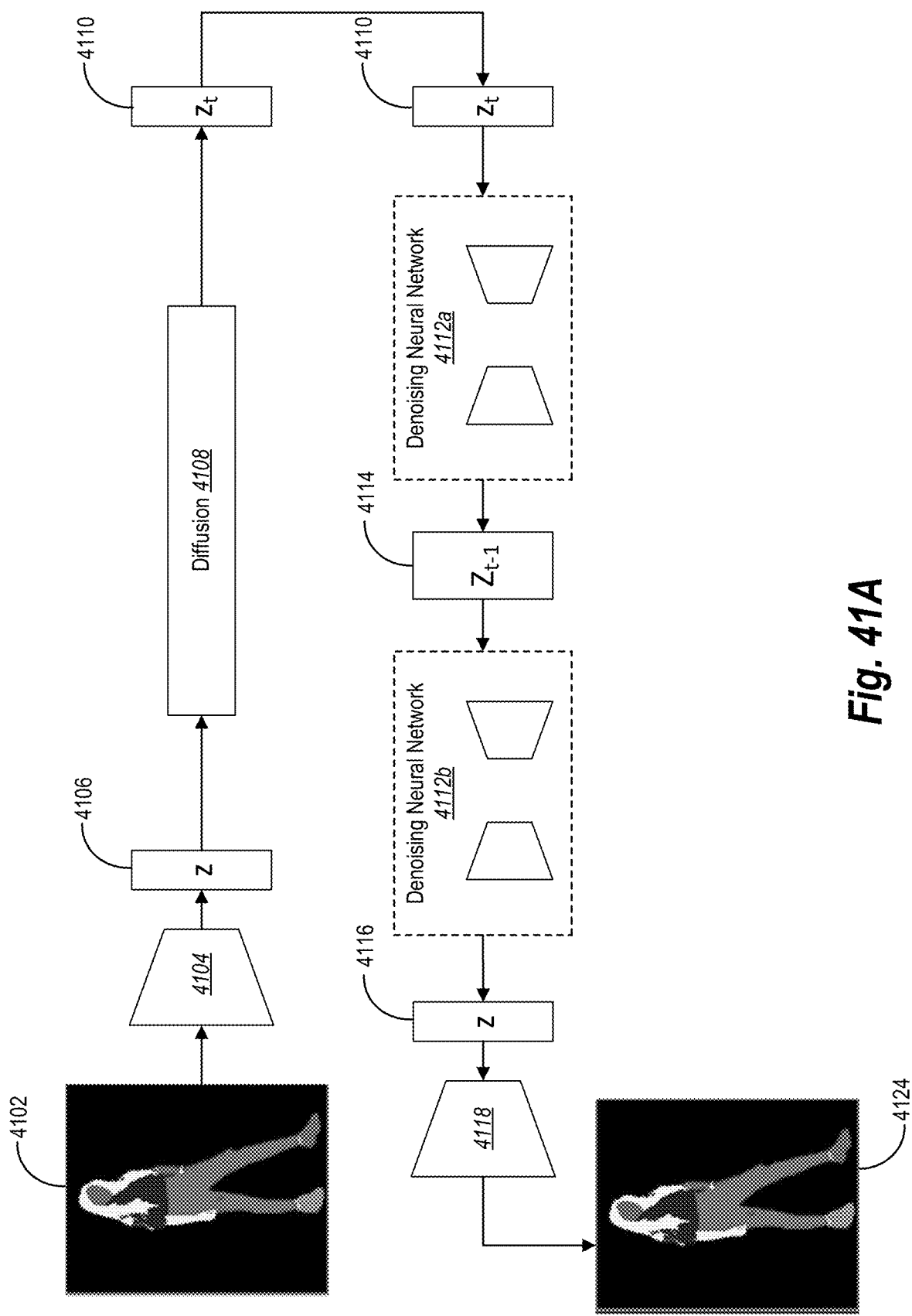
FIG. 41A illustrates an example diagram of the scene-based image editing system training a diffusion neural network to generate a infill semantic map in accordance with one or more embodiments.

As discussed above, the scene-based image editing system 106 utilizes various types of machine learning models. For example, FIG. 41A illustrates the scene-based image editing system 106 utilizing a diffusion neural network (also referred to as "diffusion probabilistic model" or "denoising diffusion probabilistic model") to generate an infill semantic map in accordance with one or more embodiments. In particular, FIG. 41A illustrates the diffusion neural network generating an infill semantic map 4124 while the subsequent figure (FIG. 42) illustrates the diffusion neural network generating the modified digital image conditioned on the infill semantic map 4124. For example, in one or more embodiments, the scene-based image editing system 106 utilizes a diffusion model (or diffusion neural network) as described by J. Ho, A. Jain, P Abbeel, Denoising Diffusion Probabilistic Models, arXiv: 2006:11239 or by Jiaming Song, et al. in Denoising diffusion implicit models. In ICLR, 2021, which are incorporated by reference in their entirety herein.

As mentioned above, the scene-based image editing system 106 utilizes a diffusion neural network. In particular, a diffusion neural network receives as input a digital image and adds noise to the digital image through a series of steps. For instance, the scene-based image editing system 106 via the diffusion neural network maps a digital image to a latent space utilizing a fixed Markov chain that adds noise to the data of the digital image. Furthermore, each step of the fixed Markov chain relies upon the previous step. Specifically, at each step, the fixed Markov chain adds Gaussian noise with variance, which produces a diffusion representation (e.g., diffusion latent vector, a diffusion noise map, or a diffusion inversion). Subsequent to adding noise to the digital image at various steps of the diffusion neural network, the scene-based image editing system 106 utilizes a trained denoising neural network to recover the original data from the digital image. Specifically, the scene-based image editing system 106 utilizes a denoising neural network with a length T equal to the length of the fixed Markov chain to reverse the process of the fixed Markov chain.

As mentioned earlier, in one or more embodiments the scene-based image editing system 106 generates an infill semantic map. FIG. 41A illustrates the scene-based image editing system 106 training a diffusion neural network to generate an infill semantic map 4124. In particular, FIG. 41A illustrates the scene-based image editing system 106 analyzing an input infill semantic map 4102 to generate the infill semantic map 4124 (e.g., a reconstruction of the input infill semantic map 4102). Specifically, the scene-based image editing system 106 utilizes the diffusion process during training to get generate various diffusion representations, culminating in a final diffusion representation that is passed to the denoising network. The scene-based image editing system 106, during training, supervises the output of each denoising neural network layer based on the diffusion representations generated during the diffusion process.

As illustrated, FIG. 41A shows the scene-based image editing system 106 utilizing the encoder 4104 to generate a latent vector 4106 from the input infill semantic map 4102. In one or more embodiments, the encoder 4104 is a neural network (or one or more layers of a neural network) that extract features relating to the semantic map 4102, e.g., in this instance relating to objects (human sub-portions) depicted within the input infill semantic map 4102. In some cases, the encoder 4104 includes a neural network that encodes features from the input infill semantic map 4102. For example, the encoder 4104 can include a particular number of layers including one or more fully connected and/or partially connected layers that identify and represent characteristics/features of the input infill semantic map 4102 through a latent feature vector. Thus, the latent vector 4106 includes a hidden (e.g., indecipherable to humans) vector representation of the semantic map 4102. Specifically, the latent vector 4106 includes a numerical representation of features of the semantic map 4102.

Furthermore, FIG. 41A illustrates the diffusion process 4108 of the diffusion neural network. In particular, FIG. 41A shows a diffusion of the latent vector 4106. At each step (based on the fixed Markov chain) of the diffusion process 4108, the scene-based image editing system 106 via the diffusion neural network generates a diffusion representation. For instance, the diffusion process 4108 adds noise to the diffusion representation at each step until the diffusion representation is diffused, destroyed, or replaced. Specifically, the scene-based image editing system 106 via the diffusion process 4108 adds Gaussian noise to the signal of the latent vector utilizing a fixed Markov Chain. The scene-based image editing system 106 can adjust the number of diffusion steps in the diffusion process 4108 (and the number of corresponding denoising layers in the denoising steps). Moreover, although FIG. 41A illustrates performing the diffusion process 4108 with the latent vector 4106, in some embodiments, the scene-based image editing system 106 applies the diffusion process 4108 to pixels of the input infill semantic map 4102 (without generating a latent vector representation of the input infill semantic map 4102).

As just mentioned, the diffusion process 4108 adds noise at each step of the diffusion process 4108. Indeed, at each diffusion step, the diffusion process 4108 adds noise and generates a diffusion representation. Thus, for a diffusion process 4108 with five diffusion steps, the diffusion process 4108 generates five diffusion representations. As shown in FIG. 41A the scene-based image editing system 106 generates a final diffusion representation 4110. In particular, FIG.

41A in the final diffusion representation 4110 comprises random Gaussian noise after the completion of the diffusion process. As part of the diffusion neural network, the denoising neural network 4112a denoises the final diffusion representation 4110 (e.g., reverses the process of adding noise to the diffusion representation performed by the diffusion process 4108).

As shown, FIG. 41A illustrates the denoising neural network 4112a generating a first denoised representation 4114 that partially denoises the final diffusion representation 4110 by generating a first denoised representation 4114. Furthermore, FIG. 41 also illustrates a denoising neural network 4112b receiving the first denoised representation 4114 for further denoising to generate the second denoised representation 4116. In particular, in one or more embodiments the number of denoising steps corresponds with the number of diffusion steps (e.g., of the fixed Markov chain). Furthermore, FIG. 41A illustrates the scene-based image editing system 106 processing the second denoised representation 4116 with a decoder 4118 to generate the infill semantic map 4124.

In one or more implementations, the scene-based image editing system 106 trains the denoising neural networks in a supervised manner based on the diffusion representations generates at the diffusion process 4108. For example, the scene-based image editing system 106 compares (utilizing a loss function) a diffusion representation at a first step of the diffusion process 4108 with a final denoised representation generated by the final denoising neural network. Similarly, the scene-based image editing system 106 can compare (utilizing a loss function) a second diffusion representation from a second step of the diffusion process 4108 with a penultimate denoised representation generated by a penultimate denoising neural network. The scene-based image editing system 106 can thus utilize corresponding diffusion representations of the diffusion process 4108 to teach or train the denoising neural networks to denoise random Gaussian noise and generate realistic digital images.

The scene-based image editing system 106 can utilize a variety of neural network formulations for the denoising neural networks 4112a, 4112b. For example, in some implementations, the scene-based image editing system 106 utilizes a time conditional U-Net, as described by O. Ronneberger, P. Fischer, and T. Brox, in U-net: Convolutional networks for biomedical image segmentation, MICCAI (3), Vol. 9351 of Lecture Notes in Computer Science, p. 234-241 (2015), which is incorporated by reference herein in its entirety. In one or more embodiments, the scene-based image editing system 106 utilizes the diffusion architecture and training approach described by R. Rombach, A. Blattmann, D. Lorenz, P. Esser, and B. Ommer, in High-Resolution Image Synthesis with Latent Diffusion Models, arXiv: 2112.10752v2, which is incorporated by reference in its entirety herein.

Figure 41B:
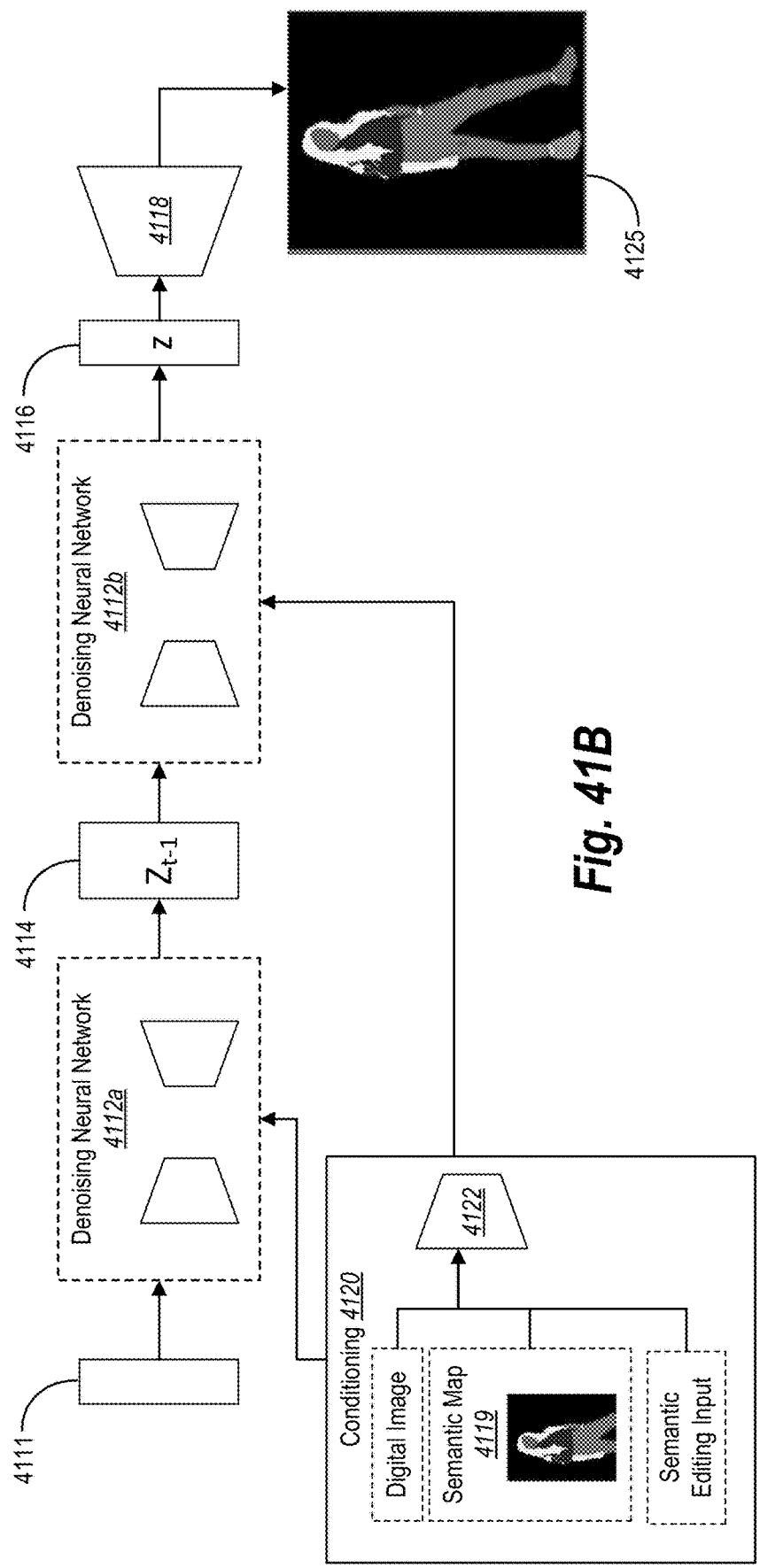
FIG. 41B illustrates an example diagram of the scene-based image editing system utilizing a diffusion neural network to generate a infill semantic map in accordance with one or more embodiments.

In addition to the training illustrated in FIG. 41A, FIG. 41B illustrates the scene-based image editing system 106 generating an infill semantic map (e.g., during inference) in accordance with one or more embodiments. In particular, the scene-based image editing system 106 utilizes a random noise input 4111 (together with conditioning) to generate an infill semantic map from a semantic map 4119 (i.e., an incomplete semantic map relative to the expanded frame of the uncropped digital image).

As shown, the scene-based image editing system 106 conditions the denoising neural network 4112a and the denoising neural network 4112b. For example, FIG. 41B illustrates the scene-based image editing system 106 performing an act 4120 of conditioning each layer of the denoising neural network 4112a and the denoising neural network 4112b. To illustrate, conditioning layers of a neural network includes providing context to the networks to guide the generation of the infill semantic map 4124. For instance, conditioning layers of neural networks include at least one of (1) transforming conditioning inputs (e.g., the digital image, the semantic map 4119, and the semantic editing input) into conditioning representations to combine with the denoising representations; and/or (2) utilizing attention mechanisms which causes the neural networks to focus on specific portions of the input and condition its predictions (e.g., outputs) based on the attention mechanisms. Specifically, for denoising neural networks, conditioning layers of the denoising neural networks includes providing an alternative input to the denoising neural networks (e.g., the digital image, the semantic map 4119, and the semantic editing input).

In particular, the scene-based image editing system 106 provides alternative inputs to provide a guide in removing noise from the diffusion representation (e.g., the denoising process). Thus, the scene-based image editing system 106 conditioning layers of the denoising neural networks acts as guardrails to allow the denoising neural networks to learn how to remove noise from an input signal and produce a clean output.

For instance, FIG. 41B shows that prior to conditioning, the scene-based image editing system 106 utilizes an encoder 4122 to analyze conditioning information (such as one or all of the digital image, the semantic map 4119 of the digital image, and a semantic editing input). In some embodiments, the encoder 4122 generates a conditioning representation from this conditioning information. In one or more embodiments, the scene-based image editing system 106 provides an option to a user of a client device to indicate the semantic editing input. In particular, the scene-based image editing system 106 provides the semantic map 4119 to the user of the client device and an option to indicate a semantic classification/boundary. For instance, the scene-based image editing system 106 provides the option to indicate a classification and/or position to fill in from below the knees of the human portrayed in the semantic map 4119. Moreover, in one or more embodiments, the scene-based image editing system 106 provides an additional infill semantic map that includes an additional semantic classification within an additional semantic boundary. For instance, the scene-based image editing system 106 allows for the user of the client device to indicate multiple semantic classifications within multiple semantic boundaries.

Furthermore, in response to the user of the client device providing this indication, the scene-based image editing system 106 processes the semantic editing input for conditioning. Accordingly, the scene-based image editing system 106 can condition the network based on a combination of one or more of the digital image, the semantic map 4119 of the digital image, and/or the semantic editing input. More details relating to the scene-based image editing system 106 providing the option to a user of a client device to indicate the semantic editing input is given below (e.g., in relation to FIG. 49A).

Furthermore, the scene-based image editing system 106 utilizes the conditioning representation generated from the encoder 4122 to perform the act 4120 of conditioning the layers of the denoising neural network 4112a and denoising neural network 4112b. Specifically, conditioning the layers of the network includes modifying input into the layers of the denoising neural networks to combine with the random noise input 4111. For instance, the scene-based image editing system 106 combines (e.g., concatenates) the conditioning representation generated from the encoder 4122 at different layers of the denoising neural networks. For instance, the scene-based image editing system 106 combines one or more conditioning vectors with the input 4111 of random noise, the first denoised representation 4114, or other intermediate denoised representations analyzed by denoising layers. Thus, the denoising process considers the semantic map 4119 and the digital image to generate denoised representations.

As shown, FIG. 41B illustrates the scene-based image editing system 106 utilizing the second denoised representation 4116 (e.g., the final denoised representation illustrated in FIG. 41, although other embodiments can include additional steps and additional denoised representations). For example, the scene-based image editing system 106 utilizes the decoder 4118 to process the second denoised representation 4116. In particular, the scene-based image editing system 106 via the decoder 4118 generates the infill semantic map 4125 from the second denoised representation 4116. As shown, FIG. 41B illustrates the infill semantic map 4125 with infilled semantic labels from the knees down while the semantic map only illustrated semantic labels for the human from the knees up. Accordingly, the scene-based image editing system 106 utilizes the diffusion neural network to generate the infill semantic map 4125.

Although FIG. 41B illustrates generating the infill semantic map 4125 with the denoising architecture, in one or more implementations, the scene-based image editing system 106 utilizes a cross-attention layer that analyzes the representation from the encoder 4122 and denoised representations (intermediate representations of the UNet).

As mentioned above, FIG. 42 shows the scene-based image editing system 106 utilizing denoising neural networks to generate a modified digital image 4224 conditioned by an infill semantic map 4221 (e.g., a completed semantic map). Similar to the discussion above relating to FIG. 41, the scene-based image editing system 106 utilizes the diffusion neural network for training purposes of generating the modified digital image 4224. In particular, during training the scene-based image editing system 106 utilizes an encoder to analyze an input digital image (instead of the semantic map) and generate a latent vector. Further, the scene-based image editing system 106 utilizes a diffusion process to process the latent vector and generate diffusion representations at each step (depending on the length of the fixed Markov chain). Moreover, the scene-based image editing system 106 generates a final diffusion representation for the input digital image (e.g., the expected output during training). The scene-based image editing system 106 trains by comparing diffusion representations generated by the diffusion process with corresponding denoised representations generated by the denoising neural network layers.

Figure 42:
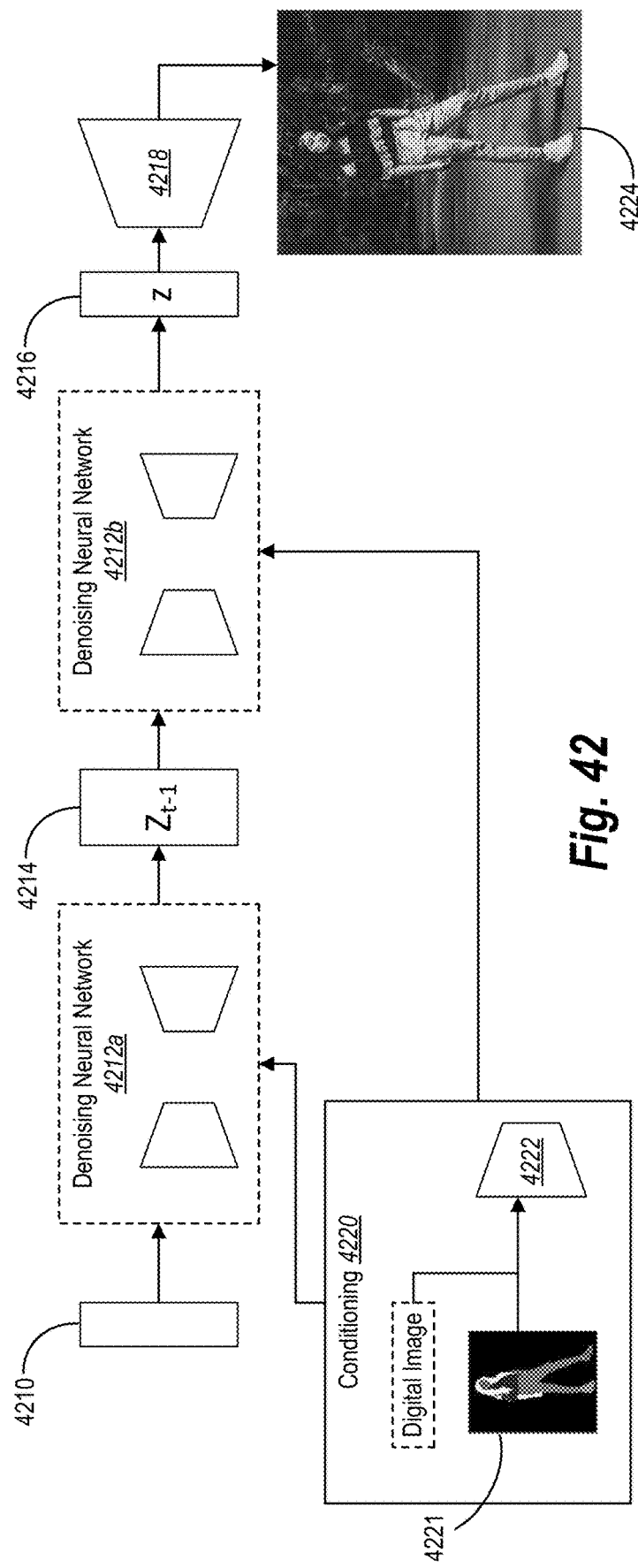
FIG. 42 illustrates an example diagram of the scene-based image editing system utilizing a diffusion neural network to generate a modified digital image in accordance with one or more embodiments.

As shown, FIG. 42 illustrates the scene-based image editing system 106 utilizing a trained diffusion network to generate a complete digital image. In particular, FIG. 42 shows the scene-based image editing system 106 utilizing the infill semantic map 4221 and a digital image (e.g., the digital image 4002 discussed in FIG. 40) as a conditioning input to the denoising neural networks. Further, the scene-based image editing system 106 utilizes a binary mask to indicate to the denoising neural networks a region to infill. The scene-based image editing system 106 can also utilize additional editing inputs to the infill semantic map 4221. In particular, the scene-based image editing system 106 provides an option to a user of a client device to provide color or texture patches as conditioning input. Based on the provided color or texture patches, the scene-based image editing system 106 then utilizes the infill semantic map 4221 and the digital image with the color or texture patches as a conditioning input to condition each layer of the denoising neural networks.

As further shown, FIG. 42 illustrates the scene-based image editing system 106 utilizing a random noise input 4210 with the denoising neural network 4212$a$ (e.g., a first denoising layer). Similar to the discussion in FIG. 41B, the scene-based image editing system 106 utilizes the denoising neural network 4212$a$ to reverse the diffusion process and generate a modified digital image 4224. FIG. 42 also shows the denoising neural network 4212$a$ generating a denoised representation 4214 and utilizing a denoising neural network 4212$b$ to further denoise the denoised representation (denoising here also corresponds with the number of steps in the diffusion process).

Moreover, FIG. 42 shows the scene-based image editing system 106 performing an act 4220. For example, the act 4220 includes conditioning the layers of the denoising neural network 4212$a$ and the denoising neural network 4212$b$. Specifically, FIG. 42 shows the scene-based image editing system 106 performing the act 4220 of conditioning with the infill semantic map 4221. FIG. 42 illustrates an encoder 4222 analyzing the infill semantic map 4221 (generated in FIG. 41B), the digital image, and a binary mask. By conditioning the layers of the denoising neural network 4212$a$ and the denoising neural network 4212$b$ with the infill semantic map 4221 and the digital image, the scene-based image editing system 106 accurately generates the modified digital image 4224.

As just mentioned, the scene-based image editing system 106 generates the modified digital image 4224 by conditioning layers of the denoising neural networks. In particular, FIG. 42 illustrates the scene-based image editing system 106 via a decoder 4218 receiving the second denoised representation 4216 and generating the modified digital image 4224. Specifically, the modified digital image 4224 accurately depicts the legs of the human from the knees down. Accordingly, FIG. 42 illustrates the scene-based image editing system 106 via the diffusion neural network generating an infilled digital image corresponding to an expanded frame of the digital image 4002 shown in FIG. 40.

Figure 43:
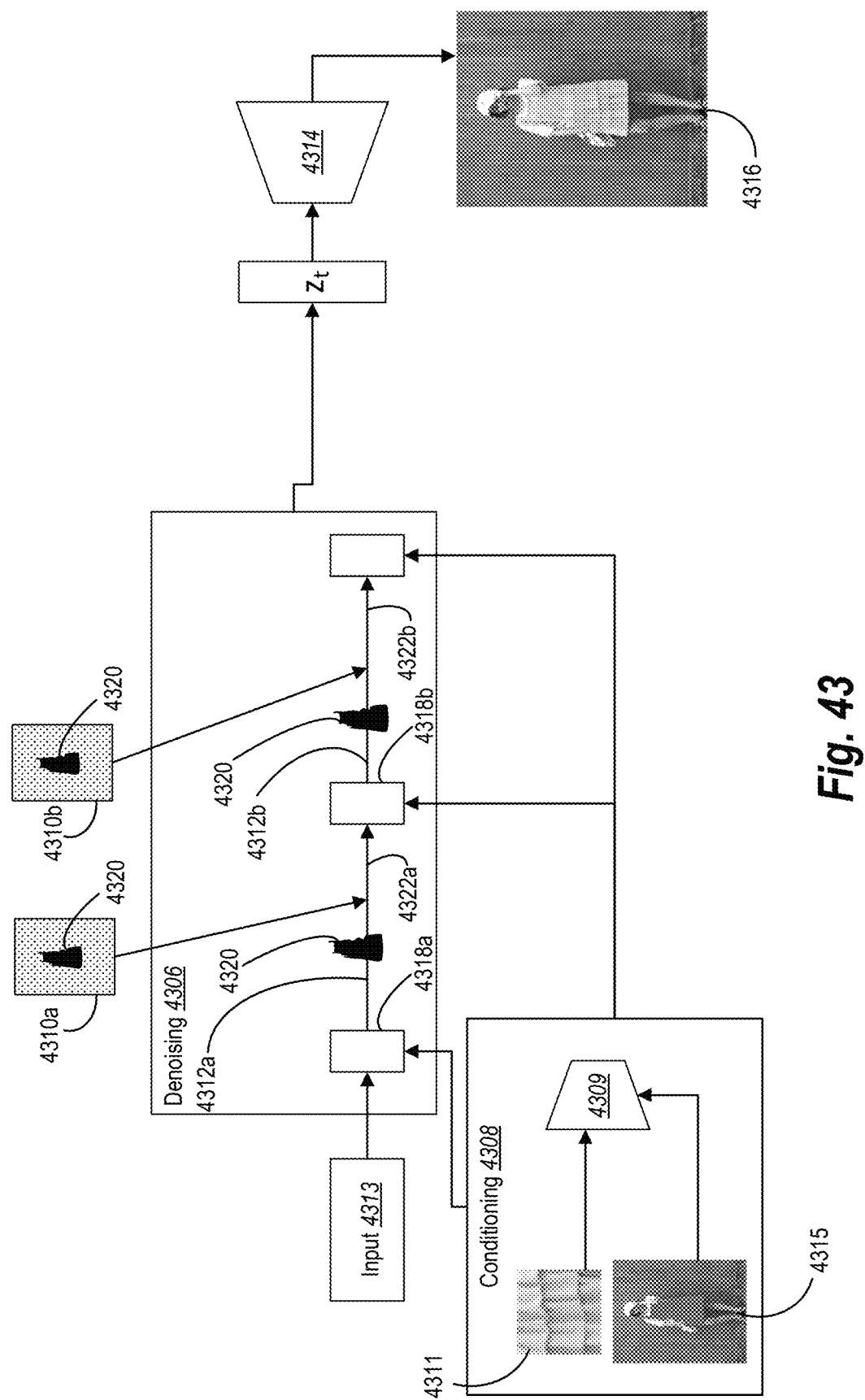
FIG. 43 illustrates an example diagram of the scene-based image editing system conditioning a diffusion neural network with an input texture in accordance with one or more embodiments.

As also mentioned above, in one or more implementations the scene-based image editing system 106 generates a modified digital image utilizing an input texture. For example, FIG. 43 illustrates utilizing an input texture to generate a modified digital image utilizing a diffusion neural network, in accordance with one or more embodiments. Like FIGS. 41A and 42, the scene-based image editing system 106 trains the diffusion neural network. In particular, like the above discussion, during training the scene-based image editing system 106 utilizes the expected output as an input into the diffusion neural networks and utilizes diffusion representations to supervise training of the denoising layers of the neural network.

The scene-based image editing system 106 receives an indication to replace pixel values within a digital image 4315 and an input texture 4311 utilizing a trained denoising neural network. In particular, the scene-based image editing system 106 replaces the indicated pixel values with the input texture 4311. Specifically, the input texture 4311 includes a sample texture that portrays a pattern selected by a user of a client device. To illustrate, the scene-based image editing system 106 modifies an input digital image 4315 with the specifically selected pattern by localizing the input texture 4311 to the relevant region of the input digital image 4315. For example, the scene-based image editing system 106 receives the input texture 4311 from a client device or from a selection of a pre-defined texture option.

In one or more embodiments, the scene-based image editing system 106 utilizes a diffusion neural network to generate the modified digital image 4316 that includes the input texture 4311. Similar to the discussion above, the scene-based image editing system 106 also utilizes diffusion neural networks to replace a region in the digital image 4315 with the input texture 4311. In some implementations, the scene-based image editing system 106 isolates texture modifications to certain portions of the digital image within the diffusion neural network. In particular, FIG. 43 illustrates the scene-based image editing system 106 generating a mask for relevant portion of the digital image 4315 to replace with the input texture 4311. For instance, in FIG. 43 the relevant portion includes the dress of the human portrayed in the digital image 4315. Moreover, the scene-based image editing system 106 generates the mask via a segmentation image neural network for the dress based on an input or query selection by a user of a client device. This is discussed in additional detail below (e.g., with regard to FIG. 44). As discussed above, the scene-based image editing system 106 can train the diffusion neural networks within the denoising process 4306 by reconstructing input digital images and supervising the diffusion neural networks with diffusion representations generated from steps of the diffusion process.

FIG. 43 illustrates the scene-based image editing system 106 performing an act 4308 of conditioning each denoising layer in the denoising process 4306 based on processing a random noise input 4313. In particular, the scene-based image editing system 106 utilizes an encoder 4309 to process the input texture 4311 and the input digital image 4315. Specifically, the scene-based image editing system 106 utilizes the encoder 4309 to generate one or more conditioning vectors that are combined with inputs (i.e., denoised representations) at each of the denoising layers. Furthermore, although not shown in FIG. 43, in one or more embodiments, the scene-based image editing system 106 also provides an option for user input. In particular, the user input includes modifications to the masked portion of the digital image 4315, or modifications to the input texture 4311. For instance, modifications include varying the input texture 4311 or modifying the portion included with the mask in the input digital image 4315. Accordingly, the scene-based image editing system 106 performs the act 4308 of conditioning each layer of the denoising neural networks with user input in addition to the other conditioning inputs.

As mentioned above, the scene-based image editing system 106 can apply the denoising and conditioning process so that a texture is localized to certain portions or regions of the modified digital image. Indeed, applying conditioning vectors based on the input texture 4311 throughout the denoising process in a global fashion could result in adding texture to the entire modified digital image. The scene-based image editing system 106 can localize the texture to a certain region (i.e., the area of the dress) by applying a mask between the denoising layers and utilizing an unconditioned representation of the input digital image for regions outside of the mask.

For instance, FIG. 43 shows the scene-based image editing system 106 applying a first denoising layer 4318a to generate a first denoised representation 4312a. The scene-based image editing system 106 applies a mask 4320 to the first denoised representation 4312a (i.e., to isolate the region that falls within the dress and omit the region outside of the dress). Accordingly, the scene-based image editing system 106 generates a first masked denoised representation 4322a. The first masked denoised representation 4322a thus represents a partially denoised signal that includes the input texture 4311 for the dress region.

The scene-based image editing system 106 then combines the first masked denoised representation 4322a with untextured image representation 4310a. Indeed, as shown, the scene-based image editing system 106 identifies or generates the untextured image representation 4310a as a representation of the digital image 4315 without texture. The scene-based image editing system 106 can generate the untextured image representation 4310a in a variety of ways. For example, in some implementations, the scene-based image editing system 106 utilizes the output of a diffusion layer at the same level of a corresponding denoising layer as the untextured image representation 4310a. In some implementations, the scene-based image editing system 106 applies the denoising layers without condition vectors to generate the untextured image representation 4310a.

As shown, the scene-based image editing system 106 can combine the untextured image representation 4310a with the first masked denoised representation 4322a. Specifically, the scene-based image editing system 106 applies the mask 4320 to the untextured image representation 4310a (i.e., to extract the region outside of the dress) to generate a masked untextured image representation. The scene-based image editing system 106 then combines the masked untextured image representation with the first masked denoised representation 4322a. This results in a modified denoised representation where the area corresponding to the dress is conditioned on the input texture 4311 whereas the area outside the dress is not conditioned on the input texture 4311 (but the entire representation is at the same level of noise for input into the next denoising layer). The scene-based image editing system 106 then analyzes this modified denoised representation utilizing a second denoising layer 4318b.

As shown, the scene-based image editing system 106 repeats this approach at each denoising layer. For example, the second denoising layer 4318b generates a second denoised representation 4312b. The scene-based image editing system 106 applies the mask 4320 to the second denoised representation 4312b to generate a second masked denoised representation 4322b. The scene-based image editing system 106 generates a second untextured image representation 4310b (with the same level of noise as the second denoised representation 4312b) and applies the mask 4320 to generate a second masked untextured image representation. The scene-based image editing system 106 then combines the second masked untextured image representation with the second masked denoised representation 4322b to generate a second modified representation. This second modified representation is then utilized by the next denoising layer.

In one or more embodiments, the scene-based image editing system 106 applies a similar process to the output of the final denoising layer. In particular, the scene-based image editing system 106 applies a mask to the final denoised representation (to preserve the texture within the dress region) and applies a mask to an untextured representation (to preserve the background outside of the dress region without texture). The scene-based image editing system 106 then applies a decoder 4314 to the resulting latent vector to generate the modified digital image 4316. Thus, FIG. 43 illustrates the denoising process 4306 generating a latent vector that contains information that localizes the input texture to only the portion to be replaced (e.g., the dress). The scene-based image editing system 106 then utilizes the decoder 4314 to generate the modified digital image 4316 from the latent vector. Specifically, FIG. 43 illustrates the digital image 4315 with the masked portion (e.g., the dress) replaced with the new input texture.

Figure 44:
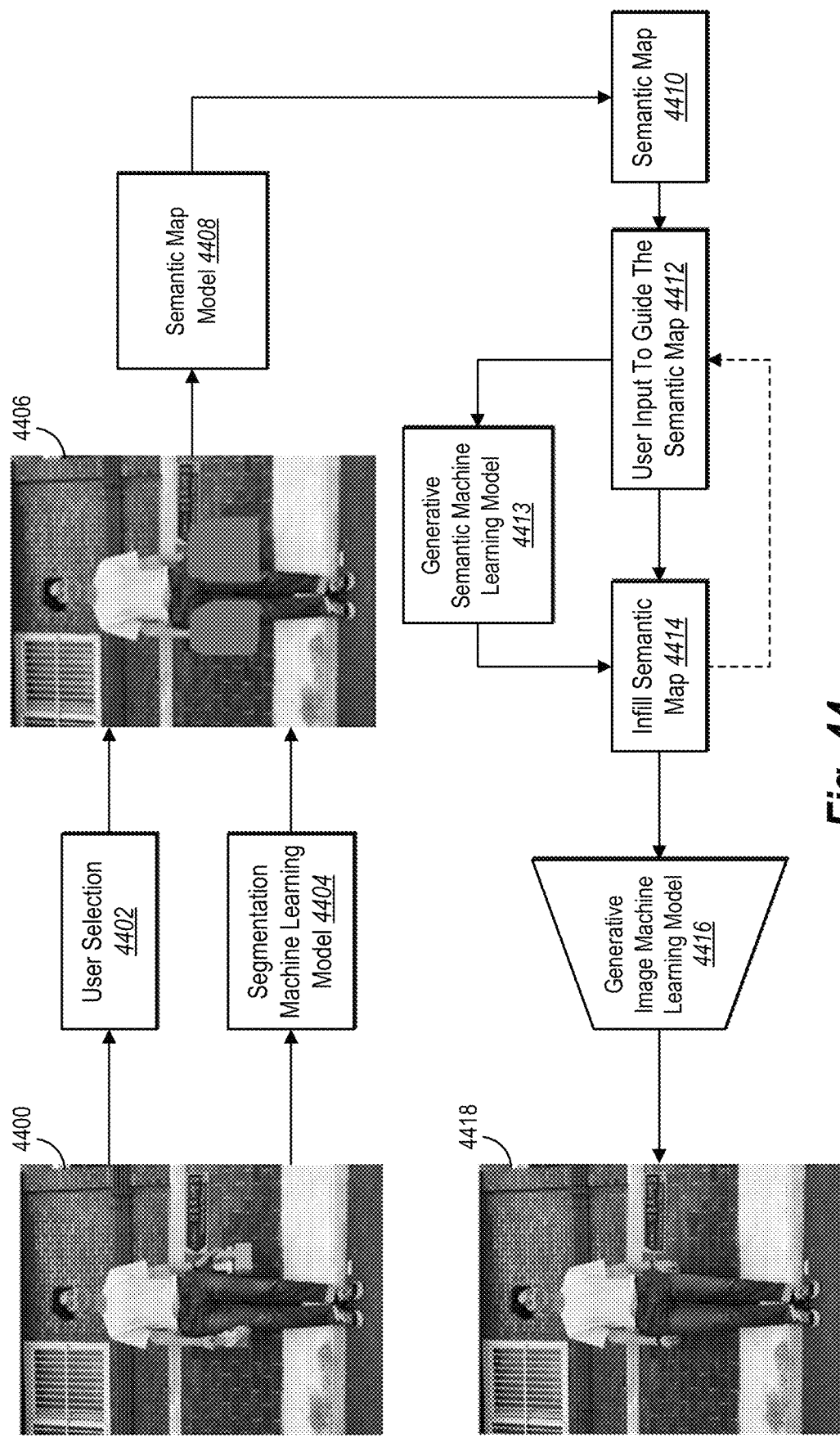
FIG. 44 illustrates an example diagram of a scene-based image editing system segmenting a portion of a digital image to replace in accordance with one or more embodiments.

As mentioned above, in one or more embodiments the scene-based image editing system 106 utilizes segmentation image neural networks. For example, FIG. 44 illustrates the scene-based image editing system 106 generating a modified digital image based on segmenting an input image in accordance with one or more embodiments. In particular, FIG. 44 shows a digital image 4400 that portrays a person holding two items, one in each hand. The scene-based image editing system 106 generates a modified digital image 4418 which removes the two items from the person's hands and infills the removed portion of the digital image 4400.

As shown, FIG. 44 illustrates the scene-based image editing system 106 segmenting the two items in the person's hands. For example, FIG. 44 shows the scene-based image editing system 106 utilizing either a user selection 4402 or a segmentation machine learning model 4404 to select and segment the two items in the person's hands. In particular, the segmentation machine learning model 4404 is a neural network that segments or selects objects in a digital image. Thus, as shown the segmentation machine learning model 4404 generates a segmented (or masked) digital image 4406.

The scene-based image editing system 106 can identify the user selection 4402 in a variety of ways. In some implementations, the scene-based image editing system 106 provides an editing tool to a client device and identifies the region to be removed based on user interaction with the editing tool. Specifically, the client device can identify a user interaction (e.g., a click, finger press, or drawing) to indicate scene-based image editing system 106 the portion to segment.

In some embodiments, the scene-based image editing system 106 utilizes the segmentation machine learning model 4404 to select the items. The segmentation machine learning model 4404 can also segment or select objects based on user input (or without user input). For example, in some implementations the scene-based image editing system 106 provides an option to the user of the client device to query a portion to be selected (via a selection or a natural language input). For instance, the user of the client device queries the scene-based image editing system 106 to select "bags" shown in the digital image 4400. Based on the query, the scene-based image editing system 106 utilizes the segmentation machine learning model 4404 to segment the portion of the digital image 4400 that portrays "bags." In other embodiments, the user of the client device queries the scene-based image editing system 106 to select "pants" or "shirt" or "hair."

In some implementations, the scene-based image editing system 106 utilizes the user selection 4402 with the segmentation machine learning model 4404 to segment or select an object in a digital image. For example, the scene-based image editing system 106 can utilize the segmentation machine learning model 4404 to analyze user inputs (e.g., clicks, drawings, outlines, or natural language) with the digital image to generate a segmentation. For example, the scene-based image editing system 106 can utilize the segmentation approach described in UTILIZING INTERACTIVE DEEP LEARNING TO SELECT OBJECTS IN DIGITAL VISUAL MEDIA, U.S. application Ser. No. 16/376,704, filed on Apr. 5, 2019, which is incorporated by reference herein in its entirety.

As mentioned previously in relation to FIGS. 40-41, the scene-based image editing system 106 can also generate a semantic map. In relation to FIG. 44, the scene-based image editing system 106 generates a semantic map 4410 utilizing the segmented (or masked) digital image 4406. In particular, the scene-based image editing system 106 utilizes the segmentation machine learning model 4404 to assign a label to pixels within the digital image 4400.

As further illustrated, FIG. 44 shows the scene-based image editing system 106 utilizing a semantic map model 4408 (already discussed above) to generate a semantic map 4410 from the segmented (or masked) digital image 4406. In particular, the scene-based image editing system 106 generates the semantic map 4410 for the masked portion (i.e., the infill region) from the segmented digital image 4406. In accordance with the embodiment illustrated in FIG. 44, the scene-based image editing system 106 further performs an act 4412. In particular, the act 4412 includes providing an option for a user of a client device to provide user input to guide the generation of an infill semantic map 4414. Specifically, the option for a user to provide user input to guide the generation of the infill semantic map 4414 from the semantic map includes indicating semantic classification/boundaries in the semantic map 4410. For example, the scene-based image editing system 106 receives the user input to guide the semantic map and utilizing a generative semantic machine learning model 4413, the scene-based image editing system 106 generates the infill semantic map 4414. In particular, as mentioned above (in the description of FIG. 41) the scene-based image editing system 106 generates the infill semantic map 4414 by utilizing the semantic map and/or the user input to guide the semantic map (e.g., the semantic editing input) as a conditioning input. For instance, as discussed, the scene-based image editing system 106 utilizes the semantic map and/or the user input to guide the semantic map to condition each layer of the denoising neural networks.

Accordingly, for the scene-based image editing system 106 providing the option to provide user input to guide the semantic map, the scene-based image editing system 106 provides an option to indicate the direction and position of the hands beneath the items removed (e.g., the bags). This is discussed in additional detail below (e.g., with regard to FIG. 49A).

In response to the scene-based image editing system 106 performing the act 4412 of providing the option to provide user input to guide the generation of the infill semantic map 4414, the scene-based image editing system 106 further utilizes the generative semantic machine learning model 4413 to generate the infill semantic map 4414 based on the user input. As indicated by FIG. 44, the act 4412 can iteratively occur to re-generate the infill semantic map 4414 until the user of the client device is satisfied with the infill semantic map 4414.

Moreover, FIG. 44 illustrates the scene-based image editing system 106 utilizing a generative image machine learning model 4416 (e.g., generative image machine learning model 4010 discussed in FIG. 40) to generate the modified digital image 4418. Specifically, the modified digital image 4418 shows the digital image 4400 however without the items in the person's hands and the background and the hands infilled by the scene-based image editing system 106.

Although FIG. 44 illustrates the act 4412 of providing the user of the client device the option to provide user input to guide the scene-based image editing system 106 generating the infill semantic map 4414, in one or more embodiments, the scene-based image editing system 106 does not provide this user input option. For example, the scene-based image editing system 106 generates the semantic map 4410 and then generates the modified digital image 4418 via the generative image machine learning model 4416.

Figure 45A:
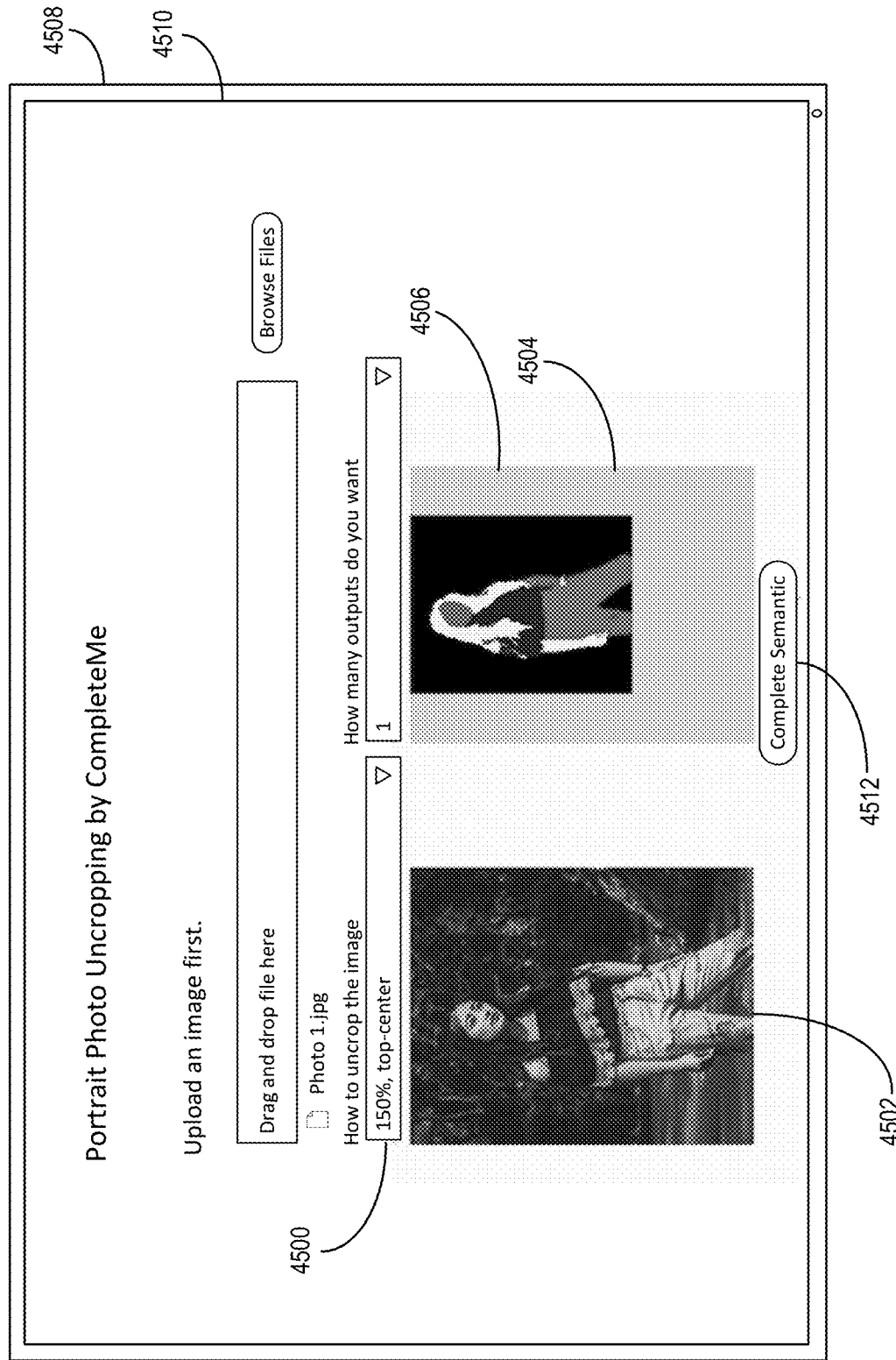
FIGS. 45A-45C illustrate an example graphical user interface of the scene-based image editing system providing parameters for generating a modified digital image in accordance with one or more embodiments.

As mentioned above, in some embodiments the scene-based image editing system 106 provides a user interface to a user of a client device to generate a modified digital image. For example, FIG. 45A illustrates a client device 4510 with a user interface 4508 for expanding a frame of a digital image (e.g., uncropping) in accordance with one or more embodiments. In particular, FIG. 45A shows a selectable expansion option 4500 for "how to uncrop the image" and a drop-down option to indicate the manner of expanding the digital image 4502. For instance, expanding the digital image 4502 includes the infill modification discussed above.

Furthermore, the selectable expansion option 4500 includes an option to indicate a percentage by which to expand the digital image 4502 and a position of the digital image 4502 within an expanded frame 4504. For instance, FIG. 45A shows an indication to expand the digital image 4502 by 150%. Furthermore, FIG. 45A also shows an indication to position the digital image 4502 at the top-center position of the expanded frame 4504. In other instances, the position of the digital image in the expanded frame 4504 includes top-left, top-right, bottom-left, bottom-right, bottom-center, middle-left, middle-right, and middle-center. Moreover, the scene-based image editing system 106 can place the digital image 4502 within the expanded frame 4504 and provide an option for the user of the client device to drag the digital image 4502 into a desired position.

In response to an indication of the parameters to expand the digital image 4502, the scene-based image editing system 106 shows next to the digital image 4502 a semantic map 4506. Similar to the above discussion, the scene-based image editing system 106 generates the semantic map 4506 utilizing a semantic map model. Furthermore, FIG. 45A also illustrates the semantic map within the expanded frame 4504 positioned in the "top-center." Additionally, FIG. 45A shows the scene-based image editing system 106 providing via the user interface a semantic completion option 4512 (labeled in FIG. 45A as "complete semantic"). The semantic completion option shown 4512 in FIG. 45A utilizes the process discussed above in FIGS. 40-41 for generating an infill semantic map. Specifically, in response to a selection of the semantic completion option 4512 in the user interface 4508, the scene-based image editing system 106 infills the expanded frame 4504 based on the semantic map 4506 (e.g., the initial semantic map of the digital image 4502).

Figure 45B:
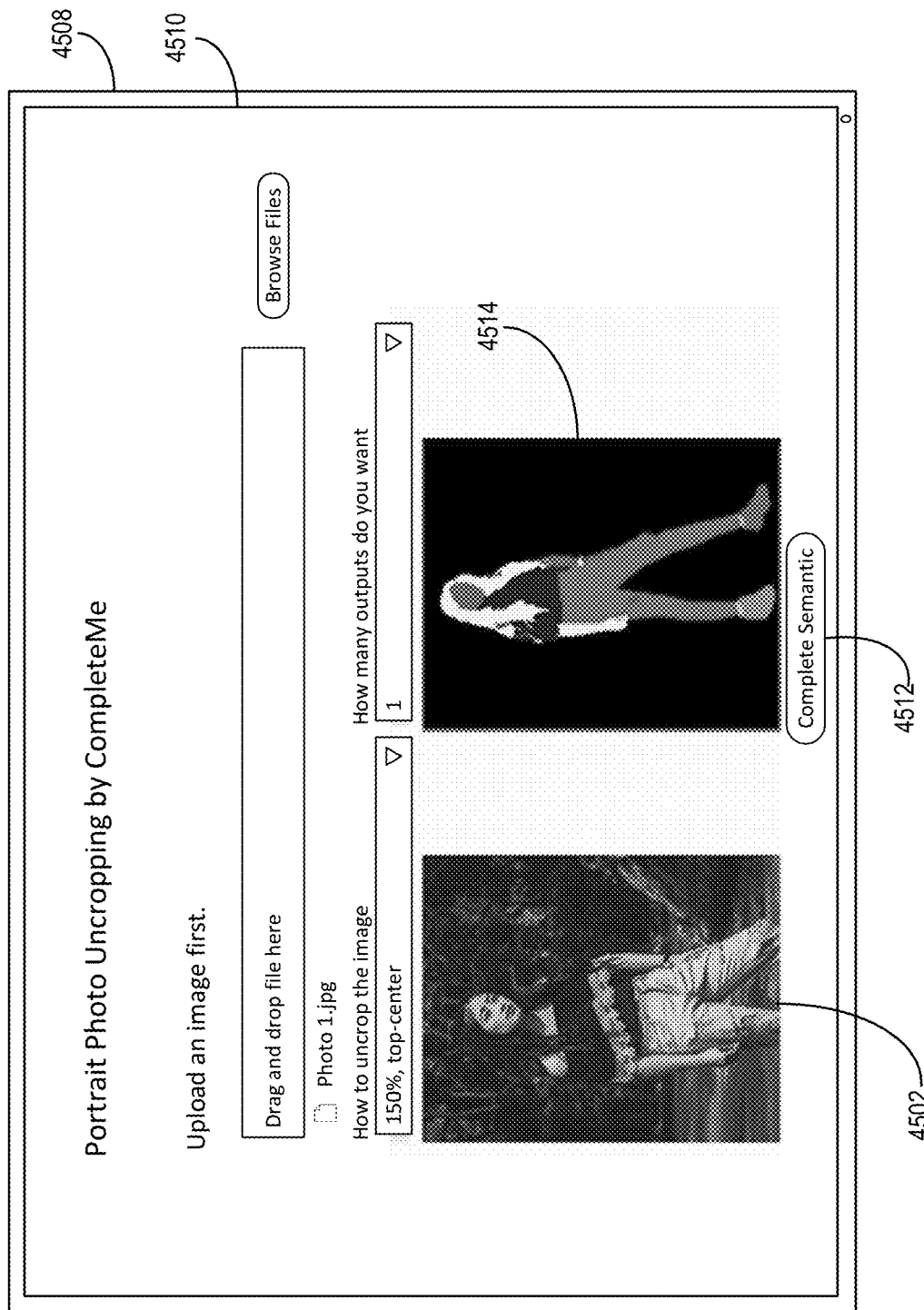

As just mentioned, the scene-based image editing system 106 receives a selection of the semantic completion option 4512. As illustrated, FIG. 45B shows the scene-based image editing system 106 receiving a selection of the semantic completion option 4512 to complete the semantic map and generating an infill semantic map 4514. Thus, comparing the semantic map 4506 shown in FIG. 45A within the expanded frame 4504 with the infill semantic map 4514, FIG. 45B illustrates the completion of the lower extremities (e.g., below the knee) that correspond with the expanded frame from FIG. 45B. For instance, the infill semantic map 4514 illustrates the semantic labels for the pants, ankles and, shoes/feet whereas the digital image 4502 only depicts the person from the knees up.

Figure 45C:
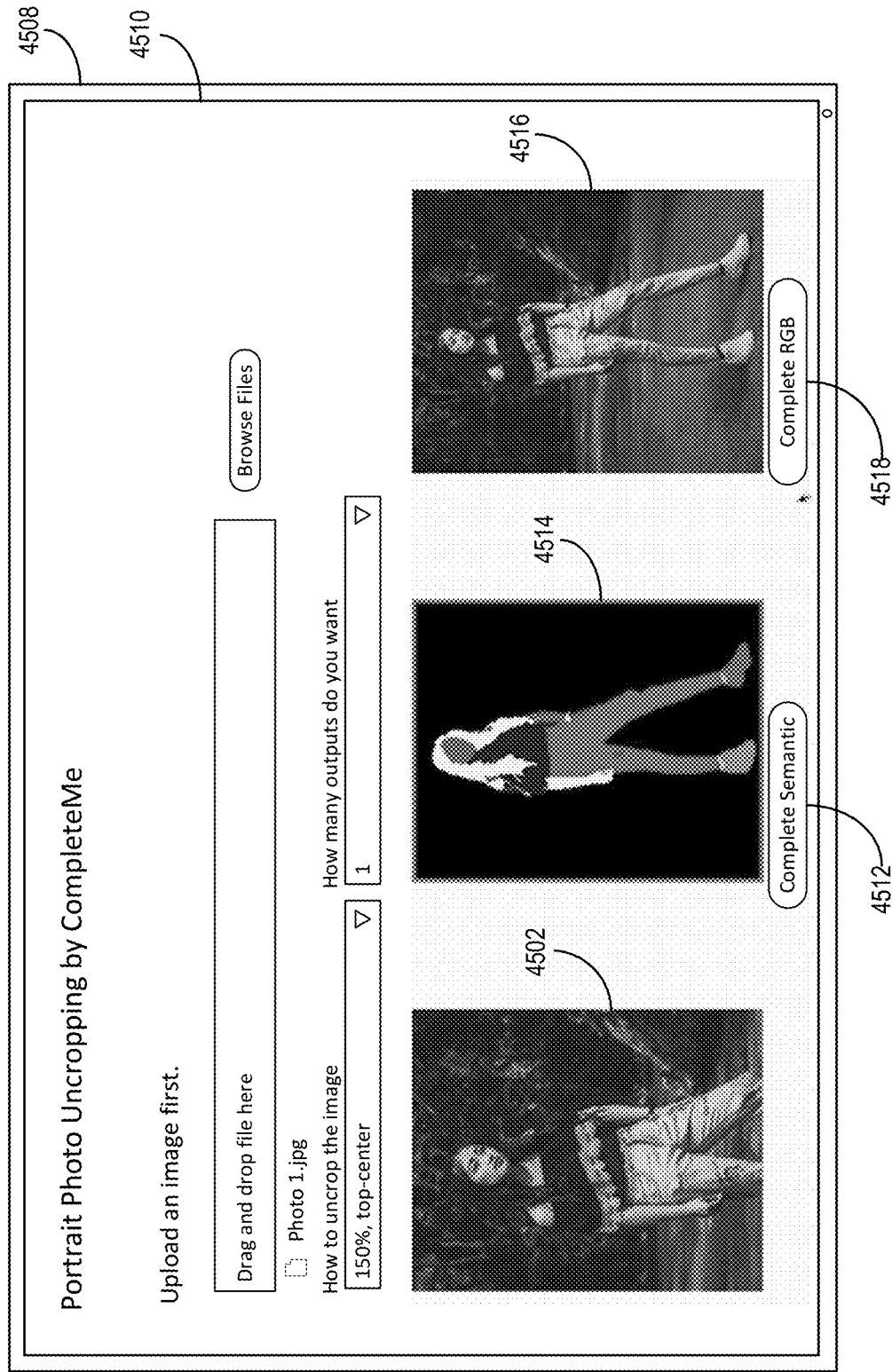

In addition, FIG. 45C illustrates the user interface 4508 for generating a modified digital image from an infill semantic map in accordance with one or more embodiments. For example, FIG. 45C illustrates a digital image completion option 4518 (labeled "complete RGB"). In particular, in response to selection of the digital image completion option 4518, the scene-based image editing system 106 generates a modified digital image 4516 based on the infill semantic map 4514. Accordingly, as shown in FIG. 45C, the scene-based image editing system 106 provides for display (via the user interface 4508) the modified digital image 4516 (e.g., the completed digital image) along with the infill semantic map 4514 and the digital image 4502. Similar to the discussion in FIG. 45B, the modified digital image 4516 shows the person in the digital image 4502 from the knees down. In particular, as already mentioned, the scene-based image editing system 106 guides the generation of the modified digital image 4516 with the infill semantic map 4514.

Figure 46:
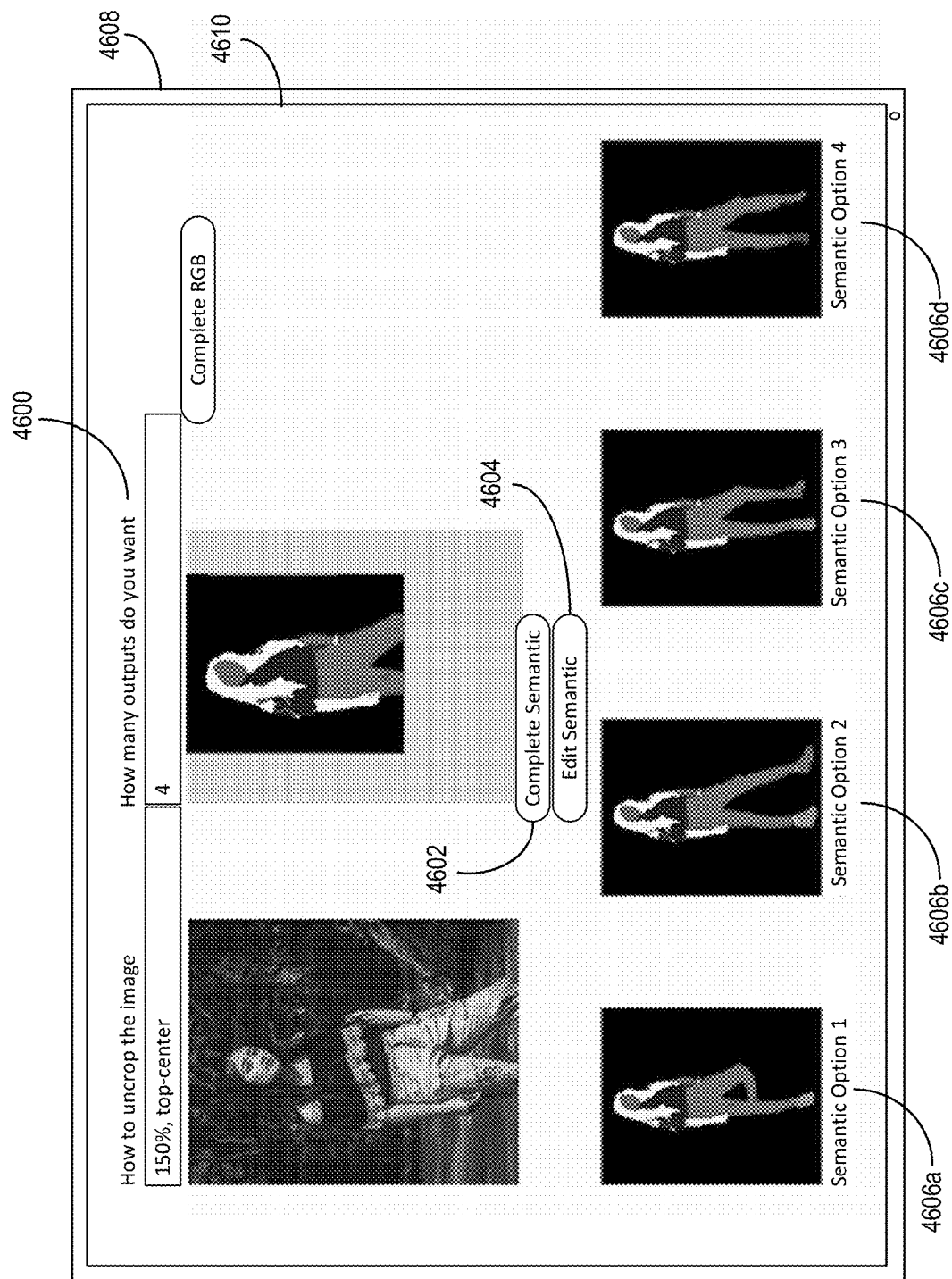
FIG. 46 illustrates an example graphical user interface of the scene-based image editing system generating multiple infill semantic map options in accordance with one or more embodiments.

As also shown in FIGS. 45A-45C, the scene-based image editing system 106 provides, via the user interface 4508 of the client device 4510 a number of infill semantic maps option to generate multiple infill semantic maps. For example, FIG. 46 illustrates a number of infill semantic maps option 4600 for selecting a number of infill semantic map outputs. In particular, FIG. 46 shows the user interface 4610 displaying the number of infill semantic maps option 4600 as indicating four infill semantic map outputs. Based on the indicated number of outputs for the infill semantic map, the scene-based image editing system 106 utilizes the generative semantic machine learning model to generate the indicated number. Moreover, FIG. 46 also illustrates a semantic completion option 4602 and a semantic editing option 4604.

As shown, FIG. 46 illustrates the scene-based image editing system 106 generating a first semantic option 4606a, a second semantic option 4606b, a third semantic option 4606c, and a fourth semantic option 4606d. Furthermore, the scene-based image editing system 106 provides the option for the client device 4608 to select a semantic option for the scene-based image editing system 106 to further generate the modified digital image. In one or more embodiments, the scene-based image editing system 106 utilizes a diffusion neural network to generate the multiple outputs of the infill semantic map. For instance, the diffusion neural network generates multiple semantic options by performing the diffusion and denoising process for different diffusion signals. Specifically, if the scene-based image editing system 106 receives an indication to generate four separate semantic options, the scene-based image editing system 106 feeds four different noisy signals to the diffusion neural network. Thus, for each starting signal the scene-based image editing system 106 via the diffusion neural network generates an infill semantic map with the legs positioned differently (e.g., different semantic classifications/boundaries).

In one or more embodiments, the scene-based image editing system 106 provides the client device 4608 with an option to select multiple semantic options. In particular, the scene-based image editing system 106 allows the user of the client device 4608 to select two or more semantic options. Furthermore, in response to selecting multiple semantic options and receiving a digital image completion selection (labeled "complete RGB"), the scene-based image editing system 106 generates a modified digital image for each semantic option selected.

Figure 47:
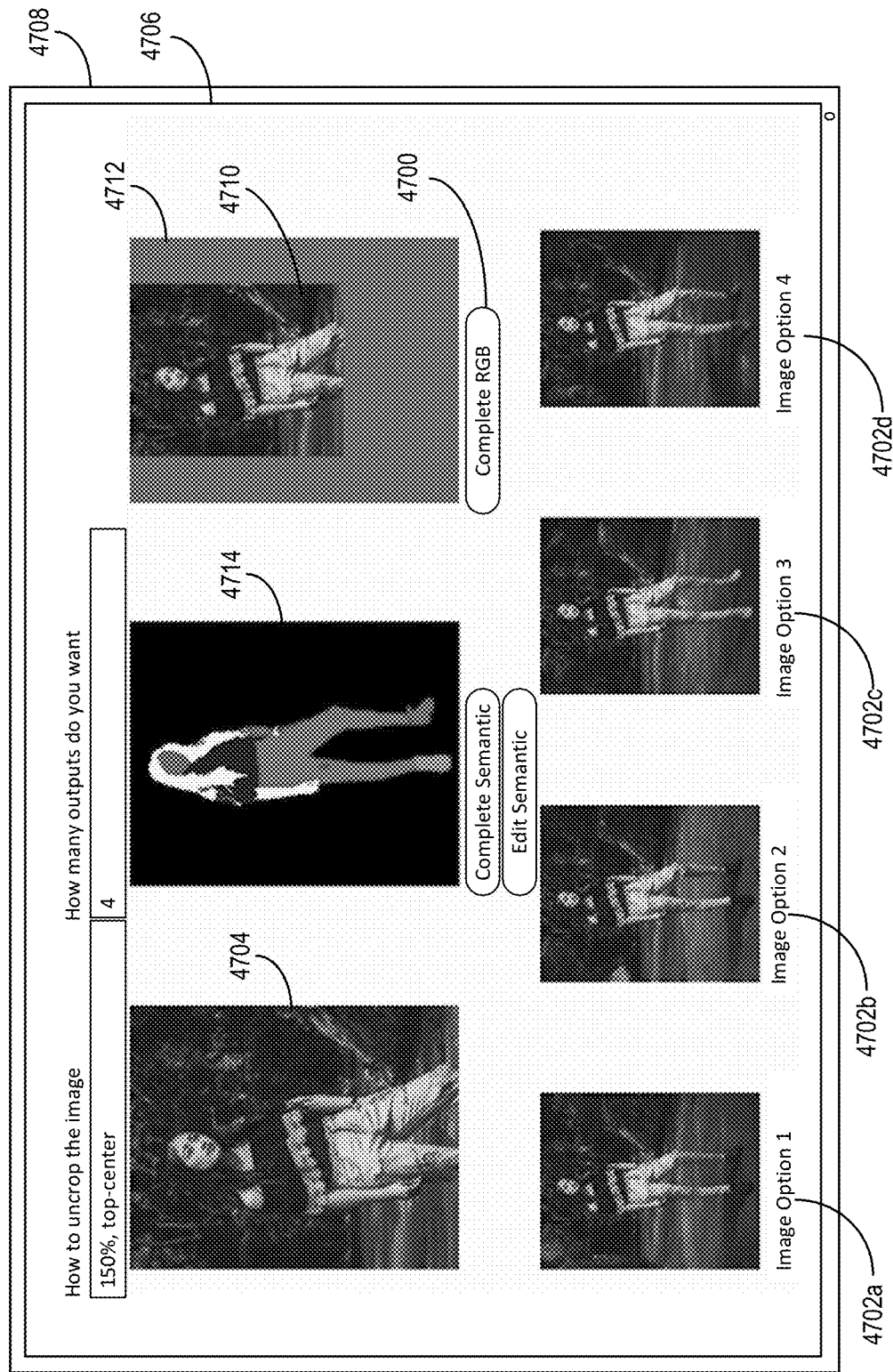
FIG. 47 illustrates an example graphical user interface of the scene-based image editing system generating multiple modified digital images in accordance with one or more embodiments.

In one or more implementations, the scene-based image editing system 106 generates multiple modified digital images from a single semantic map. For example, FIG. 47 illustrates the scene-based image editing system 106 generating multiple outputs of modified digital images in accordance with one or more embodiments. In particular, FIG. 47 shows the scene-based image editing system 106 generating an infill semantic map 4714 from a digital image 4704 and a client device 4708 of a user interface 4706 showing a digital image 4710 within an expanded frame 4712. In response to user selection of a digital image completion option 4700 (labeled "complete RGB"), the scene-based image editing system 106 generates multiple modified digital images that conform with the infill semantic map 4714. Specifically, the digital image completion option 4700 provides a selectable element for indicating the number of outputs of modified digital images.

FIG. 47 illustrates the scene-based image editing system 106 generating a first image option 4702a, a second image option 4702b, a third image option 4702c, and a fourth image option 4702d. In particular, FIG. 47 shows different color shades for the shoes of the person generated by the scene-based image editing system 106 via a generative image machine learning model such as a diffusion neural network. Similar to the discussion in FIG. 46, here the scene-based image editing system 106 via the diffusion neural network generates a number of starting noisy signals corresponding with the indicated number of outputs. In this way, the scene-based image editing system 106 via the diffusion neural network generates the correct number of image options. Furthermore, the scene-based image editing system 106 provides the option for the user of the client device to select a specific image option to utilize as the modified digital image.

Figure 48:
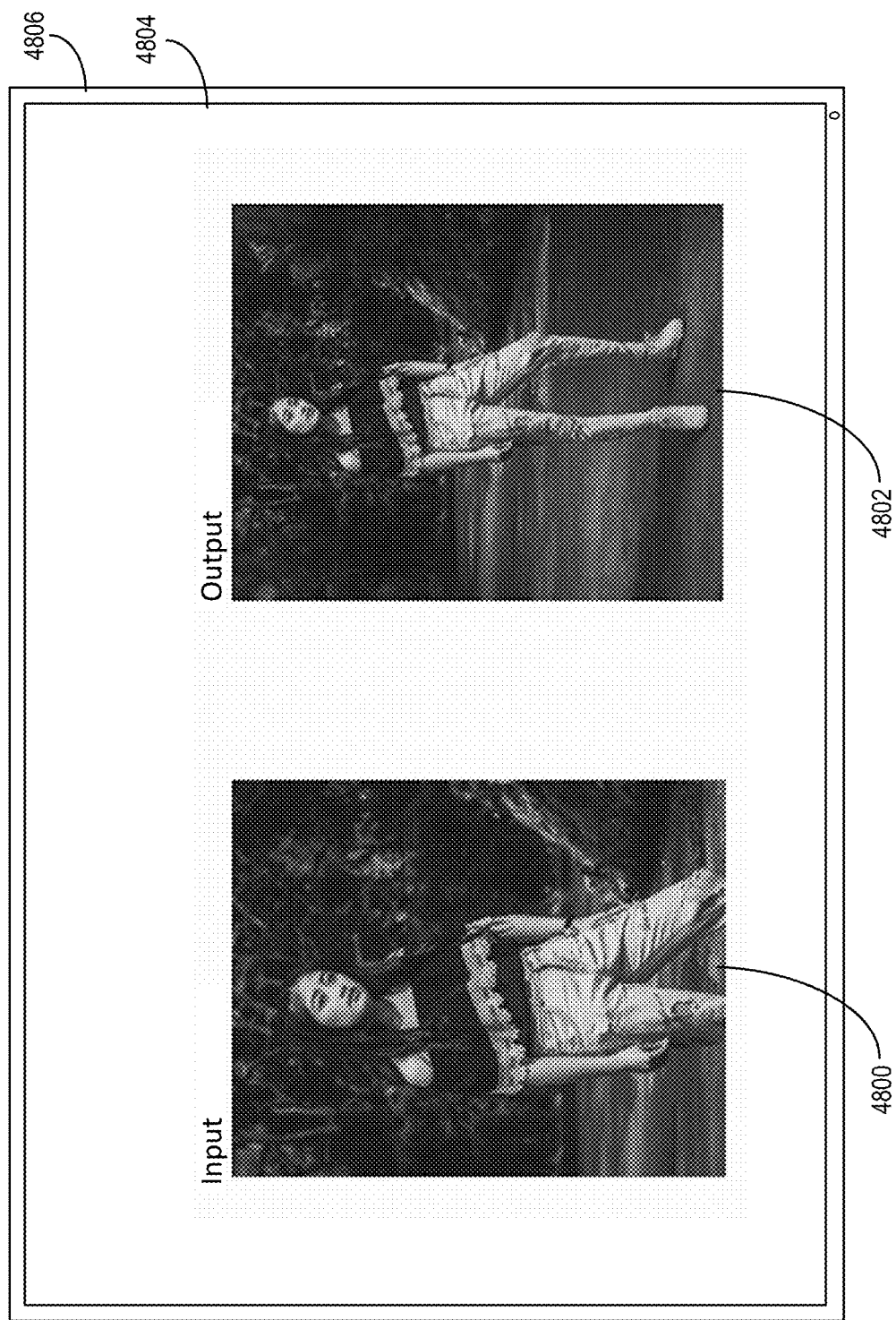
FIG. 48 illustrates an example graphical user interface of the results of the scene-based image editing system generating a modified digital image output in accordance with one or more embodiments.

The above discussion for FIGS. 45A-47 relates to user interface flow for generating a modified digital image. FIG. 48 illustrates the results of and generating a modified digital image with an expanded frame in accordance with one or more embodiments. As already mentioned, the scene-based image editing system 106 receives an input digital image 4800 and an indication of a region to infill. In particular, FIG. 48 shows a client device 4806 via a user interface 4804 displaying the input digital image 4800. Moreover, the scene-based image editing system 106 generates an infill semantic map and generates a modified digital image 4802 as shown in FIG. 48. FIG. 48 further illustrates the efficiency of the user interface to modify the input digital image 4800 quickly and accurately.

Figure 49A:
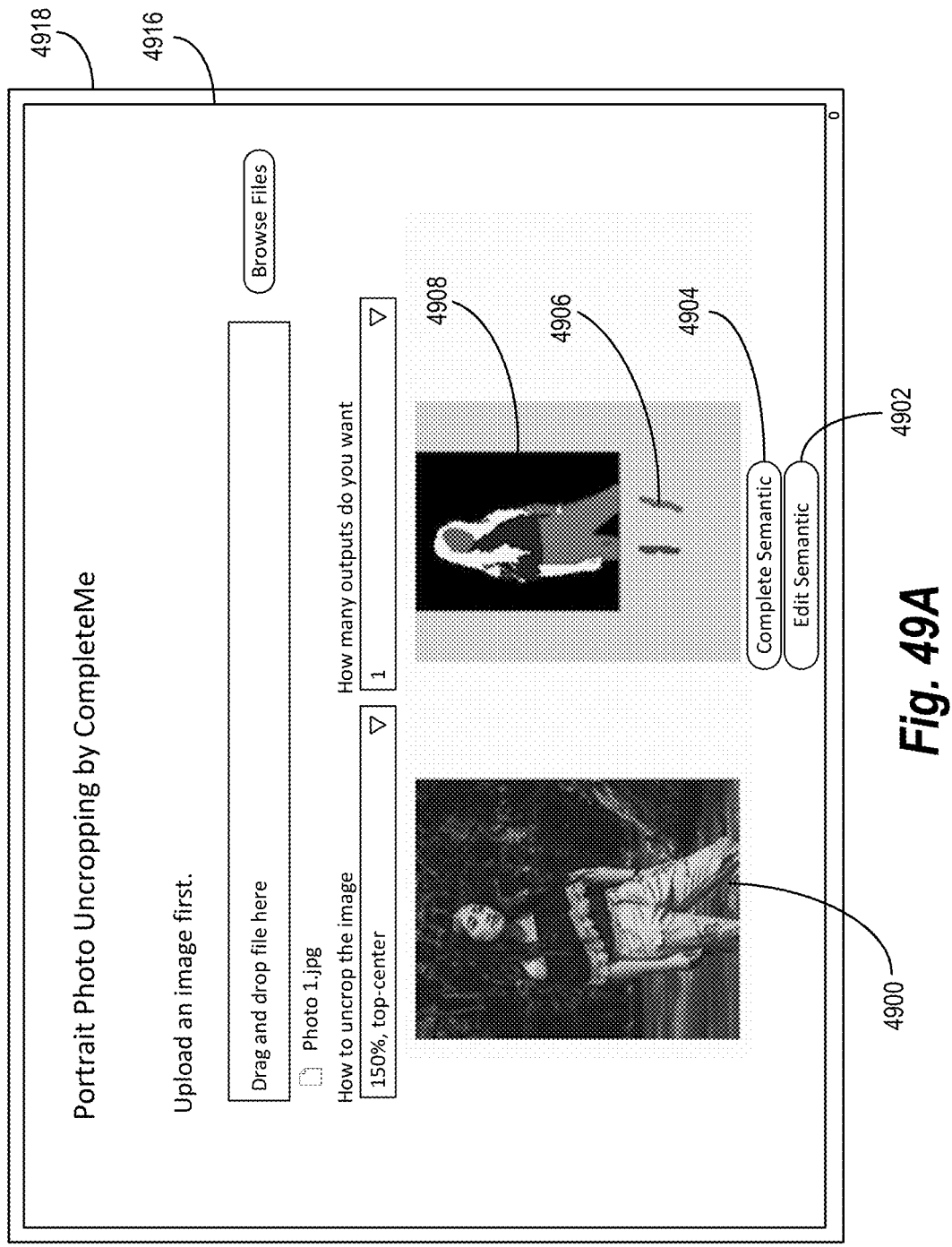
FIGS. 49A-49B illustrate an example graphical user interface of the scene-based image editing system receiving semantic editing input in accordance with one or more embodiments.

As mentioned above, the scene-based image editing system 106 can provider user interfaces for editing semantic maps in generating a modified digital image. For example, FIG. 49A illustrates the scene-based image editing system 106 providing an option to a user of a client device to provide semantic editing input in accordance with one or more embodiments. For example, FIG. 49A shows the scene-based image editing system 106 providing, for display via a user interface 4916 of a client device 4918, a digital image 4900 and a semantic map 4908 corresponding to the digital image 4900. Based on an indication to expand the frame of the digital image 4900, the scene-based image editing system 106 provides the semantic map 4908 for display via the client device 4918 within the user interface 4916 and provides an option to provide a semantic editing input 4906. In other words, the scene-based image editing system 106 provides an option to edit the semantic map 4908. Specifically, the scene-based image editing system 106 provides via the client device 4918, a drawing tool to the user of the client device 4918 to add semantic classifications and/or add/modify a semantic boundary. As shown in FIG. 49A, user input via the drawing tool indicates the location of new semantic classifications for a left leg and a right leg (instead of pants) in the expanded region. Accordingly, the semantic classification extends into the expanded region (e.g., the expanded digital image frame).

Semantic classifications were previously mentioned in relation to the generation of the semantic map 4908. For example, generating semantic maps and infill semantic maps includes generating a semantic classification. In particular, a semantic classification includes a classification for an object of the digital image 4900. The scene-based image editing system 106 can include these classifications in a variety of ways, including numbers, text, textures, or other labels. In relation to FIG. 49A, the image editing system utilizes colors to indicate different classifications of pixels. For instance, for a region of the digital image 4900 that corresponds with the legs of a human, the scene-based image editing system 106 utilizes a semantic classification with a bright pink shade. In other instances, for a region of the digital image 4900 that corresponds with the arms of a human, the semantic classification includes a yellow shade for one arm and a blue shade for the shirt. Alternatively, the scene-based image editing system 106 can utilize various shades of grey to indicate semantic classifications.

Accordingly, utilizing a semantic map model, scene-based image editing system 106 classifies each pixel of the digital image 4900. For the semantic classification, the scene-based image editing system 106 utilizes color shades to indicates objects such as hair, face, arms, shirt, torso, legs, pants, feet, shoes, and/or ankles. Moreover, for instances where generating the infill semantic map includes an expanded frame of the digital image, the scene-based image editing system 106 fills in the expanded frame for the infill semantic map by utilizing semantic classifications within the semantic map 4908. To illustrate, the digital image 4900 portrays a human from the knees up, and the scene-based image editing system 106 determines the infill modification as expanding the digital image 4900 to show the portrayal of the human below the knees. In such an instance, the scene-based image editing system 106 first generates the semantic map 4908 portraying the digital image of the human from the knees up. The semantic classification for pixels within the digital image 4900 guides the generative semantic machine learning model to fill-in the expanded portion of the digital image 4900. For instance, to complete the semantic map 4908 from the knees down, the scene-based image editing system 106 utilizes the semantic classification indicating the legs to complete the legs in the infill semantic map and add additional semantic classifications such as the feet.

As just mentioned above, the scene-based image editing system 106 generates semantic classifications when generating the semantic maps. In some embodiments, the scene-based image editing system 106 also generates a semantic boundary. In particular, the semantic boundary includes an indication of the shape or the form of pixels sharing a common semantic classification. For instance, a semantic boundary indicates an area of pixels sharing a pant semantic classification. Accordingly, in some implementations, the scene-based image editing system 106 identifies the semantic editing input 4906 to add/modify pixel classifications or to add/modify a classification boundary.

Figure 49B:
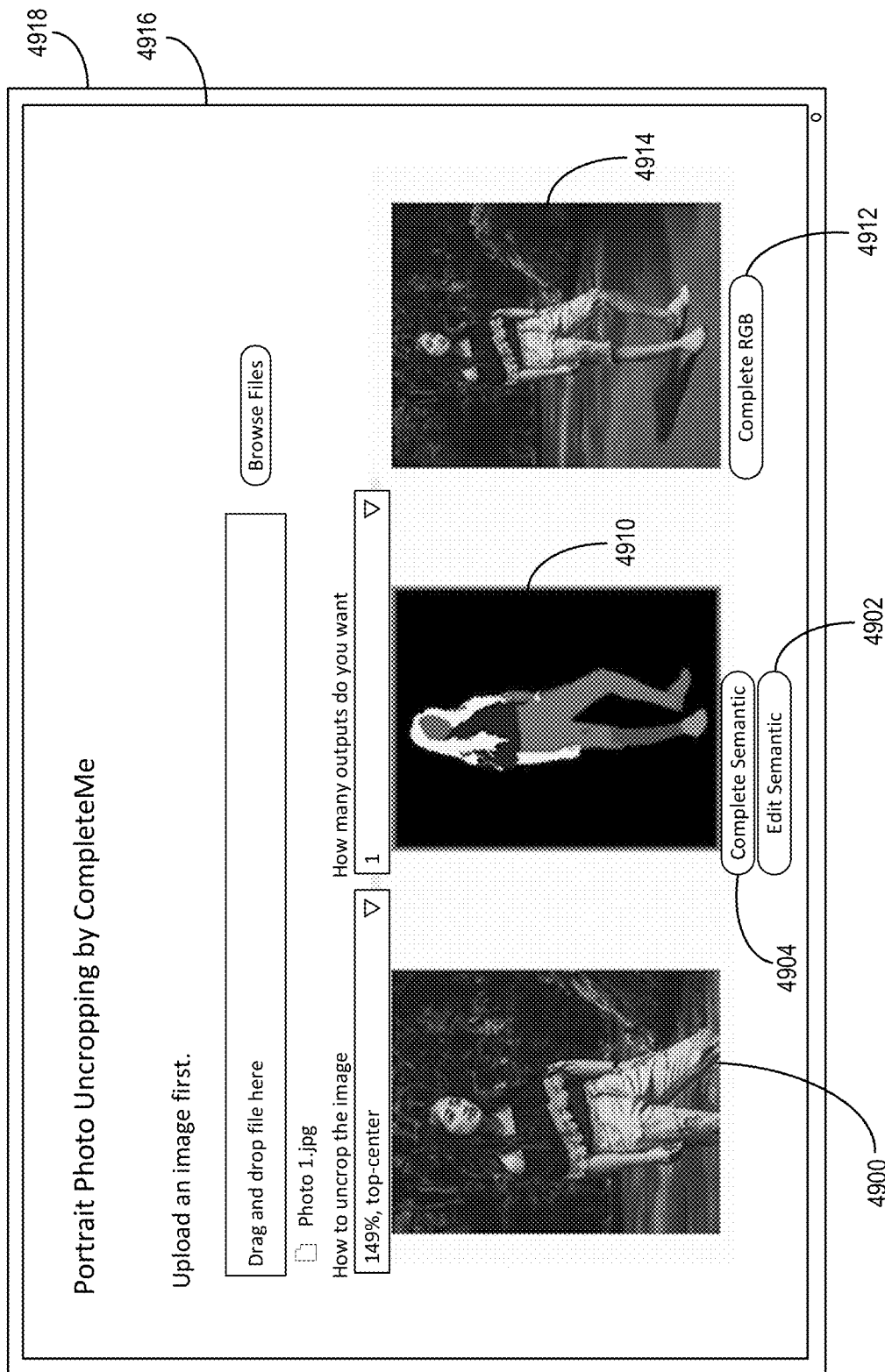

As just mentioned, the scene-based image editing system 106 provides a semantic editing input tool for the user of the client device to indicate the semantic boundaries. FIG. 49B illustrates the scene-based image editing system 106 generating an infill semantic map 4910 based on the semantic editing input 4906. In particular, after receiving the semantic editing input 4906, the scene-based image editing system 106 also receives a selection of a semantic completion option 4904 (labeled "complete semantic") and generates the infill semantic map 4910. In one or more embodiments, the scene-based image editing system 106 utilizes a generative semantic machine learning model to generate the infill semantic map 4910 (e.g., as discussed above in relation to FIG. 40). In some embodiments, the scene-based image editing system 106 generates the infill semantic map 4910 with a diffusion neural network.

Similar to the discussion in FIG. 41, the scene-based image editing system 106 utilizes the diffusion neural network to generate the infill semantic map 4910. In relation to FIG. 49A, the scene-based image editing system 106 conditions the layers of the denoising neural networks with the semantic editing input 4906 discussed in FIG. 49A.

As mentioned, the semantic editing input in FIG. 49A guides the generation of the infill semantic map 4910 shown in FIG. 49B. In particular, the semantic editing input 4906 in FIG. 49A includes skin/leg semantic classifications (instead of jeans or pants) . . . . Accordingly, as shown, the infill semantic map 4910 shows skin/legs semantic classes below jeans semantic classifications in conformity with the semantic editing input shown in FIG. 49A.

Moreover, the scene-based image editing system 106 provides a semantic editing option 4902 within the user interface to further edit the semantic. In particular, selecting the semantic editing option 4902 allows for modification of the semantic editing input 4906 to generate a different infill semantic map with different semantic classifications or semantic boundaries. For example, the scene-based image editing system 106 can modify semantic classifications of pixels/regions, change classification boundaries, or add new semantic classifications/boundaries.

FIG. 49B also illustrates a digital image completion option 4912 (labeled "complete RGB"). In particular, in response to a selection of the digital image completion option 4912 the scene-based image editing system 106 generates a modified digital image 4914 from the infill semantic map 4910. As shown, the modified digital image 4914 accurately depicts the legs shown in the infill semantic map 4910.

Figure 50A:
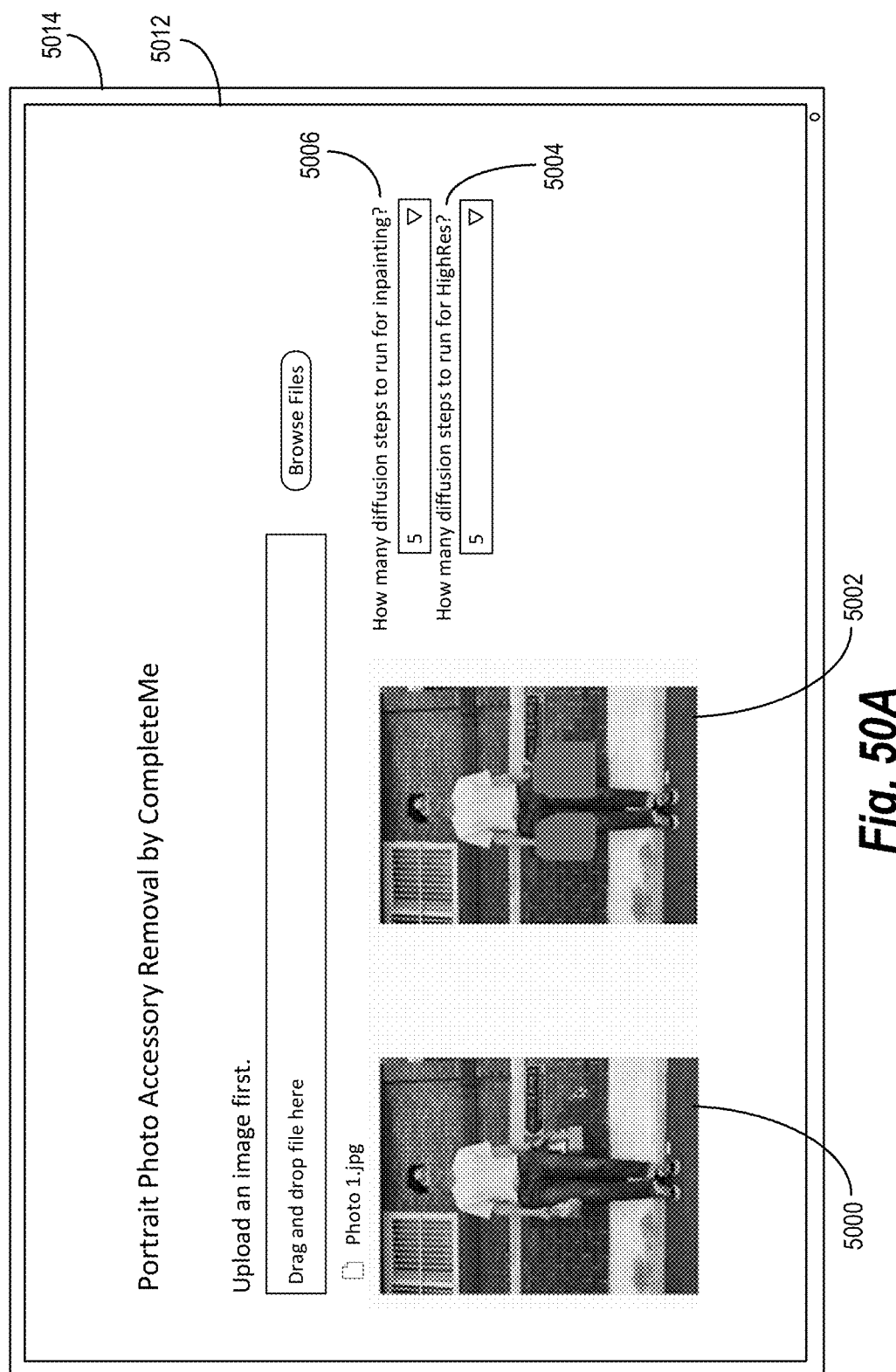
FIGS. 50A-50B illustrate an example graphical user interface of the scene-based image editing system removing an object and generating a modified digital image in accordance with one or more embodiments.

As mentioned, the scene-based image editing system 106 provides options for selecting regions in a digital image to remove. For example, FIG. 50A shows the scene-based image editing system 106 with a digital image 5000 and a masked digital image 5002 with the region to be removed masked. In particular, similar to the discussion in FIG. 44, the digital image 5000 portrays a person with bags in each hand and the scene-based image editing system 106 provides a tool to select a portion to remove. For instance, the scene-based image editing system 106 receives an indication to remove the bags via a click selection or a query that designates the "bags."

FIG. 50A further illustrates the scene-based image editing system 106 utilizing a user interface 5012 of a client device 5014 to provide a diffusion step iteration option 5006 to designate the number of diffusion steps (e.g., sampling steps) for performing the infill modification. In response to receiving the designated number of diffusion iterations, the scene-based image editing system 106 can dynamically select a number of diffusion layers/denoising layers to utilize in generating the modified digital image from the masked digital image 5002 and the digital image 5000. In particular, diffusion iterations include the length of the fixed Markov chain (e.g., the number of diffusion layers and/or denoising layers). In other words, the diffusion iterations indicate the number of steps for forward diffusion and the number of steps for reverse diffusion (denoising). Moreover, the scene-based image editing system 106 takes just a few seconds in some implementations to generate a modified digital image or a high-resolution version of the digital image 5000.

Furthermore, FIG. 50A also illustrates a high-resolution option 5004 to designate the number of diffusion steps for generating a high-resolution version of the modified digital image.

For example, based on conditioning from the infill semantic map, the diffusion neural network generates the modified digital image in a low-resolution version. In particular, in response to an indication to generate a high-resolution version of the digital image, the diffusion neural network receives the generated modified digital image (low-resolution) as an input and performs the number of diffusion iterations indicated to generate the high-resolution version of the modified digital image.

Although FIG. 50A shows various user interface options (e.g., the diffusion step iteration option 5006 and the high-resolution option 5004), in one or more embodiments, the scene-based image editing system 106 provides via the user interface 5012 of the client device 5014 the digital image 5000 and the masked digital image 5002 with the region to be removed without additional user interface elements. In particular, the scene-based image editing system 106 provides an intuitive and easy-to-use interface with the client device 5014 only displaying the digital image 5000 and the masked digital image 5002. In doing so, a user of the client device 5014 can via the user interface 5012 click/tap/select portions on the digital image 5000 and the scene-based image editing system 106 intelligently detects and performs acts such as generating a modified digital image. For instance, in response to detecting selection of an object in a person's hand, the scene-based image editing system 106 automatically generates an infill semantic map and infills the region defined by the object. Similarly, in response to a selection expanding the boundary or frame of a digital image, the scene-based image editing system 106 automatically generates an infill semantic map and infills the expanded frame. Thus, in some embodiments, the scene-based image editing system 106 eliminates user interface elements.

Figure 50B:
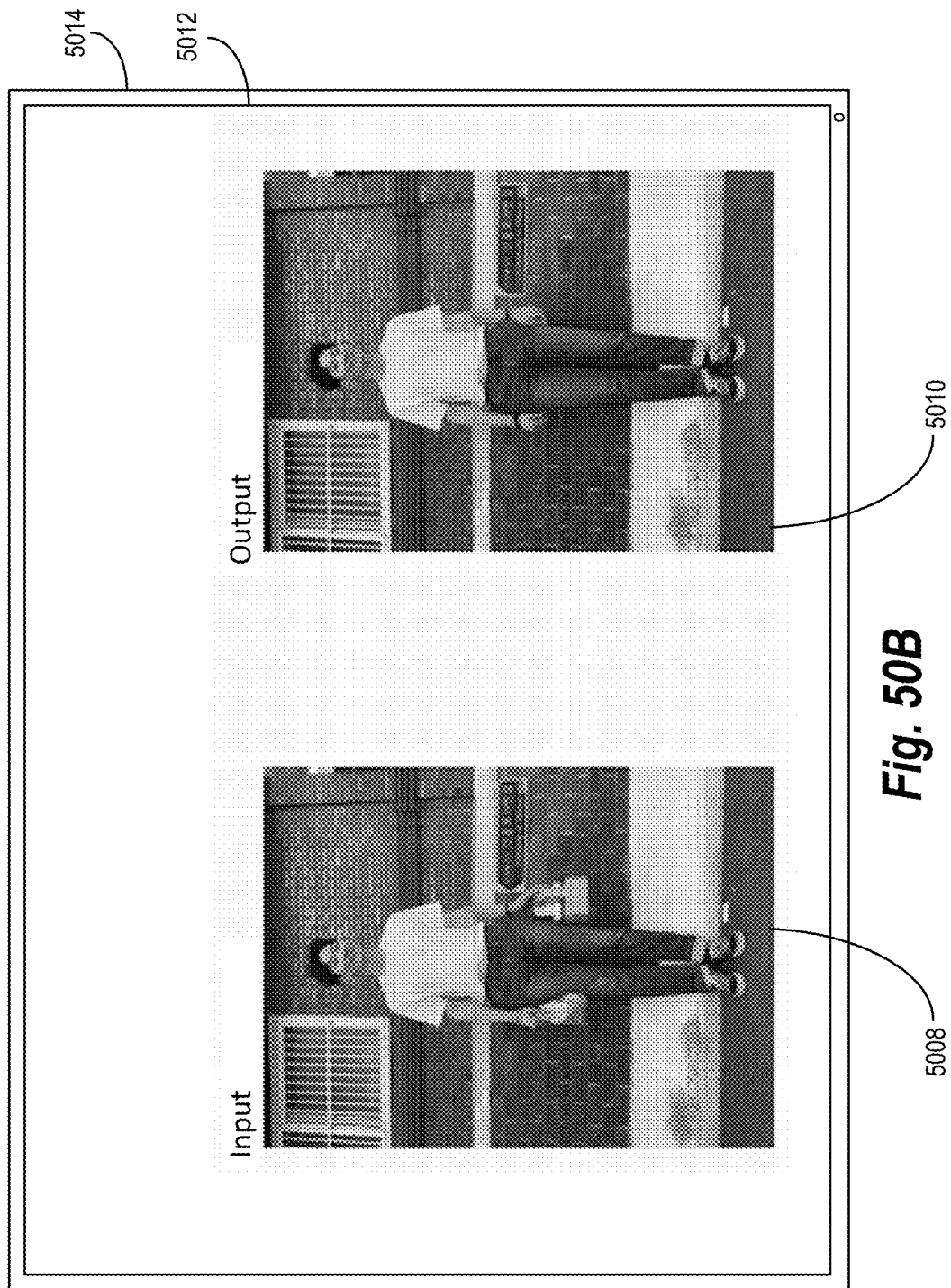

Moreover, FIG. 50B illustrates example results of the scene-based image editing system 106 removing items from an input digital image 5008. In particular, FIG. 50B illustrates the input digital image 5008 received as input by the scene-based image editing system 106 and in response to user interactions, generating a modified digital image 5010 that conforms with the user interactions. Specifically, FIG. 50B illustrates an accurate and high-quality modification of the input digital image 5008 to infill the hands and the background portion behind the removed bags.

Figure 51A:
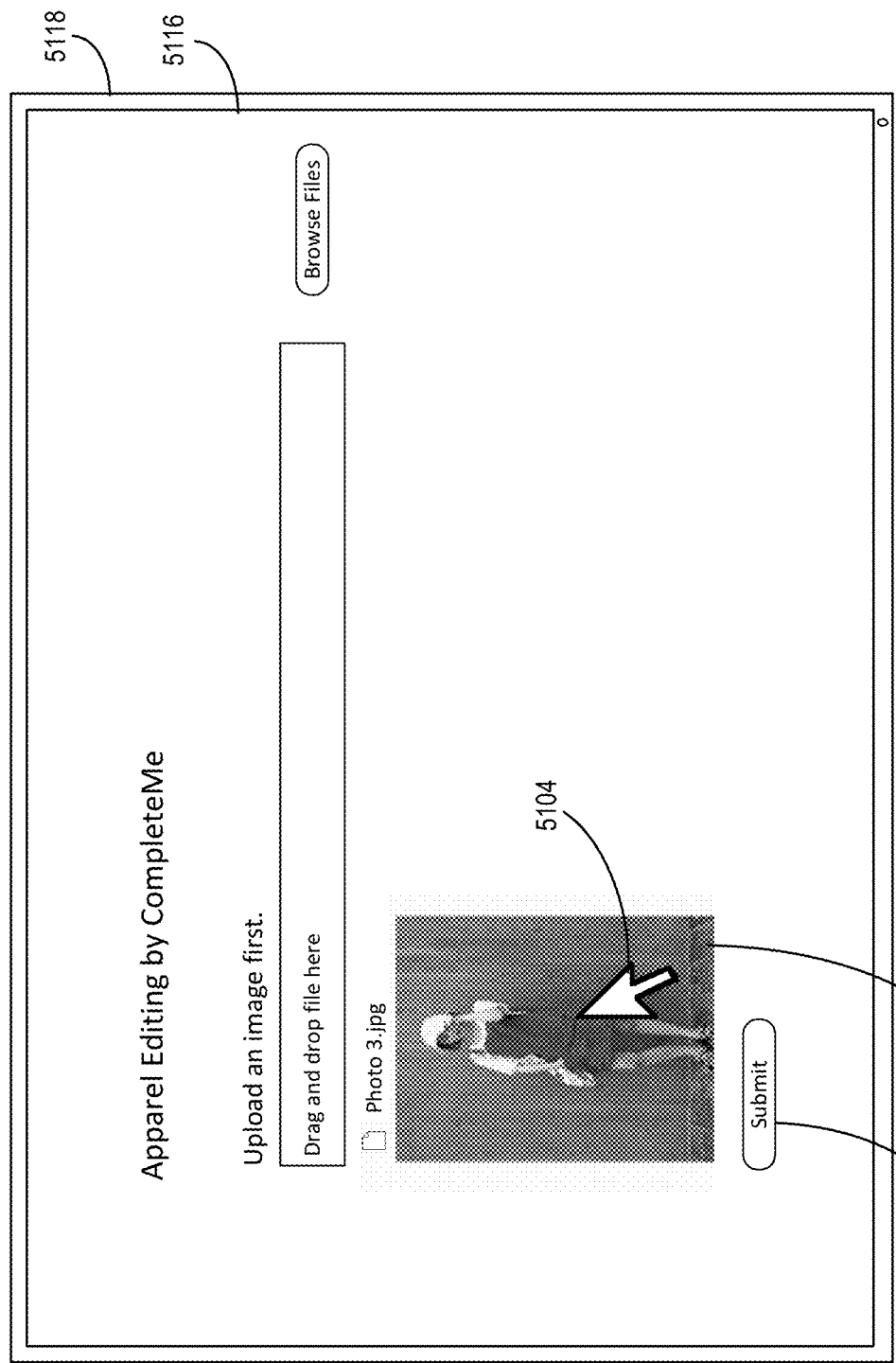
FIGS. 51A-51C illustrate an example graphical user interface of the scene-based image editing system modifying apparel within a digital image in accordance with one or more embodiments.

As mentioned above, in one or more embodiments the scene-based image editing system 106 provides the option for a client device to replace a segmented portion within a digital image with an input texture. For example, FIG. 51A illustrates a digital image 5102 within a user interface 5116 of a client device 5118. In response to a selection of the digital image 5102, the scene-based image editing system 106 applies a segmentation machine learning model to identify a region of the digital image 5102 to modify. For example, in response to selection of a pixel within the dress, the scene-based image editing system 106 identifies and segments the dress within the digital image 5102.

Figure 51B:
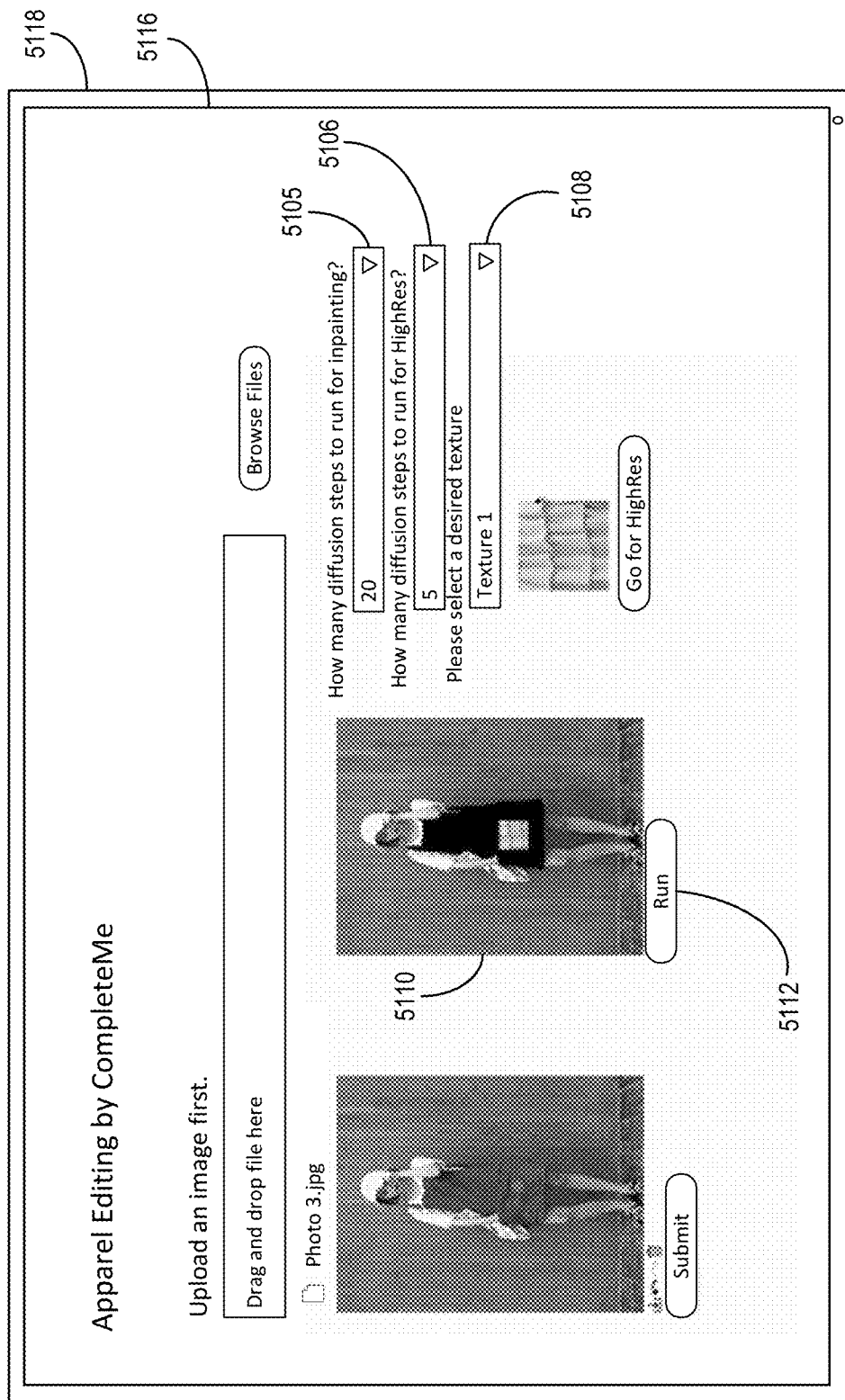

For example, FIG. 51B shows the user interface 5116 upon selecting and segmenting the dress within the digital image 5102. In particular, FIG. 51B illustrates a masked digital image 5110 next to the digital image 5104, where the masked digital image 5110 extracts/removes the selected portion from FIG. 51A. In addition, FIG. 51B illustrates the scene-based image editing system 106 providing additional options via the user interface 5116 of the client device 5118. For instance, FIG. 51B illustrates a diffusion iteration option 5105 for providing the number of diffusion iterations for the infill modification, a high-resolution option 5106 for indicating the number of diffusion iterations for a high-resolution version of the digital image, and a texture selection option 5108 for selecting a desired texture.

Specifically, for the texture selection option 5108 FIG. 51B shows a drop-down menu to select a texture patch. FIG. 51B shows a texture patch indicating an apparel pattern to replace the masked portion of the masked digital image 5110. Moreover, FIG. 51B illustrates a modified digital image generation option 5112 to generate the digital image with the masked portion matching the selected texture from the texture selection option 5108. In other embodiments, the scene-based image editing system 106 provides an option to select or upload a texture.

Figure 51C:
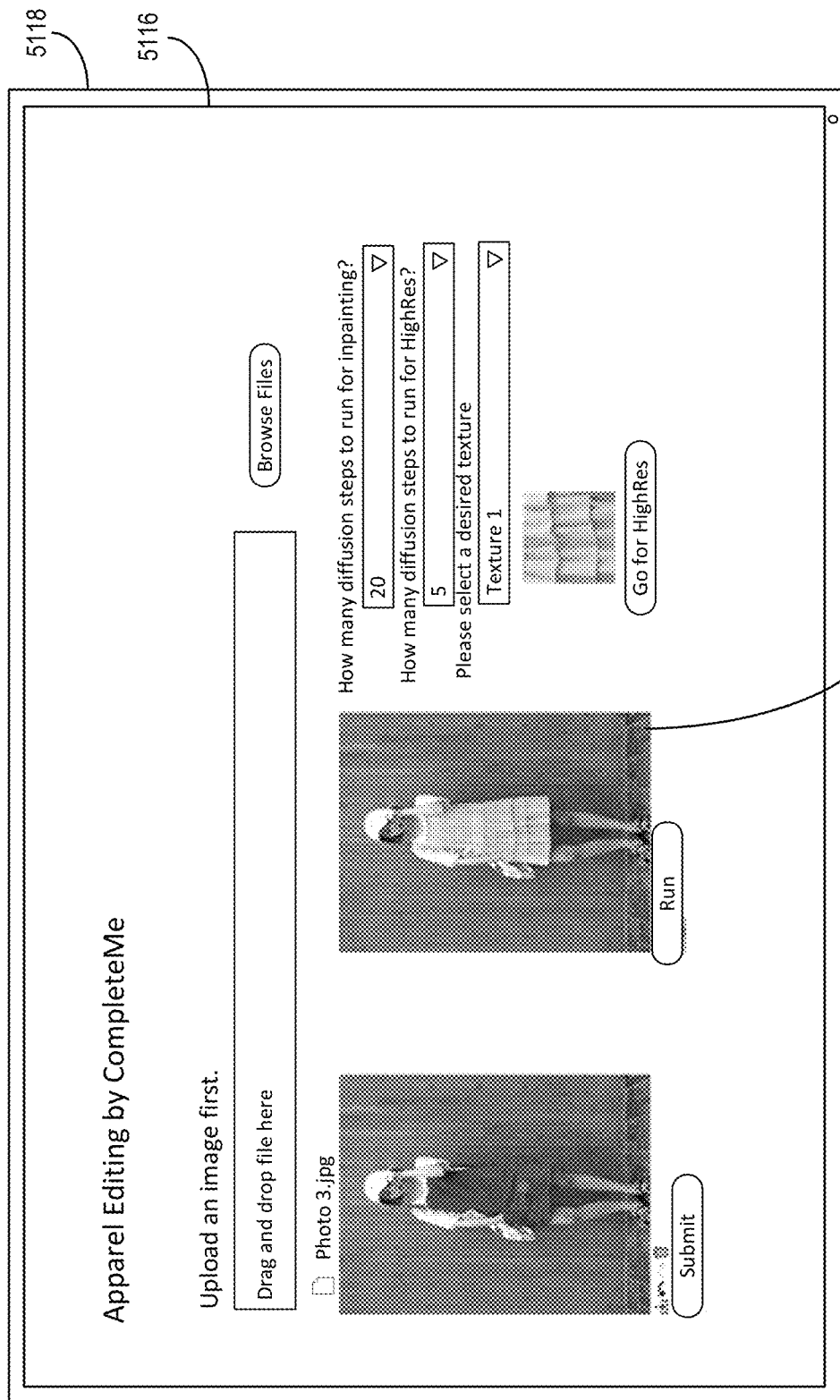

For example, FIG. 51C illustrates scene-based image editing system 106 providing, for display via a user the user interface 5116, the digital image 5104 and a modified digital image 5114. Specifically, the scene-based image editing system 106 has modified the dress from the digital image 5104 to include a texture corresponding to the selected texture patch. Notably, the scene-based image editing system 106 does not just fill the dress with the selected texture. Rather, the scene-based image editing system 106 recreates the dress so that it appears to be a realistic representation of a dress made out of the requested texture. Indeed, by conditioning a diffusion neural network on the requested texture, the generated dress appears as if it were a real dress made from the texture. In one or more embodiments, the scene-based image editing system 106 generates a replacement of the dress with the selected texture in the initial input digital image in less than 1 second for a designation of five diffusion steps.

Figure 52A:
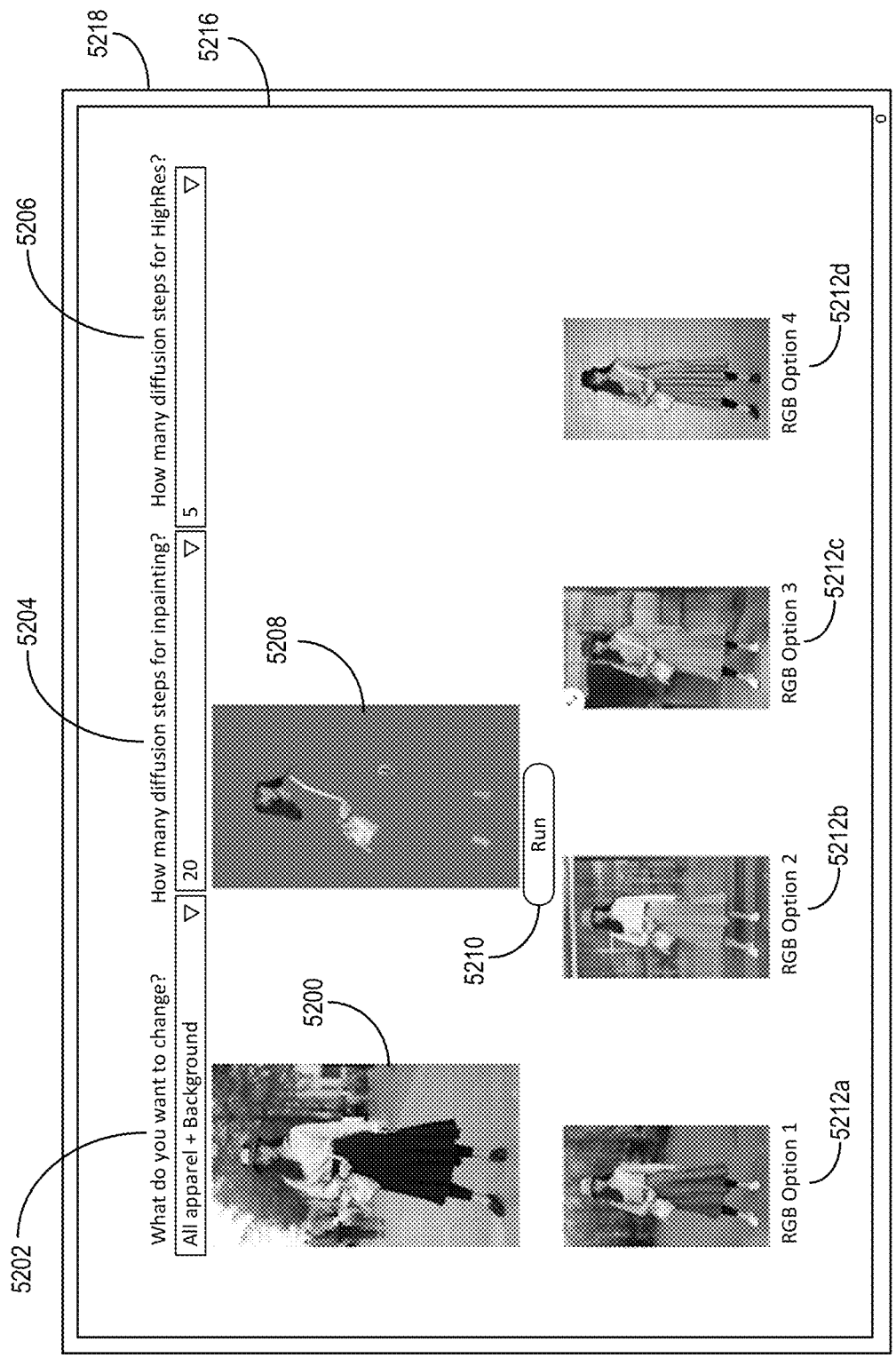
FIGS. 52A-52B illustrate an example graphical user interface of the scene-based image editing system providing parameters for modifying apparel and/or background of a digital image in accordance with one or more embodiments.

As mentioned above, in one or more implementations the scene-based image editing system 106 provides an option to a client device to query scene-based image editing system 106 and select a portion of the digital image to modify. For example, FIG. 52A illustrates a digital image 5200 and a query selection option 5202 to select a portion of the digital image 5200 to modify. Furthermore, FIG. 52A also shows a diffusion iteration option 5204 to indicate diffusion iterations for infill modifications, and a high-resolution option 5206 to indicate diffusion iterations for a high-resolution version of the digital image 5200.

In particular, FIG. 52A illustrates for the query selection option 5202, a query to modify "all apparel+background." In response to selection of the query selection option 5202, the scene-based image editing system 106 provides for display in the user interface a masked digital image 5208 based on the indication in the query selection option 5202. In this instance, FIG. 52A shows the masked digital image 5208 with all the apparel and the background in the digital image 5200 masked.

In one or more embodiments, the scene-based image editing system 106 has additional query options such as selecting only the apparel, selecting only the background, or selecting a specific sub-portion (the dress, the hat, the shoes, the shirt, etc.). In particular, based on the query, the scene-based image editing system 106 utilizes a segmentation image neural network to identify the relevant portions within the digital image 5200 and generates a identify the relevant portion to modify.

Moreover, FIG. 52A illustrates the scene-based image editing system 106 generating a first digital image 5212a, a second digital image 5212b, a third digital image 5212c, and a fourth digital image 5212d in response to selecting a generate modified digital image option 5210. Moreover, FIG. 52A illustrates the scene-based image editing system 106 utilizing a user interface 5216 of a client device 5218 to display the generated digital images. Each of the digital image options shown in FIG. 52A illustrate a different background and different apparel. In some embodiments, the scene-based image editing system 106 provides an option to generate more or less modified digital image options.

Figure 52B:
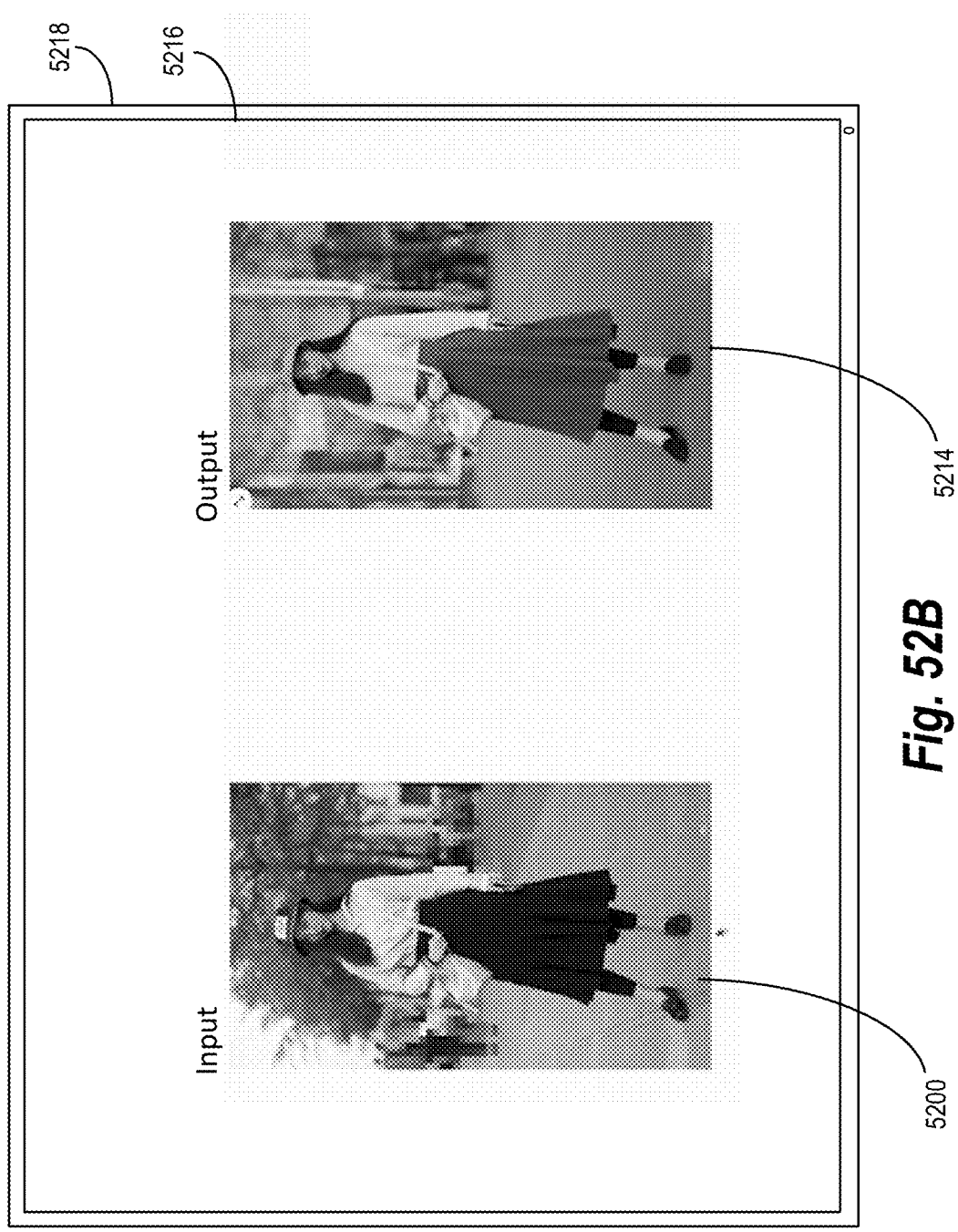

Although not shown in FIG. 52A, in one or more embodiments the scene-based image editing system 106 provides an option to indicate the color shade and texture of apparel to replace within the digital image 5200. Additionally, the scene-based image editing system 106 also provides an option to indicate the location of the background to replace within the digital image 5200. Furthermore, similar to the discussion in the other figures, the scene-based image editing system 106 receives a selection of one of the digital image options (5212a-5212d) and generates a high-resolution version of the digital image 5200 based on the indicated number of diffusion iterations. FIG. 52B illustrates the resulting image upon selection of a modified digital image of FIG. 52A. In particular, FIG. 52B illustrates the digital image 5200 and based on the designated parameters for replacing the apparel and background, the scene-based image editing system 106 generates a modified digital image 5214. As such, FIG. 52B illustrates an example of the scene-based image editing system 106 accurately and realistically replacing both the apparel and the background of an input digital image.

In one or more embodiments, the scene-based image editing system 106 intelligently utilizes the features discussed in FIGS. 40-52B to perform infill modifications. For example, if a user of a client device uploads a cropped digital image into an existing digital image being edited in an image editing application, the scene-based image editing system 106 intelligently determines modifications. In particular, the scene-based image editing system 106 determines a percentage to expand the digital frame of the uploaded cropped digital image based on the uploaded cropped digital image not aligning with the bottom frame of the existing digital image. Moreover, the scene-based image editing system 106 generates an infill modification to fill in the expanded portion (e.g., completes a human/object to be cropped into the digital image so that the human/object aligns with the boundaries of the new digital image and then combines/composites the completed human with the new digital image). Additionally, the scene-based image editing system 106 intelligently provides multiple outputs of generated digital images based on the uploaded cropped digital image. In particular, the multiple outputs include different variations of the scene-based image editing system 106 generating infill modifications for an expanded digital image frame.

Furthermore, in one or more embodiments, the scene-based image editing system 106 intelligently detects occluders or detractors in a digital image. For example, the scene-based image editing system 106 detects occluders/detractors covering part of a human portrayed within a digital image and removes the occluders/detractors. In particular, the scene-based image editing system 106 removes the occluders/detractors and generates an infill modification in place of the removed occluders/detractors. For instance, the scene-based image editing system 106 intelligently removes portions of a uploaded digital image and infills the removed portion.

Moreover, in one or more embodiments, the scene-based image editing system 106 intelligently detects textures within a digital image and recommends alternative textures. For example, the scene-based image editing system 106 detects apparel portrayed within a digital image and extracts the texture of the apparel. In particular, the scene-based image editing system 106 then provides a recommendation of texture options to replace the current texture shown within the digital image.

In addition, in one or more embodiments, the scene-based image editing system 106 intelligently detects other portions within a digital image and recommends options to replace detected portions. For example, the scene-based image editing system 106 detects apparel, background, hair, and other accessories (e.g., purse, backpack, hat, glasses, etc.). In particular, the scene-based image editing system 106 detects various portions of the digital image and provides multiple recommendations for each detected portion to replace the detected portion. Accordingly, for each of the above embodiments, the scene-based image editing system 106 intelligently and automatically performs infill modifications or infill recommendations to a user of a client device in real-time or near real-time (e.g., seconds).

As briefly mentioned above, in one or more implementations the scene-based image editing system 106 generates modified digital images by inpainting indicated portions of a digital image. Specifically, in one or more embodiments the scene-based image editing system 106 performs partial human inpainting with generative machine learning models specially trained to accommodate inpainting of human subjects from digital images. For example, for a digital image that portrays a human with an object covering (e.g., obstructing or occluding) part of the human, the scene-based image editing system 106 utilizes a human inpainting GAN to perform human inpainting. In particular, the scene-based image editing system 106 generates a modified digital image by utilizing a structural guidance map and a digital image portraying a human.

In addition, in one or more embodiments the scene-based image editing system 106 performs human inpainting to generate a modified digital image by utilizing two-dimensional modulation. For example, the scene-based image editing system 106 generates utilizing an encoder, a visual appearance encoding from the digital image portraying the human. Moreover, the scene-based image editing system 106 further utilizes a parameter neural network to generate a local appearance feature tensor, which includes spatially varying scaling and shifting tensors. In other words, the scene-based image editing system 106 modulates a structural encoding generated from a structure guidance map at the human inpainting GAN. The two-dimensional modulation aids in generating accurate and high-quality human inpainted digital images.

Further, in one or more embodiments, the scene-based image editing system 106 generates human inpainted digital images by utilizing hierarchical encoders. For example, the scene-based image editing system 106 utilizes a hierarchical encoder to generate the structural encoding and the visual appearance encoding. In particular, the scene-based image editing system 106 utilizes the hierarchical encoder which includes multiple downsampling and upsampling layers connected via skip connections (e.g., skip connections for matching resolutions between various layers). By utilizing the hierarchical encoder, the scene-based image editing system 106 can preserve nuance and details when generating the human inpainted digital images.

Moreover, as mentioned, in one or more embodiments the scene-based image editing system 106 utilizes structure guidance map(s) for generating the structural encoding. For example, the structure guidance maps include at least one of a keypoint map, a densepose map, a segmentation map, or a digital image. In particular, in some embodiments, the scene-based image editing system 106 utilizes a separate neural network branch to generate a segmentation map of a digital image for further use as the structure guidance map. For instance, the scene-based image editing system 106 generates an infill segmentation map of the digital image portraying the human with an unclassified region corresponding to the region to inpaint.

Furthermore, in other embodiments, the scene-based image editing system 106 utilizes multiple machine learning models for human inpainting and background inpainting. For example, the scene-based image editing system 106 utilizes a background GAN in addition to a human inpainting GAN. In particular, the scene-based image editing system 106 generates a modified background portion of the digital image utilizing a background GAN and generates modified pixels of the region of the human portrayed within the digital image with a human inpainting GAN. k Moreover, the scene-based image editing system 106 can train a human inpainting GAN. For example, in some implementations, the scene-based image editing system 106 utilizes a combination of partial reconstruction loss and adversarial loss for training the human inpainting GAN. Indeed, because occluder images often fail to include underlying ground truth information behind the occlusion, the scene-based image editing system 106 can utilize a partial reconstruction loss where the measure of loss is based on the portions of the human outside of the region to inpaint.

As mentioned above, the scene-based image editing system 106 performs acts for generating modified digital images. For example, the scene-based image editing system 106 utilizes multiple machine learning model instances to generate a modified digital image by performing partial human inpainting. In particular, FIG. 53 illustrates an overview of the scene-based image editing system 106 performing partial human inpainting in accordance with one or more embodiments. For instance, the scene-based image editing system 106 generates a realistic and accurate modified digital image 5304 from an input digital image 5300 by inpainting a portion of the input digital image 5300. Specifically, the scene-based image editing system 106 analyzes an indication from a user of a client device of a region for inpainting such as a segmented portion or an indication to remove an object obstructing a human portrayed within a digital image. Additionally, the indication from a user of a client device includes an indication of at least one of removing an object from the digital image (e.g., obstructing a human), expanding a digital image frame (e.g., the expanded portion requires infilling of the human), or removing a blemish from the region of the human.

As shown, FIG. 53 illustrates the scene-based image editing system 106 receiving the input digital image 5300 which portrays a human (e.g., from an upload or selection at the image editing application). For example, the scene-based image editing system 106 determines a depiction of a human within the input digital image 5300. For instance, the depiction of the human can include the input digital image 5300 only showing the human from the chest up or from the chest down or any other sub-portion of the human. Furthermore, the depiction of the human can include the input digital image 5300 with a frame that encompasses the entire body of the human however with an occlusion or hole covering a part of the human. For instance, the input digital image 5300 depicts a human holding a towel, the towel obstructing a portion of the human.

As shown, for the input digital image 5300, the scene-based image editing system 106 determines a region to inpaint corresponding with the depiction of the human. In particular, the region of the human includes a portion of the input digital image 5300 that either only covers a part of the depicted human or a portion of the input digital image 5300 that overlaps with part of the depicted human and another part of the input digital image 5300. Specifically, the input digital image 5300 depicts a human and also depicts the human holding an object, the region of the human to inpaint in this instance includes the object held by the human.

As also shown, FIG. 53 illustrates the scene-based image editing system 106 utilizing a human inpainting GAN 5302 to generate the modified digital image 5304. As already mentioned above, the scene-based image editing system 106 utilizes various generative models to generate realistic features. The scene-based image editing system 106 trains the human inpainting GAN 5302 specifically for human inpainting. More details relating to training of the human inpainting GAN 5302 is given below in the description of FIG. 61. Moreover, details relating to the specific architectural components of the human inpainting GAN 5302 are given below in the description of FIG. 54.

Moreover, as further shown, FIG. 53 illustrates the scene-based image editing system 106, via the human inpainting GAN 5302, generating the modified digital image 5304. As previously discussed, the scene-based image editing system 106 determines infill modifications (e.g., the act 4004 for determining an infill modification discussed in FIG. 40) and infill modifications include infilling a region or in other words, inpainting the region. For example, inpainting includes adding pixel values, replacing pixel values with new pixel values, or adding pixel values to an expanded frame of a digital image, where the expanded frame is unpopulated. Accordingly, inpainting includes the addition of pixel values to a digital image to either fill a gap, replace an object, or add to an expanded portion of the digital image. Specifically, as shown in FIG. 53, the scene-based image editing system 106 inpaints the "hole" depicted in the input digital image 5300 with the addition of pixel values to generate a realistic-looking digital image that depicts the portion behind the "hole" in the input digital image 5300. Accordingly, the human inpainting performed by the scene-based image editing system 106 via the human inpainting GAN 5302, includes realistically filling in regions corresponding to a human's stomach, hands, and pants.

In one or more embodiments, the scene-based image editing system 106 segments the input digital image 5300 utilizing a segmentation model. In particular, the scene-based image editing system 106 utilizes a segmentation image neural network (e.g., segmentation machine learning model 4404 discussed in FIG. 44 or other segmentation models discussed herein). For instance, the scene-based image editing system 106 processes a selection by a user of a client device or a query to select a class of object(s) within the input digital image 5300. Furthermore, in response to a selection or a query, the scene-based image editing system 106 generates a segmentation mask. Thus, as shown, the input digital image 5300 includes the relevant portion segmented by the scene-based image editing system 106.

FIG. 53 also further illustrates a comparison with the modified digital image 5304 relative to an original digital image 5306. As shown, the scene-based image editing system 106 inpaints a realistic depiction of the portion of the human behind the towel. Specifically, FIG. 53 illustrates the scene-based image editing system 106 performing realistic and accurate inpainting of the hands, stomach, and swimsuit worn by the human portrayed within the original digital image 5306.

Conventional systems have leveraged recent computing advancements to modify digital images utilizing a variety of digital tools and models. To illustrate, conventional systems utilize computer-implemented models to inpaint digital images. Despite these advancements, however, conventional systems continue to suffer from a number of technical deficiencies, particularly with regard to accuracy, efficiency, and flexibility of implementing systems in generating inpainted digital images.

For example, FIG. 53 also shows the results of a conventional system generating inpainted humans. In particular, FIG. 53 illustrates a prior art digital image 5308. For instance, the prior art digital image 5308 also corresponds with the input digital image 5300. Specifically, the prior art digital image 5308 depicts the same human as the input digital image 5300, however the result of inpainting the portion behind the segmented region shows a failure of conventional systems to accurately and realistically generate an inpainted human. In comparing the results of the modified digital image 5304 generated by the scene-based image editing system 106 and the prior art digital image 5308 generated by conventional systems, the prior art digital image 5308 erroneously incorporates elements of the water background in place of the human's stomach and swimsuit. Furthermore, the prior art digital image 5308 also depicts vestiges of the towel held by the human in the original digital image 5306. For instance, a residual outline of the towel remains in the prior art digital image 5308 and the hands once holding the towel unclearly portray the human's hands. Thus, unlike the prior art digital image 5308, the modified digital image 5304 accurately and realistically shows the inpainted human without leaking the background into the human and including vestiges of the towel. Accordingly, as shown by the prior art digital image 5308, conventional systems inaccurately inpaint humans. Moreover, as discussed previously, conventional systems are also inefficient in the number of user interactions for inpainting digital images (e.g., to correct erroneous inpainting pixels).

The scene-based image editing system 106 can improve accuracy relative to conventional systems. For example, in one or more implementations the scene-based image editing system 106 improves upon the accuracy of conventional systems by utilizing a local appearance feature tensor (e.g., spatially variant parameters) to generate smooth, natural, realistic, and accurate human inpainting. Unlike conventional machine learning models that merely utilize global features of a digital image (e.g., feature representations that do not change or vary across pixels of the digital image), the use of the local appearance feature tensor can add more nuance, depth, and details to generating the fills. Accordingly, in some implementations the scene-based image editing system 106 more accurately generates inpainted digital images.

Moreover, the scene-based image editing system 106 can improve upon accuracy of conventional systems by utilizing the human inpainting GAN 5302. In particular, in one or more implementations the scene-based image editing system 106 utilizes the human inpainting GAN 5302 which is trained specifically for performing human inpainting. Thus, unlike conventional systems which are generally trained for filling in regions, the scene-based image editing system 106 can utilize a specifically trained and specialized generative model for inpainting humans portrayed within digital images.

Additionally, the scene-based image editing system 106 can improve upon accuracy by utilizing structure guidance maps. Specifically, the scene-based image editing system 106 utilizes structural guidance maps, such as keypoint maps, pose maps, or segmentation maps to inform the human inpainting GAN 5302 to more accurately generate modified digital images.

In addition to improving accuracy, the scene-based image editing system 106 improves upon the efficiency of conventional systems. For example, the scene-based image editing system 106 reduces the need for excessive user interactions for generating modified digital images. Indeed, by intelligently and accurately inpainting regions of a digital image, the scene-based image editing system 106 reduces user interactions and user interfaces needed to remove occluders, correct digital images, and generate accurate portrayals of human subjects.

Figure 54:
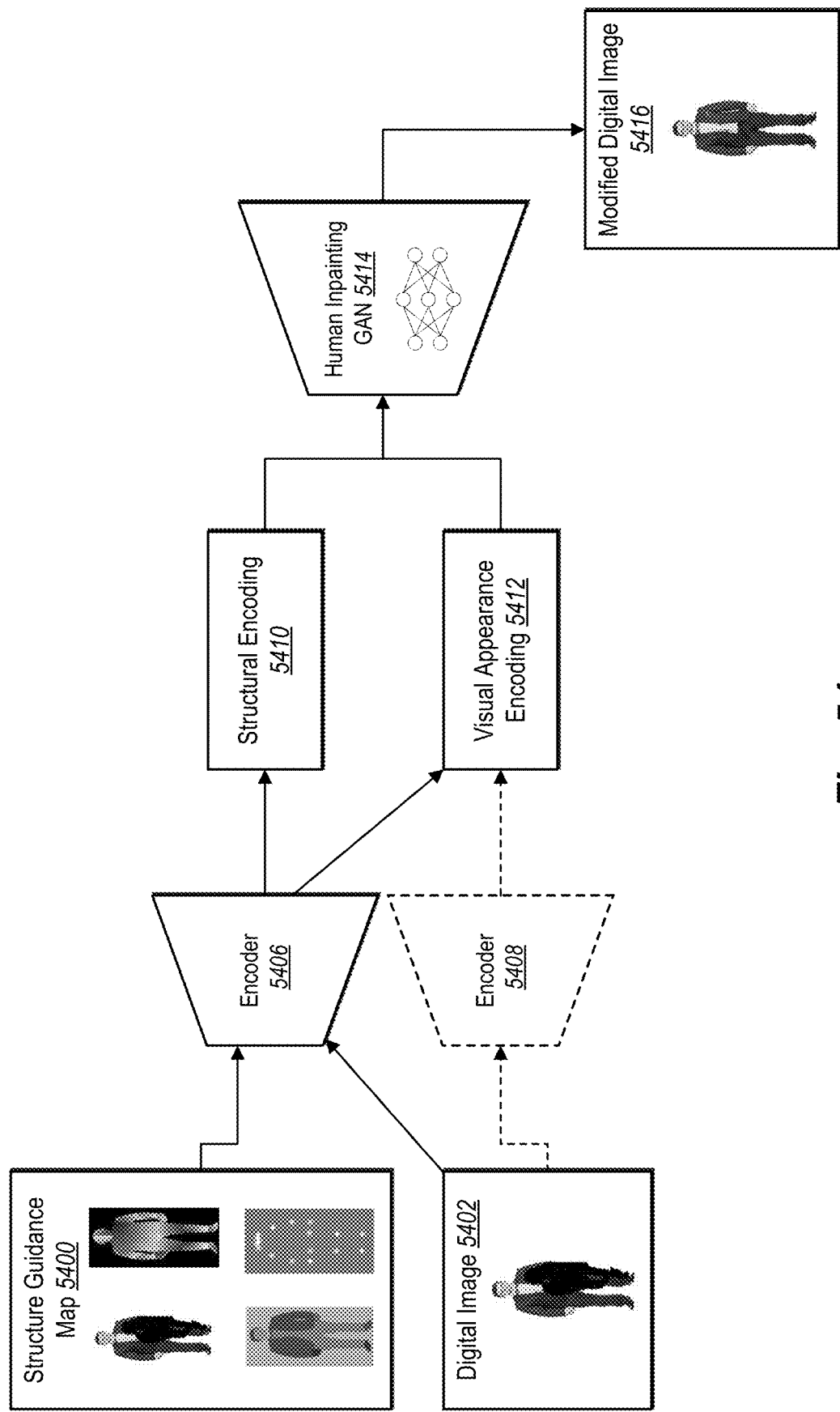
FIG. 54 illustrates an example diagram of the scene-based image editing system generating encodings in accordance with one or more embodiments.

As illustrated, FIG. 54 shows additional details relating to the scene-based image editing system 106 generating a modified digital image from various encodings in accordance with one or more embodiments. For example, FIG. 54 shows the scene-based image editing system 106 utilizing a structure guidance map 5400 to assist in generating the modified digital image 5416. In particular, the structure guidance map 5400 includes a structural representation of a human depicted within the digital image 5402. For instance, the structure guidance map 5400 contains data points regarding the structural position, shape, and/or pose of the human depicted within the digital image 5402. Thus, the structure guidance map 5400 can include a keypoint map, a pose map, or a segmentation map. In one or more embodiments, the scene-based image editing system 106 generates the structure guidance map utilizing a machine learning model (e.g., a segmentation machine learning model, a keypoint machine learning model, a shape machine learning model, or a pose machine learning model).

As shown in FIG. 54, the scene-based image editing system 106 utilizes an encoder 5406 to extract structural data from the structure guidance map 5400. As further shown, the scene-based image editing system 106 generates a structural encoding 5410 from the structure guidance map 5400 utilizing the encoder 5406. In particular, the structural encoding 5410 includes a low-dimensional representation for high-dimensional features from a structural guidance map.

In addition to generating the structural encoding 5410, FIG. 54 also illustrates the scene-based image editing system 106 utilizing the encoder 5406 to generate the visual appearance encoding 5412 from the digital image 5402. For example, the visual appearance encoding 5412 includes visual information pertaining to the digital image 5402. In particular, the visual appearance encoding 5412 includes visual features of the human portrayed within the digital image 5402 as a numerical representation.

As shown, FIG. 54 illustrates the scene-based image editing system 106 utilizing the encoder 5406 to generate the structural encoding 5410 and the visual appearance encoding 5412. Thus, the scene-based image editing system 106 can utilize a single encoder to generate the structural encoding 5410 (from the structure guidance map 5400) and the visual appearance encoding 5412 (from the digital image 5402). In some implementations, the use of a single encoder can improve the efficiency of the scene-based image editing system 106. Specifically, the use of a single encoder (e.g., the encoder 5406) reduces the amount of computational resources required for training and implementation.

In some embodiments, the scene-based image editing system 106 utilizes multiple encoders. For example, FIG. 54 also shows the scene-based image editing system 106 optionally utilizing an encoder 5408. Thus, in some embodiments the scene-based image editing system 106 utilizes the encoder 5408 to generate the visual appearance encoding 5412 from the digital image 5402 while utilizing the encoder 5406 to generate the structural encoding 5410 from the structure guidance map 5400.

As further shown, FIG. 54 illustrates the scene-based image editing system 106 utilizing the human inpainting GAN 5414 to generate a modified digital image 5416 from both the structural encoding 5410 and the visual appearance encoding 5412. As mentioned previously, the scene-based image editing system 106 utilizes the human inpainting GAN to generate a realistic-looking inpainted human within the digital image 5402. Specifically, the scene-based image editing system 106 tunes the human inpainting GAN 5414 specifically for humans within digital images to generate realistic inpainted humans.

As mentioned above, in some implementations the scene-based image editing system 106 generates a local appearance feature tensor to improve the accuracy of human inpainting. For example, FIG. 55 illustrates additional details relating to modulating a human inpainting GAN 5514 with a local appearance feature tensor in accordance with one or more embodiments.

Figure 55:
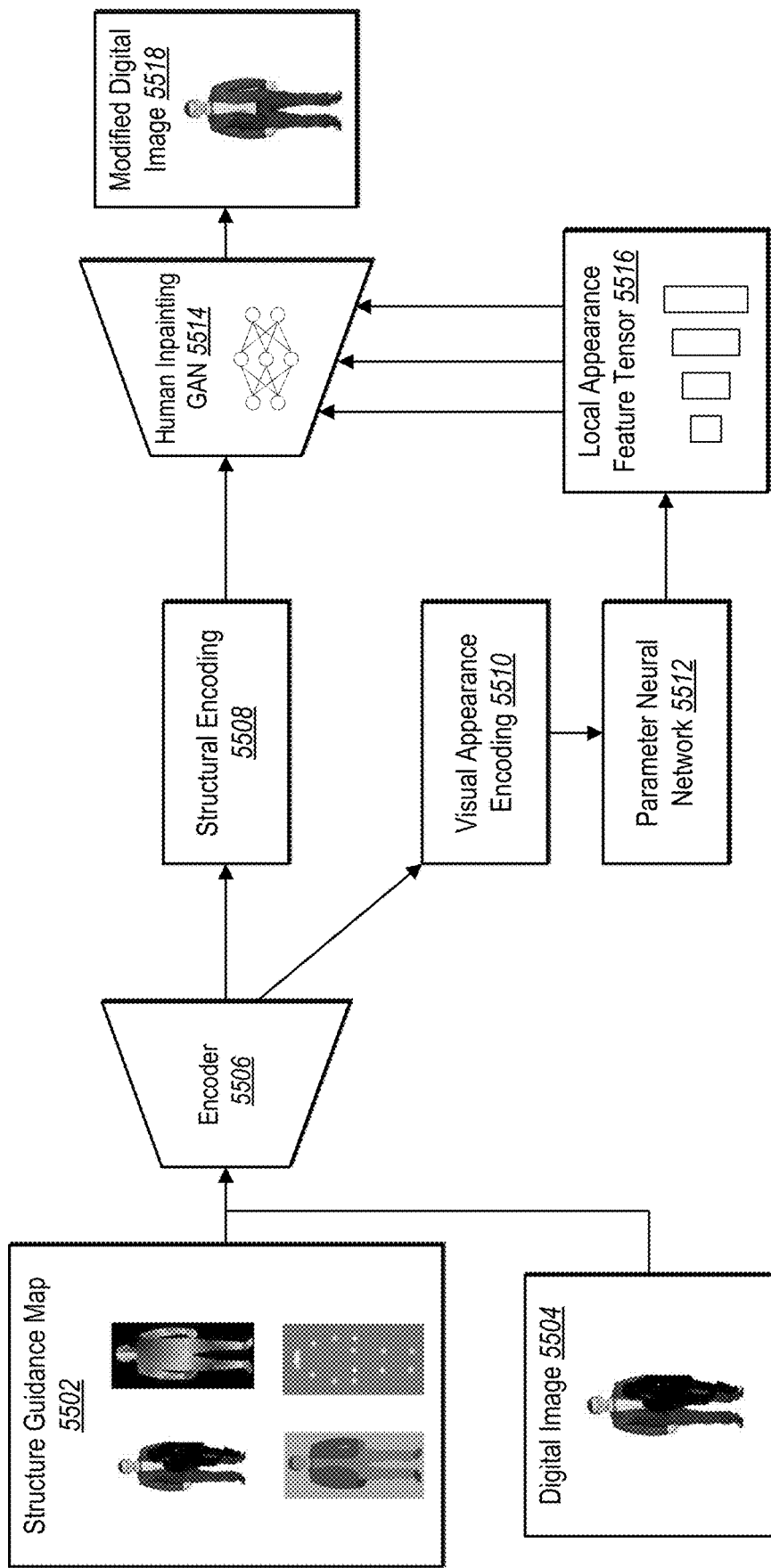
FIG. 55 illustrates an example diagram of the scene-based image editing system generating a local appearance feature tensor in accordance with one or more embodiments.

In particular, FIG. 55 shows the scene-based image editing system 106 utilizing a structure guidance map 5502. As mentioned above, the structure guidance map 5502 can include a keypoint map, a pose map, a segmentation map, and a digital image. A keypoint map includes a representation of points that make up a human figure. For instance, the keypoint map defines the structure of the human with various points (e.g., points corresponding to head, joints, members, etc.). Accordingly, the keypoint map includes the key structural form of the human depicted within the digital image 5504.

In some embodiments, the scene-based image editing system 106 utilizes a pose map. In particular, a pose map includes a dense pose representation. For instance, in generating the pose map, the scene-based image editing system 106 maps known pixels of the digital image 5504 to a 3-dimensional surface of a human body. The pose map includes a dense keypoint sequence representation of the digital image 5504. In some embodiments, the scene-based image editing system 106 generates the dense keypoint sequence representation utilizing a pose estimation algorithm such as DensePose. For example, the scene-based image editing system 106 can utilize a pose estimation algorithm that maps pixels portraying a human within a digital image to a 3D surface of the human body (e.g., by quantizing UV values).

Furthermore, in one or more embodiments, the scene-based image editing system 106 utilizes segmentation maps (such as a semantic map as discussed above). For example, the segmentation map utilized as the structure guidance map 5502 includes the depiction of the human within the digital image 5504 segmented according to various classifications. For example, the segmentation map includes a segmentation between the background and the human. In particular, the segmentation map further segments sub-portions of the human such as a jacket the human is wearing, pants, shoes, head, and hair.

Moreover, in some embodiments, the scene-based image editing system 106 utilizes the digital image 5504 (or a portion of the digital image 5504) as the structure guidance map 5502. For example, the scene-based image editing system 106 utilizes the digital image 5504 that depicts the human as the structure guidance map 5502. In particular, the digital image 5504 contains structural information such as the boundary of the human and the various sub-portions of the human reflected by different color shades within the digital image 5504. As such, the scene-based image editing system 106 utilizes the human from the digital image 5504 as the structure guidance map 5502.

As further shown, the scene-based image editing system 106 utilizes an encoder 5506 to generate a structural encoding 5508 and a visual appearance encoding 5510 from the structure guidance map 5502 and the digital image 5504. Specifically, the scene-based image editing system 106 generates the structural encoding 5508 and the visual appearance encoding 5510 for each resolution of the digital image 5504. More details relating to generating the structural encoding 5508 and the visual appearance encoding 5510 are given below in the description of FIGS. 56-57.

Additionally, FIG. 55 shows the scene-based image editing system 106 utilizing a parameter neural network 5512. For example, the scene-based image editing system 106 generates a local appearance feature tensor 5516 utilizing the parameter neural network 5512 from the visual appearance encoding 5510. In particular, the parameter neural network 5512 includes generating a scaling and shifting parameter that applies locally (e.g., varies across individual regions or pixel representations). Specifically, the parameter neural network 5512 generates the local appearance feature tensor 5516 (scaling and shifting parameter) for modulating a style block/layer of the human inpainting GAN 5514. In other words, the local appearance feature tensor 5516 for the visual appearance encoding 5510 includes a scaling tensor and a shifting tensor that locally modify the digital image 5504 such that the scaling tensor and shifting tensor vary across different portions or regions. Accordingly, the scene-based image editing system 106 utilizes the parameter neural network 5512 to generate a feature tensor (scaling and shifting tensor) from the visual appearance encoding 5510 at a specific resolution corresponding to a specific resolution of a particular style block. Moreover, the scene-based image editing system 106 utilizes the parameter neural network 5512 to generate different feature tensors (different locally varying scaling and shifting tensors) at different resolutions for the varying style blocks of the human inpainting GAN 5514.

For example, a feature tensor includes a multi-dimensional array of numerical values that represent features or characteristics of underlying data (such as a digital image, structural representation, and/or visual appearance representation). The scene-based image editing system 106 utilizes a feature tensor for modulating style blocks within a human inpainting GAN.

In one or more embodiments, the human inpainting GAN utilizes a StyleGAN or StyleGAN2 architecture (as discussed and incorporated above with regard to StyleGAN2). For instance, the scene-based image editing system 106 utilizes convolutional layers (e.g., multiple fully connected convolutional layers) to convert a digital image into intermediate latent vectors (e.g., w vectors in a W or W+ space). In turn, the scene-based image editing system 106 converts the Intermediate latent vectors into latent style vectors utilizing a series of learned transformations.

The scene-based image editing system 106 converts style vectors into a feature representation utilizing a series of layers referred to as style blocks. In particular, the scene-based image editing system 106 utilizes a first style block to process a first style vector. The first style block generates a first intermediate feature vector and passes the first intermediate feature vector to a second style block. The second style block processes the first intermediate feature vector and the second style vector to generate a second intermediate feature vector. The second style block generates the second intermediate feature vector. Thus, the scene-based image editing system 106 iteratively utilizes the style blocks to generate a series of intermediate feature vectors. The scene-based image editing system 106 can also modulate these style blocks by combining additional representations with the style vectors/and/or intermediate feature vectors.

As mentioned above, the scene-based image editing system 106 generates the local appearance feature tensor 5516. For example, the local appearance feature tensor 5516 includes a scaling and/or a shifting tensor. In other words, depending on the pixel value location of the digital image 5504, the scene-based image editing system 106 utilizes a different scaling and shifting tensor to modulate the feature representations for a particular style block. Accordingly, the scene-based image editing system 106 utilizes the local appearance feature tensor 5516 from the visual appearance encoding 5510 that corresponds to a specific resolution of a particular style block to modulate (scale and shift) the feature representations of the human inpainting GAN 5514. Moreover, as shown, the scene-based image editing system 106 via the human inpainting GAN 5514 generates the modified digital image 5518.

For example, in one or more embodiments, the scene-based image editing system utilizes a scaling tensor and shifting tensor to perform 2D modulation as described by B. AlBahar, J. Lu, J. Yang, Z. Shu, E. Shechtman, and J. Huang in Pose with Style: Detail-Preserving Pose-Guided Image Synthesis with Conditional StyleGAN, SIGGRAPH Asia 2021 (Pose with Style), which is incorporated by reference herein in its entirety. Unlike Pose with Style, in one or more embodiments, the scene-based image editing system 106 performs modulation with regard to different features and inputs, with a different architecture, and with regard to generating different results.

As mentioned above, FIG. 55 shows the scene-based image editing system 106 generating a single visual appearance encoding 5510 and further utilizing the parameter neural network 5512 to generate the local appearance feature tensor 5516 (which includes a spatially varying shifting tensor and/or a spatially varying scaling tensor). Although not illustrated in FIG. 55, in some implementations, the scene-based image editing system 106 generates visual appearance encodings and structural encodings for each resolution of style blocks within the human inpainting GAN 5514. For each visual appearance encoding, the scene-based image editing system 106 utilizes the parameter neural network 5512 to generate a local appearance feature tensor from the visual appearance encoding corresponding to a resolution of a corresponding channel or style block. Accordingly, each generated local appearance feature tensor modulates a structural encoding at a different style block of the human inpainting GAN 5514. More details relating to the modulation of the human inpainting GAN 5514 is given below in the description of FIG. 58.

Although the description above illustrates the scene-based image editing system 106 utilizing a single structure guidance map, in one or more embodiments, the scene-based image editing system 106 utilizes multiple structure guidance maps. In particular, the scene-based image editing system 106 generates the structural encoding 5508 from a combination of a keypoint map and a pose map. In other instances, the scene-based image editing system 106 generates the structural encoding from a combination of the segmentation map and a digital image. Moreover, the scene-based image editing system 106 can utilize various combinations of the available structure guidance maps to generate the structural encoding 5508.

Figure 56:
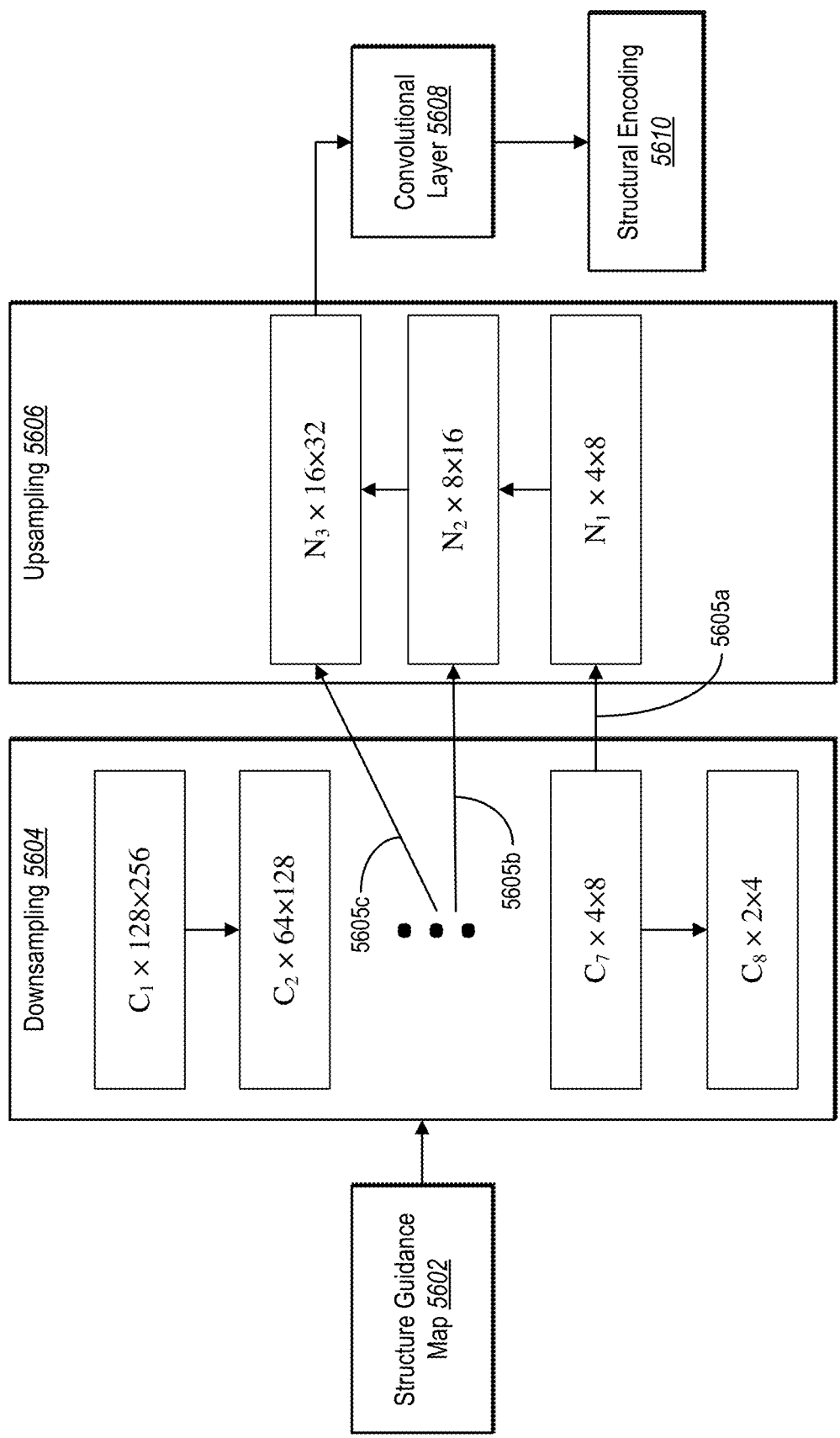
FIG. 56 illustrates an example diagram of the scene-based image editing system utilizing a hierarchical encoder to generate a structural encoding in accordance with one or more embodiments.

As mentioned above, FIG. 56 provides more details relating to generating a structural encoding in accordance with one or more embodiments. For example, FIG. 56 illustrates the scene-based image editing system 106 utilizing a hierarchical encoder to generate a structural encoding 5610. In particular, the hierarchical encoder includes a plurality of layers, and each layer of the hierarchical encoder corresponds with a different resolution of the style blocks of the human inpainting GAN. Specifically, the scene-based image editing system 106 utilizes a hierarchical encoder with a U-shaped architecture and generates a structural encoding corresponding to each resolution of a structure guidance map 5602.

As shown in FIG. 56, the scene-based image editing system 106 utilizes the hierarchical encoder for the structure guidance map 5602 to generate the structural encoding 5610. The hierarchical encoder includes both downsampling layers 5604 and upsampling layers 5606. For downsampling, the hierarchical encoder moves from a high resolution to a lower resolution. In particular, downsampling includes moving from a higher resolution (e.g., 256×512) to a lower resolution that corresponds with the style blocks of the human inpainting GAN. Furthermore, the scene-based image editing system 106 for downsampling also utilizes skip connections to a corresponding upsampling layer.

For example, upsampling includes moving from a lower resolution to a higher resolution corresponding with the style blocks of the human inpainting GAN. In particular, prior to moving to a next upsampling layer, the scene-based image editing system 106 utilizes the aforementioned skip connections to receive the encodings from a corresponding downsampling layer. In response to receiving the encodings from the downsampling layers 5604 via skip connections, the scene-based image editing system 106 combines the encodings. Specifically, the scene-based image editing system 106 concatenates the encodings from the corresponding downsampling layer and upsampling layer. The scene-based image editing system 106 then passes the combined encoding to the next upsampling layer and the process repeats.

As FIG. 56 illustrates, the scene-based image editing system 106 generates the structural encoding 5610 from the structure guidance map 5602 by utilizing the hierarchical encoder. In particular, FIG. 56 shows the downsampling layers 5604 with downsample blocks at each resolution utilized by the scene-based image editing system 106. Specifically, the downsampling layers 5604 contain downsample blocks ranging from 128×256 to 2×4. Furthermore, FIG. 56 shows upsample blocks increasing in resolution. Specifically, the upsample blocks range from 4×8 to 128×256. Additionally, as shown, FIG. 56 has skip connections 5605a-5605c between corresponding downsampled and upsampled layers. For example, skip connections 5605a-5605c include skipping layers within the neural network and feeding the output from one layer as the input to another layer. In particular, skip connections 5605a-5605c assist in preventing degradation of features within the structure guidance map 5602. Moreover, FIG. 56 shows the scene-based image editing system 106 generating the structural encoding 5610 from a convolutional layer 5608. For example, via the skip connections 5605a-5605c between the downsampling layers 5604 and the upsampling layers 5606, the scene-based image editing system 106 passes the output from the hierarchical encoder to the convolutional layer 5608 to generate the structural encoding 5610.

As mentioned previously, the hierarchical encoder generates an encoding for a variety of resolutions (i.e., each resolution of the channels/style blocks of the human inpainting GAN). As illustrated, FIG. 56 shows the scene-based image editing system 106 utilizing the convolutional layer 5608 and generating the structural encoding 5610 that corresponds with the 16×32 resolution of a style block. Although not shown, the scene-based image editing system 106 via the hierarchical encoder generates a structural encoding for each resolution of the different style blocks utilizes to analyze the different resolutions of the structural encodings 5508.

Figure 57:
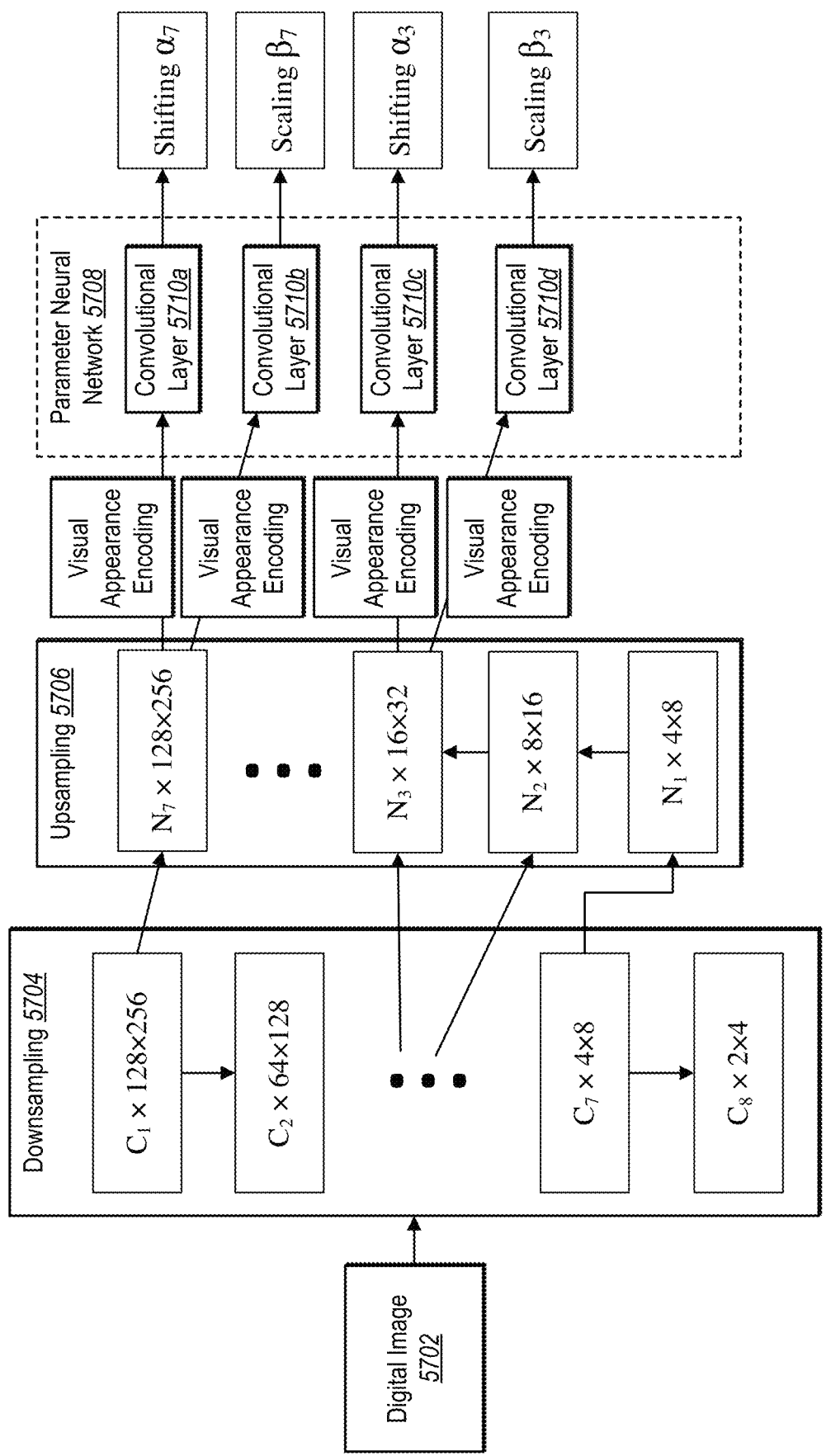
FIG. 57 illustrates an example diagram of the scene-based image editing system utilizing a hierarchical encoder to generate local appearance feature tensors in accordance with one or more embodiments.

FIG. 57 also shows a hierarchical encoder, however the scene-based image editing system 106 utilizes the hierarchical encoder in FIG. 57 for generating a local appearance feature tensor in accordance with one or more embodiments. For example, FIG. 57 illustrates the scene-based image editing system 106 utilizing the hierarchical encoder to generate the local appearance feature tensor with various downsampling layers 5704 and upsampling layers 5706. Downsampling layers 5704 and upsampling layers 5706 were discussed previously in relation to the description of FIG. 56. As mentioned previously, the scene-based image editing system 106 combines the encodings from the downsampling layers 5704 with the upsampling layers 5706 via skip connections. FIG. 57 however, further illustrates the scene-based image editing system 106 passing the combination to a parameter neural network 5708 (e.g., the parameter neural network 5512 discussed in FIG. 55). Within the parameter neural network 5708, the scene-based image editing system 106 utilizes an additional convolutional layer to generate various scaling and shifting tensors.

As an example, FIG. 57 shows the scene-based image editing system 106 passing the encoding from each resolution (e.g., 128×256 and 16×32) to the parameter neural network 5708. In particular, FIG. 57 shows the scene-based image editing system 106 passing the encoding from the 128×256 resolution to convolutional layer 5710a and convolutional layer 5710b. In addition, FIG. 57 also illustrates the scene-based image editing system 106 passing the encoding from the 16×32 resolution to convolutional layer 5710c and convolutional layer 5710d. Although FIG. 57 only shows the scene-based image editing system 106 generating a scaling and shifting tensor for two different resolutions (e.g., 128×256 and 16×32), in one or more embodiments, the scene-based image editing system 106 generates a scaling and shifting tensor for each resolution of the digital image 5702.

As shown in FIG. 57, the scene-based image editing system 106 generates a shifting and scaling tensor (e.g., alpha and beta) for each resolution. The local appearance feature tensor was discussed above, and the local appearance feature tensor includes a scaling and shifting tensor. For example, another description of the local appearance feature tensor includes spatially varying scaling tensor and spatially varying shifting tensor. In particular, the spatially varying aspect of the scaling and shifting tensor means that depending on the spatial location, the scaling and shifting tensor varies. Accordingly, different locations of the digital image 5702 utilize different scaling and shifting tensors. For example, the scene-based image editing system 106 can modulate a first region of a first intermediate feature vector of a first style block (corresponding to a first resolution) utilizing a first scaling value and a first shifting value. The scene-based image editing system 106 can modulate a second region of the first intermediate feature vector of the first style block utilizing a second scaling value and a second shifting value.

Similarly, the scene-based image editing system 106 can modulate a third region of a second intermediate feature vector of a second style block (corresponding to a second resolution) utilizing a third scaling value and a third shifting value. Moreover, the scene-based image editing system 106 can modulate a fourth region of the second intermediate feature vector of the second style block utilizing a fourth scaling value and a fourth shifting value.

Figure 58:
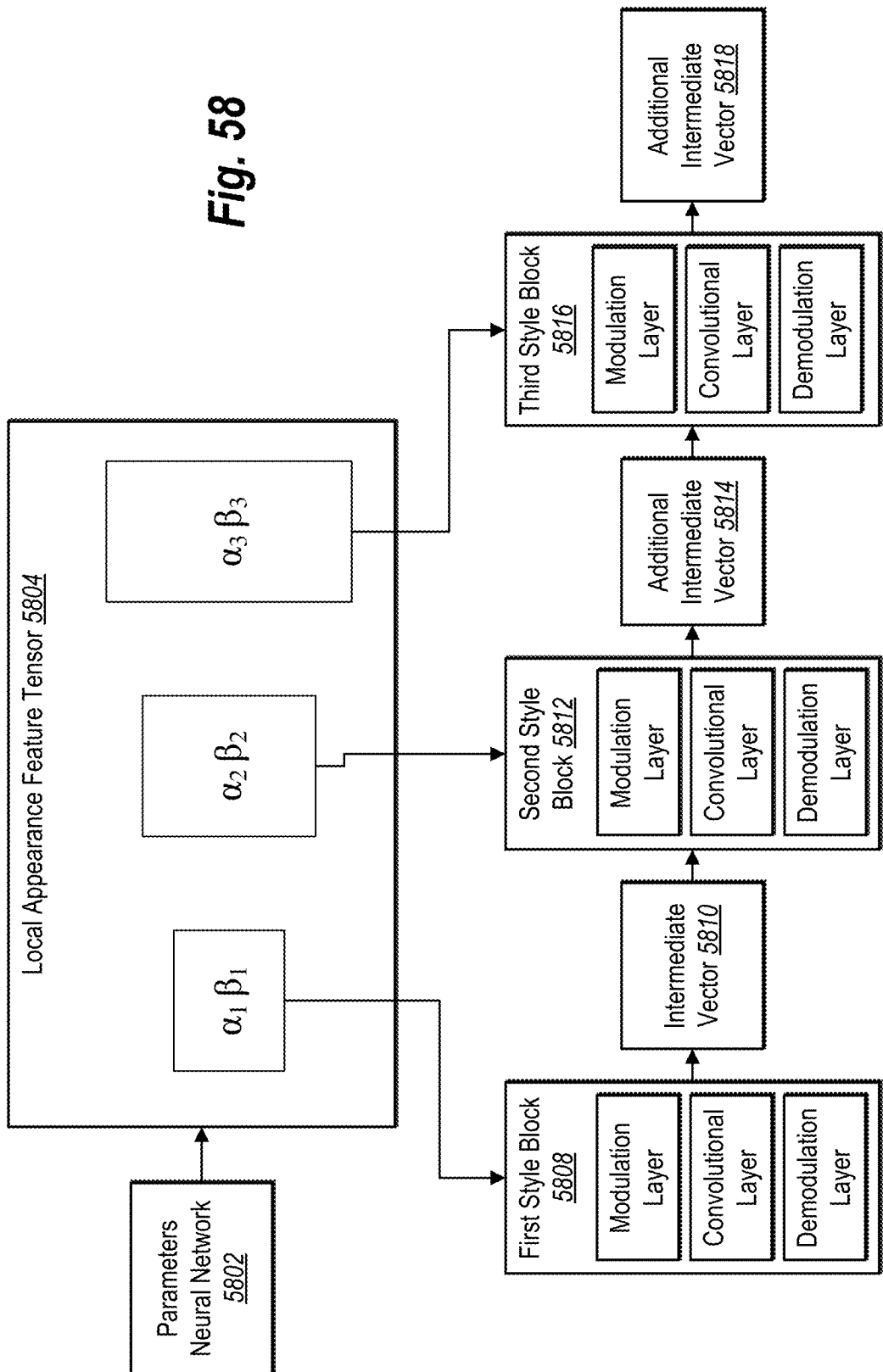
FIG. 58 illustrates an example diagram of the scene-based image editing system modulating style blocks in accordance with one or more embodiments.

As mentioned above, FIG. 58 provides more details regarding modulation in accordance with one or more embodiments. For example, FIG. 58 illustrates the scene-based image editing system 106 utilizing a local appearance feature tensor 5804 to modulate vectors at each style block of the human inpainting GAN. In particular, FIG. 58 shows the scene-based image editing system 106 via a parameters neural network 5802 generating the local appearance feature tensor 5804. As mentioned, the local appearance feature tensor 5804 includes spatially varying scaling and shifting tensors at different resolutions, as indicated by the first alpha, first beta, second alpha, second beta, etc. Furthermore, FIG. 58 shows the scene-based image editing system 106 utilizing the local appearance feature tensor 5804 to modulate each style block of the human inpainting GAN.

For example, as shown, the scene-based image editing system 106 utilizes the human inpainting GAN with multiple style blocks. In particular, FIG. 58 shows the scene-based image editing system 106 generating an intermediate vector 5810 utilizing a first style block 5808. In other words, the human inpainting GAN includes each of the style blocks shown in FIG. 58. For instance, FIG. 58 illustrates the scene-based image editing system 106 utilizing the first style block 5808 including a set of layers of the human inpainting GAN that correspond with a certain resolution of the digital image. To illustrate, the first style block 5808 includes a first resolution of the digital image, whereas a second style block 5812 increases to a second resolution. As shown, the first style block 5808 of the human inpainting GAN utilizes a corresponding scaling and shifting tensor (the first alpha and beta). The scene-based image editing system 106 utilizes the corresponding scaling and shifting tensor from the local appearance feature tensor 5804 to modulate the vectors (e.g., style vectors and/or intermediate vector representations) at each style block of the human inpainting GAN. In particular, FIG. 58 shows the first style block 5808 which includes a modulation layer, a convolutional layer and a demodulation layer. For instance, the scene-based image editing system 106 via the first style block 5808 generates the intermediate vector 5810 utilizing the modulation layer, the convolutional layer, and the demodulation layer.

Modulation in a neural network refers to the process of adjusting the strength or influence of certain inputs or pathways in the network. This can be done by adjusting the weights or biases of specific neurons or groups of neurons. Modulation can be used to improve the performance of a network, such as by increasing the sensitivity of certain neurons to important features in the input data, or by reducing the influence of noise or irrelevant information. It can also be used to control the behavior of a network, such as by adjusting the strength of certain pathways to control the output of the network. For example, in FIG. 58, modulation includes scaling and shifting vectors of the human inpainting GAN. Specifically, scaling and shifting structural feature representations to influence the output of the human inpainting GAN. By utilizing the local appearance feature tensor 5804, the modulation includes spatially variant scaling tensors and spatially variant shifting tensors. For instance, the scene-based image editing system 106 generates an inpainted human within the modified digital image by modulating layers of the human inpainting GAN based on the local appearance feature tensor 5804 (e.g., the information that is locally applicable to specific locations within the digital image).

As mentioned above, for the human inpainting GAN, each style block contains multiple layers (e.g., the modulation layer, the convolutional layer, and the demodulation layer). The scene-based image editing system 106 modulates a first vector at the modulation layer, passes the modulated structural encoding to the convolutional layer, then to the demodulation layer (or normalization layer) to generate the intermediate vector 5810. Indeed, in one or more implementations, the scene-based image editing system 106 modulates the mean and standard deviation of the features (e.g., the style vectors) using the scaling and shifting tensors (at the modulation layer), applies the convolutional layer, and normalizes (at the demodulation layer) the output of the convolution to zero mean and unit standard deviation before adding the bias and StyleGAN 2 noise broadcast operation. In some embodiments, the scene-based image editing system 106 utilizes the modulation approach described in Pose with Style.

As further shown, the scene-based image editing system 106 utilizes the human inpainting GAN at the second style block 5812 to generate an additional intermediate vector 5814 from the intermediate vector 5810 (and/or style vectors analyzed/processed by each style block but unshown in FIG. 58) and the local appearance feature tensor 5804. The process of passing the intermediate vector 5810 through the modulation layer, convolutional layer, and demodulation layer continues, specifically, the scene-based image editing system 106 modulates a second vector with a second alpha and beta (e.g., an additional spatially varying scaling tensor and an additional spatially varying shifting tensor at a second resolution). As shown, the second style block 5812 generates the additional intermediate vector 5814 and a third style block 5816 generates an additional intermediate vector 5818 from the additional intermediate vector 5814.

Figure 59:
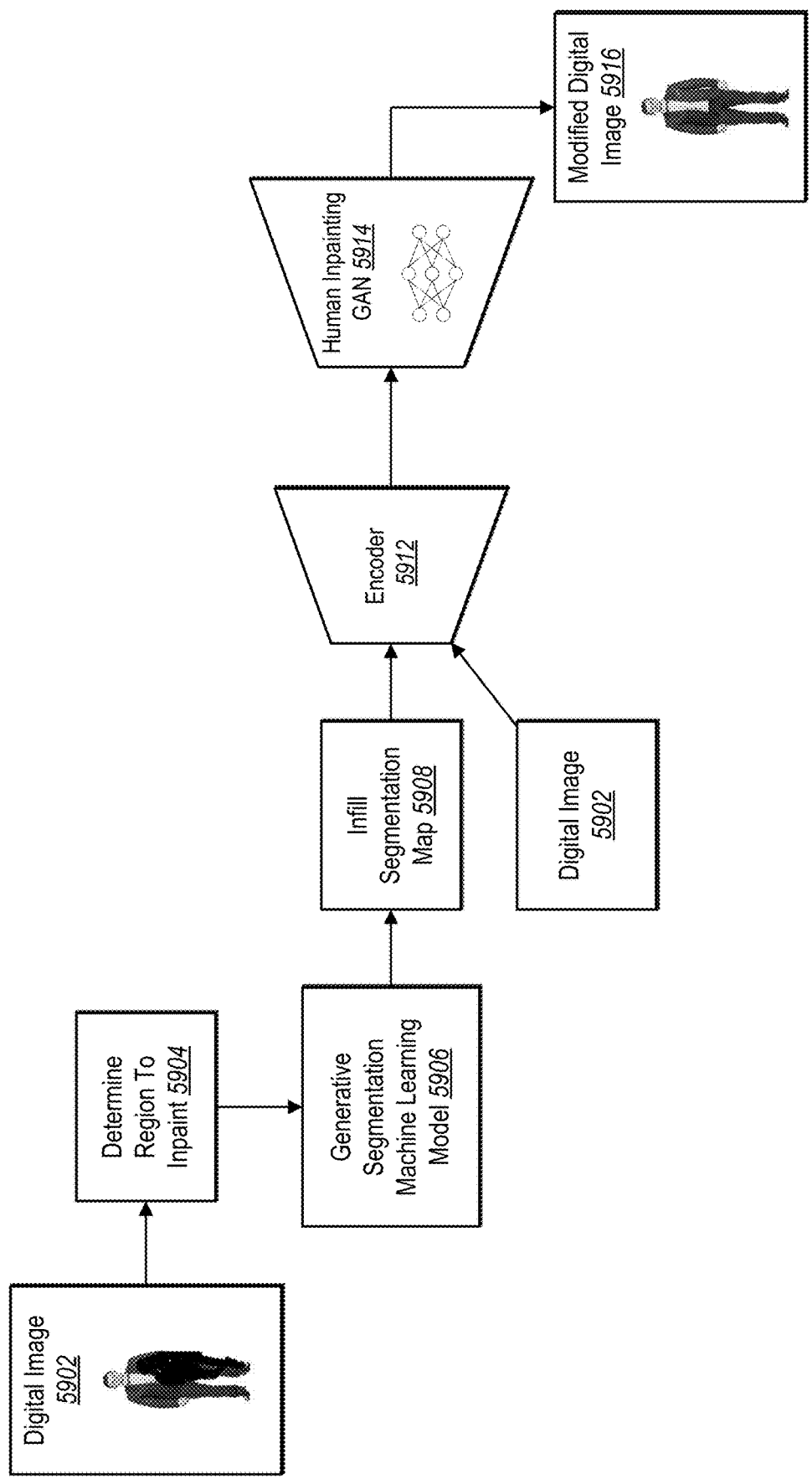
FIG. 59 illustrates an example diagram of the scene-based image editing system utilizing a separate segmentation map branch in accordance with one or more embodiments.

As mentioned previously, the scene-based image editing system 106 generates segmented digital images (e.g., segmented digital image 4406 discussed in the description of FIG. 44). As shown, FIG. 59 illustrates an overview of the scene-based image editing system 106 utilizing a separate segmentation branch to generate an infill segmentation map and a modified digital image in accordance with one or more embodiments. For example, FIG. 59 shows the scene-based image editing system 106 performing an act 5904 based on a digital image 5902. In particular, the act 5904 includes determining a region to inpaint within the digital image 5902. As discussed previously, determining the region to inpaint includes a selection by a user of a client device or a query to a segmentation machine learning model.

Furthermore, as shown, FIG. 59 illustrates the scene-based image editing system 106 utilizing a generative segmentation machine learning model 5906. However, prior to utilizing the generative segmentation machine learning model 5906, the scene-based image editing system 106 utilizes a segmentation machine learning model to generate an initial segmentation map (not shown in FIG. 59). In particular, prior to generating an infill segmentation map 5908, the scene-based image editing system 106 generates an initial segmentation map via a segmentation machine learning model, which was previously discussed above (e.g., segmentation machine learning model as discussed in the description of FIG. 44). In particular, the scene-based image editing system 106 generates the initial segmentation map from the digital image 5902 and subsequently generates the infill segmentation map 5908 based on the initial segmentation map and the digital image 5902 with the region determined for inpainting.

As just mentioned, the scene-based image editing system 106 generates the initial segmentation map. However, due to a hole or occlusion of the human portrayed within the digital image 5902, the segmentation map includes an unclassified region. In particular, the unclassified region corresponds to the region of the human to inpaint. The scene-based image editing system 106 utilizes a generative semantic machine learning model (e.g., generative semantic machine learning model 4006 discussed in the description of FIG. 40) to generate an infill semantic map. Here, for example, the scene-based image editing system 106 utilizes the generative segmentation machine learning model 5906 to generate the infill segmentation map 5908.

Accordingly, the scene-based image editing system 106 utilizes a generative model specifically for segmentation maps to generate a realistic and accurate infill segmentation for the determined region to inpaint. For the infill segmentation map 5908 the scene-based image editing system 106 assigns a label to various pixels within the digital image 5902. Specifically, the scene-based image editing system 106 assigns labels to every pixel within the digital image 5902. For instance, the scene-based image editing system 106 assigns a label to pixels in a manner that groups pixels together that share certain characteristics (e.g., background portion or foreground portion). Furthermore, the infill segmentation map 5908 assigns labels to the region determined to be inpainted. Accordingly, various models utilize the infill segmentation map 5908 to determine how to infill the region indicated to be inpainted.

For example, as mentioned, the scene-based image editing system 106 generates the infill segmentation map and, for the region determined for inpainting, the scene-based image editing system 106 assigns a human segmentation classification. In particular, the inpainting of a region corresponds with a human portrayed within the digital image 5902, as such, the region for inpainting includes a human segmentation classification. Specifically, the human segmentation classification corresponds with a sub-portion of the human such as the hands, feet, arms, legs, torso, or head. Further as shown, the scene-based image editing system 106 utilizes an encoder 5912 that generates outputs based on the infill segmentation map 5908 and the digital image 5902. In particular, the scene-based image editing system 106 further utilizes an output of the encoder 5912 and via a human inpainting GAN 5914, the scene-based image editing system 106 generates a modified digital image 5916.

Figure 60:
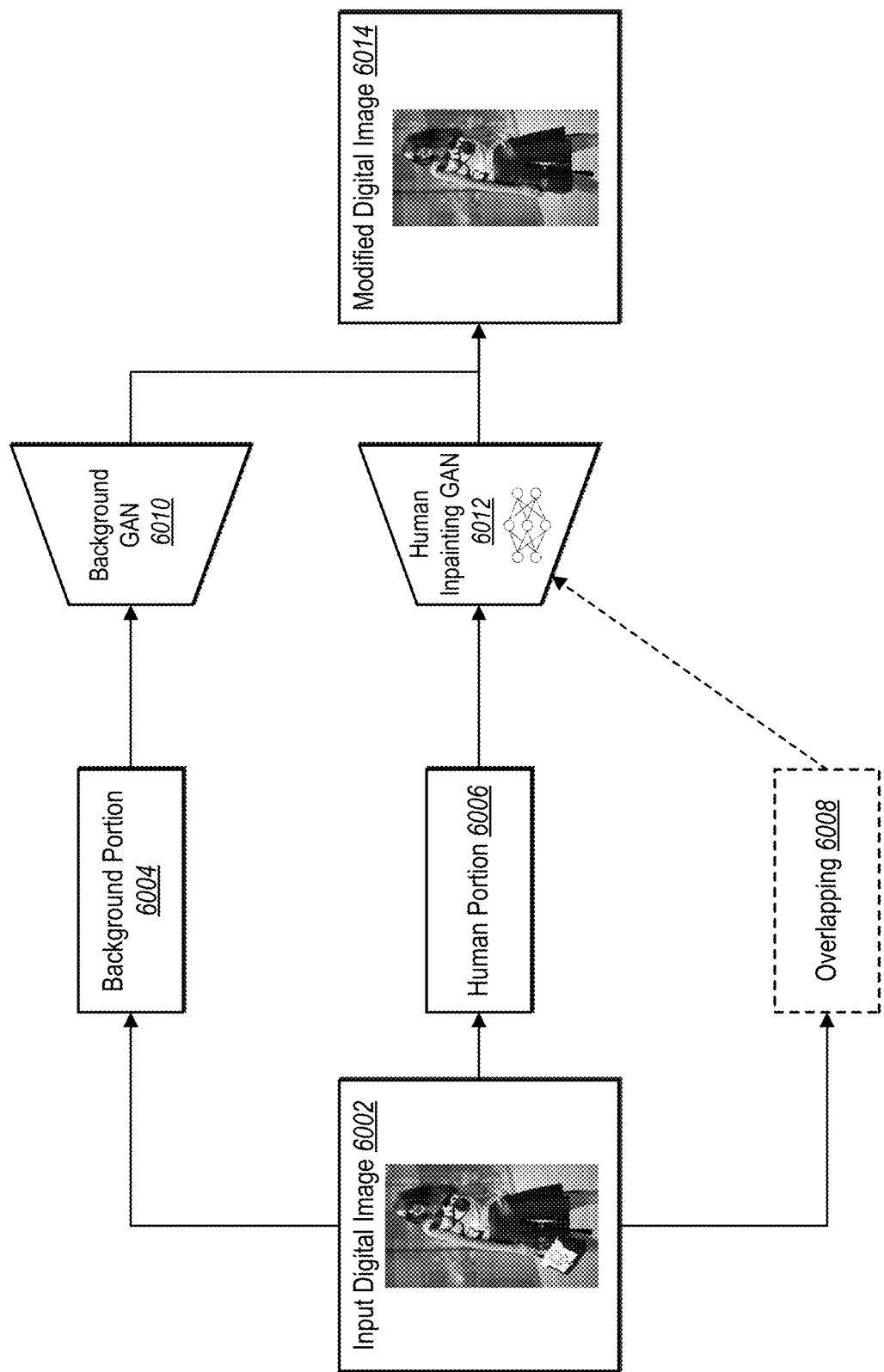
FIG. 60 illustrates an example diagram of the scene-based image editing system generating a modified digital image utilizing a background GAN and a human inpainting GAN in accordance with one or more embodiments.

As mentioned earlier, in one or more embodiments the scene-based image editing system 106 utilizes a human inpainting GAN and background GAN. FIG. 60 illustrates details relating to the scene-based image editing system 106 generating a modified digital image 6014 by utilizing both a background GAN 6010 and a human inpainting GAN 6012. For example, FIG. 60 shows the scene-based image editing system 106 utilizing an input digital image 6002 to segment or identify various portions within the input digital image 6002. For instance, the scene-based image editing system 106 determines a background portion 6004. The background portion 6004 includes non-foreground elements such pixel values corresponding to scenery, buildings, mountains, and sky. For instance, for the input digital image 6002, the background portion 6004 includes the portions of the input digital image 6002 not overlapping with the portrayed human. Furthermore, the scene-based image editing system 106 utilizes the background GAN 6010 to generate a modified background portion of the input digital image 6002. In one or more implementations, the scene-based image editing system 106 utilizes a foreground/background segmentation machine learning model to separate/segment the foreground (human) portion of the digital image from the background portion of the digital image.

The scene-based image editing system 106 utilizes the modified background portion of the input digital image 6002 to generate the modified digital image 6014. The background GAN 6010 includes a GAN that generates a modified background portion of a digital image. In particular, the background GAN 6010 replaces or adds pixel values to the background portion 6004 to generate a realistic-looking background portion 6004. For example, in one or more embodiments, the scene-based image editing system 106 utilizes a cascaded modulation inpainting neural network (or another architecture such as CoModGAN) as the background GAN 6010.

In addition to determining the background portion 6004, the scene-based image editing system 106 also determines a human portion 6006 of the input digital image 6002. For example, the scene-based image editing system 106 determines the human portion 6006 and generates modified pixels of the region corresponding to the human. In particular, the scene-based image editing system 106 utilizes a human inpainting GAN 6012 to generate the modified pixels for the human portion 6006 portrayed within the input digital image 6002. As shown, the scene-based image editing system 106 utilizes a combination of the modified background portion and the modified human portion to generate the modified digital image 6014. Thus, as just discussed in some embodiments, the scene-based image editing system 106 utilizes separate generative models to modify the background portion 6004 and the human portion 6006.

The scene-based image editing system 106 can utilize a variety of approaches to combine the background and human portions of a digital image generated by the human inpainting GAN 6012 and the background GAN 6010. In some implementations, the scene-based image editing system 106 masks an indicated object for removal, inpaints background pixels utilizing the background GAN 6010, and inpaints human pixels (for the hole or infill portion) utilizing the human inpainting GAN 6012. In particular, the scene-based image editing system 106 inpaints the remaining background pixels independent of the pixels corresponding to the human inpainted region.

In some circumstances, this approach can lead to bleeding of the human region into the background pixels. In one or more embodiments, the scene-based image editing system 106 utilizes a different approach to account for this potential bleeding. For example, in one or more implementations, the scene-based image editing system 106 utilizes the human inpainting GAN 6012 to complete the human pixels, but segments and removes the human from the digital image. The scene-based image editing system 106 utilizes the background GAN 6010 to inpaint background pixels (without the human in the digital image), and then reinserts the human within the digital image.

To illustrate, the scene-based image editing system 106 generates the modified digital image 6014 by generating an intermediate digital image. For instance, the scene-based image editing system 106 generates the intermediate digital image by removing the region of the human in the input digital image 6002. Specifically, the scene-based image editing system 106 masks the region corresponding with the human and removes the masked region. Furthermore, for the intermediate digital image, the scene-based image editing system 106 inpaints the remaining portion which includes the background portion 6004 utilizing the background GAN 6010. In doing so, the intermediate digital image contains the background portion 6004 with the human portion 6006 temporarily removed.

In addition, the scene-based image editing system 106 generates modified pixels for the region corresponding to the human portion 6006 (e.g., the human segmentation classification) by utilizing the human inpainting GAN 6012. For example, the scene-based image editing system 106 generates modified pixels for the human portion 6006 separately and inserts the modified pixels corresponding to the human portion 6006 into the intermediate digital image. In doing so, the scene-based image editing system 106 generates the modified digital image 6014.

In some circumstances, this approach can also lead to artifacts along the boundary of the human and background pixels, particularly where the segmentation is not precise. As shown in FIG. 60, in one or more embodiments, the scene-based image editing system 106 determines an overlapping portion 6008 of the input digital image 6002. In particular, the overlapping portion 6008 includes determining an overlap between the human portion 6006 and the background portion 6004. For instance, in one or more embodiments, the scene-based image editing system 106 determines the overlapping portion 6008 by determining a first set of pixels from the inpainting portion of the digital image that correspond to human pixels and determining a second set of pixels from the inpainting portion of the digital image that correspond to background pixels. The scene-based image editing system 106 can expand the first set of pixels (and/or the second set of pixels) to determine an overlapping portion.

In one or more embodiments, the scene-based image editing system utilizes the human inpainting GAN 6012 to generate modified pixel values corresponding to the human portion 6006 and the overlapping portion 6008. Further, the scene-based image editing system 106 utilizes the background inpainting GAN on the background portion 6004. In particular, the scene-based image editing system 106 performs background inpainting for the background portion 6004 based on the human inpainted pixels (e.g., the scene-based image editing system 106 utilizing the human inpainting GAN 6012 to generate modified pixel values corresponding to the human portion 6006 and the overlapping portion 6008). Thus, the combination of the inpainted background portion, the inpainted human portion, and the inpainted overlapping portion generates the modified digital image 6014. In other words, the scene-based image editing system 106 first inpaints the pixels corresponding to the human portion 6006 and then the scene-based image editing system 106 inpaints the background portion 6004 conditioned on the inpainting performed for the human portion 6006.

As mentioned, the scene-based image editing system 106 determines various portions of the input digital image 6002. In one or more embodiments, the scene-based image editing system 106 masks the various determined portions of the input digital image 6002. For example, the scene-based image editing system 106 generates masks for the region of the human portion 6006 and a mask for the background portion 6004. In particular, the mask includes segmenting a portion of the input digital image 6002. For instance, the scene-based image editing system 106 generates a mask by utilizing a segmentation machine learning model to identify pixels corresponding to an indicated region (e.g., the human portion 6006, the background portion 6004, and/or the overlapping portion 6008).

As just mentioned, the scene-based image editing system 106 utilizes masks for the various portions of the input digital image 6002. In particular, the scene-based image editing system 106 first determines the human portion 6006 and the overlapping portion 6008 (the human and the background overlapping), generates masks, and inpaints the masked human portion and the masked overlapping portion utilizing the human inpainting GAN 6012. Subsequently, the scene-based image editing system 106 inpaints the masked background portion utilizing the background GAN 6010. Moreover, the scene-based image editing system 106 combines the inpainted masked background portion with the inpainted masked human portion and masked overlapping portion to generate the modified digital image 6014.

Figure 61:
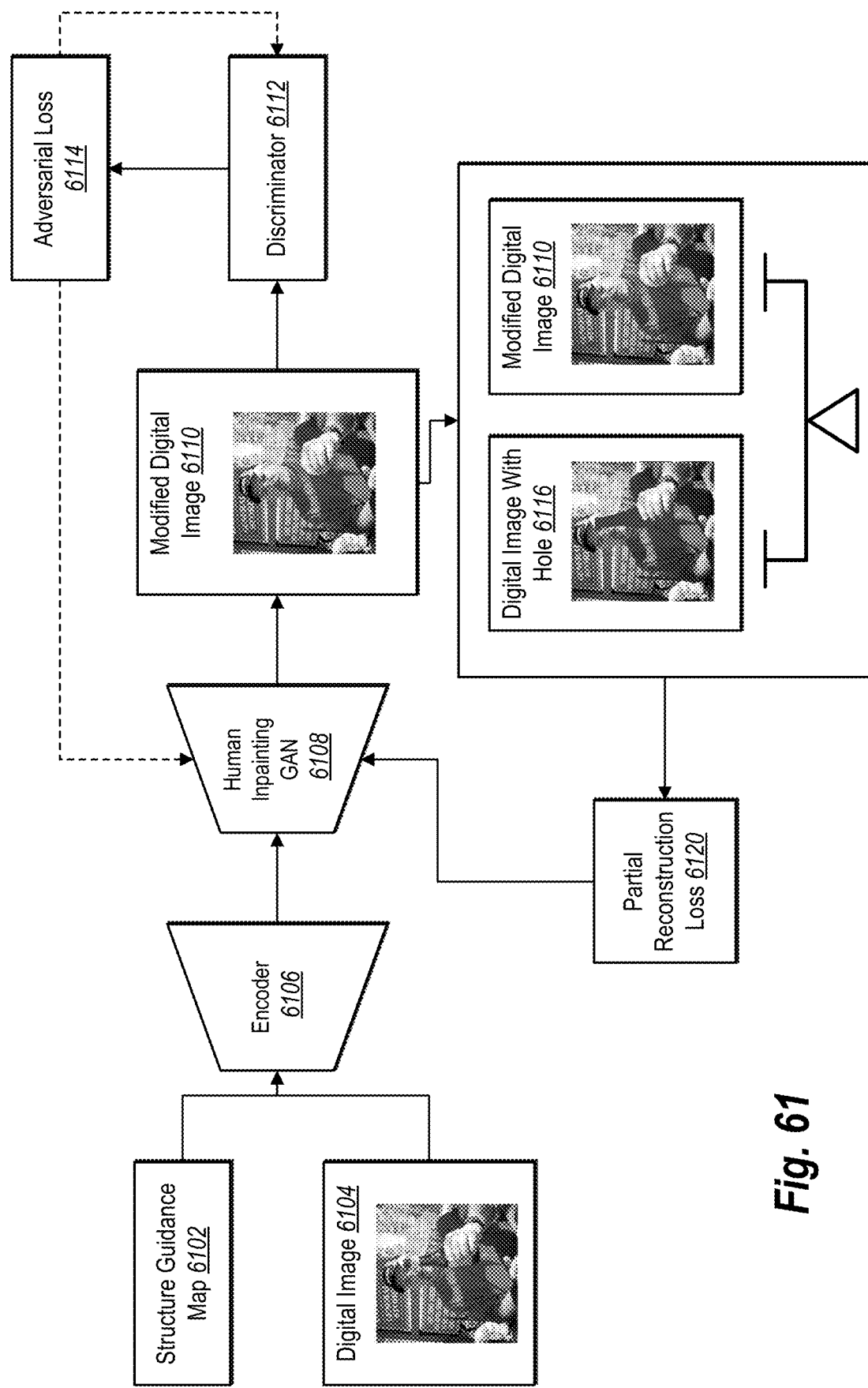
FIG. 61 illustrates an example diagram of the scene-based image editing system training the human inpainting GAN in accordance with one or more embodiments.

As shown, FIG. 61 illustrates details of the scene-based image editing system 106 training a human inpainting GAN in accordance with one or more embodiments. For example, FIG. 61 shows the scene-based image editing system 106 training a human inpainting GAN 6108 with a partial reconstruction loss 6120 and/or an adversarial loss 6114. As mentioned previously, training data for inpainting of occlusions can be difficult to generate because of the lack of ground truth information underlying the occlusion. In one or more embodiments, the scene-based image editing system 106 addresses this problem by utilizing a partial reconstruction loss that determines a measure of loss for portions of the digital image outside of the hole/occlusion to improve the accuracy of the network. In other words, in some implementations the scene-based image editing system 106 does not utilize reconstruction loss on occluder objects so that the human inpainting GAN 6108 does not generate occluder objects.

For example, FIG. 61 shows the scene-based image editing system 106 utilizing an encoder 6106 based on a structure guidance map 6102 and a digital image 6104. Furthermore, utilizing the human inpainting GAN 6108, the scene-based image editing system 106 generates a modified digital image 6110. The scene-based image editing system 106 then compares the modified digital image 6110 and the digital image with hole 6116 to determine the partial reconstruction loss 6120.

Reconstruction loss refers to a measure a similarity or fidelity between a digital image and a generated digital image. For example, a reconstruction loss includes the degree of closeness for a decoder output relative to the original input. In one or more implementations, the scene-based image editing system 106 determines a reconstruction loss utilizing a loss function, such as a mean-squared error or other measure of loss.

In one or more embodiments, the scene-based image editing system 106 determines the partial reconstruction loss 6120 by focusing on a particular portion of the digital image. For example, in one or more implementations, the scene-based image editing system 106 determines the partial reconstruction loss 6120 between the region of the digital image 6104 outside of the hole/occlusion. For instance, the scene-based image editing system 106 in utilizing the human inpainting GAN 6108, inpaints a portion of the digital image 6104. In doing so, the scene-based image editing system 106 determines a reconstruction loss between the non-inpainted portion and the corresponding portion (non-inpainted portion) of the digital image 6104. Thus, as illustrated, the scene-based image editing system 106 compares the modified digital image 6110 with a digital image with a hole 6116 to generate the partial reconstruction loss 6120.

Upon determining the partial reconstruction loss 6120, the scene-based image editing system 106 utilizes the partial reconstruction loss to train the human inpainting GAN 6108. For example, the scene-based image editing system 106 modifies parameters of the human inpainting GAN 6108 to reduce the partial reconstruction loss 6120. In one or more implementations, the scene-based image editing system 106 back propagates the partial reconstruction loss 6120 to the human inpainting GAN 6108.

As further shown, the scene-based image editing system 106 also determines the adversarial loss 6114. As mentioned previously, a discriminator 6112 and generative model attempt to generate a realistic-looking digital image. For example, the scene-based image editing system 106 determines adversarial loss for a generative model. In particular, as mentioned, the adversarial loss includes the generative model and the discriminator 6112 attempting to trick one another in a zero-sum game. As shown in FIG. 61 the scene-based image editing system 106 back propagates the adversarial loss 6114 to the human inpainting GAN 6108. Accordingly, the scene-based image editing system 106 modifies parameters of the human inpainting GAN 6108 based on the adversarial loss 6114 and the partial reconstruction loss 6120.

Figure 62:
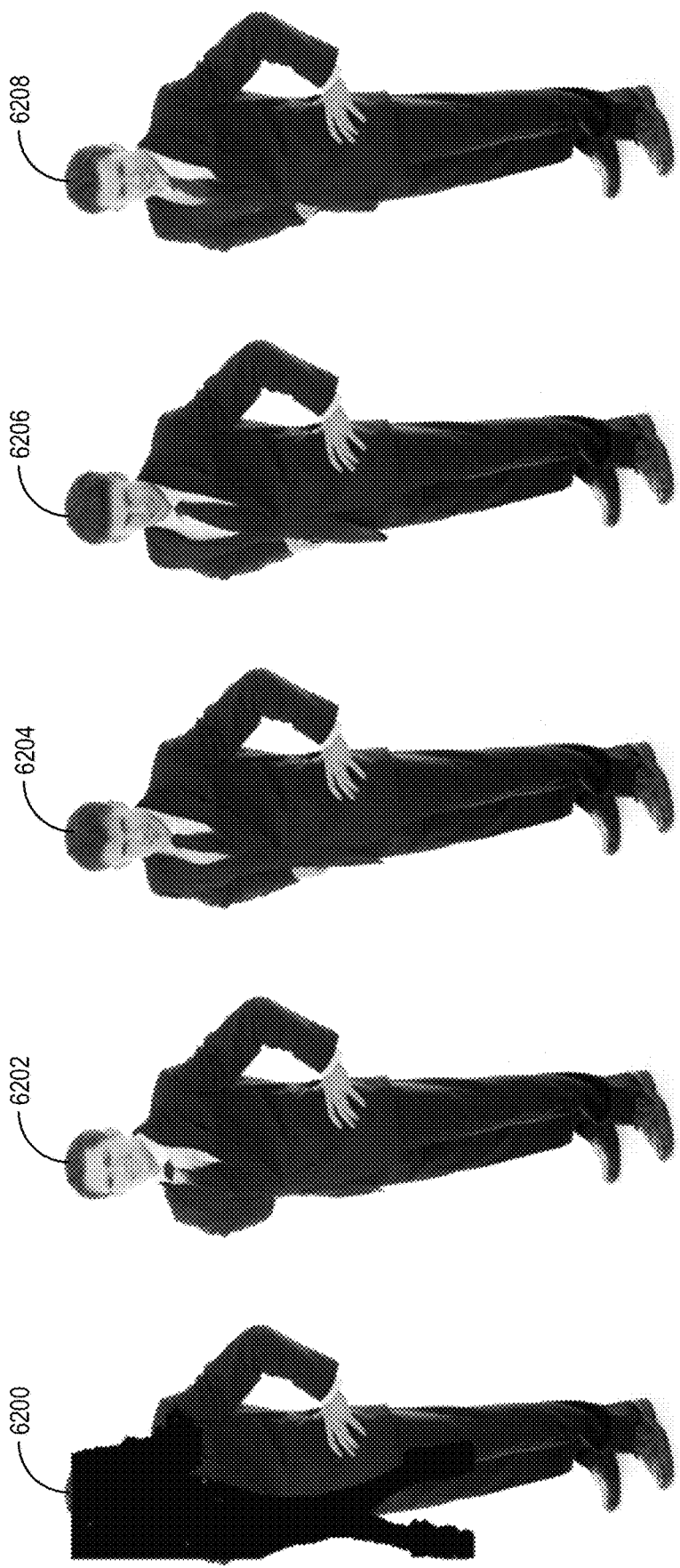
FIG. 62 illustrates example results the scene-based image editing system utilizing various structural guidance maps in accordance with one or more embodiments.

As mentioned above, the scene-based image editing system 106 utilizes various structure guidance maps in accordance with one or more embodiments. For example, FIG. 62 illustrates the scene-based image editing system 106 generating a modified digital image with different structure guidance maps. In particular, FIG. 62 shows an input digital image 6200 with a hole (e.g., obstructing part of the human). Moreover, FIG. 62 shows a modified digital image 6202 generated from utilizing a digital image corresponding with the input digital image 6200 as the structure guidance map.

FIG. 62 also shows a modified digital image 6204 generated from utilizing the digital image corresponding with the input digital image 6200 and a pose map. Further, FIG. 62 shows a modified digital image 6206 generated from utilizing the digital image corresponding with the input digital image 6200 and a segmentation map. Moreover, FIG. 62 shows a modified digital image 6208 generated from utilizing the digital image corresponding with the input digital image 6200 and a keypoint map. In comparing the various modified digital images, FIG. 62 illustrates differences in the scene-based image editing system 106 generating accurate and realistic inpainted humans from the input digital image 6200 with the hole.

In one or more embodiments, the scene-based image editing system 106 intelligently utilizes the features discussed in FIGS. 53-62 to perform human inpainting. For example, if the scene-based image editing system 106 detects a human portrayed within a digital image, the scene-based image editing system 106 provides various intelligent recommendations. In particular, the scene-based image editing system 106 detects a human portrayed within a digital image and partial or whole obstructions/occlusions of the human. For instance, in response to this detection, the scene-based image editing system 106 generates a modified digital image with the detected obstruction/occlusion inpainted.

In some implementations, the scene-based image editing system 106 receives a user selection of an area, occluder, or object (or a user input expanding a frame) and utilizes the human inpainting GAN 6108 to inpaint a human portrayed in the digital image. Thus, based on a single user interaction, the scene-based image editing system 106 can generate a modified digital image that more accurately inpaints a portion of a human.

In some embodiments, the scene-based image editing system 106 detects the human and an obstruction/occlusion within a digital image and provides recommendations. For example, the scene-based image editing system 106 provides various recommendations to remove detected obstructions/occlusions and provides an option for a user of a client device to select the provided recommendations. In particular, the scene-based image editing system 106 can also provide a generated sample of various objects removed from a digital image and inpainting of a human and/or background.

Moreover, in some embodiments, the scene-based image editing system 106 intelligently detects an upload of a digital image portraying a human in addition to an existing digital image being edited within an image editing application. In particular, the scene-based image editing system 106 receives the upload of the digital image portraying a human and automatically removes objects (e.g., objects occluding or obstructing the human) and performs human inpainting. Moreover, in this instance, the scene-based image editing system 106 can also perform background inpainting to conform with the already existing digital image. Furthermore, in response to receiving additionally uploaded digital images, the scene-based image editing system 106 performs human inpainting for humans portrayed within the existing digital image being edited within the image editing application.

As also briefly mentioned above, in one or more embodiments the scene-based image editing system 106 generates modified digital images by reposing subjects portrayed within a digital image. For example, the scene-based image editing system 106 reposes human subjects (or other objects) portrayed in a source digital image according to a target pose. In particular, the scene-based image editing system 106 utilizes a human (or object) portrayed within the source digital image to depict the human (or object) with a different pose. For instance, the scene-based image editing system 106, in one or more embodiments, utilizes a global texture map appearance vector and a local appearance feature tensor. Moreover, the scene-based image editing system 106 combines the global texture map appearance vector with the local appearance feature tensor and utilizes a reposing model to generate a modified digital image.

As just mentioned, in one or more embodiments the scene-based image editing system 106 combines a global texture map appearance vector and a local appearance feature tensor. Specifically, the scene-based image editing system 106 combines these representations to generate a globally modified local appearance feature tensor which includes spatially variant information and spatially invariant information. Furthermore, the scene-based image editing system 106 utilizes the globally modified local appearance feature tensor to modulate a reposing model, such as a reposing GAN. Accordingly, modulating the reposing GAN results in the scene-based image editing system 106 generating a high-quality and nuanced reposing of the human portrayed within the source digital image.

Furthermore, in one or more embodiments the scene-based image editing system 106 generates a warped digital image from a texture map and a target pose map. In particular, the scene-based image editing system 106 further generates a warped pose feature map from the warped digital image. For instance, the scene-based image editing system 106 generates vectors utilizing the warped digital image and synthesizes a modified digital image based on the warped pose feature map. Moreover, in one or more embodiments the scene-based image editing system 106 utilizes a coordinate inpainting GAN to generate an inpainted warped digital image. The inpainted warped digital image can further assist the scene-based image editing system 106 in generating high-quality reposing of humans portrayed within digital images.

In addition, in one or more implementations the scene-based image editing system 106 trains the reposing GAN by utilizing an unpaired image dataset. For example, the scene-based image editing system 106 generates incomplete digital images and synthesized inpainted digital images from the incomplete digital images and target poses. Based on the synthesized inpainted digital images, the scene-based image editing system 106 determines a measure of loss to modify parameters of the reposing GAN. Moreover, the scene-based image editing system 106 generates masks for different portions of a modified digital image. In particular, the scene-based image editing system 106 generates masks for the body and/or for sub-parts of the body to determine different loss weights. For instance, the scene-based image editing system 106 modifies parameters of the reposing GAN based on the various loss weights.

Figure 63:
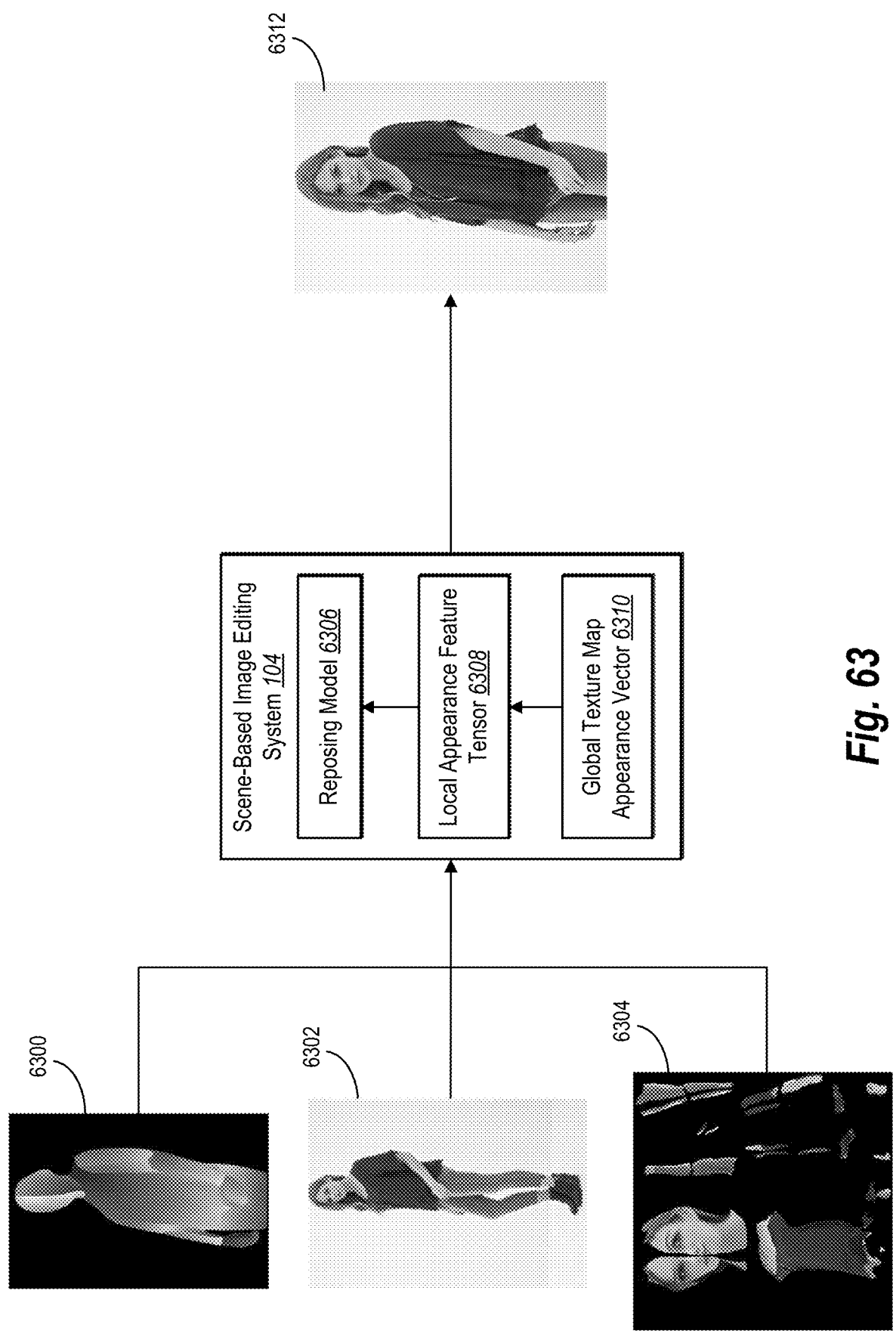
FIG. 63 illustrates an overview diagram of the scene-based image editing system performing reposing in accordance with one or more embodiments.

For example, FIG. 63 illustrates an overview of the scene-based image editing system 106 utilizing a reposing model 6306 to repose a human shown within a source digital image 6302. As shown, FIG. 63 illustrates the scene-based image editing system 106 utilizing the source digital image 6302. In particular, the source digital image 6302 includes a digital image that depicts a human. The scene-based image editing system 106 can receive or identify the source digital image 6302 in a variety of ways, such as from a camera roll of a client device, a cloud storage service, or an upload from the client device.

In addition, FIG. 63 also illustrates a target pose map 6300. The target pose map 6300 comprises a representation of a modified pose. The target pose map, for example, can include a dense pose representation of a new pose. The scene-based image editing system 106 can obtain the target pose map 6300 from a plurality of predetermined target poses and/or extract the target pose map 6300. For example, the scene-based image editing system 106 can determine a target pose by analyzing a target image portraying a target human and extracting a dense pose representation of the target human.

For instance, the scene-based image editing system 106 can generate the target pose map 6300 by mapping UV coordinates from a digital image that depicts a human to represent the structural pose of the human. Furthermore, the target pose map 6300 represents rendered dense body UV coordinates. Specifically, the scene-based image editing system 106 utilizes a parametric 3D body model to render the dense UV of the body captured in a target digital image. For example, the scene-based image editing system 106 utilizes the parametric 3D body model to map the human appearance within a digital image to a UV space. In particular, the 3D body model utilized by the scene-based image editing system 106 includes a set of interconnected 3D meshes for defining body shape and pose. The scene-based image editing system 106 can utilize a variety of computer-implemented models. For instance, in one or more embodiments the scene-based image editing system 106 generates the target pose map 6300 by utilizing the methods described by Kripasindhu Sarkar, Vladislav Golyanik, Lingjie Liu, and Christian Theobalt in Style and pose control for image synthesis of humans from a single monocular view, 2021, which is incorporated in its entirety by reference herein.

Moreover, in some embodiments, the scene-based image editing system 106 receives an upload of a digital image from the user of the client device and generates the target pose map 6300 from the uploaded digital image. In other embodiments, the scene-based image editing system 106 provides pre-defined target poses and in response to a selection of a pre-defined target pose, the scene-based image editing system 106 utilizes a corresponding target pose map with the selected pre-defined target pose.

Furthermore, FIG. 63 also illustrates a texture map 6304. For example, the scene-based image editing system 106 generates the texture map 6304 by projecting pixels from the source digital image to a predefined texture map layout. Additional details relating to the texture map 6304 are given below (e.g., in the description of FIG. 65).

As shown in FIG. 63, the scene-based image editing system 106 utilizes the target pose map 6300, the source digital image 6302 and the texture map 6304 in conjunction with the reposing model 6306 to generate the modified digital image 6312. In particular, the scene-based image editing system 106 generates a global texture map appearance vector 6310 and a local appearance feature tensor 6308. Further, the scene-based image editing system 106 utilizes the reposing model 6306 to generate a modified digital image 6312 from the local appearance feature tensor 6308 and the global texture map appearance vector 6310. Additional detail regarding the local appearance feature tensor 6308, the global texture map appearance vector 6310 and the reposing model 6306 are provided below (e.g., in relation to FIG. 64). Moreover, although FIG. 63 illustrates utilizing the source digital image 6302 as input to the scene-based image editing system 104, in one or more embodiments, the scene-based image editing system 106 utilizes a warped digital image along with the target pose map 6300 and the texture map 6304 to generate the modified digital image 6312. Additional detail regarding utilizing a warped digital image is provided below (e.g., in relation to FIG. 67).

As shown, the reposing model 6306 generates the modified digital image 6312, which portrays the human within the source digital image 6302 reposed according to the target pose map 6300. As compared to conventional systems, the scene-based image editing system 106 improves upon accuracy and efficiency in generating modified digital images, specifically reposing subjects portrayed within digital images. Indeed, conventional systems suffer from a number of technical deficiencies, particularly with regard to accuracy and efficiency in performing reposing in a digital image.

For instance, conventional systems can repose subjects shown in a digital image, however conventional systems often generate inaccurate and unrealistic results. In particular, conventional systems performing reposing generally suffers from a lack of nuance and detail. Specifically, conventional systems utilize global feature modifications which fail to accurately and efficiently capture the details for reposing a subject within a digital image. In addition, conventional systems typically require excessive user interactions and user interfaces for a user of a client device to accurately generate a reposed subject within a modified digital image.

The scene-based image editing system 106 can improve upon accuracy of conventional systems by utilizing both global and local feature representations. For example, in one or more embodiments the scene-based image editing system 106 utilizes the global texture map appearance vector 6310 and the local appearance feature tensor 6308 to generate the to generate a more accurate and realistic digital image. For instance, the scene-based image editing system 106 modulates the reposing model 6306 to capture the nuance and details of reposing the subject from the source digital image 6302.

Furthermore, in one or more embodiments, the scene-based image editing system 106 improves accuracy by utilizing a warped digital image generated from a texture map and a target pose map. In particular, the scene-based image editing system 106 rearranges the pixels from the source image with the spatial structure provided by the target to generate the warped image. The system can combine the target pose and the warped image as input to focus on the detail hallucination instead of synthesizing the 2D appearance based on appearance code alone.

Additionally, the scene-based image editing system 106 can improve upon accuracy by utilizing an inpainted warped digital image. For example, the scene-based image editing system 106 utilizes a coordinate inpainting GAN for inpainting a warped digital image. In one or more implementations, the scene-based image editing system 106 utilizes the coordinate inpainting GAN to address holes and missing parts in the projected texture map.

As mentioned above, the scene-based image editing system 106 can also improve efficiency. For example, as mentioned above, the scene-based image editing system 106 eliminates excessive user interactions and user interfaces for performing reposing of a subject within a digital image. Specifically, the scene-based image editing system 106 incorporates the nuance and details from the target pose map 6300, the source digital image 6302, and the texture map 6304 to automatically and efficiently generate a high-quality and accurate modified digital image.

Figure 64:
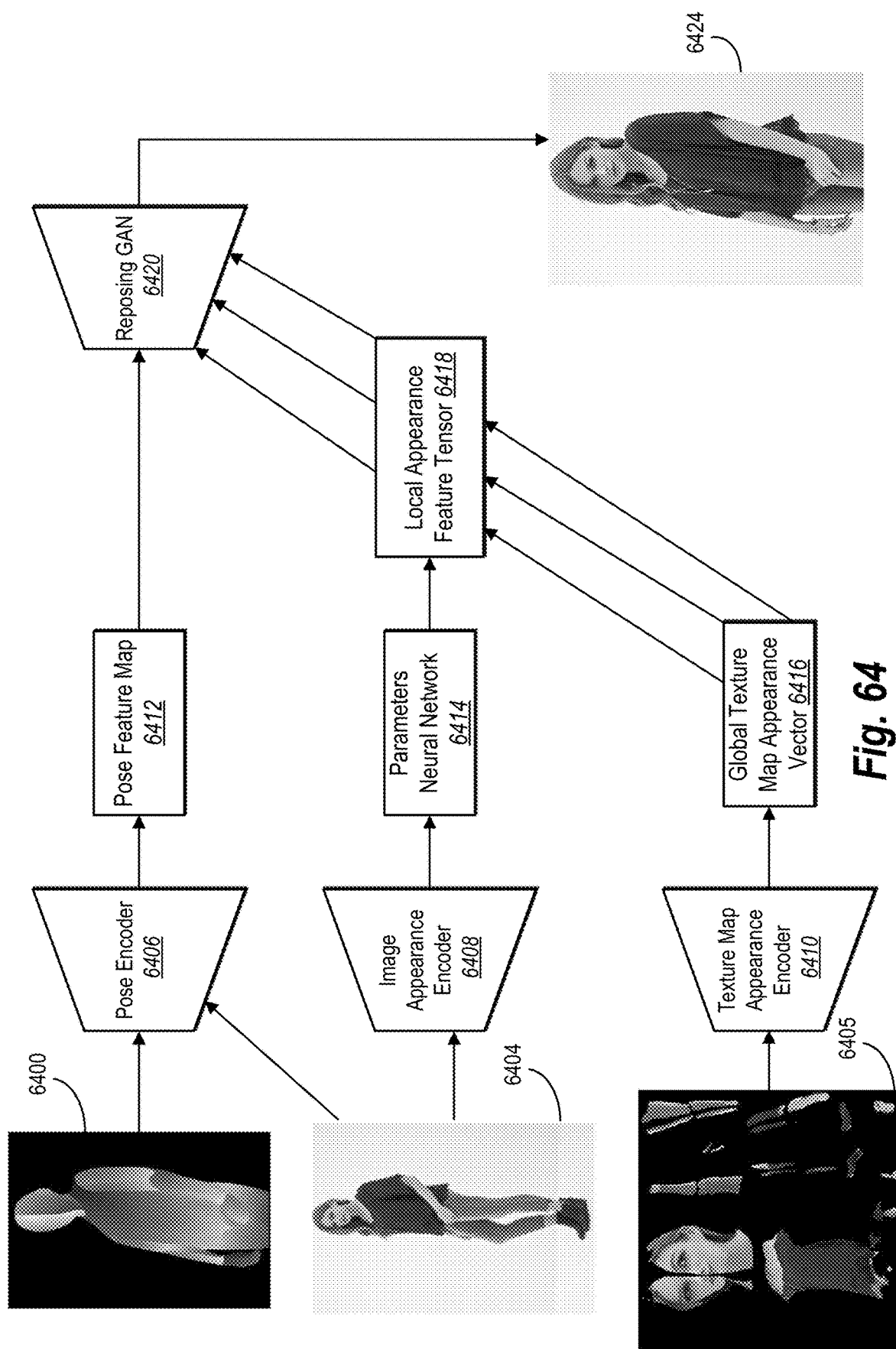
FIG. 64 illustrates an example diagram of the scene-based image editing system generating a local appearance feature tensor in accordance with one or more embodiments.

As mentioned above, FIG. 64 shows additional details relating to generating a global texture map appearance vector and a local appearance feature tensor in accordance with one or more embodiments. As already discussed in FIG. 63, the scene-based image editing system 106 utilizes a target pose map 6400, a source digital image 6404, and a texture map 6405. For example, FIG. 64 illustrates the scene-based image editing system 106 utilizing a pose encoder 6406 based on the target pose map 6400 and the source digital image 6404. As mentioned previously, in one or more embodiments, an encoder is a neural network (or one or more layers of a neural network) that extract features relating to a pose of a subject portrayed within a digital image. The scene-based image editing system 106 utilizes the pose encoder 6406 to extract features relating to pose to generate a pose feature map 6412 from the target pose map 6400 and the source digital image 6404.

In one or more embodiments, the pose encoder 6406 includes a hierarchical pose encoder. In particular, the hierarchical pose encoder includes multiple layers to encode the target pose map 6400 and the source digital image 6404 in a hierarchical manner. Each layer of the hierarchical pose encoder extracts a different level of abstraction from the target pose map 6400 and the source digital image 6404. Specifically, the hierarchical pose encoder extracts features, passes the features to the next layer until generating the pose feature map 6412.

Moreover, as discussed above, the hierarchical pose encoder includes downsampling layers and upsampling layers. Specifically, the scene-based image editing system 106 utilizes the hierarchical pose encoder to process the target pose map 6400 and the source digital image 6404 via a downsampling layer of the hierarchical pose encoder. Further, the scene-based image editing system 106 via the downsampling layer generates an intermediate downsampled feature vector with a resolution corresponding to that downsampling layer. Furthermore, the scene-based image editing system 106 generates utilizing an additional downsampling layer of the hierarchical pose encoder, an additional intermediate downsampled feature vector corresponding to an additional resolution.

In addition, to the downsampling layers, the hierarchical pose encoder also utilizes an upsampling layer to generate an intermediate upsampled feature vector with a resolution corresponding to that upsampled layer. Further, the scene-based image editing system 106 utilizes skip connections between the downsampling layer and the upsampling layer to generate a combined feature vector from the intermediate downsampled feature vector and the intermediate upsampled feature vector. Moreover, the scene-based image editing system 106 generates utilizing an additional upsampling layer of the hierarchical pose encoder from the combined feature vector (of the intermediate downsampled feature vector and the intermediate upsampled feature vector) an additional intermediate upsampled feature vector corresponding to an additional resolution. Furthermore, via skip connections, the scene-based image editing system 106 combines the additional intermediate downsampled feature vector with the additional intermediate upsampled feature vector to generate the pose feature map 6412. Indeed, in one or more embodiments, the scene-based image editing system 106 utilizes the architecture illustrated in FIG. 56 as a hierarchical pose encoder.

For example, as mentioned above, the scene-based image editing system 106 generates the pose feature map 6412. In particular, the pose feature map 6412 includes an encoding, embedding, or feature representation of the source digital image 6404 and the target pose map 6400. For instance, the pose feature map 6412 includes an indication of the different features found within the source digital image 6404 and the target pose map 6400. Accordingly, because the scene-based image editing system 106 generates the pose feature map 6412 from the target pose map 6400 and the source digital image 6404, the pose feature map 6412 contains feature of both the target pose map 6400 and the source digital image 6404.

Furthermore, FIG. 64 illustrates the scene-based image editing system 106 passing the pose feature map 6412 generated from the pose encoder 6406 to a reposing GAN 6420. In FIG. 64, the scene-based image editing system 106 trains the reposing GAN 6420 specifically for reposing of subjects shown within a digital image.

As shown in FIG. 64, the scene-based image editing system 106 additionally utilizes an image appearance encoder 6408 to process the source digital image 6404. In particular, the scene-based image editing system 106 utilizes the image appearance encoder 6408 to extract features from the source digital image 6404 relating to appearance and generates a local appearance vector (not shown in FIG. 64). Also, the scene-based image editing system 106 utilizes the image appearance encoder 6408 that includes a hierarchical image appearance encoder. Similar to above, the scene-based image editing system 106 generates the local appearance vector utilizing multiple upsampling and downsampling layers (e.g., as illustrated in FIG. 56 or FIG. 57).

Moreover, although not shown, the scene-based image editing system 106 passes the local appearance vector generated from the image appearance encoder 6408 to a parameters neural network 6414. For example, in one or more embodiments, the scene-based image editing system 106 utilizes the parameter neural network described in relation to FIG. 57 in implementing the parameters neural network 6414. As shown, the scene-based image editing system 106 utilizes the parameters neural network 6414 to generate a local appearance feature tensor 6418. The local appearance feature tensor 6418 includes generating a scaling and/or shifting tensor that locally applies to the pose feature map 6412. For example, the scene-based image editing system 106 generates the local appearance feature tensor utilizing the parameters neural network 6414 from the local appearance vector. Specifically, the scene-based image editing system 106 utilizes the local appearance feature tensor 6418 as a spatially varying tensor. In other words, the local appearance feature tensor 6418 includes nuanced localized details that applies locally to different portions/regions of the pose feature map 6412. For different parts of the source digital image 6404, the scene-based image editing system 106 utilizes a different local appearance feature tensor.

Furthermore, FIG. 64 illustrates the scene-based image editing system 106 utilizing a texture map appearance encoder 6410 to process the texture map 6405. Similar to the above, the scene-based image editing system 106 utilizes the texture map appearance encoder 6410 to generate texture appearance features (e.g., a feature vector) from the texture map 6405. Specifically, FIG. 64 shows the scene-based image editing system 106 generating a global texture map appearance vector 6416.

In particular, the global texture map appearance vector 6416 includes a spatially invariant vector. In other words, the global texture map appearance vector 6416 globally applies to the entire source digital image 6404. In contrast to the local appearance feature tensor 6418, as mentioned, the global texture map appearance vector 6416 includes a spatially invariant vector. Specifically, the global texture map appearance vector 6416 does not change depending on the location of the pixel value within the source digital image 6404 (or feature representations of the source digital image 6404. Thus, the global texture map appearance vector 6416 includes a one-dimensional appearance vector.

In addition to generating the global texture map appearance vector 6416 from the texture map appearance encoder 6410, FIG. 64 also shows the scene-based image editing system 106 combining the global texture map appearance vector 6416 with the local appearance feature tensor 6418. Specifically, the scene-based image editing system 106 utilizes a combination of the global texture map appearance vector 6416 and the local appearance feature tensor 6418 to modulate individual layers (i.e., style blocks) at the reposing GAN 6420. Further, the scene-based image editing system 106 generates a modified digital image 6424, modified relevant to the source digital image 6404 and reposed according to the target pose map 6400. More details relating to the combination of the global texture map appearance vector 6416 and the local appearance feature tensor 6418 are given below in the description of FIG. 66.

Moreover, although FIG. 64 shows the scene-based image editing system 106 utilizing the source digital image 6404, in one or more embodiments the scene-based image editing system 106 utilizes a warped digital image. In particular, the scene-based image editing system 106 processes the warped digital image with the pose encoder 6406 and the image appearance encoder 6408 to generate the pose feature map 6412 and the local appearance feature tensor 6418.

Figure 65:
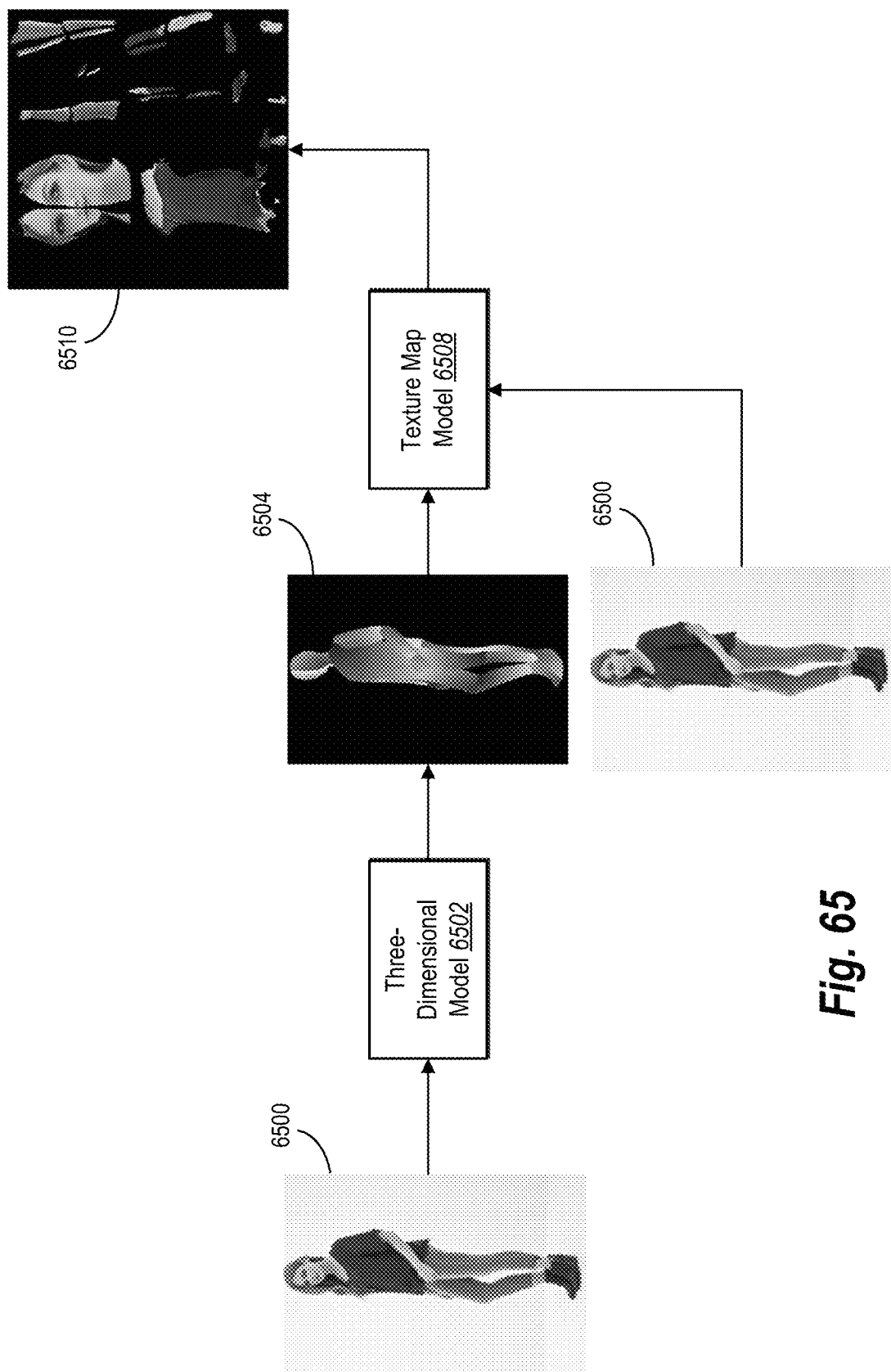
FIG. 65 illustrates an example diagram of the scene-based image editing system generating a texture map in accordance with one or more embodiments.

As mentioned, FIG. 65 illustrates the scene-based image editing system 106 generating a texture map in accordance with one or more embodiments. As shown, FIG. 65 illustrates the scene-based image editing system 106 utilizing a three-dimensional model 6502 to process a source digital image 6500. For example, the scene-based image editing system 106 utilizes the three-dimensional model 6502 to generate a pose map 6504 from the source digital image 6500. In particular, the three-dimensional model 6502 represents an object within a digital image (e.g., the human) by utilizing x, y, and z coordinates to define the object's position in space. Specifically, the scene-based image editing system 106 utilizes the three-dimensional model 6502 to generate pose maps (e.g., target pose map, or pose map of the source digital image 6500).

As shown, the scene-based image editing system 106 utilizes a texture map model 6508 to generate a texture map 6510 from the pose map 6504 of the source digital image 6500 and the source digital image 6500. Specifically, the texture map model 6508 generates the texture map 6510 by utilizing pixel values from the source digital image 6500 and the pose map 6504 of the source digital image 6500. In other words, the scene-based image editing system 106 generates the texture map 6510 by projecting the pixel values of the source digital image 6500 guided by the pose map 6504 of the source digital image 6500. For instance, in some implementations, the scene-based image editing system 106 utilizes the methods disclosed in *Style and Pose Control for Image Synthesis of Humans from a Single Monocular View*, 2021 which was mentioned above. Furthermore, in some embodiments, the scene-based image editing system 106 utilizes the methods discussed in Pose With Style for generating texture maps.

Additionally, in one or more implementations, the scene-based image editing system 106 generates the texture map 6510 utilizing VGG normalization. For instance, prior to projecting the pixel values of the source digital image 6500 guided by the pose map 6504, the scene-based image editing system 106 normalizes the source digital image 6500 to match a distribution used when training a VGG network, e.g., VGG Net described by Karen Simonyan and Andrew Zisserman in Very deep convolutional networks for large-scale image recognition. arXiv preprint arXiv: 1409.1556, 2014 which is incorporated in its entirety by reference herein.

Figure 66:
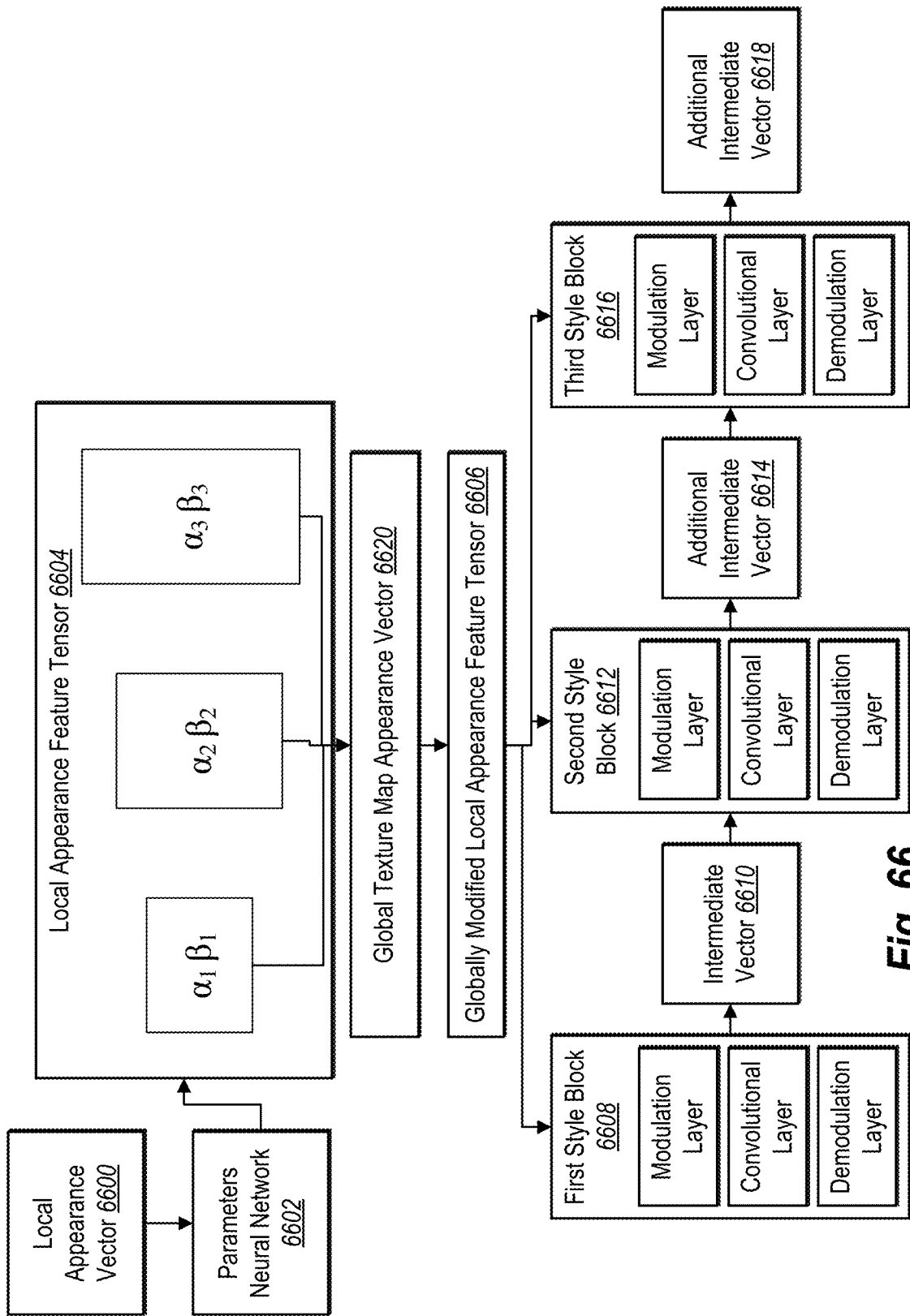
FIG. 66 illustrates an example diagram of the scene-based image editing system modulating style blocks in accordance with one or more embodiments.

As mentioned, in one or more embodiments, the scene-based image editing system 106 modulates the reposing GAN. For example, FIG. 66 illustrates details of the scene-based image editing system 106 modulating the reposing GAN at each style block in accordance with one or more embodiments. In particular, FIG. 66 shows the scene-based image editing system 106 utilizing a parameters neural network 6602 to process a local appearance vector 6600. Specifically, the local appearance vector 6600 includes feature information from the source digital image, specifically, spatially variant information. Further, the scene-based image editing system 106 via the parameters neural network 6602 generates a local appearance feature tensor 6604, which includes different spatially varying shifting and scaling tensors. For example, the scene-based image editing system 106 can generate local appearance feature tensors as discussed above with regard to FIGS. 55, 57, and 58.

As further shown, the scene-based image editing system 106 combines a global texture map appearance vector 6620 with the local appearance feature tensor 6604. For instance, in one or more implementations, the scene-based image editing system 106 concatenates the global texture map appearance vector 6620 (i.e., a 1D appearance vector) to each location of the local appearance feature tensor 6604 (i.e., a 2D appearance tensor) to pass the global information of the texture map into the generator. For example, by combining the global texture map appearance vector 6620 and the local appearance feature tensor 6604, the scene-based image editing system 106 generates a globally modified local appearance feature tensor 6606. In particular, the scene-based image editing system 106 modulates the reposing GAN with the globally modified local appearance feature tensor 6606. The globally modified local appearance feature tensor 6606 includes spatially variant information and spatially invariant information for modulating the pose feature map at each block of the reposing GAN.

As mentioned above (e.g., with regard to FIGS. 55 and 58), generative models (such as StyleGAN or StyleGAN2) can include various layers or style blocks that correspond to different resolutions. For example, FIG. 66 shows a first style block 6608 of the reposing GAN utilizing as input a globally modified local appearance feature tensor 6606 corresponding to a resolution of the first style block 6608. In particular, the scene-based image editing system 106 utilizes the globally modified local appearance feature tensor 6606 to modulate the first style block 6608. Moreover, as shown, FIG. 66 shows that the first style block 6608 includes a modulation layer, a convolutional layer, and a demodulation layer. As previously discussed (e.g., in relation to FIG. 58), at the modulation layer, the scene-based image editing system 106 modulates the corresponding resolution of the pose feature map with the globally modified local appearance feature tensor 6606. After passing the corresponding resolution of the pose feature map through the modulation layer, the convolutional layer, and the demodulation layer, the scene-based image editing system 106 via the first style block 6608 of the reposing GAN generates an intermediate vector 6610.

Furthermore, the scene-based image editing system 106 utilizes as input a corresponding resolution of the second style block 6612 and modulates the corresponding feature representations (e.g., style vector or other vector representations) of the second style block 6612 with the globally modified local appearance feature tensor 6606. As shown, for the second style block 6612, the scene-based image editing system 106 utilizes a different scaling and shifting tensor at the second style block 6612 than at the first style block 6608. Similar to the above, the corresponding resolution of the second style block 6612 passes through the modulation layer, convolutional layer, and demodulation layer to generate an additional intermediate vector 6614. As similarly shown, the scene-based image editing system 106 also utilizes at a third style block 6616 a corresponding resolution of the third style block 6616 for modulation by the globally modified local appearance feature tensor 6606. Similarly, the scene-based image editing system 106 via the third style block 6616 generates an additional intermediate vector 6618.

As mentioned earlier, in one or more embodiments the scene-based image editing system 106 also utilizes a warped digital image. For example, FIG. 67 shows details of the scene-based image editing system 106 generating a warped digital image 6706 and utilizing the warped digital image 6706 to generate a modified digital image 6728.

Figure 67:
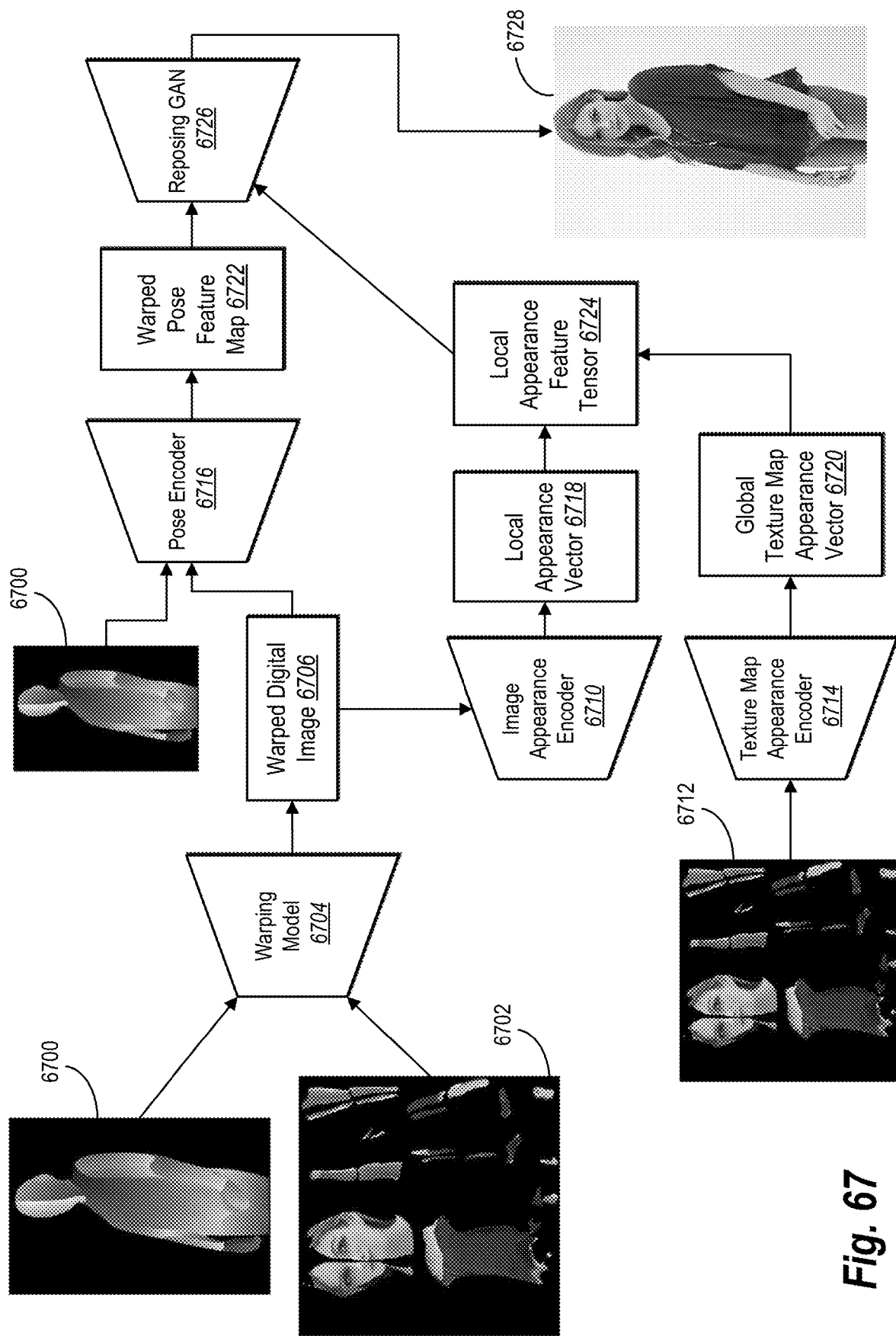
FIG. 67 illustrates an example diagram of the scene-based image editing system generating a warped digital image in accordance with one or more embodiments.

In particular, FIG. 67 shows the scene-based image editing system 106 utilizing a warping model 6704 to process a target pose map 6700 and a texture map 6702 to generate the warped digital image 6706. For example, the warped digital image 6706 includes a distorted digital image representation (e.g., a modified texture map). In particular, the scene-based image editing system 106 generates the warped digital image 6706 by warping the texture map 6702 with the target pose map 6700. Specifically, the scene-based image editing system 106 utilizes UV coordinates from the target pose map 6700 to warp the texture map 6702. Furthermore, the warped digital image 6706 includes pixel values rearranged according to the target pose map 6700. For instance, the scene-based image editing system 106 generates the warped digital image 6706 by rearranging the pixel values from the source digital image in the texture map 6702 based on the UV coordinates from the target pose map 6700. As mentioned above, the scene-based image editing system 106 generates the warped digital image 6706 based on the UV coordinates from the target pose map 6700. For example, the UV coordinates include mapping points on a two-dimensional surface to a point on a texture. The "U" in UV coordinates corresponds to the horizontal axis of the texture and the "V" corresponds to the vertical axis of the texture.

Furthermore, FIG. 67 illustrates the scene-based image editing system 106 utilizing a pose encoder 6716 to process the warped digital image 6706 along with the target pose map 6700. For example, FIG. 67 shows the scene-based image editing system 106 generating, via the pose encoder 6716, a warped pose feature map 6722. For instance, the warped pose feature map 6722 includes an indication of the different features found within the warped digital image 6706 and the target pose map 6700. Additionally, as shown, the scene-based image editing system 106 passes the warped pose feature map 6722 to a reposing GAN 6726.

As shown, FIG. 67 illustrates the scene-based image editing system 106 also utilizing an image appearance encoder 6710 to process the warped digital image 6706. As already discussed, the scene-based image editing system 106 generates a local appearance vector 6718 and subsequently a local appearance feature tensor 6724 via a parameters neural network. Further, as also shown, FIG. 67 illustrates the scene-based image editing system 106 utilizing a texture map appearance encoder 6714 to process a texture map 6712. In particular, the scene-based image editing system 106 via the texture map appearance encoder 6714 generates a global texture map appearance vector 6720. As discussed previously, the scene-based image editing system 106 combines the global texture map appearance vector 6720 with the local appearance feature tensor 6724 to generate the globally modified local appearance feature tensor for modulating the warped pose feature map 6722 at the reposing GAN 6726. Moreover, as shown, the scene-based image editing system 106 via the reposing GAN 6726 generates a modified digital image 6728.

Although not shown in FIG. 67, in one or more embodiments, the scene-based image editing system 106 additionally utilizes a coordinate inpainting generative neural network. Indeed, in some circumstances, a texture map projected from a source image will be incomplete (i.e., because the source image captures a partial observation of the subject relative to the target pose). Accordingly, the warped image can include holes and missing parts. To address this issue, the scene-based image editing system 106 can apply coordinate inpainting. For example, the scene-based image editing system 106 generates an inpainted warped digital image utilizing a coordinate inpainting generative neural network. In particular, coordinate inpainting includes filling in missing or corrupted data by reconstructing the missing parts.

The coordinate inpainting generative neural network can learn correlations between different UV positions. During run time, the missing pixels in the texture map can be synthesized from the visible pixels using such correlation prior. The scene-based image editing system 106 can utilize a variety of coordinate inpainting models. In one or more implementations, the scene-based image editing system 106 utilizes a coordinate inpainting model as described by Artur Grigorev, Artem Sevastopolsky, Alexander Vakhitov, and Victor Lempitsky. Coordinate-based texture inpainting for pose-guided image generation, arXiv preprint arXiv: 1811.11459, 2018, which is incorporated by reference in its entirety herein).

Accordingly, the scene-based image editing system 106 generates the warped digital image 6706 which includes missing pixel values. As such, the scene-based image editing system 106 utilizes the coordinate inpainting generative neural network to generate an inpainted warped digital image.

As mentioned above, the scene-based image editing system 106 generates the inpainted warped digital image. Because the warped digital image 6706 often includes corrupted or missing parts, the scene-based image editing system 106 utilizes the coordinate inpainting generative neural network to generate an inpainted version of the warped digital image 6706. Furthermore, utilizing the inpainted warped digital image, the scene-based image editing system 106 generates via the image appearance encoder 6710 a warped image feature vector. In particular, the warped image appearance encoder extracts features of the inpainted warped digital image and generates the warped image feature vector. Similar to the discussion above, the scene-based image editing system 106 utilizes the inpainted warped digital image to generate the warped pose feature map 6722 and the local appearance vector 6718 and to further generate the modified digital image 6728.

Figure 68:
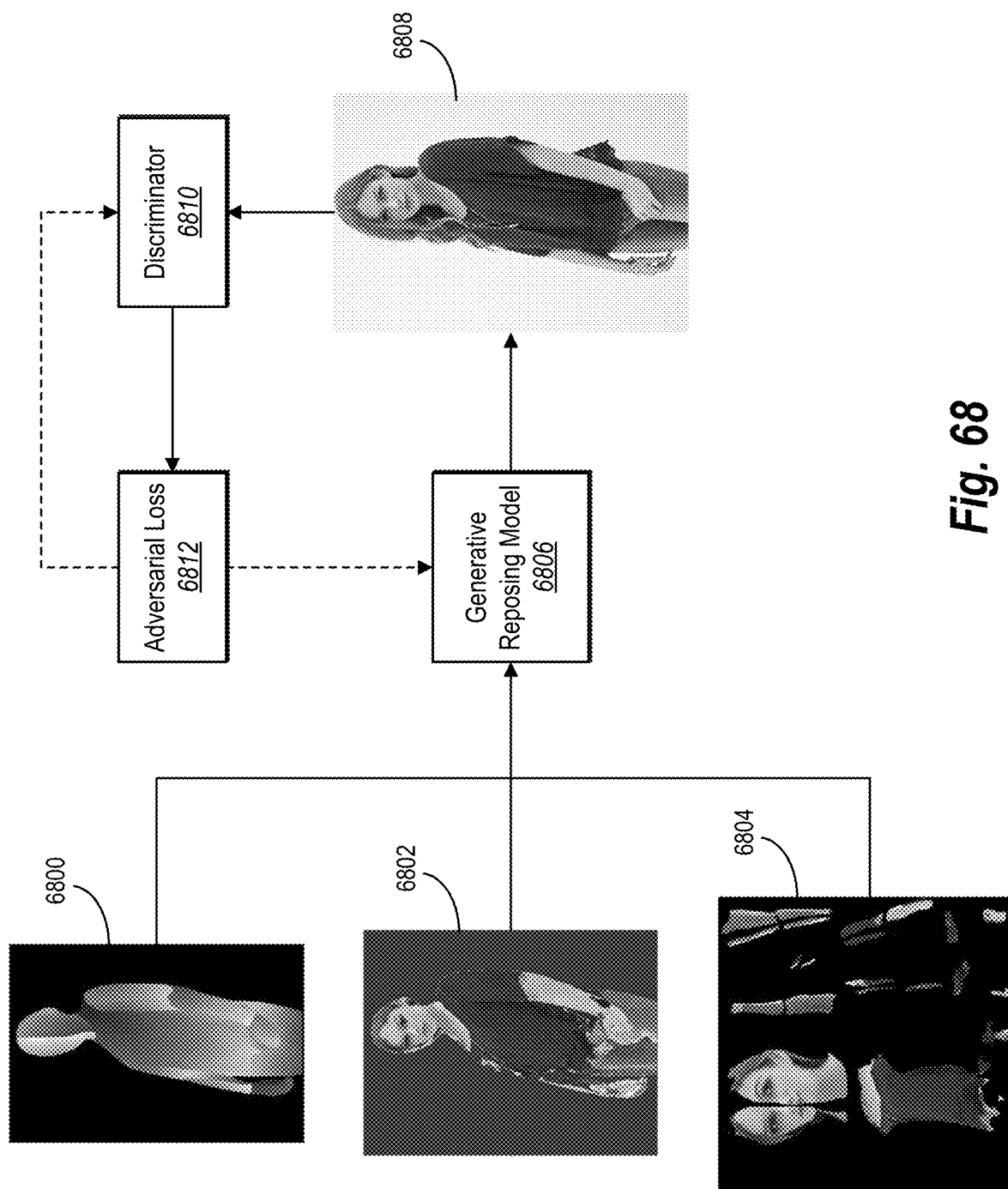
FIG. 68 illustrates an example diagram of the scene-based image editing system training a reposing model in accordance with one or more embodiments.

In addition, FIG. 68 illustrates details of training a generative reposing model (e.g., the reposing GAN 6726 discussed in FIG. 67) in accordance with one or more embodiments. For example, FIG. 68 shows a generative reposing model 6806 generating a modified digital image 6808 from a target pose map 6800, a source digital image 6802, and a texture map 6804. In particular, FIG. 68 illustrates the scene-based image editing system 106 utilizing a discriminator 6810 to process the modified digital image 6808 to generate an authenticity prediction for the modified digital image 6808. Specifically, the discriminator generates an adversarial loss 6812 based on the accuracy of the authenticity prediction (i.e., if the authenticity prediction was correct or incorrect and the image was a real digital image or a generated digital image). As shown, the scene-based image editing system 106 back propagates the determined adversarial loss 6812 either to the discriminator 6810 or to the generative reposing model 6806. Furthermore, back propagation of the adversarial loss 6812 causes the scene-based image editing system 106 to modify parameters of the generative reposing model 6806 and/or the discriminator 6810.

Figure 69:
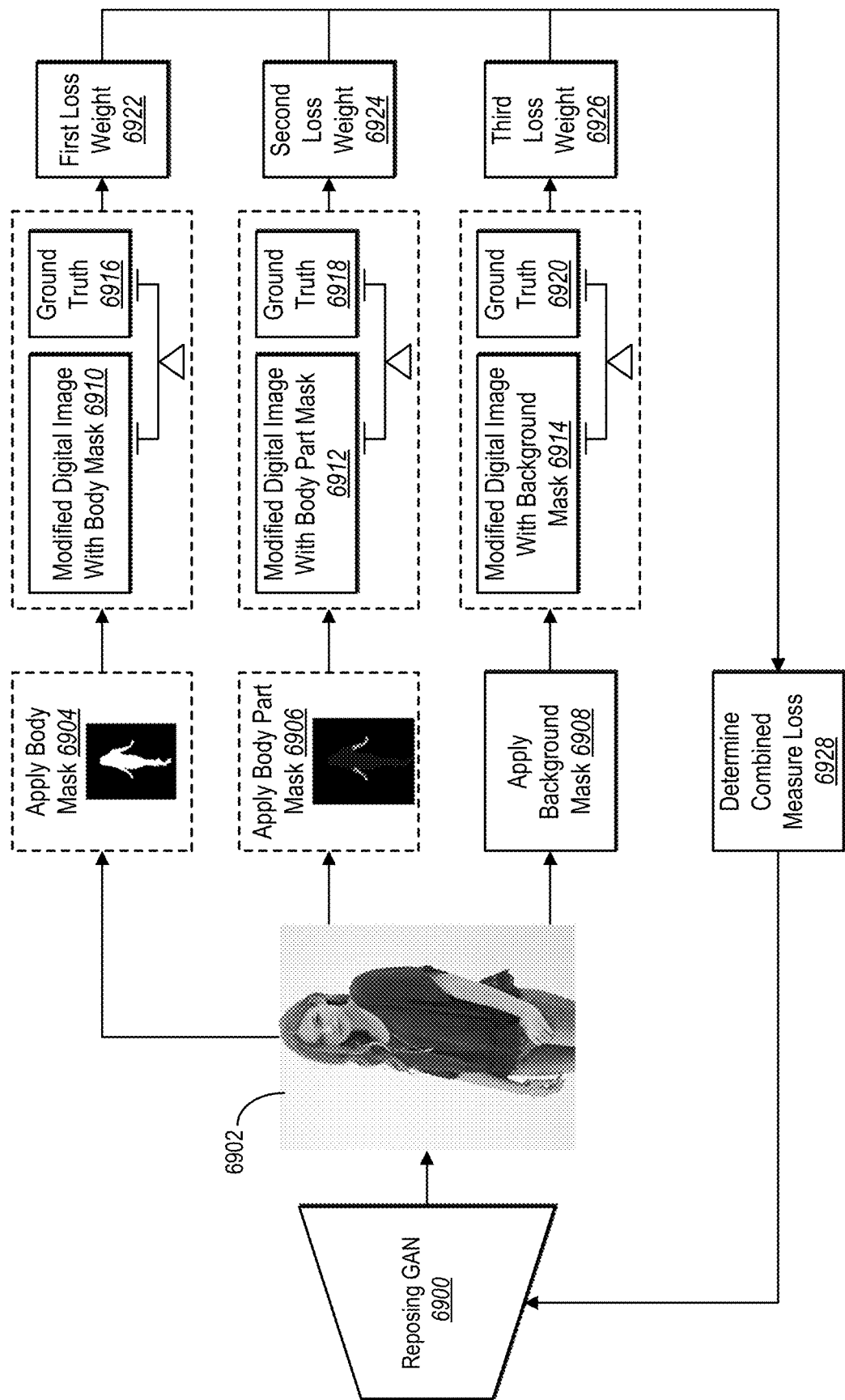
FIG. 69 illustrates an example diagram of the scene-based image editing system training a reposing model by utilizing various masks in accordance with one or more embodiments.

Moreover, FIG. 69 illustrates the scene-based image editing system 106 performing further training of a reposing GAN in accordance with one or more embodiments. For example, FIG. 69 shows details of training a reposing GAN 6900 by applying masks to different portions of the modified digital image 6902 to generate different measures of loss for training the reposing GAN 6900. In particular, FIG. 69 shows the scene-based image editing system 106 utilizing the reposing GAN 6900 to generate the modified digital image 6902. As discussed above, scene-based image editing system 106 can utilize the reposing GAN 6900 to generate the modified digital image 6902 based on a target pose and texture map.

In addition, FIG. 69 illustrates the scene-based image editing system 106 performing a first act 6904 of applying a body mask to the modified digital image 6902. The scene-based image editing system 106 generates the body mask by utilizing a segmentation machine learning model to identify or segment pixels corresponding to an indicated region (e.g., the body portion of the human). FIG. 69 further shows the scene-based image editing system 106 comparing a modified digital image with a body mask 6910 with a ground truth digital image 6916. Based on the comparison, the scene-based image editing system 106 applies a first loss weight 6922.

Further, FIG. 69 illustrates the scene-based image editing system 106 performing a second act 6906 of applying a body part mask to the modified digital image 6902. In particular, the scene-based image editing system 106 generates the body part mask utilizing a segmentation machine learning model to generate pixels corresponding to an indicated body part. In other words, the body part mask includes a sub-portion of the human portrayed within the modified digital image 6902. For instance, the scene-based image editing system 106 generates a body part mask that only applies to the arms (or hands) of the human within the modified digital image 6902. Moreover, similar to the discussion above, the scene-based image editing system 106 also performs a comparison between a modified digital image with a body part mask 6912 with a ground truth digital image 6918. In doing so, the scene-based image editing system 106 applies a second loss weight 6924.

Moreover, FIG. 69 illustrates the scene-based image editing system 106 performing a third act 6908 of applying a background mask to the modified digital image 6902. In particular, the scene-based image editing system 106 generates the background mask utilizing a segmentation machine learning model to generate pixels corresponding to a background portion of the modified digital image 6902. Furthermore, as shown, the scene-based image editing system 106 performs a comparison between a modified digital image with a background mask 6914 and a ground truth digital image 6920 to generate a third loss weight 6926.

As also shown, FIG. 69 illustrates the scene-based image editing system 106 performing an act 6928 of determining a combination of the measured losses. In particular, the scene-based image editing system 106 can combined the measures of loss (e.g., utilizing the first loss weight 6922, the second loss weight 6924, and the third loss weight 6926). Specifically, the scene-based image editing system 106 generates a first weighted loss by applying the first loss weight 6922 to a first measure of loss (generated from the body mask), generates a second weighted loss by applying the second loss weight 6924 to a second measure of loss (generated from the body part mask), and generates a third weighted loss by applying the third loss weight 6926 to a third measure of loss (generated from a background mask). As shown, the scene-based image editing system 106 combines these weighted measures of loss to determine the combined measure of loss. Furthermore, the scene-based image editing system 106 back propagates the determined combined measure of loss to the reposing GAN 6900.

As mentioned above, the scene-based image editing system 106 trains the reposing GAN 6900 utilizing various weights. For example, the scene-based image editing system 106 can apply a weight of 0.1 to the body measure of loss, apply a weight of 0.9 to the body part measure of loss, while applying a weight of 0 for the background measure of loss. The scene-based image editing system 106 can apply a variety of weight combinations (e.g., 1/3, 1/3, 1/3 or 0.5, 0.25, 0.25, or 1, 0, 0).

By applying masks (and weights) during training of the reposing GAN 6900, the scene-based image editing system 106 improves the synthesis quality of the modified digital image 6902. Indeed, the scene-based image editing system 106 can focus training on the body as a whole (e.g., utilizing a body mask), certain sub-parts of the body that are difficult to synthesize (e.g., hands or harms), or other portions of the digital image (e.g., the background). Furthermore, as shown, in one or more embodiments, the scene-based image editing system 106 optionally performs the act 6904 and the act 6906 (e.g., performs different combinations of one or more masks in training). In particular, the scene-based image editing system 106 performs the act of applying a body mask to the modified digital image 6902 and does not perform the act of applying the body part mask to the modified digital image 6902 or vice-versa.

Figure 70:
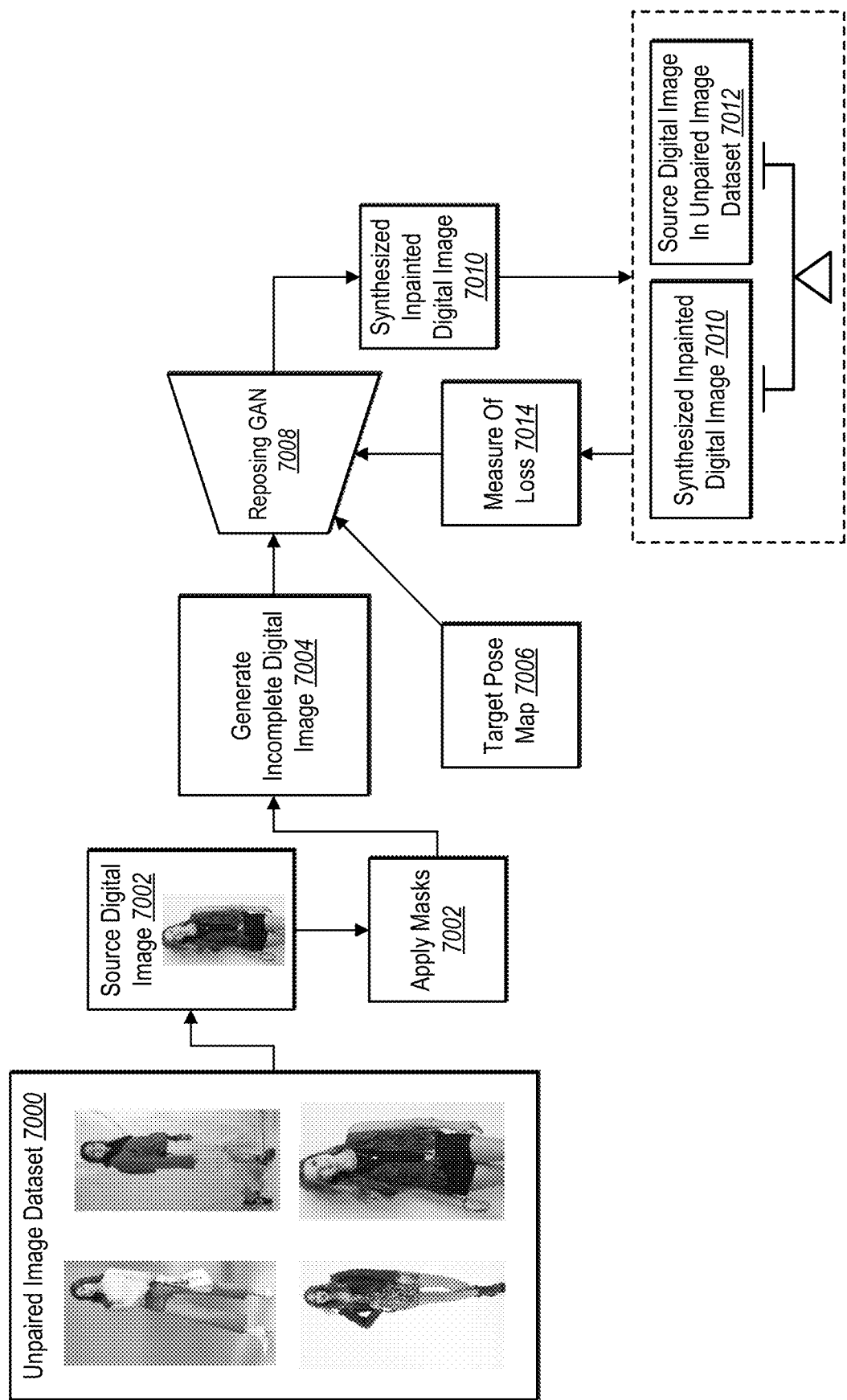
FIG. 70 illustrates an example diagram of the scene-based image editing system training a reposing model with an unpaired image dataset in accordance with one or more embodiments.

In addition to training the reposing GAN 6900 by applying masks, the scene-based image editing system 106 in FIG. 70 illustrates training a reposing GAN with an unpaired image dataset in accordance with one or more embodiments. For example, FIG. 70 shows the scene-based image editing system 106 training a reposing GAN 7008 with incomplete digital images and inpainting the incomplete digital images. For example, the scene-based image editing system 106 utilizes an unpaired image dataset 7000 to train the reposing GAN 7008. In particular, the unpaired image dataset 7000 includes a collection of images with no known ground truth result. For instance, the unpaired image dataset 7000 includes a set for source digital images without known target digital images with known reposing results.

FIG. 70 further shows the scene-based image editing system 106 utilizing a source digital image 7012 from the unpaired image dataset 7000 and performing an act 7002. For example, the act 7002 includes applying masks to the source digital image 7012 of the unpaired image dataset 7000. By applying masks to the source digital image 7012 part of the unpaired image dataset 7000, the scene-based image editing system 106 generates an incomplete digital image 7004. In particular, the incomplete digital image 7004 includes a digital image with a mask obstructing a portion of a human portrayed within a digital image. Specifically, the scene-based image editing system 106 utilizing the incomplete digital image 7004 synthesizes an inpainted digital image from the incomplete digital image 7004 and a target pose map 7006 from the source digital image 7012 (e.g., a pose representation of the source digital image) of the unpaired image dataset 7000.

As shown, FIG. 70 illustrates the scene-based image editing system 106 utilizing the reposing GAN 7008 to generate a synthesized inpainted digital image 7010. For example, FIG. 70 illustrates the scene-based image editing system 106 generating the synthesized inpainted digital image 7010. Because the scene-based image editing system 106 generated the synthesized inpainted digital image 7010 utilizing a target pose map 7006 and an incomplete digital image 7004, the synthesized inpainted digital image 7010 should reflect the source digital image 7012 itself from the unpaired image dataset 7000. Thus, by creating an incomplete digital image and utilizing the pose map 7006 from the source digital image 7012, the scene-based image editing system 106 can use the source digital image 7012 as a pseudo-ground truth, despite the fact that the source digital image 7012 comes from the unpaired image dataset 7000.

Indeed, as shown, the scene-based image editing system 106 compares the synthesized inpainted digital image 7010 and a source digital image 7012 in the unpaired image dataset 7000. In particular, the scene-based image editing system 106 compares the synthesized inpainted digital image 7010 and the source digital image 7012 (e.g., utilizing a loss function) to determine a measure of loss 7014. Furthermore, the scene-based image editing system 106 utilizes the determined measure of loss 7014 (e.g., via back propagation) to modify parameters of the reposing GAN 7008. Similar to above, although not shown in FIG. 70, in one or more embodiments, the scene-based image editing system 106 generates a synthesized inpainted digital image for each digital image that is part of the unpaired image dataset 7000 and determines the measure of loss 7014 by comparing each synthesized inpainted digital image with a corresponding source digital image in the unpaired image dataset 7000.

Although not shown in FIG. 70, in one or more embodiments, the scene-based image editing system 106 determines, utilizing a discriminator neural network, an adversarial loss from the synthesized inpainted digital image 7010. In particular, the scene-based image editing system 106 modifies parameters of the reposing GAN 7008 based on the adversarial loss of the synthesized inpainted digital image 7010 generated from the unpaired image dataset 7000. Furthermore, although not shown in FIG. 70, in one or more embodiments, the scene-based image editing system 106 trains the reposing GAN 7008 with various datasets.

Moreover, in one or more embodiments, the scene-based image editing system 106 utilizes wild image datasets which contains no paired digital images or ground truth digital images for comparison. Furthermore, the scene-based image editing system 106 in some instances utilizes paired digital image datasets which includes ground truth digital images in target poses.

Figure 71:
FIG. 71 illustrates example results of the scene-based image editing system reposing subjects within a digital image in accordance with one or more embodiments.

FIG. 71 illustrates details of the reposing GAN generating modified digital images according to a target pose map in accordance with one or more embodiments. For example, FIG. 71 shows four examples of the scene-based image editing system 106 reposing a source digital image. In particular, FIG. 71 shows a source digital image 7102*a* and a target pose map 7106*a* that results in a modified digital image 7104*a*. For instance, the modified digital image 7104*a* depicts the same human from the source digital image 7102*a* but according to the pose shown in the target pose map 7106*a*. Likewise, source digital images 7102*b*-7102*d* and target pose map 7106*b*-7106*d* also show modified digital images 7104*b*-7104*d* generated according to the corresponding target pose maps 7106*c*, 7106*d* but still showing the human from the source digital images 7102*c*, 7102*d*.

Figure 72A:
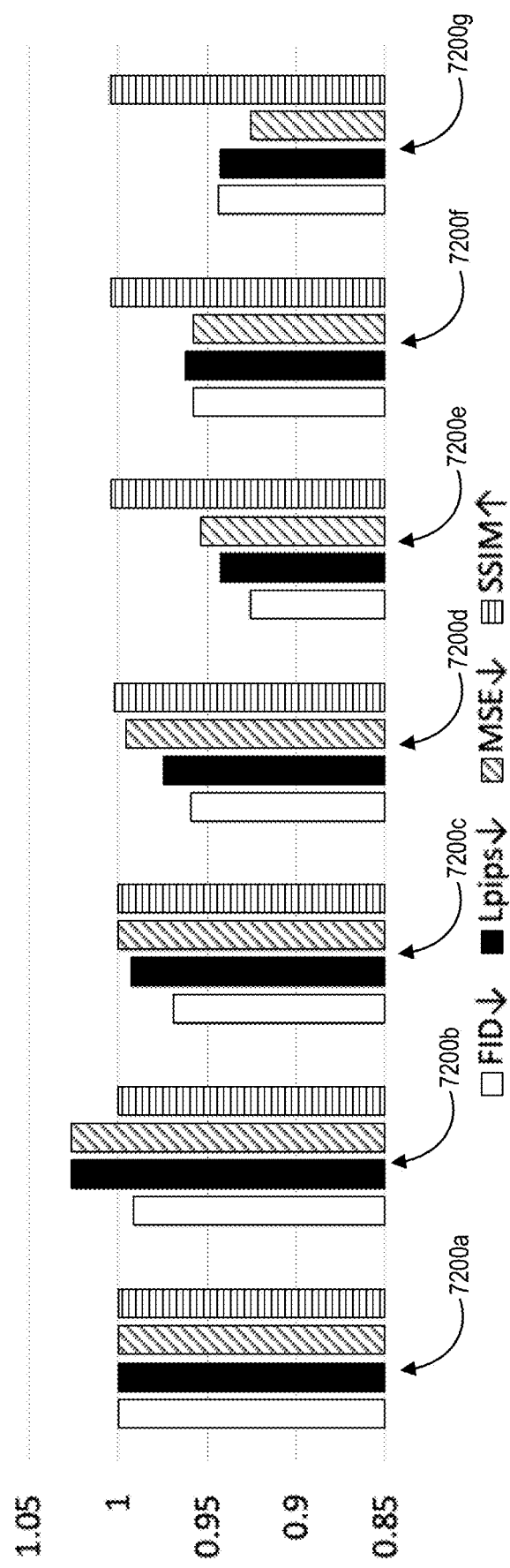
FIGS. 72A-72C illustrate an example charts of the scene-based image editing system performing ablation studies in accordance with one or more embodiments.
Figure 72B:
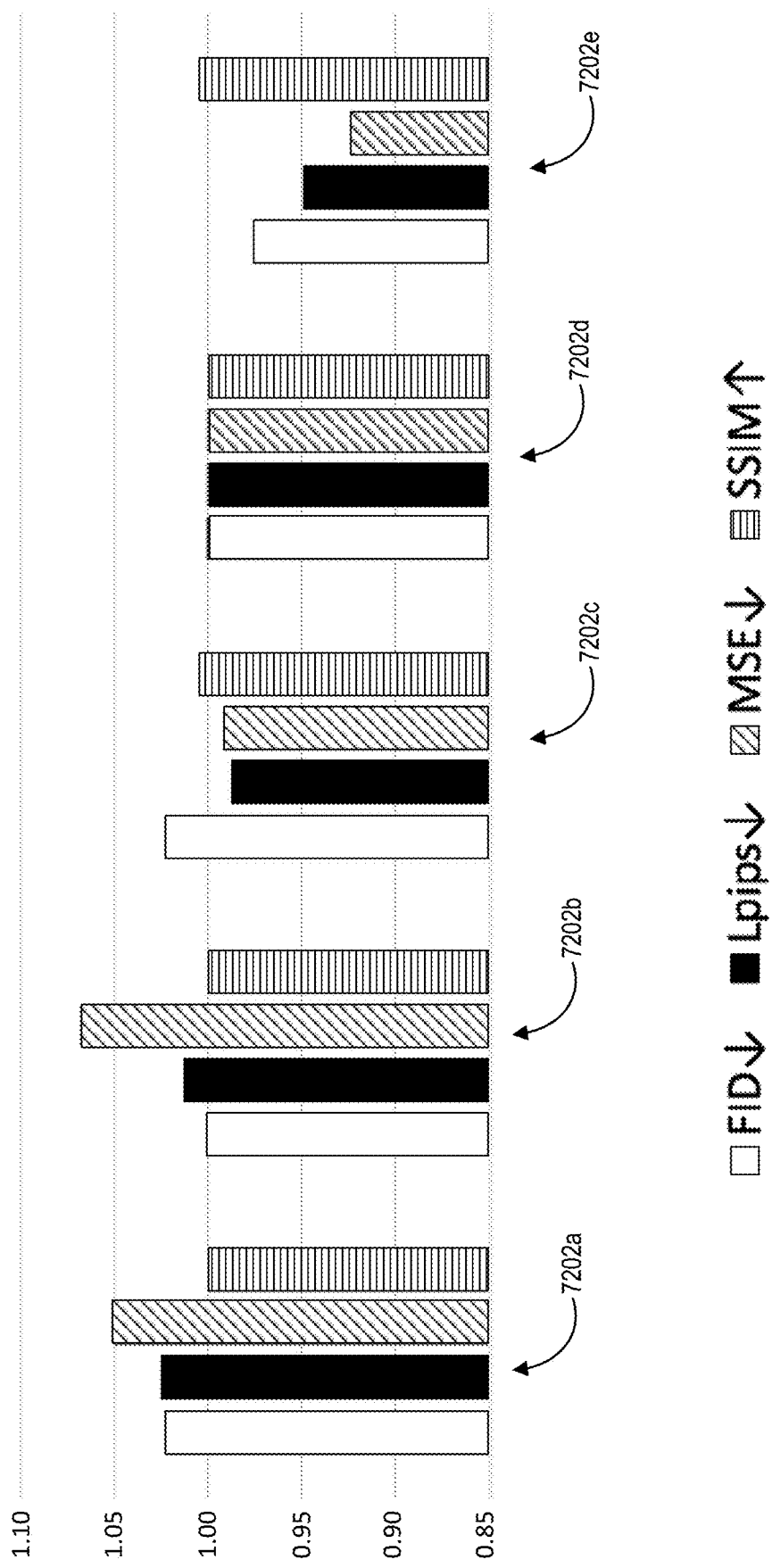
Figure 72C:
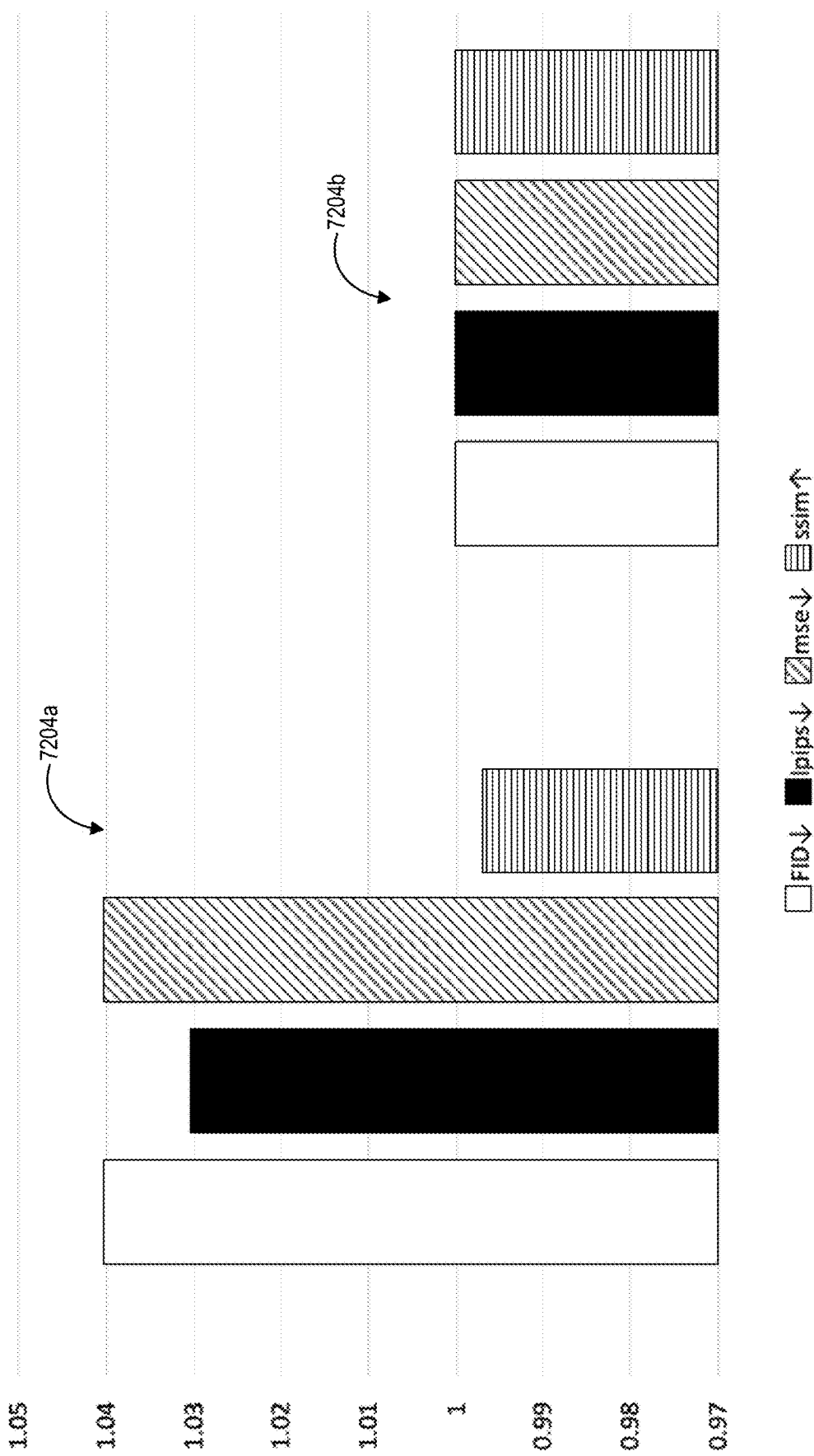

Furthermore, as shown, FIGS. 72A-72C illustrate further details relating to ablation studies in accordance with one or more embodiments. For example, experimenters utilized ablation studies to compare different components such as two-dimensional modulation, digital image warping, coordinate inpainting, VGG normalization, applying masks, and training with unpaired image datasets. In particular, FIG. 72A shows a quantitative comparison with various calculated scores such as Frechet inception distance (FID), learned perceptual image patch similarity (Lpips), mean squared error (MSE), and structural similarity index measure (SSIM). For instance, the FID score assesses the quality of images created by a generative model and a decrease in the FID score indicates a higher quality. The Lpips score evaluates the distance between images and a lower Lpips score indicates similarity between image patches. The mean squared error indicates an average of the square of the errors and the larger the MSE score, the larger the error. Additionally, the SSIM predicts a perceived quality of digital images and measures similarity between two digital images, the higher the SSIM the more similarity between two digital images.

To illustrate, FIG. 72A shows (1) a quantitative comparison between a baseline embodiment 7200a; (2) a two-dimensional modulation with image warping embodiment 7200b; (3) a two-dimensional modulation with image warping and coordinate inpainting embodiment 7200c; (4) a two-dimensional modulation with image warping, coordinate inpainting, and VGG normalization embodiment 7200d; (5) a two-dimensional modulation with image warping, coordinate inpainting, and a body mask embodiment 7200e; (6) two-dimensional modulation with image warping, coordinate inpainting, and an arm mask embodiment 7200f; and (7) two-dimensional modulation with image warping, coordinate inpainting, a body mask, and an unpaired image dataset embodiment 7200g. In particular, FIG. 72A shows for (5), (6), and (7) a higher quality of modified digital images. Specifically, FIG. 72A shows a decrease in the FID, Lpips, and MSE score for (5)-(7) which indicates an increase in quality. Moreover, in comparing (5)-(7), FIG. 72A shows an increase in the SSIM score for (7) with also a lower MSE score. Accordingly, FIG. 72A illustrates various improvements in digital image quality with the inclusion of certain components.

Furthermore, as mentioned FIG. 72B shows more details of an ablation study. For example, FIG. 72B shows a comparison between (1) no warped digital image in the branch for the pose encoder embodiment 7202a; (2) no global texture map appearance vector embodiment 7202b; (3) utilizing a pose map for the image appearance encoder branch embodiment 7202c; (4) two-dimensional modulation with image warping and coordinate inpainting embodiment 7202d; and (5) two-dimensional modulation with image warping, coordinate inpainting, a body mask, and an unpaired image dataset embodiment 7202e. In particular, FIG. 72B illustrates the greatest increases in quality for (5) based on the decreased FID, Lpips, and MSE score and the increased SSIM score.

Moreover, FIG. 72C further illustrates a comparison between masking various portions of a digital image. For example, FIG. 72C shows the various scores for the digital image without masking various portions compared with masking various portions. For instance, the unmasked patches 7204a has higher FID, Lpips, and MSE scores than the masked patches 7204b. Additionally, the masked patches 7204b has a higher SSIM score than the unmasked patches 7204a. Accordingly, FIG. 72C illustrates the improvement in quality in training the reposing GAN based on masking the modified digital image to determine a measure of loss.

In one or more embodiments, the scene-based image editing system 106 intelligently utilizes the features discussed in FIGS. 63-72C to perform reposing of subjects portrayed within digital images. For example, the scene-based image editing system 106 provides intelligent modifications and recommendations to a user of a client device. In particular, the scene-based image editing system 106 receives an upload of a digital image portraying a human in addition to an existing digital image being editing in an image editing application. For instance, in response to receiving an upload of a digital image, the scene-based image editing system 106 intelligently detects humans portrayed within the uploaded digital image relative to humans portrayed within existing digital images. Moreover, in detecting a pose of the humans portrayed within the uploaded digital image relative to the existing digital image, the scene-based image editing system 106 intelligently reposes the human within the uploaded digital image. Accordingly, the scene-based image editing system 106 intelligently adjusts the human pose in an uploaded digital image relative to an existing digital image being edited.

Further, in other embodiments, the scene-based image editing system 106 receives an upload of a digital image, detects the uploaded digital image portrays a human and makes intelligent recommendations. For example, the scene-based image editing system 106 provides alternative pose options for the human within the digital image and provides the options to a user of a client device. In particular, the scene-based image editing system 106 indicates to a user of a client device possible options for reposing a human portrayed within an uploaded digital image. Accordingly, the scene-based image editing system 106 can make intelligent adjustments and/or recommendations in real-time or near real-time to a user of a client device (e.g., seconds).

The scene-based image editing system 106 can also match a target pose in generating a composite digital image. For example, consider an initial digital image portraying a human with closed eyes or awkward facial expression. The scene-based image editing system 106 can extract a representation of the human from a second digital image and repose the representation from the second digital image to align to the target pose of the source digital image. The scene-based image editing system 106 can then generate a composite image by adding the modified representation to the initial image.

The scene-based image editing system 106 can also provide a variety of user interfaces for modifying poses. For example, the scene-based image editing system 106 can provide a user interface with a selectable option for selecting a source image. The scene-based image editing system 106 can also provide selectable options for selecting or creating a target pose. For instance, the scene-based image editing system 106 can provide a user interface element for uploading a target image with a target pose.

Similarly, the scene-based image editing system 106 can provide an interactive pose element (e.g., as an overlay to a human in a digital image) that allows a client device to modify the pose element and create a target pose. For instance, the scene-based image editing system 106 can receive a user interaction moving a member or joint to a new location, rotating a pose representation, or making another modification to the interactive pose element. The scene-based image editing system 106 can utilize the user interaction to determine a target pose and generate a modified digital image according to the target pose.

As also briefly mentioned above, in one or more embodiments the scene-based image editing system 106 generates modified digital images by transferring facial expression and pose or animating a static digital image. For example, the scene-based image editing system 106 transfers a facial expression and a pose from a target digital image to a source digital image. In particular, the scene-based image editing system 106 utilizes the face of a human portrayed within the source digital image and modifies the face and pose to match a different facial expression and a different pose. For instance, the scene-based image editing system 106, in one or more embodiments, generates various embeddings (e.g., target facial expression embedding, source shape embedding, and target pose embedding) to utilize within an end-to-end network for generating a modified source digital image.

Further, in one or more embodiments, the scene-based image editing system 106 animates a static source digital image. For example, the scene-based image editing system

106 performs facial animation by animating a static source digital image according to a target digital video. In particular, the scene-based image editing system 106 extracts various embeddings from a target digital video and generates an animation that portrays a source face from the source digital image. Moreover, in some embodiments, the scene-based image editing system 106 utilizes a diffusion neural network to generate the animation that portrays the source face. Additionally, the scene-based image editing system 106 accurately and efficiently performs both the facial expression transfer and the facial animation for a variety of races and ethnicities without a drop-off in quality.

Furthermore, in one or more embodiments, the scene-based image editing system 106 provides to a user of a client device via a user interface a variety of intuitive options for performing facial expression and/or pose transfer and animation. For example, the scene-based image editing system 106 provides via a user interface of a client device a variety of selectable element options such as selecting a source digital image and/or a target digital image. In particular, the scene-based image editing system 106 provides the selectable elements for a user of a client device to upload various images to transfer facial expressions and/or pose or animate static digital images. Additionally, the scene-based image editing system 106 also provides pre-defined elements. For instance, pre-defined elements include already defined target facial expressions (e.g., happy, sad, smile, cry, angry, etc.). In doing so, the scene-based image editing system 106 can receive from a user of a client device a selection of a pre-defined target facial expression or pose to utilize for transferring a facial expression and/or pose, or animating a static source digital image.

Figure 73:
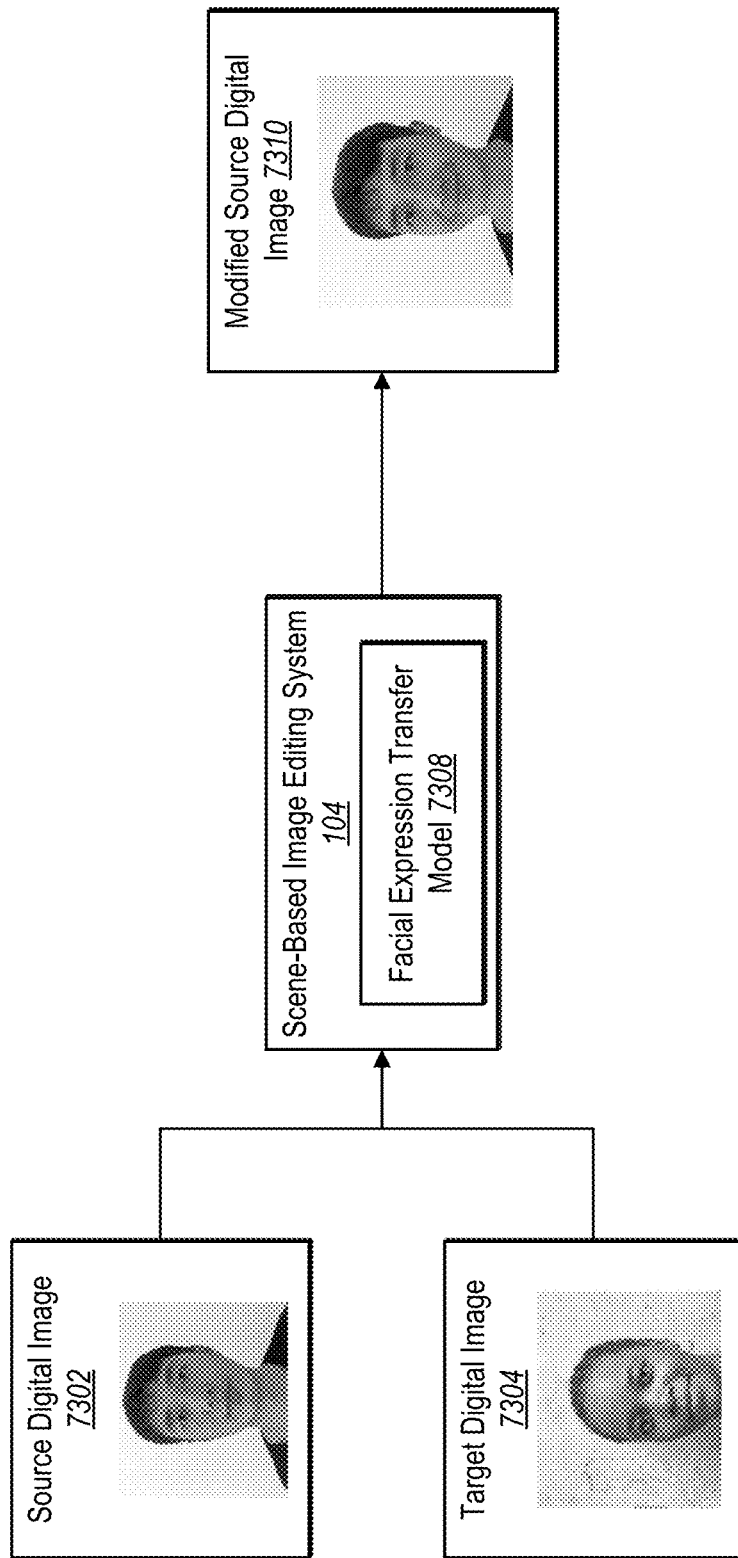
FIG. 73 illustrates an overview diagram of the scene-based image editing system performing facial expression transfer in accordance with one or more embodiments.

As mentioned above, in some embodiments the scene-based image editing system 106 generates a modified source digital image utilizing a facial expression transfer model in accordance with one or more embodiments. For example, FIG. 73 illustrates the scene-based image editing system 106 utilizing a facial expression transfer model 7308 to generate a modified source digital image 7310 from a source digital image 7302 and a target digital image 7304. In particular, FIG. 73 shows the scene-based image editing system 106 processing the modified source digital image 7310 with the facial expression transfer model 7308.

For example, the scene-based image editing system 106 utilizes the source digital image 7302 for facial expression transfer as a starting reference point for modification. In particular, the scene-based image editing system 106 utilizes the source digital image 7302 as the digital image to be modified by the target digital image 7304. Moreover, the scene-based image editing system 106 can receive the source digital image 7302 from a variety of sources, such as a camera roll of a client device, upload from a client device, or a cloud repository of digital images.

Furthermore, FIG. 73 shows the scene-based image editing system 106 also utilizing the target digital image 7304. For example, the target digital image 7304 includes a digital image with a portrayal of a human face. Specifically, as mentioned above, the target digital image includes a human with a target facial expression. Moreover, the scene-based image editing system 106 utilizes the target digital image 7304 to guide the modification of the source digital image 7302. Additionally, the scene-based image editing system 106 can receive the target digital image 7304 from a variety of sources, including from a camera roll of a client device, as an upload from a client device, or via a cloud repository of digital images.

Additionally, as mentioned, the scene-based image editing system 106 utilizes the facial expression transfer model 7308 to process the source digital image 7302 and the target digital image 7304 and generate the modified source digital image 7310. For example, the modified source digital image 7310 includes one or more pixel values that differ from the source digital image 7302. In particular, the scene-based image editing system 106 via the facial expression transfer model 7308 modifies pixels relating to the facial expression portrayed within the source digital image 7302 according to the target digital image 7304. More details relating to the facial expression transfer model 7308 is given below.

Conventional systems have leveraged recent computing advancements to modify digital images utilizing a variety of digital tools and models. To illustrate, conventional systems utilize computer-implemented models to generate digital images with various facial expressions. Despite these advancements, however, conventional systems continue to suffer from a number of technical deficiencies, particularly with regard to accuracy and efficiency in generating digital images with modified facial expressions.

For instance, to generate modified digital images with various facial expressions, conventional systems utilize models that fail to accurately capture the nuance and detail of a facial expression and realistically transfer that facial expression to another digital image. In particular, conventional systems render various intermediate digital images for utilization in transferring a facial expression from one digital image to another. Moreover, conventional systems often require a large number of user interactions and user interfaces for transferring facial expressions.

As mentioned above, the scene-based image editing system 106 can improve upon accuracy of conventional systems. For example, in one or more implementations the scene-based image editing system 106 improves upon the accuracy of conventional systems by generating embeddings and utilizing the generated embeddings to further generate a modified source digital image. In particular, in some embodiments, the scene-based image editing system 106 generates a target facial expression embedding and a source shape embedding. Further, the scene-based image editing system 106 generates a modified source digital image that portrays a target facial expression from the target digital image 7304 by conditioning layers of the facial expression transfer model 7308 with the target facial expression embedding and the source shape embedding.

For instance, the scene-based image editing system 106, unlike conventional systems, can directly utilize generated embeddings for further generating the modified source digital image 7310. Specifically, the scene-based image editing system 106 need not render intermediate digital images to aid in facial expression transfer. In one or more implementations, the scene-based image editing system 106 utilizes an end-to-end network to generate embeddings and utilize the embeddings to further generate the modified source digital image 7310. Moreover, the scene-based image editing system 106 can utilize a combination of various embeddings such as the facial expression embedding, the target pose embedding, and the source shape embedding to condition layers of the facial expression transfer model 7308. The combined embedding further improves upon accuracy in generating modified source digital images.

Furthermore, in some implementations the scene-based image editing system 106 improves upon accuracy of conventional systems by generating an animation that portrays a source face from a source digital image. In particular, the scene-based image editing system 106 extracts various embeddings (e.g., the target facial expression animation embeddings from a target digital video) and generates the animation from the embeddings. Similar to the facial expression transfer, the scene-based image editing system 106 generates the animation utilizing an end-to-end network without rendering intermediate digital images. In doing so, the scene-based image editing system 106 increases the quality and nuance of animations.

In addition to the accuracy improvements, the scene-based image editing system 106 can also improve upon efficiency and functionality. In particular, the scene-based image editing system 106 can provide a user interface to select a source digital image and a target digital image/video for generating modified digital images or animations. For instance, the scene-based image editing system 106 can provide efficient user interface implementations that reduce excessive user interactions and user interfaces while providing improved functionality and flexibility in generating modified digital images or animations from source content.

As mentioned above, FIG. 74 describes the scene-based image editing system 106 generating various embeddings in accordance with one or more embodiments. For example, FIG. 74 shows the scene-based image editing system 106 utilizing a three-dimensional encoder 7404 to process a source digital image 7402 and a three-dimensional encoder 7410 to process a target digital image 7408.

Figure 74:
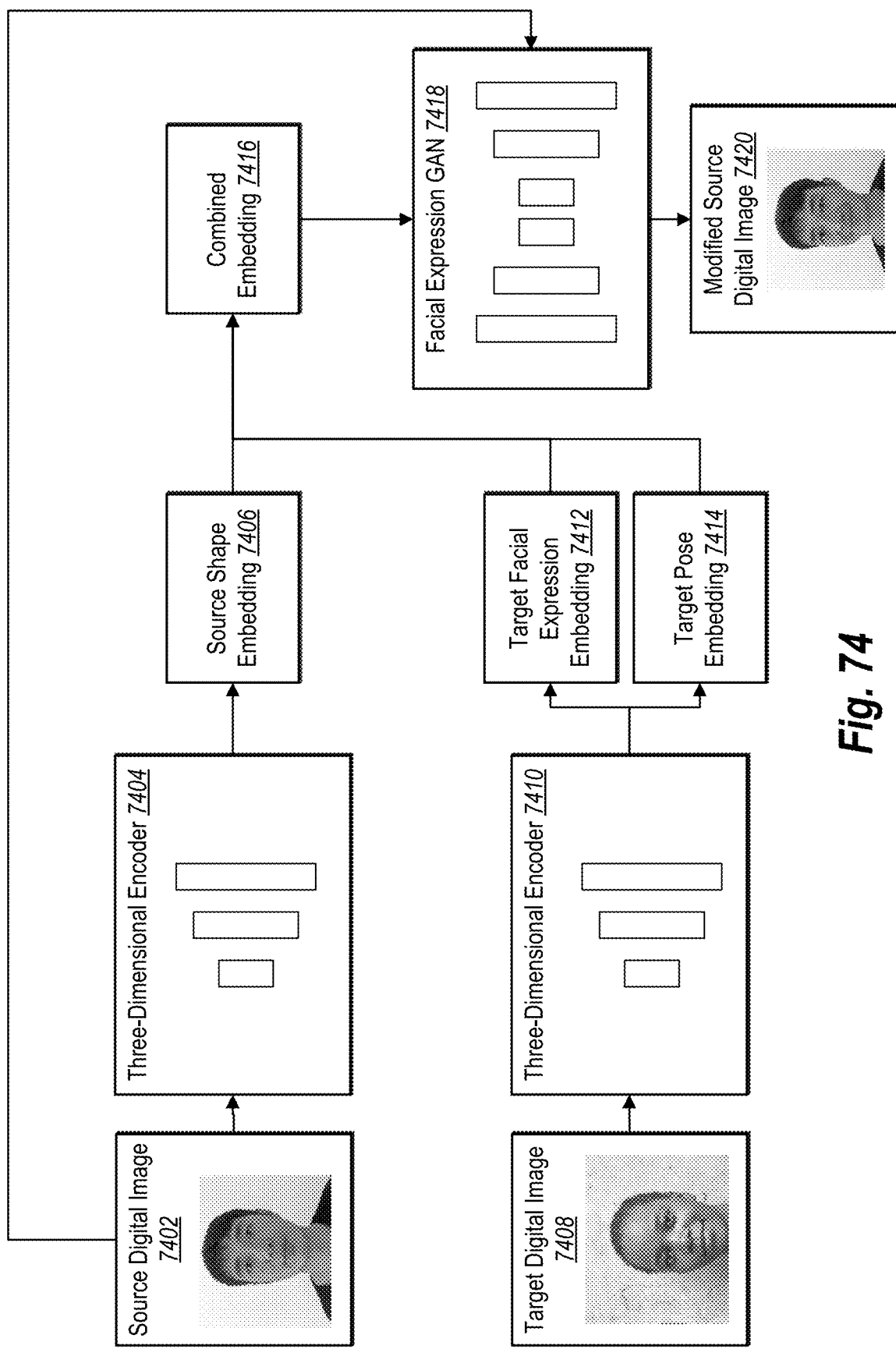
FIG. 74 illustrates an example diagram of the scene-based image editing system generating a combined embedding for generating a modified source digital image in accordance with one or more embodiments.

In relation to FIG. 74, the target digital image 7408 portrays a face having a target facial expression. In particular, a face includes a digital image portraying a front part of a human head. For instance, the face within the digital image includes features such as eyes, nose, mouth, checks. Furthermore, the target facial expression includes a driving facial expression (e.g., an arrangement of facial features that combine to form a particular expression) that guides the generation of a modified source digital image 7420. For instance, the image editing system 104 utilizes the target facial expression to modify a facial expression in another digital image. Specifically, the scene-based image editing system 106 guides the modification of the source digital image 7402 portraying a source facial expression with the target facial expression.

Moreover, the source digital image 7402 includes a source pose and a source facial expression. In particular, the source pose includes a position, or an arrangement of a person or face portrayed within the source digital image 7402. Specifically, the source pose includes the position or arrangement of the person's face portrayed within the source digital image 7402. Furthermore, the source facial expression includes the facial expression shown in the original digital image (e.g., the source digital image 7402) for modification by the target facial expression. For instance, the source facial expression includes an expression of the human face (e.g., a combination of facial elements with particular arrangements or features) shown in the source digital image 7402. Furthermore, the scene-based image editing system 106 extracts the source facial expression of the source digital image 7402 to modify the source facial expression by the target facial expression.

As shown, the scene-based image editing system 106 utilizes the three-dimensional encoder 7404 and the three-dimensional encoder 7410. In particular, the three-dimensional encoders extract features from a digital image. For instance, the scene-based image editing system 106 utilizes the three-dimensional encoders to process the source digital image 7402 and/or the target digital image 7408. Furthermore, the three-dimensional encoders map the image pixels to a higher-dimensional vector representation (e.g., an embedding) to capture features portrayed within the source digital image 7402 and the target digital image 7408.

As further shown, the scene-based image editing system 106 utilizes the three-dimensional encoder 7404 to generate a source shape embedding 7406. For example, the scene-based image editing system 106 generates the source shape embedding 7406 from the source digital image 7402. In particular, the scene-based image editing system 106 extracts features from the source digital image 7402 relating to the shape of the face and human portrayed within the source digital image 7402 to generate the source shape embedding 7406.

In addition, FIG. 74 also shows the scene-based image editing system 106 utilizing the three-dimensional encoder 7410 to generate a target facial expression embedding 7412 and a target pose embedding 7414. For example, the scene-based image editing system 106 generates the target facial expression embedding 7412 from the target digital image 7408. In particular, the scene-based image editing system 106 utilizes the three-dimensional encoder 7410 to process the target digital image 7408 and extract features relating to the target facial expression. In this manner, the three-dimensional encoder 7410 generates the target facial expression embedding 7412.

The scene-based image editing system 106 can utilize a variety of three-dimensional machine learning models. In one or more embodiments, the scene-based image editing system 106 utilizes one or more three-dimensional morphable models (e.g., to generate 3D morphable model parameters). For instance, in some implementations, the scene-based image editing system 106 utilizes a 3D morphable model, as described by V. Blanz and T. Vetter in A Morphable Model for the Synthesis of 3D Faces, SIGGRAPH '99 (187-194) or by J. Booth, A. Roussos, E. Ververas, E. Antonakos, S. Ploumpis, Y. Panagakis, and S. Zafeiriou in Lage Scale 3D Morphable Models, Int. J. Comput. Vision, 126 (2-4): 233-254 (2018), which are incorporated by reference herein in their entirety. In some embodiments, the scene-based image editing system 106 utilizes detailed expression capture and animation model (e.g., DECA) as described by Yao Feng, Haiwen Feng, Michael J. Black, Timo Bolkar in Learning an Animatable Detailed 3D Face Model from In-The-Wild Images, arXiv: 2012.04012v2, which is incorporated by reference herein in its entirety.

As mentioned, FIG. 74 also shows the scene-based image editing system 106 generating the target pose embedding 7414. For example, as just mentioned, the target facial expression embedding 7412 includes target facial expression features. Likewise, for generating the target pose embedding 7414, the scene-based image editing system 106 extracts pose features. In particular, the scene-based image editing system 106 extracts pose features from the target digital image 7408. For instance, the pose features include position and/or arrangement of the human or the human's face in the target digital image 7408. Moreover, the scene-based image editing system 106 utilizes the extracted features via the three-dimensional encoder 7410 to generate the target pose embedding 7414.

As also mentioned previously, the scene-based image editing system 106 generates a combined embedding. For example, FIG. 74 shows the scene-based image editing system 106 generating a combined embedding 7416. In particular, the combined embedding 7416 includes combining one or more embedding such as the target facial expression embedding 7412 and the source shape embedding 7406. Furthermore, in other embodiments, the combined embedding includes combining the target facial expression embedding 7412, the target pose embedding 7414, and the source shape embedding 7406. The scene-based image editing system 106 can combine these embeddings in a variety of ways (e.g., add, multiply, etc.). In one or more embodiments, the scene-based image editing system 106 concatenates embeddings to generate the combined embedding 7416.

FIG. 74 further illustrates the scene-based image editing system 106 utilizing a facial expression GAN 7418 to process the combined embedding 7416. For example, the scene-based image editing system 106 generates a modified source digital image 7420 utilizing the facial expression GAN 7418. As previously discussed, the image editing system 104 utilizes generative models. In one or more embodiments, the image editing system 104 utilizes the facial expression GAN 7418 to process the combined embedding 7416 and the source digital image 7402 to generate the modified source digital image 7420. For instance, the scene-based image editing system 106 conditions layers of the facial expression GAN 7418 with the combined embedding 7416. In particular, in one or more embodiments, the scene-based image editing system 106 utilizes a CoModGAN implementation of the facial expression GAN 7418 to process the combined embedding 7416 and the source digital image 7402 to generate the modified source digital image 7420. For instance, the scene-based image editing system 106 can utilize a CoModGAN architecture as described in Shengyu Zhao, Jonathan Cui, Yilun Sheng, Yue Dong, Xiao Liang, Eric I Chang, and Yan Xu, in Large scale image completion via co-modulated generative adversarial networks, arXiv preprint arXiv: 2103.10428 (2021) which is incorporated by reference in its entirety herein. Furthermore, in one or more embodiments the scene-based image editing system 106 can utilize an architecture as described in GENERATING MODIFIED DIGITAL IMAGES VIA IMAGE INPAINTING USING MULTI-GUIDED PATCH MATCH AND INTELLIGENT CURATION, patent application Ser. No. 17/661,985, filed May 25, 2022, which is incorporated by reference in its entirety herein.

Furthermore, although not shown in FIG. 74, in one or more embodiments, the scene-based image editing system 106 performs an eye alignment calculation. For example, the scene-based image editing system 106 performs an eye alignment calculation prior to processing the source digital image 7402 and the target digital image 7408 with the three-dimensional encoders. In particular, the scene-based image editing system 106 detects facial keypoints from the target digital image 7408 and centers the eyes portrayed within the source digital image 7402 according to the detected facial keypoints. After the scene-based image editing system 106 centers the eyes in the source digital image 7402, the scene-based image editing system 106 then proceeds to process the source digital image 7402.

Although FIG. 74 shows the scene-based image editing system 106 generating a single embedding for each embedding type (e.g., the source shape embedding 7406, the target facial expression embedding 7412, and the target pose embedding 7414), in one or more embodiments, the scene-based image editing system 106 utilizes the three-dimensional encoders to generate embeddings for each resolution (e.g., convolutional layer) of the source digital image 7402 and the target digital image 7408. In particular, the scene-based image editing system 106 generates for a first resolution (corresponding to a convolutional layer) a first source shape embedding, a first target facial expression embedding and a first target pose embedding. Further, the scene-based image editing system 106 combines the first source shape embedding, the first target facial expression embedding and the first target pose embedding to generate a first combined embedding corresponding to the first resolution.

To further illustrate, for a second resolution (corresponding to a convolutional layer), the scene-based image editing system 106 generates a second source shape embedding, a second target facial expression embedding, and a second target pose embedding (corresponding to the second resolution). Likewise, the scene-based image editing system 106 combines the second source shape embedding, the second target facial expression embedding and the second target pose embedding to generate a second combined embedding corresponding to the second resolution. With each of the combined embeddings (the first combined embedding and the second combined embedding) the scene-based image editing system 106 utilizes the facial expression GAN 7418 to process the source digital image 7402 and conditions layers of the facial expression GAN 7418 (having matching resolutions) with the combined embeddings.

Moreover, although FIG. 74 shows the scene-based image editing system 106 utilizing separate three-dimensional encoders to generate the various embeddings, in one or more embodiments the scene-based image editing system 106 utilizes the same three-dimensional encoder. In particular, the scene-based image editing system 106 utilizes a single three-dimensional encoder to generate the source shape embedding 7406, the target facial expression embedding 7412, and the target pose embedding 7414.

Figure 75:
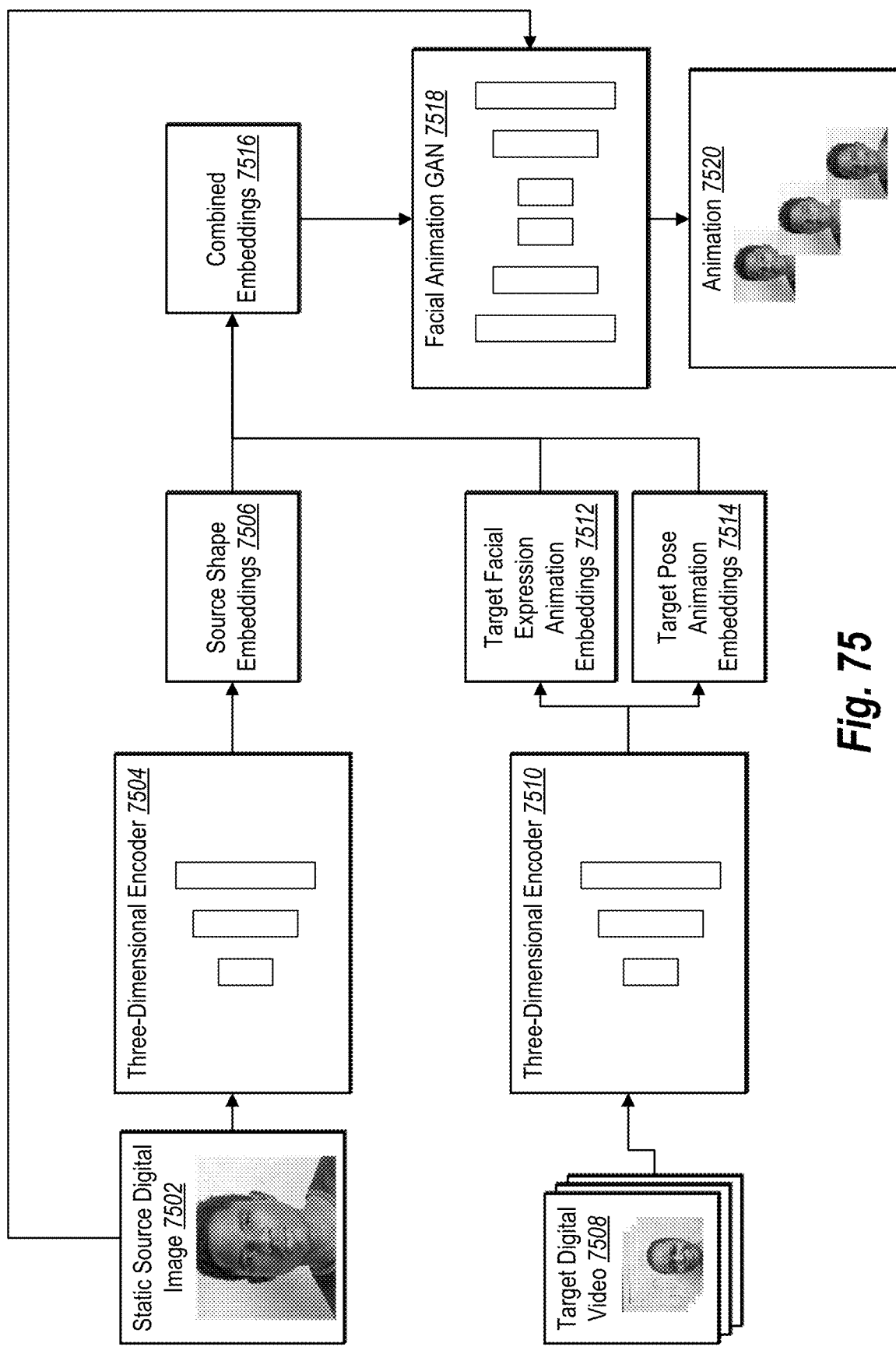
FIG. 75 illustrates an example diagram of the scene-based image editing system generating combined embeddings to generate an animation in accordance with one or more embodiments.

As mentioned above, the scene-based image editing system 106 also generates animations of a face portrayed within a static source digital image in accordance with one or more embodiments. For example, FIG. 75 shows the scene-based image editing system 106 generating an animation 7520 of a face portrayed within a static source digital image 7502. In particular, FIG. 75 shows the scene-based image editing system 106 utilizing a three-dimensional encoder 7504 to process the static source digital image 7502. For instance, the scene-based image editing system 106 identifies the static source digital image 7502 which includes a non-animated digital image. Moreover, the scene-based image editing system 106 utilizes the static source digital image 7502 as a starting point and modifies the static source digital image 7502 with a target digital video 7508.

As previously discussed, in one or more embodiments the scene-based image editing system 106 generates a source shape embedding by processing a static source digital image. FIG. 75 illustrates the scene-based image editing system 106 utilizing the three-dimensional encoder 7504 to generate source shape embeddings 7506. In particular, FIG. 75 shows the scene-based image editing system 106 generating multiple source shape embeddings because the scene-based image editing system 106 generates a source shape embedding for each resolution of the static source digital image 7502. Thus, FIG. 75 illustrates the scene-based image editing system 106 generating the source shape embeddings 7506 (which covers each embedding for convolutional layers that correspond with a different resolution of the static source digital image 7502).

Furthermore, FIG. 75 illustrates the scene-based image editing system 106 utilizing the three-dimensional encoder 7510 to process a target digital video 7508. For example, the target digital video 7508 includes multiple digital image frames. In particular, the target digital video 7508 includes multiple digital image frames that portray a target animation of a face. Moreover, FIG. 75 shows the three-dimensional encoder 7510 generating target facial expression animation embeddings 7512 and target pose animation embeddings 7514 from frames of the target digital video 7508.

In contrast to FIG. 74, FIG. 75 shows the scene-based image editing system 106 generating the target facial expression animation embeddings 7512. For example, generating the target facial expression animation embeddings 7512 includes extracting animation features from the target digital video 7508. In particular, the scene-based image editing system 106 utilizes the three-dimensional encoder 7510 to extract features from various frames of the target digital video 7508 relating to facial expression animation. Moreover, after extracting the target facial expression features, the three-dimensional encoder 7510 generates the target facial expression animation embeddings 7512 that correspond with each frame of the target digital video 7508. In addition, as mentioned above, for each frame, the three-dimensional encoder 7510 also generates embeddings at different resolution corresponding to different layers of the facial expression GAN 7418.

For example, as mentioned, the image editing system 104 also generates target pose animation embeddings 7514. In particular, generating target pose animation embeddings 7514 include the scene-based image editing system 106 extracting pose animation information from the target digital video 7508. For instance, the target pose animation embeddings 7514 include extracting information such as the arrangement and/or position of a human portrayed within the target digital video 7508. Furthermore, the scene-based image editing system 106 generates utilizing the three-dimensional encoder 7510 the target pose animation embeddings 7514 based on the extracted pose animation information.

As mentioned above, the scene-based image editing system 106 generates multiple target facial expression animation embeddings, multiple target pose animation embeddings, and multiple source shape embeddings. For example, the scene-based image editing system 106 utilizes the three-dimensional encoder 7504 to generate a first source shape embedding corresponding with a first resolution of the static source digital image 7502. Moreover, the scene-based image editing system 106 then utilizes the three-dimensional encoder 7504 to generate a second source shape embedding corresponding with a second resolution of the static source digital image 7502. Specifically, the scene-based image editing system 106 iteratively repeats the process for each resolution of the static source digital image 7502. In doing so, the scene-based image editing system 106 generates the source shape embeddings 7506.

Furthermore, the scene-based image editing system 106 utilizes the three-dimensional encoder 7510 to process a first frame of the target digital video 7508 and generate a first target facial expression animation embedding and a first target pose animation embedding corresponding to a first resolution of the first frame. Moreover, the scene-based image editing system 106 further utilizes the three-dimensional encoder 7510 to generate a second target facial expression animation embedding and a second target pose animation embedding corresponding to a second resolution of the first frame. Furthermore, for a second frame of the target digital video 7508, the scene-based image editing system 106 generates a third target facial expression animation embedding and a third target pose animation embedding corresponding to a first resolution of the second frame. As mentioned, the scene-based image editing system 106 iteratively repeats this process for each frame of the target digital video 7508 and each resolution of each frame. Accordingly, the scene-based image editing system 106 generates the target facial expression animation embeddings 7512 and the target pose animation embeddings 7514.

Moreover, as shown, the scene-based image editing system 106 generates combined embeddings 7516. In particular, the scene-based image editing system 106 combines the source shape embeddings 7506, the target facial expression animation embeddings 7512, and the target pose animation embeddings 7514. Further, the scene-based image editing system 106 utilizes the facial animation GAN 7518 to process the combined embeddings 7516. Moreover, the scene-based image editing system 106 utilizes the facial animation GAN 7518 to generate an animation 7520. For instance, the animation portrays the source face from the static source digital image 7502 according to the target animation from the target digital video 7508. In one or more embodiments, the scene-based image editing system 106 implements the architecture of CoModGAN (or another GAN described herein) as the facial animation GAN 7518. In some embodiments, the scene-based image editing system 106 implements the architecture of a diffusion neural network as the facial animation GAN 7518.

Although FIG. 75 shows the scene-based image editing system 106 generating source shape embeddings 7506, target facial expression animation embeddings 7512 and target pose animation embeddings 7514, in one or more embodiments, the scene-based image editing system 106 does not utilize all the embeddings to generate the combined embeddings 7516. In particular, similar to the discussion in FIG. 74, the scene-based image editing system 106 generates the combined embeddings 7516 from the source shape embeddings 7506 and the target facial expression animation embeddings. Moreover, the scene-based image editing system 106 conditions layers of the facial animation GAN 7518 with the combined embeddings 7516. Furthermore, although FIGS. 74 and 75 shows the scene-based image editing system 106 utilizing a source digital image and/or a target digital video or a target digital image, in one or more embodiments, the scene-based image editing system 106 utilizes a source digital video. In particular, the scene-based image editing system 106 utilizes a source digital video in combination with either a target digital image or a target digital video. In doing so, the scene-based image editing system 106 generates a modified source digital video by modifying individual frames of the source digital video according to individual frames of a target digital image, or a target digital video.

Figure 76:
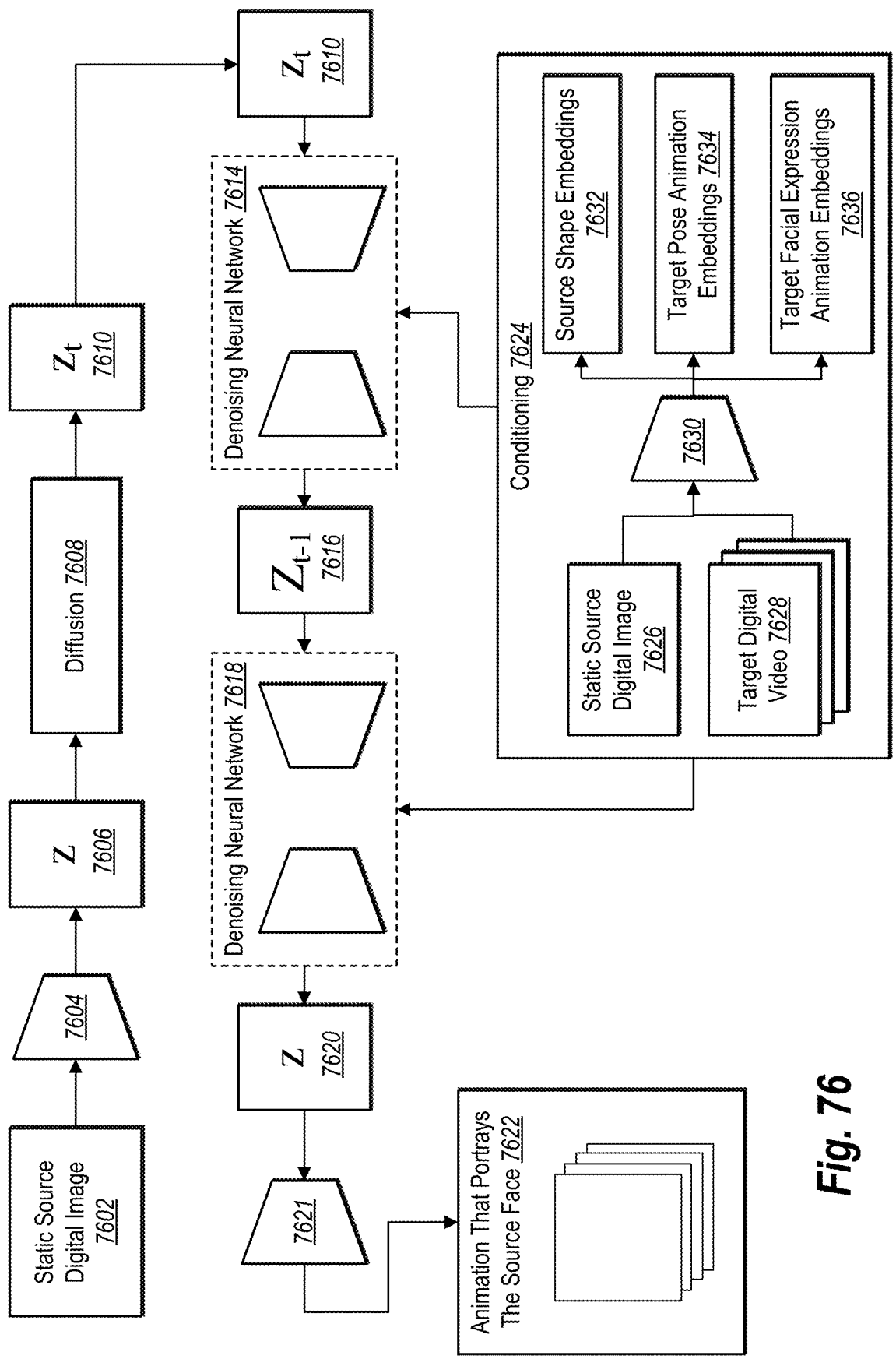
FIG. 76 illustrates an example diagram of the scene-based image editing system utilizing a diffusion neural network to generate an animation in accordance with one or more embodiments.

As mentioned above, the scene-based image editing system 106 in one or more embodiments utilizes a diffusion neural network to generate an animation. Diffusion neural networks were discussed above (e.g., with regard to FIG. 41). For example, FIG. 76 shows the scene-based image editing system 106 utilizing an encoder 7604 to process a static source digital image 7602 to generate a latent vector 7606. In particular, the facial animation diffusion neural network generates an animation by conditioning the denoising layers of the facial animation diffusion neural network with embeddings from a target digital video.

Specifically, FIG. 76 shows the scene-based image editing system 106 performing a diffusion process 7608 to add noise to the latent vector 7606 and generate a final diffusion representation 7610. Furthermore, FIG. 76 shows the scene-based image editing system 106 processing the final diffusion representation 7610 with a denoising neural network 7614. As already mentioned above, the scene-based image editing system 106 reverses the diffusion process 7608 by generating a denoising representation 7616.

As mentioned, the scene-based image editing system 106 performs an act 7624 of conditioning layers of the denoising neural network 7614 and a denoising neural network 7618. For example, the scene-based image editing system 106 utilizes an encoder 7630 to process a static source digital image 7626 and a target digital video 7628. In particular, the scene-based image editing system 106 generates utilizing the encoder 7630 source shape embeddings 7632, target pose animation embeddings 7634, and target facial expression animation embeddings 7636. Conditioning was previously discussed. As discussed, the scene-based image editing system 106 conditions layers of the denoising neural network 7614 and the denoising neural network 7618 with the source shape embeddings 7632, the target pose animation embeddings 7634, and/or the target facial expression animation embeddings 7636 (e.g., a combined embedding). Additionally, as shown, the scene-based image editing system 106 generates a final denoised representation 7620 and processes the final denoised representation 7620 with a decoder 7621. In particular, the scene-based image editing system 106 utilizes the decoder 7621 to generate an animation 7622 (or a digital image in each iteration that is combined to generate the animation 7622) that portrays the source face.

Although FIG. 76 shows the scene-based image editing system 106 conditioning the denoising neural networks with embeddings from the static source digital image 7626 and the target digital video 7628, in one or more embodiments, the scene-based image editing system 106 only utilizes the target digital video 7628. Specifically, the scene-based image editing system 106 only processes the target digital video 7628 with the encoder 7630 and conditions the denoising neural networks with the embeddings from the target digital video 7628. Moreover, although FIG. 76 illustrates utilizing a diffusion neural network to generate an animation, the scene-based image editing system 106 can also utilize this approach to generate a modified digital image from a target image.

Figure 77A:
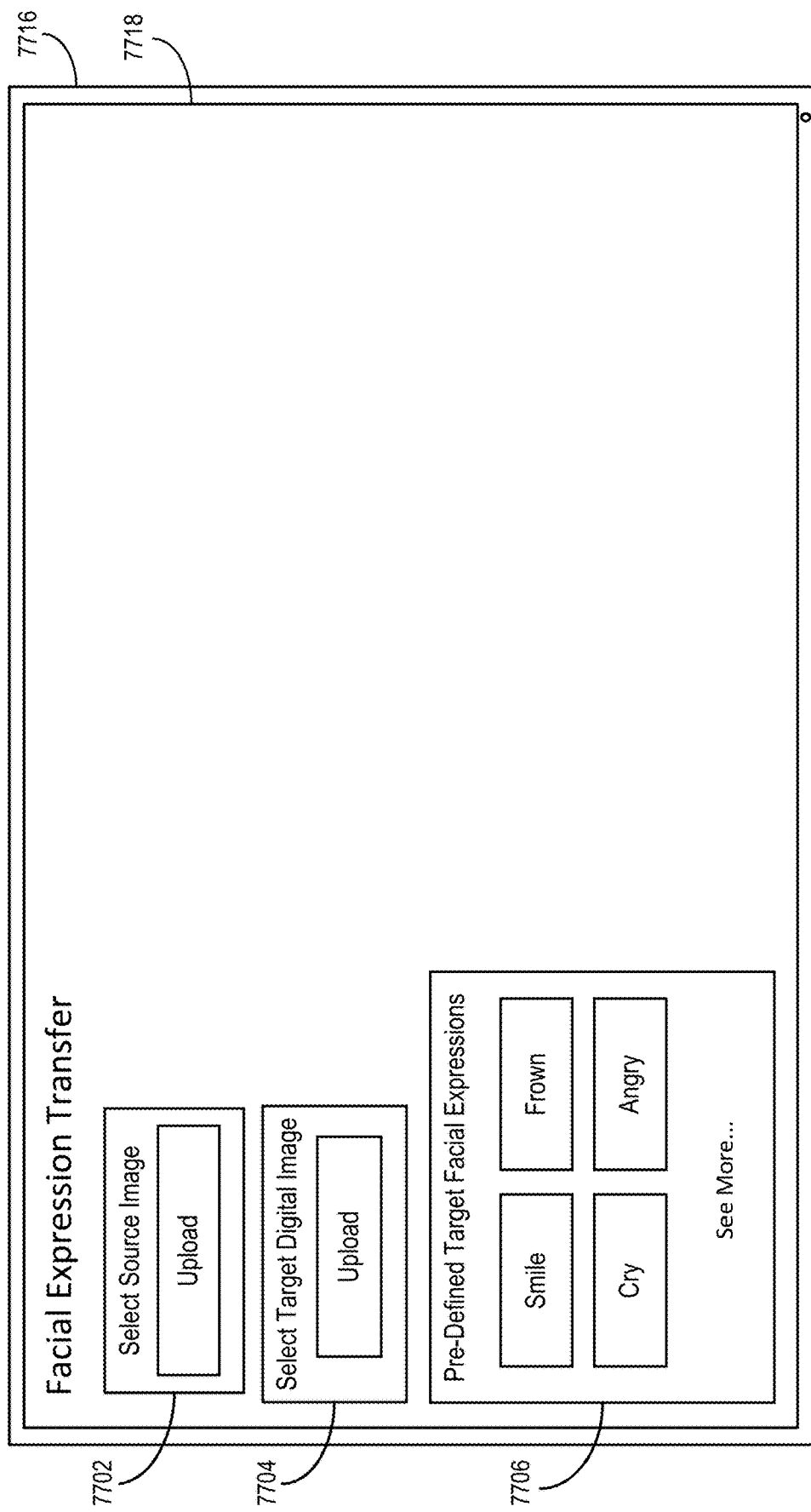
FIGS. 77A-77C illustrate an example graphical user interface of the scene-based image editing system providing options to select a source digital image and a target digital image to generate a modified source digital image in accordance with one or more embodiments.

As mentioned above, the scene-based image editing system 106 provides an intuitive and efficient user interface for performing facial expression transfer in accordance with one or more embodiments. For example, FIG. 77A shows the scene-based image editing system 106 providing, for display via a user interface 7718 of a client device 7716, an interface for transferring a facial expression from a target digital image to a source digital image. In particular, FIG. 77A shows a source image selectable element 7702. For instance, the source image selectable element 7702 includes an option for a user of the client device 7716 to select a digital image to designate as the source image. For example, the scene-based image editing system 106 provides, in response to a user interaction with the source image selectable element 7702, an option to upload a digital image or an option to select from a pre-established list of digital images.

Furthermore, FIG. 77A also shows the scene-based image editing system 106 providing a target face selectable element 7704. For example, the target face selectable element 7704 includes an option for a user of the client device 7716 to select a digital image to designate as the target digital image. In particular, the scene-based image editing system 106 provides, in response to a user interaction with the target face selectable element 7704, an option to upload or an option to select from pre-defined target faces.

Moreover, in addition to the source image selectable element 7702 and the target face selectable element 7704, the scene-based image editing system 106 provides pre-defined target facial expressions 7706. For example, the scene-based image editing system 106 provides to a user of the client device 7716 the pre-defined target facial expressions 7706. In particular, the pre-defined target facial expressions 7706 includes expressions (i.e., embeddings for target expressions/poses) previously generated by the scene-based image editing system 106. For instance, the pre-defined target facial expressions 7706 include expressions such as frowning, smiling, angry, crying, or happy. Although FIG. 77A includes textual descriptions of the expressions, in one or more embodiments the pre-defined target facial expressions 7706 include illustrations (images or animations) of a target expression. For example, the scene-based image editing system 106 determines the pre-defined target facial expressions 7706 by receiving a set of target digital images and extracting the target facial expression data from the set of target digital images to generate the pre-defined target facial expressions 7706.

Figure 77B:
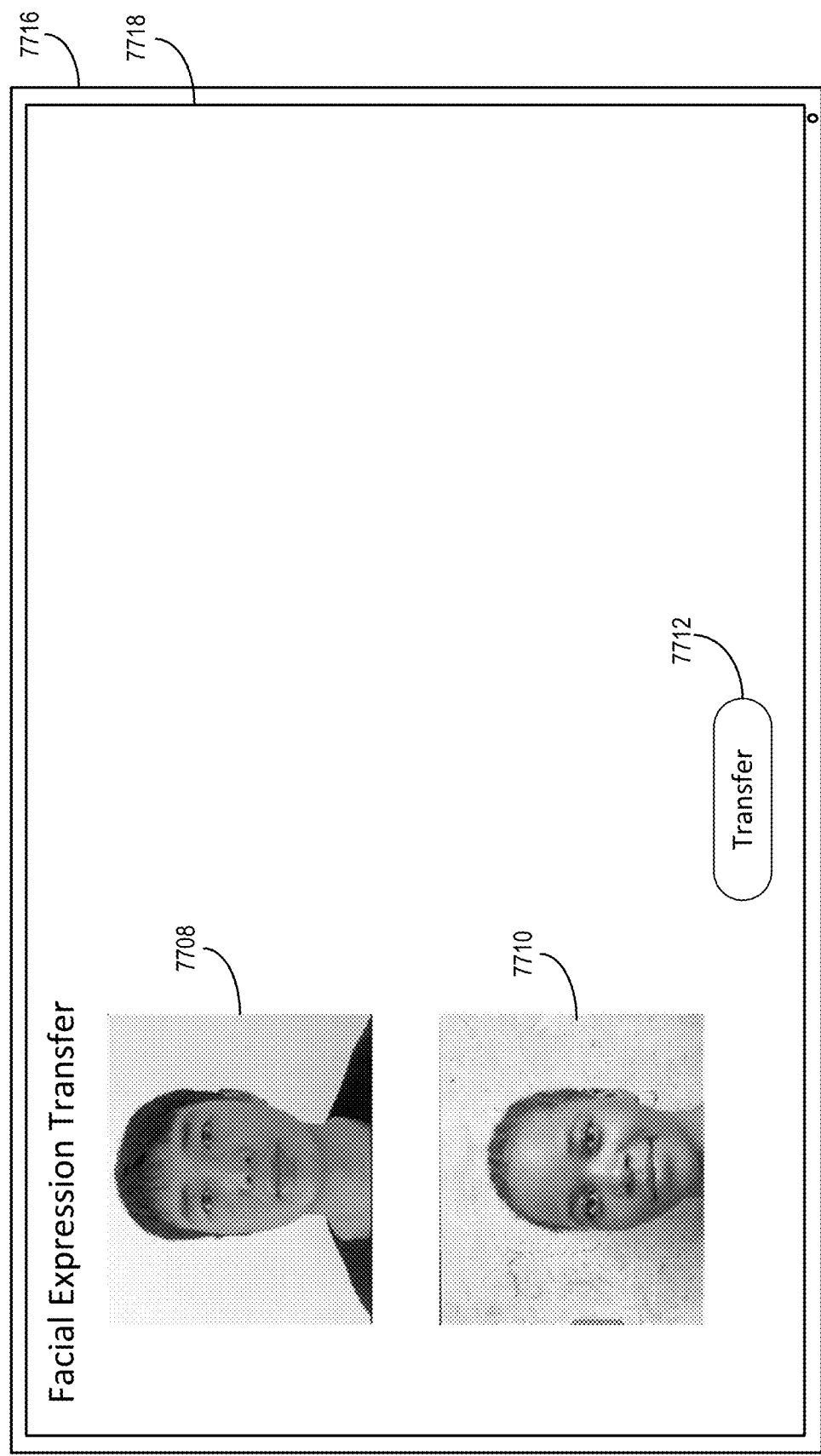

FIG. 77B illustrates the scene-based image editing system 106 providing for display via the user interface 7718 of the client device 7716 a selected source digital image 7708 and a selected target digital image 7710. For instance, in response to a selection of a digital image after selecting the source image selectable element 7702, the scene-based image editing system 106 shows the source digital image 7708 within the user interface 7718. Further, in response to a selection of a digital image after selecting the target face selectable element 7704, the scene-based image editing system 106 shows the target digital image 7710 (or in response to a selection of the pre-defined target facial expressions 7706). For instance, the selected digital images in FIG. 77B show the source digital image 7708 with the subject not smiling and the target digital image 7710 with the subject including a slight smile. Moreover, FIG. 77B also shows a transfer selectable element 7712. In particular, the scene-based image editing system 106 provides the transfer selectable element 7712, and in response to a selection of the transfer selectable element 7712, the scene-based image editing system 106 generates the modified source digital image.

Figure 77C:
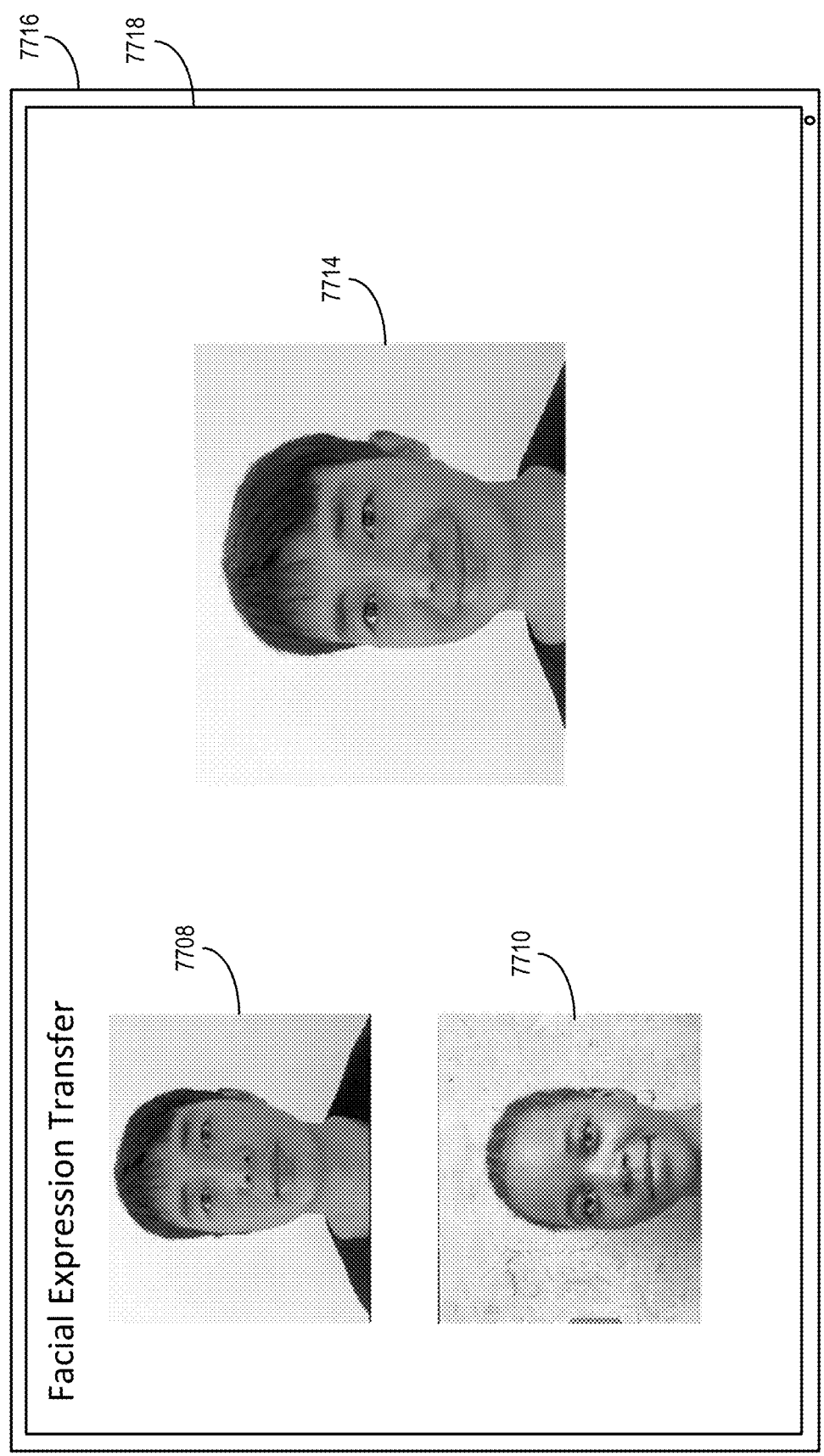

FIG. 77C shows the result of the scene-based image editing system 106 receiving a selection of the transfer selectable element 7712. For example, FIG. 77C shows the scene-based image editing system 106 generating a modified source digital image 7714 portraying the face from the source digital image 7708 but with the facial expression from the target digital image 7710. In particular, FIG. 77C also illustrates the high-quality generation of the modified source digital image 7714 despite the differences in gender and ethnicity between the source digital image 7708 and the target digital image 7710.

Figure 78A:
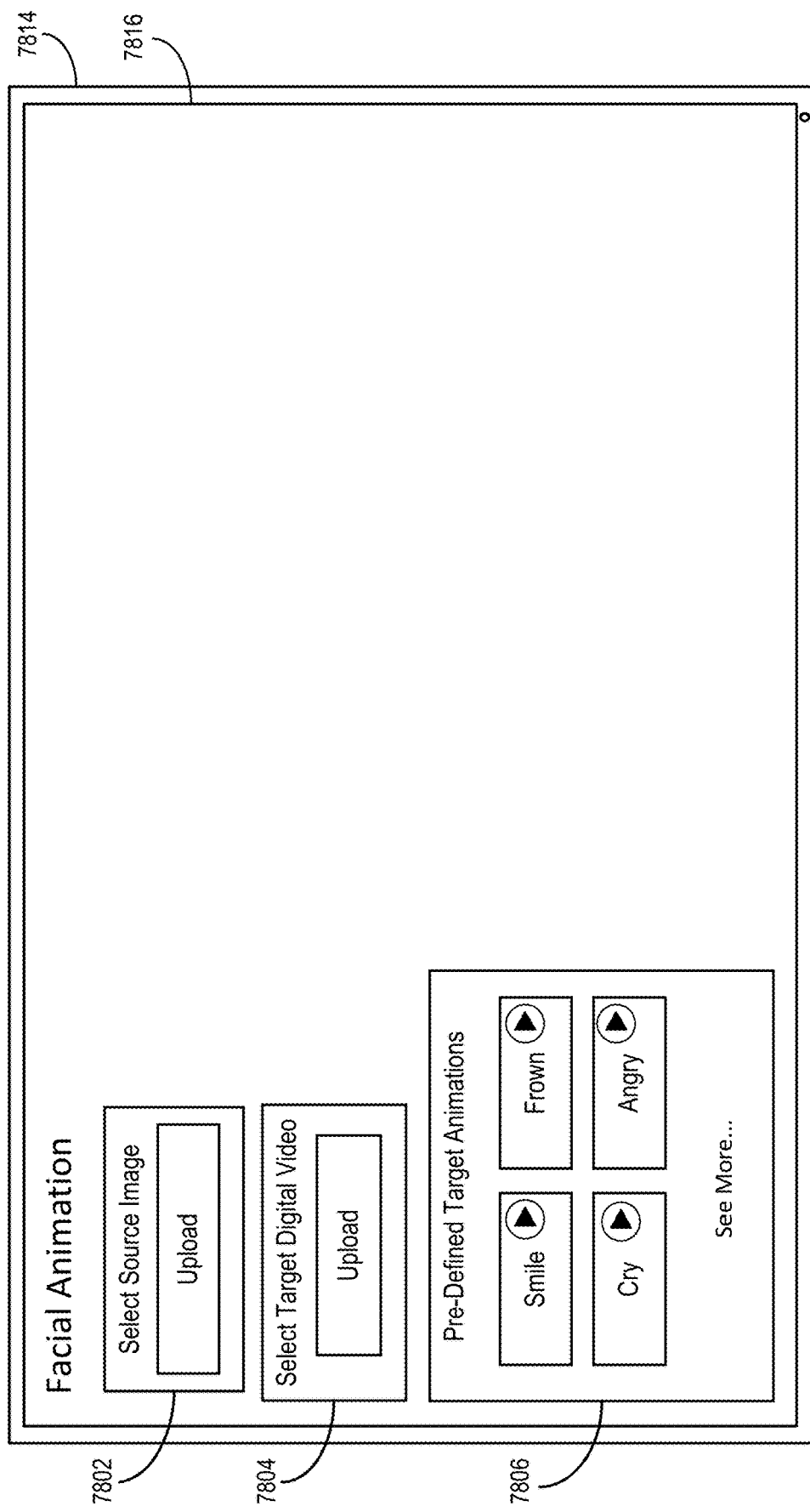

Similar to FIG. 77A, FIG. 78A also illustrates the scene-based image editing system 106 providing for display via a user interface 7816 of a client device 7814 an interface for generating facial animations. For example, FIG. 78A shows the scene-based image editing system 106 providing for display via the user interface 7816 a source image selectable element 7802 and a target video animation selectable element 7804. Similar to FIG. 77A, the target video animation selectable element 7804 also allows for a user of the client device 7814 to upload a target digital video or select from a list of target digital videos. In addition, the scene-based image editing system 106 also provides pre-defined target animations 7806.

Similar to the discussion above relating to pre-defined target facial expressions, the scene-based image editing system 106 also provides pre-defined target animations 7806. For example, pre-defined target animations 7806 include the scene-based image editing system 106 providing in the user interface 7816, options to select animations to animate the static source digital image with. In particular, the scene-based image editing system 106 previously receives multiple digital videos and extracts various types of animations from the digital videos. In doing so, the scene-based image editing system 106 provides the pre-defined target animations 7806. In other embodiments, rather than selecting from the pre-defined target animations 7806, the scene-based image editing system 106 receives a selection of a target animation from a camera roll. In particular, the camera roll includes a plurality of target animations on the client device 7814.

FIG. 78B shows the scene-based image editing system 106 providing for display via the user interface 7816 a selected source digital image and a selected target digital video. For example, FIG. 78B illustrates the scene-based image editing system 106 providing for display via the user interface 7816 a static source digital image 7808 and a target digital video 7810 in response to a selection of the source image selectable element 7802 and the target video animation selectable element 7804 (or the pre-defined target animations 7806). Specifically, FIG. 78B shows a thumbnail of the selected target digital video (e.g., a single frame of the target digital video). Furthermore, FIG. 78B also shows an animation selectable element 7812. In particular, a selection of the animation selectable element 7812 causes the scene-based image editing system 106 to generate to animate the static source digital image 7808 according to the target digital video 7810.

Figure 78C:
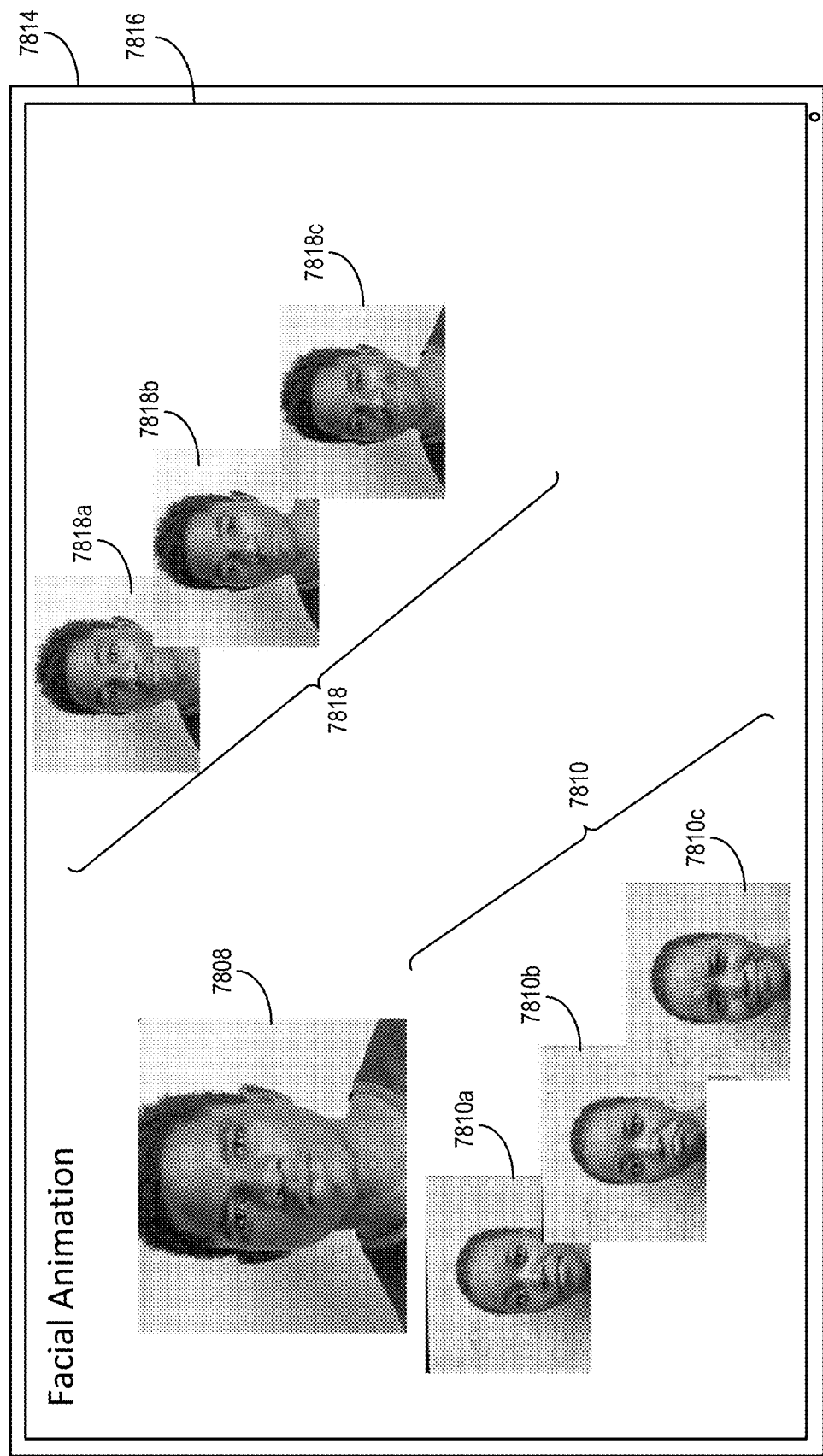

FIG. 78C shows the scene-based image editing system 106 providing for display via the user interface 7816 of the client device 7814 the static source digital image 7808 animated. For example, the scene-based image editing system 106 via the user interface 7816 shows the static source digital image 7808 and three frames of the target digital video 7810. In particular, FIG. 78C shows a first frame 7810*a*, a second frame 7810*b*, and a third frame 7810*c* each displaying a different facial expression to animate the static source digital image 7808 with. Accordingly, in response to a selection of the animation selectable element 7812, the scene-based image editing system 106 generates an animation 7818. Specifically, the animation 7818 includes a first frame 7818*a*, a second frame 7818*b*, and a third frame 7818*c* that corresponds with the first frame 7810*a*, the second frame 7810*b*, and the third frame 7810*c* from the target digital video 7810.

Figure 79:
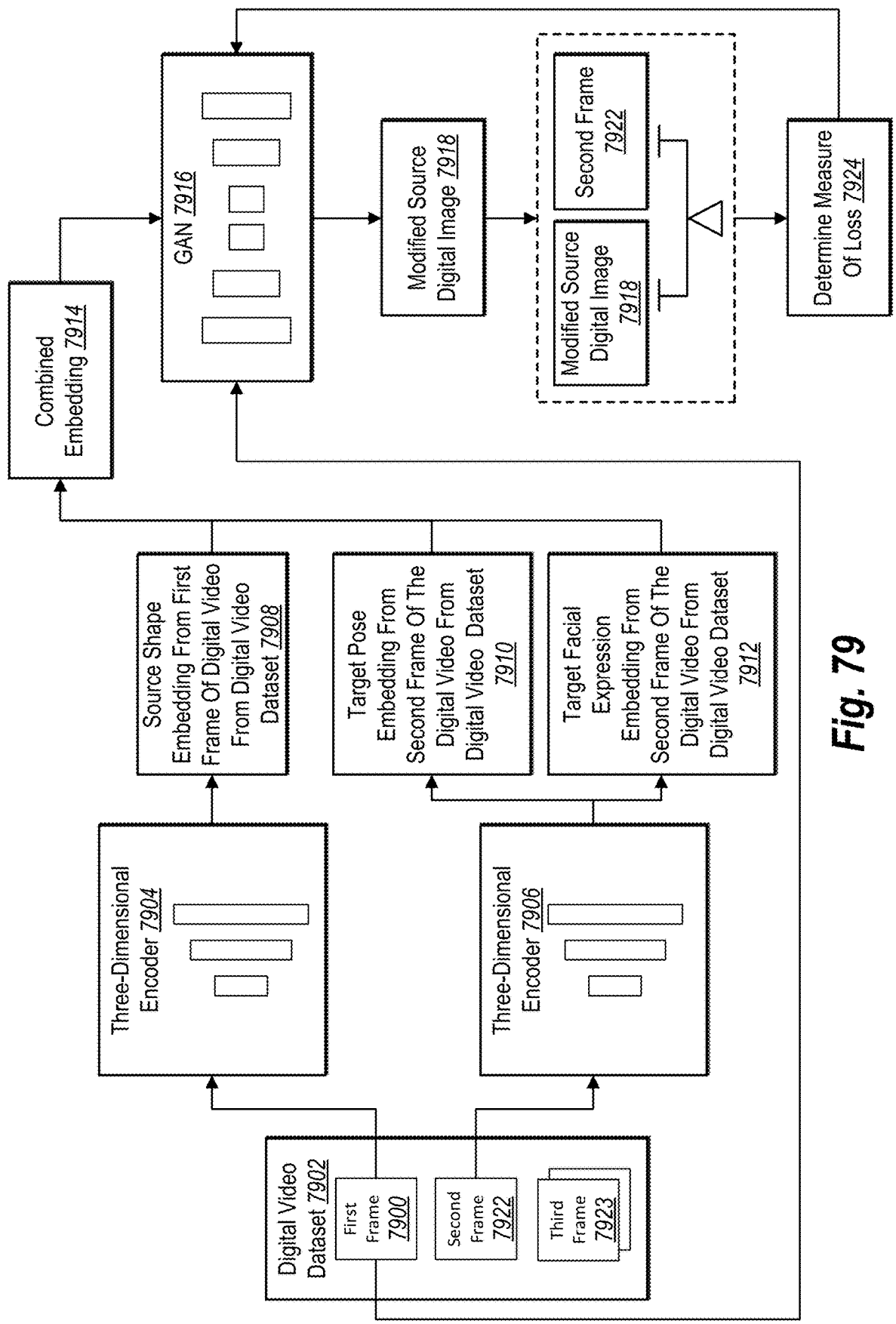
FIG. 79 illustrates an example diagram of the scene-based image editing system training a generative model in accordance with one or more embodiments.

Furthermore, the scene-based image editing system 106 trains a generative model to generate facial expressions from a digital video dataset in accordance with one or more embodiments. For example, FIG. 79 illustrates the scene-based image editing system 106 utilizing a digital video dataset 7902. In particular, the digital video dataset 7902 includes multiple frames within each of the digital videos of the digital video dataset 7902. Moreover, the digital video dataset 7902 also includes multiple facial expressions within the multiple frames of each digital video. Specifically, the scene-based image editing system 106 utilizes one frame of the digital video part of the digital video dataset 7902 to generate a source shape embedding 7908 and another frame of the digital video dataset 7902 to generate a target pose embedding 7910 and a target facial expression embedding 7912.

As shown, FIG. 79 illustrates the scene-based image editing system 106 utilizing a digital video of the digital video dataset 7902 with a first frame 7900, a second frame 7922, a third frame 7923, etc. In particular, FIG. 79 further shows the scene-based image editing system 106 utilizing a three-dimensional encoder 7904 to process the first frame 7900 of the digital video from the digital video dataset 7902. For instance, the scene-based image editing system 106 generates the source shape embedding 7908 from the first frame 7900 of the digital video from the digital video dataset 7902.

Moreover, FIG. 79 shows the scene-based image editing system 106 utilizing a three-dimensional encoder 7906 to process the second frame 7922 of a digital video from the digital video dataset 7902. In particular, the scene-based image editing system 106 generates the target pose embedding 7910 and the target facial expression embedding from the second frame 7922 of the digital video from the digital video dataset 7902. In addition, with the source shape embedding 7908, the target pose embedding 7910, and the target facial expression embedding 7912, the scene-based image editing system 106 generates a combined embedding 7914.

Furthermore, as shown, the scene-based image editing system 106 utilizes a GAN 7916 to process the combined embedding 7914 guided by the first frame 7900 of the digital video from the digital video dataset 7902. Moreover, the scene-based image editing system 106 utilizes the GAN 7916 to generate a modified source digital image 7918. Additionally, the scene-based image editing system 106 compares the modified source digital image 7918 with the second frame 7922 of the digital video from the digital video dataset 7902 to determine a measure of loss 7924. Accordingly, the scene-based image editing system 106 back propagates the determined measure of loss to modify parameters of the GAN 7916. Furthermore, although not shown, the scene-based image editing system 106 in a similar manner trains a GAN for generating animations. In particular, the scene-based image editing system 106 utilizes the digital video dataset 7902 and a static source digital image (e.g., the first frame 7900). For instance, in a similar manner, the scene-based image editing system 106 determines a measure of loss by comparing a generated animation with multiple frames of the digital video from the digital video dataset 7902. Furthermore, the scene-based image editing system 106 back propagates the measure of loss to the GAN 7916.

Figure 80A:
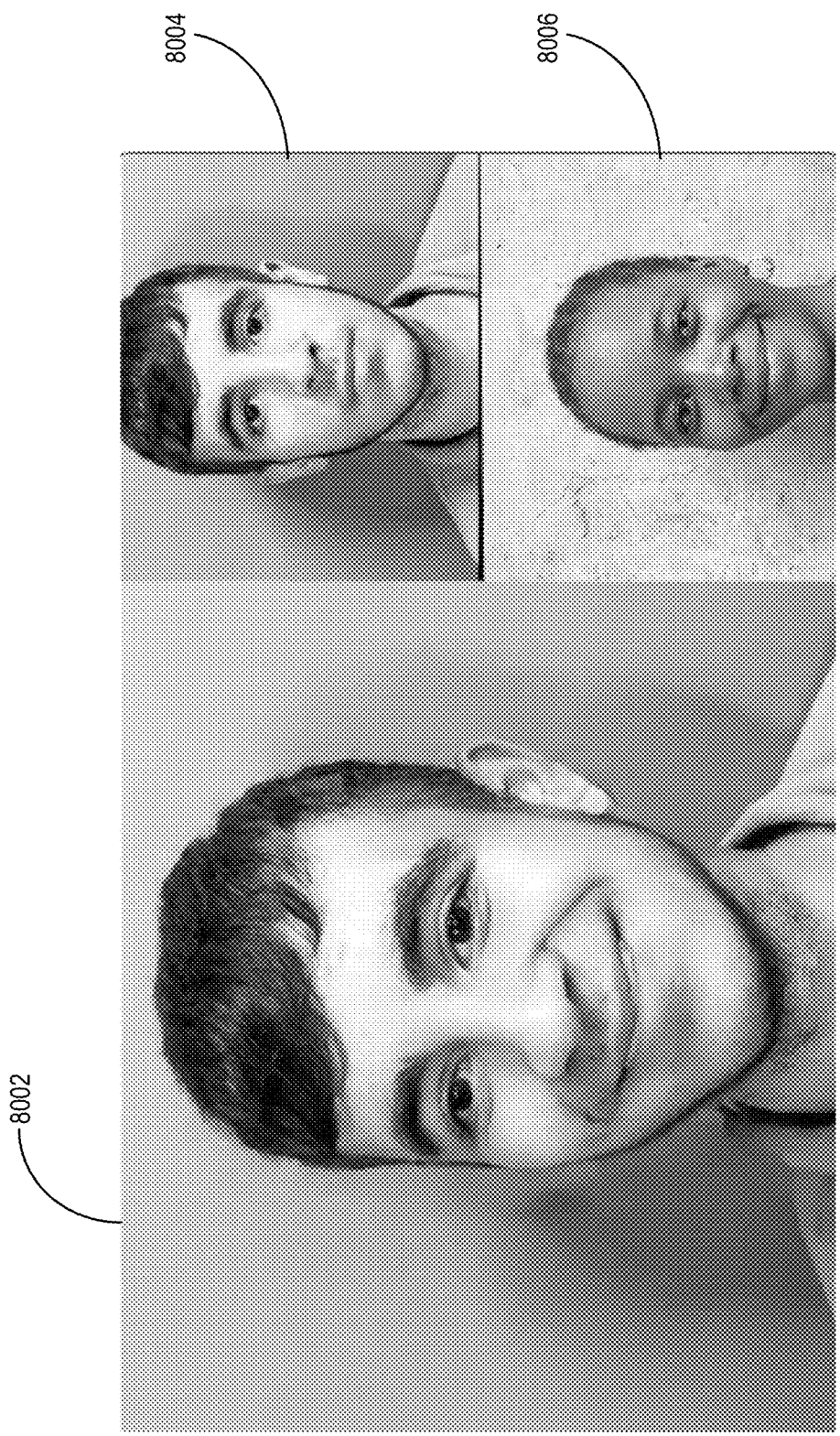
FIGS. 80A-80C illustrate an example graphical user interface of the results of the scene-based image editing system generating a modified source digital image in accordance with one or more embodiments.
Figure 80B:
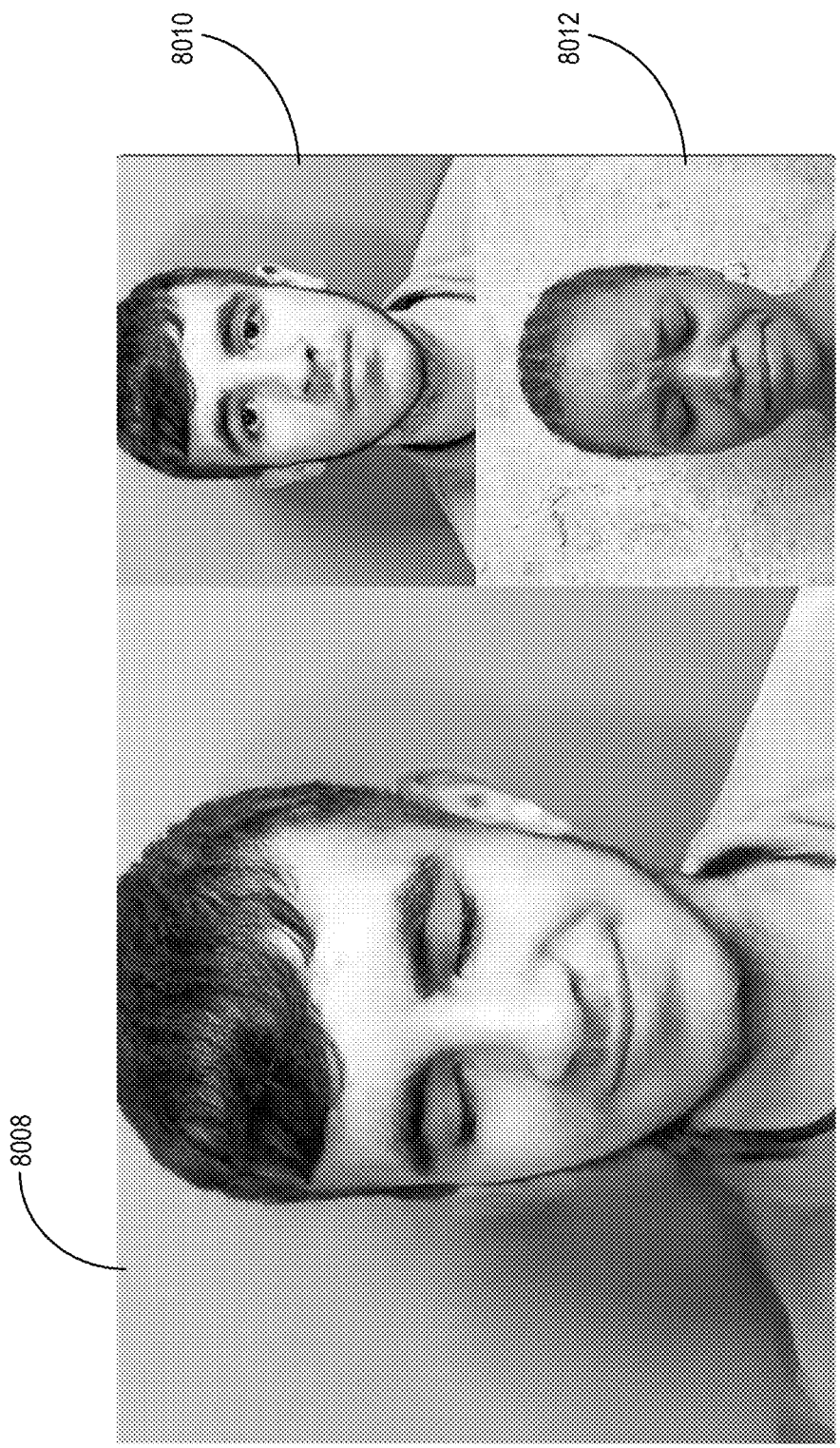
Figure 80C:
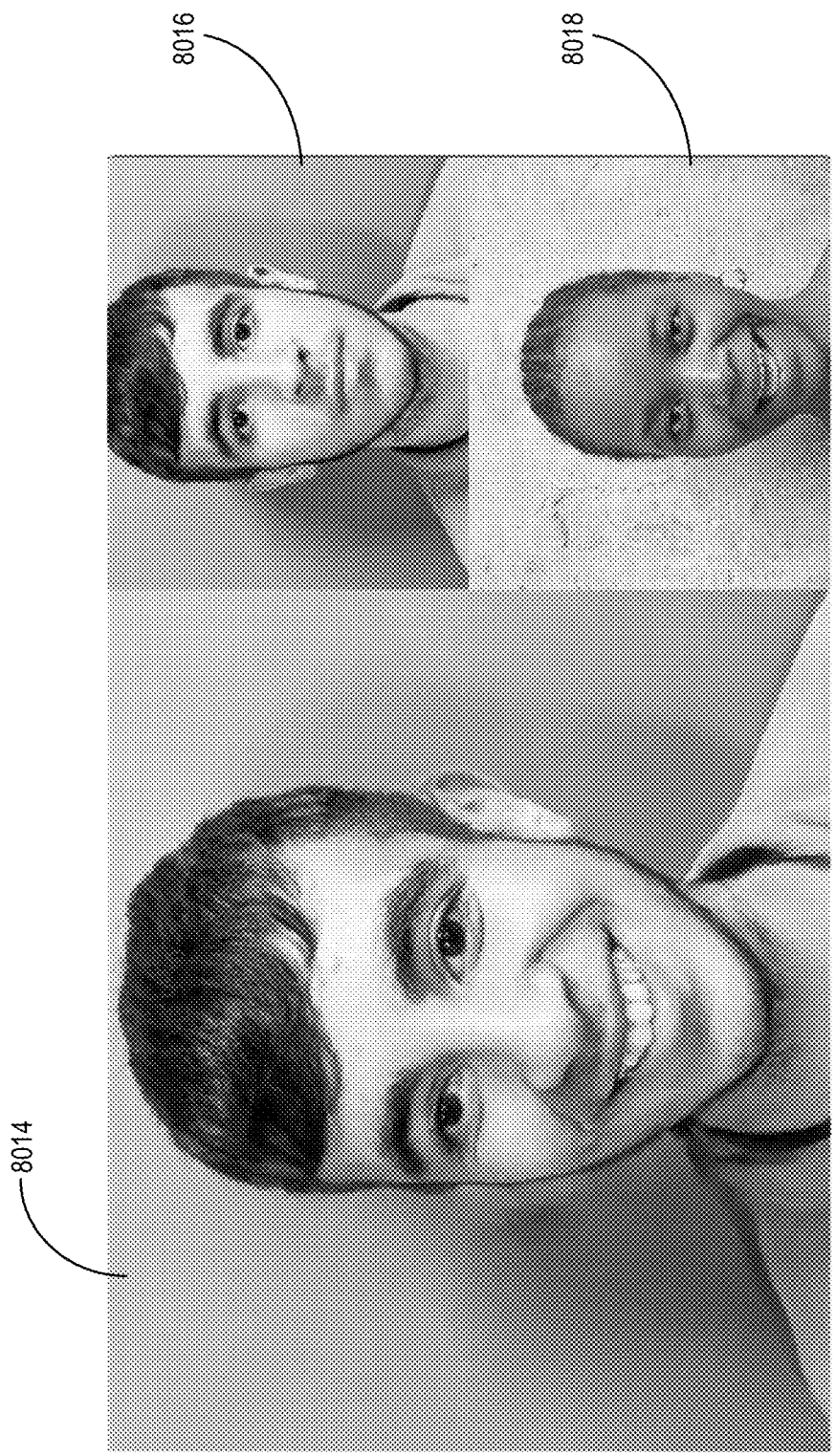
Figure 81:
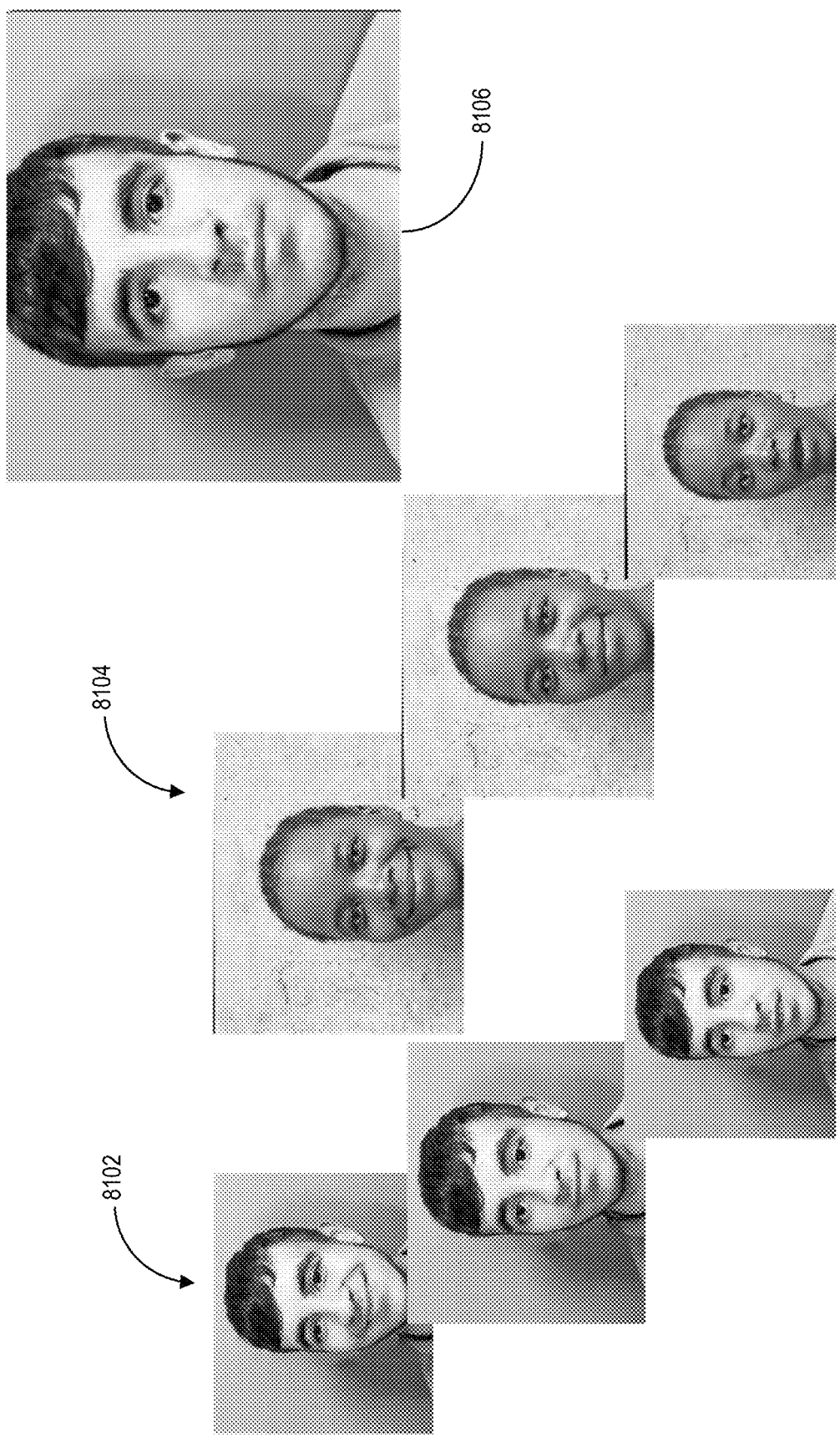
FIG. 81 illustrates an example graphical user interface of the results of the scene-based image editing system generating an animation in accordance with one or more embodiments.

FIGS. 80A-81 illustrate the result of the scene-based image editing system 106 performing facial expression transfer and animation in accordance with one or more embodiments. For example, FIG. 80A shows a source digital image 8004 a target digital image 8006 and a modified source digital image 8002. In particular, the modified source digital image 8002 accurately portrays the human's face from the source digital image 8004 with the facial expression from the target digital image 8006. Despite the ethnic differences between the source digital image 8004 and the target digital image 8006, the scene-based image editing system 106 still accurately generates the modified source digital image 8002.

FIG. 80B likewise portrays the same subjects from FIG. 80A however with different facial expressions. For example, FIG. 80B shows a source digital image 8010, a target digital image 8012 and a modified source digital image 8008. In particular, FIG. 80B shows the target digital image 8012 with the subject's eyes closed which the scene-based image editing system 106 accurately translates over to the modified source digital image 8008. FIG. 80C also shows the same subjects from FIG. 80A, however with a broad smile showing teeth. For example, FIG. 80C also shows a source digital image 8016, a target digital image 8018, and a modified source digital image 8014. In particular, FIG. 80C accurately illustrates the subject from the source digital image 8016 showing his teeth in a broad smile based on the facial expression shown in the target digital image 8018.

As mentioned above, FIG. 81 shows the results of the scene-based image editing system 106 performing facial animation. For example, FIG. 81 illustrates a static source digital image 8106, a target digital video 8104 and an animation 8102 that portrays the face from the static source digital image 8106. In particular, FIG. 81 illustrates the accuracy of the scene-based image editing system 106 in generating an animation of a face from the static source digital image 8106.

In one or more embodiments, the scene-based image editing system 106 intelligently utilizes the features discussed in FIGS. 73-81 to perform facial expression transfer and animation. For example, the scene-based image editing system 106 detects faces in images being edited by a user of a client device or detects faces in uploaded images in addition to an existing digital image being edited. In particular, the scene-based image editing system 106 determines intelligent modifications and provides recommendations.

In one or more embodiments, the scene-based image editing system 106 detects faces within a digital image being edited and provides recommendations for i) transferring a different facial expression to the portrayed faces within the digital image or ii) animating one or more faces shown in the digital image. In particular, for providing recommendations to transfer a facial expression or animate a face in the digital image, the scene-based image editing system 106 provides an overlay option with pre-defined facial expression or animation options (e.g., happy sad, angry, crying, etc.) for a user to select from. In response to a selection of one of the pre-defined options, the scene-based image editing system 106 modifies the faces shown within the digital image.

In other embodiments, the scene-based image editing system 106 detects the upload of a digital image in addition to an existing digital image being edited. In particular, in response to detecting the upload of the digital image, the scene-based image editing system 106 detects one or more facial expressions within the existing digital image. Further, after detecting the one or more facial expressions within the existing digital image, the scene-based image editing system 106 automatically provides modifications to the uploaded digital image to transfer the facial expressions from the existing digital image to the uploaded digital image. For example, in a family portrait, the scene-based image editing system 106 can detect that a first facial expression (a frown) differs from other facial expressions (other family members smiling). The scene-based image editing system 106 can modify the first facial expression based on one or more other facial expressions in the image. In doing so, the scene-based image editing system 106 intelligently matches uploaded digital image facial expressions with an existing digital image being edited. In other instances however, the scene-based image editing system 106 does not automatically transfer the facial expression, but rather provides an option for the user of the client device to confirm whether the scene-based image editing system 106 should perform a facial expression transfer.

Figure 82:
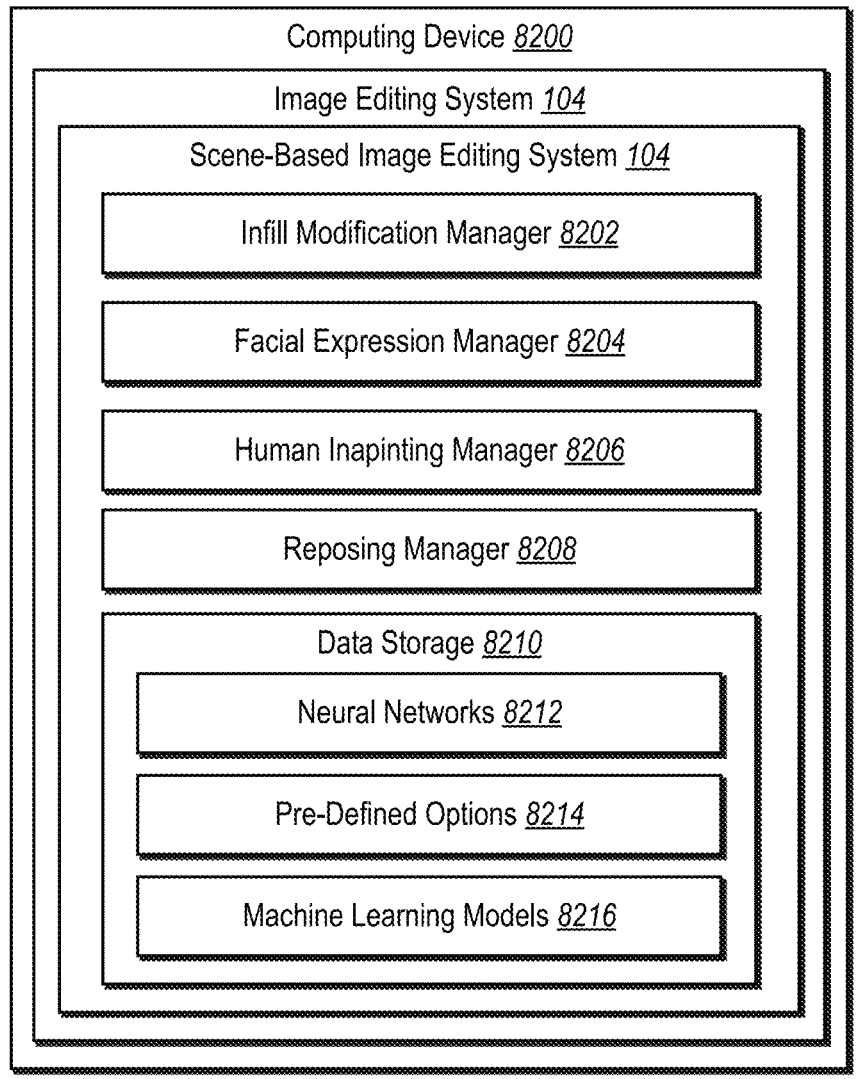
FIG. 82 illustrates an example diagram of the scene-based image editing system in accordance with one or more embodiments.

Turning to FIG. 82, additional detail will now be provided regarding various components and capabilities of the scene-based image editing system 106. In particular, FIG. 82 shows the scene-based image editing system 106 implemented by a computing device 8200 (e.g., the server(s) 102 and/or one of the client devices 110*a*-110*n*). Additionally, the scene-based image editing system 106 is also part of the image editing system 104. As shown, in one or more embodiments, the scene-based image editing system 106 includes, but is not limited to, an infill modification manager 8202, a facial expression manager 8204, a human inpainting manager 8206, a reposing manager 8208, and a data storage 8210 (which includes neural networks 8212, pre-defined options 8214, and machine learning models 8216).

As just mentioned, and as illustrated in FIG. 82, the scene-based image editing system 106 includes the infill modification manager 8202. In one or more embodiments, the infill modification manager 8202 implements a manager to determine infill modifications, generate infill semantic maps, and to generate modified digital images. In particular, the infill modification manager 8202 utilizes information from a client device indicating a region to fill for a digital image and in response utilizes various models (e.g., machine learning models and neural networks) to generate an infill semantic map. Furthermore, utilizing the infill modification manager 8202 utilizes the generated infill semantic map to generate a modified digital image. Moreover, the infill modification manager 8202 provides various options and controls to a user of a client device via a user interface of a client device. In particular, the infill modification manager 8202 allows a user of a client device to provide semantic editing input, to segment a digital image, to indicate the number of diffusion steps and other parameters discussed above.

Additionally, as shown in FIG. 82, the scene-based image editing system 106 includes the facial expression manager 8204. In particular, the facial expression manager 8204 utilizes various encoders to generate various embeddings. For instance, the facial expression manager 8204 generates target facial expression embeddings, source shape embeddings, and target pose embeddings. Moreover, the facial expression manager 8204 generates a modified source digital image by utilizing various neural networks and machine learning models (e.g., facial expression GAN). Furthermore, the facial expression manager 8204 utilizes a source digital image and a target digital image to perform the various acts described above. In addition, the facial expression manager 8204 generates animations by utilizing a static source digital image and a target digital video. In particular, the facial expression manager 8204 utilizes various models to extract embeddings from a target digital video and static source digital image to generate an animation. Moreover, the facial expression manager 8204 also provides via a user interface of a client device options for a user of a client device to transfer facial expressions or to animate a static source digital image. In particular, the facial expression manager 8204 provides options such as selecting pre-defined options 8214 from the data storage 8210 or providing selectable elements to upload digital images or videos.

As shown in FIG. 82, the scene-based image editing system 106 also includes the human inpainting manager 8206. In one or more embodiments, the human inpainting manager 8206 determines a region to inpaint and a depiction of a human. In particular, the human inpainting manager 8206 receives structure guidance maps and digital images to generate various encodings. For instance, the human inpainting manager 8206 generates a structural encoding and a visual appearance encoding utilizing an encoder. Moreover, the human inpainting manager 8206 generates a modified digital image from the structural encoding and the visual appearance encoding utilizing various models (e.g., a human inpainting GAN). Additionally, the human inpainting manager 8206 also utilizes models to generate an infill segmentation map (e.g. generative segmentation machine learning model). Furthermore, the human inpainting manager 8206 also utilizes other models (background GAN) to generate modified background portions of a digital image to combine with modified human portions of a digital image.

Further, as shown in FIG. 82, the scene-based image editing system 106 includes the reposing manager 8208. In one or more embodiments, the reposing manager 8208 receives source digital images, and target poses. In particular, the reposing manager 8208 generates a pose feature map and generates various vectors and tensors. For instance, the reposing manager 8208 generates a global texture map appearance vector and a local appearance feature tensor. In doing so, the reposing manager 8208 synthesizes a modified digital image that depicts the human in a source digital image reposed according to a target pose map. Moreover, the reposing manager 8208 also generates warped digital images and utilizes coordinate inpainting to further generate inpainted warped digital images.

Additionally, as shown in FIG. 82, the scene-based image editing system 106 includes data storage 8210. In particular, data storage 8210 includes the neural networks 8212, the pre-defined options 8214, and the machine learning models 8216.

Each of the components 8202-8216 of the scene-based image editing system 106 optionally include software, hardware, or both. For example, the components 8202-8216 include one or more instructions stored on a computer-readable storage medium and executable by processors of one or more computing devices, such as a client device or server device. When executed by the one or more processors, the computer-executable instructions of the scene-based image editing system 106 cause the computing device(s) to perform the methods described herein. Alternatively, the components 8202-8216 include hardware, such as a special-purpose processing device to perform a certain function or group of functions. Alternatively, the components 8202-8216 of the scene-based image editing system 106 include a combination of computer-executable instructions and hardware.

Furthermore, the components 8202-8216 of the scene-based image editing system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 8202-8216 of the scene-based image editing system 106 may be implemented as a stand-alone application, such as a desktop or mobile application. Furthermore, the components 8202-8216 of the scene-based image editing system 106 may be implemented as one or more web-based applications hosted on a remote server. Alternatively, or additionally, the components 8202-8216 of the scene-based image editing system 106 may be implemented in a suite of mobile device applications or "apps." For example, in one or more embodiments, the scene-based image editing system 106 comprises or operates in connection with digital software applications such as ADOBE® PHOTOSHOP® or ADOBE® ILLUSTRATOR®. The foregoing are either registered trademarks or trademarks of Adobe Inc. in the United States and/or other countries.

FIGS. 1-82, the corresponding text, and the examples provide a number of different methods, systems, devices, and non-transitory computer-readable media of the scene-based image editing system 106. In addition to the foregoing, one or more embodiments can also be described in terms of flowcharts comprising acts for accomplishing the particular result, as shown in FIGS. 83-94. FIGS. 83-94 may be performed with more or fewer acts. Further, the acts may be performed in different orders. Additionally, the acts described herein may be repeated or performed in parallel with one another or in parallel with different instances of the same or similar acts.

Figure 83:
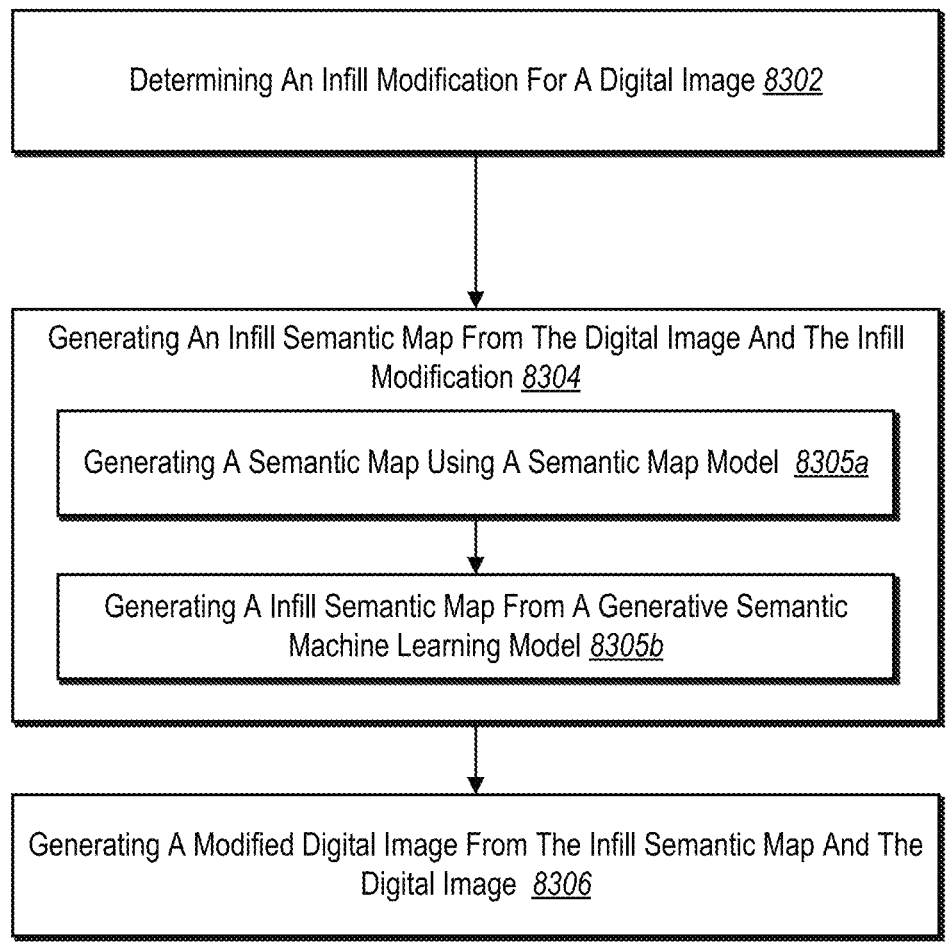
FIGS. 83-85 illustrates a flowchart for a series of acts for generating a modified digital image from an infill semantic map in accordance with one or more embodiments.

FIG. 83 illustrates a flowchart for a series of acts 8300 for implementing an infill modification of a digital image in accordance with one or more embodiments. FIG. 83 illustrates acts according to one embodiment, alternative embodiments may omit, add to, reorder, and/or modify any of the acts shown in FIG. 83. In some implementations, the acts of FIG. 83 are performed as part of a method. For example, in some embodiments, the acts of FIG. 83 are performed as part of a computer-implemented method. Alternatively, a non-transitory computer-readable medium can store instructions thereon that, when executed by at least one processor, cause the at least one processor to perform operations comprising the acts of FIG. 83. In some embodiments, a system performs the acts of FIG. 83. For example, in one or more embodiments, a system includes at least one memory device comprising a machine learning model. The system further includes at least one processor configured to cause the system to perform the acts of FIG. 83.

As shown in FIG. 83, the series of acts 8300 includes an act 8302 of determining an infill modification for a digital image, an act 8304 of generating an infill semantic map from the digital image and the infill modification, and an act 8306 of generating a modified digital image from the infill semantic map and the digital image. Further, FIG. 83 shows the act 8304 including a first sub-act 8305a of generating a semantic map using a semantic map model and a second sub-act 8305b of generating an infill semantic map from a generative semantic machine learning model.

In particular, the act 8302 can include determining an infill modification indicating a region to fill for a digital image, the act 8304 can include generating, utilizing a generative semantic machine learning model, an infill semantic map from the digital image and the infill modification, and the act 8306 can include generating, utilizing a generative image machine learning model, a modified digital image from the infill semantic map and the digital image.

For example, the series of acts 8300 also includes generating, by utilizing a semantic map model, a semantic map from the digital image and generating, utilizing the generative semantic machine learning model, the infill semantic map from the semantic map and the infill modification. Moreover, the series of acts 8300 includes determining the region to fill by generating, utilizing a segmentation neural network, a segmented digital image from the digital image. In addition, the series of acts 8300 includes comprises segmenting, utilizing a segmentation neural network, an object to remove from the digital image.

Also, the series of acts 8300 includes comprising generating the infill semantic map from the digital image to remove the object from the digital image by generating, utilizing the generative semantic machine learning model, semantic classifications for pixels within the region to be filled. Further, the series of acts 8300 includes generating, utilizing a semantic map model, an initial semantic map from the digital image, and generating, utilizing a semantic map diffusion neural network, the infill semantic map from the initial semantic map.

Further, the series of acts 8300 includes receiving a semantic editing input corresponding to the initial semantic map and generating the infill semantic map from the initial semantic map utilizing the semantic map diffusion neural network conditioned on the semantic editing input. Moreover, the acts 8300 includes generating utilizing digital image diffusion neural network, the modified digital image, wherein the digital image diffusion neural network is conditioned by the infill semantic map.

Figure 84:
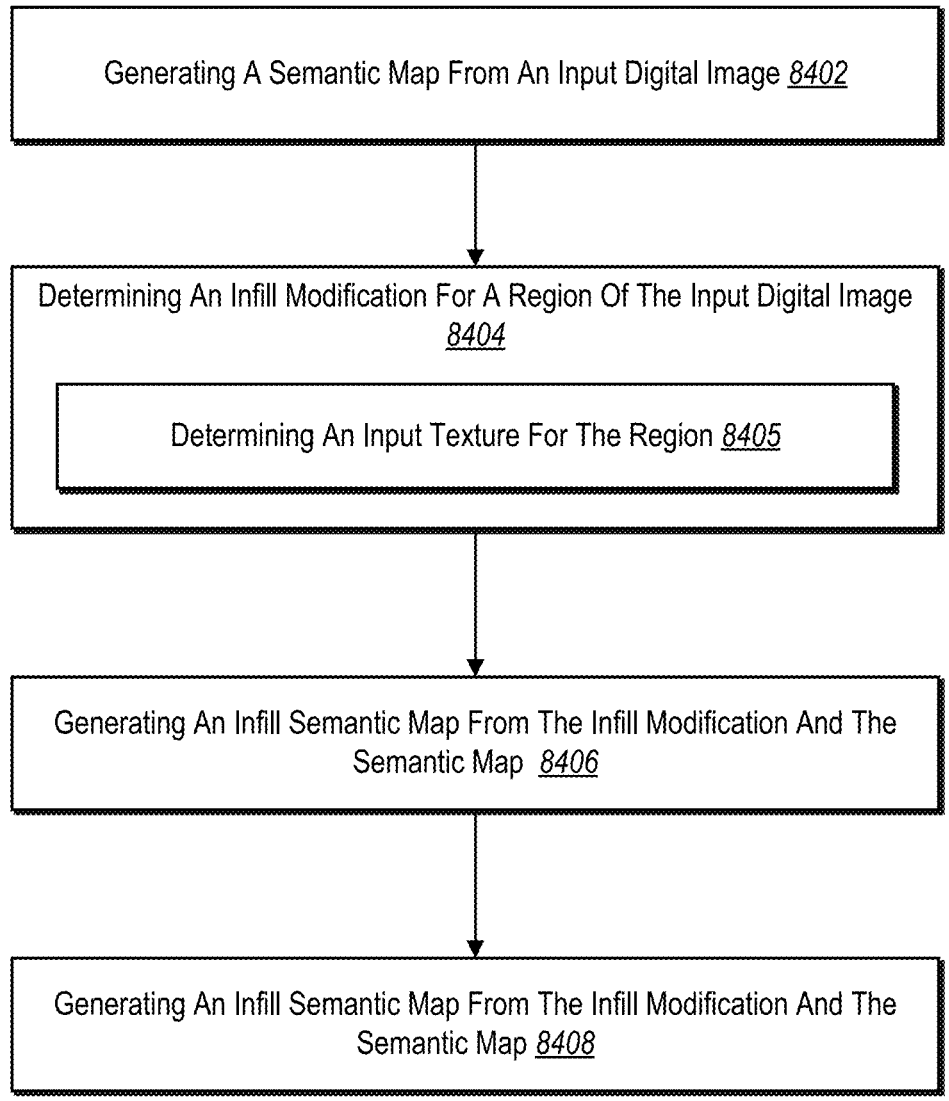

Similar to FIG. 83, FIG. 84 also illustrates a series of acts 8400. As shown, the series of acts 8400 includes an act 8402 of generating a semantic map from an input digital image, an act 8404 of determining an infill modification for a region of the input digital image, an act 8406 of generating an infill semantic map from the infill modification and the semantic map, and an act 8408 of generating an infill semantic map from the infill modification and the semantic map. In addition, the act 8404 includes a sub-act 8405 of determining an input texture for the region.

In particular, the act 8402 includes generating, utilizing the semantic map model, a semantic map from the input digital image, the act 8404 includes determining an infill modification indicating a region to fill for the input digital image, the act 8406 includes generating, utilizing the generative semantic machine learning model, an infill semantic map from the infill modification and the semantic map, and the act 8408 includes generating, utilizing the generative image machine learning model, a modified digital image from the infill semantic map and the input digital image.

For example, the series of acts 8400 includes determining an input texture for the region and generating the modified digital image from the input digital image by utilizing a digital image diffusion neural network conditioned on the infill semantic map and the input texture. Further, the series of acts 8400 also includes segmenting, utilizing a segmentation neural network, an object to remove from the input digital image and generating the infill semantic map from the input digital image and the object to remove from the input digital image. Moreover, the series of acts includes generating the infill semantic map by generating, utilizing the generative semantic machine learning model, semantic classifications of pixels within the region to be filled.

In addition, the series of acts 8400 includes generating, utilizing a semantic map model, an initial semantic map and generating an infill semantic map from the initial semantic map by utilizing a semantic map diffusion neural network. Moreover, the series of acts 8400 includes utilizing a digital image diffusion neural network conditioned on the infill semantic map and the input digital image.

Figure 85:
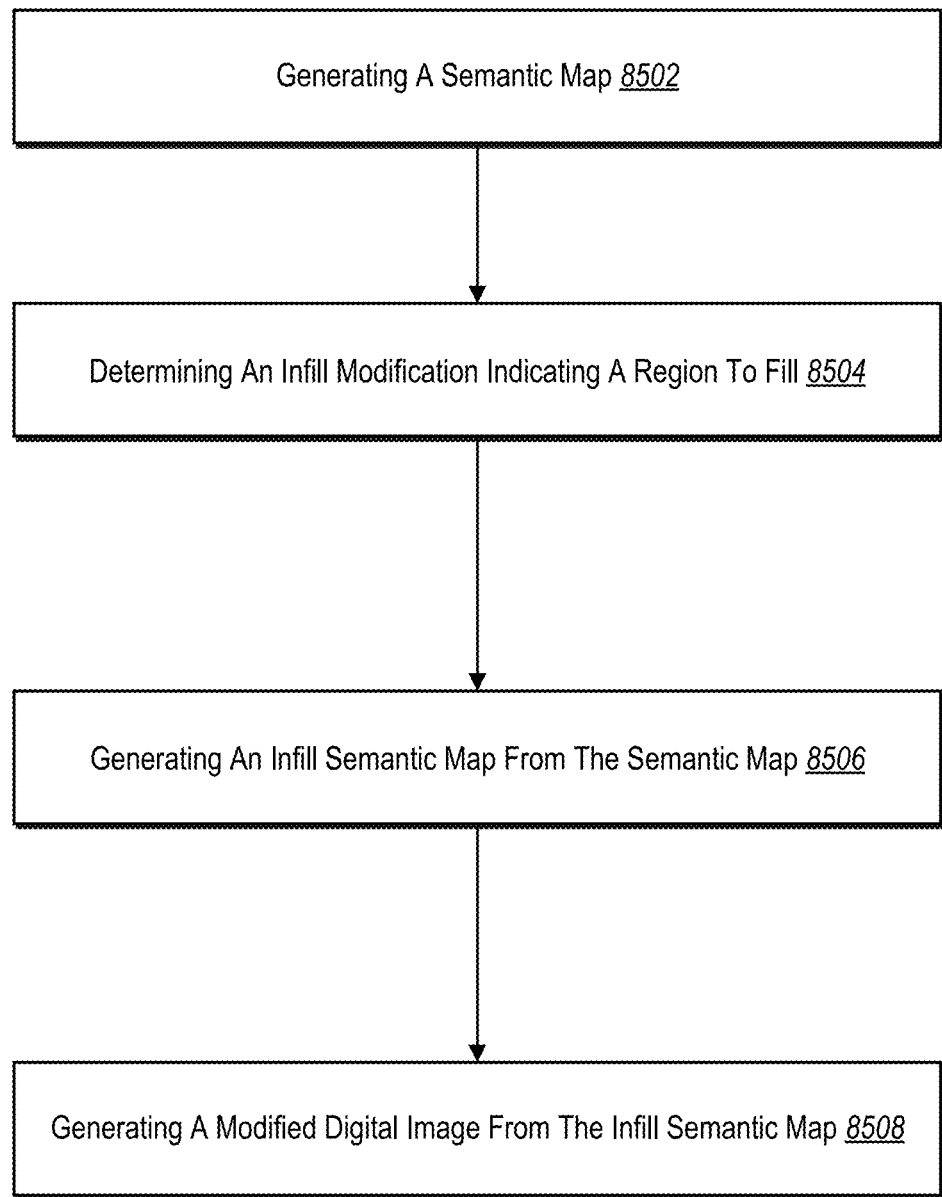

Moving on, FIG. 85 shows a series of acts 8500. For example, the series of acts 8500 includes an act 8502 of generating a semantic map, an act 8504 of determining an infill modification indicating a region to fill, an act 8506 of generating an infill semantic map from the semantic map, and an act 8508 of generating a modified digital image from the infill semantic map.

In particular, the act 8502 includes generating a semantic map corresponding to a digital image, the act 8504 includes determining an infill modification indicating a region to fill for the digital image, the act 8506 includes generating, utilizing a semantic map diffusion neural network, an infill semantic map from the semantic map and the infill modification, and the act 8508 includes generating, utilizing a digital image diffusion neural network, a modified digital image from the infill semantic map.

For example, the series of acts 8500 includes generating the modified digital image from the digital image by utilizing the digital image diffusion neural network conditioned on the infill semantic map. In addition, the series of acts 8500 includes generating, utilizing denoising steps of the semantic map diffusion neural network, the infill semantic map conditioned by the semantic map.

Moreover, the series of acts 8500 includes receiving a semantic editing input corresponding to the semantic map and generating the infill semantic map from the semantic map by conditioning denoising steps of the semantic map diffusion neural network with the semantic editing input. Further, the series of acts 8500 includes determine an input texture for modifying the digital image and generating the modified digital image from the infill semantic map by conditioning denoising steps of the digital image diffusion neural network with the input texture. In addition, the series of acts 8500 includes generating semantic classifications for the infill semantic map and generating the modified digital image by conditioning denoising steps of the digital image diffusion neural network with the semantic classifications.

Figure 86:
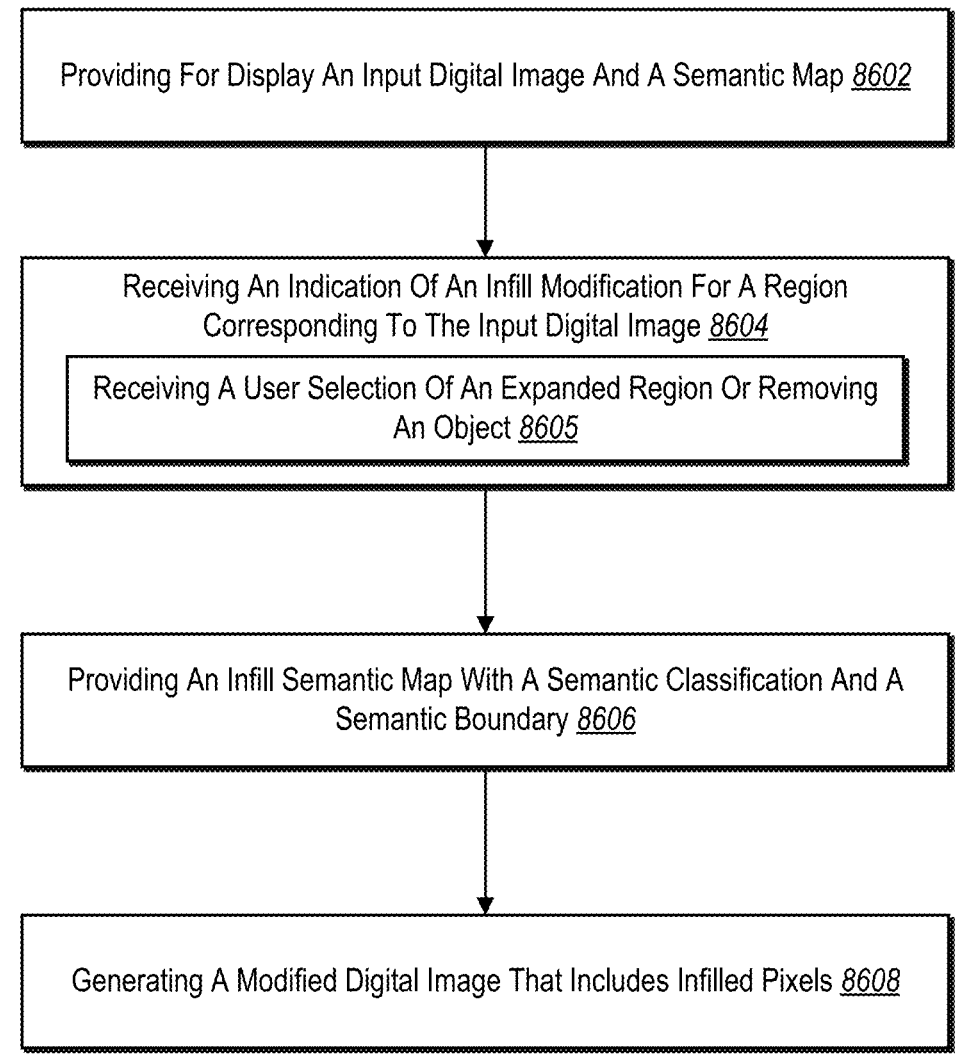
FIGS. 86-88 illustrates a flowchart for a series of acts for providing options for generating a modified digital image in accordance with one or more embodiments.

Turning to FIG. 86, FIG. 86 illustrates a series of acts 8600. For example, FIG. 86 shows an act 8602 of providing for display an input digital image and a semantic map, an act 8604 of receiving an indication of an infill modification for a region corresponding to the input digital image, an act 8606 of providing an infill semantic map with a semantic classification and a semantic boundary, and an act 8608 of generating a modified digital image that includes infilled pixels. In addition, FIG. 86 shows a sub-act 8605 of receiving a user selection of an expanded region or removing an object.

In particular, the act 8602 includes providing, for display via a user interface of a client device, an input digital image and a semantic map of the input digital image, the act 8604 includes receiving, via the user interface, an indication of an infill modification comprising a region corresponding to the input digital image to fill, the act 8606 includes provide, for display via the user interface, an infill semantic map comprising semantic classifications of pixels within the region of the input digital image to fill, and the act 8608 includes in response to an image completion interaction via the user interface, generating a modified digital image comprising infilled pixels for the region according to the infill semantic map.

For example, the series of acts 8600 includes receiving the indication of the infill modification by receiving a user selection of an expanded region beyond the input digital image and providing the infill semantic map by providing, for display via the user interface, the infill semantic map of the input digital image within an expanded digital image frame corresponding to the expanded region. Further, the series of acts 8600 includes generating, in response to an infill completion interaction via the user interface, the infill semantic map, wherein the semantic classifications of the pixels extends into the expanded digital image frame.

In addition, the series of acts 8600 includes providing the infill semantic map comprises providing, for display via the user interface, a plurality of infill semantic maps and in response to user selection of the infill semantic map from the plurality of infill semantic maps, generating the modified digital image. Further, the series of acts 8600 includes providing, for display via the user interface, the infill semantic map comprising the semantic classifications within a semantic boundary and providing, for display via the user interface, an additional infill semantic map comprising additional semantic classifications within an additional semantic boundary.

As another example, the series of acts 8600 includes generating a plurality of modified digital images according to the infill semantic map, providing, for display via the user interface, the plurality of modified digital images, and receiving a user selection of the modified digital image from the plurality of modified digital images generated according to the infill semantic map. Moreover, the series of acts 8600 includes receiving, via the user interface, a semantic editing input for a region of the semantic map, generating the infill semantic map guided by the semantic editing input, and providing, for display via the user interface, the infill semantic map guided by the semantic editing input.

Further, the series of acts 8600 includes providing, for display via the user interface, a semantic editing tool and determining the semantic editing input comprises receiving an input semantic classification or an input semantic boundary based on user interaction with the semantic editing tool. Moreover, the series of acts 8600 includes providing, via the user interface, a segmentation option to apply a segmentation model to the input digital image, in response to receiving a selection of the segmentation option, generating a segmented digital image, and providing, via the user interface, the segmented digital image, wherein the segmented digital image indicates the region of the input digital image to fill.

Additionally, the series of acts 8600 includes providing, for display via the user interface, a selectable texture option, in response to receiving a user interaction with the selectable texture option, identifying an input texture, and generating the modified digital image by filling the region corresponding to the indicated infill modification guided by the selected texture option. Moreover, the series of acts 8600 includes providing, for display via the user interface, a diffusion iteration option and in response to user interaction with the diffusion iteration option: determining a number of diffusion iterations and generating the modified digital image by utilizing a diffusion neural network comprising the number of diffusion iterations.

Figure 87:
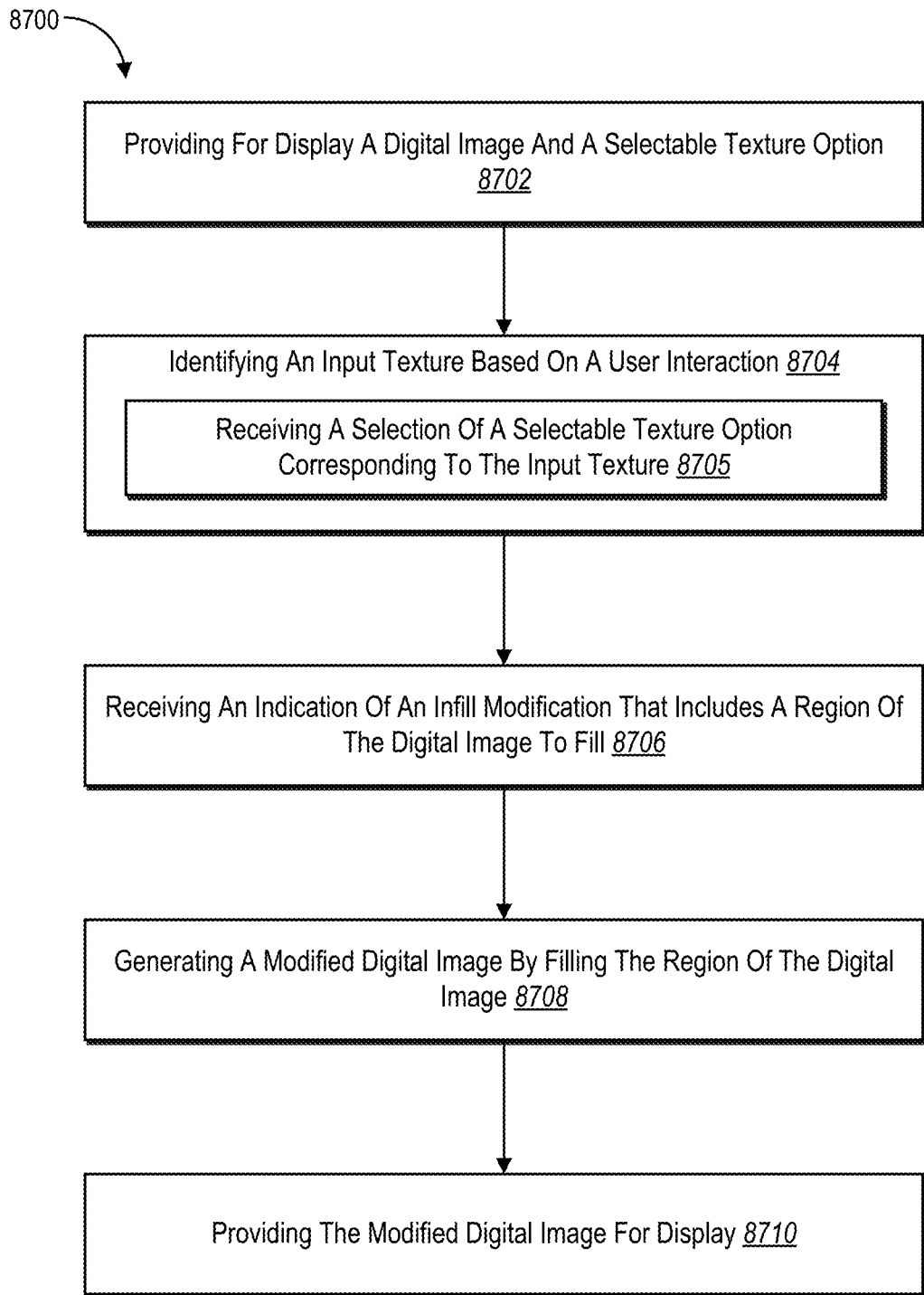

FIG. 87 illustrates a series of acts 8700. For example, FIG. 87 shows an act 8702 of providing for display a digital image and a selectable texture option, an act 8704 of identifying an input texture based on a user interaction, an act 8706 of receiving an indication of an infill modification that includes a region of the digital image to fill, an act 8708 of generating a modified digital image by filling the region of the digital image, and an act 8710 of providing the modified digital image for display. Additionally, FIG. 87 shows a sub-act 8705 of receiving a selection of selectable texture options corresponding to the input texture.

In particular, the act 8702 includes providing, for display via a user interface of a client device, a digital image and a selectable texture option, the act 8704 includes based on user interaction with the selectable texture option, identifying an input texture, the act 8706 includes receiving, via the user interface, an indication of an infill modification comprising a region of the digital image to fill, the act 8708 includes generating, utilizing a generative image machine learning model, a modified digital image by filling the region of the digital image conditioned on the input texture, and the act 8710 includes providing the modified digital image for display via the user interface.

For example, the series of acts 8700 includes receiving, via the user interface, an indication of an infill modification comprising an object portrayed in the digital image to replace and providing, for display via the user interface of the client device, a plurality of selectable texture options comprising texture patches for replacing the object. Further, the series of acts 8700 includes receiving, via the user interface, a selection of a selectable texture option corresponding to the input texture and generating, utilizing the generative image machine learning model, a modified digital image by replacing the object depicted in the digital image based on a texture patch. Moreover, the series of acts 8700 includes providing, via the user interface, a segmentation option to apply a segmentation model to the digital image, in response to receiving a selection of the segmentation option, generating a segmented digital image, and providing, via the user interface, the segmented digital image, wherein the segmented digital image indicates the region of the digital image to fill conditioned on the input texture.

Figure 88:
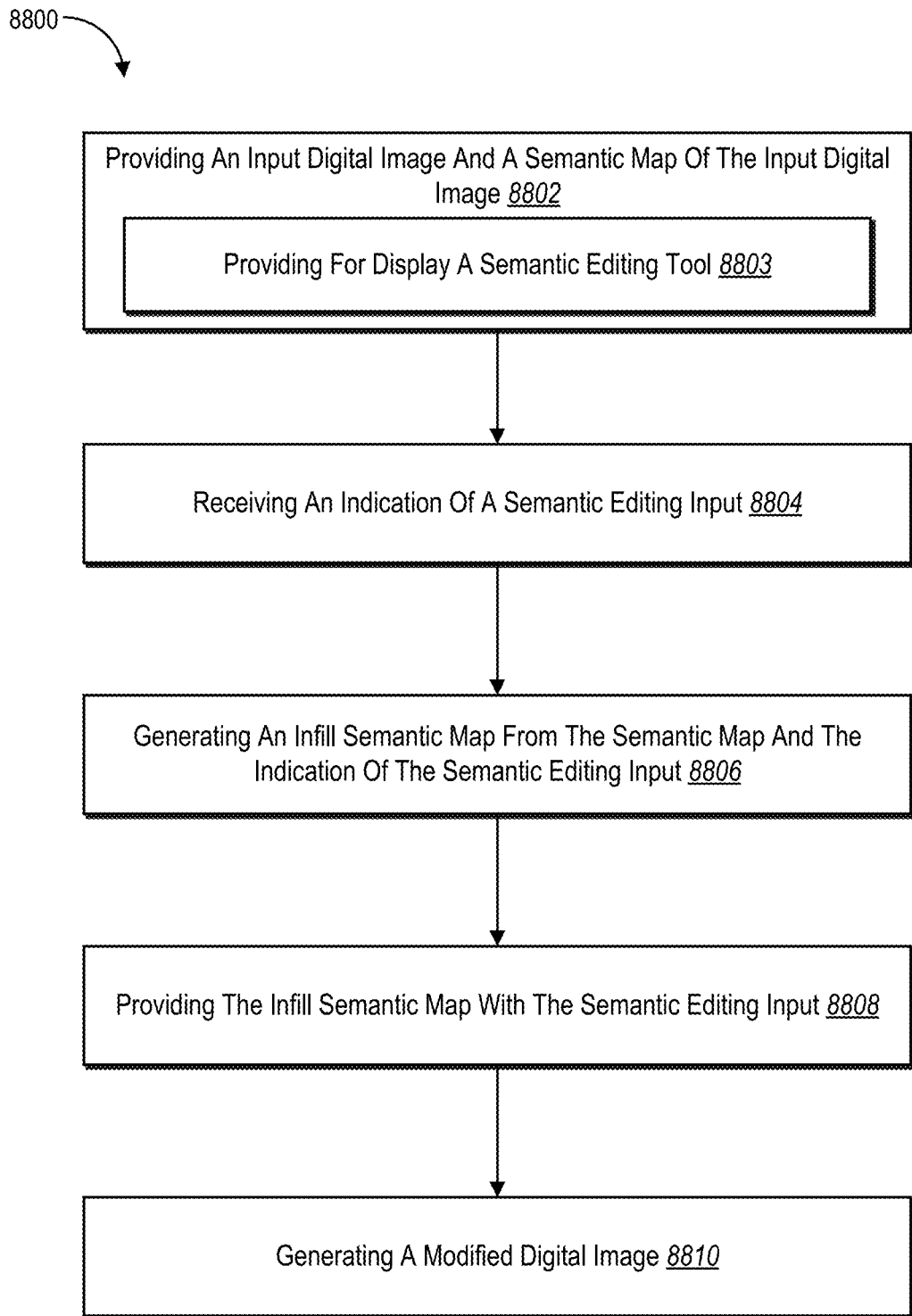

FIG. 88 illustrates a series of acts 8800. For example, FIG. 88 shows an act 8802 of providing an input digital image and a semantic map of the input digital image, an act 8804 of receiving an indication of a semantic editing input, an act 8806 of generating an infill semantic map from the semantic map and the indication of the semantic editing input, an act 8808 of providing the infill semantic map with the semantic editing input, and an act 8810 of generating a modified digital image. Additionally, FIG. 88 shows a sub-act 8803 of providing for display a semantic editing tool.

In particular, the act 8802 includes providing, for display via a user interface of a client device, an input digital image and a semantic map of the input digital image, the act 8804 includes receiving, via the user interface, an indication of a semantic editing input for a region of the semantic map, the act 8806 includes generating, utilizing a generative semantic machine learning model, an infill semantic map from the semantic map and the indication of the semantic editing input, the act 8808 includes providing, for display via the user interface, the infill semantic map comprising the semantic editing input, and the act 8810 includes in response to user interaction with an image completion element, generating a modified digital image comprising infilled pixels for the region.

Further the series of acts 8800 includes receiving an input semantic classification or an input semantic boundary. Additionally, the series of acts 8800 includes providing, for display via the user interface, a semantic editing tool and receiving, via the semantic editing tool, an indication of an input semantic classification or an input semantic boundary. Moreover, the series of acts 8800 includes providing, for display via the user interface, a diffusion iteration option and in response to user interaction with the diffusion iteration option: determining a number of diffusion iterations and generating the infill semantic map by utilizing a diffusion neural network comprising the number of diffusion iterations guided by the indication of the semantic editing input. Additionally, the series of acts 8800 includes providing, via the user interface, a segmentation option to apply a segmentation model to the input digital image, in response to receiving a selection of the segmentation option, generating a segmented digital image, and generating the modified digital image from the segmented digital image indicating the region of the input digital image to fill and the semantic editing input.

Figure 89:
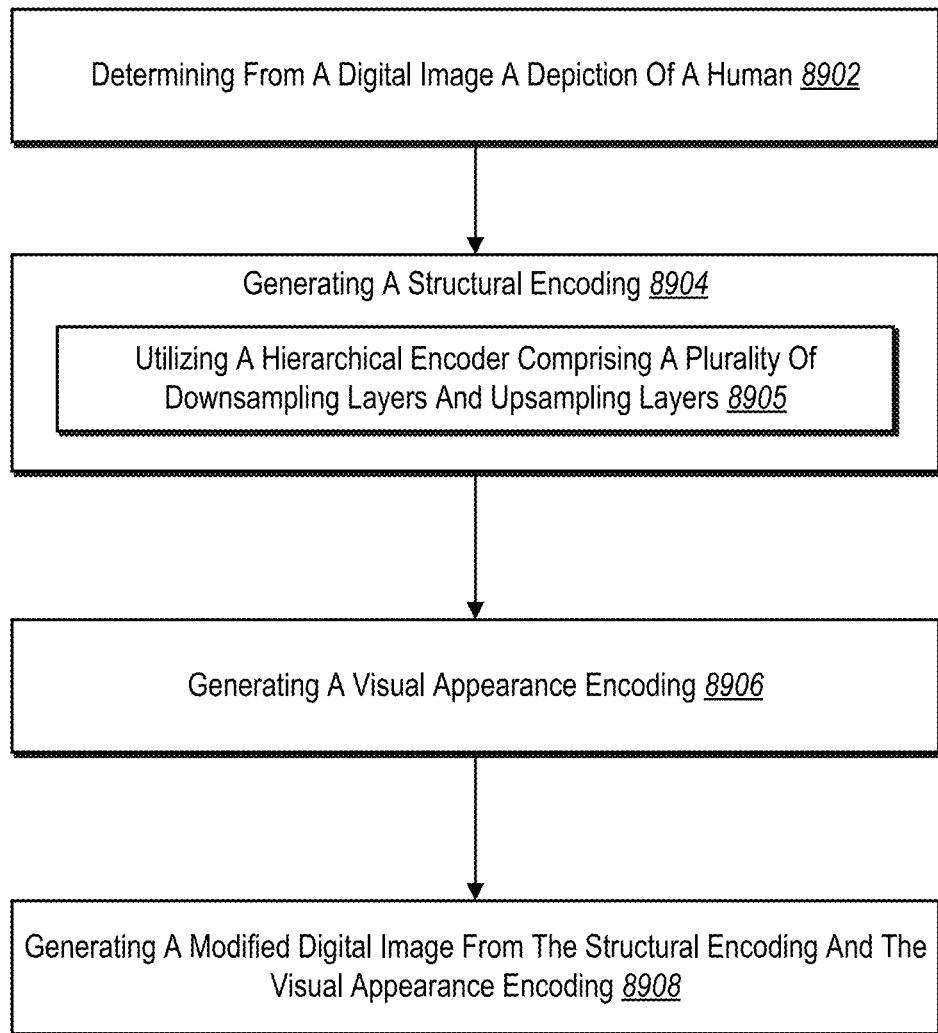
FIG. 89 illustrates a flowchart for a series of acts for performing human inpainting in accordance with one or more embodiments.

FIG. 89 shows a series of acts 8900. For example, FIG. 89 shows an act 8902 of determining from a digital image a depiction of a human, an act 8904 of generating a structural encoding, an act 8906 of generating a visual appearance encoding, and an act 8908 of generating a modified digital image from the structural encoding and the visual appearance encoding. Additionally, FIG. 89 also shows a sub-act 8905 of utilizing a hierarchical encoder comprising a plurality of downsampling layers and upsampling layers.

In particular, the act 8902 includes determining, from a digital image, a depiction of a human and a region of the human to inpaint, the act 8904 includes generating, utilizing an encoder, a structural encoding from a structure guidance map of the human, the act 8906 includes generating, utilizing the encoder, a visual appearance encoding from the human portrayed in the digital image, and the act 8908 includes generating, utilizing a human inpainting generative adversarial neural network, a modified digital image comprising modified pixels of the region from the structural encoding and the visual appearance encoding of the human.

For example, the series of acts 8900 include generating, utilizing a hierarchical encoder comprising a plurality of downsampling layers and upsampling layers of matching resolutions connected via skip connections, the structural encoding from the structure guidance map of the human and the visual appearance encoding from the human portrayed in the digital image. Additionally, the series of acts 8900 include generating, utilizing a parameter neural network, a local appearance feature tensor from the visual appearance encoding. Further, the series of acts 8900 include generating the local appearance feature tensor comprises generating, utilizing the parameter neural network, a spatially varying scaling tensor and a spatially varying shifting tensor. Moreover, the series of acts 8900 include generating, utilizing a first style block of the human inpainting generative adversarial neural network, an intermediate feature vector by modulating the structural encoding utilizing the spatially varying scaling tensor and the spatially varying shifting tensor.

Further, the series of acts 8900 include utilizing a modulation layer, a convolutional layer, and a demodulation layer to generate the intermediate feature vector. Moreover, the series of acts 8900 include generating, utilizing a second style block of the human inpainting generative adversarial neural network, an additional intermediate feature vector from the intermediate feature vector, an additional spatially varying scaling tensor, and an additional spatially varying shifting tensor. Additionally, the series of acts 8900 include generating the structural encoding from at least one of a keypoint map or a pose map. Further, the series of acts 8900 includes generating the structural encoding from at least one of a segmentation map or a digital image.

In addition the series of acts 8900 also include determining a human portrayed in the digital image and a region of the human to inpaint, generating, utilizing an encoder, a structural encoding from the structure guidance map of the human, generating, utilizing the encoder, a visual appearance encoding of the human, generating, utilizing the parameter neural network, local appearance feature tensor from the visual appearance encoding and generating, utilizing a human inpainting generative adversarial neural network, a modified digital image comprising modified pixels of the region from the structural encoding and the local appearance feature tensor.

Moreover, the series of acts include generating a spatially varying scaling tensor and a spatially varying shifting tensor by utilizing the parameter neural network. Further, the series of acts 8900 include modulating the structural encoding utilizing the spatially varying scaling tensor and the spatially varying shifting tensor. Additionally, the series of acts 8900 include utilizing a first style block of the human inpainting generative adversarial neural network, an intermediate feature vector by utilizing a modulation layer, a convolutional layer, and a demodulation layer.

Further, the series of acts 8900 include generating the structural encoding from at least one of a keypoint map, a segmentation map, or a pose map. Moreover, the series of acts 8900 include determining a partial reconstruction loss for a portion of the digital image that does not include the region of the human to inpaint and modifying parameters of the human inpainting generative adversarial neural network based on the partial reconstruction loss. In addition, the series of acts 8900 include determining an adversarial loss for the region of the human to inpaint and modifying parameters of the human inpainting generative adversarial neural network based on the adversarial loss and the partial reconstruction loss. Further, the series of acts 8900 include determining an indication of at least one of removing an object, expanding a digital image frame of the digital image, or removing an object from the region of the human.

In one or more embodiments, the series of acts 8900 includes determining a human portrayed in a digital image and a region of the human to inpaint, generating, utilizing a first encoder, a structural encoding from a structure guidance map of a depiction of the human from the digital image, generating, utilizing a second encoder, a visual appearance encoding from the depiction of the human from the digital image, and generating, utilizing a human inpainting generative adversarial neural network, a modified digital image comprising modified pixels of the region from the structural encoding by modulating style blocks of the human inpainting generative adversarial neural network based on the visual appearance encoding.

For example, the series of acts 8900 includes comprises generating, utilizing a hierarchical encoder, the structural encoding from the structure guidance map of the human and the visual appearance encoding from the human portrayed in the digital image, wherein the hierarchical encoder comprises a plurality of downsampling layers and upsampling layers of matching resolutions connected via skip connections. Further, the series of acts 8900 includes generating an intermediate feature vector for each style block of the human inpainting generative adversarial neural network by modulating the structural encoding utilizing a spatially varying scaling tensor and a spatially varying shifting tensor corresponding to a style block.

Figure 90:
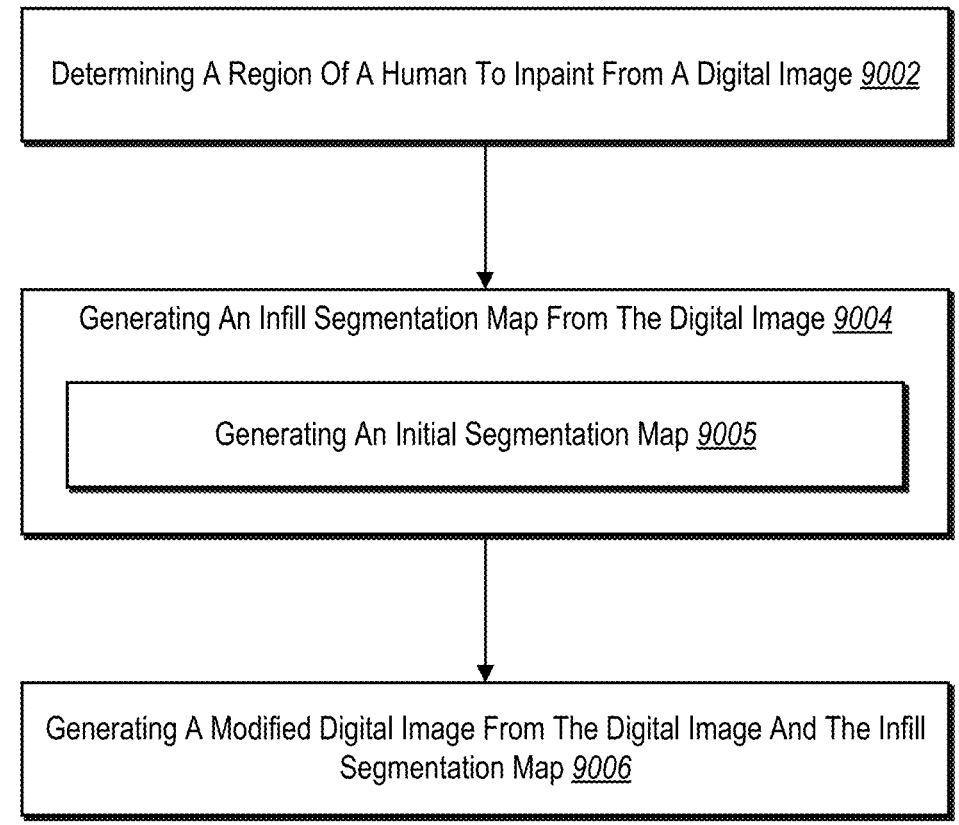
FIG. 90 illustrates a flowchart for a series of acts for performing human inpainting by utilizing an infill segmentation map in accordance with one or more embodiments.

FIG. 90 shows a series of acts 9000. For example, the series of acts 9000 include an act 9002 of determining a region of a human to inpaint from a digital image, an act 9004 of generating an infill segmentation map from the digital image, and an act 9006 of generating a modified digital image from the digital image and the infill segmentation map. Additionally, FIG. 90 shows a sub-act 9005 of generating an initial segmentation map.

In particular, the act 9002 includes determining a region of a human portrayed within a digital image to inpaint, the act 9004 includes generating, utilizing a generative segmentation machine learning model, an infill segmentation map from the digital image, the infill segmentation map comprising a human segmentation classification for the region, the act 9006 includes generating, utilizing a human inpainting generative adversarial neural network, a modified digital image from the digital image and the infill segmentation map, wherein the modified digital image comprises modified pixels for the region corresponding to the human segmentation classification.

For example, the series of acts 9000 includes generating, utilizing a segmentation machine learning model, an initial segmentation map that comprises an unclassified region corresponding to the region of the human to inpaint. Further, the series of acts 9000 includes generating, utilizing the generative segmentation machine learning model, the infill segmentation map from the initial segmentation map and wherein generating the initial segmentation map comprises generating a segmentation classification for the unclassified region.

Further, the series of acts 9000 includes generating a structural encoding from the infill segmentation map and a visual appearance encoding from the digital image. Additionally, the series of acts 9000 includes generating a structural encoding and a visual appearance encoding further comprises utilizing a hierarchical encoder comprising a plurality of downsampling layers and upsampling layers connected via skip connections. Moreover, the series of acts 9000 includes generating, utilizing a background generative adversarial neural network, a modified background portion of the digital image from the digital image and generating, utilizing the human inpainting generative adversarial neural network, the modified pixels of the region of the human portrayed within the digital image.

Additionally, the series of acts 9000 includes inpainting the human portion utilizing the human inpainting generative adversarial neural network, and inpainting the background portion based on the inpainted human portion and utilizing the background generative adversarial neural network. Further, the series of acts 9000 includes generating an intermediate digital image by removing the region of the human and inpainting the background portion utilizing the background generative adversarial neural network, generating, utilizing the human inpainting generative adversarial neural network, the modified pixels for the region corresponding to the human segmentation classification, and generating the modified digital image by inserting the modified pixels into the intermediate digital image.

The series of acts 9000 also includes determining a region of the digital image to inpaint, the region comprising a human portion of the digital image and a background portion of the digital image, generating, utilizing the generative segmentation machine learning model, an infill segmentation map from the digital image, the infill segmentation map comprising a human segmentation classification for the human portion, generating, utilizing the human inpainting generative adversarial neural network, a modified human portion of the digital image from the digital image and the infill segmentation map, and generating, utilizing the background generative adversarial neural network, a modified background portion of the digital image from the digital image.

Further, the series of acts 9000 includes generating a modified digital image by combining the modified background portion and the modified human portion of the digital image from the digital image. Additionally, the series of acts 9000 includes generating, utilizing an encoder, a structural encoding from the infill segmentation map, generating, utilizing the encoder, a visual appearance encoding based on the human portion of the digital image, and generating the modified digital image from the modified background portion, the structural encoding, and the visual appearance encoding.

Moreover, the series of acts 9000 includes generating a mask for the region of the human portion in the digital image and a mask for the background portion of the digital image. In addition, the series of acts 9000 modifying pixels for the region corresponding to the human portion of the digital image utilizing the mask for the region of the human portion, and modifying pixels for the region corresponding to the background portion of the digital image utilizing the mask for the background portion. Further, the series of acts 9000 includes generating, utilizing a segmentation machine learning model, an initial segmentation map that comprises an unclassified region corresponding to the region of the human portion to inpaint and generating, utilizing the generative segmentation machine learning model, the infill segmentation map from the initial segmentation map.

The series of acts 9000 also includes determining a region of a human portrayed within a digital image to inpaint, generating, utilizing a generative segmentation machine learning model, an infill segmentation map from the digital image, the infill segmentation map comprising a human segmentation classification for the region, generating, utilizing a hierarchical encoder comprising a plurality of downsampling layers and upsampling layers connected via skip connections, a structural encoding from the infill segmentation map, and generating, utilizing a human inpainting generative adversarial neural network, a modified digital image from the digital image and the structural encoding, the modified digital image comprising modified pixels for the region corresponding to the human segmentation classification.

Further, the series of acts 9000 also includes generating, utilizing the hierarchical encoder, a visual appearance encoding based on the digital image and generating, utilizing the human inpainting generative adversarial neural network, the modified digital image from the visual appearance encoding and the structural encoding. Moreover, the series of acts 9000 include identifying a background portion of the digital image, generating, utilizing a background generative adversarial neural network, a modified background portion of the digital image from the digital image, and generating the modified digital image by combining the modified background portion and the modified pixels of the region of the human from the structural encoding and the visual appearance encoding.

In addition, the series of acts 9000 includes generating a mask for the region of the human portrayed in the digital image and a mask for the background portion of the digital image, and generating the modified digital image by utilizing the mask for the region of the human and the mask for the background portion. Moreover, the series of acts 9000 includes generating, utilizing a segmentation machine learning model, an initial segmentation map that comprises an unclassified region corresponding to the region of the human to inpaint and wherein generating the initial segmentation map comprises generating a segmentation classification for the unclassified region. Additionally, the series of acts 9000 includes generating, utilizing the generative segmentation machine learning model, the infill segmentation map from the initial segmentation map.

FIG. 91 shows a series of acts 9100. For example, FIG. 91 shows an act 9102 of generating a pose feature map from a target pose map and a source digital image, an act 9104 of generating a global texture map appearance vector from a texture map, an act 9106 of generating a local appearance feature tensor from the source digital image, and an act 9108 of synthesizing a modified digital image based on the pose feature map, the local appearance feature tensor, and the global texture map appearance vector. Additionally, FIG. 91 shows a sub-act 9103 of generating the pose feature map utilizing a hierarchical pose encoder.

In particular, the act 9102 includes generating, utilizing a pose encoder, a pose feature map from a target pose map and a source digital image that depicts a human, the act 9104 includes generating, utilizing a texture map appearance encoder, a global texture map appearance vector from a texture map of the source digital image, the act 9106 includes generating, utilizing a parameter neural network, a local appearance feature tensor from the source digital image, and the act 9108 includes synthesizing, utilizing a reposing generative adversarial neural network, a modified digital image that depicts the human according to the target pose map based on the pose feature map, the local appearance feature tensor, and the global texture map appearance vector.

For example, the series of acts 9100 includes generating the pose feature map utilizing a hierarchical pose encoder by: generating, utilizing a downsampling layer of the hierarchical pose encoder, an intermediate downsampled feature vector having a resolution, generating utilizing an upsampling layer of the hierarchical pose encoder, an intermediate upsampled feature vector having the resolution, and generating, via a skip connection, a combined feature vector from the intermediate downsampled feature vector and the intermediate upsampled feature vector.

In addition, the series of acts 9100 includes generating, utilizing an additional downsampling layer of the hierarchical pose encoder, an additional intermediate downsampled feature vector having an additional resolution, generating utilizing an additional upsampling layer of the hierarchical pose encoder from the combined feature vector, an additional intermediate upsampled feature vector having the additional resolution, and combining, via a skip connection, the additional intermediate downsampled feature vector and the additional intermediate upsampled feature vector to generate the pose feature map. Further, the series of acts 9100 includes generating a one-dimensional appearance vector utilizing a hierarchical appearance encoder.

Further, the series of acts 9100 includes generating, utilizing an image appearance encoder, a local appearance vector from the source digital image, and generating, utilizing the parameter neural network, the local appearance feature tensor from the local appearance vector, the local appearance feature tensor comprising a spatially varying scaling tensor and a spatially varying shifting tensor. Moreover, the series of acts 9100 includes generating the modified digital image from the pose feature map by: generating globally modified local appearance feature tensor by combining the local appearance feature tensor and the global texture map appearance vector and modulating the reposing generative adversarial neural network utilizing the globally modified local appearance feature tensor.

In addition, the series of acts 9100 includes training the reposing generative adversarial neural network by: generating incomplete digital images from an unpaired image dataset by applying masks to a plurality of source digital images portraying humans in the unpaired image dataset and synthesizing, utilizing the reposing generative adversarial neural network, a plurality of inpainted digital images from the incomplete digital images and target pose maps of the plurality of source digital images. Additionally, the series of acts 9100 includes modifying parameters of the reposing generative adversarial neural network based on measures of loss between the plurality of inpainted digital images and the plurality of source digital images. Moreover, the series of acts 9100 includes training the reposing generative adversarial neural network utilizing an unpaired dataset comprising the source digital image by: determining, utilizing a discriminator neural network, an adversarial loss from the modified digital image and modifying parameters of the reposing generative adversarial neural network based on the adversarial loss from the modified digital image generated from the unpaired dataset.

The series of acts 9100 also includes generating, utilizing a texture map appearance encoder of the reposing neural network, a global texture map appearance vector from the texture map, generating, utilizing an image appearance encoder of the reposing neural network, a local appearance vector from the source digital image, generating, utilizing a parameter neural network, local appearance feature tensor from the local appearance vector, and synthesize, utilizing the reposing neural network, a modified digital image that depicts the human according to the target pose map based on the source digital image, the local appearance feature tensor, and the global texture map appearance vector.

Moreover, the series of acts 9100 includes generating the global texture map appearance vector from the texture map of the source digital image comprises generating a one-dimensional appearance vector utilizing a hierarchical appearance encoder and generating the local appearance feature tensor from the local appearance vector comprises a spatially varying scaling tensor and a spatially varying shifting tensor. Further, the series of acts 9100 includes generating globally modified local appearance feature tensor by combining the global texture map appearance vector with the local appearance feature tensor.

Additionally, the series of acts 9100 includes modulate the reposing neural network utilizing the globally modified local appearance feature tensor. Further, the series of acts 9100 includes generating the texture map from pixel values of the source digital image and a pose map of the source digital image. Moreover, the series of acts 9100 includes training the reposing neural network by generating incomplete digital images from an unpaired image dataset by applying masks to a plurality of source digital images portraying humans in the unpaired image dataset, synthesizing, utilizing the reposing neural network, a plurality of inpainted digital images from the incomplete digital images and target pose maps of the plurality of source digital images, and modifying parameters of the reposing neural network based on measures of loss between the plurality of inpainted digital images and the plurality of source digital images.

The series of acts 9100 also include generating, utilizing a texture map appearance encoder of a reposing neural network, a global texture map appearance vector from a texture map, generating, utilizing an image appearance encoder of the reposing neural network, a local appearance vector from a source digital image that depicts a human, generating, a combined vector from the global texture map appearance vector and the local appearance vector, and synthesizing, utilizing a reposing generative adversarial neural network, a modified digital image that depicts the human according to a target pose map based on the combined vector. Additionally, the series of acts 9100 includes generating the texture map from pixel values of the source digital image and a pose map of the source digital image, and generating the global texture map appearance vector from the texture map of the source digital image comprises generating a one-dimensional appearance vector utilizing a hierarchical appearance encoder.

Moreover, the series of acts 9100 includes generating a local appearance feature tensor from the local appearance vector, the local appearance feature tensor comprises a spatially varying scaling tensor and a spatially varying shifting tensor and generating the combined vector by combining the global texture map appearance vector with the local appearance feature tensor. Further, the series of acts 9100 includes synthesizing the modified digital image by modulating a style block of the reposing neural network utilizing the combined vector. Additionally, the series of acts 9100 includes training the reposing neural network by modifying parameters of the reposing neural network based on an adversarial loss from the modified digital image generated from an unpaired dataset comprising the source digital image.

Figure 92:
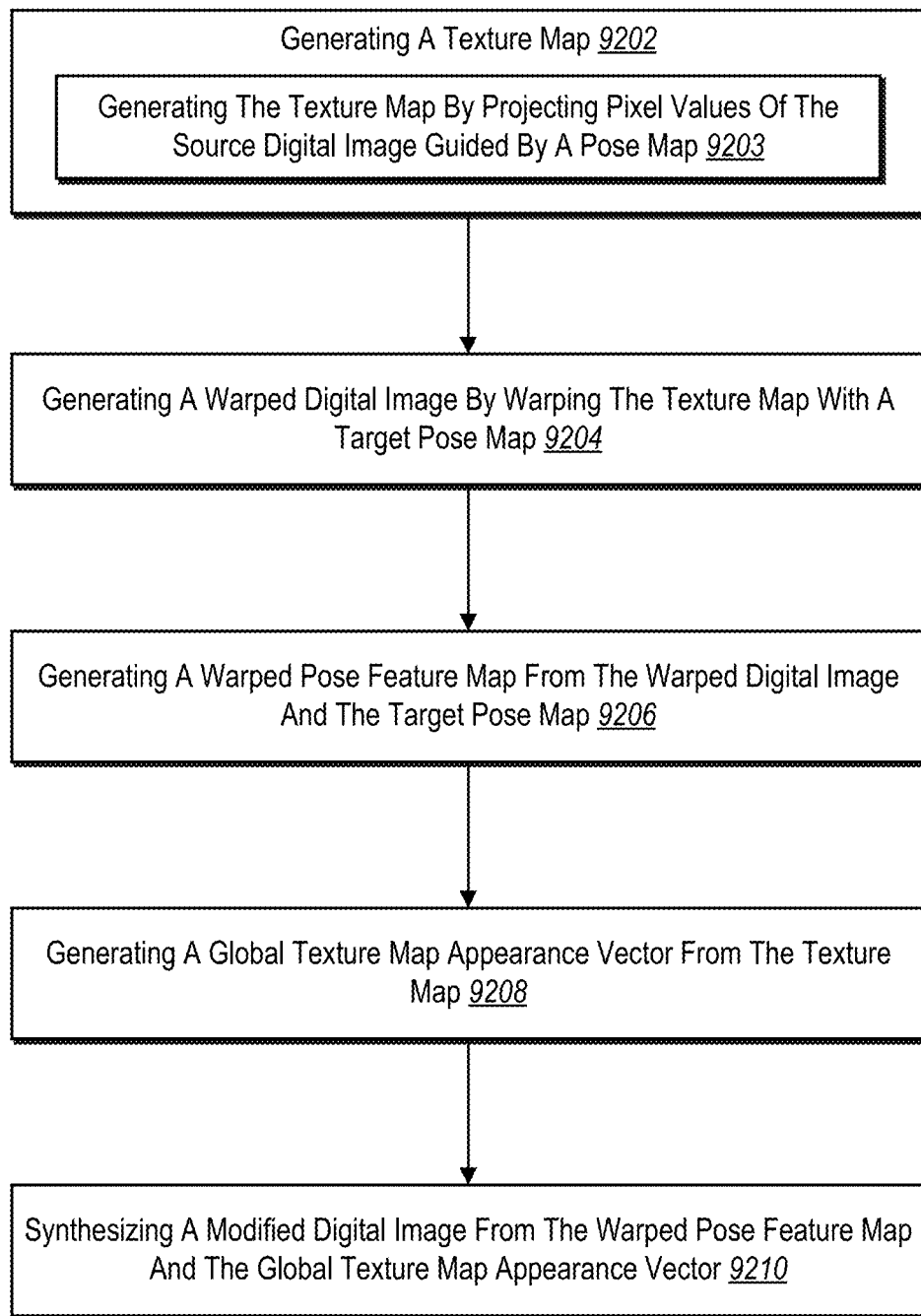
FIG. 92 illustrates a flowchart for a series of acts for reposing a subject within a digital image by utilizing a warped digital image in accordance with one or more embodiments.

FIG. 92 shows a series of acts 9200. For example, the series of acts 9200 includes an act 9202 of generating a texture map, an act 9204 of generating a warped digital image by warping the texture map with a target pose map, an act 9206 of generating a warped pose feature map from the warped digital image and the target pose map, an act 9208 of generating a global texture map appearance vector from the texture map, and an act 9210 from synthesizing a modified digital image from the warped pose feature map and the global texture map appearance vector. Additionally, FIG. 92 shows a sub-act 9203 of generating the texture map by projecting pixel values of the source digital image guided by a pose map.

In particular, the act 9202 includes generating a texture map from pixel values of a source digital image that depicts a human and from a pose map of the source digital image, the act 9204 includes generating a warped digital image by warping the texture map with a target pose map, the act 9206 includes generating, utilizing a pose encoder, a warped pose feature map from the warped digital image and the target pose map, the act 9208 includes generating, utilizing a texture map appearance encoder, a global texture map appearance vector from the texture map, and the act 9210 includes synthesizing, utilizing a reposing generative adversarial neural network, a modified digital image that depicts the human according to the target pose map based on the warped pose feature map and the global texture map appearance vector.

For example, the series of acts 9200 includes generating, utilizing a three-dimensional model, the pose map from the source digital image and generating the texture map by projecting the pixel values of the source digital image guided by the pose map of the source digital image. Further, the series of acts 9200 includes determining UV coordinates from the target pose map and generating the warped digital image by rearranging the pixel values from the source digital image in the texture map based on the UV coordinates from the target pose map. Moreover, the series of acts 9200 includes generating, utilizing an image appearance encoder of the reposing generative adversarial neural network, a local appearance vector from the warped digital image, generating, utilizing a parameter neural network, a local appearance feature tensor from the local appearance vector, and synthesizing, utilizing the reposing generative adversarial neural network, the modified digital image that depicts the human according to the target pose map based on the warped pose feature map, the global texture map appearance vector, and the local appearance feature tensor.

In addition, the series of acts 9200 includes generating a globally modified local appearance feature tensor by combining the global texture map appearance vector and the local appearance feature tensor. Moreover, the series of acts 9200 includes generating, utilizing a style block of the reposing generative adversarial neural network, an intermediate feature vector by modulating the warped pose feature map utilizing the globally modified local appearance feature tensor. Furthermore, the series of acts 9200 includes generating the warped digital image further comprises generating, utilizing a coordinate inpainting generative neural network, an inpainted warped digital image and generating the warped pose feature map comprises generating, utilizing the pose encoder, the warped pose feature map from the inpainted warped digital image.

Additionally, the series of acts 9200 include training the reposing generative adversarial neural network by: generating a body mask for the human depicted in the modified digital image and determining a measure of loss for a portion of the modified digital image within the body mask utilizing a first loss weight. Further, the series of acts 9200 includes training the reposing generative adversarial neural network by: determining an additional measure of loss for an additional portion of the modified digital image outside the body mask utilizing a second loss weight and modifying parameters of the reposing generative adversarial neural network based on the measure of loss and the additional measure of loss.

Moreover, the series of acts 9200 includes generating a texture map from pixel values of the source digital image that depicts a human and a pose map of the source digital image, generating a warped digital image by warping the texture map with the target pose map, generating, utilizing a pose encoder, a warped pose feature map from the warped digital image and the target pose map, and synthesizing, utilizing the reposing neural network from the warped pose feature map, a modified digital image that depicts the human according to the target pose map.

In addition, the series of acts 9200 includes generating, utilizing a three-dimensional model, the pose map from the source digital image, generating the texture map by projecting the pixel values of the source digital image guided by the pose map of the source digital image, and generating the warped digital image by rearranging the pixel values from the source digital image in the texture map with UV coordinates from the target pose map.

Further, the series of acts 9200 includes generating, utilizing a coordinate inpainting generative neural network, an inpainted warped digital image from the warped digital image, and generating, utilizing the pose encoder, the warped pose feature map from the inpainted warped digital image. Moreover, the series of acts 9200 includes generating, utilizing a texture map appearance encoder, a global texture map appearance vector from the texture map and generating, utilizing an image appearance encoder, a warped image feature vector from the warped digital image.

Additionally, the series of acts 9200 includes generating, utilizing a parameter neural network, a local appearance feature tensor from the warped image feature vector and generating a globally modified local appearance feature tensor by combining the global texture map appearance vector and the local appearance feature tensor. Moreover, the series of acts 9200 includes synthesizing the modified digital image that depicts the human according to the target pose map utilizing the reposing neural network from the warped pose feature map and the globally modified local appearance feature tensor.

The series of acts 9200 also includes generating a warped digital image by warping a texture map of a digital image with a target pose map, generating, utilizing a pose encoder, a warped pose feature map from the warped digital image and the target pose map, generating, utilizing a parameter neural network, local appearance feature tensor from the warped digital image, and synthesizing, utilizing a reposing generative adversarial neural network, a modified digital image that depicts a human according to the target pose map based on the warped pose feature map and the local appearance feature tensor.

Additionally, the series of acts 9200 includes generating the warped digital image by rearranging pixel values from the digital image in the texture map with UV coordinates from the target pose map. Moreover, the series of acts 9200 includes generating a globally modified local appearance feature tensor from the local appearance feature tensor and a global texture map appearance vector from the texture map and modulating the warped pose feature map via the reposing generative adversarial neural network utilizing the globally modified local appearance feature tensor. Further, the series of acts 9200 includes utilizing a coordinate inpainting generative neural network, an inpainted warped digital image. Moreover, the series of acts 9200 includes generating, utilizing the pose encoder, the warped pose feature map from the inpainted warped digital image.

Figure 93:
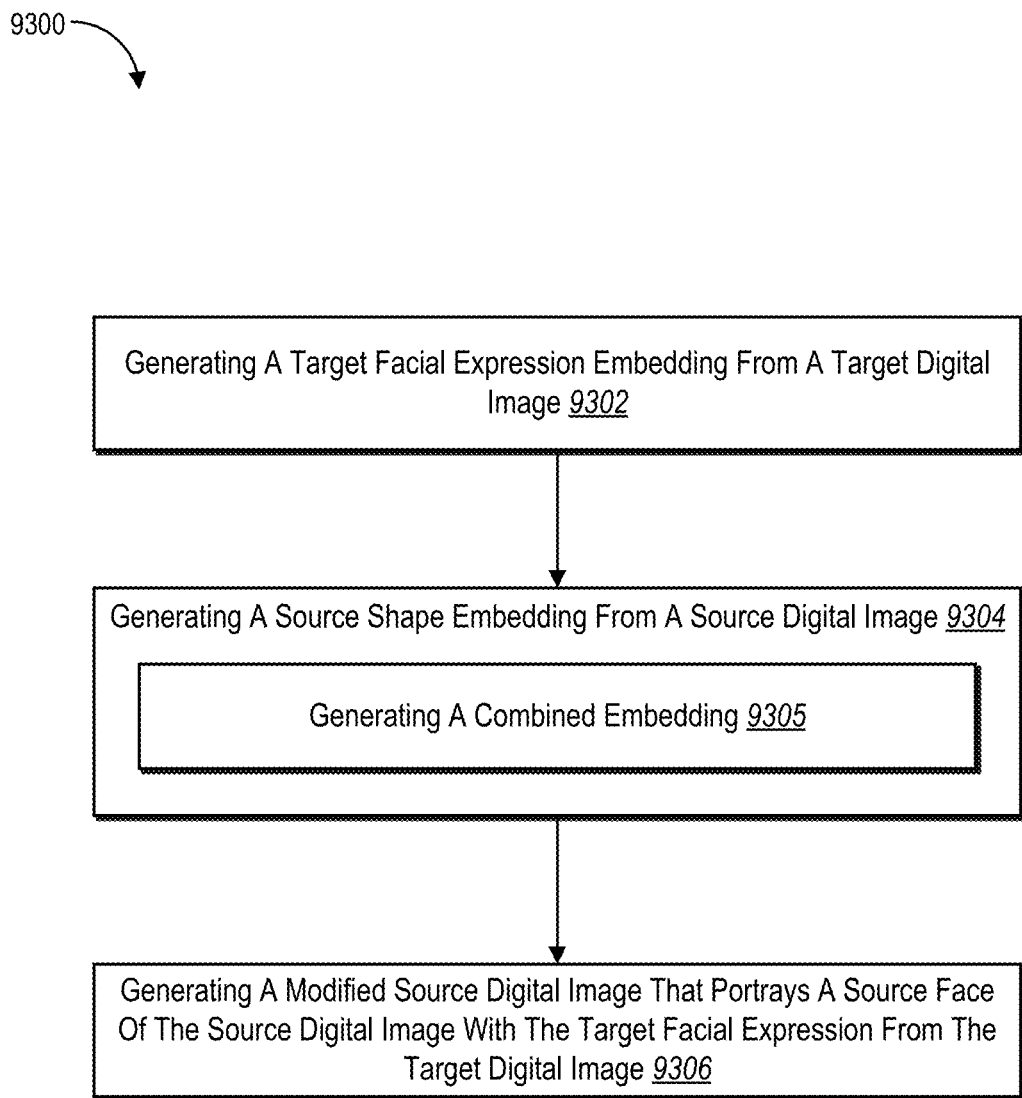
FIG. 93 illustrates a flowchart for a series of acts for performing facial expression transfer in accordance with one or more embodiments.

FIG. 93 shows a series of acts 9300. For example, the series of acts 9300 includes an act 9302 of generating a target facial expression embedding from a target digital image, an act 9304 of generating a source shape embedding from a source digital image, and an act 9306 of generating a modified source digital image that portrays a source face of the source digital image with the target facial expression from the target digital image. Additionally, FIG. 93 shows a sub-act 9305 of generating a combined embedding.

In particular, the act 9302 includes generating, utilizing a three-dimensional encoder, a target facial expression embedding from a target digital image portraying a face having a target facial expression, the act 9304 includes generating, utilizing the three-dimensional encoder, a source shape embedding from a source digital image portraying a source face having a source pose and a source facial expression, and the act 9306 includes generating, utilizing a facial expression generative neural network from the source digital image, a modified source digital image that portrays the source face of the source digital image with the target facial expression from the target digital image by conditioning layers of the facial expression generative neural network based on the target facial expression embedding and the source shape embedding.

For example, the series of acts 9300 include generating, utilizing the three-dimensional encoder, a target pose embedding from the target digital image, wherein the face comprises a target pose. Further, the series of acts 9300 include generating, utilizing the facial expression generative neural network from the source digital image, the modified source digital image that portrays the source face of the source digital image with the target pose and the target facial expression from the target digital image by conditioning layers of the facial expression generative neural network based on the target pose embedding, the target facial expression embedding, and the source shape embedding.

Additionally, the series of acts 9300 include generating a combined embedding from the target pose embedding, the target facial expression embedding, and the source shape embedding. Further, the series of acts 9300 include generating the modified source digital image from the source digital image by conditioning layers of the facial expression generative neural network with the combined embedding. Moreover, the series of acts 9300 include providing, for display via a user interface of a client device, a source image selectable element and a target face selectable element, determining the source digital image based on user interaction with the source image selectable element, and determining the target facial expression embedding based on user interaction with the target face selectable element.

Furthermore, the series of acts 9300 includes receiving a selection, via the client device, of the target digital image or receiving a selection, via the client device, of a pre-defined target facial expression. Additionally, the series of acts 9300 includes training the facial expression generative neural network utilizing a digital video dataset by: generating the source shape embedding from a first frame of a digital video of the digital video dataset and generating a target pose embedding and the target facial expression embedding from a second frame of the digital video of the digital video dataset.

Moreover, the series of acts 9300 includes generating the modified source digital image that portrays the source face from the first frame of the digital video with the target pose and the target facial expression from the second frame of the digital video and modifying parameters of the facial expression generative neural network by comparing the modified source digital image with the second frame of the digital video.

The series of acts 9300 includes generating, utilizing a facial expression generative neural network guided by the source digital image the target pose embedding, and the source shape embedding, a modified source digital image that portrays the source face of the source digital image with the target pose from the target digital image. In addition, the series of acts 9300 includes generating, utilizing the three-dimensional encoder, a target facial expression embedding from the target digital image, wherein the face comprises a target facial expression, and generating, utilizing the facial expression generative neural network from the source digital image, the modified source digital image that portrays the source face of the source digital image with the target pose and the target facial expression from the target digital image by conditioning layers of the facial expression generative neural network based on the target pose embedding, the target facial expression embedding, and the source shape embedding.

Further, the series of acts 9300 includes generating, a combined embedding from the target pose embedding, the target facial expression embedding, and the source shape embedding and generating the modified source digital image from the source digital image by conditioning layers of the facial expression generative neural network with the combined embedding. Moreover, the series of acts 9300 includes providing, for display via a user interface of a client device, a source image selectable element and a target face selectable element.

In addition, the series of acts 9300 includes determining a target facial expression embedding by receiving a selection, via the client device, of a pre-defined target facial expression. Further, the series of acts 9300 includes determining a target facial expression embedding by receiving a selection, via the client device, of the target digital image.

The series of acts 9300 includes providing, for display via a user interface of a client device, source image selection element and a target face selection element, in response to interaction with the source image selection element, determining a source digital image, in response to user interaction with the target face selection element, determining a target pose embedding and a target facial expression embedding, generating, utilizing a three-dimensional encoder, a source shape embedding from the source digital image portraying a source face having a source pose and a source facial expression, and generating, utilizing a facial expression generative neural network from the source digital image, a modified source digital image that portrays the source face of the source digital image with a target pose and target facial expression by conditioning style blocks of the facial expression generative neural network based on the target pose embedding, the target facial expression embedding, and the source shape embedding.

Further, the series of acts 9300 includes providing an option to select a target digital image that portrays the target pose and the target facial expression or an option to select a pre-defined target facial expression. Moreover, the series of acts 9300 includes training the facial expression generative neural network utilizing a digital video dataset by generating the source shape embedding from a first frame of a digital video of the digital video dataset. Additionally, the series of acts 9300 includes training the facial expression generative neural network utilizing a digital video dataset by generating the target pose embedding and the target facial expression embedding from a second frame of the digital video of the digital video dataset. Moreover, the series of acts 9300 includes training the facial expression generative neural network utilizing a digital video dataset by generating the modified source digital image that portrays the source face from the first frame of the digital video with the target pose and the target facial expression from the second frame of the digital video to modify parameters of the facial expression generative neural network by comparing the modified source digital image with the second frame of the digital video.

Figure 94:
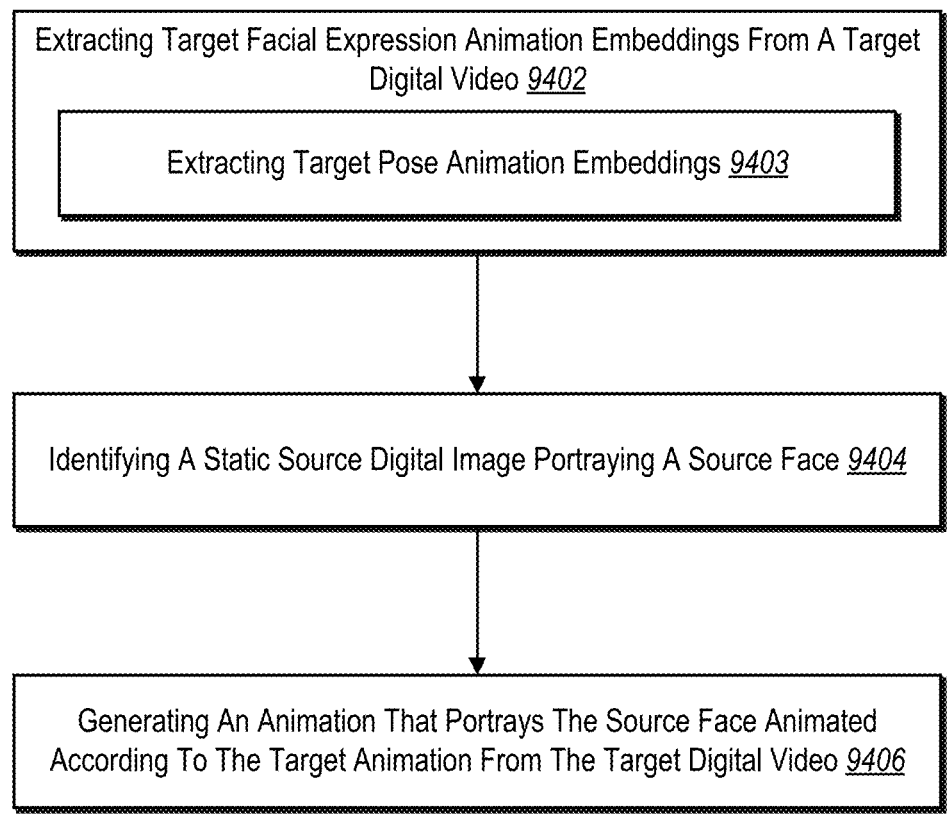
FIG. 94 illustrates a flowchart for a series of acts for performing facial expression animation in accordance with one or more embodiments.

FIG. 94 shows a series of acts 9400. For example, the series of acts 9400 includes an act 9402 of extracting target facial expression animation embeddings from a target digital video, an act 9404 of identifying a static source digital image portraying a source face, and an act 9406 of generating an animation that portrays the source face animated according to the target animation from the target digital video. In addition, FIG. 94 also shows a sub-act 9403 of extracting target pose animation embeddings.

In particular, the act 9402 includes extracting, utilizing a three-dimensional encoder, target facial expression animation embeddings from a target digital video portraying a target animation of a face, the act 9404 includes identifying a static source digital image portraying a source face having a source shape and facial expression, and the act 9406 includes generating, utilizing a facial animation generative neural network from the static source digital image and the target facial expression animation embeddings, an animation that portrays the source face animated according to the target animation from the target digital video.

For example, the series of acts 9400 includes utilizing the three-dimensional encoder, target pose animation embeddings from the target digital video portraying the target animation of the face. Moreover, the series of acts 9400 includes generating the animation utilizing the facial animation generative neural network from the static source digital image, the target facial expression animation embeddings, and the target pose animation embeddings. Further, the series of acts 9400 includes generating a first target facial expression animation embedding from a first frame of the target digital video and a second target facial expression embedding from a second frame of the target digital video.

Additionally, the series of acts 9400 includes generating the animation that portrays the source face animated according to the target animation from the target digital video by utilizing a facial animation diffusion neural network. Further, the series of acts 9400 includes conditioning the facial animation diffusion neural network with a target pose animation embeddings, the target facial expression animation embeddings, and a source shape embedding from the source face. Moreover, the series of acts includes providing, for display via a user interface of a client device, a source image selection element and a target animation selection element and based on user interaction with the source image selection element and the target animation selection element, identify the static source digital image portraying the source face and the target facial expression animation embeddings. Further, the series of acts 9400 includes providing a plurality of pre-defined target animations for display. In addition the series of acts 9400 includes identifying the target animation from a camera roll of the client device based on user interaction with the target animation selection element.

The series of acts 9400 also includes providing, for display via a user interface of a client device, a source image selection element and a target animation selection element, based on user interaction with the source image selection element and the target animation selection element, identifying a static source image portraying a source face, and target pose animation embeddings, and target facial expression animation embeddings of a target animation of a target face, generating, utilizing a facial animation generative neural network from the static source digital image, the target pose animation embeddings, and the target facial expression animation embeddings, an animation that portrays the source face animated according to the target animation of the target face, and providing the animation for display via the user interface of the client device.

Further, the series of acts 9400 includes providing, for display via the user interface of the client device an option to select from a plurality of pre-defined target animations. Additionally, the series of acts 9400 includes providing, for display via the user interface of the client device an option to select a digital image from a camera roll of the client device. Moreover, the series of acts 9400 includes identifying the static source image portraying the source face by receiving a selection of the digital image from the camera roll of the client device. Additionally, the series of acts 9400 includes generating the target facial expression animation embeddings by: generating, utilizing a three-dimensional encoder, a first target facial expression animation embedding from a first frame of the target digital video and generating, utilizing the three-dimensional encoder, a second target facial expression animation embedding from a second frame of the target digital video.

Moreover, the series of acts 9400 includes generating the animation utilizing the facial animation generative neural network by: conditioning a facial animation diffusion neural network with the first target facial expression animation embedding and the second target facial expression animation embedding.

The series of acts 9400 also includes extracting, utilizing a three-dimensional encoder, target pose animation embeddings and target facial expression animation embeddings from a target digital video portraying a target animation of a face, extracting, utilizing a three-dimensional encoder, a source shape embedding from a static source digital image that portrays a source face, generating, utilizing a facial animation generative neural network from the static source digital image, an animation that portrays the source face animated according to an animation selection element by conditioning style blocks of the facial animation generative neural network with the target pose animation embeddings, the target facial expression animation embeddings, and the source shape embedding, and providing the animation for display via a user interface of a client device.

Further the series of acts 9400 includes generating combined embeddings from the target pose animation embeddings, the target facial expression animation embeddings, and the source shape embedding and generating the animation by conditioning style blocks of the facial animation generative neural network with the combined embeddings. Moreover, the series of acts 9400 includes providing, for display via a user interface of a client device, a source image selection element and a target animation selection element, wherein the target animation selection element comprises providing a plurality of pre-defined target animations for display. Also, the series of acts 9400 includes identifying the source digital image based on user interaction with the source image selection element comprising an option to select a digital image from a camera roll of the client device. Additionally, the series of acts 9400 include utilizing a three-dimensional encoder to generate the target pose animation embedding and the target facial expression animation embeddings.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 95:
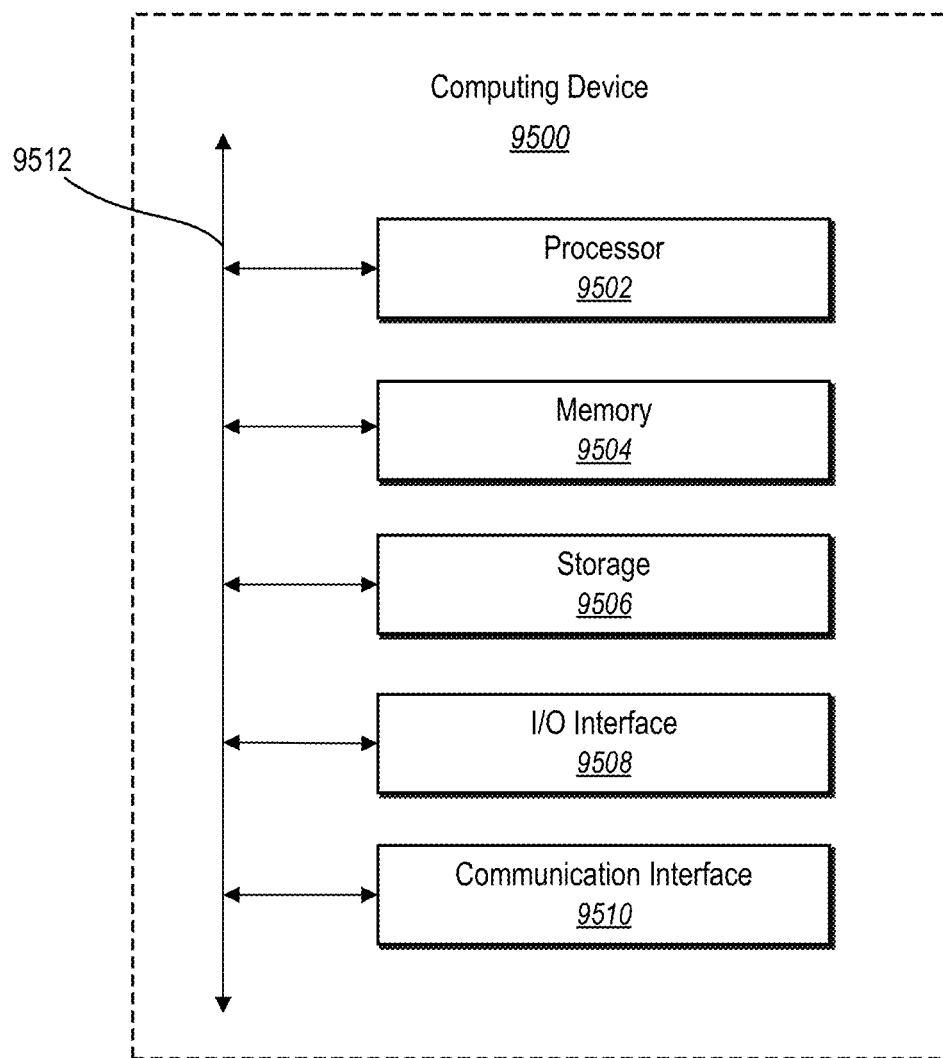
FIG. 95 illustrates a block diagram of an exemplary computing device in accordance with one or more embodiments.

FIG. 95 illustrates a block diagram of an example computing device 9500 that may be configured to perform one or more of the processes described above. One will appreciate that one or more computing devices, such as the computing device 9500 may represent the computing devices described above (e.g., the server(s) 102 and/or the client devices 110a-110n). In one or more embodiments, the computing device 5100 may be a mobile device (e.g., a mobile telephone, a smartphone, a PDA, a tablet, a laptop, a camera, a tracker, a watch, a wearable device). In some embodiments, the computing device 9500 may be a non-mobile device (e.g., a desktop computer or another type of client device). Further, the computing device 9500 may be a server device that includes cloud-based processing and storage capabilities.

As shown in FIG. 95, the computing device 9500 can include one or more processor(s) 9502, memory 9504, a storage device 9506, input/output interfaces 9508 (or "I/O interfaces 9508"), and a communication interface 9510, which may be communicatively coupled by way of a communication infrastructure (e.g., bus 9512). While the computing device 9500 is shown in FIG. 95, the components illustrated in FIG. 95 are not intended to be limiting. Additional or alternative components may be used in other embodiments. Furthermore, in certain embodiments, the computing device 5100 includes fewer components than those shown in FIG. 95. Components of the computing device 9500 shown in FIG. 95 will now be described in additional detail.

In particular embodiments, the processor(s) 9502 includes hardware for executing instructions, such as those making up a computer program. As an example, and not by way of limitation, to execute instructions, the processor(s) 9502 may retrieve (or fetch) the instructions from an internal register, an internal cache, memory 9504, or a storage device 9506 and decode and execute them.

The computing device 9500 includes memory 9504, which is coupled to the processor(s) 9502. The memory 9504 may be used for storing data, metadata, and programs for execution by the processor(s). The memory 9504 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 9504 may be internal or distributed memory.

The computing device 9500 includes a storage device 9506 including storage for storing data or instructions. As an example, and not by way of limitation, the storage device 9506 can include a non-transitory storage medium described above. The storage device 9506 may include a hard disk drive (HDD), flash memory, a Universal Serial Bus (USB) drive or a combination these or other storage devices.

As shown, the computing device 9500 includes one or more I/O interfaces 9508, which are provided to allow a user to provide input to (such as user strokes), receive output from, and otherwise transfer data to and from the computing device 9500. These I/O interfaces 9508 may include a mouse, keypad or a keyboard, a touch screen, camera, optical scanner, network interface, modem, other known I/O devices or a combination of such I/O interfaces 9508. The touch screen may be activated with a stylus or a finger.

The I/O interfaces 9508 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 9508 are configured to provide graphical data to a display for presentation to a user. The graphical data may be representative of one or more graphical user interfaces and/or any other graphical content as may serve a particular implementation.

The computing device 9500 can further include a communication interface 9510. The communication interface 9510 can include hardware, software, or both. The communication interface 9510 provides one or more interfaces for communication (such as, for example, packet-based communication) between the computing device and one or more other computing devices or one or more networks. As an example, and not by way of limitation, communication interface 9510 may include a network interface controller (NIC) or network adapter for communicating with an Ethernet or other wire-based network or a wireless NIC (WNIC) or wireless adapter for communicating with a wireless network, such as a WI-FI. The computing device 9500 can further include a bus 9512. The bus 9512 can include hardware, software, or both that connects components of computing device 9500 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
generating, utilizing a facial expression transfer model comprising an end-to-end network of one or more three-dimensional encoders and a facial expression generative adversarial neural network, a first target facial expression embedding for a first resolution from a target digital image portraying a face having a target facial expression;
generating, utilizing the facial expression transfer model comprising the one or more three-dimensional encoders, a first target pose embedding for the first resolution from the target digital image;
generating, utilizing the facial expression transfer model comprising the one or more three-dimensional encoders, a first source shape embedding for the first resolution from a source digital image portraying a source face having a source pose and a source facial expression;
generating a first combined embedding by concatenating the first target facial expression embedding for the first resolution from the target digital image, the first target pose embedding for the first resolution from the target digital image, and the first source shape embedding for the first resolution from the source digital image;

generating, utilizing the facial expression transfer model comprising the one or more three-dimensional encoders, a second target facial expression embedding for a second resolution from the target digital image;

generating, utilizing the facial expression transfer model comprising the one or more three-dimensional encoders, a second target pose embedding for the second resolution from the target digital image;

generating, utilizing the facial expression transfer model comprising the one or more three-dimensional encoders, a second source shape embedding for the second resolution from the source digital image;

generating a second combined embedding by concatenating the second target facial expression embedding for the second resolution from the target digital image, the second target pose embedding for the second resolution from the target digital image, and the second source shape embedding for the second resolution from the source digital image; and generating, utilizing the facial expression generative adversarial neural network from the source digital image, a modified source digital image that portrays the source face of the source digital image with the target facial expression from the target digital image by conditioning a first layers of the facial expression generative adversarial neural network with the first combined embedding and conditioning a second layer of the facial expression generative adversarial neural network with the second combined embedding.

2. The computer-implemented method of claim 1, further comprising:

utilizing a comodulated generative adversarial neural network as the facial expression generative adversarial neural network to generate the modified source digital image by:

generating, utilizing a modulation layer of a first style block of the first layer, a modulated vector from the source digital image and the first combined embedding;

passing the modulated vector to a convolutional layer of the first style block of the first layer; and generating, utilizing a demodulation layer of the first style block of the first layer, an intermediate vector.

3. The computer-implemented method of claim 2, further comprising:

generating, utilizing a second modulation layer of a second style block of the second layer, an additional modulated vector from the source digital image and the second combined embedding;

passing the additional modulated vector to a second convolutional layer of the second style block of the second layer;

generating, utilizing a second demodulation layer of the second style block of the second layer, an additional intermediate vector; and generating the modified source digital image from the additional intermediate vector.

4. The computer-implemented method of claim 1, further comprising generating, utilizing the one or more three-dimensional encoders, a third target facial expression embedding for a third resolution from the target digital image, a third target pose embedding for the third resolution from the target digital image, and a third source shape embedding for the third resolution from the source digital image.

5. The computer-implemented method of claim 4, further comprising:

generating a third combined embedding from concatenating the third target pose embedding, the third target facial expression embedding, and the third source shape embedding; and generating the modified source digital image from the source digital image by conditioning a third layers of the facial expression generative adversarial neural network with the third combined embedding.

6. The computer-implemented method of claim 1, further comprising:

detecting a plurality of facial expressions within an additional source digital image; and transferring an additional target facial expression from an additional target digital image to replace an additional source face in the additional source digital image based on comparing the plurality of facial expressions.

7. The computer-implemented method of claim 1, wherein generating the first source shape embedding and the second source shape embedding from the source digital image further comprises:

generating a modified source digital image by relocating the source face within the source digital image based on facial keypoints from the target digital image; and generating, utilizing the one or more three-dimensional encoders, the first source shape embedding and the second source shape embedding from the modified source digital image.

8. The computer-implemented method of claim 1, further comprising training the facial expression generative adversarial neural network utilizing a digital video dataset by:

generating a training source shape embedding from a first training frame of a digital video of the digital video dataset; and generating a training target pose embedding and a training target facial expression embedding from a second training frame of the digital video of the digital video dataset.

9. The computer-implemented method of claim 8, further comprising training the facial expression generative adversarial neural network utilizing the digital video dataset by:

generating a modified source training digital image that portrays a source face from the first training frame of the digital video with a target pose and a target facial expression from the second training frame of the digital video; and modifying parameters of the facial expression generative adversarial neural network by comparing the modified source training digital image with the second training frame of the digital video.

10. A system comprising:

one or more memory devices comprising a target digital image portraying a face having a target pose and target facial expression, a source digital image portraying a source face having a source pose and source facial expression, a facial expression transfer model comprising a first three-dimensional encoder, a second three-dimensional encoder, and a facial expression generative adversarial neural network; and one or more processors configured to cause the system to:

generate, utilizing the first three-dimensional encoder of the facial expression transfer model, a first target pose embedding for a first resolution from the target digital image;

generate, utilizing the first three-dimensional encoder of the facial expression transfer model, a first target facial expression embedding for the first resolution from the target digital image;

generate, utilizing the second three-dimensional encoder of the facial expression transfer model, a first source shape embedding for the first resolution from the source digital image;

generate a first combined embedding by concatenating the first target pose embedding, the first target facial expression embedding, and the first source shape embedding;

generate, utilizing the first three-dimensional encoder, a second target facial expression embedding for a second resolution from the target digital image;

generate, utilizing the first three-dimensional encoder, a second target pose embedding for the second resolution from the target digital image;

generate, utilizing the second three-dimensional encoder, a second source shape embedding for the second resolution from the source digital image;

generate a second combined embedding by concatenating the second target facial expression embedding for the second resolution from the target digital image, the second target pose embedding for the second resolution from the target digital image, and the second source shape embedding for the second resolution from the source digital image; and generate, utilizing the facial expression generative adversarial neural network, a modified source digital image by conditioning a first layer of the facial expression generative adversarial neural network with the first combined embedding and conditioning a second layer of the facial expression generative adversarial neural network with the second combined embedding, wherein the modified source digital image portrays the source face of the source digital image with the target pose from the target digital image.

11. The system of claim 10, wherein the one or more processors are configured to cause the system to:

utilize a comodulated generative adversarial neural network as the facial expression generative adversarial neural network to generate the modified source digital image by:

generating, utilizing a modulation layer of a first style block of the first layer, a modulated vector from the source digital image and the first combined embedding;

passing the modulated vector to a convolutional layer of the first style block of the first layer; and generating, utilizing a demodulation layer of the first style block of the first layer, an intermediate vector.

12. The system of claim 11, wherein the one or more processors are configured to cause the system to:

generate, utilizing a second modulation layer of a second style block of the second layer, an additional modulated vector from the source digital image and the second combined embedding;

pass the additional modulated vector to a second convolutional layer of the second style block of the second layer;

generate, utilizing a second demodulation layer of the second style block of the second layer, an additional intermediate vector; and generate the modified source digital image from the additional intermediate vector.

13. The system of claim 10, wherein the one or more processors are configured to cause the system to provide, for display via a user interface of a client device, a source image selectable element and a target face selectable element.

14. The system of claim 13, wherein the one or more processors are configured to cause the system to generate the first target facial expression embedding by receiving a selection, via the client device, of a pre-defined target facial expression.

15. The system of claim 13, wherein the one or more processors are configured to cause the system to generate the first target facial expression embedding by receiving a selection, via the client device, of the target digital image.

16. A non-transitory computer-readable medium storing executable instructions which, when executed by a processing device, cause the processing device to perform operations comprising:

providing, for display via a user interface of a client device, source image selection element and a target face selection element;

in response to interaction with the source image selection element, determining a source digital image;

in response to user interaction with the target face selection element, generating, utilizing a facial expression transfer model comprising an end-to-end network of a first three-dimensional encoder and a facial expression generative adversarial neural network, a first target pose embedding and a first target facial expression embedding for a first resolution from a target digital image;

generating, utilizing a second three-dimensional encoder, a first source shape embedding for the first resolution from the source digital image portraying a source face having a source pose and a source facial expression;

generating a first combined embedding by concatenating the first target pose embedding, the first target facial expression embedding, and the first source shape embedding;

generating, utilizing the first three-dimensional encoder, a second target facial expression embedding for a second resolution from the target digital image;

generating, utilizing the first three-dimensional encoder, a second target pose embedding for the second resolution from the target digital image;

generating, utilizing the second three-dimensional encoder, a second source shape embedding for the second resolution from the source digital image;

generating a second combined embedding by concatenating the second target facial expression embedding for the second resolution from the target digital image, the second target pose embedding for the second resolution from the target digital image, and the second source shape embedding for the second resolution from the source digital image; and generating, utilizing the facial expression generative adversarial neural network from the source digital image, a modified source digital image that portrays the source face of the source digital image with a target pose and target facial expression by conditioning a first style blocks of the facial expression generative adversarial neural network with the first combined embedding and conditioning a second style block of the facial expression generative adversarial neural network with the second combined embedding.

17. The non-transitory computer-readable medium of claim 16, wherein providing for display the target face selection element further comprises providing an option to select the target digital image that portrays the target pose and the target facial expression or an option to select a pre-defined target facial expression.

18. The non-transitory computer-readable medium of claim 16, further comprises training the facial expression generative adversarial neural network utilizing a digital video dataset by generating a training source shape embedding from a first training frame of a digital video of the digital video dataset.

19. The non-transitory computer-readable medium of claim 18, further comprises training the facial expression generative adversarial neural network utilizing the digital video dataset by generating a training target pose embedding and a training target facial expression embedding from a second training frame of the digital video of the digital video dataset.

20. The non-transitory computer-readable medium of claim 19, further comprises training the facial expression generative adversarial neural network utilizing the digital video dataset by generating the modified source training digital image that portrays the source face from the first training frame of the digital video with the target pose and the target facial expression from the second training frame of the digital video to modify parameters of the facial expression generative adversarial neural network by comparing the modified source training digital image with the second training frame of the digital video.

* * * * *